US012511847B2

(12) United States Patent
Sorrentino et al.

(10) Patent No.: US 12,511,847 B2
(45) Date of Patent: Dec. 30, 2025

(54) METHODS FOR MANAGING OVERLAPPING WINDOWS AND APPLYING VISUAL EFFECTS

(71) Applicant: Apple Inc., Cupertino, CA (US)

(72) Inventors: William A. Sorrentino, Mill Valley, CA (US); Benjamin Hylak, San Francisco, CA (US); Christopher D. McKenzie, Burlingame, CA (US); Stephen O. Lemay, Palo Alto, CA (US); Zoey C. Taylor, San Francisco, CA (US); Miquel Estany Rodriguez, San Francisco, CA (US); James J. Owen, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/988,115

(22) Filed: Dec. 19, 2024

(65) Prior Publication Data

US 2025/0118038 A1 Apr. 10, 2025

Related U.S. Application Data

(63) Continuation of application No. 18/733,819, filed on Jun. 4, 2024.

(Continued)

(51) Int. Cl.

*G06T 19/00* (2011.01)
*G06F 3/01* (2006.01)

(Continued)

(52) U.S. Cl.

CPC ............ *G06T 19/006* (2013.01); *G06F 3/013* (2013.01); *G06F 9/452* (2018.02); *G06T 15/40* (2013.01);

(Continued)

(58) Field of Classification Search

CPC ......... G06T 19/006; G06F 2203/04803; G06F 2203/04804

See application file for complete search history.

(56) References Cited

U.S. PATENT DOCUMENTS 1,173,824 A 2/1916 Mckee
5,015,188 A 5/1991 Pellosie et al.

(Continued)

FOREIGN PATENT DOCUMENTS

CA 3033344 A1 2/2018
CN 102298493 A 12/2011

(Continued)

OTHER PUBLICATIONS

Non-Final Office Action received for U.S. Appl. No. 18/375,280, mailed on Nov. 27, 2024, 17 pages.

(Continued)

*Primary Examiner* — Ryan M Gray
(74) *Attorney, Agent, or Firm* — Kubota & Basol LLP

(57) ABSTRACT

In some embodiments, a computer system changes a visual prominence of a respective virtual object in response to detecting a threshold amount of overlap between a first virtual object and a second virtual object. In some embodiments, a computer system changes a visual prominence of a respective virtual object based on a change in spatial location of a first virtual object with respect to a second virtual object. In some embodiments, a computer system applies visual effects to representations of physical objects, virtual environments, and/or physical environments. In some embodiments, a computer system changes a visual prominence of a virtual object relative to a three-dimensional environment based on display of overlapping objects of different types in the three-dimensional environment. In some embodiments, a computer system changes a level of (Continued)

opacity of a first virtual object overlapping a second virtual object in response to movement of the first virtual object.

69 Claims, 131 Drawing Sheets

Related U.S. Application Data

(60) Provisional application No. 63/587,442, filed on Oct. 2, 2023, provisional application No. 63/515,119, filed on Jul. 23, 2023, provisional application No. 63/506,109, filed on Jun. 4, 2023, provisional application No. 63/506,128, filed on Jun. 4, 2023.

(51) Int. Cl.

| | |
|---|---|
| ***G06F 3/04815*** | (2022.01) |
| ***G06F 9/451*** | (2018.01) |
| ***G06T 15/40*** | (2011.01) |
| ***G06T 19/20*** | (2011.01) |

(52) U.S. Cl.
CPC .......... *G06T 19/20* (2013.01); *G06F 3/04815* (2013.01); *G06T 2200/24* (2013.01); *G06T 2219/2012* (2013.01)

(56) References Cited

U.S. PATENT DOCUMENTS

| | | | |
|---|---|---|---|
| 5,422,812 | A | 6/1995 | Knoll et al. |
| 5,515,488 | A | 5/1996 | Hoppe et al. |
| 5,524,195 | A | 6/1996 | Clanton et al. |
| 5,610,828 | A | 3/1997 | Kodosky et al. |
| 5,731,805 | A | 3/1998 | Tognazzini et al. |
| 5,737,553 | A | 4/1998 | Bartok |
| 5,740,440 | A | 4/1998 | West |
| 5,751,287 | A | 5/1998 | Hahn et al. |
| 5,758,122 | A | 5/1998 | Corda et al. |
| 5,794,178 | A | 8/1998 | Caid et al. |
| 5,809,267 | A | 9/1998 | Moran et al. |
| 5,877,766 | A | 3/1999 | Bates et al. |
| 5,900,849 | A | 5/1999 | Gallery |
| 5,933,143 | A | 8/1999 | Kobayashi |
| 5,990,886 | A | 11/1999 | Serdy et al. |
| 6,061,060 | A | 5/2000 | Berry et al. |
| 6,108,004 | A | 8/2000 | Medl |
| 6,112,015 | A | 8/2000 | Planas et al. |
| 6,154,559 | A | 11/2000 | Beardsley |
| 6,167,433 | A | 12/2000 | Maples et al. |
| 6,295,069 | B1 | 9/2001 | Shirur |
| 6,323,846 | B1 | 11/2001 | Westerman et al. |
| 6,426,745 | B1 | 7/2002 | Isaacs et al. |
| 6,456,296 | B1 | 9/2002 | Cataudella et al. |
| 6,570,557 | B1 | 5/2003 | Westerman et al. |
| 6,584,465 | B1 | 6/2003 | Zhu et al. |
| 6,677,932 | B1 | 1/2004 | Westerman |
| 6,714,201 | B1 | 3/2004 | Grinstein et al. |
| 6,750,873 | B1 | 6/2004 | Bernardini et al. |
| 6,756,997 | B1 | 6/2004 | Ward et al. |
| 7,035,903 | B1 | 4/2006 | Baldonado |
| 7,096,120 | B2 | 8/2006 | Hull |
| 7,137,074 | B1 | 11/2006 | Newton et al. |
| 7,230,629 | B2 | 6/2007 | Reynolds et al. |
| 7,298,370 | B1 | 11/2007 | Middler et al. |
| 7,580,576 | B2 | 8/2009 | Wang et al. |
| 7,614,008 | B2 | 11/2009 | Ording |
| 7,633,076 | B2 | 12/2009 | Huppi et al. |
| 7,634,718 | B2 | 12/2009 | Nakajima |
| 7,653,883 | B2 | 1/2010 | Hotelling et al. |
| 7,657,849 | B2 | 2/2010 | Chaudhri et al. |
| 7,663,607 | B2 | 2/2010 | Hotelling et al. |
| 7,721,226 | B2 | 5/2010 | Barabe et al. |
| 7,844,914 | B2 | 11/2010 | Andre et al. |
| 7,957,762 | B2 | 6/2011 | Herz et al. |
| 8,006,002 | B2 | 8/2011 | Kalayjian et al. |
| 8,239,784 | B2 | 8/2012 | Hotelling et al. |
| 8,279,180 | B2 | 10/2012 | Hotelling et al. |
| 8,381,135 | B2 | 2/2013 | Hotelling et al. |
| 8,436,872 | B2 | 5/2013 | Wright et al. |
| 8,479,122 | B2 | 7/2013 | Hotelling et al. |
| 8,730,156 | B2 | 5/2014 | Weising et al. |
| 8,767,045 | B2 | 7/2014 | Kitazato et al. |
| 8,793,620 | B2 | 7/2014 | Stafford |
| 8,803,873 | B2 | 8/2014 | Yoo et al. |
| 8,866,880 | B2 | 10/2014 | Tan et al. |
| 8,947,323 | B1 | 2/2015 | Raffle et al. |
| 8,970,478 | B2 | 3/2015 | Johansson |
| 8,970,629 | B2 | 3/2015 | Kim et al. |
| 8,994,718 | B2 | 3/2015 | Latta et al. |
| 9,007,301 | B1 | 4/2015 | Raffle et al. |
| 9,108,109 | B2 | 8/2015 | Pare et al. |
| 9,158,115 | B1 | 10/2015 | Worley et al. |
| 9,164,975 | B2 | 10/2015 | Milewski et al. |
| 9,183,672 | B1 | 11/2015 | Hickman et al. |
| 9,185,062 | B1 | 11/2015 | Yang et al. |
| 9,196,072 | B2 | 11/2015 | Oh et al. |
| 9,201,500 | B2 | 12/2015 | Srinivasan et al. |
| 9,214,137 | B2 | 12/2015 | Bala et al. |
| 9,222,787 | B2 | 12/2015 | Blumenberg et al. |
| 9,230,368 | B2 | 1/2016 | Keane et al. |
| 9,237,334 | B2 | 1/2016 | Cheng et al. |
| 9,241,149 | B2 | 1/2016 | Redmann |
| 9,245,388 | B2 | 1/2016 | Poulos et al. |
| 9,256,785 | B2 | 2/2016 | Qvarfordt |
| 9,293,118 | B2 | 3/2016 | Matsui |
| 9,294,757 | B1 | 3/2016 | Lewis et al. |
| 9,298,334 | B1 | 3/2016 | Zimmerman et al. |
| 9,348,458 | B2 | 5/2016 | Hotelling et al. |
| 9,383,189 | B2 | 7/2016 | Bridges et al. |
| 9,384,594 | B2 | 7/2016 | Maciocci et al. |
| 9,396,580 | B1 | 7/2016 | Nowrouzezahrai et al. |
| 9,400,559 | B2 | 7/2016 | Latta et al. |
| 9,426,193 | B2 | 8/2016 | Goodman |
| 9,436,357 | B2 | 9/2016 | Pallakoff et al. |
| 9,437,047 | B2 | 9/2016 | Chang et al. |
| 9,448,635 | B2 | 9/2016 | Macdougall et al. |
| 9,448,687 | B1 | 9/2016 | Mckenzie et al. |
| 9,465,479 | B2 | 10/2016 | Cho et al. |
| 9,519,371 | B2 | 12/2016 | Nishida |
| 9,526,127 | B1 | 12/2016 | Taubman et al. |
| 9,544,257 | B2 | 1/2017 | Ogundokun et al. |
| 9,563,331 | B2 | 2/2017 | Poulos et al. |
| 9,575,559 | B2 | 2/2017 | Andrysco |
| 9,588,651 | B1 | 3/2017 | Buchanan et al. |
| 9,612,722 | B2 | 4/2017 | Miller et al. |
| 9,619,105 | B1 | 4/2017 | Dal Mutto |
| 9,681,112 | B2 | 6/2017 | Son |
| 9,684,372 | B2 | 6/2017 | Xun et al. |
| 9,704,230 | B2 | 7/2017 | Hofmann et al. |
| 9,734,402 | B2 | 8/2017 | Jang et al. |
| 9,778,814 | B2 | 10/2017 | Ambrus et al. |
| 9,779,512 | B2 | 10/2017 | Tomlin et al. |
| 9,851,866 | B2 | 12/2017 | Goossens et al. |
| 9,870,130 | B2 | 1/2018 | Schubert et al. |
| 9,886,087 | B1 | 2/2018 | Wald et al. |
| 9,911,232 | B2 | 3/2018 | Shapira et al. |
| 9,933,833 | B2 | 4/2018 | Tu et al. |
| 9,933,937 | B2 | 4/2018 | Lemay et al. |
| 9,934,614 | B2 | 4/2018 | Ramsby et al. |
| 9,952,042 | B2 | 4/2018 | Abovitz et al. |
| 10,026,209 | B1 | 7/2018 | Dagley et al. |
| 10,049,460 | B2 | 8/2018 | Romano et al. |
| 10,101,803 | B2 | 10/2018 | Faaborg et al. |
| 10,175,483 | B2 | 1/2019 | Salter et al. |
| 10,192,347 | B2 | 1/2019 | Bui et al. |
| 10,203,764 | B2 | 2/2019 | Katz et al. |
| 10,210,664 | B1 | 2/2019 | Chaturvedi |
| 10,303,427 | B2 | 5/2019 | Shintani et al. |
| 10,307,671 | B2 | 6/2019 | Barney et al. |
| 10,318,034 | B1 | 6/2019 | Hauenstein et al. |
| 10,339,721 | B1 | 7/2019 | Dascola et al. |
| 10,353,532 | B1 | 7/2019 | Holz et al. |
| 10,373,381 | B2 | 8/2019 | Nuernberger et al. |

(56) References Cited

U.S. PATENT DOCUMENTS

| | | | |
|---|---|---|---|
| 10,394,320 | B2 | 8/2019 | George-svahn et al. |
| 10,401,958 | B2 | 9/2019 | Peana et al. |
| 10,424,124 | B2 | 9/2019 | Takahashi |
| 10,448,189 | B2 | 10/2019 | Link |
| 10,484,641 | B2 | 11/2019 | Zhou et al. |
| 10,488,941 | B2 | 11/2019 | Lam et al. |
| 10,499,044 | B1 | 12/2019 | Giokaris et al. |
| 10,534,439 | B2 | 1/2020 | Raffa et al. |
| 10,545,584 | B2 | 1/2020 | Tome et al. |
| 10,564,714 | B2 | 2/2020 | Marggraff et al. |
| 10,573,067 | B1 | 2/2020 | Naik et al. |
| 10,630,803 | B2 | 4/2020 | Hwang et al. |
| 10,642,368 | B2 | 5/2020 | Chen |
| 10,645,332 | B2 | 5/2020 | Zhang |
| 10,664,043 | B2 | 5/2020 | Ikuta et al. |
| 10,664,048 | B2 | 5/2020 | Cieplinski et al. |
| 10,664,050 | B2 | 5/2020 | Alcaide et al. |
| 10,671,241 | B1 | 6/2020 | Jia et al. |
| 10,691,216 | B2 | 6/2020 | Geisner et al. |
| 10,698,562 | B1 | 6/2020 | Zhou et al. |
| 10,699,488 | B1 | 6/2020 | Terrano |
| 10,708,965 | B1 | 7/2020 | Subramanian et al. |
| 10,712,900 | B2 | 7/2020 | Osman et al. |
| 10,732,721 | B1 | 8/2020 | Clements |
| 10,754,434 | B2 | 8/2020 | Hall et al. |
| 10,762,716 | B1 | 9/2020 | Paul et al. |
| 10,768,421 | B1 | 9/2020 | Rosenberg et al. |
| 10,768,693 | B2 | 9/2020 | Powderly et al. |
| 10,776,933 | B2 | 9/2020 | Faulkner |
| 10,846,864 | B2 | 11/2020 | Kim et al. |
| 10,852,814 | B1 | 12/2020 | Caron et al. |
| 10,861,242 | B2 | 12/2020 | Lacey et al. |
| 10,885,701 | B1 | 1/2021 | Patel |
| 10,890,967 | B2 | 1/2021 | Stellmach et al. |
| 10,922,744 | B1 | 2/2021 | Mahajan |
| 10,929,099 | B2 | 2/2021 | Querze et al. |
| 10,936,148 | B1 | 3/2021 | Merkl et al. |
| 10,956,724 | B1 | 3/2021 | Terrano |
| 10,983,663 | B2 | 4/2021 | Iglesias |
| 11,003,308 | B1 | 5/2021 | Dryer et al. |
| 11,017,611 | B1 | 5/2021 | Mount et al. |
| 11,023,035 | B1 | 6/2021 | Atlas et al. |
| 11,055,920 | B1 | 7/2021 | Bramwell et al. |
| 11,079,995 | B1 | 8/2021 | Hulbert et al. |
| 11,082,463 | B2 | 8/2021 | Felman |
| 11,095,857 | B1 | 8/2021 | Krol et al. |
| 11,112,875 | B1 | 9/2021 | Zhou et al. |
| 11,126,850 | B1 | 9/2021 | Ichim et al. |
| 11,138,798 | B2 | 10/2021 | Paul et al. |
| 11,146,909 | B1 | 10/2021 | Pinto et al. |
| 11,175,791 | B1 | 11/2021 | Patnaikuni et al. |
| 11,176,755 | B1 | 11/2021 | Tichenor et al. |
| 11,199,898 | B2 | 12/2021 | Blume et al. |
| 11,200,742 | B1 | 12/2021 | Post et al. |
| 11,204,678 | B1 | 12/2021 | Baker et al. |
| 11,232,643 | B1 | 1/2022 | Stevens et al. |
| 11,243,734 | B2 | 2/2022 | Boissière et al. |
| 11,249,556 | B1 | 2/2022 | Schwarz et al. |
| 11,262,885 | B1 | 3/2022 | Burckel |
| 11,266,919 | B2 | 3/2022 | Bear et al. |
| 11,294,472 | B2 | 4/2022 | Tang et al. |
| 11,294,475 | B1 | 4/2022 | Pinchon et al. |
| 11,307,653 | B1 | 4/2022 | Qian et al. |
| 11,340,756 | B2 | 5/2022 | Faulkner et al. |
| 11,343,420 | B1 | 5/2022 | Herz et al. |
| 11,347,319 | B2 | 5/2022 | Goel et al. |
| 11,348,300 | B2 | 5/2022 | Zimmermann et al. |
| 11,379,033 | B2 | 7/2022 | O'hern et al. |
| 11,380,323 | B2 | 7/2022 | Shin et al. |
| 11,406,896 | B1 | 8/2022 | Cheung et al. |
| 11,409,363 | B2 | 8/2022 | Chen et al. |
| 11,416,080 | B2 | 8/2022 | Heo et al. |
| 11,432,095 | B1 | 8/2022 | Satongar et al. |
| 11,461,973 | B2 | 10/2022 | Pinchon |
| 11,496,571 | B2 | 11/2022 | Berliner et al. |
| 11,531,402 | B1 | 12/2022 | Stolzenberg |
| 11,531,459 | B2 | 12/2022 | Poupyrev et al. |
| 11,557,102 | B2 | 1/2023 | Palangie et al. |
| 11,567,625 | B2 | 1/2023 | Faulkner et al. |
| 11,573,363 | B2 | 2/2023 | Zou et al. |
| 11,574,452 | B2 | 2/2023 | Berliner et al. |
| 11,599,239 | B2 | 3/2023 | Rockel et al. |
| 11,604,080 | B2 | 3/2023 | Paoletti et al. |
| 11,615,596 | B2 | 3/2023 | Faulkner et al. |
| 11,641,460 | B1 | 5/2023 | Geusz et al. |
| 11,669,155 | B2 | 6/2023 | Bowman et al. |
| 11,689,632 | B2 | 6/2023 | Raisher et al. |
| 11,720,171 | B2 | 8/2023 | Pastrana Vicente et al. |
| 11,726,577 | B2 | 8/2023 | Katz |
| 11,730,226 | B2 | 8/2023 | Stolarz et al. |
| 11,733,824 | B2 | 8/2023 | Iskandar et al. |
| 11,743,215 | B1 | 8/2023 | Murillo et al. |
| 11,762,457 | B1 | 9/2023 | Ikkai et al. |
| 11,762,473 | B2 | 9/2023 | Cipoletta et al. |
| 11,768,544 | B2 | 9/2023 | Schwarz et al. |
| 11,847,748 | B2 | 12/2023 | Liu et al. |
| 11,861,136 | B1 | 1/2024 | Faulkner et al. |
| 11,875,013 | B2 | 1/2024 | Lemay et al. |
| 11,886,643 | B2 | 1/2024 | Irie et al. |
| 11,899,845 | B2 | 2/2024 | Chung et al. |
| 11,909,453 | B2 | 2/2024 | Javaudin et al. |
| 11,914,759 | B2 | 2/2024 | Klein et al. |
| 11,922,588 | B2 | 3/2024 | Fillhardt et al. |
| 11,928,263 | B2 | 3/2024 | Jung et al. |
| 11,934,569 | B2 | 3/2024 | Pastrana Vicente et al. |
| 11,954,242 | B2 | 4/2024 | Dascola et al. |
| 11,983,326 | B2 | 5/2024 | Lacey |
| 11,988,832 | B2 | 5/2024 | Singh et al. |
| 11,989,965 | B2 | 5/2024 | Tarighat Mehrabani |
| 12,032,803 | B2 | 7/2024 | Pastrana Vicente et al. |
| 12,062,127 | B2 | 8/2024 | Park et al. |
| 12,099,653 | B2 | 9/2024 | Chawda et al. |
| 12,099,695 | B1 | 9/2024 | Smith et al. |
| 12,112,011 | B2 | 10/2024 | Smith et al. |
| 12,113,948 | B1 | 10/2024 | Smith et al. |
| 12,118,200 | B1 | 10/2024 | Shutzberg et al. |
| 12,154,236 | B1 | 11/2024 | Herman et al. |
| 12,236,546 | B1 | 2/2025 | Lipton |
| 12,394,167 | B1 | 8/2025 | Scully et al. |
| 2001/0047250 | A1 | 11/2001 | Schuller et al. |
| 2002/0015024 | A1 | 2/2002 | Westerman et al. |
| 2002/0024675 | A1 | 2/2002 | Foxlin |
| 2002/0030692 | A1 | 3/2002 | Griesert |
| 2002/0044152 | A1 | 4/2002 | Abbott et al. |
| 2003/0151611 | A1 | 8/2003 | Turpin et al. |
| 2003/0222924 | A1 | 12/2003 | Baron |
| 2004/0059784 | A1 | 3/2004 | Caughey |
| 2004/0230912 | A1 | 11/2004 | Clow et al. |
| 2004/0243926 | A1 | 12/2004 | Trenbeath et al. |
| 2005/0062738 | A1 | 3/2005 | Handley et al. |
| 2005/0100210 | A1 | 5/2005 | Rice et al. |
| 2005/0138572 | A1 | 6/2005 | Good et al. |
| 2005/0144570 | A1 | 6/2005 | Loverin et al. |
| 2005/0144571 | A1 | 6/2005 | Loverin et al. |
| 2005/0190059 | A1 | 9/2005 | Wehrenberg |
| 2005/0198143 | A1 | 9/2005 | Moody et al. |
| 2005/0216866 | A1 | 9/2005 | Rosen et al. |
| 2005/0231532 | A1 | 10/2005 | Suzuki et al. |
| 2005/0248299 | A1 | 11/2005 | Chemel et al. |
| 2006/0017692 | A1 | 1/2006 | Wehrenberg et al. |
| 2006/0033724 | A1 | 2/2006 | Chaudhri et al. |
| 2006/0034590 | A1 | 2/2006 | Teramoto |
| 2006/0080702 | A1 | 4/2006 | Diez et al. |
| 2006/0197753 | A1 | 9/2006 | Hotelling |
| 2006/0283214 | A1 | 12/2006 | Donadon et al. |
| 2007/0172112 | A1 | 7/2007 | Paley et al. |
| 2008/0132249 | A1 | 6/2008 | Hamilton |
| 2008/0186255 | A1 | 8/2008 | Cohen et al. |
| 2008/0211771 | A1 | 9/2008 | Richardson |
| 2008/0222710 | A1 | 9/2008 | Blagsvedt et al. |
| 2008/0310707 | A1 | 12/2008 | Kansal et al. |
| 2009/0037844 | A1 | 2/2009 | Kim et al. |
| 2009/0049408 | A1 | 2/2009 | Naaman et al. |
| 2009/0064035 | A1 | 3/2009 | Shibata et al. |

(56) References Cited

U.S. PATENT DOCUMENTS

2009/0146961 A1 6/2009 Cheung et al.
2009/0231356 A1 9/2009 Barnes et al.
2009/0254843 A1 10/2009 Van et al.
2009/0319181 A1 12/2009 Khosravy et al.
2009/0326810 A1 12/2009 Callaghan et al.
2010/0097375 A1 4/2010 Tadaishi et al.
2010/0115459 A1 5/2010 Kinnunen et al.
2010/0185949 A1 7/2010 Jaeger
2010/0188503 A1 7/2010 Tsai et al.
2010/0188572 A1 7/2010 Card, II
2010/0293504 A1 11/2010 Hachiya
2010/0302245 A1 12/2010 Best
2010/0328432 A1 12/2010 Tanaka
2010/0332196 A1 12/2010 Fisker et al.
2011/0018895 A1 1/2011 Buzyn et al.
2011/0018896 A1 1/2011 Buzyn et al.
2011/0029185 A1 2/2011 Aoki et al.
2011/0032365 A1 2/2011 Yett
2011/0066981 A1 3/2011 Chmielewski et al.
2011/0142321 A1 6/2011 Huffman
2011/0164163 A1 7/2011 Bilbrey et al.
2011/0169927 A1 7/2011 Mages et al.
2011/0216060 A1 9/2011 Weising et al.
2011/0243448 A1 10/2011 Kawabuchi et al.
2011/0254865 A1 10/2011 Yee et al.
2011/0289691 A1 12/2011 Laflèche et al.
2011/0304557 A1 12/2011 Wilburn et al.
2011/0310001 A1 12/2011 Madau et al.
2011/0320969 A1 12/2011 Hwang et al.
2012/0038751 A1 2/2012 Yuan et al.
2012/0086624 A1 4/2012 Thompson et al.
2012/0170089 A1 7/2012 Kim et al.
2012/0170840 A1 7/2012 Caruso et al.
2012/0194547 A1 8/2012 Johnson et al.
2012/0223885 A1 9/2012 Perez
2012/0249416 A1 10/2012 Maciocci et al.
2012/0249741 A1 10/2012 Maciocci et al.
2012/0256956 A1 10/2012 Kasahara
2012/0256967 A1 10/2012 Baldwin et al.
2012/0257035 A1 10/2012 Larsen
2012/0272179 A1 10/2012 Stafford
2012/0304087 A1 11/2012 Walkin et al.
2013/0010062 A1 1/2013 Redmann
2013/0088516 A1 4/2013 Ota et al.
2013/0093727 A1 4/2013 Eriksson et al.
2013/0127850 A1 5/2013 Bindon
2013/0147820 A1 6/2013 Kalai et al.
2013/0169533 A1 7/2013 Jahnke
2013/0191160 A1 7/2013 Oran
2013/0211843 A1 8/2013 Clarkson
2013/0212470 A1 8/2013 Karunamuni et al.
2013/0222227 A1 8/2013 Johansson et al.
2013/0229345 A1 9/2013 Day et al.
2013/0232430 A1 9/2013 Reitan
2013/0246955 A1 9/2013 Schwesig et al.
2013/0249922 A1 9/2013 Hachiya
2013/0263016 A1 10/2013 Lehtiniemi et al.
2013/0265227 A1 10/2013 Julian
2013/0271397 A1 10/2013 Hildreth et al.
2013/0278501 A1 10/2013 Bulzacki
2013/0286004 A1 10/2013 Mcculloch et al.
2013/0307945 A1 11/2013 Cheng et al.
2013/0321462 A1 12/2013 Salter et al.
2013/0325326 A1 12/2013 Blumenberg et al.
2013/0326341 A1 12/2013 Nonaka
2013/0326364 A1* 12/2013 Latta ........................ G06F 3/012 715/751
2013/0328925 A1* 12/2013 Latta ........................ G06F 3/017 345/633
2013/0332890 A1 12/2013 Ramic et al.
2013/0342564 A1 12/2013 Kinnebrew et al.
2013/0342570 A1 12/2013 Kinnebrew et al.
2013/0345975 A1 12/2013 Vulcano et al.
2014/0002338 A1 1/2014 Raffa et al.
2014/0002444 A1 1/2014 Bennett et al.
2014/0028548 A1 1/2014 Bychkov et al.
2014/0040832 A1 2/2014 Regelous
2014/0063058 A1 3/2014 Fialho et al.
2014/0071241 A1 3/2014 Yang et al.
2014/0075361 A1 3/2014 Reynolds et al.
2014/0078176 A1 3/2014 Kim et al.
2014/0092018 A1 4/2014 Geithner
2014/0104206 A1 4/2014 Anderson
2014/0108942 A1 4/2014 Freeman et al.
2014/0114845 A1 4/2014 Rogers et al.
2014/0125584 A1 5/2014 Xun et al.
2014/0129990 A1 5/2014 Xin et al.
2014/0132633 A1 5/2014 Fekete et al.
2014/0164928 A1 6/2014 Kim
2014/0198017 A1 7/2014 Lamb et al.
2014/0232639 A1 8/2014 Hayashi et al.
2014/0237366 A1 8/2014 Poulos et al.
2014/0258942 A1 9/2014 Kutliroff et al.
2014/0267046 A1 9/2014 Ellsworth et al.
2014/0267400 A1 9/2014 Mabbutt et al.
2014/0282272 A1 9/2014 Kies et al.
2014/0298273 A1 10/2014 Blackstone et al.
2014/0320404 A1 10/2014 Kasahara
2014/0331187 A1 11/2014 Hicks et al.
2014/0333666 A1 11/2014 Poulos et al.
2014/0347391 A1 11/2014 Keane et al.
2014/0351727 A1 11/2014 Danton et al.
2014/0351753 A1 11/2014 Shin et al.
2014/0362111 A1 12/2014 Kim
2014/0363074 A1 12/2014 Dolfing et al.
2014/0368537 A1 12/2014 Salter et al.
2014/0368620 A1 12/2014 Li et al.
2014/0372957 A1 12/2014 Keane et al.
2014/0375683 A1 12/2014 Salter et al.
2015/0035822 A1 2/2015 Arsan et al.
2015/0058718 A1 2/2015 Kim et al.
2015/0067580 A1 3/2015 Um et al.
2015/0121466 A1 4/2015 Brands et al.
2015/0123890 A1 5/2015 Kapur et al.
2015/0123901 A1 5/2015 Schwesinger et al.
2015/0131850 A1 5/2015 Qvarfordt
2015/0135108 A1 5/2015 Pope et al.
2015/0145887 A1* 5/2015 Forutanpour ....... G06F 3/04815 345/633
2015/0149929 A1 5/2015 Shepherd et al.
2015/0149961 A1 5/2015 Karakotsios
2015/0153833 A1 6/2015 Pinault et al.
2015/0177937 A1 6/2015 Poletto et al.
2015/0193982 A1 7/2015 Mihelich et al.
2015/0199081 A1 7/2015 Wheeler
2015/0205106 A1 7/2015 Norden
2015/0220152 A1 8/2015 Tait et al.
2015/0221132 A1 8/2015 Kruglick
2015/0242095 A1 8/2015 Sonnenberg
2015/0253957 A1 9/2015 Crocker
2015/0254905 A1 9/2015 Ramsby et al.
2015/0262428 A1 9/2015 Tatzgern et al.
2015/0312561 A1 10/2015 Hoof et al.
2015/0317831 A1 11/2015 Ebstyne et al.
2015/0317832 A1 11/2015 Ebstyne et al.
2015/0331576 A1 11/2015 Piya et al.
2015/0332091 A1 11/2015 Kim et al.
2015/0370323 A1 12/2015 Cieplinski et al.
2015/0370404 A1 12/2015 Hu et al.
2015/0381974 A1 12/2015 Hoffman et al.
2016/0015470 A1 1/2016 Border
2016/0018898 A1 1/2016 Tu et al.
2016/0018900 A1 1/2016 Tu et al.
2016/0025971 A1 1/2016 Crow et al.
2016/0026242 A1 1/2016 Burns et al.
2016/0026253 A1 1/2016 Bradski et al.
2016/0028961 A1 1/2016 Thurairatnam
2016/0050642 A1 2/2016 Brown et al.
2016/0062636 A1 3/2016 Jung et al.
2016/0085301 A1 3/2016 Lopez
2016/0093108 A1 3/2016 Mao et al.
2016/0098093 A1 4/2016 Cheon et al.
2016/0098094 A1 4/2016 Minkkinen
2016/0098972 A1 4/2016 Feit et al.

(56) References Cited

U.S. PATENT DOCUMENTS

2016/0127690 A1 5/2016 Kaehler et al.
2016/0133044 A1 5/2016 Lynch
2016/0133052 A1 5/2016 Choi et al.
2016/0171304 A1 6/2016 Golding et al.
2016/0179191 A1 6/2016 Kim et al.
2016/0179336 A1 6/2016 Ambrus et al.
2016/0189426 A1 6/2016 Thomas et al.
2016/0196692 A1 7/2016 Kjallstrom et al.
2016/0210784 A1 7/2016 Ramsby et al.
2016/0216768 A1 7/2016 Goetz et al.
2016/0224122 A1 8/2016 Dietz et al.
2016/0225012 A1 8/2016 Ha et al.
2016/0225164 A1 8/2016 Tomlin et al.
2016/0227267 A1 8/2016 Tsurutani et al.
2016/0253063 A1 9/2016 Critchlow
2016/0253821 A1 9/2016 Romano et al.
2016/0275702 A1 9/2016 Reynolds et al.
2016/0291922 A1 10/2016 Montgomerie et al.
2016/0306434 A1 10/2016 Ferrin
2016/0313890 A1 10/2016 Walline et al.
2016/0334940 A1 11/2016 Kandadai et al.
2016/0349063 A1 12/2016 Maurer et al.
2016/0350973 A1 12/2016 Shapira et al.
2016/0370858 A1 12/2016 LeppÄnen et al.
2016/0373647 A1 12/2016 García Morate et al.
2016/0373714 A1 12/2016 Lee et al.
2016/0379409 A1 12/2016 Gavriliuc et al.
2017/0032568 A1 2/2017 Gharpure et al.
2017/0038829 A1 2/2017 Lanier et al.
2017/0038837 A1 2/2017 Faaborg et al.
2017/0038849 A1 2/2017 Hwang
2017/0039770 A1 2/2017 Lanier et al.
2017/0052393 A1 2/2017 Kweon
2017/0052595 A1 2/2017 Poulos et al.
2017/0053383 A1 2/2017 Heo
2017/0060230 A1* 3/2017 Faaborg .................. G06F 3/017
2017/0061694 A1 3/2017 Giraldi et al.
2017/0090566 A1 3/2017 George-svahn et al.
2017/0109930 A1 4/2017 Holzer et al.
2017/0115728 A1 4/2017 Park et al.
2017/0123487 A1 5/2017 Hazra et al.
2017/0131964 A1 5/2017 Baek et al.
2017/0132694 A1 5/2017 Damy
2017/0132822 A1 5/2017 Marschke et al.
2017/0147180 A1 5/2017 Yoon et al.
2017/0153866 A1 6/2017 Grinberg et al.
2017/0154326 A1 6/2017 Jo et al.
2017/0162177 A1 6/2017 Lebeck et al.
2017/0169616 A1 6/2017 Wiley et al.
2017/0178392 A1 6/2017 Zuccarino et al.
2017/0206691 A1 7/2017 Harrises et al.
2017/0206692 A1 7/2017 Sheaffer et al.
2017/0212583 A1 7/2017 Krasadakis
2017/0213388 A1 7/2017 Margolis et al.
2017/0214782 A1 7/2017 Brinda
2017/0221264 A1 8/2017 Perry
2017/0228130 A1 8/2017 Palmaro
2017/0243352 A1 8/2017 Kutliroff et al.
2017/0251143 A1 8/2017 Peruch et al.
2017/0256096 A1 9/2017 Faaborg et al.
2017/0270715 A1 9/2017 Lindsay et al.
2017/0285737 A1 10/2017 Khalid et al.
2017/0287215 A1 10/2017 Lalonde et al.
2017/0302903 A1 10/2017 Ng et al.
2017/0315715 A1 11/2017 Fujita et al.
2017/0326457 A1 11/2017 Tilton et al.
2017/0344223 A1 11/2017 Holzer et al.
2017/0351094 A1 12/2017 Poulos et al.
2017/0357389 A1 12/2017 Fleizach et al.
2017/0358141 A1 12/2017 Stafford et al.
2017/0364198 A1 12/2017 Yoganandan et al.
2018/0005433 A1 1/2018 Kohler et al.
2018/0045963 A1 2/2018 Hoover et al.
2018/0046363 A1 2/2018 Miller et al.
2018/0075658 A1 3/2018 Lanier et al.
2018/0077383 A1 3/2018 Akao et al.
2018/0081519 A1 3/2018 Kim
2018/0084287 A1 3/2018 Shimura
2018/0088787 A1 3/2018 Bereza et al.
2018/0095634 A1 4/2018 Alexander
2018/0095636 A1 4/2018 Valdivia et al.
2018/0101223 A1 4/2018 Ishihara et al.
2018/0103209 A1 4/2018 Fischler et al.
2018/0114364 A1 4/2018 Mcphee et al.
2018/0120944 A1 5/2018 Wang et al.
2018/0122043 A1 5/2018 Energin et al.
2018/0122138 A1 5/2018 Piya et al.
2018/0130255 A1 5/2018 Hazeghi et al.
2018/0136815 A1 5/2018 Tomizuka et al.
2018/0143693 A1 5/2018 Calabrese et al.
2018/0150204 A1 5/2018 Macgillivray
2018/0150997 A1 5/2018 Austin
2018/0158222 A1 6/2018 Hayashi
2018/0165853 A1 6/2018 Inagi et al.
2018/0173404 A1 6/2018 Smith
2018/0181199 A1 6/2018 Harvey et al.
2018/0181272 A1 6/2018 Olsson et al.
2018/0183986 A1 6/2018 Smith et al.
2018/0188048 A1 7/2018 Ding et al.
2018/0188802 A1 7/2018 Okumura
2018/0190003 A1 7/2018 Upadhyay et al.
2018/0197336 A1 7/2018 Rochford et al.
2018/0197341 A1 7/2018 Loberg et al.
2018/0210628 A1 7/2018 Mcphee et al.
2018/0218214 A1 8/2018 Pestun et al.
2018/0220195 A1 8/2018 Panchaksharaiah et al.
2018/0239144 A1 8/2018 Woods et al.
2018/0247449 A1 8/2018 Park et al.
2018/0275753 A1 9/2018 Publicover et al.
2018/0286126 A1 10/2018 Schwarz et al.
2018/0300023 A1 10/2018 Hein
2018/0300952 A1 10/2018 Evans et al.
2018/0302687 A1 10/2018 Bhattacharjee et al.
2018/0315248 A1 11/2018 Bastov et al.
2018/0322701 A1 11/2018 Pahud et al.
2018/0330544 A1 11/2018 Corso et al.
2018/0330550 A1 11/2018 Takahashi
2018/0348010 A1 12/2018 Coleman et al.
2018/0348861 A1 12/2018 Uscinski et al.
2018/0348986 A1 12/2018 Sawaki
2018/0350099 A1 12/2018 Yerkes et al.
2018/0350119 A1* 12/2018 Kocharlakota ......... G06F 3/012
2018/0352374 A1 12/2018 Ball et al.
2019/0005055 A1 1/2019 Andrew et al.
2019/0018479 A1 1/2019 Minami
2019/0034076 A1 1/2019 Vinayak et al.
2019/0043259 A1 2/2019 Wang et al.
2019/0050062 A1 2/2019 Chen et al.
2019/0056785 A1 2/2019 Suk
2019/0065027 A1 2/2019 Hauenstein et al.
2019/0073109 A1 3/2019 Zhang et al.
2019/0080572 A1 3/2019 Kim et al.
2019/0088149 A1 3/2019 Fink et al.
2019/0094963 A1 3/2019 Nijs
2019/0094979 A1 3/2019 Hall et al.
2019/0096134 A1 3/2019 Amacker et al.
2019/0101991 A1 4/2019 Brennan
2019/0102953 A1 4/2019 Lindsay et al.
2019/0130622 A1 5/2019 Hoover et al.
2019/0130633 A1 5/2019 Haddad et al.
2019/0138183 A1* 5/2019 Rosas ................... G06F 3/0482
2019/0146128 A1 5/2019 Cao et al.
2019/0155495 A1 5/2019 Klein et al.
2019/0164340 A1 5/2019 Pejic et al.
2019/0172261 A1 6/2019 Alt et al.
2019/0172262 A1 6/2019 Mchugh et al.
2019/0180504 A1 6/2019 Pomerantz et al.
2019/0188895 A1 6/2019 Miller et al.
2019/0188918 A1 6/2019 Brewer et al.
2019/0204906 A1 7/2019 Ross et al.
2019/0212827 A1 7/2019 Kin et al.
2019/0213389 A1 7/2019 Peruch et al.
2019/0227763 A1 7/2019 Kaufthal
2019/0228503 A1 7/2019 Tokuchi

(56) References Cited

U.S. PATENT DOCUMENTS

2019/0228589 A1 7/2019 Dascola et al.
2019/0238818 A1 8/2019 Held et al.
2019/0244434 A1 8/2019 Pahud et al.
2019/0251884 A1 8/2019 Burns et al.
2019/0258365 A1 8/2019 Zurmoehle et al.
2019/0265828 A1 8/2019 Hauenstein et al.
2019/0266774 A1 8/2019 Sommerlade et al.
2019/0277651 A1 9/2019 Ruikar
2019/0278432 A1 9/2019 Bennett et al.
2019/0279407 A1* 9/2019 McHugh ................. G06F 3/011
2019/0287307 A1 9/2019 Rogers et al.
2019/0294312 A1 9/2019 Rohrbacher
2019/0302977 A1 10/2019 Pendergast et al.
2019/0310757 A1 10/2019 Lee et al.
2019/0311547 A1 10/2019 Ohmori
2019/0324529 A1 10/2019 Stellmach et al.
2019/0325654 A1 10/2019 Stisser et al.
2019/0339770 A1 11/2019 Kurlethimar et al.
2019/0340816 A1* 11/2019 Rogers .................. G06F 21/629
2019/0340832 A1 11/2019 Srinivasan et al.
2019/0346678 A1 11/2019 Nocham
2019/0346922 A1 11/2019 Young et al.
2019/0349575 A1 11/2019 Knepper et al.
2019/0354259 A1 11/2019 Park
2019/0361521 A1 11/2019 Stellmach et al.
2019/0362557 A1 11/2019 Lacey et al.
2019/0362560 A1 11/2019 Choi et al.
2019/0369569 A1 12/2019 Olsen et al.
2019/0370492 A1 12/2019 Falchuk et al.
2019/0371072 A1 12/2019 Lindberg et al.
2019/0371279 A1 12/2019 Mak
2019/0377487 A1 12/2019 Bailey et al.
2019/0379765 A1 12/2019 Fajt et al.
2019/0384406 A1 12/2019 Smith et al.
2019/0392830 A1 12/2019 Abdollahian
2020/0004401 A1 1/2020 Hwang et al.
2020/0005539 A1 1/2020 Hwang et al.
2020/0012341 A1 1/2020 Stellmach et al.
2020/0020157 A1 1/2020 Powers et al.
2020/0026922 A1 1/2020 Pekelny et al.
2020/0038120 A1 2/2020 Ziraknejad et al.
2020/0043243 A1 2/2020 Bhushan et al.
2020/0045249 A1 2/2020 Francois et al.
2020/0048825 A1 2/2020 Schultz et al.
2020/0051527 A1 2/2020 Ngo
2020/0073521 A1 3/2020 Peebler et al.
2020/0081526 A1 3/2020 Walker et al.
2020/0082602 A1 3/2020 Jones
2020/0089314 A1 3/2020 Poupyrev et al.
2020/0092537 A1 3/2020 Sutter et al.
2020/0097077 A1 3/2020 Nguyen et al.
2020/0098140 A1 3/2020 Jagnow et al.
2020/0098173 A1 3/2020 Mccall
2020/0099989 A1 3/2020 Niemirska et al.
2020/0106965 A1 4/2020 Malia et al.
2020/0117213 A1 4/2020 Tian et al.
2020/0128227 A1 4/2020 Chavez et al.
2020/0128232 A1 4/2020 Hwang et al.
2020/0129850 A1 4/2020 Ohashi
2020/0135141 A1 4/2020 Day et al.
2020/0159017 A1 5/2020 Lin et al.
2020/0214682 A1 7/2020 Zaslavsky et al.
2020/0218074 A1 7/2020 Hoover et al.
2020/0225735 A1 7/2020 Schwarz
2020/0225747 A1 7/2020 Bar-zeev et al.
2020/0225830 A1 7/2020 Tang et al.
2020/0226814 A1 7/2020 Tang et al.
2020/0226823 A1 7/2020 Stachniak et al.
2020/0242844 A1* 7/2020 Bae ........................... G06T 3/40
2020/0257245 A1 8/2020 Linville et al.
2020/0257484 A1 8/2020 Qian et al.
2020/0267326 A1 8/2020 Yim
2020/0272303 A1 8/2020 Jia et al.
2020/0286299 A1 9/2020 Wang et al.
2020/0318955 A1 10/2020 Sharapov et al.
2020/0319704 A1 10/2020 Kathuria et al.
2020/0328913 A1 10/2020 Wyas et al.
2020/0356221 A1 11/2020 Behzadi et al.
2020/0357374 A1 11/2020 Verweij et al.
2020/0363867 A1 11/2020 Azimi et al.
2020/0371602 A1 11/2020 Kanda
2020/0379626 A1 12/2020 Guyomard et al.
2020/0387214 A1 12/2020 Ravasz et al.
2020/0387228 A1 12/2020 Ravasz et al.
2020/0387287 A1 12/2020 Ravasz et al.
2020/0401687 A1 12/2020 Mak
2021/0011556 A1 1/2021 Atlas et al.
2021/0034163 A1 2/2021 Goel et al.
2021/0034319 A1 2/2021 Wang et al.
2021/0049826 A1 2/2021 Takahashi
2021/0055789 A1 2/2021 Tsai et al.
2021/0056748 A1 2/2021 Pritchett
2021/0067418 A1 3/2021 Ely et al.
2021/0074062 A1 3/2021 Madonna et al.
2021/0090222 A1 3/2021 Lee et al.
2021/0090337 A1 3/2021 Ravasz et al.
2021/0090348 A1 3/2021 Croxford et al.
2021/0096726 A1 4/2021 Faulkner et al.
2021/0097766 A1 4/2021 Palangie et al.
2021/0102820 A1 4/2021 Le et al.
2021/0125414 A1 4/2021 Berkebile
2021/0132687 A1 5/2021 Luo et al.
2021/0134248 A1 5/2021 Wan et al.
2021/0142552 A1 5/2021 Kimura et al.
2021/0158624 A1 5/2021 Moon et al.
2021/0165484 A1 6/2021 Suguhara et al.
2021/0165923 A1 6/2021 Johnston
2021/0166437 A1 6/2021 Legendre et al.
2021/0173340 A1 6/2021 Kim
2021/0173536 A1 6/2021 Kondo
2021/0225043 A1 7/2021 Tang et al.
2021/0227601 A1 7/2021 Eom et al.
2021/0241483 A1 8/2021 Dryer et al.
2021/0248674 A1 8/2021 Ogunbunmi
2021/0272367 A1 9/2021 Richter
2021/0272537 A1 9/2021 Mak
2021/0279967 A1 9/2021 Gernoth et al.
2021/0287439 A1 9/2021 Goodrich et al.
2021/0295592 A1 9/2021 Von Cramon
2021/0295602 A1 9/2021 Scapel et al.
2021/0303074 A1 9/2021 Vanblon et al.
2021/0312713 A1 10/2021 Peri et al.
2021/0312717 A1 10/2021 Mao
2021/0326094 A1 10/2021 Buerli et al.
2021/0327140 A1 10/2021 Rothkopf et al.
2021/0331069 A1 10/2021 Gustafson et al.
2021/0333864 A1 10/2021 Harvey et al.
2021/0350564 A1 11/2021 Peuhkurinen et al.
2021/0350604 A1 11/2021 Pejsa et al.
2021/0350634 A1 11/2021 Major et al.
2021/0358294 A1 11/2021 Parashar et al.
2021/0366440 A1 11/2021 Burns et al.
2021/0368136 A1 11/2021 Chalmers et al.
2021/0374221 A1 12/2021 Markhasin et al.
2021/0375022 A1 12/2021 Lee et al.
2021/0383097 A1 12/2021 Guerard et al.
2021/0400744 A1 12/2021 Chen et al.
2021/0402306 A1 12/2021 Huang
2021/0405760 A1 12/2021 Schoen
2022/0011577 A1 1/2022 Lawver et al.
2022/0011855 A1 1/2022 Hazra et al.
2022/0012002 A1 1/2022 Bar-zeev et al.
2022/0027115 A1 1/2022 Haapoja et al.
2022/0028108 A1 1/2022 Haapoja et al.
2022/0030197 A1 1/2022 Ishimoto
2022/0070241 A1 3/2022 Yerli
2022/0076496 A1 3/2022 Palangie et al.
2022/0083145 A1 3/2022 Matsunaga et al.
2022/0083197 A1 3/2022 Rockel et al.
2022/0084279 A1 3/2022 Lindmeier et al.
2022/0086203 A1 3/2022 Morris et al.
2022/0091722 A1 3/2022 Faulkner et al.
2022/0091723 A1 3/2022 Faulkner et al.
2022/0092862 A1 3/2022 Faulkner et al.

(56) References Cited

U.S. PATENT DOCUMENTS

2022/0100265 A1 3/2022 Kies et al.
2022/0101593 A1 3/2022 Rockel et al.
2022/0101612 A1 3/2022 Palangie et al.
2022/0104910 A1 4/2022 Shelton et al.
2022/0121344 A1 4/2022 Pastrana Vicente et al.
2022/0124286 A1 4/2022 Punwani et al.
2022/0130107 A1 4/2022 Lindh
2022/0130126 A1 4/2022 Delgado et al.
2022/0137701 A1 5/2022 Bowman et al.
2022/0137705 A1 5/2022 Hashimoto et al.
2022/0148257 A1 5/2022 Boubekeur et al.
2022/0155863 A1 5/2022 Wang et al.
2022/0155909 A1 5/2022 Kawashima et al.
2022/0157029 A1 5/2022 Horita et al.
2022/0157083 A1 5/2022 Jandhyala et al.
2022/0165013 A1 5/2022 Velez et al.
2022/0179503 A1 6/2022 Timonen et al.
2022/0187907 A1 6/2022 Lee et al.
2022/0191570 A1 6/2022 Reid et al.
2022/0197403 A1 6/2022 Hughes et al.
2022/0198755 A1 6/2022 Pinchon
2022/0206298 A1 6/2022 Goodman
2022/0207840 A1 6/2022 Cansizoglu et al.
2022/0214743 A1 7/2022 Dascola et al.
2022/0221976 A1 7/2022 Agarwal et al.
2022/0229524 A1 7/2022 Mckenzie et al.
2022/0229534 A1 7/2022 Terre et al.
2022/0232191 A1 7/2022 Kawakami et al.
2022/0236801 A1 7/2022 Serbanati et al.
2022/0239718 A1 7/2022 Song et al.
2022/0244536 A1* 8/2022 Sha ....................... G06F 3/0484
2022/0245888 A1 8/2022 Singh et al.
2022/0253125 A1 8/2022 Wallen et al.
2022/0253149 A1 8/2022 Berliner et al.
2022/0253194 A1 8/2022 Berliner et al.
2022/0255995 A1 8/2022 Berliner et al.
2022/0276720 A1 9/2022 Yasui
2022/0277533 A1 9/2022 Park
2022/0279303 A1 9/2022 Marculescu et al.
2022/0287676 A1 9/2022 Steines et al.
2022/0291808 A1 9/2022 Stevens et al.
2022/0292783 A1 9/2022 Jayaram et al.
2022/0292784 A1 9/2022 Jayaram et al.
2022/0292785 A1 9/2022 Jayaram et al.
2022/0295032 A1 9/2022 Jayaram et al.
2022/0295040 A1 9/2022 Jayaram et al.
2022/0295139 A1 9/2022 Jayaram et al.
2022/0301264 A1 9/2022 O'leary et al.
2022/0303680 A1 9/2022 Ahmed et al.
2022/0311950 A1 9/2022 Ith et al.
2022/0319134 A1 10/2022 Rodrigues et al.
2022/0326837 A1 10/2022 Dessero et al.
2022/0335697 A1 10/2022 Harding et al.
2022/0365740 A1 11/2022 Chang et al.
2022/0374136 A1 11/2022 Chang et al.
2022/0382385 A1 12/2022 Chen et al.
2022/0383592 A1 12/2022 Hare et al.
2022/0392169 A1 12/2022 Simpson et al.
2022/0397962 A1 12/2022 Goel et al.
2022/0408164 A1 12/2022 Lee et al.
2022/0413691 A1 12/2022 Becker et al.
2022/0414975 A1 12/2022 Becker et al.
2022/0414999 A1 12/2022 Ravasz et al.
2022/0415094 A1 12/2022 Kim et al.
2023/0004216 A1 1/2023 Rodgers et al.
2023/0007335 A1 1/2023 Gupta et al.
2023/0008537 A1 1/2023 Henderson et al.
2023/0009683 A1 1/2023 Biran et al.
2023/0021861 A1 1/2023 Fujiwara et al.
2023/0027040 A1 1/2023 Wang et al.
2023/0030699 A1 2/2023 Zion et al.
2023/0031832 A1 2/2023 Lipton et al.
2023/0032545 A1 2/2023 Mindlin et al.
2023/0032771 A1 2/2023 Zion et al.
2023/0068660 A1 3/2023 Brent et al.
2023/0069764 A1 3/2023 Jonker et al.
2023/0074080 A1 3/2023 Miller et al.
2023/0076326 A1 3/2023 Xu et al.
2023/0092282 A1 3/2023 Boesel et al.
2023/0092874 A1 3/2023 Krivoruchko et al.
2023/0100610 A1 3/2023 Pastrana Vicente et al.
2023/0100689 A1 3/2023 Chiu et al.
2023/0103161 A1 3/2023 Li et al.
2023/0114080 A1 4/2023 Yang et al.
2023/0119162 A1 4/2023 Lipton et al.
2023/0120052 A1 4/2023 Wallen et al.
2023/0130520 A1 4/2023 Kaptelinin
2023/0133579 A1 5/2023 Chang et al.
2023/0152935 A1 5/2023 Mckenzie et al.
2023/0154122 A1 5/2023 Dascola et al.
2023/0163987 A1 5/2023 Young et al.
2023/0168745 A1 6/2023 Yoda
2023/0168788 A1 6/2023 Faulkner et al.
2023/0176806 A1 6/2023 Chen et al.
2023/0185426 A1 6/2023 Rockel et al.
2023/0186577 A1 6/2023 Rockel et al.
2023/0206572 A1 6/2023 Pazmino et al.
2023/0221833 A1 7/2023 Holder et al.
2023/0236660 A1 7/2023 Kundu
2023/0244857 A1 8/2023 Weiss et al.
2023/0260240 A1 8/2023 Jayaram et al.
2023/0266859 A1 8/2023 Day et al.
2023/0273706 A1 8/2023 Smith et al.
2023/0274504 A1 8/2023 Ren et al.
2023/0290042 A1 9/2023 Casella et al.
2023/0308610 A1 9/2023 Henderson et al.
2023/0308630 A1 9/2023 Delgado
2023/0314801 A1 10/2023 Bove et al.
2023/0316634 A1 10/2023 Chiu et al.
2023/0325004 A1 10/2023 Burns et al.
2023/0325046 A1 10/2023 De Almeida E De Vincenzo et al.
2023/0334808 A1 10/2023 Sundstrom et al.
2023/0341932 A1 10/2023 Silva et al.
2023/0343049 A1 10/2023 Boesel et al.
2023/0351702 A1 11/2023 Tan et al.
2023/0353398 A1 11/2023 White
2023/0359199 A1 11/2023 Adachi et al.
2023/0377259 A1 11/2023 Becker et al.
2023/0377268 A1 11/2023 Hopkins et al.
2023/0377295 A1 11/2023 Angevine et al.
2023/0377299 A1 11/2023 Becker et al.
2023/0377300 A1 11/2023 Becker et al.
2023/0384907 A1 11/2023 Boesel et al.
2023/0385532 A1 11/2023 Mcveigh et al.
2023/0388357 A1 11/2023 Faulkner et al.
2023/0394755 A1 12/2023 Negoita et al.
2023/0396854 A1 12/2023 Sanders et al.
2024/0012530 A1 1/2024 Lin et al.
2024/0037886 A1 2/2024 Chiu et al.
2024/0062279 A1 2/2024 Scully et al.
2024/0070948 A1 2/2024 Bradley et al.
2024/0086031 A1 3/2024 Palangie et al.
2024/0086032 A1 3/2024 Palangie et al.
2024/0087256 A1 3/2024 Hylak et al.
2024/0094863 A1 3/2024 Smith et al.
2024/0094866 A1 3/2024 Lemay et al.
2024/0094882 A1 3/2024 Brewer et al.
2024/0095984 A1 3/2024 Ren et al.
2024/0102821 A1 3/2024 Vallet et al.
2024/0103613 A1 3/2024 Chawda et al.
2024/0103616 A1 3/2024 Yerkes et al.
2024/0103636 A1 3/2024 Lindmeier et al.
2024/0103676 A1 3/2024 Pastrana Vicente et al.
2024/0103681 A1 3/2024 Broughton et al.
2024/0103684 A1 3/2024 Yu et al.
2024/0103685 A1 3/2024 Pazmino et al.
2024/0103686 A1 3/2024 Pazmino et al.
2024/0103687 A1 3/2024 Pastrana Vicente et al.
2024/0103701 A1 3/2024 Pastrana Vicente et al.
2024/0103704 A1 3/2024 Pastrana Vicente et al.
2024/0103707 A1 3/2024 Henderson et al.
2024/0103716 A1 3/2024 Pastrana Vicente et al.
2024/0103803 A1 3/2024 Krivoruchko et al.

(56) References Cited

U.S. PATENT DOCUMENTS

| | | | |
|---|---|---|---|
| 2024/0104836 | A1 | 3/2024 | Dessero et al. |
| 2024/0104843 | A1 | 3/2024 | Mckenzie et al. |
| 2024/0104870 | A1 | 3/2024 | Fuste Lleixa et al. |
| 2024/0104873 | A1 | 3/2024 | Pastrana Vicente et al. |
| 2024/0104875 | A1 | 3/2024 | Couche et al. |
| 2024/0104876 | A1 | 3/2024 | Couche et al. |
| 2024/0104877 | A1 | 3/2024 | Henderson et al. |
| 2024/0119682 | A1 | 4/2024 | Rudman et al. |
| 2024/0135612 | A1 | 4/2024 | Hold-geoffroy et al. |
| 2024/0152245 | A1 | 5/2024 | Broughton et al. |
| 2024/0152256 | A1 | 5/2024 | Dascola et al. |
| 2024/0185514 | A1 | 6/2024 | Singh et al. |
| 2024/0192764 | A1 | 6/2024 | Dascola et al. |
| 2024/0193892 | A1 | 6/2024 | Lutter et al. |
| 2024/0200967 | A1 | 6/2024 | Arroyo et al. |
| 2024/0203066 | A1 | 6/2024 | Kawashima et al. |
| 2024/0205509 | A1 | 6/2024 | Kim et al. |
| 2024/0221273 | A1 | 7/2024 | Dusseau et al. |
| 2024/0221291 | A1 | 7/2024 | Henderson et al. |
| 2024/0233097 | A1 | 7/2024 | Ngo et al. |
| 2024/0233288 | A1 | 7/2024 | Stauber et al. |
| 2024/0265656 | A1 | 8/2024 | Victor-faichney et al. |
| 2024/0265796 | A1 | 8/2024 | Ippadi Veerabhadre Gowda et al. |
| 2024/0272722 | A1 | 8/2024 | Gitter et al. |
| 2024/0272782 | A1 | 8/2024 | Pastrana Vicente et al. |
| 2024/0273838 | A1 | 8/2024 | Palangie et al. |
| 2024/0281108 | A1 | 8/2024 | Krivoruchko et al. |
| 2024/0281109 | A1 | 8/2024 | Manjunath et al. |
| 2024/0291953 | A1 | 8/2024 | Cerra et al. |
| 2024/0297919 | A1 | 9/2024 | Berliner et al. |
| 2024/0310971 | A1 | 9/2024 | Kawashima et al. |
| 2024/0338104 | A1 | 10/2024 | Salter et al. |
| 2024/0338921 | A1 | 10/2024 | Burgner et al. |
| 2024/0361832 | A1 | 10/2024 | Calderone et al. |
| 2024/0361833 | A1 | 10/2024 | Calderone et al. |
| 2024/0361835 | A1 | 10/2024 | Hylak et al. |
| 2024/0393876 | A1 | 11/2024 | Chawda et al. |
| 2024/0402800 | A1 | 12/2024 | Shutzberg et al. |
| 2024/0402821 | A1 | 12/2024 | Meyer et al. |
| 2024/0403080 | A1 | 12/2024 | Laurita et al. |
| 2024/0404206 | A1 | 12/2024 | Chiu et al. |
| 2024/0404207 | A1 | 12/2024 | Laurita et al. |
| 2024/0404232 | A1 | 12/2024 | Rockwell et al. |
| 2024/0404233 | A1 | 12/2024 | Boesel et al. |
| 2024/0411444 | A1 | 12/2024 | Shutzberg et al. |
| 2024/0420435 | A1 | 12/2024 | Gitter et al. |
| 2024/0428488 | A1 | 12/2024 | Ren et al. |
| 2025/0005855 | A1 | 1/2025 | Holder et al. |
| 2025/0005864 | A1 | 1/2025 | Dessero et al. |
| 2025/0008057 | A1 | 1/2025 | Chiu et al. |
| 2025/0013343 | A1 | 1/2025 | Smith et al. |
| 2025/0013344 | A1 | 1/2025 | Smith et al. |
| 2025/0024008 | A1 | 1/2025 | Cerra et al. |
| 2025/0028423 | A1 | 1/2025 | Dessero et al. |
| 2025/0029319 | A1 | 1/2025 | Boesel et al. |
| 2025/0029328 | A1 | 1/2025 | Smith et al. |
| 2025/0031002 | A1 | 1/2025 | Hawkins et al. |
| 2025/0036253 | A1 | 1/2025 | Stauber et al. |
| 2025/0036255 | A1 | 1/2025 | Pastrana Vicente et al. |
| 2025/0069328 | A1 | 2/2025 | Herscher et al. |
| 2025/0077060 | A1 | 3/2025 | Becker et al. |
| 2025/0077066 | A1 | 3/2025 | Lutter |
| 2025/0078420 | A1 | 3/2025 | Dessero et al. |
| 2025/0078429 | A1 | 3/2025 | Dascola et al. |
| 2025/0103132 | A1 | 3/2025 | Rickwald et al. |
| 2025/0104335 | A1 | 3/2025 | Huang et al. |
| 2025/0104367 | A1 | 3/2025 | Huang et al. |
| 2025/0106581 | A1 | 3/2025 | Lutter et al. |
| 2025/0106582 | A1 | 3/2025 | Lutter et al. |
| 2025/0110605 | A1 | 4/2025 | Huang et al. |
| 2025/0111472 | A1 | 4/2025 | Lutter et al. |
| 2025/0111605 | A1 | 4/2025 | Huang et al. |
| 2025/0111622 | A1 | 4/2025 | Stern et al. |
| 2025/0117079 | A1 | 4/2025 | Chiu et al. |
| 2025/0130707 | A1 | 4/2025 | Stauber et al. |
| 2025/0156031 | A1 | 5/2025 | Holder et al. |
| 2025/0157136 | A1 | 5/2025 | Lindmeier et al. |
| 2025/0165069 | A1 | 5/2025 | Calderone et al. |
| 2025/0199656 | A1 | 6/2025 | Lipton et al. |
| 2025/0200901 | A1 | 6/2025 | Ren et al. |
| 2025/0209744 | A1 | 6/2025 | Piemonte et al. |
| 2025/0209753 | A1 | 6/2025 | Piemonte et al. |
| 2025/0224811 | A1 | 7/2025 | Lindmeier et al. |
| 2025/0232541 | A1 | 7/2025 | Chand et al. |
| 2025/0258577 | A1 | 8/2025 | Palangie et al. |
| 2025/0278134 | A1 | 9/2025 | Pastrana Vicente et al. |
| 2025/0278166 | A1 | 9/2025 | Mckenzie et al. |
| 2025/0278907 | A1 | 9/2025 | Pazmino et al. |

FOREIGN PATENT DOCUMENTS

| | | | |
|---|---|---|---|
| CN | 104714771 | A | 6/2015 |
| CN | 104981681 | A | 10/2015 |
| CN | 105264461 | A | 1/2016 |
| CN | 105264478 | A | 1/2016 |
| CN | 106990838 | A | 7/2017 |
| CN | 108519818 | A | 9/2018 |
| CN | 108563335 | A | 9/2018 |
| CN | 108633307 | A | 10/2018 |
| CN | 110413171 | A | 11/2019 |
| CN | 110476142 | A | 11/2019 |
| CN | 110673718 | A | 1/2020 |
| CN | 110830786 | A | 2/2020 |
| CN | 111033572 | A | 4/2020 |
| CN | 111213183 | A | 5/2020 |
| CN | 111488056 | A | 8/2020 |
| CN | 111580652 | A | 8/2020 |
| CN | 111913565 | A | 11/2020 |
| CN | 112068757 | A | 12/2020 |
| CN | 113168737 | A | 7/2021 |
| CN | 109491508 | B | 8/2022 |
| CN | 115309271 | A | 11/2022 |
| CN | 116132905 | A | 5/2023 |
| CN | 117043722 | A | 11/2023 |
| CN | 117857981 | A | 4/2024 |
| CN | 118102204 | A | 5/2024 |
| DE | 102016125811 | A1 | 11/2017 |
| DE | 102020101675 | A1 | 7/2020 |
| DE | 102020128536 | A1 | 5/2021 |
| EP | 1562021 | A1 | 8/2005 |
| EP | 2393056 | A1 | 12/2011 |
| EP | 2458486 | A1 | 5/2012 |
| EP | 2741175 | A2 | 6/2014 |
| EP | 2893297 | A1 | 7/2015 |
| EP | 2947545 | A1 | 11/2015 |
| EP | 3088997 | A1 | 11/2016 |
| EP | 3118722 | A1 | 1/2017 |
| EP | 3306444 | A1 | 4/2018 |
| EP | 3316075 | A1 | 5/2018 |
| EP | 3336805 | A1 | 6/2018 |
| EP | 3451135 | A1 | 3/2019 |
| EP | 3503101 | A1 | 6/2019 |
| EP | 3506151 | A1 | 7/2019 |
| EP | 3570144 | A1 | 11/2019 |
| EP | 3588255 | A1 | 1/2020 |
| EP | 3654147 | A1 | 5/2020 |
| EP | 4155867 | A1 | 3/2023 |
| EP | 3688726 | B1 | 8/2023 |
| GB | 2540791 | A | 2/2017 |
| JP | H10-51711 | A | 2/1998 |
| JP | H1078845 | A | 3/1998 |
| JP | H11289555 | A | 10/1999 |
| JP | 2004-510239 | A | 4/2004 |
| JP | 2005-215144 | A | 8/2005 |
| JP | 2005333524 | A | 12/2005 |
| JP | 2006004093 | A | 1/2006 |
| JP | 2006-146803 | A | 6/2006 |
| JP | 2012-234550 | A | 11/2012 |
| JP | 2013-178639 | A | 9/2013 |
| JP | 2013-196158 | A | 9/2013 |
| JP | 2013-254358 | A | 12/2013 |
| JP | 2013-257716 | A | 12/2013 |
| JP | 2014071663 | A | 4/2014 |
| JP | 2014-514652 | A | 6/2014 |

(56) References Cited

FOREIGN PATENT DOCUMENTS

| | | | |
|---|---|---|---|
| JP | 2014-514653 | A | 6/2014 |
| JP | 2015-515040 | A | 5/2015 |
| JP | 2015-118332 | A | 6/2015 |
| JP | 2015-222565 | A | 12/2015 |
| JP | 2016-194744 | A | 11/2016 |
| JP | 2017-27206 | A | 2/2017 |
| JP | 2017-58528 | A | 3/2017 |
| JP | 2017126009 | A | 7/2017 |
| JP | 2017-525002 | A | 8/2017 |
| JP | 2017-531221 | A | 10/2017 |
| JP | 2018-5516 | A | 1/2018 |
| JP | 2018-5517 | A | 1/2018 |
| JP | 2018-514005 | A | 5/2018 |
| JP | 2018-101019 | A | 6/2018 |
| JP | 2018088118 | A | 6/2018 |
| JP | 2018-106499 | A | 7/2018 |
| JP | 2019-515361 | A | 6/2019 |
| JP | 2019-169154 | A | 10/2019 |
| JP | 2019-527881 | A | 10/2019 |
| JP | 2019532382 | A | 11/2019 |
| JP | 2020-503595 | A | 1/2020 |
| JP | 2020086913 | A | 6/2020 |
| JP | 2022-53334 | A | 4/2022 |
| JP | 2022175629 | A | 11/2022 |
| JP | 2023052278 | A | 4/2023 |
| KR | 20110017236 | A | 2/2011 |
| KR | 10-2011-0128487 | A | 11/2011 |
| KR | 20140097654 | A | 8/2014 |
| KR | 10-2016-0012139 | A | 2/2016 |
| KR | 20170027240 | A | 3/2017 |
| KR | 20180102171 | A | 9/2018 |
| KR | 10-2019-0100957 | A | 8/2019 |
| KR | 20200010296 | A | 1/2020 |
| KR | 20200035103 | A | 4/2020 |
| KR | 20200110788 | A | 9/2020 |
| KR | 20200135496 | A | 12/2020 |
| KR | 20210083016 | A | 7/2021 |
| KR | 2021/0123530 | A | 10/2021 |
| WO | 2010/026519 | A1 | 3/2010 |
| WO | 2012145180 | A1 | 10/2012 |
| WO | 2013/169849 | A2 | 11/2013 |
| WO | 2013/184447 | A2 | 12/2013 |
| WO | 2014/105276 | A1 | 7/2014 |
| WO | 2014/190106 | A1 | 11/2014 |
| WO | 2016/014877 | A1 | 1/2016 |
| WO | 2016118344 | A1 | 7/2016 |
| WO | 2016/126522 | A1 | 8/2016 |
| WO | 2017024142 | A1 | 2/2017 |
| WO | 2017088487 | A1 | 6/2017 |
| WO | 2018/005557 | A1 | 1/2018 |
| WO | 2018090060 | A1 | 5/2018 |
| WO | 2018/106299 | A1 | 6/2018 |
| WO | 2018/116556 | A1 | 6/2018 |
| WO | 2018/125428 | A1 | 7/2018 |
| WO | 2018175735 | A1 | 9/2018 |
| WO | 2018/213801 | A1 | 11/2018 |
| WO | 2019074771 | A1 | 4/2019 |
| WO | 2019/142560 | A1 | 7/2019 |
| WO | 2019/152286 | A2 | 8/2019 |
| WO | 2019172678 | A1 | 9/2019 |
| WO | 2019/217163 | A1 | 11/2019 |
| WO | 2019213111 | A1 | 11/2019 |
| WO | 2020/066682 | A1 | 4/2020 |
| WO | 2020/105349 | A1 | 5/2020 |
| WO | 2020121483 | A1 | 6/2020 |
| WO | 2020/179027 | A1 | 9/2020 |
| WO | 2021061349 | A1 | 4/2021 |
| WO | 2021061351 | A1 | 4/2021 |
| WO | 2021133053 | A1 | 7/2021 |
| WO | 2021173839 | A1 | 9/2021 |
| WO | 2021/202783 | A1 | 10/2021 |
| WO | 2021/203856 | A1 | 10/2021 |
| WO | 2022/046340 | A1 | 3/2022 |
| WO | 2022/055822 | A1 | 3/2022 |
| WO | 2022/066399 | A1 | 3/2022 |
| WO | 2022/066535 | A2 | 3/2022 |
| WO | 2022055821 | A1 | 3/2022 |
| WO | 2022067075 | A1 | 3/2022 |
| WO | 2022067343 | A2 | 3/2022 |
| WO | 2022072187 | A2 | 4/2022 |
| WO | 2022/146936 | A1 | 7/2022 |
| WO | 2022/146938 | A1 | 7/2022 |
| WO | 2022/147146 | A1 | 7/2022 |
| WO | 2022/164881 | A1 | 8/2022 |
| WO | 2022/204664 | A1 | 9/2022 |
| WO | 2022192040 | A1 | 9/2022 |
| WO | 2022208797 | A1 | 10/2022 |
| WO | 2023043646 | A1 | 3/2023 |
| WO | 2023096940 | A2 | 6/2023 |
| WO | 2023/141535 | A1 | 7/2023 |
| WO | 2024/064373 | A1 | 3/2024 |

OTHER PUBLICATIONS

Restriction Requirement received for U.S. Appl. No. 18/473,187, mailed on Dec. 30, 2024, 5 pages.

Notice of Allowance received for U.S. Appl. No. 18/174,337, mailed on Jan. 2, 2025, 8 pages.

Corrected Notice of Allowability received for U.S. Appl. No. 17/932,999, mailed on Jan. 23, 2025, 9 pages.

Corrected Notice of Allowability received for U.S. Appl. No. 18/174,337, mailed on Jan. 15, 2025, 2 pages.

Extended European Search Report received for European Patent Application No. 24190323.6, mailed on Dec. 12, 2024, 9 pages.

International Search Report received for PCT Patent Application No. PCT/US2024/039190, mailed on Nov. 22, 2024, 5 pages.

Non-Final Office Action received for U.S. Appl. No. 18/149,640, mailed on Jan. 15, 2025, 17 pages.

Notice of Allowance received for U.S. Appl. No. 18/154,757, mailed on Jan. 23, 2025, 12 pages.

Notice of Allowance received for U.S. Appl. No. 18/671,936, mailed on Jan. 15, 2025, 9 pages.

AquaSnap Window Manager: dock, snap, tile, organize [online], Nurgo Software, Available online at: <https://www.nurgo-software.com/products/aquasnap>, [retrieved on Jun. 27, 2023], 5 pages.

Corrected Notice of Allowability received for U.S. Appl. No. 17/448,875, mailed on Apr. 24, 2024, 4 pages.

Corrected Notice of Allowability received for U.S. Appl. No. 17/659,147, mailed on Feb. 14, 2024, 6 pages.

Corrected Notice of Allowability received for U.S. Appl. No. 17/932,655, mailed on Oct. 12, 2023, 2 pages.

Corrected Notice of Allowability received for U.S. Appl. No. 18/154,757, mailed on Aug. 30, 2024, 2 pages.

Corrected Notice of Allowability received for U.S. Appl. No. 18/421,827, mailed on Aug. 29, 2024, 2 pages.

Corrected Notice of Allowability received for U.S. Appl. No. 18/463,739, mailed on Oct. 4, 2024, 2 pages.

Corrected Notice of Allowability received for U.S. Appl. No. 18/465,098, mailed on Mar. 13, 2024, 3 pages.

Corrected Notice of Allowance received for U.S. Appl. No. 17/478,593, mailed on Dec. 21, 2022, 2 pages.

European Search Report received for European Patent Application No. 21791153.6, mailed on Mar. 22, 2024, 5 pages.

European Search Report received for European Patent Application No. 21801378.7, mailed on Jul. 10, 2024, 5 pages.

Extended European Search Report received for European Patent Application No. 23158818.7, mailed on Jul. 3, 2023, 12 pages.

Extended European Search Report received for European Patent Application No. 23158929.2, mailed on Jun. 27, 2023, 12 pages.

Extended European Search Report received for European Patent Application No. 23197572.3, mailed on Feb. 19, 2024, 7 pages.

Extended European Search Report received for European Patent Application No. 24159868.9, mailed on Oct. 9, 2024, 13 pages.

Final Office Action received for U.S. Appl. No. 17/448,875, mailed on Mar. 16, 2023, 24 pages.

Final Office Action received for U.S. Appl. No. 17/580,495, mailed on May 13, 2024, 29 pages.

(56) References Cited

OTHER PUBLICATIONS

Final Office Action received for U.S. Appl. No. 17/659,147, mailed on Oct. 4, 2023, 17 pages.
Final Office Action received for U.S. Appl. No. 18/182,300, mailed on Feb. 16, 2024, 32 pages.
Final Office Action received for U.S. Appl. No. 18/182,300, mailed on Oct. 31, 2024, 34 pages.
Final Office Action received for U.S. Appl. No. 18/375,280, mailed on Jul. 12, 2024, 19 pages.
Home | Virtual Desktop [online], Virtual Desktop, Available online at: <https://www.vrdesktop.net>, [retrieved on Jun. 29, 2023], 4 pages.
International Search Report received for PCT Application No. PCT/US2022/076603, mailed on Jan. 9, 2023, 4 pages.
International Search Report received for PCT Application No. PCT/US2023/018213, mailed on Jul. 26, 2023, 6 pages.
International Search Report received for PCT Application No. PCT/US2023/060943, mailed on Jun. 6, 2023, 7 pages.
International Search Report received for PCT Patent Application No. PCT/US2021/050948, mailed on Mar. 4, 2022, 6 pages.
International Search Report received for PCT Patent Application No. PCT/US2021/071595, mailed on Mar. 17, 2022, 7 pages.
International Search Report received for PCT Patent Application No. PCT/US2021/071596, mailed on Apr. 8, 2022, 7 pages.
International Search Report received for PCT Patent Application No. PCT/US2022/013208, mailed on Apr. 26, 2022, 7 pages.
International Search Report received for PCT Patent Application No. PCT/US2022/071704, mailed on Aug. 26, 2022, 6 pages.
International Search Report received for PCT Patent Application No. PCT/US2023/074257, mailed on Nov. 21, 2023, 5 pages.
International Search Report received for PCT Patent Application No. PCT/US2023/074950, mailed on Jan. 3, 2024, 9 pages.
International Search Report received for PCT Patent Application No. PCT/US2023/074979, mailed on Feb. 26, 2024, 6 pages.
International Search Report received for PCT Patent Application No. PCT/US2024/026102, mailed on Aug. 26, 2024, 5 pages.
Non-Final Office Action received for U.S. Appl. No. 17/448,875, mailed on Oct. 6, 2022, 25 pages.
Non-Final Office Action received for U.S. Appl. No. 17/448,875, mailed on Sep. 29, 2023, 30 pages.
Non-Final Office Action received for U.S. Appl. No. 17/580,495, mailed on Aug. 15, 2024, 28 pages.
Non-Final Office Action received for U.S. Appl. No. 17/580,495, mailed on Dec. 11, 2023, 27 pages.
Non-Final Office Action received for U.S. Appl. No. 17/659,147, mailed on Mar. 16, 2023, 19 pages.
Non-Final Office Action received for U.S. Appl. No. 17/932,655, mailed on Apr. 20, 2023, 10 pages.
Non-Final Office Action received for U.S. Appl. No. 17/932,999, mailed on Feb. 23, 2024, 22 pages.
Non-Final Office Action received for U.S. Appl. No. 18/157,040, mailed on May 2, 2024, 25 pages.
Non-Final Office Action received for U.S. Appl. No. 18/182,300, mailed on May 29, 2024, 33 pages.
Non-Final Office Action received for U.S. Appl. No. 18/182,300, mailed on Oct. 26, 2023, 29 pages.
Notice of Allowance received for U.S. Appl. No. 18/154,757, mailed on Aug. 26, 2024, 12 pages.
Notice of Allowance received for U.S. Appl. No. 17/448,875, mailed on Apr. 17, 2024, 8 pages.
Notice of Allowance received for U.S. Appl. No. 17/448,875, mailed on Jul. 12, 2024, 8 pages.
Notice of Allowance received for U.S. Appl. No. 17/448,876, mailed on Apr. 7, 2022, 9 pages.
Notice of Allowance received for U.S. Appl. No. 17/448,876, mailed on Jul. 20, 2022, 8 pages.
Notice of Allowance received for U.S. Appl. No. 17/478,593, mailed on Aug. 31, 2022, 10 pages.
Notice of Allowance received for U.S. Appl. No. 17/580,495, mailed on Jun. 6, 2023, 6 pages.
Notice of Allowance received for U.S. Appl. No. 17/580,495, mailed on Nov. 30, 2022, 12 pages.
Notice of Allowance received for U.S. Appl. No. 17/659,147, mailed on Jan. 26, 2024, 13 pages.
Notice of Allowance received for U.S. Appl. No. 17/659,147, mailed on May 29, 2024, 13 pages.
Notice of Allowance received for U.S. Appl. No. 17/932,655, mailed on Jan. 24, 2024, 7 pages.
Notice of Allowance received for U.S. Appl. No. 17/932,655, mailed on Sep. 29, 2023, 7 pages.
Notice of Allowance received for U.S. Appl. No. 17/932,999, mailed on Sep. 12, 2024, 9 pages.
Notice of Allowance received for U.S. Appl. No. 18/154,757, mailed on Jan. 23, 2024, 10 pages.
Notice of Allowance received for U.S. Appl. No. 18/154,757, mailed on May 10, 2024, 12 pages.
Notice of Allowance received for U.S. Appl. No. 18/421,675, mailed on Apr. 11, 2024, 9 pages.
Notice of Allowance received for U.S. Appl. No. 18/421,675, mailed on Jul. 31, 2024, 8 pages.
Notice of Allowance received for U.S. Appl. No. 18/421,827, mailed on Aug. 14, 2024, 10 pages.
Notice of Allowance received for U.S. Appl. No. 18/423,187, mailed on Jun. 5, 2024, 9 pages.
Notice of Allowance received for U.S. Appl. No. 18/463,739, mailed on Feb. 1, 2024, 10 pages.
Notice of Allowance received for U.S. Appl. No. 18/463,739, mailed on Jun. 17, 2024, 9 pages.
Notice of Allowance received for U.S. Appl. No. 18/463,739, mailed on Oct. 30, 2023, 11 pages.
Notice of Allowance received for U.S. Appl. No. 18/465,098, mailed on Jun. 20, 2024, 8 pages.
Notice of Allowance received for U.S. Appl. No. 18/465,098, mailed on Mar. 4, 2024, 6 pages.
Notice of Allowance received for U.S. Appl. No. 18/465,098, mailed on Nov. 17, 2023, 8 pages.
Restriction Requirement received for U.S. Appl. No. 17/932,999, mailed on Oct. 3, 2023, 6 pages.
Search Report received for Chinese Patent Application No. 202310873465.7, mailed on Feb. 1, 2024, 5 pages (2 pages of English Translation and 3 pages of Official Copy).
Bhowmick Shimmila, "Explorations on Body-Gesture Based Object Selection on HMD Based VR Interfaces for Dense and Occluded Dense Virtual Environments", Report: State of the Art Seminar, Department of Design Indian Institute of Technology, Guwahati, Nov. 2018, 25 pages.
Bolt et al., "Two-Handed Gesture in Multi-Modal Natural Dialog", Uist '92, 5th Annual Symposium on User Interface Software and Technology. Proceedings of the ACM Symposium on User Interface Software and Technology, Monterey, Nov. 15-18, 1992, pp. 7-14.
Brennan Dominic, "4 Virtual Reality Desktops for Vive, Rift, and Windows VR Compared", [online]. Road to VR, Available online at: <https://www.roadtovr.com/virtual-reality-desktop-compared-oculus-rift-htc-vive/>, [retrieved on Jun. 29, 2023], Jan. 3, 2018, 4 pages.
Chatterjee et al., "Gaze+Gesture: Expressive, Precise and Targeted Free-Space Interactions", ICMI '15, Nov. 9-13, 2015, 8 pages.
Lin et al., "Towards Naturally Grabbing and Moving Objects in VR", IS&T International Symposium on Electronic Imaging and the Engineering Reality of Virtual Reality, 2016, 6 pages.
McGill et al., "Expanding the Bounds of Seated Virtual Workspaces", University of Glasgow, Available online at: <https://core.ac.uk/download/pdf/323988271.pdf>, [retrieved on Jun. 27, 2023], Jun. 5, 2020, 44 pages.
Pfeuffer et al., "Gaze + Pinch Interaction in Virtual Reality", In Proceedings of SUI '17, Brighton, United Kingdom, Oct. 16-17, 2017, pp. 99-108.
Corrected Notice of Allowability received for U.S. Appl. No. 17/935,095, mailed on Oct. 18, 2024.
Extended European Search Report received for European Patent Application No. 24178730.8, mailed on Oct. 14, 2024.
Extended European Search Report received for European Patent Application No. 24178752.2, mailed on Oct. 4, 2024.

(56) References Cited

OTHER PUBLICATIONS

Extended European Search Report received for European Patent Application No. 24179233.2, mailed on Oct. 2, 2024.
Extended European Search Report received for European Patent Application No. 24179830.5, mailed on Nov. 5, 2024.
Final Office Action received for U.S. Appl. No. 17/202,034, mailed on Nov. 4, 2024.
Final Office Action received for U.S. Appl. No. 17/935,095, mailed on Dec. 29, 2023.
Final Office Action received for U.S. Appl. No. 18/157,040, mailed on Dec. 2, 2024.
Final Office Action received for U.S. Appl. No. 18/473,196, mailed on Dec. 6, 2024.
International Search Report received for PCT Application No. PCT/US2023/074962, mailed on Jan. 19, 2024.
International Search Report received for PCT Application No. PCT/US2024/030107, mailed on Oct. 23, 2024.
International Search Report received for PCT Application No. PCT/US2024/032314, mailed on Nov. 11, 2024.
International Search Report received for PCT Application No. PCT/US2024/032451, mailed on Nov. 15, 2024.
International Search Report received for PCT Application No. PCT/US2024/032456, mailed on Nov. 14, 2024.
International Search Report received for PCT Patent Application No. PCT/US2022/076985, mailed on Feb. 20, 2023.
International Search Report received for PCT Patent Application No. PCT/US2023/074793, mailed on Feb. 6, 2024.
Non-Final Office Action received for U.S. Appl. No. 17/935,095, mailed on Jun. 22, 2023.
Non-Final Office Action received for U.S. Appl. No. 18/322,469, mailed on Nov. 15, 2024.
Non-Final Office Action received for U.S. Appl. No. 18/473,196, mailed on Aug. 16, 2024.
Notice of Allowance received for U.S. Appl. No. 17/935,095, mailed on Jul. 3, 2024.
Notice of Allowance received for U.S. Appl. No. 18/154,697, mailed on Aug. 6, 2024.
Notice of Allowance received for U.S. Appl. No. 18/154,697, mailed on Dec. 3, 2024.
Notice of Allowance received for U.S. Appl. No. 18/336,770, mailed on Nov. 29, 2024.
Notice of Allowance received for U.S. Appl. No. 18/515,188, mailed on Nov. 27, 2024.
Supplemental Notice of Allowance received for U.S. Appl. No. 18/515,188, mailed on Dec. 12, 2024.
Pfeuffer , et al., "Gaze and Touch Interaction on Tablets", UIST '16, Tokyo, Japan, ACM , Oct. 16-19, 2016 , pp. 301-311.
Schenk , et al. , "SPOCK: A Smooth Pursuit Oculomotor Control Kit", CHI'16 Extended Abstracts, San Jose, CA, USA, ACM , May 7-12, 2016 , pp. 2681-2687.
Extended European Search Report received for European Patent Application No. 25169060.8, mailed on May 12, 2025, 10 Pages.
Non-Final Office Action received for U.S. Appl. No. 18/473,197, mailed on May 1, 2025, 14 pages.
Corrected Notice of Allowability received for U.S. Appl. No. 18/146,234, mailed on Mar. 20, 2025, 2 pages.
Corrected Notice of Allowability received for U.S. Appl. No. 18/473,180, mailed on Apr. 1, 2025, 2 pages.
Non-Final Office Action received for U.S. Appl. No. 18/174,403, mailed on Mar. 20, 2025, 26 pages.
Non-Final Office Action received for U.S. Appl. No. 18/317,890, mailed on Apr. 17, 2025, 26 pages.
Non-Final Office Action received for U.S. Appl. No. 18/327,844, mailed on Mar. 24, 2025, 27 pages.
Non-Final Office Action received for U.S. Appl. No. 18/317,886, mailed on Apr. 30, 2025, 34 pages.
International Search Report received for PCT Patent Application No. PCT/US2024/012828, mailed on May 6, 2024, 4 pages.
International Search Report received for PCT Patent Application No. PCT/US2024/032109, mailed on Sep. 13, 2024, 4 pages.
International Search Report received for PCT Patent Application No. PCT/US2024/032153, mailed on Nov. 11, 2024, 6 pages.
Notice of Allowance received for U.S. Appl. No. 18/473,182, mailed on Apr. 23, 2025, 8 pages.
Notice of Allowance received for U.S. Appl. No. 18/473,179, mailed on May 8, 2025, 9 Pages.
Notice of Allowance received for U.S. Appl. No. 18/427,434, mailed on Apr. 17, 2025, 9 pages.
Notice of Allowance received for U.S. Appl. No. 18/515,188, mailed on Mar. 20, 2025, 9 pages.
Adding Environments, Available online at: https://manual.keyshot.com/manual/environments/adding-environments/, [retrieved on Jun. 9, 2023], 2 pages.
Applicant-Initiated Interview Summary received for U.S. Appl. No. 18/119,219, mailed on May 21, 2024, 3 pages.
Area Light, Available online at: https://manual.keyshot.com/manual/materials/material-types/light-sources/area-light/, [retrieved on Jun. 9, 2023], 24 pages.
Artec Leo, Artec 3D [online], 2018 [retrieved on Apr. 25, 2024]. Retrieved from the Internet: <URL: https://artec3d.com/portable-3d-scanners/artec-leo>, 39 pages.
Artec Leo Full 3D Scanning Demo w/ Sample Data, Digitize Designs, LLC, Available online at: <https://www.youtube.com/watch?v=ecBKo_h3Pug>, [retrieved on Sep. 1, 2022], Feb. 22, 2019, 3 pages.
Corrected Notice of Allowability received for U.S. Appl. No. 17/469,788, mailed on Feb. 12, 2025, 2 pages.
Corrected Notice of Allowability received for U.S. Appl. No. 17/932,999, mailed on Feb. 20, 2025, 2 pages.
Corrected Notice of Allowability received for U.S. Appl. No. 18/146,234, mailed on Feb. 6, 2025, 2 pages.
Corrected Notice of Allowance received for U.S. Appl. No. 17/407,675, mailed on Dec. 24, 2024, 2 pages.
Corrected Notice of Allowance received for U.S. Appl. No. 18/119,219, mailed on Sep. 11, 2024, 2 pages.
Corrected Notice of Allowance received for U.S. Appl. No. 18/152,656, mailed on Dec. 20, 2024, 5 pages.
Curious Blocks Alternatives 12, progsoft [online]. Profsoft, Available Online at: <URL: https://progsoft.net/en/software/curious-blocks>, [retrieved on Apr. 25, 2024], 2024, 7 pages.
European Search Report received for European Patent Application No. 22703771.0, mailed on Feb. 26, 2025, 4 pages.
Ex Parte Quayle Action received for U.S. Appl. No. 17/655,347, mailed on Jul. 8, 2024, 6 pages.
Extended European Search Report received for European Patent Application No. 24158036.4, mailed on Jul. 18, 2024, 12 pages.
Extended European Search Report received for European Patent Application No. 24171800.6, mailed on Sep. 5, 2024, 15 pages.
Extended European Search Report received for European Patent Application No. 24171804.8, mailed on Sep. 5, 2024, 13 pages.
Extended European Search Report received for European Patent Application No. 24217335.9, mailed on Feb. 24, 2025, 8 pages.
Eye-supported target positioning in MRTK, Mixed Reality Toolkit Documentation [online]. Features and Architecture [retrieved on Mar. 21, 2025]. Retrieved from the Internet: <URL: https://microsoft.github.io/MixedRealityToolkit-Unity/Documentation/EyeTracking/EyeTracking_Positioning.html>, 2 pages.
Feature Highlights, Available online at: https://manual.keyshot.com/manual/whats-new/feature-highlights/, [retrieved on Jun. 9, 2023], 28 pages.
Final Office Action received for U.S. Appl. No. 17/407,675, mailed on May 22, 2024, 18 pages.
Final Office Action received for U.S. Appl. No. 17/469,788, mailed on Nov. 16, 2023, 24 pages.
Final Office Action received for U.S. Appl. No. 17/580,495, mailed on Feb. 12, 2025, 29 pages.
Final Office Action received for U.S. Appl. No. 17/807,226, mailed on Nov. 30, 2023, 23 pages.
Final Office Action received for U.S. Appl. No. 17/812,965, mailed on Jan. 31, 2024, 9 pages.
Final Office Action received for U.S. Appl. No. 17/814,462, mailed on Nov. 1, 2024, 44 pages.

(56) References Cited

OTHER PUBLICATIONS

Final Office Action received for U.S. Appl. No. 17/905,483, mailed on Jan. 8, 2025, 19 pages.
Final Office Action received for U.S. Appl. No. 17/934,104, mailed on Oct. 18, 2024, 28 pages.
Final Office Action received for U.S. Appl. No. 18/327,844, mailed on Nov. 29, 2024, 25 pages.
How to Use Your Phone or Tablet in VR! | iOS and Android, YouTube [online]. YouTube, Dec. 20, 2017, Available online at <https://www.youtube.com/watch?v=QhfZjbVUxZE>, [Retrieved from Internet on Dec. 23, 2022], 4 pages.
International Search Report received for PCT Patent Application No. PCT/US2021/049520, mailed on Apr. 8, 2022, 8 pages.
International Search Report received for PCT Patent Application No. PCT/US2022/071208, mailed on Aug. 18, 2022, 9 pages.
International Search Report received for PCT Patent Application No. PCT/US2022/076808, mailed on Mar. 28, 2023, 6 pages.
International Search Report received for PCT Patent Application No. PCT/US2022/082379, mailed on May 30, 2023, 7 pages.
International Search Report received for PCT Patent Application No. PCT/US2023/019309, mailed on Sep. 1, 2023, 6 pages.
Final Office Action received for U.S. Appl. No. 18/149,640, mailed on May 21, 2025, 24 pages.
Final Office Action received for U.S. Appl. No. 17/933,020, mailed on May 21, 2025, 28 pages.
European Search Report received for European Patent Application No. 22723527.2, mailed on May 12, 2025, 4 pages.
International Search Report received for PCT Patent Application No. PCT/US2024/043470, mailed on Oct. 29, 2024, 4 pages.
Extended European Search Report received for European Patent Application No. 24221722.2, mailed on Apr. 17, 2025, 7 pages.
Non-Final Office Action received for U.S. Appl. No. 18/882,622, mailed on May 22, 2025, 8 pages.
Extended European Search Report received for European Patent Application No. 25169059.0, mailed on May 12, 2025, 11 Pages.
Non-Final Office Action received for U.S. Appl. No. 18/473,187 , mailed on May 16, 2025, 15 Pages.
Non-Final Office Action received for U.S. Appl. No. 18/473,176, mailed on May 14, 2025, 23 Pages.
International Search Report received for PCT Patent Application No. PCT/US2023/074978, mailed on Apr. 4, 2024, 4 Pages.
International Search Report received for PCT Patent Application No. PCT/US2023/074960, mailed on Feb. 12, 2024, 6 Pages.
International Search Report received for PCT Patent Application No. PCT/US2023/074973, mailed on Mar. 7, 2024, 7 Pages.
Notice of Allowance received for U.S. Appl. No. 17/655,521, mailed on Apr. 16, 2025, 8 Pages.
Final Office Action received for U.S. Appl. No. 17/655,521, mailed on Apr. 10, 2024, 18 pages.
International Search Report received for PCT Patent Application No. PCT/US2022/071228, mailed on Aug. 25, 2022, 6 pages.
International Search Report received for PCT Patent Application No. PCT/US2023/060429, mailed on Jun. 28, 2023, 7 pages.
International Search Report received for PCT Patent Application No. PCT/US2023/060592, mailed on Jun. 14, 2023, 7 pages.
International Search Report received for PCT Patent Application No. PCT/US2023/074955, mailed on Feb. 1, 2024, 6 pages.
International Search Report received for PCT Patent Application No. PCT/US2023/074957, mailed on Jan. 30, 2024, 7 pages.
International Search Report received for PCT Patent Application No. PCT/US2023/074968, mailed on Feb. 26, 2024, 7 pages.
International Search Report received for PCT Patent Application No. PCT/US2024/030661, mailed on Nov. 4, 2024, 5 pages.
International Search Report received for PCT Patent Application No. PCT/US2024/032140, mailed on Sep. 10, 2024, 4 pages.
International Search Report received for PCT Patent Application No. PCT/US2024/032423, mailed on Sep. 25, 2024, 5 pages.
International Search Report received for PCT Patent Application No. PCT/US2024/032455, mailed on Sep. 25, 2024, 4 pages.
International Search Report received for PCT Patent Application No. PCT/US2024/039204, mailed on Nov. 14, 2024, 4 pages.
Kitasenju Design, X [online], X Corp., Available Online at: <URL: https://twitter.com/kitasenjudesign/status/1282665402812608513>, [retrieved on Apr. 25, 2024], 2024, 1 page.
Light Manager, Available online at: https://manual.keyshot.com/manual/lighting/lighting-manager/, [retrieved on Jun. 9, 2023], 3 pages.
Magica Voxel 0.99.5 Review, YouTube [online], Google LLC, Available Online at: <URL: https://www.youtube.com/watch?v=WPPFnHQWwFk>, [retrieved on Apr. 25, 2024], 2024, 2 pages.
Non-Final Office Action received for U.S. Appl. No. 17/407,675, mailed on Sep. 11, 2023, 16 pages.
Non-Final Office Action received for U.S. Appl. No. 17/469,788, mailed on Mar. 2, 2023, 22 pages.
Non-Final Office Action received for U.S. Appl. No. 17/469,788, mailed on Mar. 21, 2024, 24 pages.
Non-Final Office Action received for U.S. Appl. No. 17/655,521, mailed on Aug. 23, 2023, 13 pages.
Non-Final Office Action received for U.S. Appl. No. 17/655,521, mailed on Nov. 27, 2024, 17 pages.
Non-Final Office Action received for U.S. Appl. No. 17/807,226, mailed on Jun. 26, 2023, 21 pages.
Non-Final Office Action received for U.S. Appl. No. 17/812,965, mailed on Jun. 8, 2023, 8 pages.
Non-Final Office Action received for U.S. Appl. No. 17/814,455, mailed on Feb. 16, 2024, 24 pages.
Non-Final Office Action received for U.S. Appl. No. 17/814,462, mailed on Feb. 1, 2024, 30 pages.
Non-Final Office Action received for U.S. Appl. No. 17/905,483, mailed on Mar. 27, 2024, 16 pages.
Non-Final Office Action received for U.S. Appl. No. 17/933,020, mailed on Jan. 30, 2025, 26 pages.
Non-Final Office Action received for U.S. Appl. No. 17/934,104, mailed on Mar. 25, 2024, 26 pages.
Non-Final Office Action received for U.S. Appl. No. 18/119,219, mailed on Mar. 28, 2024, 15 pages.
Non-Final Office Action received for U.S. Appl. No. 18/153,943, mailed on Dec. 31, 2024, 33 pages.
Non-Final Office Action received for U.S. Appl. No. 18/298,994, mailed on Mar. 7, 2025, 26 pages.
Non-Final Office Action received for U.S. Appl. No. 18/304,290, mailed on Mar. 5, 2025, 111 pages.
Non-Final Office Action received for U.S. Appl. No. 18/317,893, mailed on Apr. 25, 2024, 18 pages.
Non-Final Office Action received for U.S. Appl. No. 18/327,844, mailed on May 17, 2024, 20 pages.
Non-Final Office Action received for U.S. Appl. No. 18/424,644, mailed on Jan. 29, 2025, 18 pages.
Non-Final Office Action received for U.S. Appl. No. 18/429,301, mailed on Jun. 12, 2024, 28 pages.
Non-Final Office Action received for U.S. Appl. No. 18/473,196, mailed on Feb. 28, 2025, 20 pages.
Non-Final Office Action received for U.S. Appl. No. 18/645,292, mailed on Feb. 21, 2025, 39 pages.
Notice of Allowability received for U.S. Appl. No. 17/812,965, mailed on Jan. 15, 2025, 3 pages.
Notice of Allowability received for U.S. Appl. No. 17/814,455, mailed on Jan. 13, 2025, 7 pages.
Notice of Allowance received for U.S. Appl. No. 17/407,675, mailed on Aug. 20, 2024, 7 pages.
Notice of Allowance received for U.S. Appl. No. 17/407,675, mailed on Dec. 11, 2024, 8 pages.
Notice of Allowance received for U.S. Appl. No. 17/469,788, mailed on Feb. 5, 2025, 5 pages.
Notice of Allowance received for U.S. Appl. No. 17/469,788, mailed on Oct. 15, 2024, 7 pages.
Notice of Allowance received for U.S. Appl. No. 17/655,347, mailed on Feb. 20, 2025, 7 pages.
Notice of Allowance received for U.S. Appl. No. 17/655,347, mailed on Oct. 9, 2024, 7 pages.
Notice of Allowance received for U.S. Appl. No. 17/807,226, mailed on Jul. 3, 2024, 9 pages.

(56) References Cited

OTHER PUBLICATIONS

Notice of Allowance received for U.S. Appl. No. 17/807,236, mailed on Feb. 5, 2024, 13 pages.
Notice of Allowance received for U.S. Appl. No. 17/807,236, mailed on Jul. 10, 2024, 9 pages.
Notice of Allowance received for U.S. Appl. No. 17/812,965, mailed on Jul. 26, 2024, 6 pages.
Notice of Allowance received for U.S. Appl. No. 17/812,965, mailed on Nov. 15, 2024, 6 pages.
Notice of Allowance received for U.S. Appl. No. 17/814,455, mailed on Oct. 7, 2024, 10 pages.
Notice of Allowance received for U.S. Appl. No. 17/814,462, mailed on Feb. 26, 2025, 8 pages.
Notice of Allowance received for U.S. Appl. No. 18/119,219, mailed on Jul. 22, 2024, 7 pages.
Notice of Allowance received for U.S. Appl. No. 18/146,234, mailed on Jan. 24, 2025, 12 pages.
Notice of Allowance received for U.S. Appl. No. 18/152,656, mailed on Dec. 17, 2024, 12 pages.
Notice of Allowance received for U.S. Appl. No. 18/317,893, mailed on Jan. 13, 2025, 11 pages.
Notice of Allowance received for U.S. Appl. No. 18/317,893, mailed on Mar. 6, 2024, 8 pages.
Notice of Allowance received for U.S. Appl. No. 18/317,893, mailed on Nov. 22, 2023, 9 pages.
Notice of Allowance received for U.S. Appl. No. 18/429,294, mailed on Jun. 21, 2024, 10 pages.
Notice of Allowance received for U.S. Appl. No. 18/429,294, mailed on Oct. 31, 2024, 10 pages.
Notice of Allowance received for U.S. Appl. No. 18/429,301, mailed on Nov. 22, 2024, 8 pages.
Notice of Allowance received for U.S. Appl. No. 18/473,180, mailed on Aug. 22, 2024, 13 pages.
Notice of Allowance received for U.S. Appl. No. 18/473,180, mailed on Jan. 2, 2025, 12 pages.
Notice of Allowance received for U.S. Appl. No. 18/668,032, mailed on Jan. 16, 2025, 9 pages.
Notice of Allowance received for U.S. Appl. No. 18/671,936, mailed on Mar. 5, 2025, 7 pages.
Open Source Voxel Editor for Windows, Mac, Linux, iOS, and Android, GOXEL [online]. Goxel by Guillaume Chereau, Available Online at: <URL: https://goxel.xyz/>, [retrieved on Apr. 25, 2024], 2024, 3 pages.
POP 2 3D Scanner (Infrared Light I Precision 0.05mm), REVPOINT [online]. Revopoint 3D, <URL: https://global.revopoint3d.com/products/face-3d-scanner-pop2?_ ga=2.182721893.277596832.1650264227-586470518.1640327512&ref=dh0L07OOzRuqo&utm_campaign=pop2_banner&utm_medium=referral&utm_source=Official_Website>, [retrieved on Apr. 25, 2024], 2014, 16 pages.
Reality Scan, Unreal Engine [online], [retrieved on Jun. 14, 2024]. Retrieved from the Internet: <URL: https://www.unrealengine.com/en-US/realityscan>, 11 pages.
RealityScan Available Now | Capture the World and Create Your Own, YouTube [online]. YouTube, Dec. 1, 2022 [retrieved on Jun. 14, 2024]. Retrieved from the Internet: <URL: https://www.youtube.com/watch?v=fXLOMOWBJQ>, 2 pages.
Restriction Requirement received for U.S. Appl. No. 17/905,483, mailed on Dec. 7, 2023, 7 pages.
Search Report received for United Kingdom Patent Application No. GB2210885.6, mailed on Jan. 27, 2023, 1 page.
ShareVOX, PHORIA [online]. Phoria Pty Ltd, Available Online at: <URL: https://www.phoria.com.au/projects/sharevox/>, [retrieved on Apr. 25, 2024], 2024, 2 pages.
Sliders, Mixed Reality Toolkit Documentation [online]. Features and Architecture [retrieved on Mar. 21, 2025]. Retrieved from the Internet: <URL: https://microsoft.github.io/MixedRealityToolkit-Unity/Documentation/README_Sliders.html>, 3 pages.
Spatial Audio Head Tracking on Apple Tv Automatically Resets when You Get Up from the Couc . . . , AppleInsider [online]. Jun. 10, 2021 [retrieved on Dec. 20, 2024]. Retrieved from the Internet: <https://forums.appleinsider.com/discussion/222259/spatial-audio-head-tracking-on-apple-tv-automatically-resets-when-you-get-up-from-the-couc>, 2024, 6 pages.
Supplemental Notice of Allowability received for U.S. Appl. No. 18/317,893, mailed on Jan. 29, 2025, 3 pages.
VoxEdit Beta Tutorial—Introduction and How to Animate Voxel Creations, YouTube [online], Google LLC, Available Online at: <URL: https://www.youtube.com/watch?v=fqcArJWtyqM>, [retrieved on Apr. 25, 2024], 2024, 2 pages.
Voxel World Lens, Snapchat [online]. Snapchat Inc., Available Online at: <URL: https://www.snapchat.com/lens/689751dd6a7d446280d903d15d79f104?locale=en-US>, [retrieved on Apr. 25, 2024], 2024, 1 page.
Voxelize, Rossiev [online]. Denis Rossiev 2018-2024, Available Online at: <URL: https://www.rossiev.pro/voxelize/>, [retrieved on Apr. 25, 2024], 2024, 16 pages.
Your PC in VR, Virtual Desktop [online]. Virtual Desktop, Inc., 2023 [retrieved on Apr. 17, 2024]. Retrieved from the Internet: <URL: https://www.vrdesktop.net/>, 4 pages.
Coloring a Point Cloud Using 3DF Zephyr Pro, Wayback Machine, https://web.archive.org/web/20170522233043/http://www.3dflow.net:80/technology/documents/3df-zephyr-tutorials/point-cloud-coloring-using-3df-zephyr/, May 22, 2017, 1 page.
Apple, "Use Continuity to Connect Your Mac, iPhone, iPad, and Apple Watch", Apple Support, Available online at <https://support.apple.com/en-us/HT204681>, [Retrieved from Internet on Dec. 23, 2022], 4 pages.
Apple, "Use Message Effects with iMessage on Your iPhone, iPad, and iPod Touch", Apple Support, Available online at: <https://support.apple.com/en-us/HT206894>, [retrieved on Feb. 22, 2024], 5 pages.
Berard Francois, "A Study on Two-Dimensional Scrolling with Head Motion", Clips-Imag Technical Report. France, Ref: <TR-IMAG-CLIPS-IHM-199901>, Retrieved from: <http://iihm.imag.fr/publs/1999/TR199901_PWindowRate.pdf>, Retrieved on Dec. 26, 2024, Jan. 8, 1999, 7 pages.
Capturing Reality, "Data Sheet RealityCapture TARASQUE 1.2", Wayback Machine, https://web.archive.org/web/20220327110303/https://www.capturingreality.com/assets/Documents/datasheet_TARASQUE_1.2.pdf, Mar. 27, 2022, 5 pages.
Capturing Reality, "RealityCapture tutorial: Complete model in PPI", Youtube, https://www.youtube.com/watch?v=tw6wNNEbH_M, Oct. 14, 2021, 2 pages.
Cas and Chary XR, "Oculus Go & Your Phone as 2nd Controller!!—An Inexpensive Way to Play PC VR Games", posted on Mar. 8, 2019, https://www.youtube.com/watch?v=i_iRVa0kemw, 2019, 4 pages.
Choe et al., "Augmented-Reality-Based 3D Emotional Messenger for Dynamic User Communication with Smart Devices", Electronics, vol. 9, No. 1127, Jul. 10, 2020, 15 pages.
Didehkhorshid et al., "Text Input in Virtual Reality Using a Tracked Drawing Tablet", HCII 2020, LNCS 12428, 2020, pp. 314-329.
Edmiston et al., "Touch-Enabled Input Devices for Controlling Virtual Environments", 12th IFAC Symposium on Analysis, Design and Evaluation of Human-Machine Systems, Las Vegas, NV, USA, Aug. 11-15, 2013, pp. 349-356.
Gamedbharat, "I Want to Rotate a Object on Double Tap, Can Any One Help Me With This?", posted on Jul. 26, 2017, https://discussions.unity.com/t/i-want-to-rotate-a-object-on-double-tap-can-any-one-help-me-with-this/192010, 2017, 3 pages.
Headmaster Introduction, "If You Can Move Your Head, You Can Move Your World", Retrieved from: <https://www.microsoft.com/buxtoncollection/a/pdf/HeadMaster%20Introduction.pdf)>, Retrieved on Dec. 26, 2024, 4 pages.
Huang et al., "Proxy-Based Security Audit System for Remote Desktop Access", Computer Communications and Networks, ICCCN 2009. Proceedings of 18th International Conference on, IEEE, Piscataway, NJ, USA, Aug. 3, 2009, 5 pages.
Jones et al., "The Future of Virtual Museums: On-Line, Immersive, 3D Environments", ProQuest (Technology Collection Database, Dissertations and Theses Database): Technical Literature Search, Jul. 26, 2002, 12 pages.

(56) References Cited

OTHER PUBLICATIONS

Lachambre et al., "Unity Photogrammetry Workflow", https://unity3d.com/files/solutions/photogrammetry/Unity-Photogrammetry-Workflow_2017-07_v2.pdf, Jun. 23, 2017, pp. 55-64.
Lin et al., "Ubii: Physical World Interaction Through Augmented Reality", Publisher: IEEE, vol. 16, No. 3, DOI:10.1109/TMC.2016.2567378, May 13, 2016, pp. 872-885.
Locher et al., "Mobile Phone and Cloud—a Dream Team for 3D Reconstruction", 2016 IEEE Winter Conference on Applications of Computer Vision (WACV), 2016, pp. 1-8.
Lor Cas, "Reality Capture: Exporting Mesh", Youtube, https://www.youtube.com/watch?v=PdvTRa2B_s0, Dec. 10, 2020, 2 pages.
Macmostvideo, "A Beginner's Guide to Selecting Items on Your Mac (#1566)", Bibliographic Information, Jan. 4, 2018, Retrieved from <URL:https://www.youtube.com/watch?v=a6MDAuh7MOQ&ab_channel=macmostvideo/>, [retrieved on Feb. 19, 2025], Most relevant passage of the video is 00:10 to 00:30, 2 pages.
Metalnwood, "Using a Tablet for Touch Control, with VR Headset on. (Demo Vid)", Virtual Reality, ED Forums, Jun. 12, 2020, Available online at <https://forum.dcs.world/topic/237992-using-a-tablet-for-touch-control-with-vr-headset-on-demo-vid/>, [Retrieved from Internet on Jan. 2, 2024], 9 pages.
Process a 3D Scan With Projection in Reality Capture (RC), Wayback Machine, https://web.archive.org/web/20200116135047/http:/www.pi3dscan.com/index.php/instructions/item/process-a-3d-scan-with-projection-in-reality-capture-rc, Jan. 16, 2020, 1 page.
Qi et al., "PointNet++: Deep Hierarchical Feature Learning on Point Sets in a Metric Space", Stanford University, Jun. 7, 2017, 14 pages.
Ro et al., "AR Pointer: Advanced Ray-Casting Interface Using Laser Pointer Metaphor for Object Manipulation in 3D Augmented Reality Environment", Applied Sciences, vol. 9, No. 3078, [retrieved on Jul. 27, 2020], Jul. 30, 2019, 18 pages.
Schubert Martin, "Design Sprints at Leap Motion: A Playground of 3D User Interfaces", Ultraleap For Developers [online]. Nov. 8, 2017 [retrieved on Mar. 21, 2025]. Retrieved from the Internet: <URL: https://blog.leapmotion.com/design-playground-3d-user-interfaces/>, 17 pages.
Schuetz Markus, "Interactive Exploration of Point Clouds", Technische Universitat Wien, reposiTUm, https://doi.org/10.34726/hss.2021.91668, Mar. 8, 2021, 119 pages.
Slambekova Dana, "Gaze and Gesture Based Object Interaction in Virtual World", [retrieved on Dec. 17, 2015]. Retrieved from the Internet: <URL:https://www.cs.rit.edu/~dxs4659/Report.pdf>, May 31, 2012, 54 pages.
Strand Robin, "Surface Skeletons in Grids With Non-cubic Voxels", 2004 IEEE Xplore, Available Online at: <DOI: 10.1109/ICPR.2004.1334195>, Sep. 2004, 5 pages.
Sun et al., "MagicHand: Interact with IoT Devices in Augmented Reality Environment", 2019 IEEE Conference on Virtual Reality and 3D User Interfaces, Osaka, Japan, Mar. 23-27, 2019, [retrieved on Dec. 4, 2020], 6 pages.
Tolle et al., "Design of Head Movement Controller System (HEMOCS) for Control Mobile Application through Head Pose Movement Detection", Retrieved from:<https://www.google.com/url?sa=t&source=web&rct=j&opi=89978449&url=https://online-journals.org/index.php/i-jim/article/download/5552/4029/19224&ved=2ahUKEwj-w86vga-HAxUJJDQIHYMNDNw4HhAWegQILhAB&usg=AOvVaw3HR1t7v8Rx7osc1lp0UfOh>, DOI: <httpdx.doi.org/10.3991/ijim.v10i3.5552>, Retrieved on Dec. 26, 2024, 2016, 5 pages.
Wood Tyriel, "The HoloLens 2 Tour!—Discovering a World of Holograms", YouTube [online]. YouTube, Mar. 23, 2021 [retrieved on Dec. 7, 2023], Retrieved from the Internet: <URL: https://www.youtube.com/watch?v=rMks7sMzPxI>, 2 pages.
Writtenhouse Sandy, "How to Use Live View on Google Maps", Available online at <https://www.lifewire.com/use-live-view-google-maps-5323691>, [Retrieved from Internet on Jun. 27, 2024], Jul. 5, 2022, 6 pages.
Yue et al., "Optimal Region Selection for Stereoscopic Video Subtitle Insertion", IEEE Transactions on Circuits and Systems for Video Technology, vol. 28, No. 11, Nov. 2018, 13 pages.
Extended European Search Report received for European Patent Application No. 25179367.5, mailed on Jul. 1, 2025, 10 pages.
Extended European Search Report received for European Patent Application No. 25174955.2, mailed on Jun. 25, 2025, 12 pages.
Non-Final Office Action received for U.S. Patent Application No. 18/473, 198, mailed on Jul. 15, 2025, 13 pages.
Notice of Allowance received for U.S. Appl. No. 18/174,403, mailed on Aug. 21, 2025, 13 pages.
Notice of Allowance received for U.S. Appl. No. 18/894,997, mailed on Aug. 12, 2025, 13 pages.
Non-Final Office Action received for U.S. Appl. No. 18/896,227, mailed on May 29, 2025, 14 pages.
Notice of Allowance received for U.S. Appl. No. 18/322,469, mailed on Jul. 7, 2025, 14 pages.
Non-Final Office Action received for U.S. Appl. No. 18/473,195, mailed on Jun. 27, 2025, 16 pages.
Non-Final Office Action received for U.S. Appl. No. 18/467,523, mailed on Jun. 17, 2025, 19 pages.
Non-Final Office Action received for U.S. Appl. No. 18/471,729, mailed on Jun. 17, 2025, 19 pages.
Corrected Notice of Allowability received for U.S. Appl. No. 18/152,656, mailed on Jul. 22, 2025, 2 pages.
Corrected Notice of Allowance received for U.S. Appl. No. 18/424,644, mailed on Jun. 24, 2025, 2 pages.
Final Office Action received for U.S. Patent Application No. 18/473, 196, mailed on Jul. 16, 2025, 20 pages.
Non-Final Office Action received for U.S. Appl. No. 17/905,483, mailed on Jul. 15, 2025, 20 pages.
Non-Final Office Action received for U.S. Appl. No. 18/518,340, mailed on Jul. 22, 2025, 20 pages.
Final Office Action received for U.S. Appl. No. 18/317,890, mailed on Sep. 3, 2025, 22 pages.
Non-Final Office Action received for U.S. Appl. No. 18/473,260, mailed on Jun. 27, 2025, 35 pages.
International Search Report received for PCT Patent Application No. PCT/US2025/011189, mailed on Apr. 23, 2025, 4 pages.
Non-Final Office Action received for U.S. Appl. No. 17/202,034, mailed on Jun. 4, 2025, 40 pages.
Non-Final Office Action received for U.S. Appl. No. 18/473,184, mailed on Jul. 25, 2025, 40 pages.
Final Office Action received for U.S. Appl. No. 18/645,292, mailed on Jun. 2, 2025, 41 pages.
Non-Final Office Action received for U.S. Appl. No. 18/473,155, mailed on Jul. 10, 2025, 47 pages.
Notice of Allowance received for U.S. Appl. No. 18/152,656, mailed on Jun. 25, 2025, 6 pages.
Notice of Allowance received for U.S. Appl. No. 18/424,644, mailed on Jun. 11, 2025, 6 pages.
Notice of Allowance received for U.S. Appl. No. 18/153,943, mailed on Jun. 17, 2025, 7 pages.
Notice of Allowance received for U.S. Appl. No. 18/304,290, mailed on Aug. 20, 2025, 7 pages.
Notice of Allowance received for U.S. Appl. No. 18/882,622, mailed on Aug. 27, 2025, 8 pages.
Notice of Allowance received for U.S. Appl. No. 18/896,227, mailed on Jul. 11, 2025, 8 pages.
Notice of Allowance received for U.S. Appl. No. 18/919,095, mailed on Jul. 22, 2025, 8 pages.
Notice of Allowance received for U.S. Appl. No. 18/157,040, mailed on Jun. 24, 2025, 9 pages.
Notice of Allowance received for U.S. Appl. No. 18/471,850, mailed on Jun. 10, 2025, 9 pages.
Notice of Allowance received for U.S. Appl. No. 18/473,262, mailed on Jun. 10, 2025, 9 pages.
VR Design Best Practices, LeapMotion, Aug. 29, 2015, 31 pages.
Banta et al., "A Next-Best-View System for Autonomous 3-D Object Reconstruction", IEEE Transactions on Systems, Man, and Cybernetics—Part A: Systems and Humans vol. 30, No. 5, Sep. 30, 2000, pp. 589-598.

(56) References Cited

OTHER PUBLICATIONS

Bermejo et al., "Exploring Button Designs for Mid-air Interaction in Virtual Reality: A Hexa-metric Evaluation of Key Representations and Multi-modal Cues", Proceedings of the ACM on Human-Computer Interaction, vol. 5, No. EICS, Article 194, May 27, 2021, 26 pages.
Dhakal et al., "SLAM-Share: Visual Simultaneous Localization and Mapping for Real-time Multi-user Augmented Reality", CoNEXT '22, Dec. 6-9, 2022, Roma, Italy, 14 pages.
Dudley et al., "Fast and Precise Touch-Based Text Entry for Head-Mounted Augmented Reality with Variable Occlusion", ACM Transactions on Computer-Human Interaction (TOCHI), vol. 25, No. 6, Article 30, Dec. 13, 2018, 40 pages.
Kim et al., "Pseudo-haptic Button for Improving User Experience of Mid-air Interaction in VR", International Journal of Human-Computer Studies, vol. 168, No. 102907, Aug. 9, 2022, 11 pages.
Kim et al., "Virtual Object Sizes for Efficient and Convenient Mid-air Manipulation", The Visual Computer, vol. 38, No. 9, Jul. 1, 2022, pp. 3463-3474.
Lee et al., "UbiPoint: Towards Non-intrusive Mid-Air Interaction for Hardware Constrained Smart Glasses", In Proceedings of the 11th ACM Multimedia Systems Conference, May 27, 2020, pp. 190-201.
Mendes et al., "Mid-Air Interactions Above Stereoscopic Interactive Tables", IEEE Symposium on 3D User Interfaces (3DUI), Mar. 29-30, 2014, pp. 3-10.
Nunez Angulo et al., "Manual for the Design of Didactic Units in Augmented Reality Using the Cospaces EDU Application", 2020, 75 pages.
Pfeuffer et al., "Gaze+touch vs. Touch: What's the Trade-off When Using Gaze to Extend Touch to Remote Displays?", Advances In Databases And Information Systems, Aug. 30, 2015, pp. 349-367.
Ran et al., "Multi-User Augmented Reality with Communication Efficient and Spatially Consistent Virtual Objects", CoNEXT '20, Dec. 1-4, 2020, Barcelona, Spain, 13 pages.
Speicher et al., "Pseudo-haptic Controls for Mid-air Finger-based Menu Interaction", CHI'19 Extended Abstracts, May 4-9, 2019, Conference on Human Factors in Computing Systems, May 2, 2019, pp. 1-6.
Zhuang et al., "Distributed Architecture for 3D Graphics Rendering in Collaborative System", Computer and Modernization, Issue 4, 2017, 5 pages (1 page of English Abstract and 4 pages of Official Copy).
Non-Final Office Action received for U.S. Appl. No. 18/473,242, mailed on Sep. 5, 2025, 17 pages.
Non-Final Office Action received for U.S. Appl. No. 18/473,239, mailed on Sep. 10, 2025, 38 pages.
Ghosh et al., "NotifiVIR: Exploring Interruptions and Notifications in Virtual Reality", IEEE Transactions on Visualization and Computer Graphics, vol. 24, No. 4, Apr. 2018, pp. 1447-1456.
Medeiros et al., "Promoting Reality Awareness in Virtual Reality through Proxemics", IEEE Virtual Reality and 3D User Interfaces (VR), Mar. 27-Apr. 1, 2021, 11 pages.

* cited by examiner

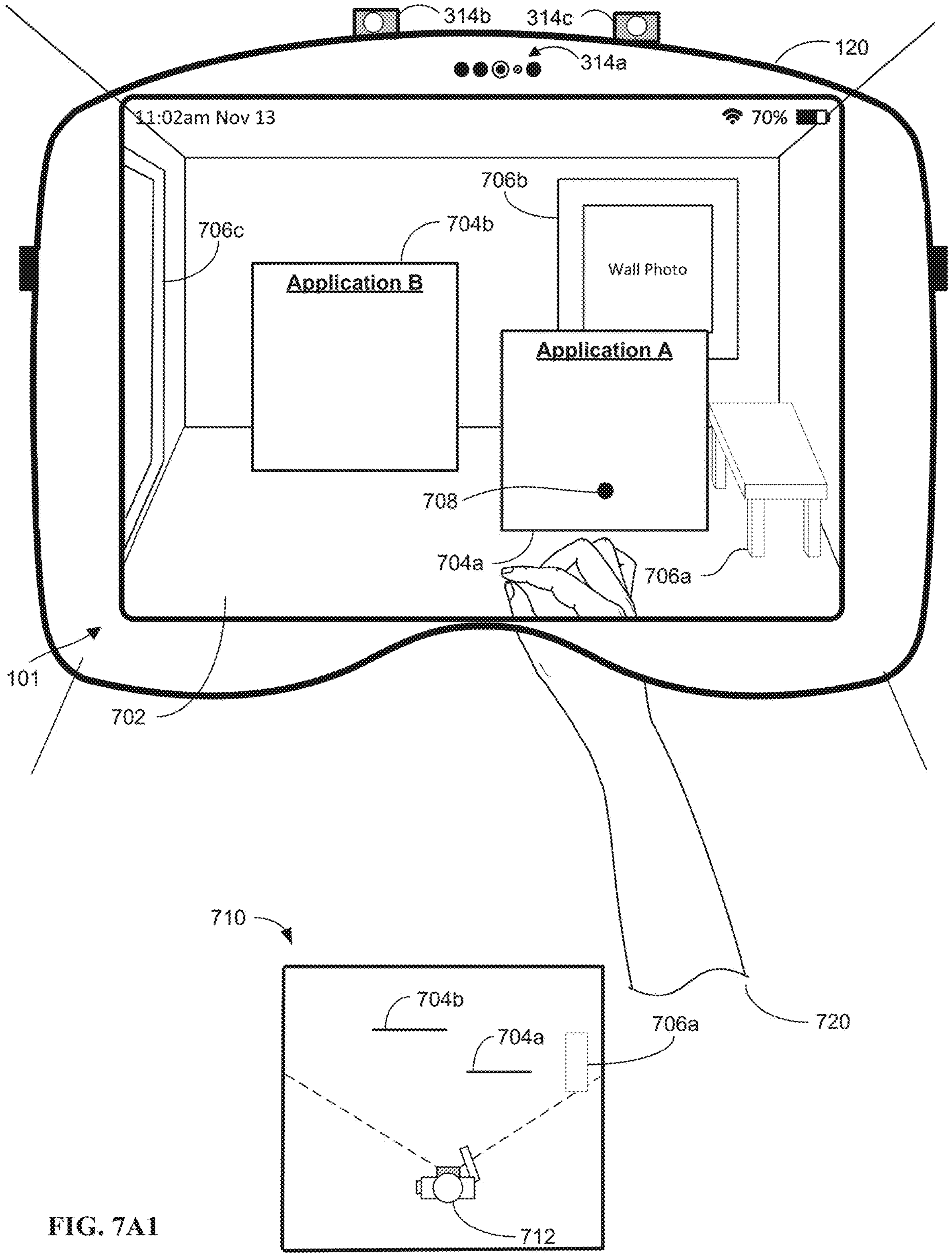
FIG. 7A1

800

900

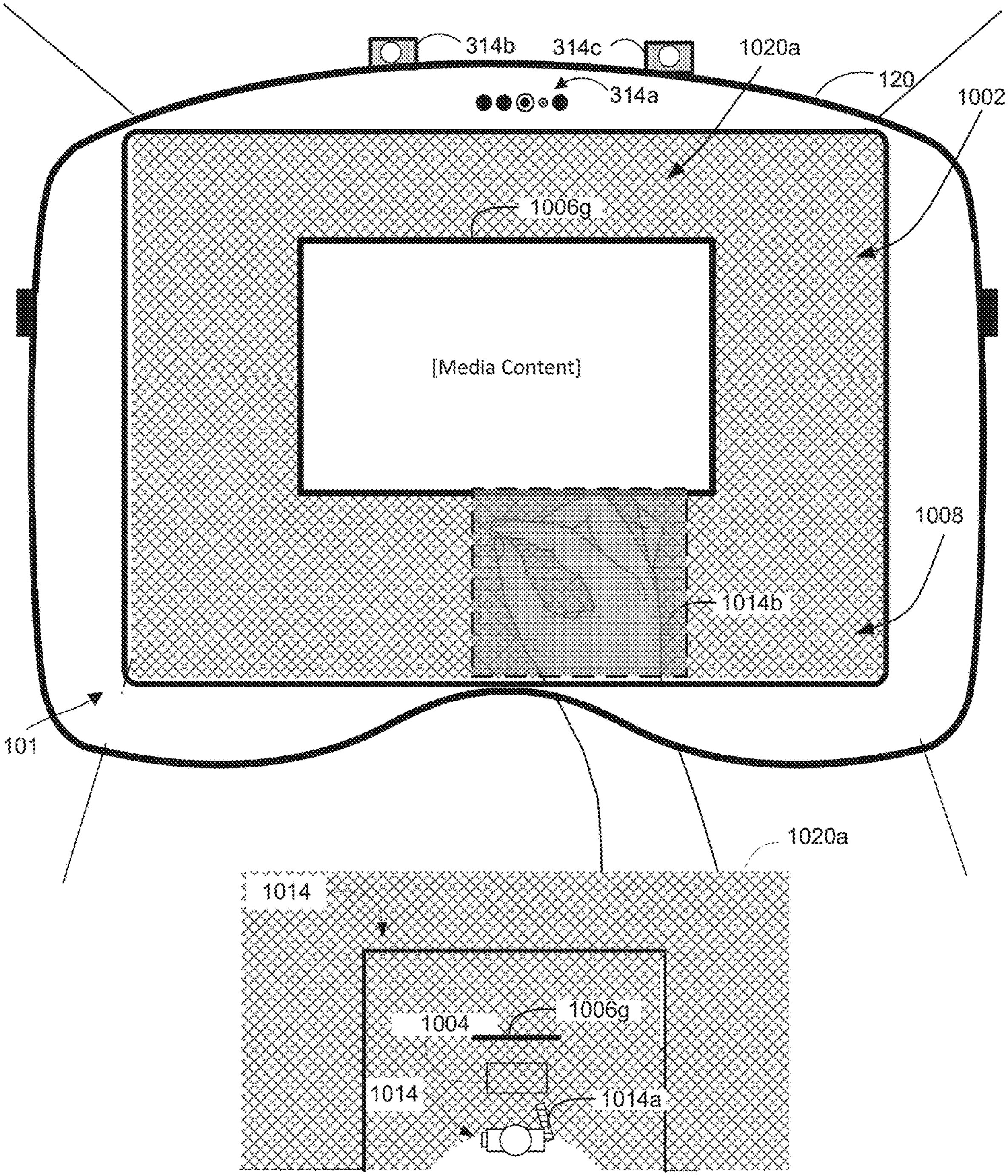
FIG. 10N1

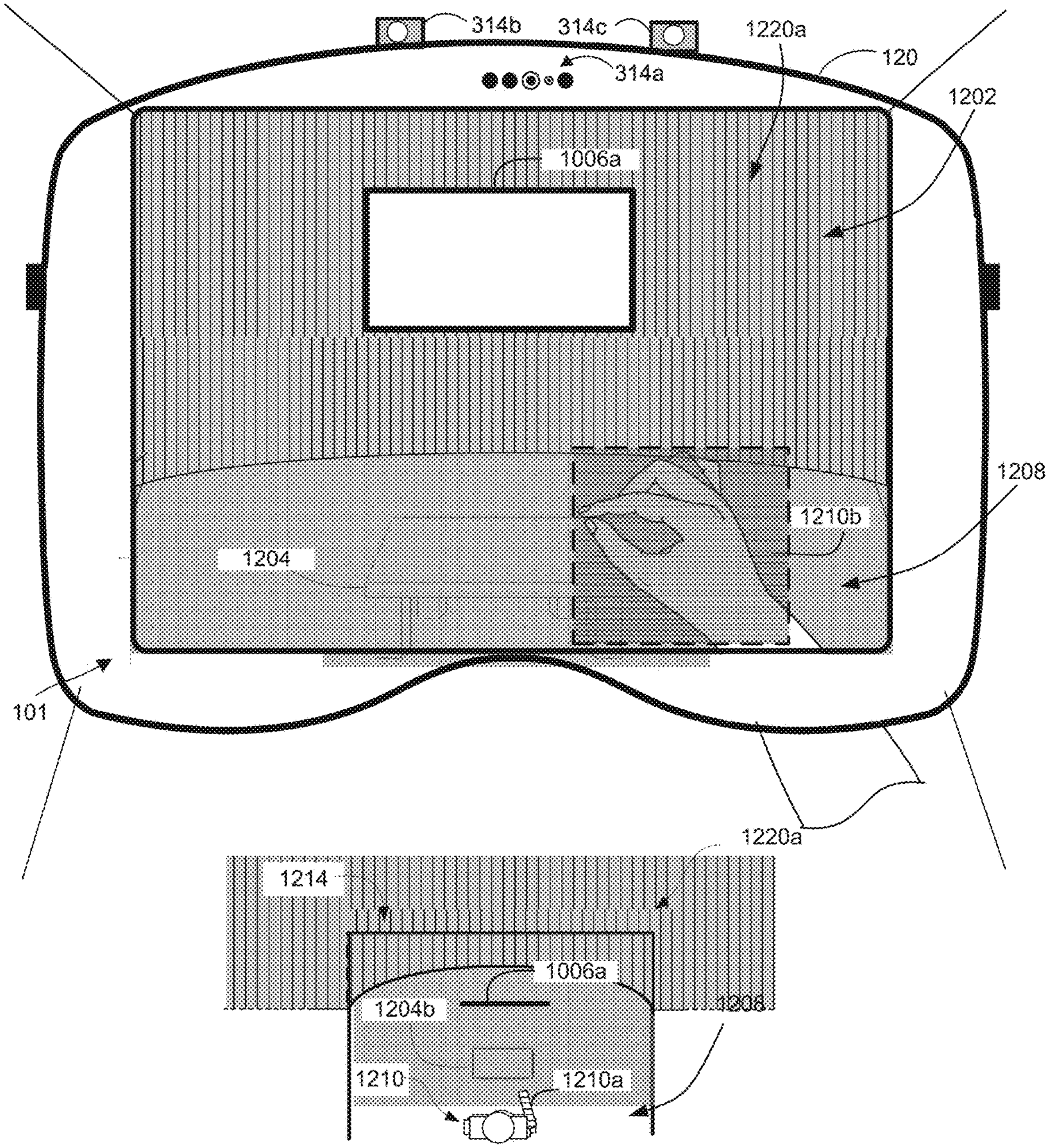
FIG. 12Q1

1300

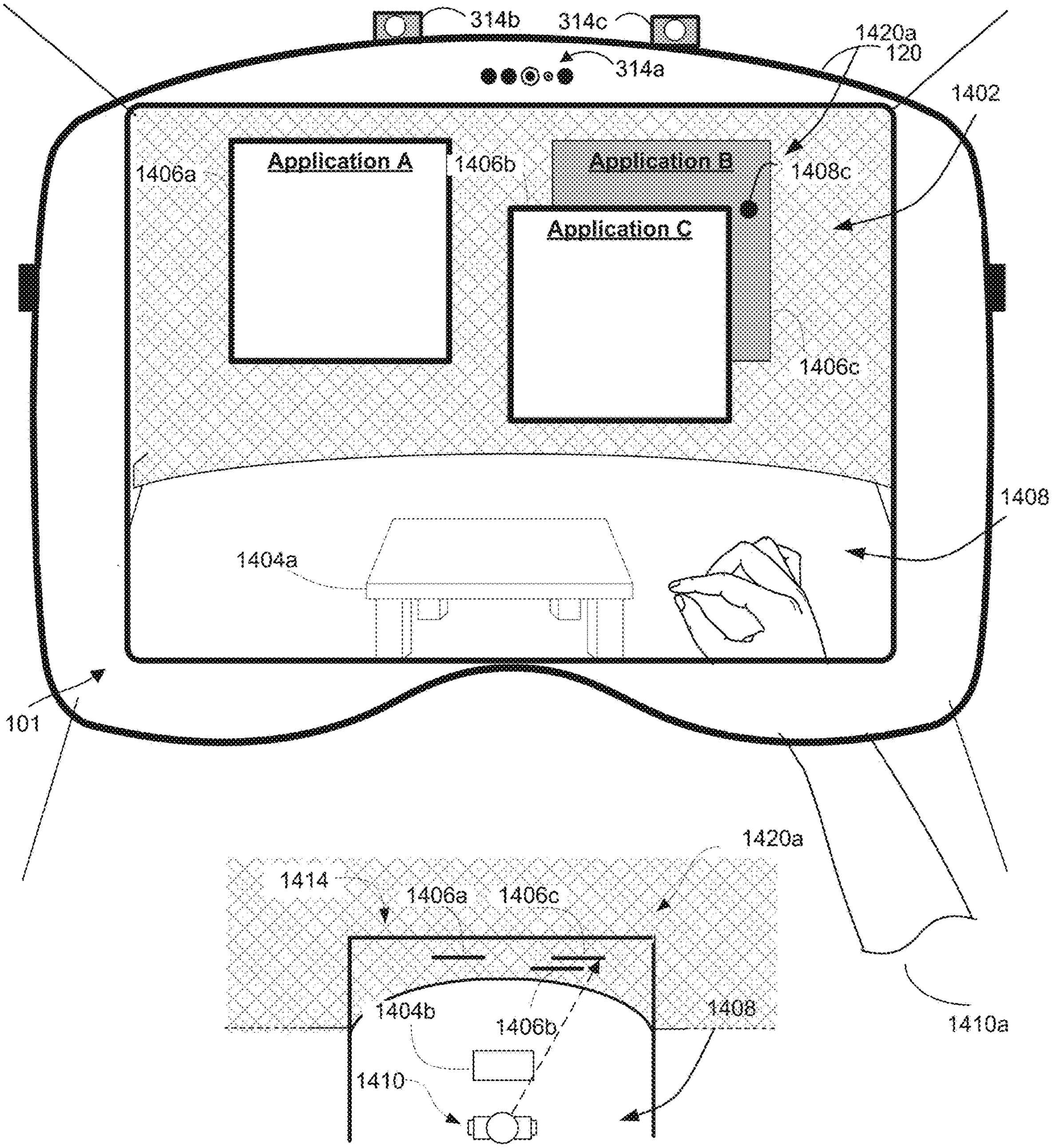
FIG. 14D1

METHODS FOR MANAGING OVERLAPPING WINDOWS AND APPLYING VISUAL EFFECTS

CROSS REFERENCE TO RELATED APPLICATIONS

This application is a continuation of U.S. patent application Ser. No. 18/733,819, filed Jun. 4, 2024, which claims the benefit of U.S. Provisional Application No. 63/587,442, filed Oct. 2, 2023, U.S. Provisional Application No. 63/515,119, filed Jul. 23, 2023, U.S. Provisional Application No. 63/506,128, filed Jun. 4, 2023, and U.S. Provisional Application No. 63/506,109, filed Jun. 4, 2023, the contents of which are herein incorporated by reference in their entireties for all purposes.

TECHNICAL FIELD

This relates generally to computer systems that provide computer-generated experiences, including, but not limited to, electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects, such as digital images, video, text, icons, and control elements such as buttons and other graphics.

SUMMARY

Some methods and interfaces for interacting with environments that include at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious, and error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for providing computer-generated experiences to users that make interaction with the computer systems more efficient and intuitive for a user. Such methods and interfaces optionally complement or replace conventional methods for providing extended reality experiences to users. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has (e.g., includes or is in communication with) a display generation component (e.g., a display device such as a head-mounted device (HMD), a display, a projector, a touch-sensitive display (also known as a "touch screen" or "touch-screen display"), or other device or component that presents visual content to a user, for example on or in the display generation component itself or produced from the display generation component and visible elsewhere). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for interacting with a three-dimensional environment. Such methods and interfaces may complement or replace conventional methods for interacting with a three-dimensional environment. Such methods and interfaces reduce the number, extent, and/or the nature of the inputs from a user and produce a more efficient human-machine interface. For battery-operated computing devices, such methods and interfaces conserve power and increase the time between battery charges.

In some embodiments, a computer system changes a visual prominence of a respective virtual object in response to detecting a threshold amount of overlap between a first virtual object and a second virtual object. In some embodiments, a computer system changes a visual prominence of a respective virtual object based on a change in spatial location of a first virtual object with respect to a second virtual object. In some embodiments, a computer system applies a visual effect to a real-world object in response to detecting a passthrough visibility event (e.g., an event in which the real-world object becomes visible via the computer system). In some embodiments, a computer system applies a visual effect to a background based on the state of the background. In some embodiments, a computer system applies a visual effect associated with a virtual object based on a state of the virtual object. In some embodiments, a computer system changes a visual prominence of a virtual object relative to a three-dimensional environment based on display of overlapping objects of different types in the three-dimensional environment. In some embodiments, a computer system changes a level of opacity of a first virtual object overlapping a second virtual object in response to movement of the first virtual object.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 12A-12Q1 illustrate examples of applying a visual effect to a background.

DESCRIPTION OF EMBODIMENTS

The present disclosure relates to user interfaces for providing an extended reality (XR) experience to a user, in accordance with some embodiments.

The systems, methods, and GUIs described herein improve user interface interactions with virtual/augmented reality environments in multiple ways.

In some embodiments, a computer system changes a visual prominence of a respective virtual object in a three-dimensional environment in response to detecting that at least a portion of a first virtual object overlaps a second virtual object by more than a threshold amount from a current viewpoint of a user.

In some embodiments, a computer system reduces a visual prominence of a portion of a respective virtual object and changes the visual prominence of the portion of the respective virtual object based on a change in a spatial location of a first virtual object with respect to a second virtual object during movement of the first virtual object in a three-dimensional environment.

In some embodiments, a computer system applies a visual effect, such as a dimming effect or tinting effect, to a real-world object in response to detecting a passthrough visibility event in which the real-world object becomes visible in a three-dimensional environment presented by the computer system.

In some embodiments, while displaying virtual content in a three-dimensional environment and while a background is visible in the three-dimensional environment (e.g., a background that optionally includes a virtual environment and/or a representation of a physical environment), a computer system applies (or forgoes applying) a visual effect to the background based on a state of the background, such as a state associated with a time-of-day setting.

In some embodiments, a computer system applies (or forgoes applying) a visual effect associated with a virtual object (e.g., a virtual application window) based on whether the virtual object is in an active state or is not in an active state.

In some embodiments, a computer system changes a visual prominence, such as changing a brightness of and/or a translucency of, a virtual object in response to detecting an event that causes a user interface element to be displayed overlapping the virtual object in a three-dimensional environment.

In some embodiments, a computer system changes a level of opacity of a first virtual object overlapping a second virtual object in response to movement of the first virtual object.

Figure 8:
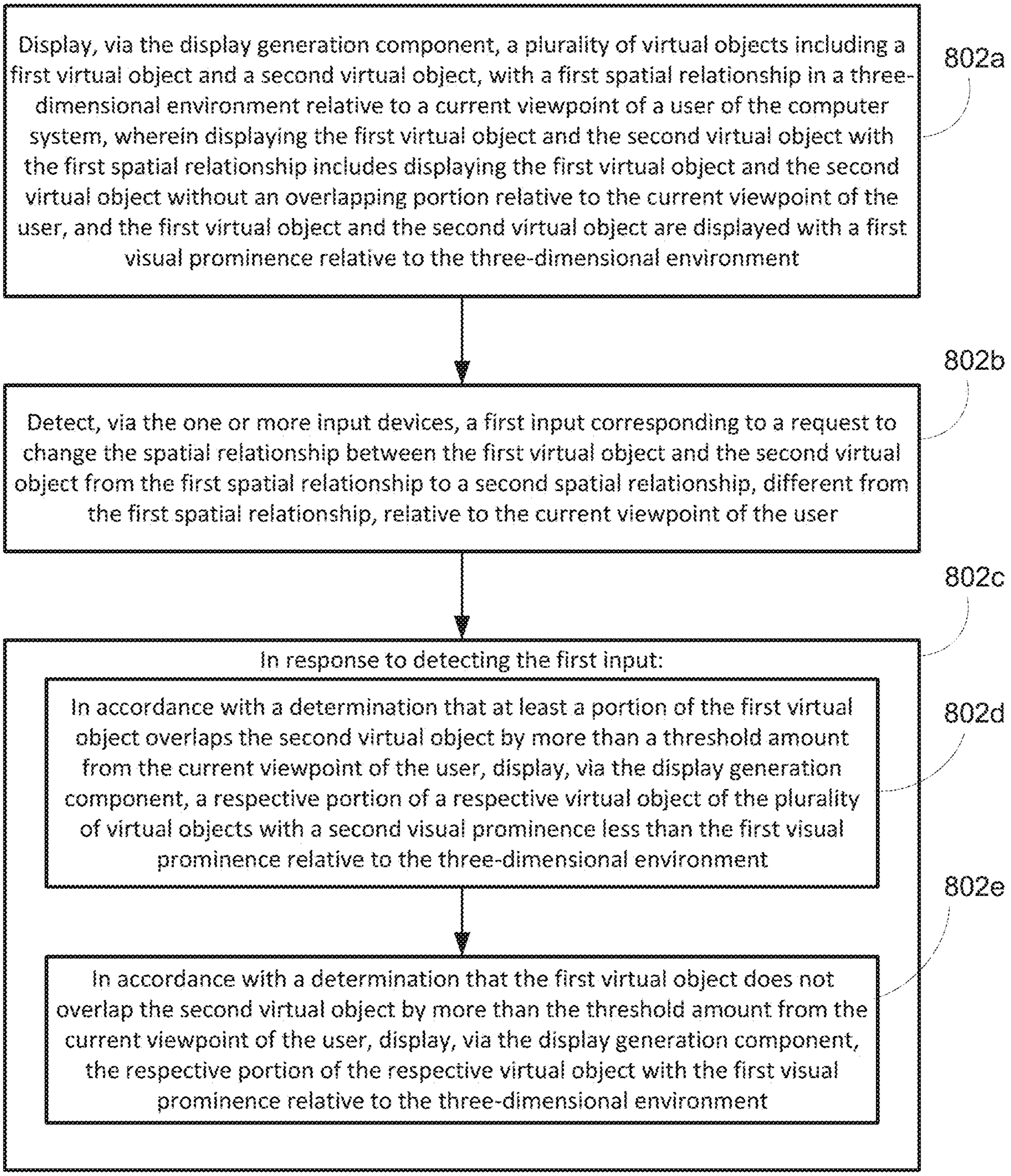
FIG. 8 is a flowchart illustrating an exemplary method of changing a visual prominence of a respective virtual object in response to a threshold amount of overlap between a first virtual object and a second virtual object.
Figure 9:
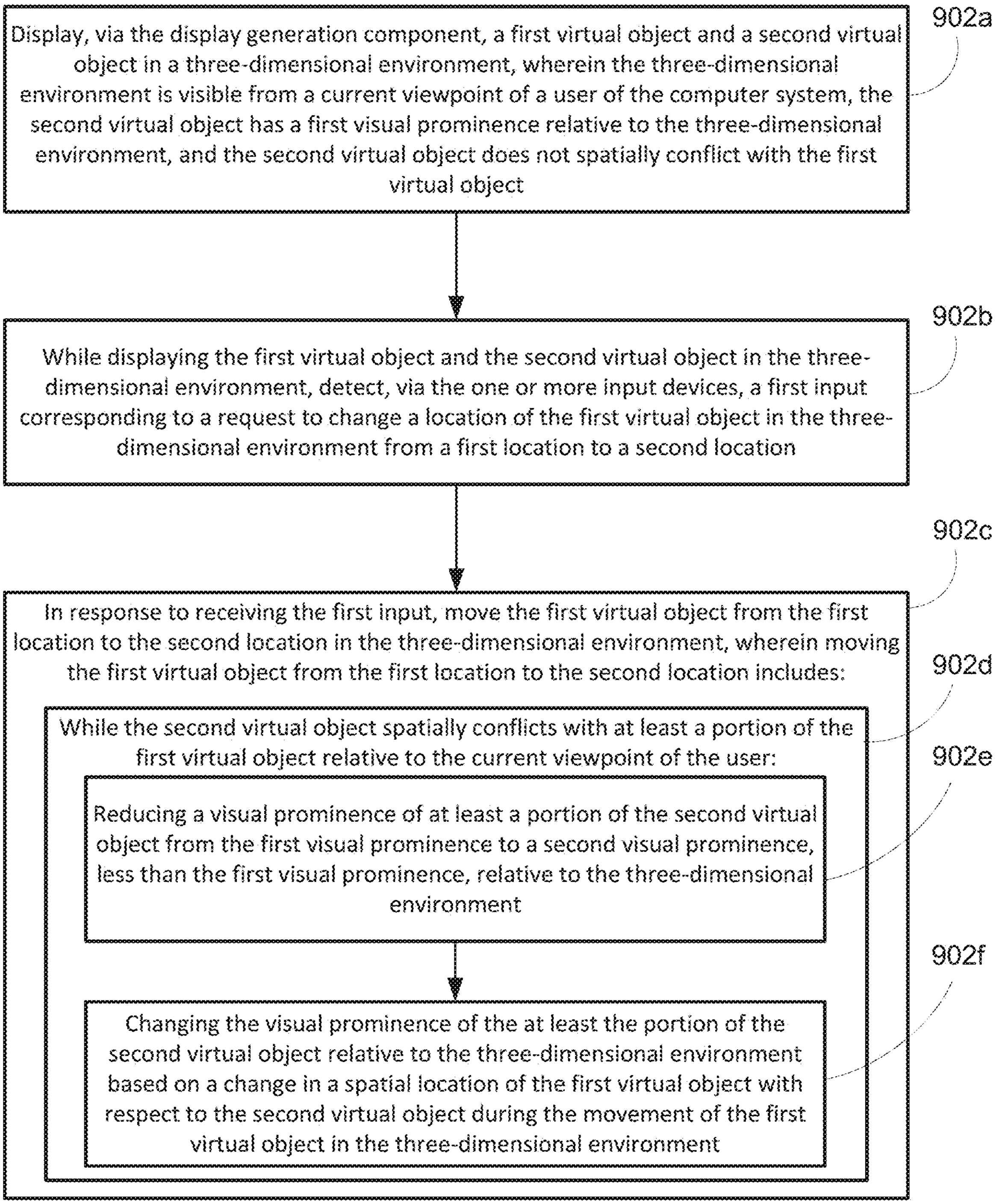
FIG. 9 is a flowchart illustrating an exemplary method of changing a visual prominence of a respective virtual object based on a change in spatial location of a first virtual object with respect to a second virtual object.
Figure 10A:
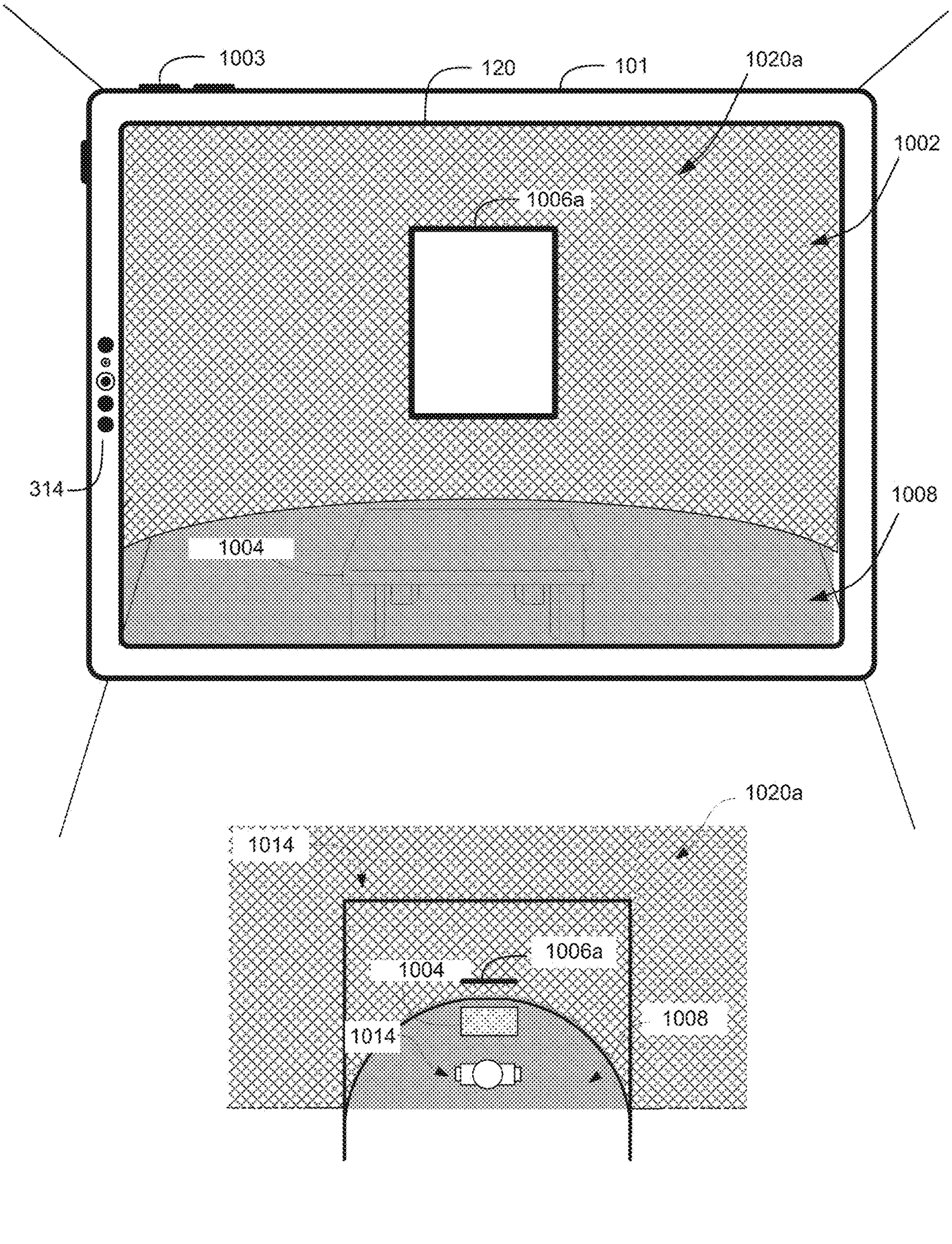
Figure 11:
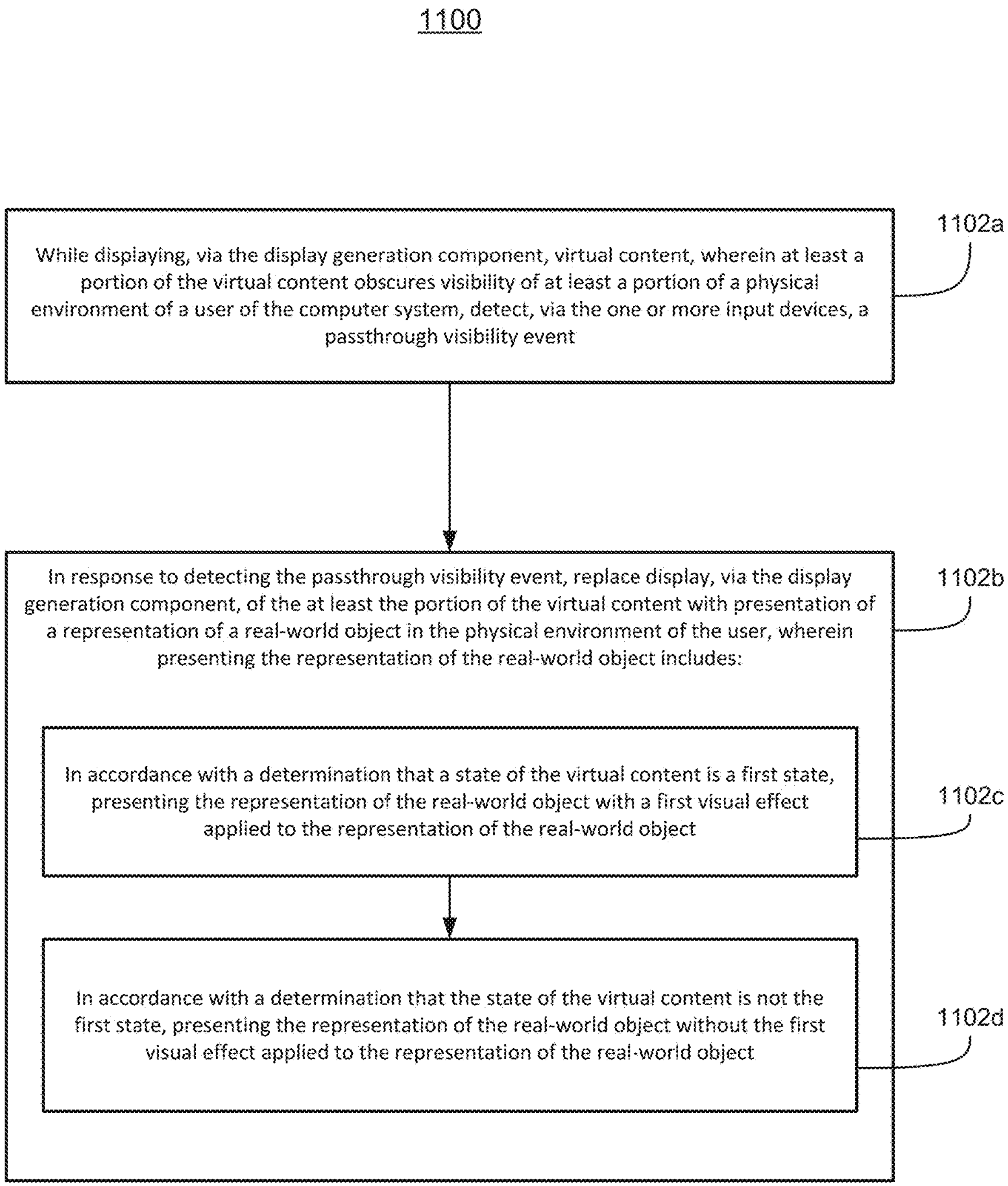
FIG. 11 is a flowchart illustrating an exemplary method of applying a visual effect to a real-world object.
Figure 12A:
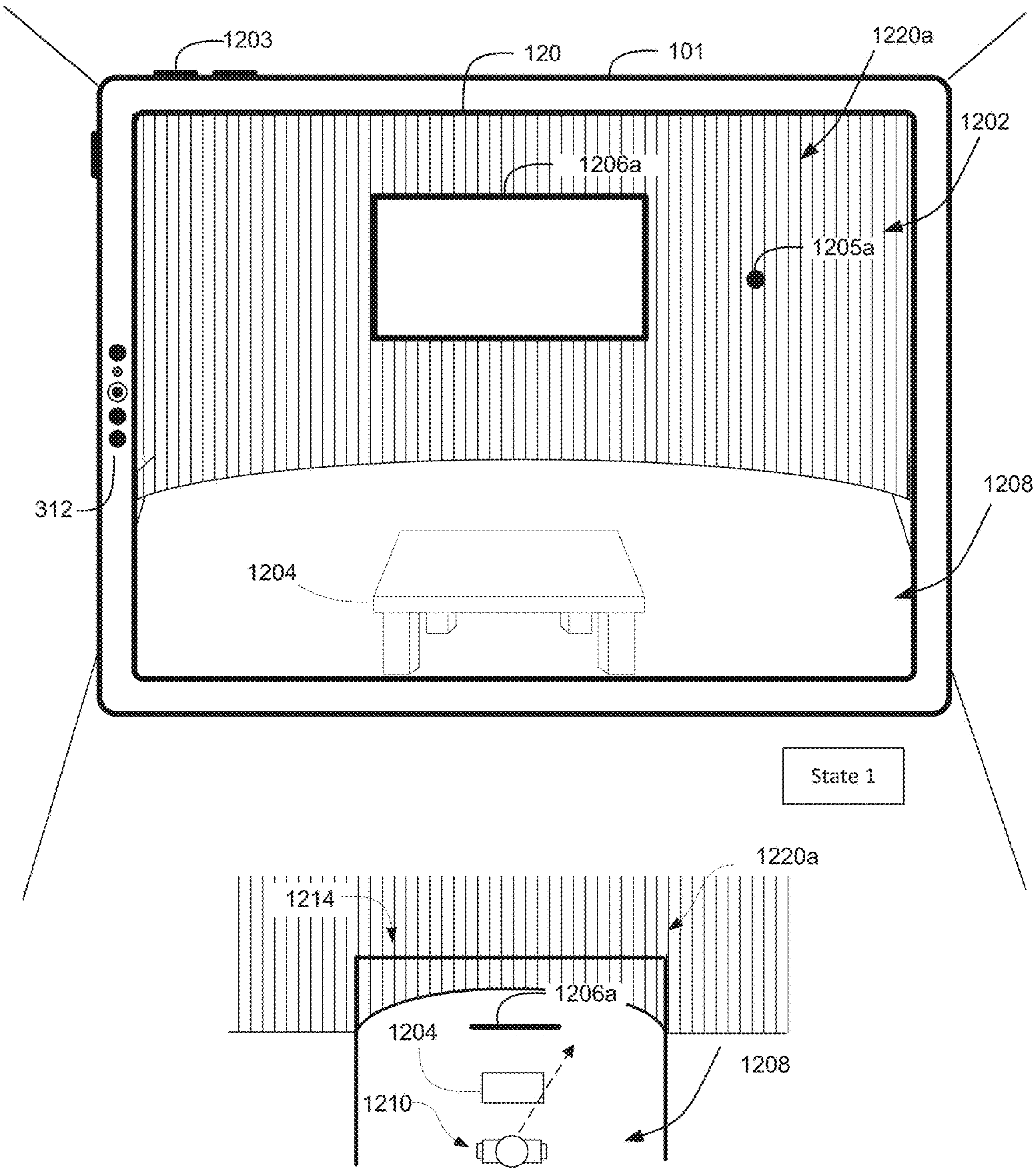
Figure 12Q:
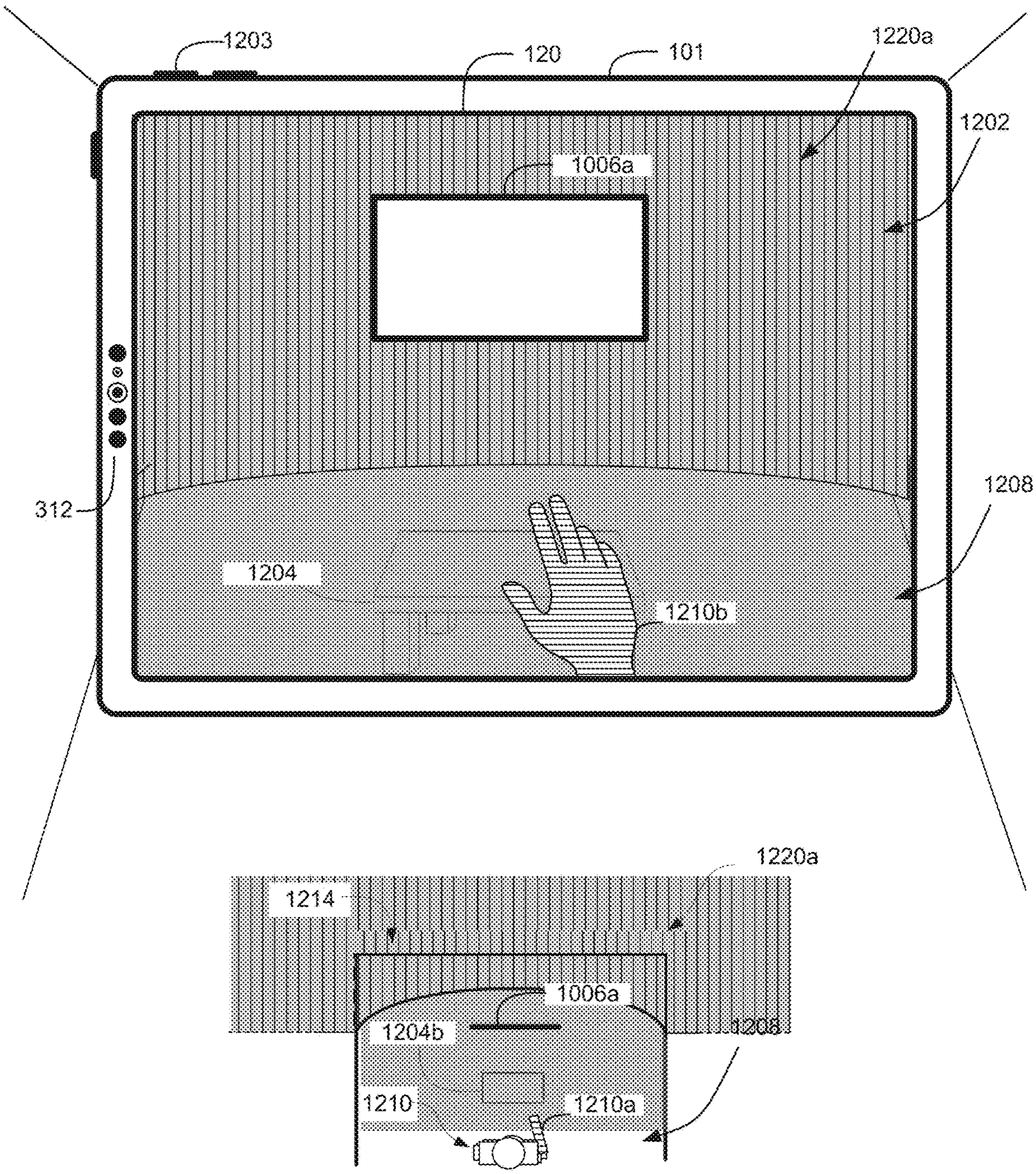
Figure 13:
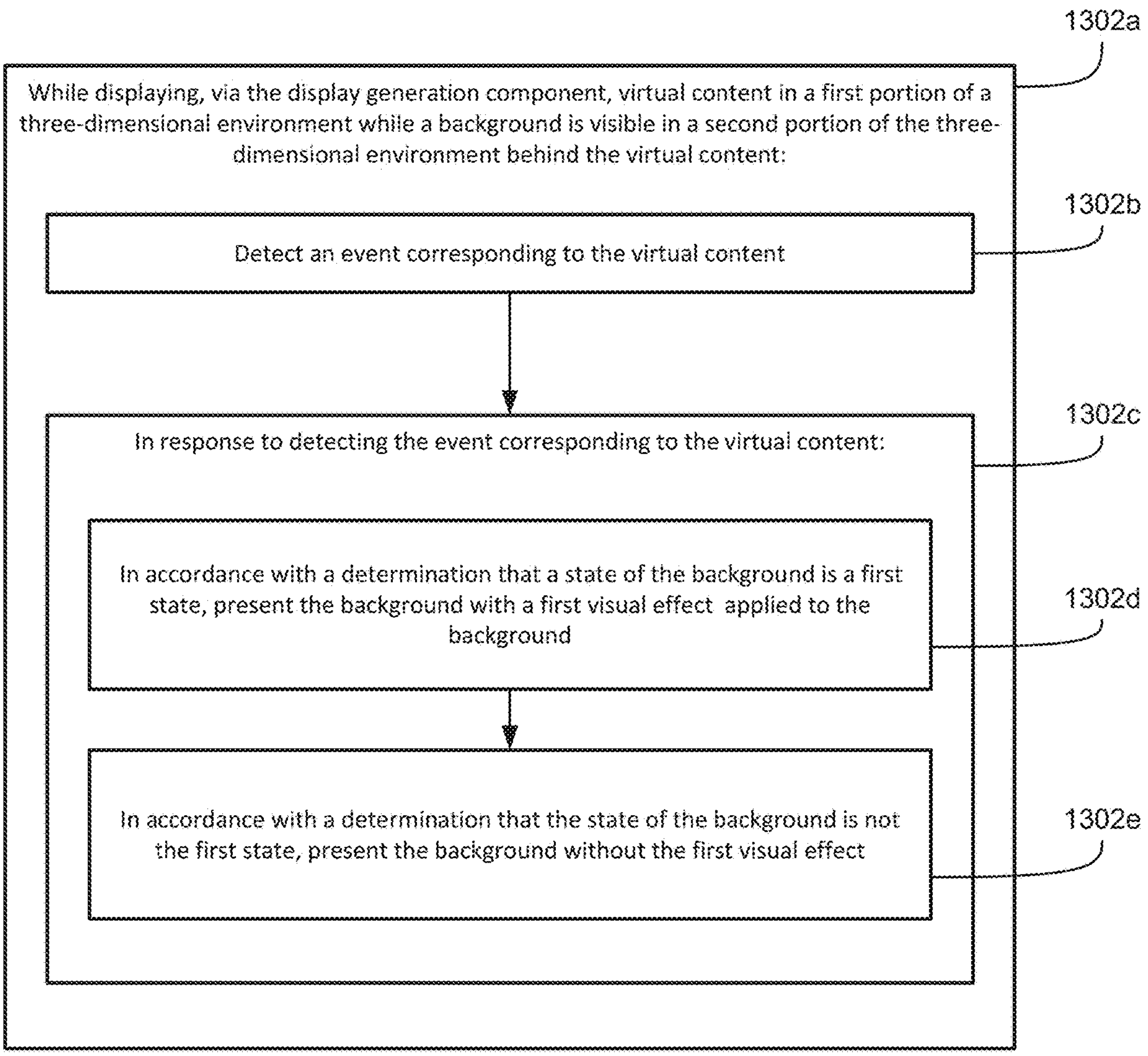
FIG. 13 is a flowchart illustrating an exemplary method of applying a visual effect to a background.
Figure 17:
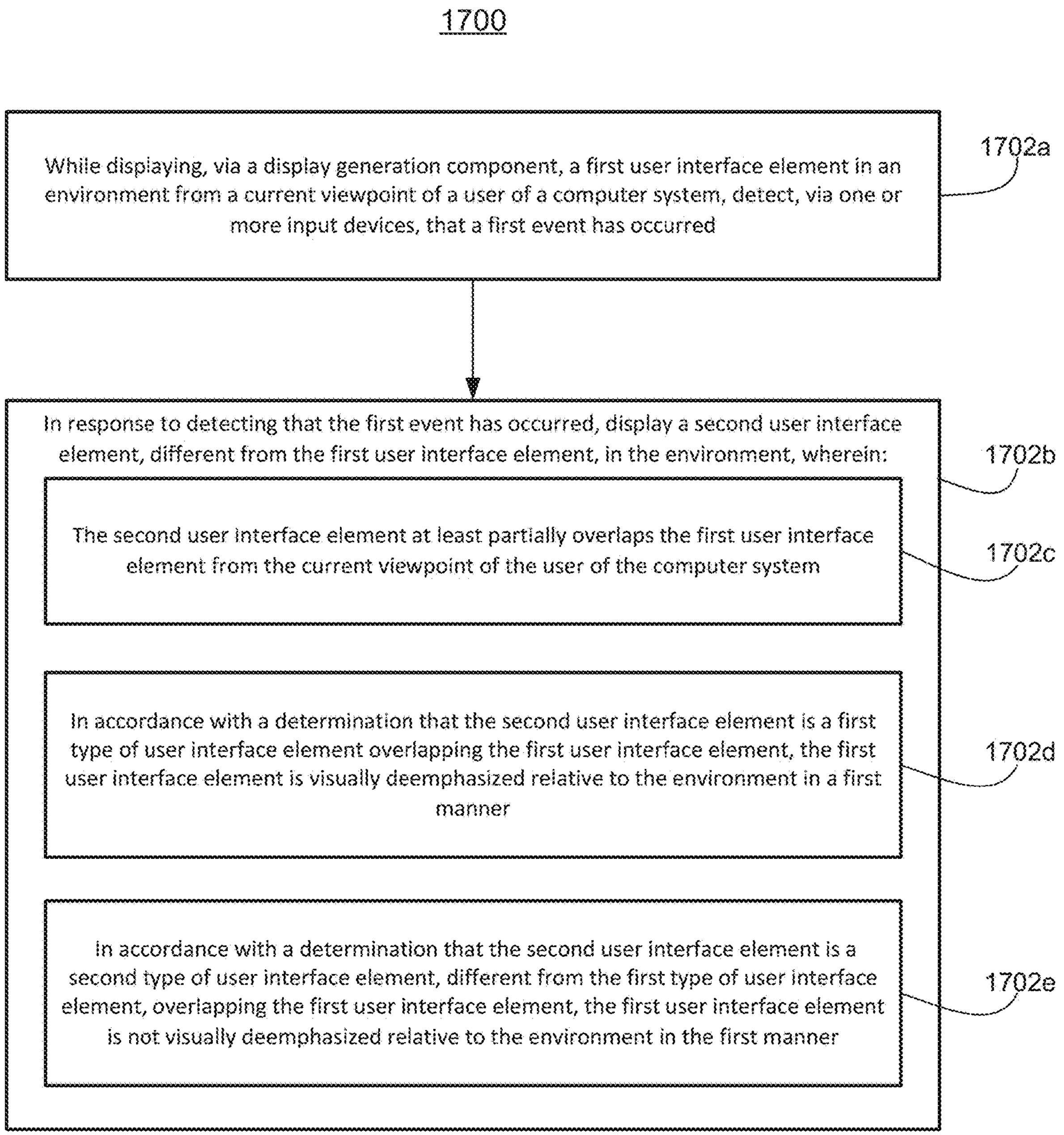
FIG. 17 is a flowchart illustrating a method of changing a visual prominence of a virtual object based on display of overlapping objects of different types in accordance with some embodiments.
Figure 18A:
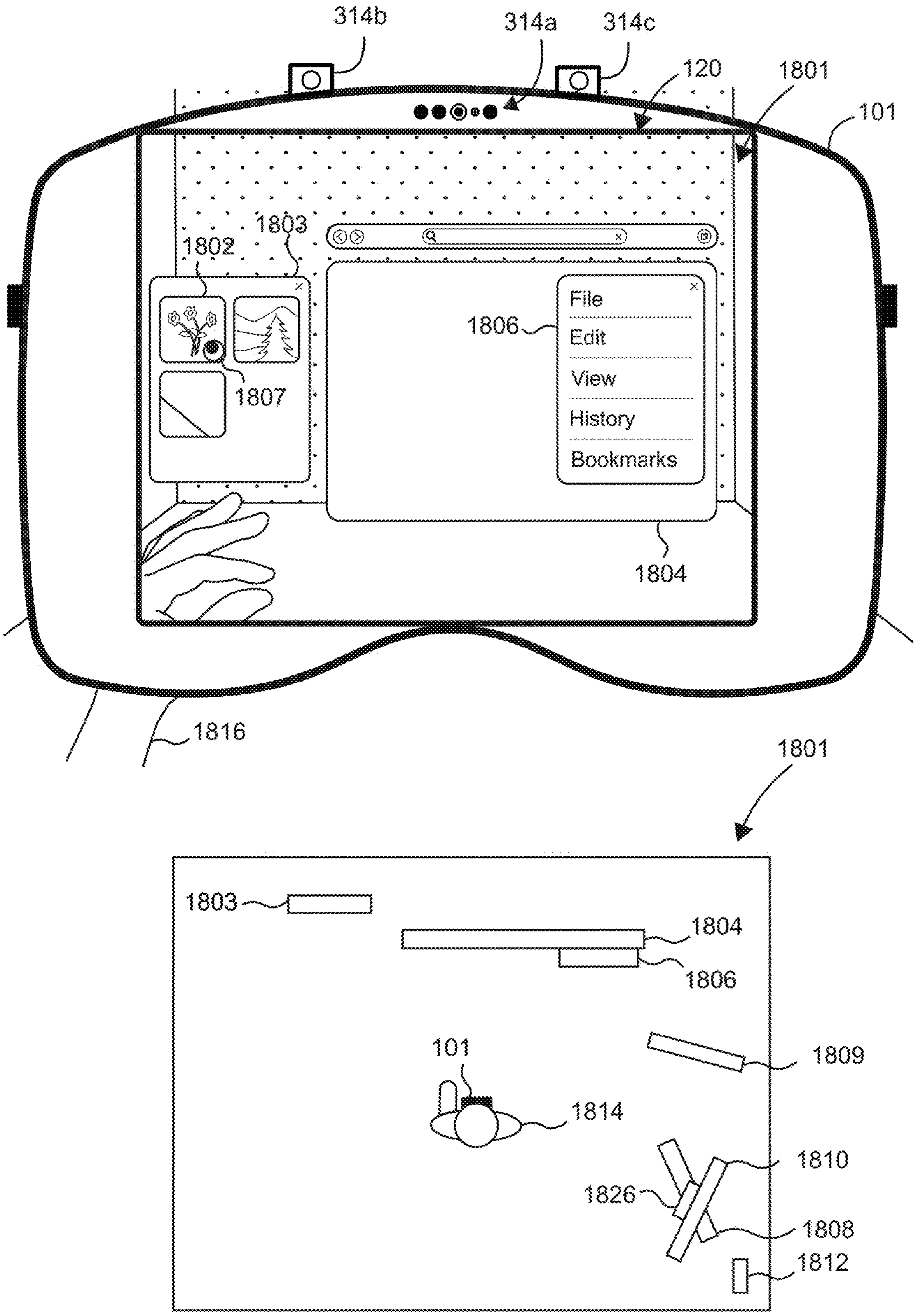
FIGS. 18A-18T illustrate examples of a computer system changing a visual prominence of a virtual object to resolve a simulated overlapping with another virtual object in accordance with some embodiments.

FIGS. 1A-6 provide a description of example computer systems for providing XR experiences to users (such as described below with respect to methods 800, 900, 1100, 1300, and/or 1500). FIGS. 7A-7EE illustrate examples of a computer system changing a visual prominence of a respective virtual object relative to a three-dimensional environment in accordance with some embodiments. FIG. 8 is a flowchart illustrating an exemplary method of changing a visual prominence of a respective virtual object relative to a three-dimensional environment in response to detecting a threshold amount of overlap between a first virtual object and a second virtual object in a three-dimensional environment in accordance with some embodiments. The user interfaces in FIGS. 7A-7EE are used to illustrate the processes in FIG. 8. FIG. 9 is a flowchart illustrating a method of changing a visual prominence of a respective virtual object based on a change in spatial location of a first virtual object with respect to a second virtual object in a three-dimensional environment in accordance with some embodiments. The user interfaces in FIGS. 7A-7EE are used to illustrate the processes in FIG. 9. FIGS. 10A-10N illustrate example techniques for applying a visual effect to a real-world object in accordance with some embodiments. FIG. 11 is a flow diagram of methods of applying a visual effect to a real-world object in accordance with various embodiments. The user interfaces in FIGS. 10A-10F are used to illustrate the processes in FIG. 11. FIGS. 12A-12Q illustrate example techniques for applying a visual effect to a background in accordance with some embodiments. FIG. 13 is a flow diagram of methods of applying a visual effect to a background in accordance with various embodiments. The user interfaces in FIGS. 12A-12Q are used to illustrate the processes in FIG. 13. FIGS. 14A-14K illustrate example techniques for applying a visual effect based on a state of a virtual object in accordance with some embodiments. FIG. 15 is a flow diagram of methods of applying a visual effect based on a state of a virtual object in accordance with various embodiments. The user interfaces in FIGS. 14A-14K are used to illustrate the processes in FIG. 15. FIGS. 16A-16K illustrate example techniques for changing a visual prominence of a virtual object based on display of overlapping objects of different types in a three-dimensional environment in accordance with various embodiments. FIG. 17 is a flow diagram of methods of changing a visual prominence of a virtual object based on display of overlapping object of different types in a three-dimensional environment in accordance with various embodiments, the user interfaces in FIGS. 16A-16K are used to illustrate the processes in FIG. 17. FIGS. 18A-18T illustrate example techniques for a computer system changing a visual prominence of a virtual object to resolve a simulated overlapping with another virtual object in accordance with some embodiments. FIG. 19 is a flow diagram illustrating methods of changing a visual prominence of a virtual object to resolve a simulated overlapping with another virtual object in accordance with some embodiments. The user interfaces in FIGS. 18A-18T are used to illustrate the processes in FIG. 19.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, providing a more varied, detailed, and/or realistic user experience while saving storage space, and/or additional techniques. These techniques also reduce power usage and improve battery life of the device by enabling the user to use the device more quickly and efficiently. Saving on battery power, and thus weight, improves the ergonomics of the device. These techniques also enable real-time communication, allow for the use of fewer and/or less-precise sensors resulting in a more compact, lighter, and cheaper device, and enable the device to be used in a variety of lighting conditions. These techniques reduce energy usage, thereby reducing heat emitted by the device, which is particularly important for a wearable device where a device well within operational parameters for device components can become uncomfortable for a user to wear if it is producing too much heat.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Figure 1A:
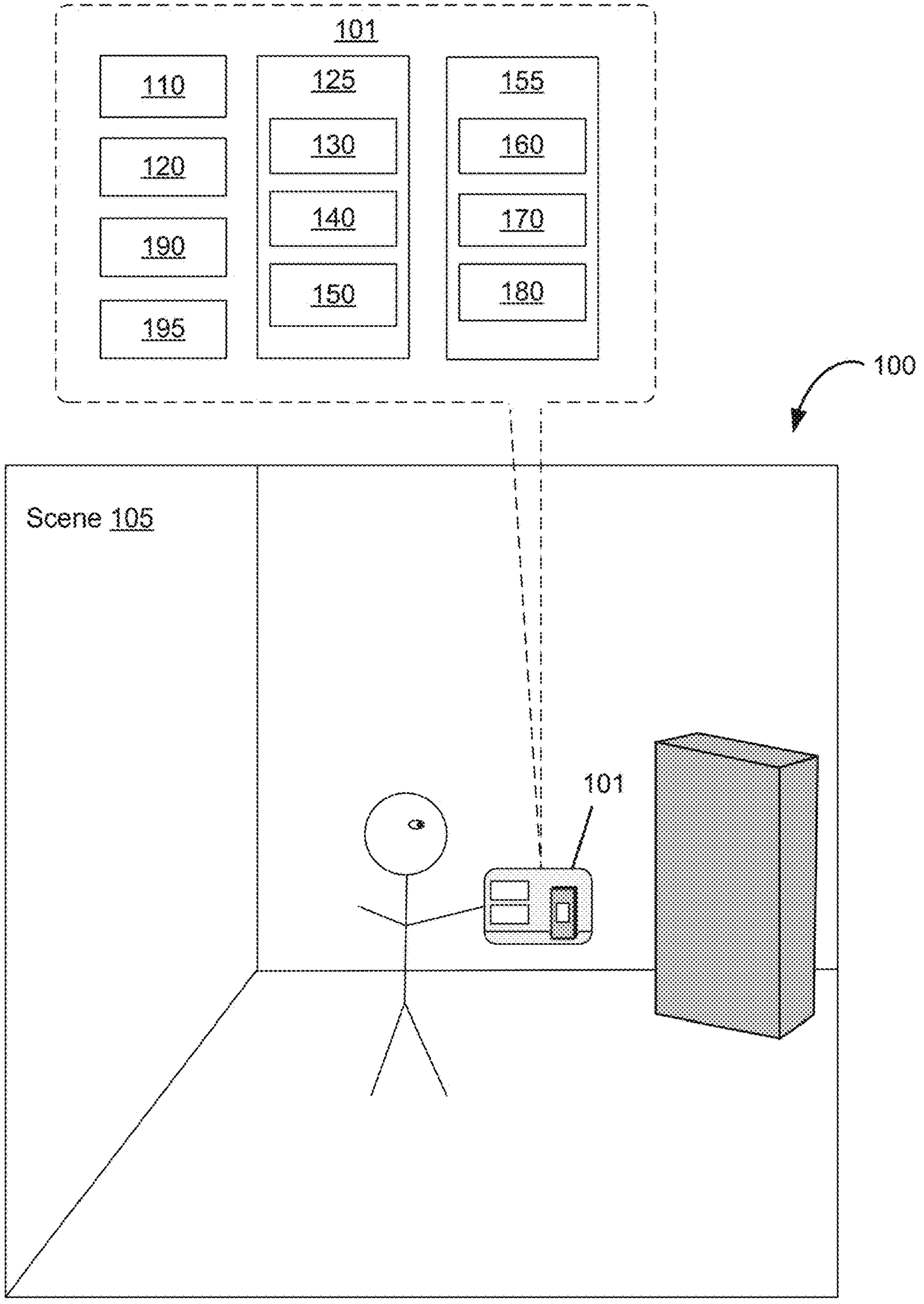
FIG. 1A is a block diagram illustrating an operating environment of a computer system for providing XR experiences in accordance with some embodiments.

In some embodiments, as shown in FIG. 1A, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing an XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands). A person may sense and/or interact with a XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

In an augmented reality, mixed reality, or virtual reality environment, a view of a three-dimensional environment is visible to a user. The view of the three-dimensional environment is typically visible to the user via one or more display generation components (e.g., a display or a pair of display modules that provide stereoscopic content to different eyes of the same user) through a virtual viewport that has a viewport boundary that defines an extent of the three-dimensional environment that is visible to the user via the one or more display generation components. In some embodiments, the region defined by the viewport boundary is smaller than a range of vision of the user in one or more dimensions (e.g., based on the range of vision of the user, size, optical properties or other physical characteristics of the one or more display generation components, and/or the location and/or orientation of the one or more display generation components relative to the eyes of the user). In some embodiments, the region defined by the viewport boundary is larger than a range of vision of the user in one or more dimensions (e.g., based on the range of vision of the user, size, optical properties or other physical characteristics of the one or more display generation components, and/or the location and/or orientation of the one or more display generation components relative to the eyes of the user). The viewport and viewport boundary typically move as the one or more display generation components move (e.g., moving with a head of the user for a head mounted device or moving with a hand of a user for a handheld device such as a tablet or smartphone). A viewpoint of a user determines what content is visible in the viewport, a viewpoint generally specifies a location and a direction relative to the three-dimensional environment, and as the viewpoint shifts, the view of the three-dimensional environment will also shift in the viewport. For a head mounted device, a viewpoint is typically based on a location an direction of the head, face, and/or eyes of a user to provide a view of the three-dimensional environment that is perceptually accurate and provides an immersive experience when the user is using the head-mounted device. For a handheld or stationed device, the viewpoint shifts as the handheld or stationed device is moved and/or as a position of a user relative to the handheld or stationed device changes (e.g., a user moving toward, away from, up, down, to the right, and/or to the left of the device). For devices that include display generation components with virtual passthrough, portions of the physical environment that are visible (e.g., displayed, and/or projected) via the one or more display generation components are based on a field of view of one or more cameras in communication with the display generation components which typically move with the display generation components (e.g., moving with a head of the user for a head mounted device or moving with a hand of a user for a handheld device such as a tablet or smartphone) because the viewpoint of the user moves as the field of view of the one or more cameras moves (and the appearance of one or more virtual objects displayed via the one or more display generation components is updated based on the viewpoint of the user (e.g., displayed positions and poses of the virtual objects are updated based on the movement of the viewpoint of the user)). For display generation components with optical passthrough, portions of the physical environment that are visible (e.g., optically visible through one or more partially or fully transparent portions of the display generation component) via the one or more display generation components are based on a field of view of a user through the partially or fully transparent portion(s) of the display generation component (e.g., moving with a head of the user for a head mounted device or moving with a hand of a user for a handheld device such as a tablet or smartphone) because the viewpoint of the user moves as the field of view of the user through the partially or fully transparent portions of the display generation components moves (and the appearance of one or more virtual objects is updated based on the viewpoint of the user).

In some embodiments a representation of a physical environment (e.g., displayed via virtual passthrough or optical passthrough) can be partially or fully obscured by a virtual environment. In some embodiments, the amount of virtual environment that is displayed (e.g., the amount of physical environment that is not displayed) is based on an immersion level for the virtual environment (e.g., with respect to the representation of the physical environment). For example, increasing the immersion level optionally causes more of the virtual environment to be displayed, replacing and/or obscuring more of the physical environment, and reducing the immersion level optionally causes less of the virtual environment to be displayed, revealing portions of the physical environment that were previously not displayed and/or obscured. In some embodiments, at a particular immersion level, one or more first background objects (e.g., in the representation of the physical environment) are visually de-emphasized (e.g., dimmed, blurred, and/or displayed with increased transparency) more than one or more second background objects, and one or more third background objects cease to be displayed. In some embodiments, a level of immersion includes an associated degree to which the virtual content displayed by the computer system (e.g., the virtual environment and/or the virtual content) obscures background content (e.g., content other than the virtual environment and/or the virtual content) around/behind the virtual content, optionally including the number of items of background content displayed and/or the visual characteristics (e.g., colors, contrast, and/or opacity) with which the background content is displayed, the angular range of the virtual content displayed via the display generation component (e.g., 60 degrees of content displayed at low immersion, 120 degrees of content displayed at medium immersion, or 180 degrees of content displayed at high immersion), and/or the proportion of the field of view displayed via the display generation component that is consumed by the virtual content (e.g., 33% of the field of view consumed by the virtual content at low immersion, 66% of the field of view consumed by the virtual content at medium immersion, or 100% of the field of view consumed by the virtual content at high immersion). In some embodiments, the background content is included in a background over which the virtual content is displayed (e.g., background content in the representation of the physical environment).

In some embodiments, the background content includes user interfaces (e.g., user interfaces generated by the computer system corresponding to applications), virtual objects (e.g., files or representations of other users generated by the computer system) not associated with or included in the virtual environment and/or virtual content, and/or real objects (e.g., pass-through objects representing real objects in the physical environment around the user that are visible such that they are displayed via the display generation component and/or a visible via a transparent or translucent component of the display generation component because the computer system does not obscure/prevent visibility of them through the display generation component). In some embodiments, at a low level of immersion (e.g., a first level of immersion), the background, virtual and/or real objects are displayed in an unobscured manner. For example, a virtual environment with a low level of immersion is optionally displayed concurrently with the background content, which is optionally displayed with full brightness, color, and/or translucency. In some embodiments, at a higher level of immersion (e.g., a second level of immersion higher than the first level of immersion), the background, virtual and/or real objects are displayed in an obscured manner (e.g., dimmed, blurred, or removed from display). For example, a respective virtual environment with a high level of immersion is displayed without concurrently displaying the background content (e.g., in a full screen or fully immersive mode). As another example, a virtual environment displayed with a medium level of immersion is displayed concurrently with darkened, blurred, or otherwise de-emphasized background content. In some embodiments, the visual characteristics of the background objects vary among the background objects. For example, at a particular immersion level, one or more first background objects are visually de-emphasized (e.g., dimmed, blurred, and/or displayed with increased transparency) more than one or more second background objects, and one or more third background objects cease to be displayed. In some embodiments, a null or zero level of immersion corresponds to the virtual environment ceasing to be displayed and instead a representation of a physical environment is displayed (optionally with one or more virtual objects such as application, windows, or virtual three-dimensional objects) without the representation of the physical environment being obscured by the virtual environment. Adjusting the level of immersion using a physical input element provides for quick and efficient method of adjusting immersion, which enhances the operability of the computer system and makes the user-device interface more efficient.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides an XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1A, those of ordinary skill in the art will appreciate from the present disclosure that various other features have not been illustrated for the sake of brevity and so as not to obscure more pertinent aspects of the example embodiments disclosed herein.

Figure 1B:
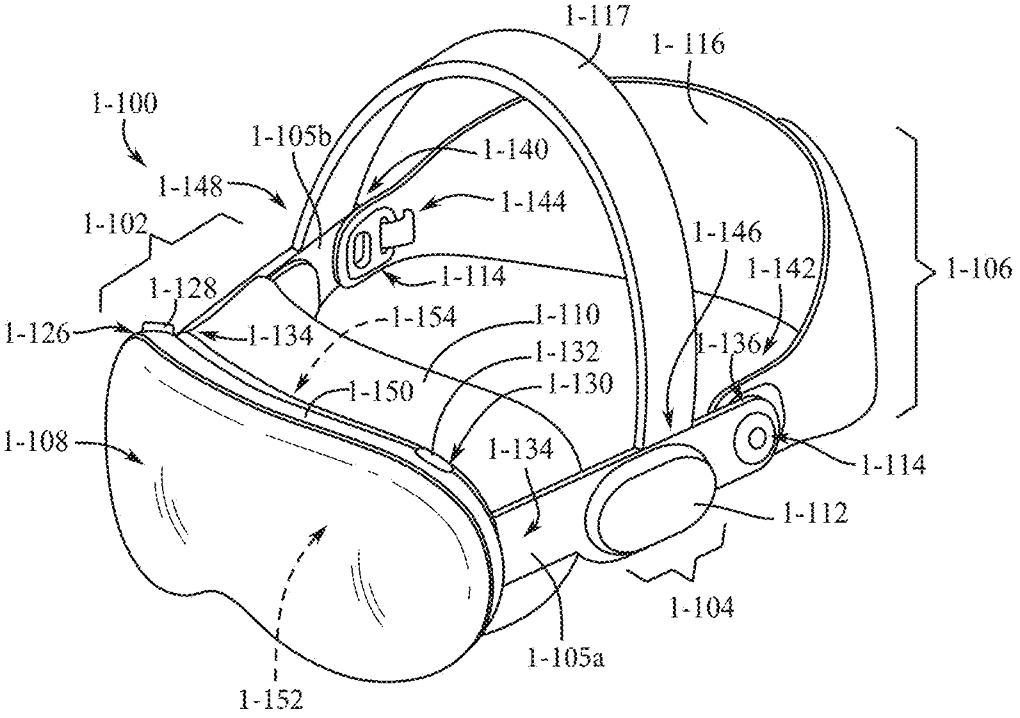
FIGS. 1B-1P are examples of a computer system for providing XR experiences in the operating environment of FIG. 1A.
Figure 1C:
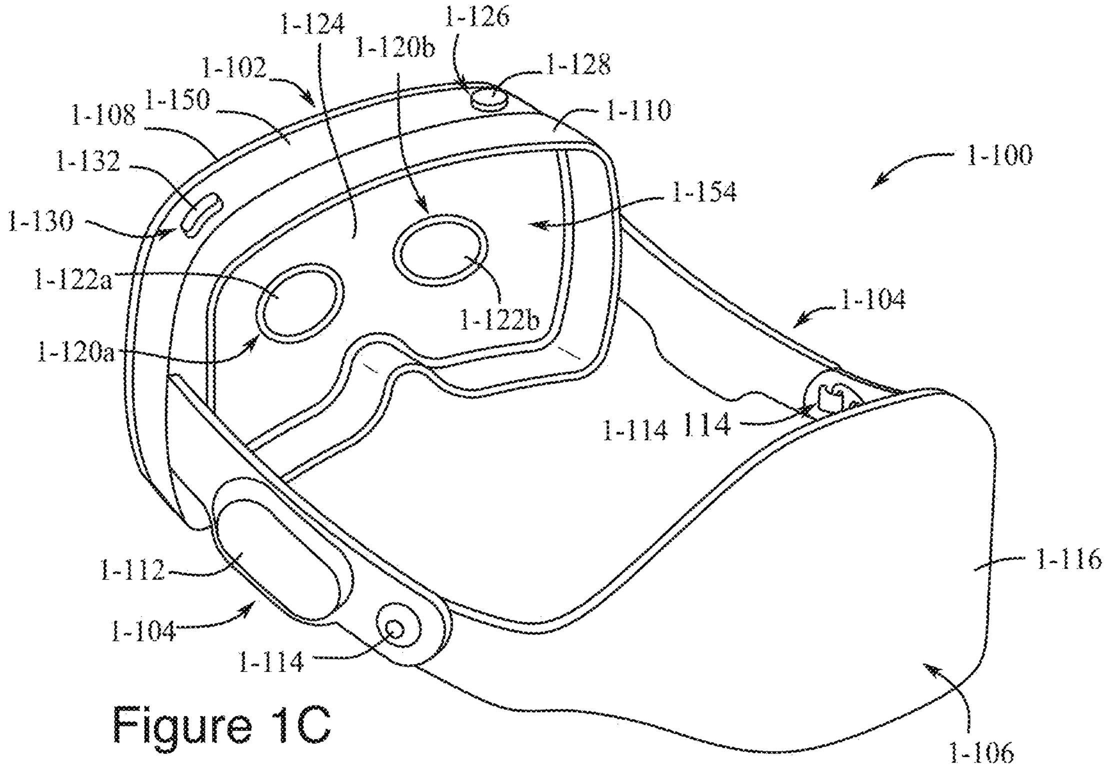
FIGS. 10A-10N1 illustrate examples of applying a visual effect to a real-world object.
Figure 1D:
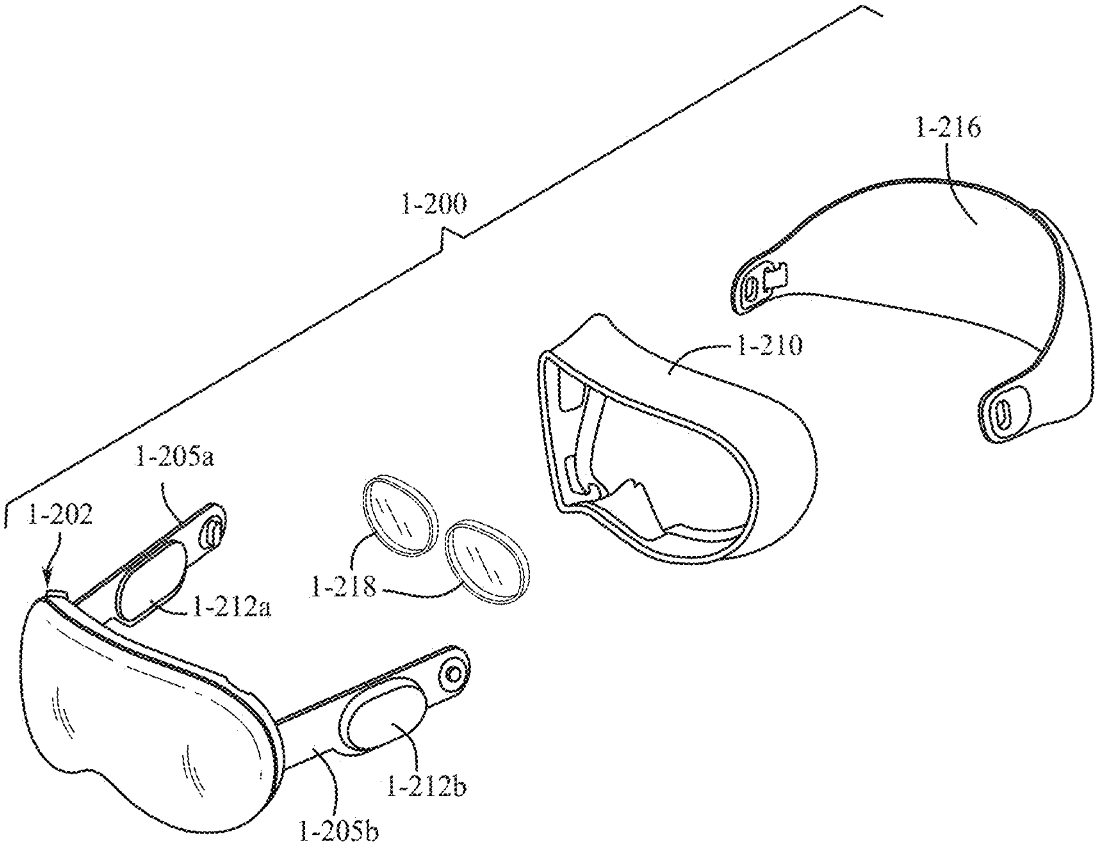
Figure 1E:
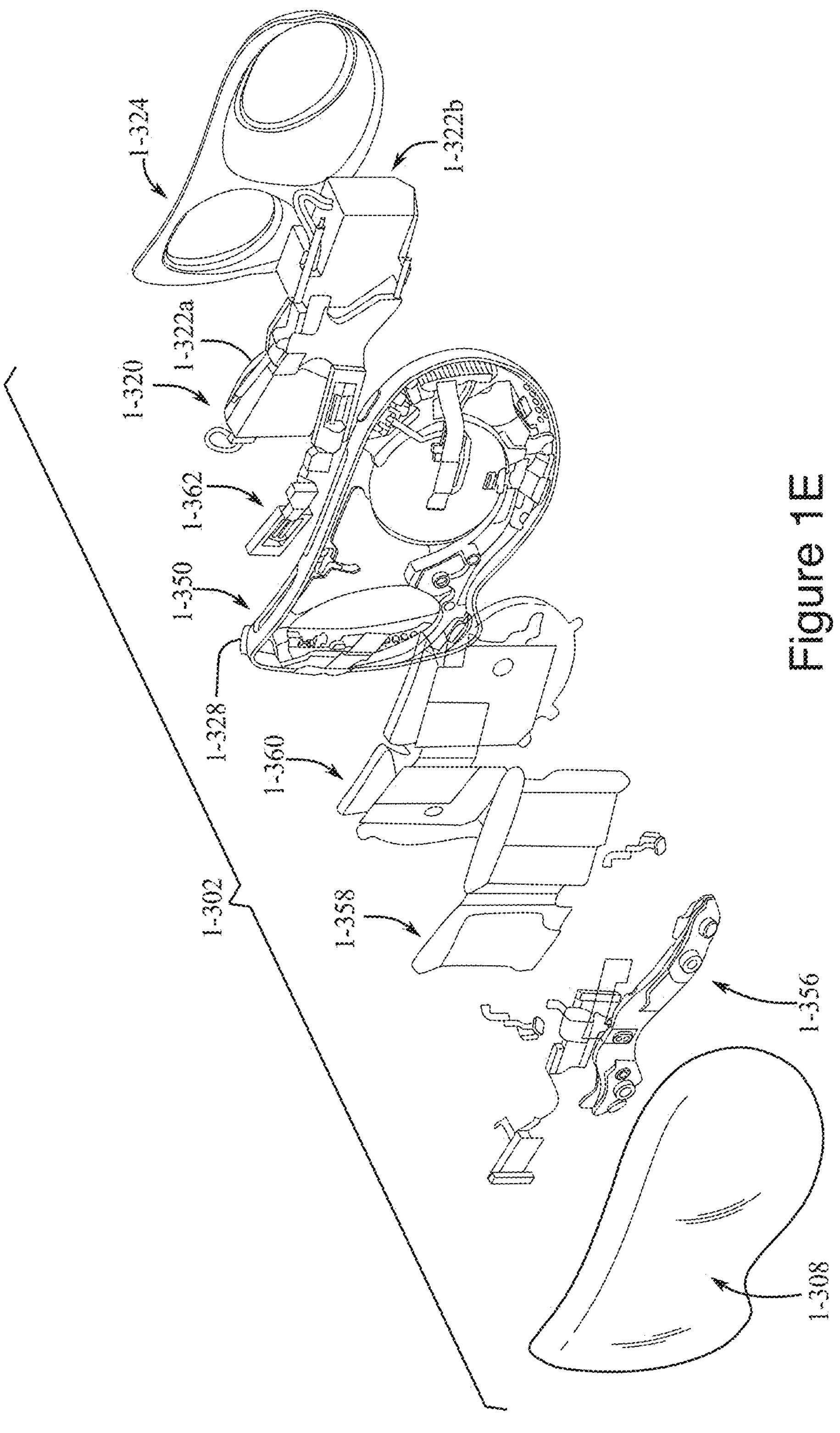
Figure 1F:
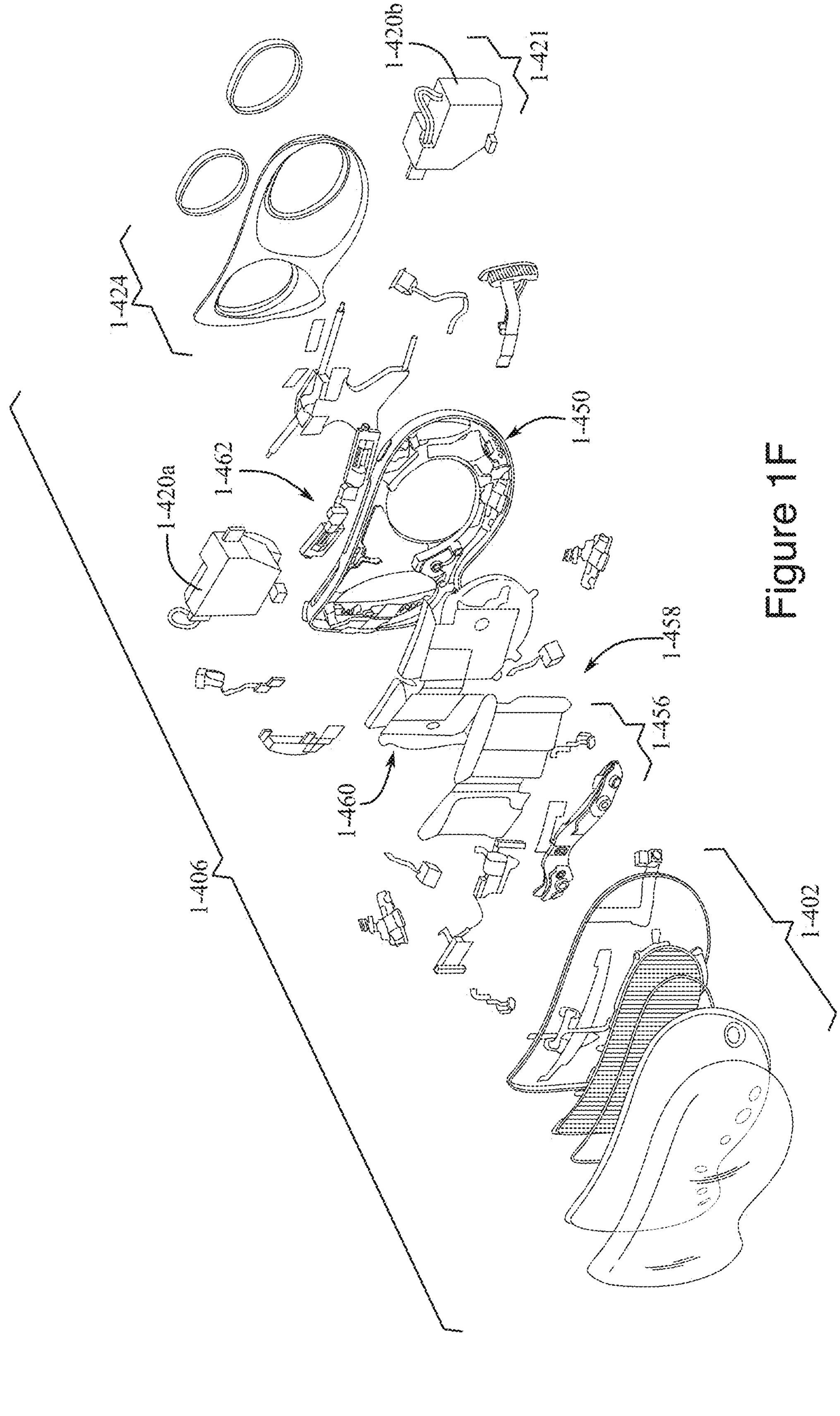
Figure 1G:
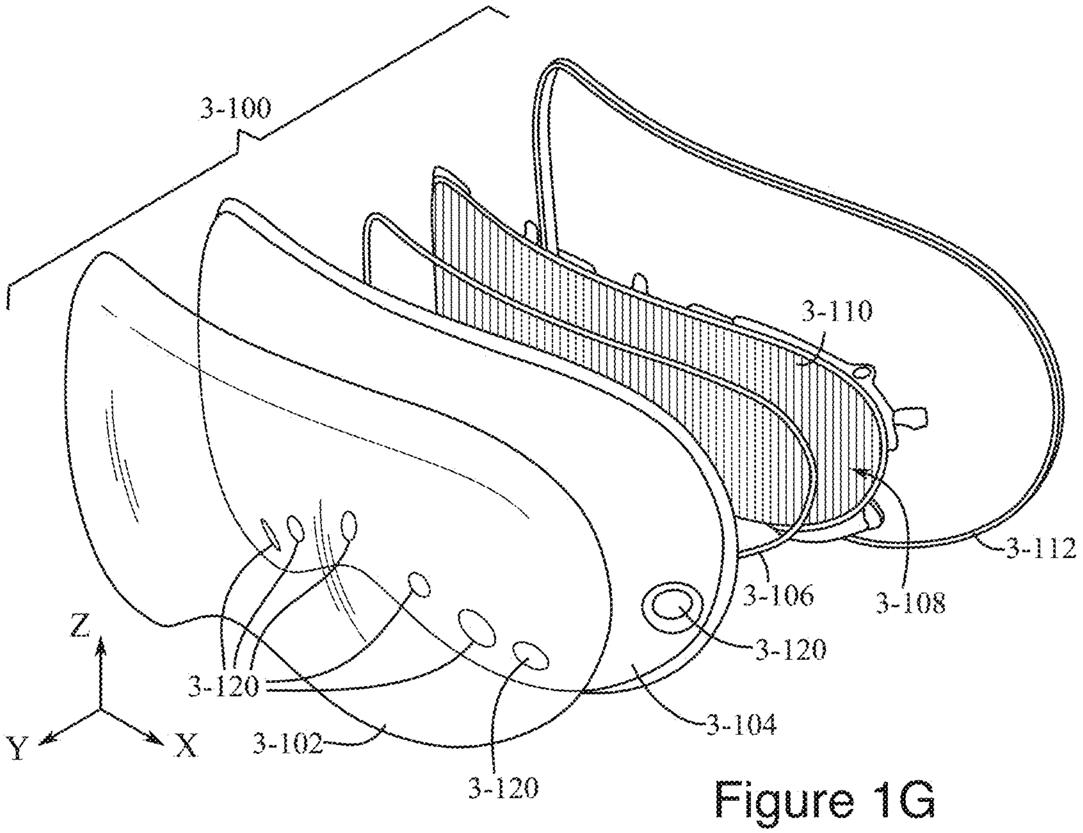
Figure 1H:
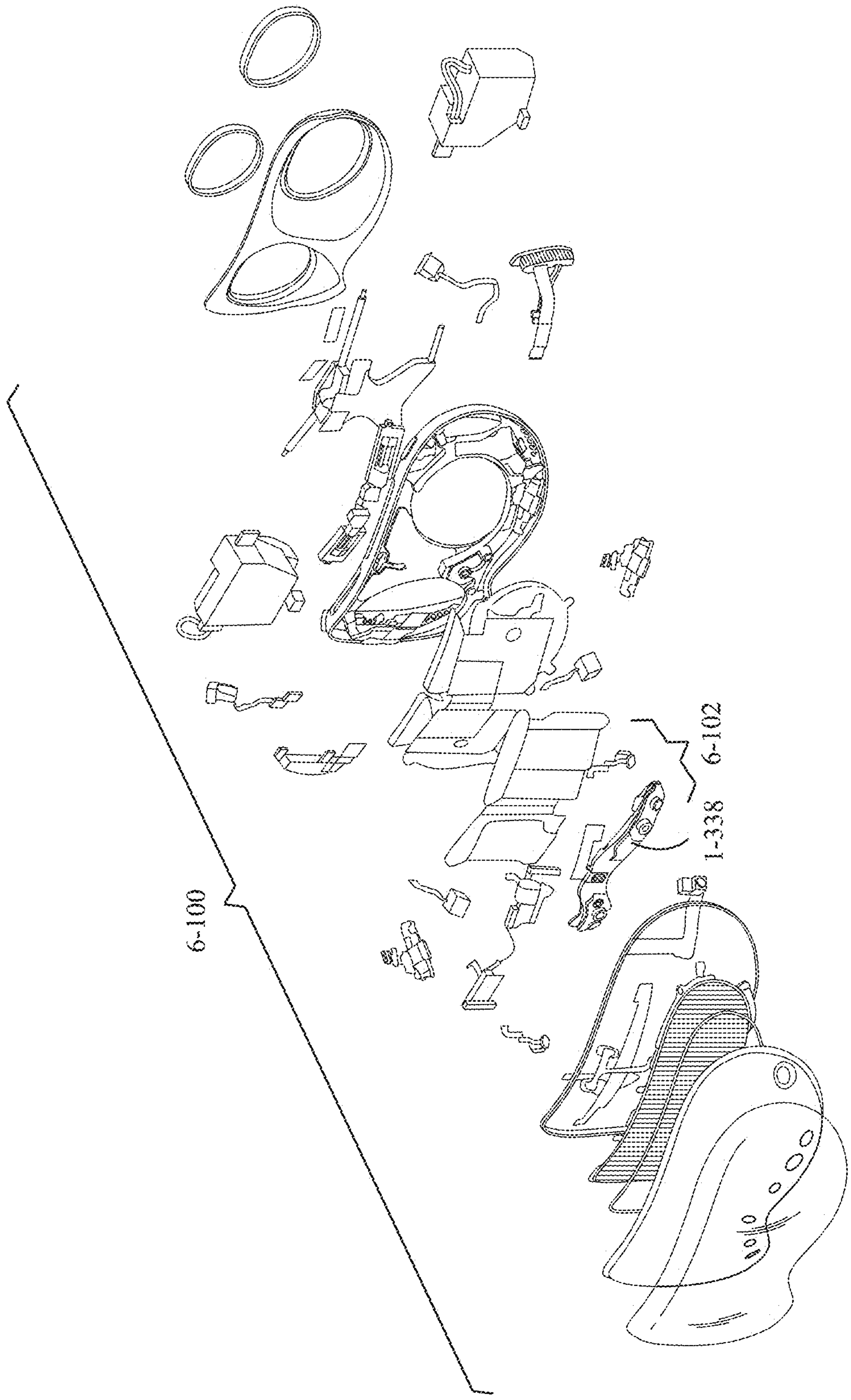
Figure 1I:
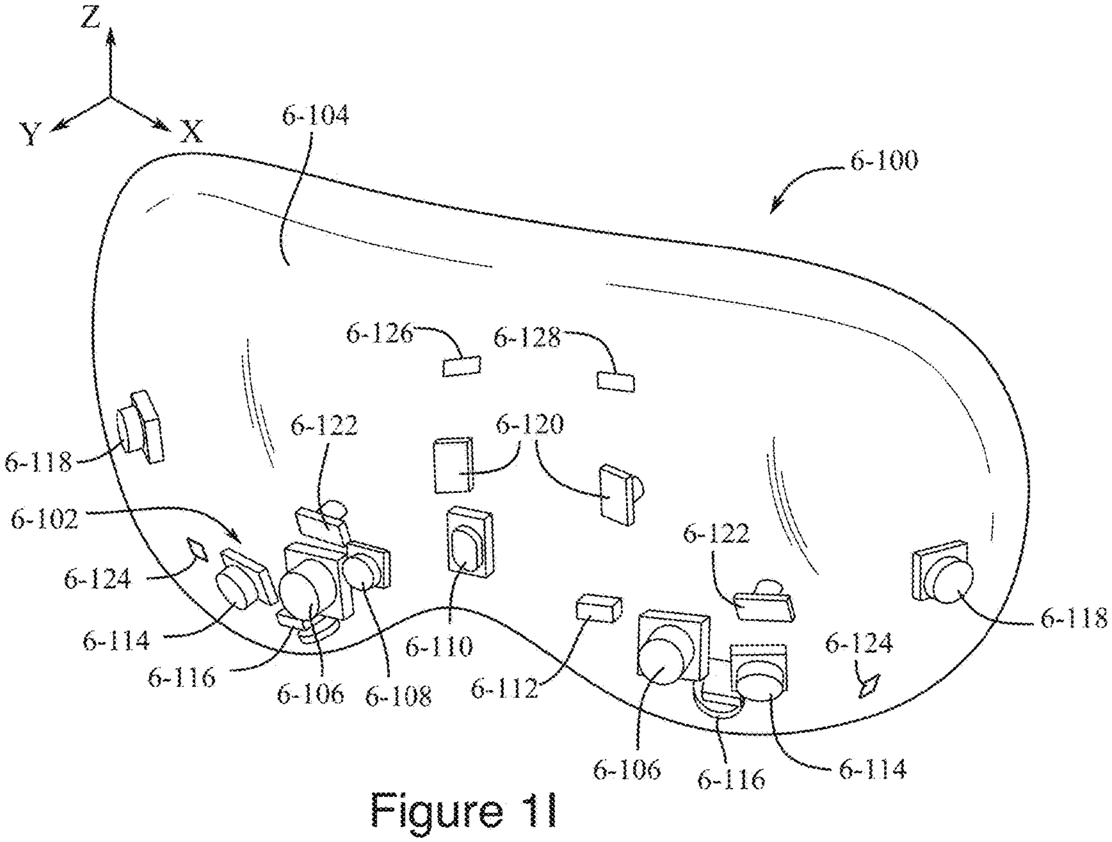
Figure 1J:
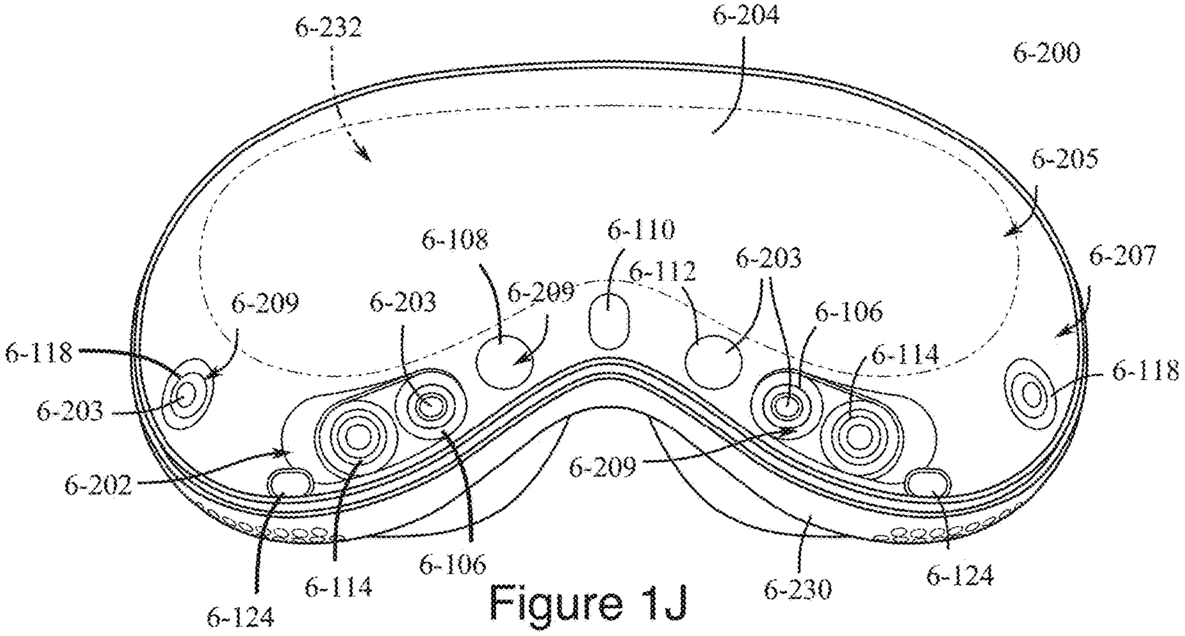
Figure 1K:
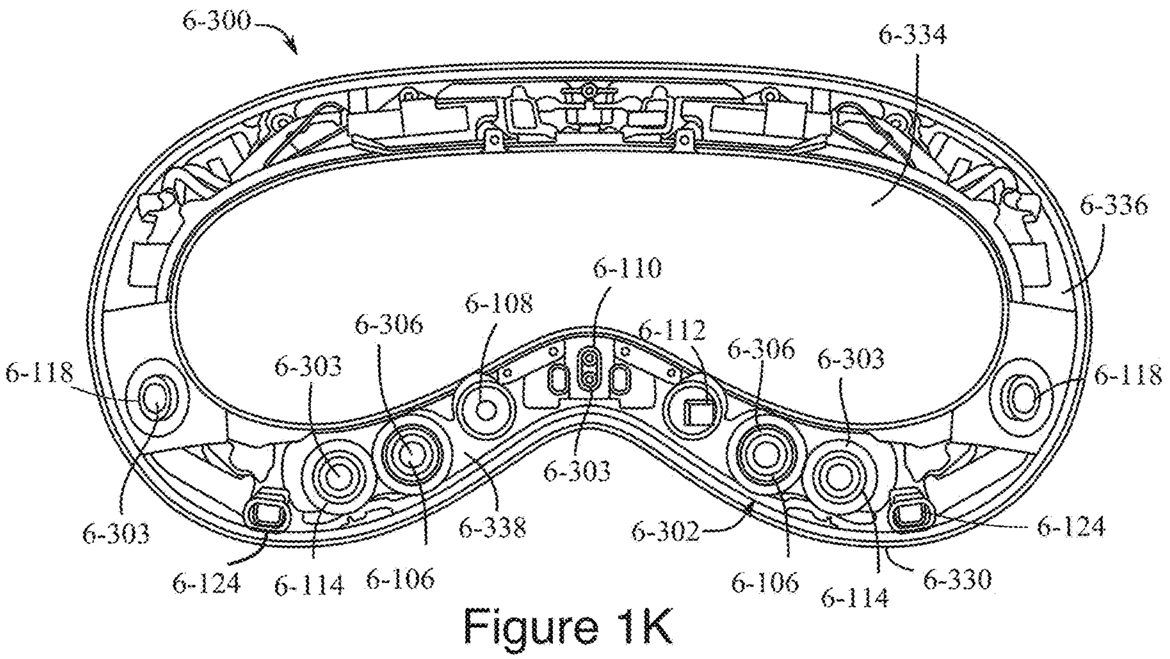
Figure 1L:
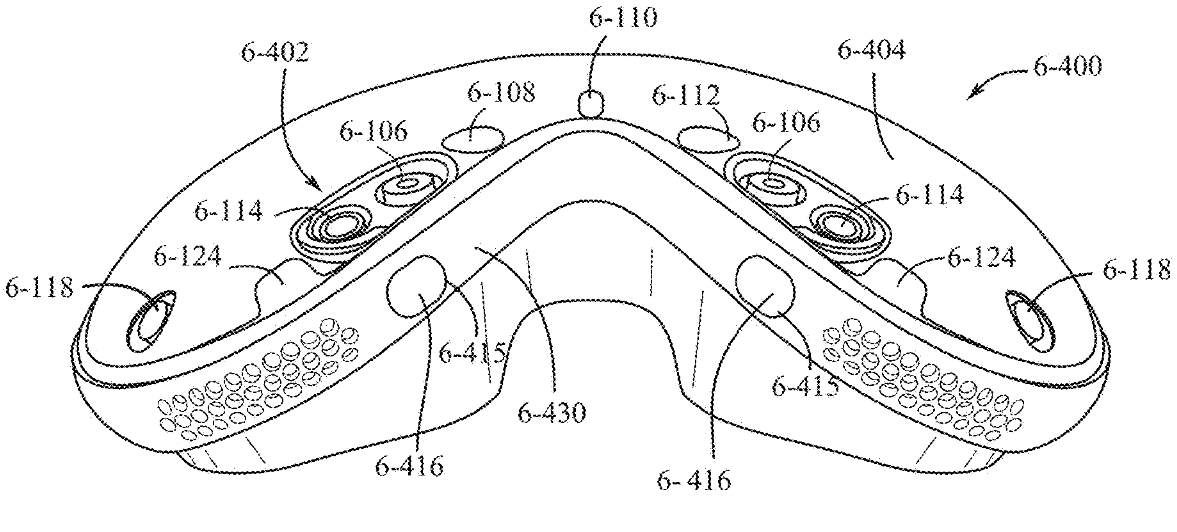
Figure 1M:
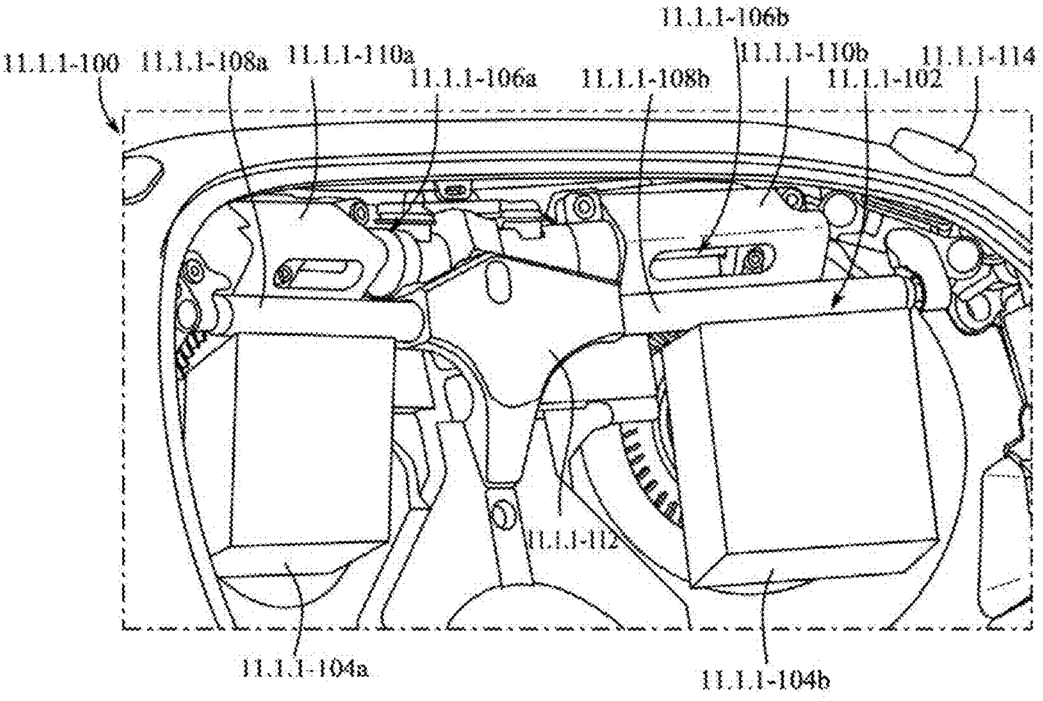
Figure 1N:
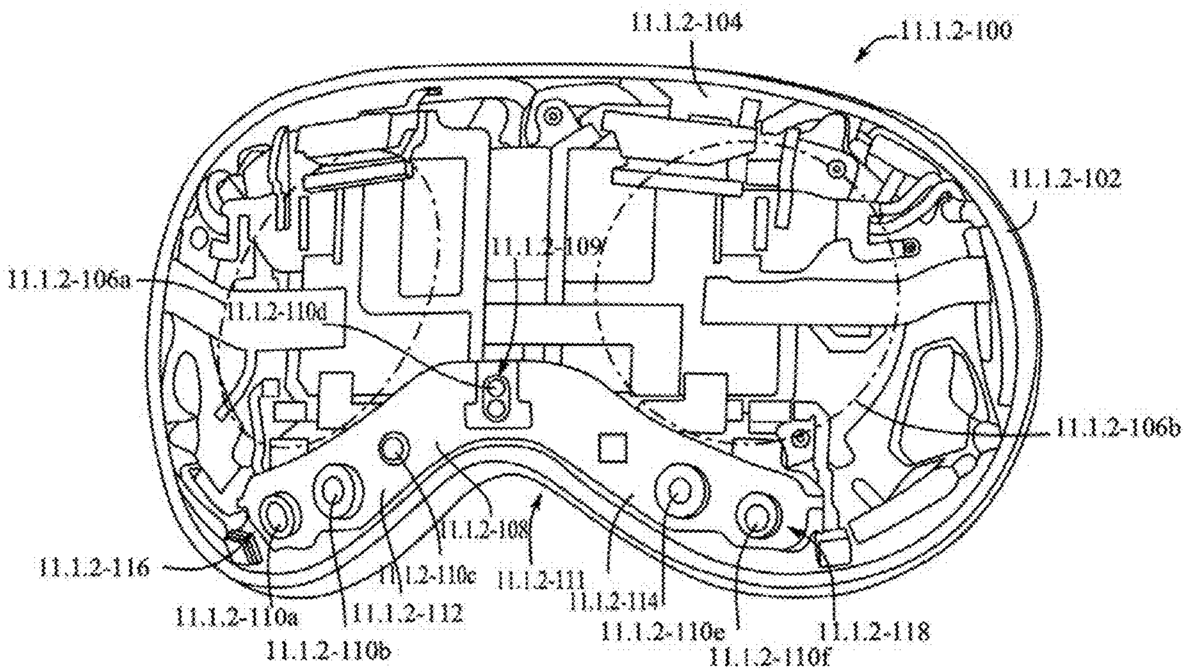
Figure 1O:
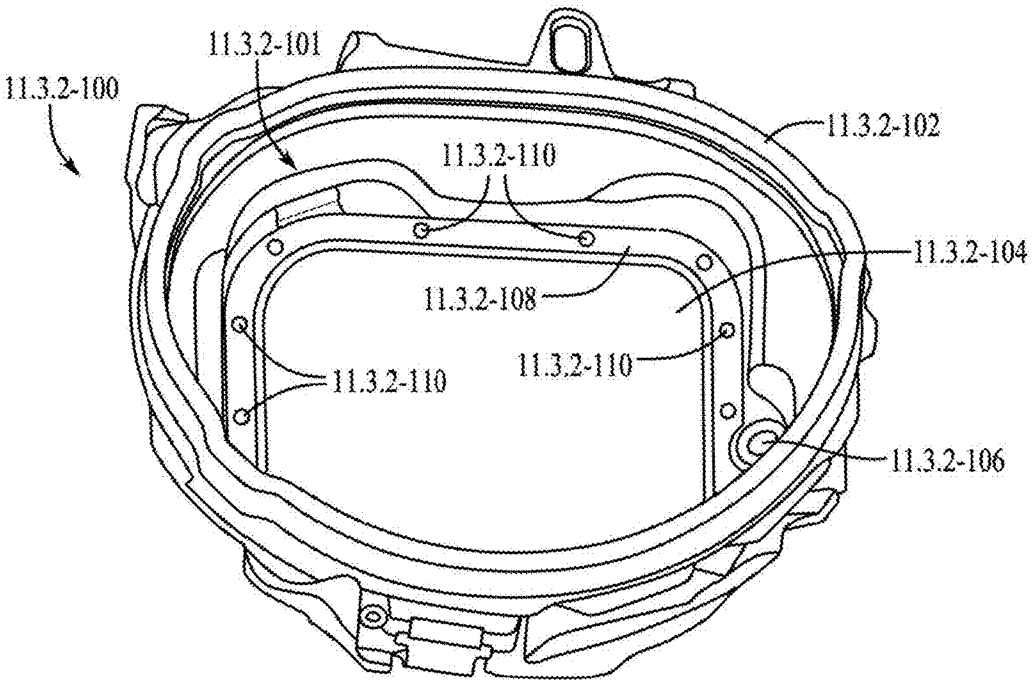
Figure 1P:
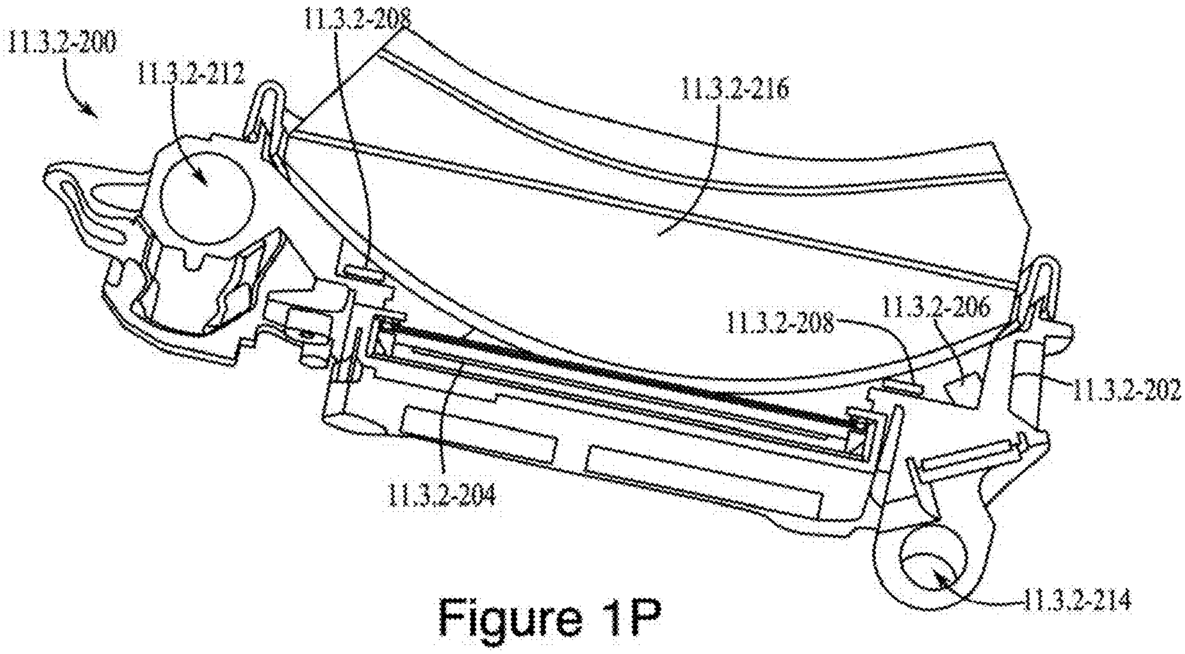

FIGS. 1A-1P illustrate various examples of a computer system that is used to perform the methods and provide audio, visual and/or haptic feedback as part of user interfaces described herein. In some embodiments, the computer system includes one or more display generation components (e.g., first and second display assemblies 1-120*a*, 1-120*b* and/or first and second optical modules 11.1.1-104*a* and 11.1.1-104*b*) for displaying virtual elements and/or a representation of a physical environment to a user of the computer system, optionally generated based on detected events and/or user inputs detected by the computer system. User interfaces generated by the computer system are optionally corrected by one or more corrective lenses 11.3.2-216 that are optionally removably attached to one or more of the optical modules to enable the user interfaces to be more easily viewed by users who would otherwise use glasses or contacts to correct their vision. While many user interfaces illustrated herein show a single view of a user interface, user interfaces in a HMD are optionally displayed using two optical modules (e.g., first and second display assemblies 1-120*a*, 1-120*b* and/or first and second optical modules 11.1.1-104*a* and 11.1.1-104*b*), one for a user's right eye and a different one for a user's left eye, and slightly different images are presented to the two different eyes to generate the illusion of stereoscopic depth, the single view of the user interface would typically be either a right-eye or left-eye view and the depth effect is explained in the text or using other schematic charts or views. In some embodiments, the computer system includes one or more external displays (e.g., display assembly 1-108) for displaying status information for the computer system to the user of the computer system (when the computer system is not being worn) and/or to other people who are near the computer system, optionally generated based on detected events and/or user inputs detected by the computer system. In some embodiments, the computer system includes one or more audio output components (e.g., electronic component 1-112) for generating audio feedback, optionally generated based on detected events and/or user inputs detected by the computer system. In some embodiments, the computer system includes one or more input devices for detecting input such as one or more sensors (e.g., one or more sensors in sensor assembly 1-356, and/or FIG. 1I) for detecting information about a physical environment of the device which can be used (optionally in conjunction with one or more illuminators such as the illuminators described in FIG. 1I) to generate a digital passthrough image, capture visual media corresponding to the physical environment (e.g., photos and/or video), or determine a pose (e.g., position and/or orientation) of physical objects and/or surfaces in the physical environment so that virtual objects ban be placed based on a detected pose of physical objects and/or surfaces. In some embodiments, the computer system includes one or more input devices for detecting input such as one or more sensors for detecting hand position and/or movement (e.g., one or more sensors in sensor assembly 1-356, and/or FIG. 1I) that can be used (optionally in conjunction with one or more illuminators such as the illuminators 6-124 described in FIG. 1I) to determine when one or more air gestures have been performed. In some embodiments, the computer system includes one or more input devices for detecting input such as one or more sensors for detecting eye movement (e.g., eye tracking and gaze tracking sensors in FIG. 1I) which can be used (optionally in conjunction with one or more lights such as lights 11.3.2-110 in FIG. 1O) to determine attention or gaze position and/or gaze movement which can optionally be used to detect gaze-only inputs based on gaze movement and/or dwell. A combination of the various sensors described above can be used to determine user facial expressions and/or hand movements for use in generating an avatar or representation of the user such as an anthropomorphic avatar or representation for use in a real-time communication session where the avatar has facial expressions, hand movements, and/or body movements that are based on or similar to detected facial expressions, hand movements, and/or body movements of a user of the device. Gaze and/or attention information is, optionally, combined with hand tracking information to determine interactions between the user and one or more user interfaces based on direct and/or indirect inputs such as air gestures or inputs that use one or more hardware input devices such as one or more buttons (e.g., first button 1-128, button 11.1.1-114, second button 1-132, and or dial or button 1-328), knobs (e.g., first button 1-128, button 11.1.1-114, and/or dial or button 1-328), digital crowns (e.g., first button 1-128 which is depressible and twistable or rotatable, button 11.1.1-114, and/or dial or button 1-328), trackpads, touch screens, keyboards, mice and/or other input devices. One or more buttons (e.g., first button 1-128, button 11.1.1-114, second button 1-132, and or dial or button 1-328) are optionally used to perform system operations such as recentering content in three-dimensional environment that is visible to a user of the device, displaying a home user interface for launching applications, starting real-time communication sessions, or initiating display of virtual three-dimensional backgrounds. Knobs or digital crowns (e.g., first button 1-128 which is depressible and twistable or rotatable, button 11.1.1-114, and/or dial or button 1-328) are optionally rotatable to adjust parameters of the visual content such as a level of immersion of a virtual three-dimensional environment (e.g., a degree to which virtual-content occupies the viewport of the user into the three-dimensional environment) or other parameters associated with the three-dimensional environment and the virtual content that is displayed via the optical modules (e.g., first and second display assemblies 1-120*a*, 1-120*b* and/or first and second optical modules 11.1.1-104*a* and 11.1.1-104*b*).

FIG. 1B illustrates a front, top, perspective view of an example of a head-mountable display (HMD) device 1-100 configured to be donned by a user and provide virtual and altered/mixed reality (VR/AR) experiences. The HMD 1-100 can include a display unit 1-102 or assembly, an electronic strap assembly 1-104 connected to and extending from the display unit 1-102, and a band assembly 1-106 secured at either end to the electronic strap assembly 1-104. The electronic strap assembly 1-104 and the band 1-106 can be part of a retention assembly configured to wrap around a user's head to hold the display unit 1-102 against the face of the user.

In at least one example, the band assembly 1-106 can include a first band 1-116 configured to wrap around the rear side of a user's head and a second band 1-117 configured to extend over the top of a user's head. The second strap can extend between first and second electronic straps 1-105*a*, 1-105*b* of the electronic strap assembly 1-104 as shown. The strap assembly 1-104 and the band assembly 1-106 can be part of a securement mechanism extending rearward from the display unit 1-102 and configured to hold the display unit 1-102 against a face of a user.

In at least one example, the securement mechanism includes a first electronic strap 1-105*a* including a first proximal end 1-134 coupled to the display unit 1-102, for example a housing 1-150 of the display unit 1-102, and a first distal end 1-136 opposite the first proximal end 1-134. The securement mechanism can also include a second electronic strap 1-105*b* including a second proximal end 1-138 coupled to the housing 1-150 of the display unit 1-102 and a second distal end 1-140 opposite the second proximal end 1-138. The securement mechanism can also include the first band 1-116 including a first end 1-142 coupled to the first distal end 1-136 and a second end 1-144 coupled to the second distal end 1-140 and the second band 1-117 extending between the first electronic strap 1-105*a* and the second electronic strap 1-105*b*. The straps 1-105*a-b* and band 1-116 can be coupled via connection mechanisms or assemblies 1-114. In at least one example, the second band 1-117 includes a first end 1-146 coupled to the first electronic strap 1-105*a* between the first proximal end 1-134 and the first distal end 1-136 and a second end 1-148 coupled to the second electronic strap 1-105*b* between the second proximal end 1-138 and the second distal end 1-140.

In at least one example, the first and second electronic straps 1-105*a-b* include plastic, metal, or other structural materials forming the shape the substantially rigid straps 1-105*a-b*. In at least one example, the first and second bands 1-116, 1-117 are formed of elastic, flexible materials including woven textiles, rubbers, and the like. The first and second bands 1-116, 1-117 can be flexible to conform to the shape of the user' head when donning the HMD 1-100.

In at least one example, one or more of the first and second electronic straps 1-105*a-b* can define internal strap volumes and include one or more electronic components disposed in the internal strap volumes. In one example, as shown in FIG. 1B, the first electronic strap 1-105*a* can include an electronic component 1-112. In one example, the electronic component 1-112 can include a speaker. In one example, the electronic component 1-112 can include a computing component such as a processor.

In at least one example, the housing 1-150 defines a first, front-facing opening 1-152. The front-facing opening is labeled in dotted lines at 1-152 in FIG. 1B because the display assembly 1-108 is disposed to occlude the first opening 1-152 from view when the HMD 1-100 is assembled. The housing 1-150 can also define a rear-facing second opening 1-154. The housing 1-150 also defines an internal volume between the first and second openings 1-152, 1-154. In at least one example, the HMD 1-100 includes the display assembly 1-108, which can include a front cover and display screen (shown in other figures) disposed in or across the front opening 1-152 to occlude the front opening 1-152. In at least one example, the display screen of the display assembly 1-108, as well as the display assembly 1-108 in general, has a curvature configured to follow the curvature of a user's face. The display screen of the display assembly 1-108 can be curved as shown to compliment the user's facial features and general curvature from one side of the face to the other, for example from left to right and/or from top to bottom where the display unit 1-102 is pressed.

In at least one example, the housing 1-150 can define a first aperture 1-126 between the first and second openings 1-152, 1-154 and a second aperture 1-130 between the first and second openings 1-152, 1-154. The HMD 1-100 can also include a first button 1-128 disposed in the first aperture 1-126 and a second button 1-132 disposed in the second aperture 1-130. The first and second buttons 1-128, 1-132 can be depressible through the respective apertures 1-126, 1-130. In at least one example, the first button 1-126 and/or second button 1-132 can be twistable dials as well as depressible buttons. In at least one example, the first button 1-128 is a depressible and twistable dial button and the second button 1-132 is a depressible button.

FIG. 1C illustrates a rear, perspective view of the HMD 1-100. The HMD 1-100 can include a light seal 1-110 extending rearward from the housing 1-150 of the display assembly 1-108 around a perimeter of the housing 1-150 as shown. The light seal 1-110 can be configured to extend from the housing 1-150 to the user's face around the user's eyes to block external light from being visible. In one example, the HMD 1-100 can include first and second display assemblies 1-120*a*, 1-120*b* disposed at or in the rearward facing second opening 1-154 defined by the housing 1-150 and/or disposed in the internal volume of the housing 1-150 and configured to project light through the second opening 1-154. In at least one example, each display assembly 1-120*a-b* can include respective display screens 1-122*a*, 1-122*b* configured to project light in a rearward direction through the second opening 1-154 toward the user's eyes.

In at least one example, referring to both FIGS. 1B and 1C, the display assembly 1-108 can be a front-facing, forward display assembly including a display screen configured to project light in a first, forward direction and the rear facing display screens 1-122*a-b* can be configured to project light in a second, rearward direction opposite the first direction. As noted above, the light seal 1-110 can be configured to block light external to the HMD 1-100 from reaching the user's eyes, including light projected by the forward facing display screen of the display assembly 1-108 shown in the front perspective view of FIG. 1B. In at least one example, the HMD 1-100 can also include a curtain 1-124 occluding the second opening 1-154 between the housing 1-150 and the rear-facing display assemblies 1-120*a-b*. In at least one example, the curtain 1-124 can be elastic or at least partially elastic.

Any of the features, components, and/or parts, including the arrangements and configurations thereof shown in FIGS. 1B and 1C can be included, either alone or in any combination, in any of the other examples of devices, features, components, and parts shown in FIGS. 1D-1F and described herein. Likewise, any of the features, components, and/or parts, including the arrangements and configurations thereof shown and described with reference to FIGS. 1D-1F can be included, either alone or in any combination, in the example of the devices, features, components, and parts shown in FIGS. 1B and 1C.

FIG. 1D illustrates an exploded view of an example of an HMD 1-200 including various portions or parts thereof separated according to the modularity and selective coupling of those parts. For example, the HMD 1-200 can include a band 1-216 which can be selectively coupled to first and second electronic straps 1-205*a*, 1-205*b*. The first securement strap 1-205*a* can include a first electronic component 1-212*a* and the second securement strap 1-205*b* can include a second electronic component 1-212*b*. In at least one example, the first and second straps 1-205*a-b* can be removably coupled to the display unit 1-202.

In addition, the HMD 1-200 can include a light seal 1-210 configured to be removably coupled to the display unit 1-202. The HMD 1-200 can also include lenses 1-218 which can be removably coupled to the display unit 1-202, for example over first and second display assemblies including display screens. The lenses 1-218 can include customized prescription lenses configured for corrective vision. As noted, each part shown in the exploded view of FIG. 1D and described above can be removably coupled, attached, re-attached, and changed out to update parts or swap out parts for different users. For example, bands such as the band 1-216, light seals such as the light seal 1-210, lenses such as the lenses 1-218, and electronic straps such as the straps 1-205*a-b* can be swapped out depending on the user such that these parts are customized to fit and correspond to the individual user of the HMD 1-200.

Any of the features, components, and/or parts, including the arrangements and configurations thereof shown in FIG. 1D can be included, either alone or in any combination, in any of the other examples of devices, features, components, and parts shown in FIGS. 1B, 1C, and 1E-1F and described herein. Likewise, any of the features, components, and/or parts, including the arrangements and configurations thereof shown and described with reference to FIGS. 1B, 1C, and 1E-1F can be included, either alone or in any combination, in the example of the devices, features, components, and parts shown in FIG. 1D.

FIG. 1E illustrates an exploded view of an example of a display unit 1-306 of a HMD. The display unit 1-306 can include a front display assembly 1-308, a frame/housing assembly 1-350, and a curtain assembly 1-324. The display unit 1-306 can also include a sensor assembly 1-356, logic board assembly 1-358, and cooling assembly 1-360 disposed between the frame assembly 1-350 and the front display assembly 1-308. In at least one example, the display unit 1-306 can also include a rear-facing display assembly 1-320 including first and second rear-facing display screens 1-322*a*, 1-322*b* disposed between the frame 1-350 and the curtain assembly 1-324.

In at least one example, the display unit 1-306 can also include a motor assembly 1-362 configured as an adjustment mechanism for adjusting the positions of the display screens 1-322*a-b* of the display assembly 1-320 relative to the frame 1-350. In at least one example, the display assembly 1-320 is mechanically coupled to the motor assembly 1-362, with at least one motor for each display screen 1-322*a-b*, such that the motors can translate the display screens 1-322*a-b* to match an interpupillary distance of the user's eyes.

In at least one example, the display unit 1-306 can include a dial or button 1-328 depressible relative to the frame 1-350 and accessible to the user outside the frame 1-350. The button 1-328 can be electronically connected to the motor assembly 1-362 via a controller such that the button 1-328 can be manipulated by the user to cause the motors of the motor assembly 1-362 to adjust the positions of the display screens 1-322*a-b*.

Any of the features, components, and/or parts, including the arrangements and configurations thereof shown in FIG. 1E can be included, either alone or in any combination, in any of the other examples of devices, features, components, and parts shown in FIGS. 1B-1D and 1F and described herein. Likewise, any of the features, components, and/or parts, including the arrangements and configurations thereof shown and described with reference to FIGS. 1B-1D and 1F can be included, either alone or in any combination, in the example of the devices, features, components, and parts shown in FIG. 1E.

FIG. 1F illustrates an exploded view of another example of a display unit 1-406 of a HMD device similar to other HMD devices described herein. The display unit 1-406 can include a front display assembly 1-402, a sensor assembly 1-456, a logic board assembly 1-458, a cooling assembly 1-460, a frame assembly 1-450, a rear-facing display assembly 1-421, and a curtain assembly 1-424. The display unit 1-406 can also include a motor assembly 1-462 for adjusting the positions of first and second display sub-assemblies 1-420*a*, 1-420*b* of the rear-facing display assembly 1-421, including first and second respective display screens for interpupillary adjustments, as described above.

The various parts, systems, and assemblies shown in the exploded view of FIG. 1F are described in greater detail herein with reference to FIGS. 1B-1E as well as subsequent figures referenced in the present disclosure. The display unit 1-406 shown in FIG. 1F can be assembled and integrated with the securement mechanisms shown in FIGS. 1B-1E, including the electronic straps, bands, and other components including light seals, connection assemblies, and so forth.

Any of the features, components, and/or parts, including the arrangements and configurations thereof shown in FIG. 1F can be included, either alone or in any combination, in any of the other examples of devices, features, components, and parts shown in FIGS. 1B-1E and described herein. Likewise, any of the features, components, and/or parts, including the arrangements and configurations thereof shown and described with reference to FIGS. 1B-1E can be included, either alone or in any combination, in the example of the devices, features, components, and parts shown in FIG. 1F.

FIG. 1G illustrates a perspective, exploded view of a front cover assembly 3-100 of an HMD device described herein, for example the front cover assembly 3-1 of the HMD 3-100 shown in FIG. 1G or any other HMD device shown and described herein. The front cover assembly 3-100 shown in FIG. 1G can include a transparent or semi-transparent cover 3-102, shroud 3-104 (or "canopy"), adhesive layers 3-106, display assembly 3-108 including a lenticular lens panel or array 3-110, and a structural trim 3-112. The adhesive layer 3-106 can secure the shroud 3-104 and/or transparent cover 3-102 to the display assembly 3-108 and/or the trim 3-112. The trim 3-112 can secure the various components of the front cover assembly 3-100 to a frame or chassis of the HMD device.

In at least one example, as shown in FIG. 1G, the transparent cover 3-102, shroud 3-104, and display assembly 3-108, including the lenticular lens array 3-110, can be curved to accommodate the curvature of a user's face. The transparent cover 3-102 and the shroud 3-104 can be curved in two or three dimensions, e.g., vertically curved in the Z-direction in and out of the Z-X plane and horizontally curved in the X-direction in and out of the Z-X plane. In at least one example, the display assembly 3-108 can include the lenticular lens array 3-110 as well as a display panel having pixels configured to project light through the shroud 3-104 and the transparent cover 3-102. The display assembly 3-108 can be curved in at least one direction, for example the horizontal direction, to accommodate the curvature of a user's face from one side (e.g., left side) of the face to the other (e.g., right side). In at least one example, each layer or component of the display assembly 3-108, which will be shown in subsequent figures and described in more detail, but which can include the lenticular lens array 3-110 and a display layer, can be similarly or concentrically curved in the horizontal direction to accommodate the curvature of the user's face.

In at least one example, the shroud 3-104 can include a transparent or semi-transparent material through which the display assembly 3-108 projects light. In one example, the shroud 3-104 can include one or more opaque portions, for example opaque ink-printed portions or other opaque film portions on the rear surface of the shroud 3-104. The rear surface can be the surface of the shroud 3-104 facing the user's eyes when the HMD device is donned. In at least one example, opaque portions can be on the front surface of the shroud 3-104 opposite the rear surface. In at least one example, the opaque portion or portions of the shroud 3-104 can include perimeter portions visually hiding any components around an outside perimeter of the display screen of the display assembly 3-108. In this way, the opaque portions of the shroud hide any other components, including electronic components, structural components, and so forth, of the HMD device that would otherwise be visible through the transparent or semi-transparent cover 3-102 and/or shroud 3-104.

In at least one example, the shroud 3-104 can define one or more apertures transparent portions 3-120 through which sensors can send and receive signals. In one example, the portions 3-120 are apertures through which the sensors can extend or send and receive signals. In one example, the portions 3-120 are transparent portions, or portions more transparent than surrounding semi-transparent or opaque portions of the shroud, through which sensors can send and receive signals through the shroud and through the transparent cover 3-102. In one example, the sensors can include cameras, IR sensors, LUX sensors, or any other visual or non-visual environmental sensors of the HMD device.

Any of the features, components, and/or parts, including the arrangements and configurations thereof shown in FIG. 1G can be included, either alone or in any combination, in any of the other examples of devices, features, components, and parts described herein. Likewise, any of the features, components, and/or parts, including the arrangements and configurations thereof shown and described herein can be included, either alone or in any combination, in the example of the devices, features, components, and parts shown in FIG. 1G.

FIG. 1H illustrates an exploded view of an example of an HMD device 6-100. The HMD device 6-100 can include a sensor array or system 6-102 including one or more sensors, cameras, projectors, and so forth mounted to one or more components of the HMD 6-100. In at least one example, the sensor system 6-102 can include a bracket 1-338 on which one or more sensors of the sensor system 6-102 can be fixed/secured.

FIG. 1I illustrates a portion of an HMD device 6-100 including a front transparent cover 6-104 and a sensor system 6-102. The sensor system 6-102 can include a number of different sensors, emitters, receivers, including cameras, IR sensors, projectors, and so forth. The transparent cover 6-104 is illustrated in front of the sensor system 6-102 to illustrate relative positions of the various sensors and emitters as well as the orientation of each sensor/emitter of the system 6-102. As referenced herein, "sideways," "side," "lateral," "horizontal," and other similar terms refer to orientations or directions as indicated by the X-axis shown in FIG. 1J. Terms such as "vertical," "up," "down," and similar terms refer to orientations or directions as indicated by the Z-axis shown in FIG. 1J. Terms such as "frontward," "rearward," "forward," backward," and similar terms refer to orientations or directions as indicated by the Y-axis shown in FIG. 1J.

In at least one example, the transparent cover 6-104 can define a front, external surface of the HMD device 6-100 and the sensor system 6-102, including the various sensors and components thereof, can be disposed behind the cover 6-104 in the Y-axis/direction. The cover 6-104 can be transparent or semi-transparent to allow light to pass through the cover 6-104, both light detected by the sensor system 6-102 and light emitted thereby.

As noted elsewhere herein, the HMD device 6-100 can include one or more controllers including processors for electrically coupling the various sensors and emitters of the sensor system 6-102 with one or more mother boards, processing units, and other electronic devices such as display screens and the like. In addition, as will be shown in more detail below with reference to other figures, the various sensors, emitters, and other components of the sensor system 6-102 can be coupled to various structural frame members, brackets, and so forth of the HMD device 6-100 not shown in FIG. 1I. FIG. 1I shows the components of the sensor system 6-102 unattached and un-coupled electrically from other components for the sake of illustrative clarity.

In at least one example, the device can include one or more controllers having processors configured to execute instructions stored on memory components electrically coupled to the processors. The instructions can include, or cause the processor to execute, one or more algorithms for self-correcting angles and positions of the various cameras described herein overtime with use as the initial positions, angles, or orientations of the cameras get bumped or deformed due to unintended drop events or other events.

In at least one example, the sensor system 6-102 can include one or more scene cameras 6-106. The system 6-102 can include two scene cameras 6-102 disposed on either side of the nasal bridge or arch of the HMD device 6-100 such that each of the two cameras 6-106 correspond generally in position with left and right eyes of the user behind the cover 6-103. In at least one example, the scene cameras 6-106 are oriented generally forward in the Y-direction to capture images in front of the user during use of the HMD 6-100. In at least one example, the scene cameras are color cameras and provide images and content for MR video pass through to the display screens facing the user's eyes when using the HMD device 6-100. The scene cameras 6-106 can also be used for environment and object reconstruction.

In at least one example, the sensor system 6-102 can include a first depth sensor 6-108 pointed generally forward in the Y-direction. In at least one example, the first depth sensor 6-108 can be used for environment and object reconstruction as well as user hand and body tracking. In at least one example, the sensor system 6-102 can include a second depth sensor 6-110 disposed centrally along the width (e.g., along the X-axis) of the HMD device 6-100. For example, the second depth sensor 6-110 can be disposed above the central nasal bridge or accommodating features over the nose of the user when donning the HMD 6-100. In at least one example, the second depth sensor 6-110 can be used for environment and object reconstruction as well as hand and body tracking. In at least one example, the second depth sensor can include a LIDAR sensor.

In at least one example, the sensor system 6-102 can include a depth projector 6-112 facing generally forward to project electromagnetic waves, for example in the form of a predetermined pattern of light dots, out into and within a field of view of the user and/or the scene cameras 6-106 or a field of view including and beyond the field of view of the user and/or scene cameras 6-106. In at least one example, the depth projector can project electromagnetic waves of light in the form of a dotted light pattern to be reflected off objects and back into the depth sensors noted above, including the depth sensors 6-108, 6-110. In at least one example, the depth projector 6-112 can be used for environment and object reconstruction as well as hand and body tracking.

In at least one example, the sensor system 6-102 can include downward facing cameras 6-114 with a field of view pointed generally downward relative to the HDM device 6-100 in the Z-axis. In at least one example, the downward cameras 6-114 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The downward cameras 6-114, for example, can be used to capture facial expressions and movements for the face of the user below the HMD device 6-100, including the cheeks, mouth, and chin.

In at least one example, the sensor system 6-102 can include jaw cameras 6-116. In at least one example, the jaw cameras 6-116 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The jaw cameras 6-116, for example, can be used to capture facial expressions and movements for the face of the user below the HMD device 6-100, including the user's jaw, cheeks, mouth, and chin. for hand and body tracking, headset tracking, and facial avatar In at least one example, the sensor system 6-102 can include side cameras 6-118. The side cameras 6-118 can be oriented to capture side views left and right in the X-axis or direction relative to the HMD device 6-100. In at least one example, the side cameras 6-118 can be used for hand and body tracking, headset tracking, and facial avatar detection and re-creation.

In at least one example, the sensor system 6-102 can include a plurality of eye tracking and gaze tracking sensors for determining an identity, status, and gaze direction of a user's eyes during and/or before use. In at least one example, the eye/gaze tracking sensors can include nasal eye cameras 6-120 disposed on either side of the user's nose and adjacent the user's nose when donning the HMD device 6-100. The eye/gaze sensors can also include bottom eye cameras 6-122 disposed below respective user eyes for capturing images of the eyes for facial avatar detection and creation, gaze tracking, and iris identification functions.

In at least one example, the sensor system 6-102 can include infrared illuminators 6-124 pointed outward from the HMD device 6-100 to illuminate the external environment and any object therein with IR light for IR detection with one or more IR sensors of the sensor system 6-102. In at least one example, the sensor system 6-102 can include a flicker sensor 6-126 and an ambient light sensor 6-128. In at least one example, the flicker sensor 6-126 can detect overhead light refresh rates to avoid display flicker. In one example, the infrared illuminators 6-124 can include light emitting diodes and can be used especially for low light environments for illuminating user hands and other objects in low light for detection by infrared sensors of the sensor system 6-102.

In at least one example, multiple sensors, including the scene cameras 6-106, the downward cameras 6-114, the jaw cameras 6-116, the side cameras 6-118, the depth projector 6-112, and the depth sensors 6-108, 6-110 can be used in combination with an electrically coupled controller to combine depth data with camera data for hand tracking and for size determination for better hand tracking and object recognition and tracking functions of the HMD device 6-100. In at least one example, the downward cameras 6-114, jaw cameras 6-116, and side cameras 6-118 described above and shown in FIG. 1I can be wide angle cameras operable in the visible and infrared spectrums. In at least one example, these cameras 6-114, 6-116, 6-118 can operate only in black and white light detection to simplify image processing and gain sensitivity.

Any of the features, components, and/or parts, including the arrangements and configurations thereof shown in FIG. 1I can be included, either alone or in any combination, in any of the other examples of devices, features, components, and parts shown in FIGS. 1J-1L and described herein. Likewise, any of the features, components, and/or parts, including the arrangements and configurations thereof shown and described with reference to FIGS. 1J-1L can be included, either alone or in any combination, in the example of the devices, features, components, and parts shown in FIG. 1I.

FIG. 1J illustrates a lower perspective view of an example of an HMD 6-200 including a cover or shroud 6-204 secured to a frame 6-230. In at least one example, the sensors 6-203 of the sensor system 6-202 can be disposed around a perimeter of the HDM 6-200 such that the sensors 6-203 are outwardly disposed around a perimeter of a display region or area 6-232 so as not to obstruct a view of the displayed light. In at least one example, the sensors can be disposed behind the shroud 6-204 and aligned with transparent portions of the shroud allowing sensors and projectors to allow light back and forth through the shroud 6-204. In at least one example, opaque ink or other opaque material or films/layers can be disposed on the shroud 6-204 around the display area 6-232 to hide components of the HMD 6-200 outside the display area 6-232 other than the transparent portions defined by the opaque portions, through which the sensors and projectors send and receive light and electromagnetic signals during operation. In at least one example, the shroud 6-204 allows light to pass therethrough from the display (e.g., within the display region 6-232) but not radially outward from the display region around the perimeter of the display and shroud 6-204.

In some examples, the shroud 6-204 includes a transparent portion 6-205 and an opaque portion 6-207, as described above and elsewhere herein. In at least one example, the opaque portion 6-207 of the shroud 6-204 can define one or more transparent regions 6-209 through which the sensors 6-203 of the sensor system 6-202 can send and receive signals. In the illustrated example, the sensors 6-203 of the sensor system 6-202 sending and receiving signals through the shroud 6-204, or more specifically through the transparent regions 6-209 of the (or defined by) the opaque portion 6-207 of the shroud 6-204 can include the same or similar sensors as those shown in the example of FIG. 1I, for example depth sensors 6-108 and 6-110, depth projector 6-112, first and second scene cameras 6-106, first and second downward cameras 6-114, first and second side cameras 6-118, and first and second infrared illuminators 6-124.

These sensors are also shown in the examples of FIGS. 1K and 1L. Other sensors, sensor types, number of sensors, and relative positions thereof can be included in one or more other examples of HMDs.

Any of the features, components, and/or parts, including the arrangements and configurations thereof shown in FIG. 1J can be included, either alone or in any combination, in any of the other examples of devices, features, components, and parts shown in FIGS. 1I and 1K-1L and described herein. Likewise, any of the features, components, and/or parts, including the arrangements and configurations thereof shown and described with reference to FIGS. 1I and 1K-1L can be included, either alone or in any combination, in the example of the devices, features, components, and parts shown in FIG. 1J.

FIG. 1K illustrates a front view of a portion of an example of an HMD device 6-300 including a display 6-334, brackets 6-336, 6-338, and frame or housing 6-330. The example shown in FIG. 1K does not include a front cover or shroud in order to illustrate the brackets 6-336, 6-338. For example, the shroud 6-204 shown in FIG. 1J includes the opaque portion 6-207 that would visually cover/block a view of anything outside (e.g., radially/peripherally outside) the display/display region 6-334, including the sensors 6-303 and bracket 6-338.

In at least one example, the various sensors of the sensor system 6-302 are coupled to the brackets 6-336, 6-338. In at least one example, the scene cameras 6-306 include tight tolerances of angles relative to one another. For example, the tolerance of mounting angles between the two scene cameras 6-306 can be 0.5 degrees or less, for example 0.3 degrees or less. In order to achieve and maintain such a tight tolerance, in one example, the scene cameras 6-306 can be mounted to the bracket 6-338 and not the shroud. The bracket can include cantilevered arms on which the scene cameras 6-306 and other sensors of the sensor system 6-302 can be mounted to remain un-deformed in position and orientation in the case of a drop event by a user resulting in any deformation of the other bracket 6-226, housing 6-330, and/or shroud.

Any of the features, components, and/or parts, including the arrangements and configurations thereof shown in FIG. 1K can be included, either alone or in any combination, in any of the other examples of devices, features, components, and parts shown in FIGS. 1I-1J and 1L and described herein. Likewise, any of the features, components, and/or parts, including the arrangements and configurations thereof shown and described with reference to FIGS. 1I-1J and 1L can be included, either alone or in any combination, in the example of the devices, features, components, and parts shown in FIG. 1K.

FIG. 1L illustrates a bottom view of an example of an HMD 6-400 including a front display/cover assembly 6-404 and a sensor system 6-402. The sensor system 6-402 can be similar to other sensor systems described above and elsewhere herein, including in reference to FIGS. 1I-1K. In at least one example, the jaw cameras 6-416 can be facing downward to capture images of the user's lower facial features. In one example, the jaw cameras 6-416 can be coupled directly to the frame or housing 6-430 or one or more internal brackets directly coupled to the frame or housing 6-430 shown. The frame or housing 6-430 can include one or more apertures/openings 6-415 through which the jaw cameras 6-416 can send and receive signals.

Any of the features, components, and/or parts, including the arrangements and configurations thereof shown in FIG. 1L can be included, either alone or in any combination, in any of the other examples of devices, features, components, and parts shown in FIGS. 1I-1K and described herein. Likewise, any of the features, components, and/or parts, including the arrangements and configurations thereof shown and described with reference to FIGS. 1I-1K can be included, either alone or in any combination, in the example of the devices, features, components, and parts shown in FIG. 1L.

FIG. 1M illustrates a rear perspective view of an inter-pupillary distance (IPD) adjustment system 11.1.1-102 including first and second optical modules **11.1.1-104*a-b* slidably engaging/coupled to respective guide-rods 11.1.1-108*a-b* and motors 11.1.1-110*a-b* of left and right adjustment subsystems 11.1.1-106*a-b*. The IPD adjustment system 11.1.1-102 can be coupled to a bracket 11.1.1-112 and include a button 11.1.1-114 in electrical communication with the motors 11.1.1-110*a-b*. In at least one example, the button 11.1.1-114 can electrically communicate with the first and second motors 11.1.1-110*a-b* via a processor or other circuitry components to cause the first and second motors 11.1.1-110*a-b* to activate and cause the first and second optical modules 11.1.1-104*a-b***, respectively, to change position relative to one another.

In at least one example, the first and second optical modules **11.1.1-104*a-b* can include respective display screens configured to project light toward the user's eyes when donning the HMD 11.1.1-100. In at least one example, the user can manipulate (e.g., depress and/or rotate) the button 11.1.1-114 to activate a positional adjustment of the optical modules 11.1.1-104*a-b* to match the inter-pupillary distance of the user's eyes. The optical modules 11.1.1-104*a-b* can also include one or more cameras or other sensors/sensor systems for imaging and measuring the IPD of the user such that the optical modules 11.1.1-104*a-b*** can be adjusted to match the IPD.

In one example, the user can manipulate the button 11.1.1-114 to cause an automatic positional adjustment of the first and second optical modules **11.1.1-104*a-b*. In one example, the user can manipulate the button 11.1.1-114 to cause a manual adjustment such that the optical modules 11.1.1-104*a-b* move further or closer away, for example when the user rotates the button 11.1.1-114 one way or the other, until the user visually matches her/his own IPD. In one example, the manual adjustment is electronically communicated via one or more circuits and power for the movements of the optical modules 11.1.1-104*a-b* via the motors 11.1.1-110*a-b* is provided by an electrical power source. In one example, the adjustment and movement of the optical modules 11.1.1-104*a-b* via a manipulation of the button 11.1.1-114 is mechanically actuated via the movement of the button 11.1.1-114**.

Any of the features, components, and/or parts, including the arrangements and configurations thereof shown in FIG. 1M can be included, either alone or in any combination, in any of the other examples of devices, features, components, and parts shown in any other figures shown and described herein. Likewise, any of the features, components, and/or parts, including the arrangements and configurations thereof shown and described with reference to any other figure shown and described herein, either alone or in any combination, in the example of the devices, features, components, and parts shown in FIG. 1M.

FIG. 1N illustrates a front perspective view of a portion of an HMD 11.1.2-100, including an outer structural frame 11.1.2-102 and an inner or intermediate structural frame 11.1.2-104 defining first and second apertures **11.1.2-106*a*, 11.1.2-106*b*. The apertures 11.1.2-106*a-b* are shown in dotted lines in FIG. 1N because a view of the apertures 11.1.2-106***a-b* can be blocked by one or more other components of the HMD 11.1.2-100 coupled to the inner frame 11.1.2-104 and/or the outer frame 11.1.2-102, as shown. In at least one example, the HMD 11.1.2-100 can include a first mounting bracket 11.1.2-108 coupled to the inner frame 11.1.2-104. In at least one example, the mounting bracket 11.1.2-108 is coupled to the inner frame 11.1.2-104 between the first and second apertures 11.1.2-106*a-b*.

The mounting bracket 11.1.2-108 can include a middle or central portion 11.1.2-109 coupled to the inner frame 11.1.2-104. In some examples, the middle or central portion 11.1.2-109 may not be the geometric middle or center of the bracket 11.1.2-108. Rather, the middle/central portion 11.1.2-109 can be disposed between first and second cantilevered extension arms extending away from the middle portion 11.1.2-109. In at least one example, the mounting bracket 108 includes a first cantilever arm 11.1.2-112 and a second cantilever arm 11.1.2-114 extending away from the middle portion 11.1.2-109 of the mount bracket 11.1.2-108 coupled to the inner frame 11.1.2-104.

As shown in FIG. 1N, the outer frame 11.1.2-102 can define a curved geometry on a lower side thereof to accommodate a user's nose when the user dons the HMD 11.1.2-100. The curved geometry can be referred to as a nose bridge 11.1.2-111 and be centrally located on a lower side of the HMD 11.1.2-100 as shown. In at least one example, the mounting bracket 11.1.2-108 can be connected to the inner frame 11.1.2-104 between the apertures 11.1.2-106*a-b* such that the cantilevered arms 11.1.2-112, 11.1.2-114 extend downward and laterally outward away from the middle portion 11.1.2-109 to compliment the nose bridge 11.1.2-111 geometry of the outer frame 11.1.2-102. In this way, the mounting bracket 11.1.2-108 is configured to accommodate the user's nose as noted above. The nose bridge 11.1.2-111 geometry accommodates the nose in that the nose bridge 11.1.2-111 provides a curvature that curves with, above, over, and around the user's nose for comfort and fit.

The first cantilever arm 11.1.2-112 can extend away from the middle portion 11.1.2-109 of the mounting bracket 11.1.2-108 in a first direction and the second cantilever arm 11.1.2-114 can extend away from the middle portion 11.1.2-109 of the mounting bracket 11.1.2-10 in a second direction opposite the first direction. The first and second cantilever arms 11.1.2-112, 11.1.2-114 are referred to as "cantilevered" or "cantilever" arms because each arm 11.1.2-112, 11.1.2-114, includes a distal free end 11.1.2-116, 11.1.2-118, respectively, which are free of affixation from the inner and outer frames 11.1.2-102, 11.1.2-104. In this way, the arms 11.1.2-112, 11.1.2-114 are cantilevered from the middle portion 11.1.2-109, which can be connected to the inner frame 11.1.2-104, with distal ends 11.1.2-102, 11.1.2-104 unattached.

In at least one example, the HMD 11.1.2-100 can include one or more components coupled to the mounting bracket 11.1.2-108. In one example, the components include a plurality of sensors 11.1.2-110*a-f*. Each sensor of the plurality of sensors 11.1.2-110*a-f* can include various types of sensors, including cameras, IR sensors, and so forth. In some examples, one or more of the sensors 11.1.2-110*a-f* can be used for object recognition in three-dimensional space such that it is important to maintain a precise relative position of two or more of the plurality of sensors 11.1.2-110*a-f*. The cantilevered nature of the mounting bracket 11.1.2-108 can protect the sensors 11.1.2-110*a-f* from damage and altered positioning in the case of accidental drops by the user. Because the sensors 11.1.2-110*a-f* are cantilevered on the arms 11.1.2-112, 11.1.2-114 of the mounting bracket 11.1.2-108, stresses and deformations of the inner and/or outer frames 11.1.2-104, 11.1.2-102 are not transferred to the cantilevered arms 11.1.2-112, 11.1.2-114 and thus do not affect the relative positioning of the sensors 11.1.2-110*a-f* coupled/mounted to the mounting bracket 11.1.2-108.

Any of the features, components, and/or parts, including the arrangements and configurations thereof shown in FIG. 1N can be included, either alone or in any combination, in any of the other examples of devices, features, components, and described herein. Likewise, any of the features, components, and/or parts, including the arrangements and configurations thereof shown and described herein can be included, either alone or in any combination, in the example of the devices, features, components, and parts shown in FIG. 1N.

FIG. 1O illustrates an example of an optical module 11.3.2-100 for use in an electronic device such as an HMD, including HDM devices described herein. As shown in one or more other examples described herein, the optical module 11.3.2-100 can be one of two optical modules within an MID, with each optical module aligned to project light toward a user's eye. In this way, a first optical module can project light via a display screen toward a user's first eye and a second optical module of the same device can project light via another display screen toward the user's second eye.

In at least one example, the optical module 11.3.2-100 can include an optical frame or housing 11.3.2-102, which can also be referred to as a barrel or optical module barrel. The optical module 11.3.2-100 can also include a display 11.3.2-104, including a display screen or multiple display screens, coupled to the housing 11.3.2-102. The display 11.3.2-104 can be coupled to the housing 11.3.2-102 such that the display 11.3.2-104 is configured to project light toward the eye of a user when the HMD of which the display module 11.3.2-100 is a part is donned during use. In at least one example, the housing 11.3.2-102 can surround the display 11.3.2-104 and provide connection features for coupling other components of optical modules described herein.

In one example, the optical module 11.3.2-100 can include one or more cameras 11.3.2-106 coupled to the housing 11.3.2-102. The camera 11.3.2-106 can be positioned relative to the display 11.3.2-104 and housing 11.3.2-102 such that the camera 11.3.2-106 is configured to capture one or more images of the user's eye during use. In at least one example, the optical module 11.3.2-100 can also include a light strip 11.3.2-108 surrounding the display 11.3.2-104. In one example, the light strip 11.3.2-108 is disposed between the display 11.3.2-104 and the camera 11.3.2-106. The light strip 11.3.2-108 can include a plurality of lights 11.3.2-110. The plurality of lights can include one or more light emitting diodes (LEDs) or other lights configured to project light toward the user's eye when the HMD is donned. The individual lights 11.3.2-110 of the light strip 11.3.2-108 can be spaced about the strip 11.3.2-108 and thus spaced about the display 11.3.2-104 uniformly or non-uniformly at various locations on the strip 11.3.2-108 and around the display 11.3.2-104.

In at least one example, the housing 11.3.2-102 defines a viewing opening 11.3.2-101 through which the user can view the display 11.3.2-104 when the HMD device is donned. In at least one example, the LEDs are configured and arranged to emit light through the viewing opening 11.3.2-101 and onto the user's eye. In one example, the camera 11.3.2-106 is configured to capture one or more images of the user's eye through the viewing opening 11.3.2-101.

As noted above, each of the components and features of the optical module 11.3.2-100 shown in FIG. 1O can be replicated in another (e.g., second) optical module disposed with the HMD to interact (e.g., project light and capture images) of another eye of the user.

Any of the features, components, and/or parts, including the arrangements and configurations thereof shown in FIG. 1O can be included, either alone or in any combination, in any of the other examples of devices, features, components, and parts shown in FIG. 1P or otherwise described herein. Likewise, any of the features, components, and/or parts, including the arrangements and configurations thereof shown and described with reference to FIG. 1P or otherwise described herein can be included, either alone or in any combination, in the example of the devices, features, components, and parts shown in FIG. 1O.

FIG. 1P illustrates a cross-sectional view of an example of an optical module 11.3.2-200 including a housing 11.3.2-202, display assembly 11.3.2-204 coupled to the housing 11.3.2-202, and a lens 11.3.2-216 coupled to the housing 11.3.2-202. In at least one example, the housing 11.3.2-202 defines a first aperture or channel 11.3.2-212 and a second aperture or channel 11.3.2-214. The channels 11.3.2-212, 11.3.2-214 can be configured to slidably engage respective rails or guide rods of an HMD device to allow the optical module 11.3.2-200 to adjust in position relative to the user's eyes for match the user's interpapillary distance (IPD). The housing 11.3.2-202 can slidably engage the guide rods to secure the optical module 11.3.2-200 in place within the HMD.

In at least one example, the optical module 11.3.2-200 can also include a lens 11.3.2-216 coupled to the housing 11.3.2-202 and disposed between the display assembly 11.3.2-204 and the user's eyes when the HMD is donned. The lens 11.3.2-216 can be configured to direct light from the display assembly 11.3.2-204 to the user's eye. In at least one example, the lens 11.3.2-216 can be a part of a lens assembly including a corrective lens removably attached to the optical module 11.3.2-200. In at least one example, the lens 11.3.2-216 is disposed over the light strip 11.3.2-208 and the one or more eye-tracking cameras 11.3.2-206 such that the camera 11.3.2-206 is configured to capture images of the user's eye through the lens 11.3.2-216 and the light strip 11.3.2-208 includes lights configured to project light through the lens 11.3.2-216 to the users' eye during use.

Any of the features, components, and/or parts, including the arrangements and configurations thereof shown in FIG. 1P can be included, either alone or in any combination, in any of the other examples of devices, features, components, and parts and described herein. Likewise, any of the features, components, and/or parts, including the arrangements and configurations thereof shown and described herein can be included, either alone or in any combination, in the example of the devices, features, components, and parts shown in FIG. 1P.

Figure 2:
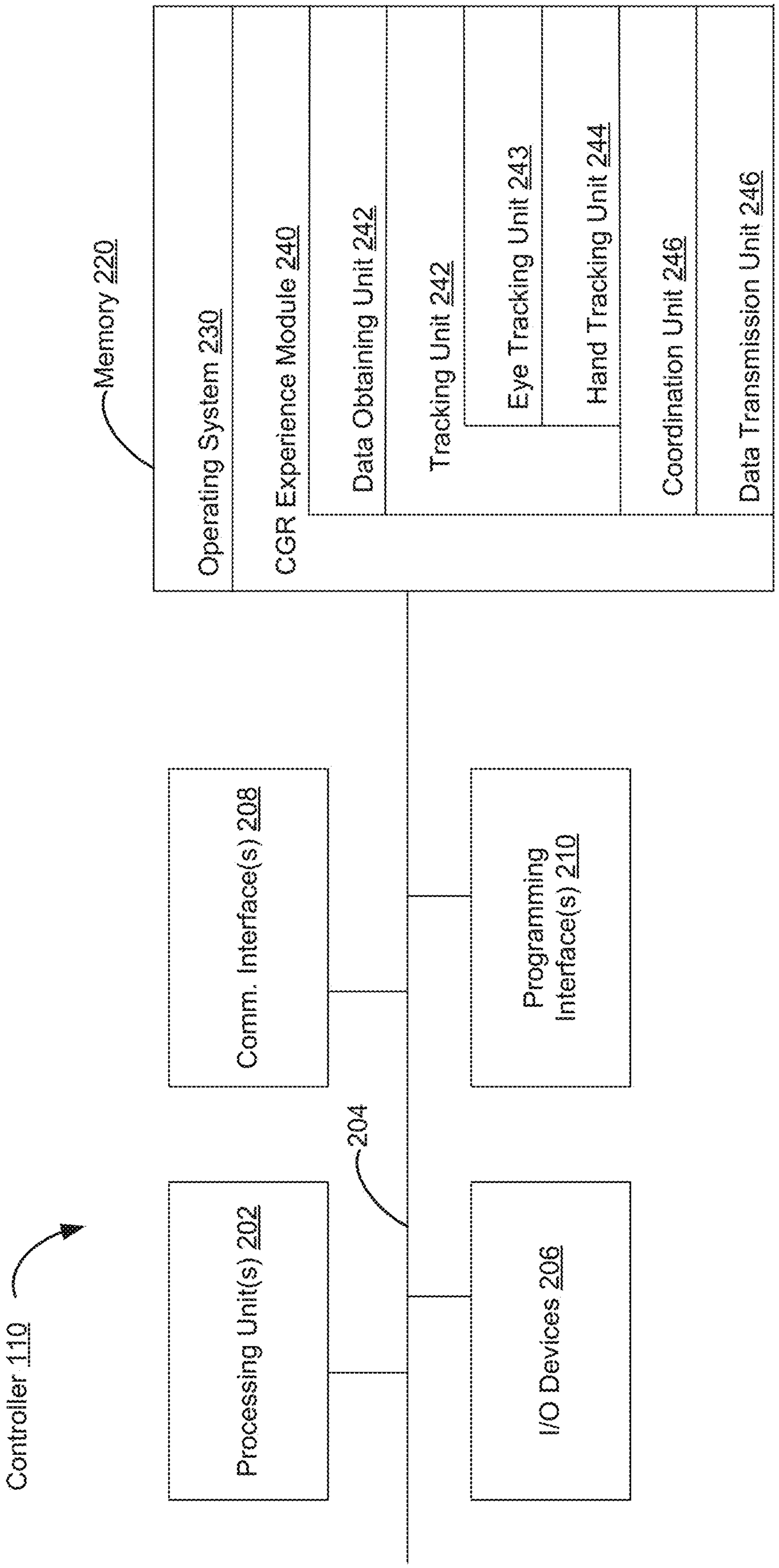
FIG. 2 is a block diagram illustrating a controller of a computer system that is configured to manage and coordinate a XR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1A, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1A, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1A, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
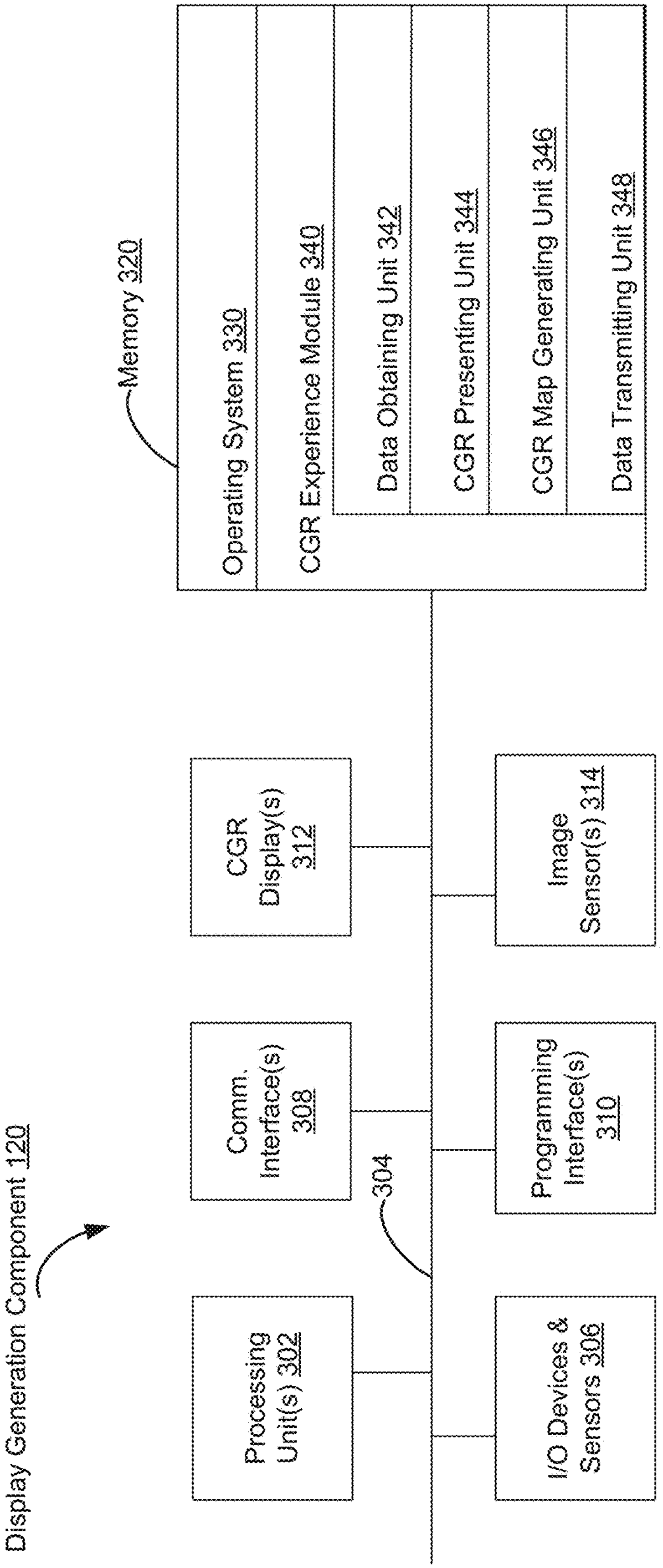
FIG. 3 is a block diagram illustrating a display generation component of a computer system that is configured to provide a visual component of the XR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes a XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, a XR presenting unit 344, a XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1A. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate a XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1A), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
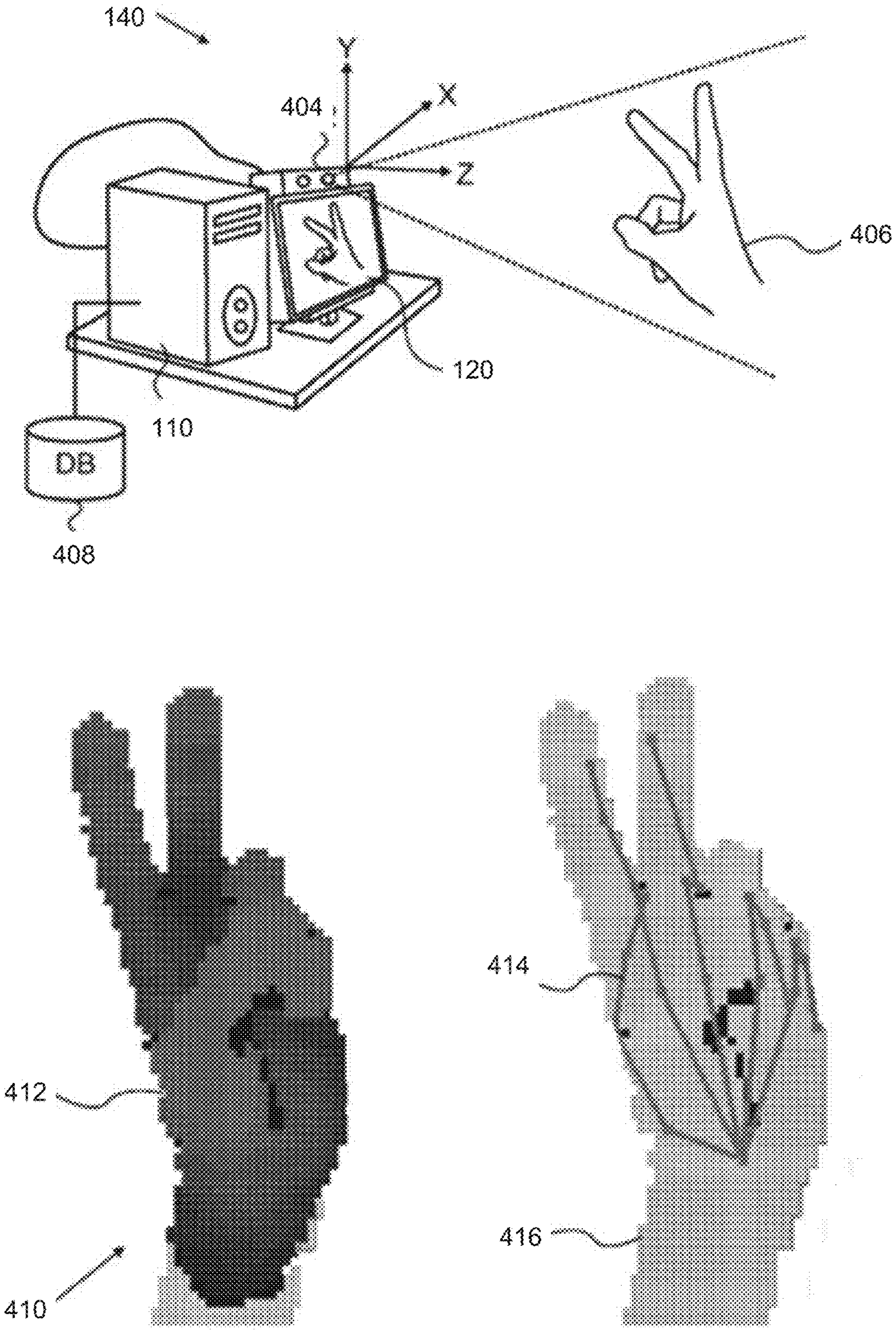
FIG. 4 is a block diagram illustrating a hand tracking unit of a computer system that is configured to capture gesture inputs of the user in accordance with some embodiments.

FIG. 4 is a schematic, pictorial illustration of an example embodiment of the hand tracking device 140. In some embodiments, hand tracking device 140 (FIG. 1A) is controlled by hand tracking unit 244 (FIG. 2) to track the position/location of one or more portions of the user's hands, and/or motions of one or more portions of the user's hands with respect to the scene 105 of FIG. 1A (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand. In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In scenarios where inputs are described with reference to air gestures, it should be understood that similar gestures could be detected using a hardware input device that is attached to or held by one or more hands of a user, where the position of the hardware input device in space can be tracked using optical tracking, one or more accelerometers, one or more gyroscopes, one or more magnetometers, and/or one or more inertial measurement units and the position and/or movement of the hardware input device is used in place of the position and/or movement of the one or more hands in the corresponding air gesture(s). In scenarios where inputs are described with reference to air gestures, it should be understood that similar gestures could be detected using a hardware input device that is attached to or held by one or more hands of a user. User inputs can be detected with controls contained in the hardware input device such as one or more touch-sensitive input elements, one or more pressure-sensitive input elements, one or more buttons, one or more knobs, one or more dials, one or more joysticks, one or more hand or finger coverings that can detect a position or change in position of portions of a hand and/or fingers relative to each other, relative to the user's body, and/or relative to a physical environment of the user, and/or other hardware input device controls, where the user inputs with the controls contained in the hardware input device are used in place of hand and/or finger gestures such as air taps or air pinches in the corresponding air gesture(s). For example, a selection input that is described as being performed with an air tap or air pinch input could be alternatively detected with a button press, a tap on a touch-sensitive surface, a press on a pressure-sensitive surface, or other hardware input. As another example, a movement input that is described as being performed with an air pinch and drag (e.g., an air drag gesture or an air swipe gesture) could be alternatively detected based on an interaction with the hardware input control such as a button press and hold, a touch on a touch-sensitive surface, a press on a pressure-sensitive surface, or other hardware input that is followed by movement of the hardware input device (e.g., along with the hand with which the hardware input device is associated) through space. Similarly, a two-handed input that includes movement of the hands relative to each other could be performed with one air gesture and one hardware input device in the hand that is not performing the air gesture, two hardware input devices held in different hands, or two air gestures performed by different hands using various combinations of air gestures and/or the inputs detected by one or more hardware input devices that are described above.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the hand skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
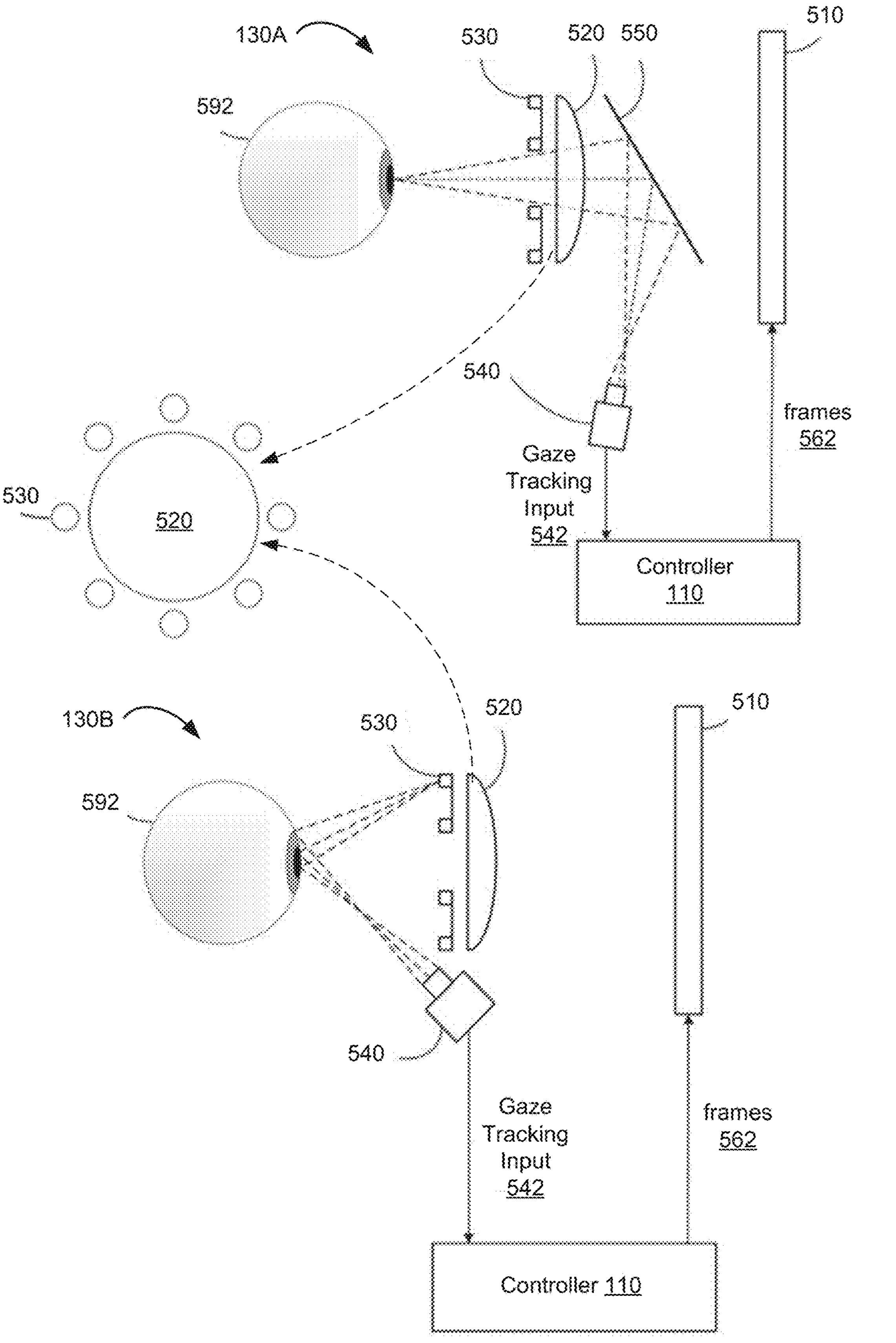
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1A). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or a XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., illumination sources 530 (e.g., IR or NIR LEDs), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight illumination sources 530 (e.g., LEDs) are arranged around each lens 520 as an example. However, more or fewer illumination sources 530 may be used, and other arrangements and locations of illumination sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm)

and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
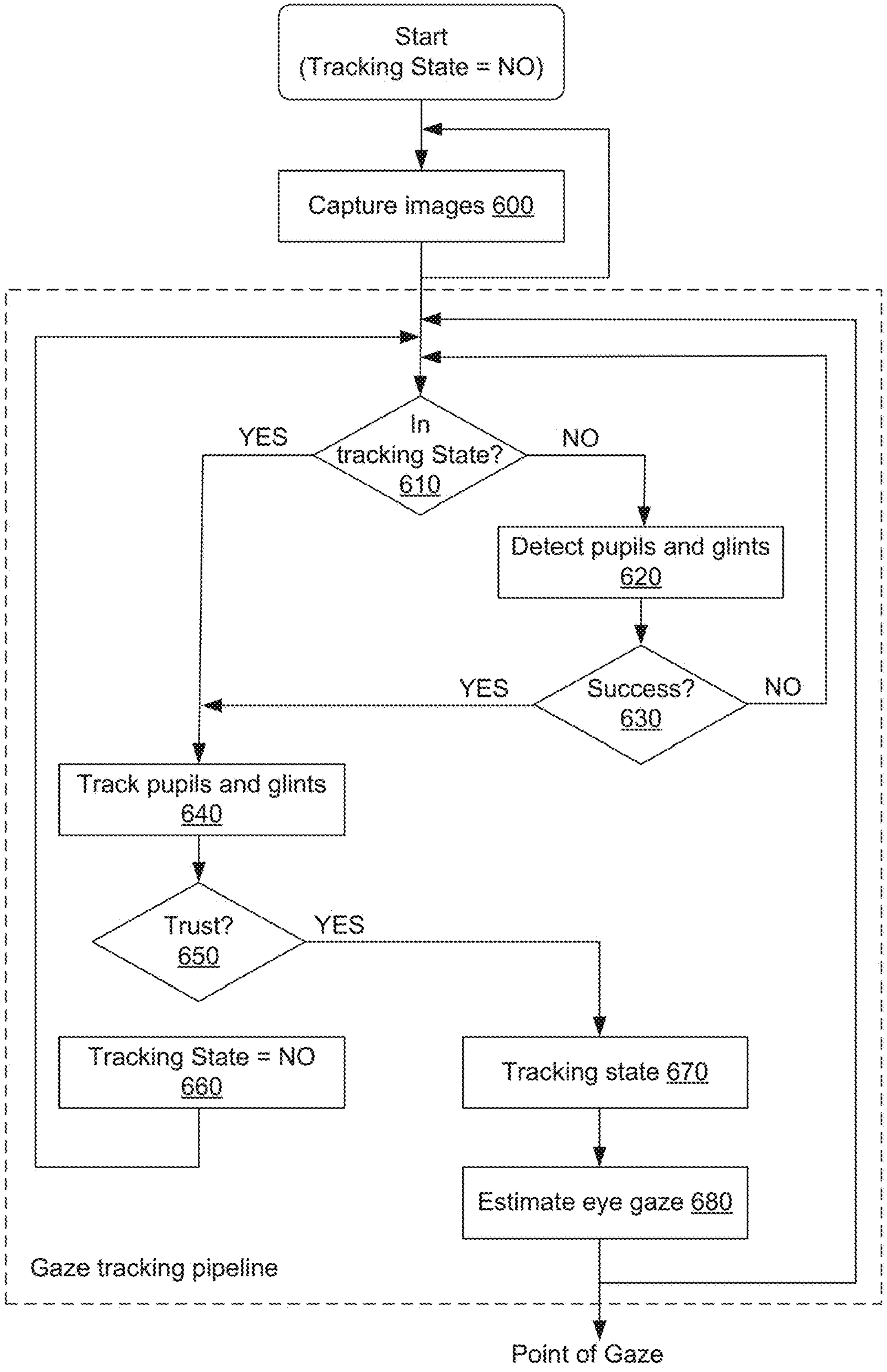
FIG. 6 is a flowchart illustrating a glint-assisted gaze tracking pipeline in accordance with some embodiments.

FIG. 6 illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1A and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In some embodiments, the captured portions of real world environment 602 are used to provide a XR experience to the user, for example, a mixed reality environment in which one or more virtual objects are superimposed over representations of real world environment 602.

Thus, the description herein describes some embodiments of three-dimensional environments (e.g., XR environments) that include representations of real world objects and representations of virtual objects. For example, a three-dimensional environment optionally includes a representation of a table that exists in the physical environment, which is captured and displayed in the three-dimensional environment (e.g., actively via cameras and displays of a computer system, or passively via a transparent or translucent display of the computer system). As described previously, the three-dimensional environment is optionally a mixed reality system in which the three-dimensional environment is based on the physical environment that is captured by one or more sensors of the computer system and displayed via a display generation component. As a mixed reality system, the computer system is optionally able to selectively display portions and/or objects of the physical environment such that the respective portions and/or objects of the physical environment appear as if they exist in the three-dimensional environment displayed by the computer system. Similarly, the computer system is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the computer system optionally displays a vase such that it appears as if a real vase is placed on top of a table in the physical environment. In some embodiments, a respective location in the three-dimensional environment has a corresponding location in the physical environment. Thus, when the computer system is described as displaying a virtual object at a respective location with respect to a physical object (e.g., such as a location at or near the hand of the user, or at or near a physical table), the computer system displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment (e.g., and/or visible via the display generation component) can interact with virtual objects that exist only in the three-dimensional environment. For example, a three-dimensional environment can include a table and a vase placed on top of the table, with the table being a view of (or a representation of) a physical table in the physical environment, and the vase being a virtual object.

In a three-dimensional environment (e.g., a real environment, a virtual environment, or an environment that includes a mix of real and virtual objects), objects are sometimes referred to as having a depth or simulated depth, or objects are referred to as being visible, displayed, or placed at different depths. In this context, depth refers to a dimension other than height or width. In some embodiments, depth is defined relative to a fixed set of coordinates (e.g., where a room or an object has a height, depth, and width defined relative to the fixed set of coordinates). In some embodiments, depth is defined relative to a location or viewpoint of a user, in which case, the depth dimension varies based on the location of the user and/or the location and angle of the viewpoint of the user. In some embodiments where depth is defined relative to a location of a user that is positioned relative to a surface of an environment (e.g., a floor of an environment, or a surface of the ground), objects that are further away from the user along a line that extends parallel to the surface are considered to have a greater depth in the environment, and/or the depth of an object is measured along an axis that extends outward from a location of the user and is parallel to the surface of the environment (e.g., depth is defined in a cylindrical or substantially cylindrical coordinate system with the position of the user at the center of the cylinder that extends from a head of the user toward feet of the user). In some embodiments where depth is defined relative to viewpoint of a user (e.g., a direction relative to a point in space that determines which portion of an environment that is visible via a head mounted device or other display), objects that are further away from the viewpoint of the user along a line that extends parallel to the direction of the viewpoint of the user are considered to have a greater depth in the environment, and/or the depth of an object is measured along an axis that extends outward from a line that extends from the viewpoint of the user and is parallel to the direction of the viewpoint of the user (e.g., depth is defined in a spherical or substantially spherical coordinate system with the origin of the viewpoint at the center of the sphere that extends outwardly from a head of the user). In some embodiments, depth is defined relative to a user interface container (e.g., a window or application in which application and/or system content is displayed) where the user interface container has a height and/or width, and depth is a dimension that is orthogonal to the height and/or width of the user interface container. In some embodiments, in circumstances where depth is defined relative to a user interface container, the height and or width of the container are typically orthogonal or substantially orthogonal to a line that extends from a location based on the user (e.g., a viewpoint of the user or a location of the user) to the user interface container (e.g., the center of the user interface container, or another characteristic point of the user interface container) when the container is placed in the three-dimensional environment or is initially displayed (e.g., so that the depth dimension for the container extends outward away from the user or the viewpoint of the user). In some embodiments, in situations where depth is defined relative to a user interface container, depth of an object relative to the user interface container refers to a position of the object along the depth dimension for the user interface container. In some embodiments, multiple different containers can have different depth dimensions (e.g., different depth dimensions that extend away from the user or the viewpoint of the user in different directions and/or from different starting points). In some embodiments, when depth is defined relative to a user interface container, the direction of the depth dimension remains constant for the user interface container as the location of the user interface container, the user and/or the viewpoint of the user changes (e.g., or when multiple different viewers are viewing the same container in the three-dimensional environment such as during an in-person collaboration session and/or when multiple participants are in a real-time communication session with shared virtual content including the container). In some embodiments, for curved containers (e.g., including a container with a curved surface or curved content region), the depth dimension optionally extends into a surface of the curved container. In some situations, z-separation (e.g., separation of two objects in a depth dimension), z-height (e.g., distance of one object from another in a depth dimension), z-position (e.g., position of one object in a depth dimension), z-depth (e.g., position of one object in a depth dimension), or simulated z dimension (e.g., depth used as a dimension of an object, dimension of an environment, a direction in space, and/or a direction in simulated space) are used to refer to the concept of depth as described above.

In some embodiments, a user is optionally able to interact with virtual objects in the three-dimensional environment using one or more hands as if the virtual objects were real objects in the physical environment. For example, as described above, one or more sensors of the computer system optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or due to projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment as if they were physical objects in the physical environment. In some embodiments, the computer system is able to update display of the representations of the user's hands in the three-dimensional environment in conjunction with the movement of the user's hands in the physical environment.

In some of the embodiments described below, the computer system is optionally able to determine the "effective" distance between physical objects in the physical world and virtual objects in the three-dimensional environment, for example, for the purpose of determining whether a physical object is directly interacting with a virtual object (e.g., whether a hand is touching, grabbing, holding, etc. a virtual object or within a threshold distance of a virtual object). For example, a hand directly interacting with a virtual object optionally includes one or more of a finger of a hand pressing a virtual button, a hand of a user grabbing a virtual vase, two fingers of a hand of the user coming together and pinching/holding a user interface of an application, and any of the other types of interactions described here. For example, the computer system optionally determines the distance between the hands of the user and virtual objects when determining whether the user is interacting with virtual objects and/or how the user is interacting with virtual objects. In some embodiments, the computer system determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the computer system optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared with the position of the virtual object of interest in the three-dimensional environment to determine the distance between the one or more hands of the user and the virtual object. In some embodiments, the computer system optionally determines a distance between a physical object and a virtual object by comparing positions in the physical world (e.g., as opposed to comparing positions in the three-dimensional environment). For example, when determining the distance between one or more hands of the user and a virtual object, the computer system optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the computer system optionally performs any of the techniques described above to map the location of the physical object to the three-dimensional environment and/or map the location of the virtual object to the physical environment.

In some embodiments, the same or similar technique is used to determine where and what the gaze of the user is directed to and/or where and at what a physical stylus held by a user is pointed. For example, if the gaze of the user is directed to a particular position in the physical environment, the computer system optionally determines the corresponding position in the three-dimensional environment (e.g., the virtual position of the gaze), and if a virtual object is located at that corresponding virtual position, the computer system optionally determines that the gaze of the user is directed to that virtual object. Similarly, the computer system is optionally able to determine, based on the orientation of a physical stylus, to where in the physical environment the stylus is pointing. In some embodiments, based on this determination, the computer system determines the corresponding virtual position in the three-dimensional environment that corresponds to the location in the physical environment to which the stylus is pointing, and optionally determines that the stylus is pointing at the corresponding virtual position in the three-dimensional environment.

Similarly, the embodiments described herein may refer to the location of the user (e.g., the user of the computer system) and/or the location of the computer system in the three-dimensional environment. In some embodiments, the user of the computer system is holding, wearing, or otherwise located at or near the computer system. Thus, in some embodiments, the location of the computer system is used as a proxy for the location of the user. In some embodiments, the location of the computer system and/or user in the physical environment corresponds to a respective location in the three-dimensional environment. For example, the location of the computer system would be the location in the physical environment (and its corresponding location in the three-dimensional environment) from which, if a user were to stand at that location facing a respective portion of the physical environment that is visible via the display generation component, the user would see the objects in the physical environment in the same positions, orientations, and/or sizes as they are displayed by or visible via the display generation component of the computer system in the three-dimensional environment (e.g., in absolute terms and/or relative to each other). Similarly, if the virtual objects displayed in the three-dimensional environment were physical objects in the physical environment (e.g., placed at the same locations in the physical environment as they are in the three-dimensional environment, and having the same sizes and orientations in the physical environment as in the three-dimensional environment), the location of the computer system and/or user is the position from which the user would see the virtual objects in the physical environment in the same positions, orientations, and/or sizes as they are displayed by the display generation component of the computer system in the three-dimensional environment (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as portable multifunction device or a head-mounted device, with a display generation component, one or more input devices, and (optionally) one or cameras.

FIGS. 7A-7EE illustrate examples of a computer system changing a visual prominence of a respective virtual object relative to a three-dimensional environment in response to detecting a threshold amount of overlap between a first virtual object and a second virtual object. In some embodiments, the computer system changes the visual prominence of a respective virtual object based on a change in spatial location of the first virtual object with respect to the second virtual object in the three-dimensional environment.

Figure 7A:
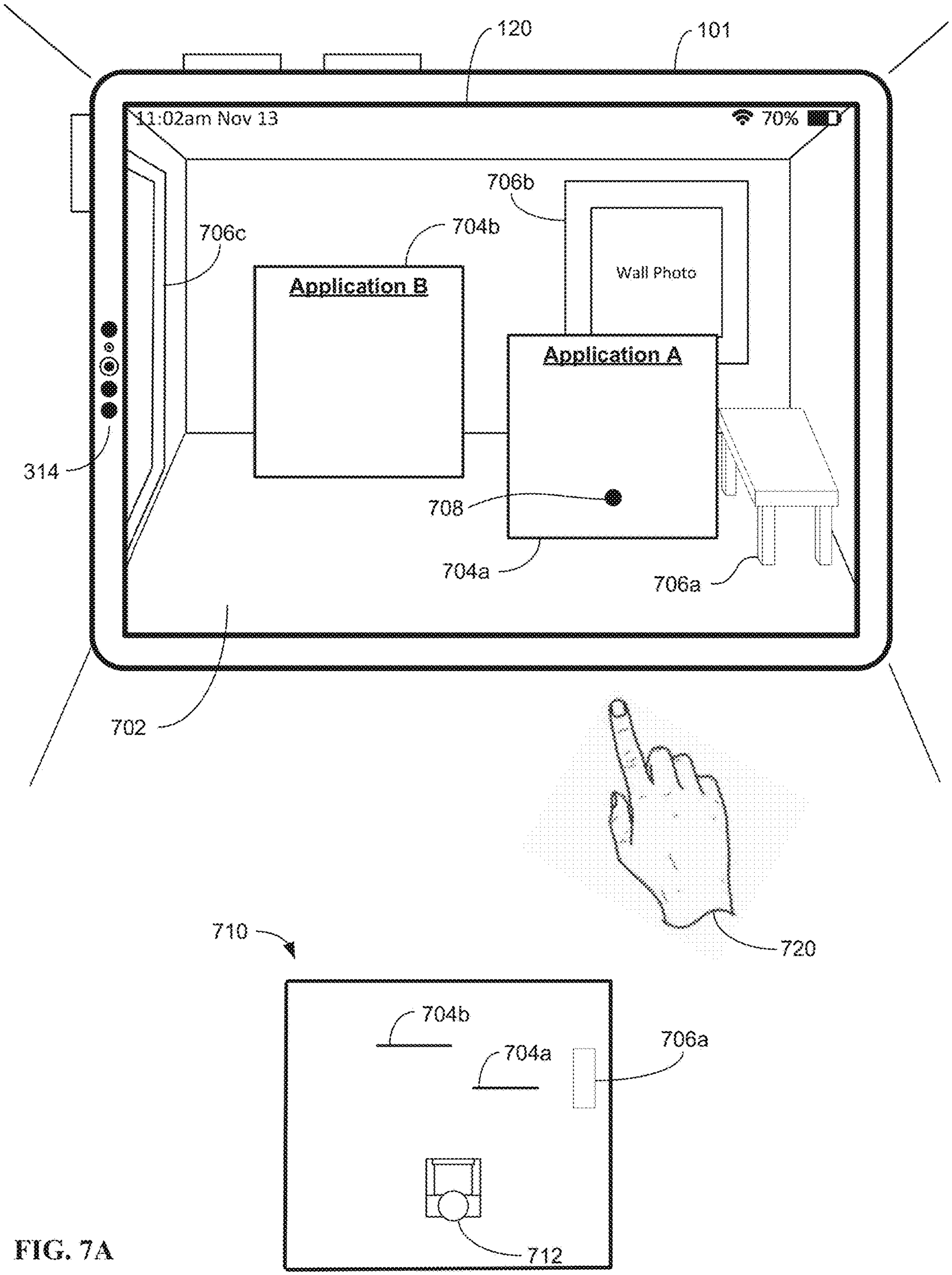
FIGS. 7A-7EE illustrate examples of changing a visual prominence of a respective virtual object in a three-dimensional environment.

FIG. 7A illustrates a computer system (e.g., an electronic device) 101 displaying, via a display generation component (e.g., display generation component 120 of FIG. 1), a three-dimensional environment 702 from a viewpoint of a user (e.g., user 712) of the computer system 101 (e.g., facing the back wall of the physical environment in which computer system 101 is located). In some embodiments, computer system 101 includes a display generation component (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user), and/or attention (e.g., gaze) of the user (e.g., internal sensors facing inwards towards the face of the user).

As shown in FIG. 7A, the computer system 101 displays a first virtual object 704*a* and a second virtual object 704*b* in three-dimensional environment 702. In some embodiments, first virtual object 704*a* and second virtual object 704*b* have one or more characteristics of the first virtual object, second virtual object and/or the respective virtual object described with reference to methods 800 and/or 900. For example, first virtual object 704*a* and/or second virtual object 704*b* are associated with one or more applications for presenting content in three-dimensional environment 702 (e.g., first virtual object 704*a* is associated with "Application A" and second virtual object 704*b* is associated with "Application B"). In some embodiments, first virtual object 704*a* and/or second virtual object 704*b* present video content (e.g., associated with video media (e.g., from a video streaming application)), website content (e.g., from a web browsing application), phone and/or message content (e.g., from a phone, messaging and/or social media application), or interactive content (e.g., from a video game application).

In FIG. 7A, one or more objects other than first virtual object 704*a* and second virtual object 704*b* are visible. Particularly, table 706*a*, wall photo 706*b* and door 706*c* are shown in FIG. 7A. In some embodiments, table 706*a*, wall photo 706*b* and door 706*c* are physical objects from a user's (e.g., user 712 described below) physical environment that are visible through optical passthrough on display generation component 120. In some embodiments, table 706*a*, wall photo 706*b* and door 706*c* are virtual representations of physical objects from the user's physical environment that are visible through virtual passthrough on display generation component 120. In some embodiments, three-dimensional environment 702 is an immersive virtual environment (e.g., fully immersive or partially immersive) and one or more objects from the physical environment of a user are not visible relative to the current viewpoint of the user. In some embodiments, first virtual object 704*a* and second virtual object 704*b* are displayed with a first amount of visual prominence (e.g., including one or more characteristics of the first amount of visual prominence relative to the three-dimensional environment as described with reference to method 800). For example, first virtual object 704*a* and second virtual object 704*b* are displayed with an amount of opacity, brightness and/or color such that content associated with first virtual object 704*a* and second virtual object 704*b* are visible relative to the current viewpoint of the user of computer system 101. In some embodiments, displaying a respective virtual object (e.g., first virtual object 704*a* or second virtual object 704*b*) with the first amount of visual prominence corresponds to the respective virtual being an active virtual object as described with reference to method 800.

An overhead view 710 is shown in FIGS. 7A-7EE of three-dimensional environment 702. Overhead view 710 shows user 712 in three-dimensional environment 702. In some embodiments, user 712 is a user of computer system 101 (e.g., user 712 is viewing three-dimensional environment 702 from a current viewpoint). In some embodiments, user 712 in overhead view 710 represents the current viewpoint of user 712 relative to three-dimensional environment 702. In overhead view 710 in FIG. 7A, first virtual object 704*a* and second virtual object 704*b* are not shown with overlap in three-dimensional environment 702 (e.g., and do not overlap relative to the current viewpoint of user 712 as shown in FIG. 7A). Particularly, first virtual object 704*a* and second virtual object 704*b* do not spatially conflict in three-dimensional environment 702 (e.g., at least a portion of first virtual object 704*a* and at least a portion of second virtual object are not displayed at the same location in three-dimensional environment 702). As shown in overhead view 710, first virtual object 704*a* includes a different spatial arrangement relative to the current viewpoint of user 712 than second virtual object 704*b*. Particularly, first virtual object 704*a* is at a first distance in the three-dimensional environment 702 and second virtual object 704*b* is at a second distance in three-dimensional environment 702, greater than the first distance, relative to the current viewpoint of user 712 in three-dimensional environment 702.

As shown in FIG. 7A, user 712 directs an input (e.g., an air pinch input, an air tap input, a pinch input, a tap input, an air pinch and drag input, an air drag input, a drag input, a click and drag input, a gaze input, and/or other input) to first virtual object 704*a*. Particularly, gaze 708 of user 712 is directed to first virtual object 704*a* (e.g., represented by a black circle in three-dimensional environment 702) and a hand 720 of user 712 is shown. In some embodiments, user 712 performs an air gesture (e.g., including one or more air gestures described with reference to methods 800 and/or 900) with hand 720 while the attention of user 712 (e.g., gaze 708) is concurrently directed to first virtual object 704*a*. In some embodiments, the input shown in FIG. 7A corresponds to a request to move (e.g., and/or change a spatial arrangement of) first virtual object 704*a* in the three-dimensional environment 702 (e.g., and/or change the spatial arrangement of first virtual object 704*a* relative to the current viewpoint of user 712). For example, the input includes hand movement (e.g., while attention is directed to first virtual object 704*a* and/or an air gesture is performed) using hand 720 corresponding to the requested movement of first virtual object 704*a* in three-dimensional environment 702. In some embodiments, the input shown in FIG. 7A has one or more characteristics of the first input described with reference to methods 800 and/or 900. In some embodiments, an input having one or more characteristics of the input shown in FIG. 7A can be directed to second virtual object 704*b* to move second virtual object 704*b* in the three-dimensional environment 702 (e.g., to change the spatial arrangement of second virtual object 704*b* relative to the current viewpoint of user 712).

FIG. 7A1 illustrates similar and/or the same concepts as those shown in FIG. 7A (with many of the same reference numbers). It is understood that unless indicated below, elements shown in FIG. 7A1 that have the same reference numbers as elements shown in FIGS. 7A-7EE have one or more or all of the same characteristics. FIG. 7A1 includes computer system 101, which includes (or is the same as) display generation component 120. In some embodiments, computer system 101 and display generation component 120 have one or more of the characteristics of computer system 101 shown in FIGS. 7A-7EE and display generation component 120 shown in FIGS. 1 and 3, respectively, and in some embodiments, computer system 101 and display generation component 120 shown in FIGS. 7A-7EE have one or more of the characteristics of computer system 101 and display generation component 120 shown in FIG. 7A1.

In FIG. 7A1, display generation component 120 includes one or more internal image sensors 314*a* oriented towards the face of the user (e.g., eye tracking cameras 540 described with reference to FIG. 5). In some embodiments, internal image sensors 314*a* are used for eye tracking (e.g., detecting a gaze of the user). Internal image sensors 314*a* are optionally arranged on the left and right portions of display generation component 120 to enable eye tracking of the user's left and right eyes. Display generation component 120 also includes external image sensors 314*b* and 314*c* facing outwards from the user to detect and/or capture the physical environment and/or movements of the user's hands. In some embodiments, image sensors 314*a*, 314*b*, and 314*c* have one or more of the characteristics of image sensors 314 described with reference to FIGS. 7A-7EE.

In FIG. 7A1, display generation component 120 is illustrated as displaying content that optionally corresponds to the content that is described as being displayed and/or visible via display generation component 120 with reference to FIGS. 7A-7EE. In some embodiments, the content is displayed by a single display (e.g., display 510 of FIG. 5) included in display generation component 120. In some embodiments, display generation component 120 includes two or more displays (e.g., left and right display panels for the left and right eyes of the user, respectively, as described with reference to FIG. 5) having displayed outputs that are merged (e.g., by the user's brain) to create the view of the content shown in FIG. 7A1.

Display generation component 120 has a field of view (e.g., a field of view captured by external image sensors 314*b* and 314*c* and/or visible to the user via display generation component 120) that corresponds to the content shown in FIG. 7A1. Because display generation component 120 is optionally a head-mounted device, the field of view of display generation component 120 is optionally the same as or similar to the field of view of the user.

In FIG. 7A1, the user is depicted as performing an air pinch gesture (e.g., with hand 720) to provide an input to computer system 101 to provide a user input directed to content displayed by computer system 101. Such depiction is intended to be exemplary rather than limiting; the user optionally provides user inputs using different air gestures and/or using other forms of input as described with reference to FIGS. 7A-7EE.

In some embodiments, computer system 101 responds to user inputs as described with reference to FIGS. 7A-7EE.

In the example of FIG. 7A1, because the user's hand is within the field of view of display generation component 120, it is visible within the three-dimensional environment. That is, the user can optionally see, in the three-dimensional environment, any portion of their own body that is within the field of view of display generation component 120. It is understood than one or more or all aspects of the present disclosure as shown in, or described with reference to FIGS. 7A-7EE and/or described with reference to the corresponding method(s) are optionally implemented on computer system 101 and display generation unit 120 in a manner similar or analogous to that shown in FIG. 7A1.

Figure 7B:
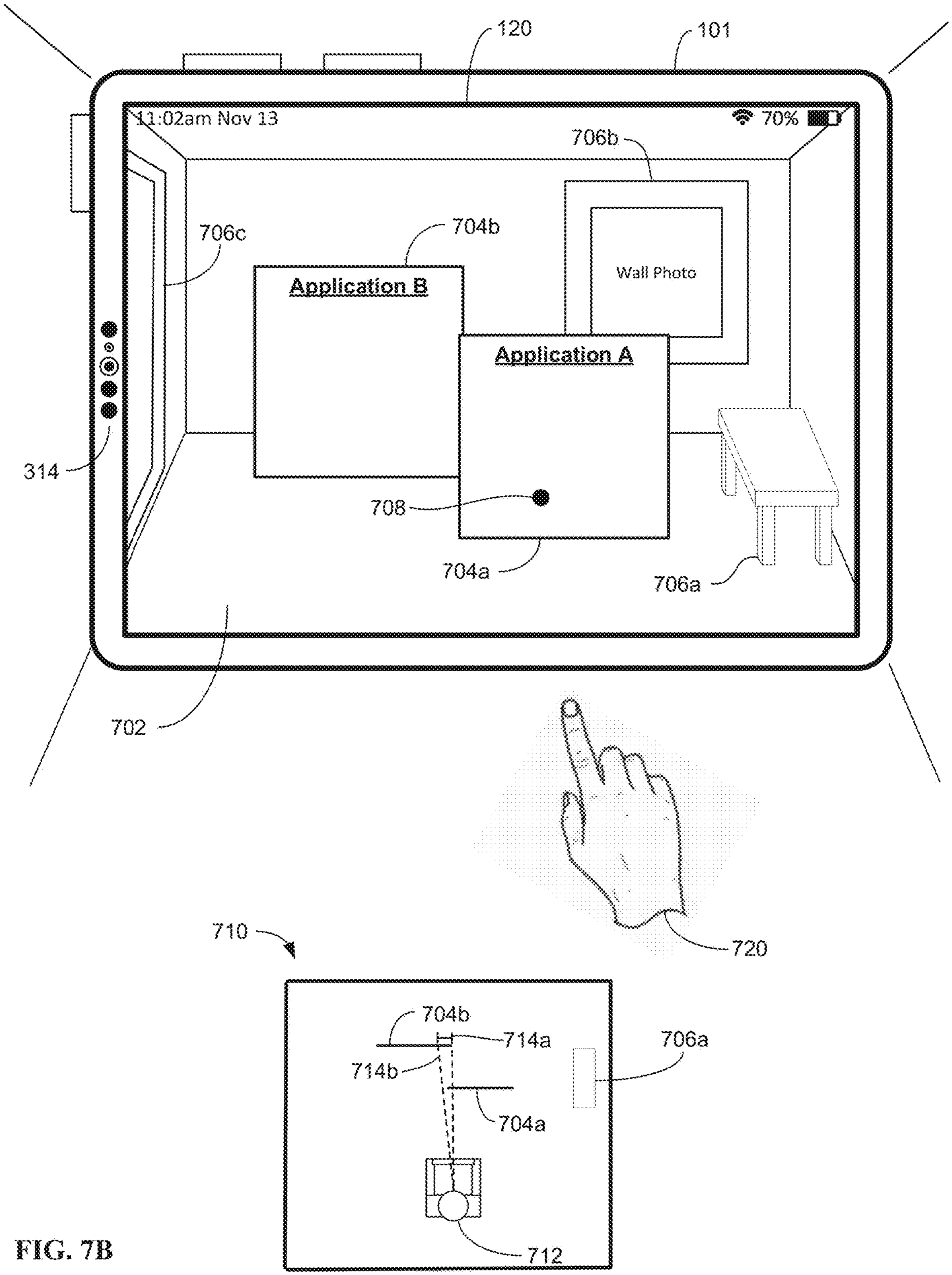

FIG. 7B illustrates movement of first virtual object 704*a* in three-dimensional environment 702 (e.g., relative to the current viewpoint of user 712) in response to the input provided by user 712 in FIG. 7A. As shown in FIG. 7B, movement of first virtual object 704*a* in three-dimensional environment 702 causes first virtual object 704*a* to at least partially overlap second virtual object 704*b* (e.g., at least a portion of first virtual object 704*a* spatially conflicts (e.g., visually obscures) second virtual object 704*b* (e.g., the first virtual object overlaps with the second virtual object from a viewpoint of the user and, optionally, the first virtual object is within a threshold distance of the second virtual object in a depth dimension) relative to the current viewpoint of user 712). Particularly, first virtual object 704*a* is displayed at a distance in three-dimensional environment 702 closer to user 712 (e.g., relative to the current viewpoint of user 712) than second virtual object 704*b*, causing a portion of first virtual object 704*a* that overlaps with second virtual object 704*b* to visually obscure a portion of second virtual object 704*b* relative to the current viewpoint of user 712.

In some embodiments, in accordance with computer system 101 detecting a threshold amount of overlap between a portion of first virtual object 704*a* and second virtual object 704*b*, a respective virtual object displayed in three-dimensional environment 702 (e.g., first virtual object 704*a* or second virtual object 704*b*) is displayed with a different visual prominence (e.g., computer system 101 reduces the visual prominence of at least a portion of the respective virtual object). Accordingly, overhead view 710 shows a schematic representation of a region (e.g., area) of overlap threshold 714*a* and an angle (e.g., angular distance) of overlap threshold 714*b* corresponding to a threshold amount of overlap (e.g., or optionally one or more threshold amounts of overlap) to be detected by computer system 101 to change a visual prominence of a respective virtual object displayed in three-dimensional environment 702. In some embodiments, in accordance with computer system 101 detecting overlap between first virtual object 704*a* and second virtual object 704*b* that exceeds the region of overlap threshold 714*a* and/or the angle of overlap 716*b* threshold, at least a portion of first virtual object 704*a* or second virtual object 704*b* is displayed with a different (e.g., reduced) visual prominence. For example, in accordance with attention of user 712 (e.g., through gaze 708 while concurrently performing an air gesture (e.g., air pinch) with hand 720) being directed to first virtual object 704*a*, second virtual object 704*b* is displayed with the different visual prominence (e.g., first virtual object 704*a* is the active virtual object). For example, in accordance with attention of user 712 (e.g., through gaze 708 while concurrently performing an air gesture (e.g., air pinch) with hand 720) being directed to second virtual object 704*b*, first virtual object 704*a* is displayed with the different visual prominence (e.g., second virtual object 704*b* is the active virtual object). In some embodiments, the threshold amount of overlap (e.g., region of overlap threshold 714*a* and/or angle of overlap threshold 714*b*) has one or more characteristics of the threshold amount of overlap between the at least a portion of the first virtual object and the second virtual object as described with reference to method 800.

As shown in FIG. 7B, the overlap between first virtual object 704*a* and second virtual object 704*b* does not exceed the region of overlap threshold 714*a* or the angle of overlap threshold 714*b*. In accordance with the overlap between first virtual object 704*a* and second virtual object 704*b* not exceeding the threshold amount of overlap, computer system 101 maintains display of the first virtual object 704*a* and second virtual object 704*b* with the first visual prominence relative to three-dimensional environment 702.

In FIG. 7B, user 712 directs an input (e.g., an air pinch input, an air tap input, a pinch input, a tap input, an air pinch and drag input, an air drag input, a drag input, a click and drag input, a gaze input, and/or other input) to first virtual object 704*a* corresponding to a request to move first virtual object 704*a* in three-dimensional environment 702 (e.g., corresponding to gaze 708 directed to first virtual object 704*a* and an air gesture and/or hand movement performed by hand 720). In some embodiments, FIG. 7B illustrates computer system 101 continuing to receive the input initiated in FIG. 7A by user 712. For example, the input shown in FIG. 7B is a continuation of the input shown in FIG. 7A (e.g., user 712 continues to move first virtual object 704*a* in three-dimensional environment 702 by continuing to direct gaze 708 to first virtual object 704*a* while continuing to perform the air gesture and/or hand movement initiated in FIG. 7A).

Figure 7C:
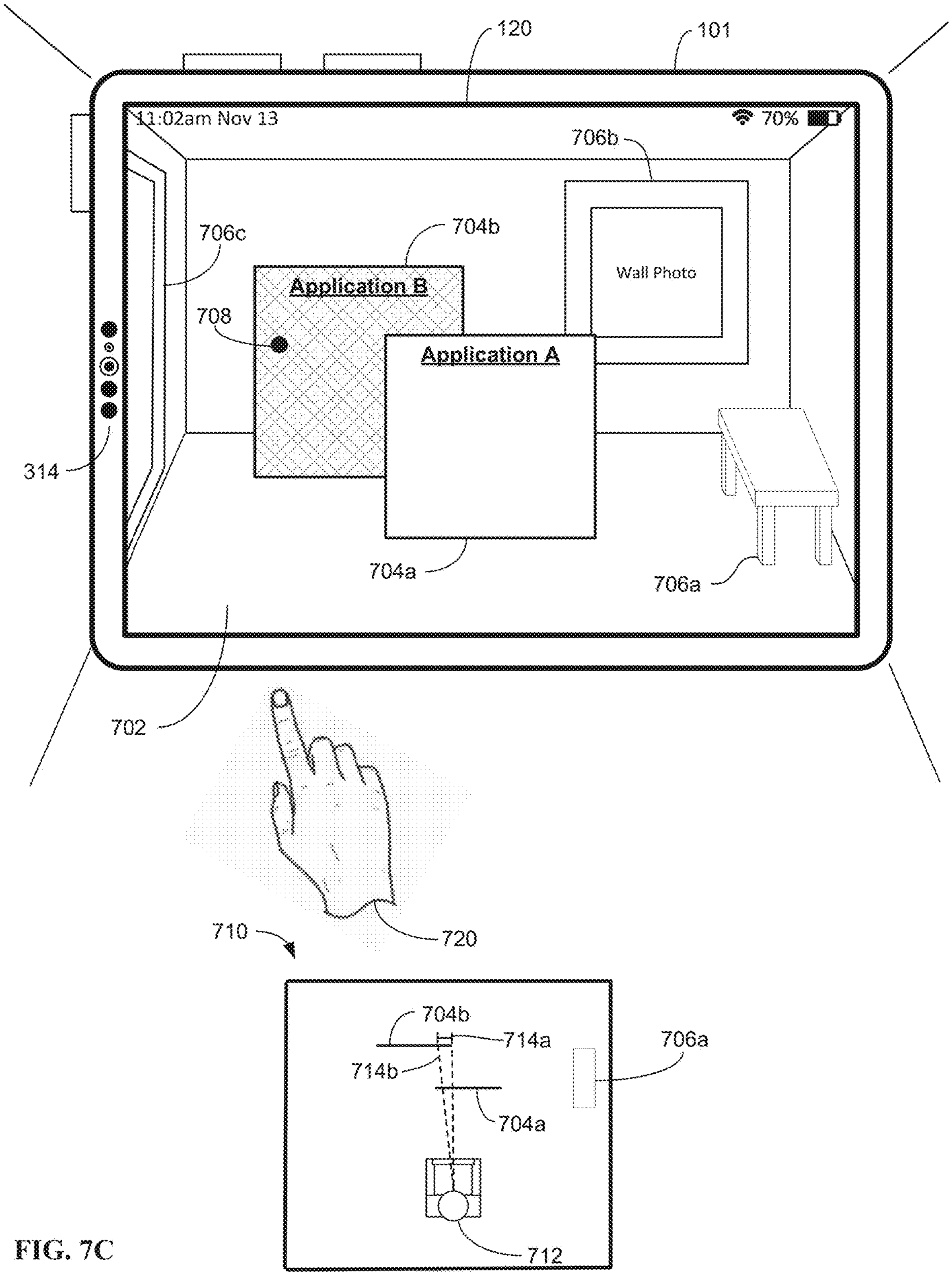

FIG. 7C illustrates movement of first virtual object 704*a* in three-dimensional environment 702 (e.g., relative to the current viewpoint of user 712) based on the input(s) provided by user 712 in FIGS. 7A-7B. Due to the movement of first virtual object 704*a* in three-dimensional environment 702 (e.g., relative to the current viewpoint of user 712), first virtual object 704*a* overlaps second virtual object 704*b* by more than the threshold amount of overlap (e.g., more than region of overlap threshold 714 and/or angle of overlap threshold 714*b* as shown in overhead view 710) relative to the current viewpoint of user 712. In accordance with the movement of first virtual object 704*a* causing more than the threshold amount of overlap with second virtual object 704*b*, second virtual object 704*b* (e.g., or optionally a portion of second virtual object 704*b*) is displayed with a second amount of visual prominence (e.g., including one or more characteristics of the second visual prominence as described with reference to method 800). In some embodiments, displaying second virtual object 704*b* with the second amount of visual prominence includes displaying second virtual object 704*b* (e.g., or optionally a portion of second virtual object 704*b*) with a reduced amount of brightness, color, saturation and/or opacity compared to displaying second virtual object 704*b* with the first amount of visual prominence (e.g., the amount of visual prominence second virtual object 704*b* is displayed with in FIG. 7A-7B). In some embodiments, displaying second virtual object 704*b* with the second amount of visual prominence includes ceasing to display a portion of second virtual object 704*b* in three-dimensional environment that is overlapped by first virtual object 704*a* relative to the current viewpoint of user 712 (e.g., the portion of second virtual object 704*b* spatially conflicts with first virtual object 704*a* (e.g., is visually obscured by first virtual object 704*a*) relative to the current viewpoint of user 712) (e.g., the second virtual object overlaps with the first virtual object from a viewpoint of the user and, optionally, the second virtual object is within a threshold distance of the first virtual object in a depth dimension). In some embodiments, second virtual object 704*b* is displayed with the second amount of visual prominence because attention of user 712 (e.g., through gaze 708 and the air gesture and/or hand movement performed by hand 720) is directed to first virtual object 704*a* while performing the input shown in FIGS. 7A-7B (e.g., first virtual object 704*a* is the active virtual object).

As shown in FIG. 7C, user 712 ceases directing an input (e.g., ceases to move a hand for more than a threshold amount of time, depinching the user's fingers for an air pinch input, closing the user's eyes, or another input that indicates an end of the input) to first virtual object 704*a* and directs an input (e.g., an air pinch input, an air tap input, a pinch input, a tap input, an air pinch and drag input, an air drag input, a drag input, a click and drag input, a gaze input, and/or other input) to second virtual object 704*b*. Particularly, gaze 708 is directed to second virtual object 704*b*. In some embodiments, while user 712 directs gaze 708 to second virtual object 704*b*, user 712 performs an air gesture (e.g., an air pinch) with hand 720. In some embodiments, the input illustrated in FIG. 7C corresponds to a request to interact with second virtual object 704*b* (e.g., and a request to display second virtual object 704*b* with the first amount of visual prominence and first virtual object 704*a* with the second amount of visual prominence). For example, the input illustrated in FIG. 7C corresponds to a request to make second virtual object 704*b* the active virtual object.

Figure 7D:
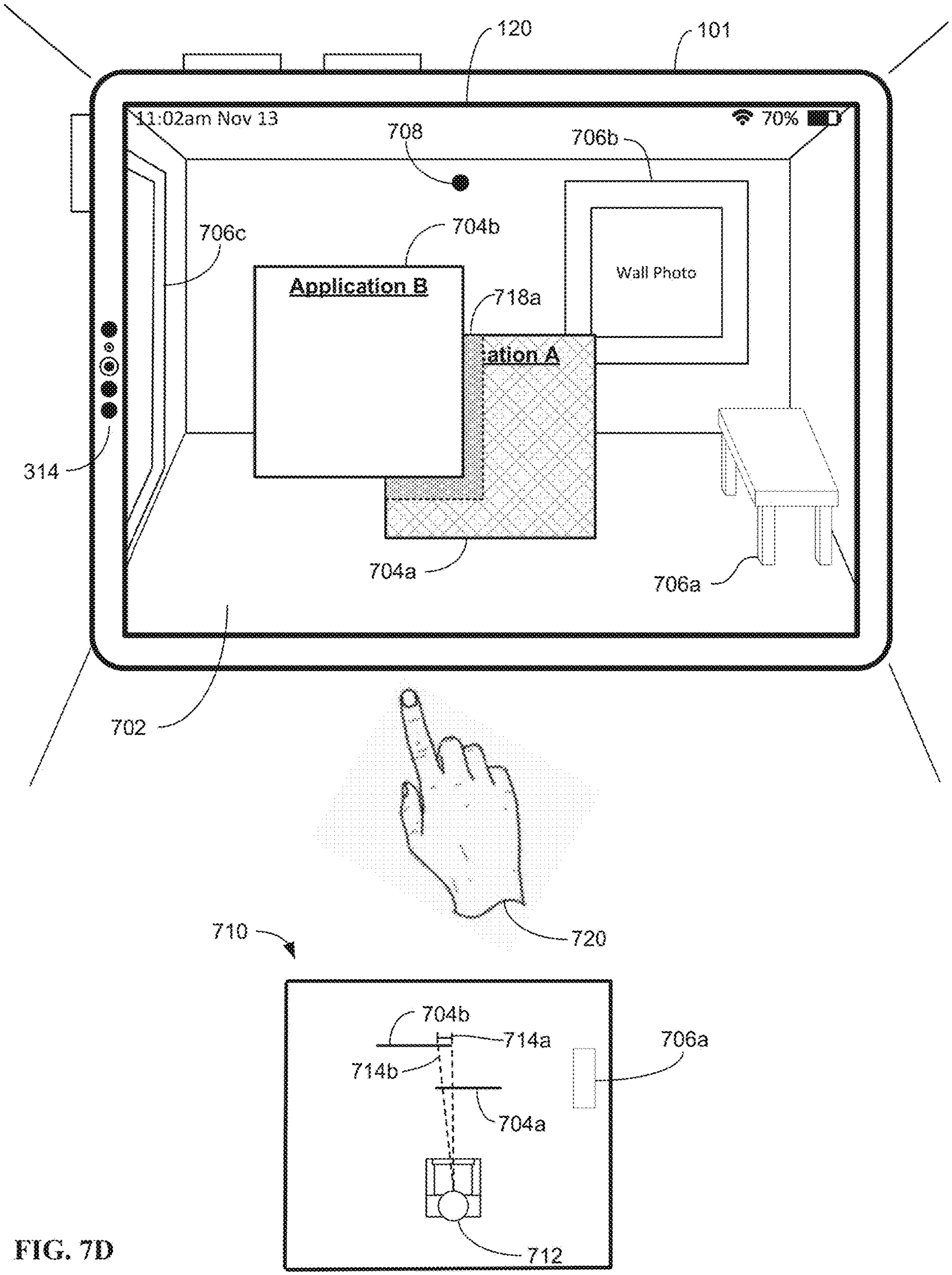

FIG. 7D illustrates second virtual object 704*b* displayed with the first amount visual prominence and first virtual object 704*a* displayed with the second amount visual prominence in response to the input provided by user 712 in FIG. 7C. In some embodiments, first virtual object 704*a* is displayed with a reduced amount of brightness, color, saturation and/or opacity in FIG. 7D compared to as shown in FIGS. 7A-7C. In some embodiments, computer system 101 ceases to display a portion of first virtual object 704*a* that is overlapped by second virtual object 704*b* in three-dimensional environment 702 (e.g., the portion of first virtual object 704*a* has one or more characteristics of the first portion of the respective portion of the respective virtual object as described with reference to method 800 and/or the first portion of the at least the portion of the second virtual object as described with reference to method 900). For example, the portion of first virtual object 704*a* has a size relative to three-dimensional environment that corresponds to a size of the portion of second virtual object 704*b* that overlaps first virtual object 704*a* relative to the current viewpoint of user 712.

As shown in FIGS. 7A-7D (e.g., in overhead view 710), second virtual object 704*b* is displayed at a greater distance from the current viewpoint user 712 compared to first virtual object 704*a*. In some embodiments, in accordance with second virtual object 704*b* being displayed at a greater distance from the current viewpoint of user 712 compared to first virtual object 704*a*, a portion 718*a* of first virtual object 704*a* is displayed with a greater amount of transparency compared to displaying the portion of the first virtual object 704*a* with the first amount of visual prominence (e.g., portion 718*a* of first virtual object 704*a* has one or more characteristics of the second portion of the respective portion of the respective virtual object as described with reference to method 800 and/or the second portion of the at least the portion of the second virtual object as described with reference to method 900). As shown in FIG. 7D, portion 718*a* of first virtual object 704*a* surrounds a portion of second virtual object 704*b* that overlaps first virtual object 704*a* relative to the current viewpoint of user 712 (e.g., portion 718*a* of first virtual object 704*a* surrounds the portion of first virtual object 704*a* that computer system 101 ceases to display in three-dimensional environment 702). In some embodiments, in FIG. 7D, second virtual object 704*b* is visible (e.g., not visually obscured by first virtual object 704*a*) despite the spatial conflict (e.g., overlap) between first virtual object 704*a* and second virtual object 704*b* and first virtual object 704*a* being displayed at a closer distance relative to the current viewpoint of user 712 (e.g., because computer system 101 ceases to display the portion of first virtual object 704*a* that visually obscures second virtual object 704*b* and displays portion 718*a* of first virtual object 704*a* that surrounds second virtual object 704*b* with transparency).

In FIG. 7D, user 712 directs an input (e.g., an air pinch input, an air tap input, a pinch input, a tap input, an air pinch and drag input, an air drag input, a drag input, a click and drag input, a gaze input, and/or other input) to empty space in three-dimensional environment 702 (e.g., a region of three-dimensional environment that does not include one or more virtual objects (e.g., first virtual object 704*a* or second virtual object 704*b*). In some embodiments, the empty space in three-dimensional environment 702 has one or more characteristics of the empty space in the three-dimensional environment as described with reference to method 800. As shown in FIG. 7D, the input directed to the empty space in three-dimensional environment 702 includes gaze 708 directed to the empty space while user 712 performs an air gesture (e.g., an air pinch) with hand 720. In some embodiments, the input illustrated in FIG. 7D corresponds to a request to change which respective virtual objects (e.g., first virtual object 704*a* or second virtual object 704*b*) is displayed with the first amount visual prominence (e.g., which respective virtual object is displayed as the active virtual object). For example, the input illustrated in FIG. 7D corresponds to a request to display a respective virtual object displayed closest relative to the current viewpoint of user 712 (e.g., first virtual object 704*a*) with the first amount of visual prominence (e.g., and one or more virtual objects displayed in three-dimensional environment 702 different from the respective virtual object (e.g., second virtual object 704*b*) with the second amount visual prominence).

Figure 7E:
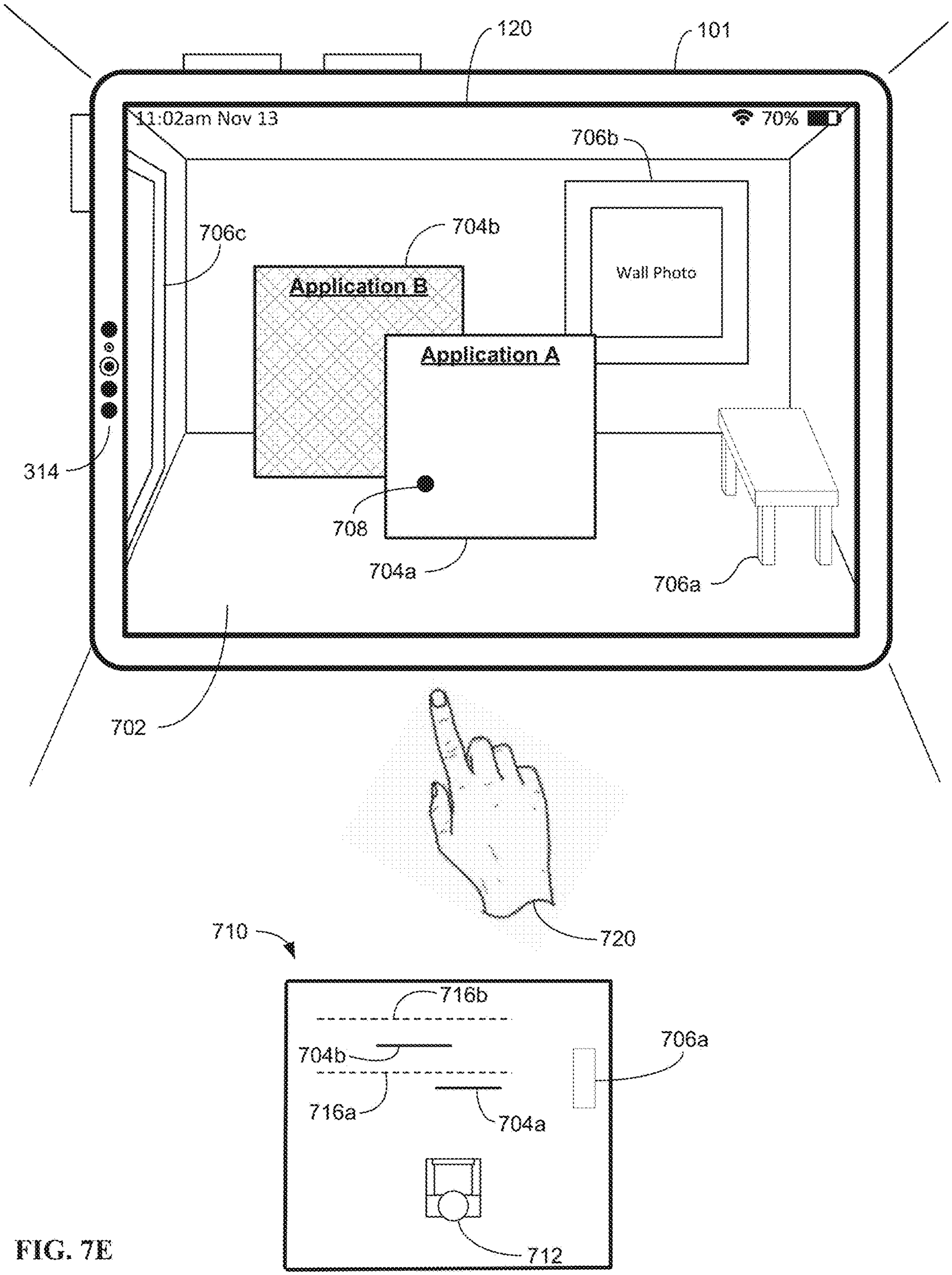

FIG. 7E illustrates first virtual object 704*a* displayed with the first amount of visual prominence and second virtual object 704*b* displayed with the second amount of visual prominence in response to the input provided by user 712 in FIG. 7D. In some embodiments, displaying first virtual object 704*a* with the first amount of visual prominence and second virtual object 704*b* with the second amount of visual prominence includes one or more characteristics of displaying first virtual object 704*a* with the first amount of visual prominence and second virtual object 704*b* with the second amount of visual prominence shown and described with reference to FIG. 7C.

In some embodiments, computer system 101 changes the visual prominence of second virtual object 704*b* based on a change in spatial location of first virtual object 704*a* with respect to second virtual object 704*b* (e.g., including one or more characteristics of changing the visual prominence of the at least the portion of the second virtual object relative to the three-dimensional environment based on the change in spatial location of the first virtual object with respect to the second virtual object during the movement of the first virtual object in the three-dimensional environment as described with reference to method 900). In FIG. 7E, overhead view 710 includes schematic representations of spatial location thresholds 716*a* and 716*b*. In some embodiments, spatial location thresholds 716*a* and 716*b* correspond to distance thresholds relative to second virtual object 704*b*. For example, the distance thresholds correspond to distances from second virtual object 704*b* in a first dimension (e.g., a direction of depth relative to the current viewpoint of user 712) in three-dimensional environment 702. In some embodiments, spatial location thresholds 716*a* and 716*b* correspond to distance thresholds relative to the current viewpoint of user 712. For example, the distance thresholds are associated with distances in the first dimension from the current viewpoint of user 712 in three-dimensional environment 702 that differ from the distance of second virtual object 704*b* from the current viewpoint of user 712 by more than a threshold amount.

As shown in FIG. 7E, an input (e.g., an air pinch input, an air tap input, a pinch input, a tap input, an air pinch and drag input, an air drag input, a drag input, a click and drag input, a gaze input, and/or other input) is directed to first virtual object 704*a*. In some embodiments, the input corresponds to a request to move first virtual object 704*a* in the three-dimensional environment in the first dimension (e.g., in the direction of depth relative to the current viewpoint of user 712). The input shown in FIG. 7E includes attention of user 712 (e.g., gaze 708) directed to first virtual object 704*a*. In some embodiments, while gaze is directed to first virtual object 704*a*, user 712 performs an air gesture (e.g., an air pinch) and/or hand movement relative to the three-dimensional environment 702 (e.g., the hand movement is in the direction of depth in three-dimensional environment 702 relative to the current viewpoint of user 712).

Figure 7F:
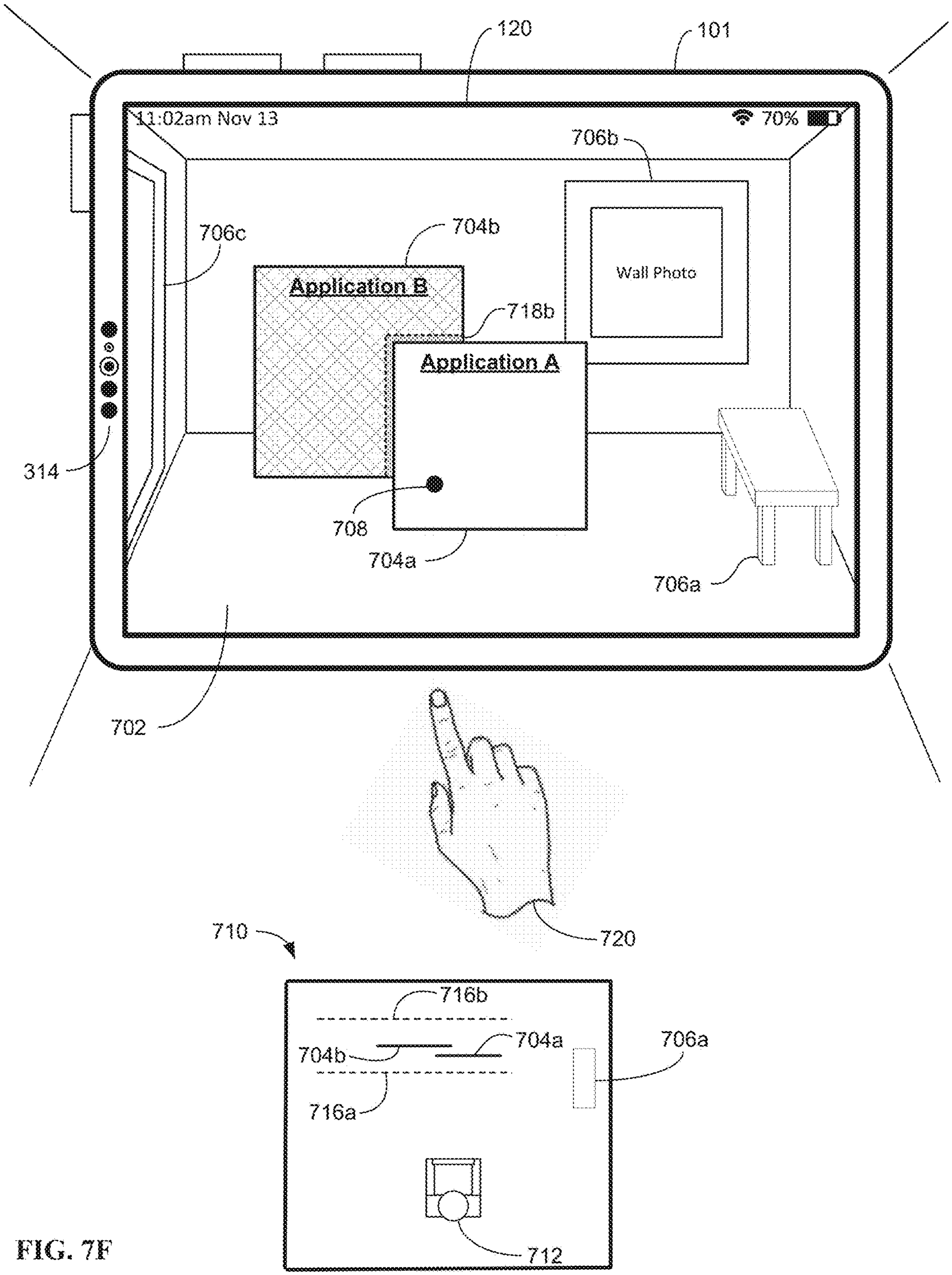

FIG. 7F illustrates movement of first virtual object 704*a* in the three-dimensional environment 702 in response to the input provided by user 712 in FIG. 7E. Based on the input provided in FIG. 7E, first virtual object 704*a* is moved (e.g., in the first dimension) in the three-dimensional environment 702 to a greater distance relative to the current viewpoint of user 712. As shown in overhead view 710, movement of first virtual object 704*a* in the first dimension in three-dimensional environment 702 causes first virtual object 704*a* to be at a spatial location with respect to second virtual object 704*b* that is within spatial location thresholds 716*a* and 716*b*. In some embodiments, due to first virtual object 704*a* being at a spatial location with respect to second virtual object 704*b* that is within spatial location thresholds 716*a* and 716*b*, computer system 101 changes the visual prominence of a portion 718*b* of second virtual object 704*b*. In some embodiments, changing the visual prominence of portion 718*b* of second virtual object 704*b* includes one or more characteristics of changing the visual prominence of portion 718*a* of first virtual object 704*a* as described above. In some embodiments, changing the visual prominence of portion 718*b* of second virtual object 704*b* includes one or more characteristics of changing the visual prominence of the at least the portion of the second virtual object relative to the three-dimensional environment based on the change in the spatial location of the first virtual object with respect to the second virtual object during the movement of the first virtual object in the three-dimensional environment as described with reference to method 900. For example, portion 718*b* of second virtual object 704*b* is displayed with a greater amount of transparency compared to displaying portion 718*b* with the first amount of visual prominence. In some embodiments, based on the spatial location of first virtual object 704*a* with respect to second virtual object 704*b* during the movement of first virtual object 704*a* in three-dimensional environment 702 (e.g., and in accordance with first virtual object 704*a* being within spatial location thresholds 716*a* and 716*b*), computer system 101 reduces the visual prominence of second virtual object 704*b* by a different magnitude. In some embodiments, reducing the visual prominence by a different magnitude includes changing the size of portion 718*b* that is displayed with a greater amount of transparency based on the spatial location of first virtual object 704*a* with respect to second virtual object

704*b*. For example, in FIG. 7F, portion 718*b* of second virtual object 704*b* is a first size relative to three-dimensional environment 702. In some embodiments, the size of portion 718*b* increases as first virtual object 704*a* is moved closer to second virtual object 704*b* (e.g., relative to the first dimension) in three-dimensional environment 702 (e.g., as the difference between the distance of first virtual object 704*a* relative to the current viewpoint of user 712 and the distance of second virtual object 704*b* relative to the current viewpoint of user 712 becomes less, the size of portion 718*b* increases relative to three-dimensional environment 702). In FIG. 7F, as portion 718*b* of second virtual object 704*b* is displayed with the greater amount of transparency, a portion of second virtual object 704*b* different from portion 718*b* (e.g., the remainder of second virtual object 704*b* outside of portion 718*b*) continues to be displayed with the second amount of visual prominence (e.g., with the amount of visual prominence as shown in FIG. 7E). In FIG. 7F, a portion of second virtual object 704*b* that spatially conflicts (e.g., is visually obscured by) first virtual object 704*a* (e.g., the portion of the second virtual object is overlapped by the first virtual object from a viewpoint of the user and, optionally, the second virtual object is within a threshold distance of the first virtual object in a depth dimension) relative to the current viewpoint of user 712 ceases to be displayed in three-dimensional environment 702 (e.g., as shown and described with reference to FIG. 7C).

As shown in FIG. 7F, an input (e.g., an air pinch input, an air tap input, a pinch input, a tap input, an air pinch and drag input, an air drag input, a drag input, a click and drag input, a gaze input, and/or other input) is directed to first virtual object 704*a* corresponding to a request to move first virtual object 704*a* in three-dimensional environment 702 (e.g., the input shown in FIG. 7F has one or more characteristics of the input shown and described with reference to FIG. 7E). In some embodiments, FIG. 7F illustrates computer system 101 continuing to receive the input initiated in FIG. 7E by user 712. For example, the input shown in FIG. 7F is a continuation of the input shown in FIG. 7E (e.g., user 712 continues to move first virtual object 704*a* (e.g., in the first dimension) in three-dimensional environment 702 by continuing to direct gaze 708 to first virtual object 704*a* while performing the air gesture and/or hand movement initiated in FIG. 7E.

Figure 7G:
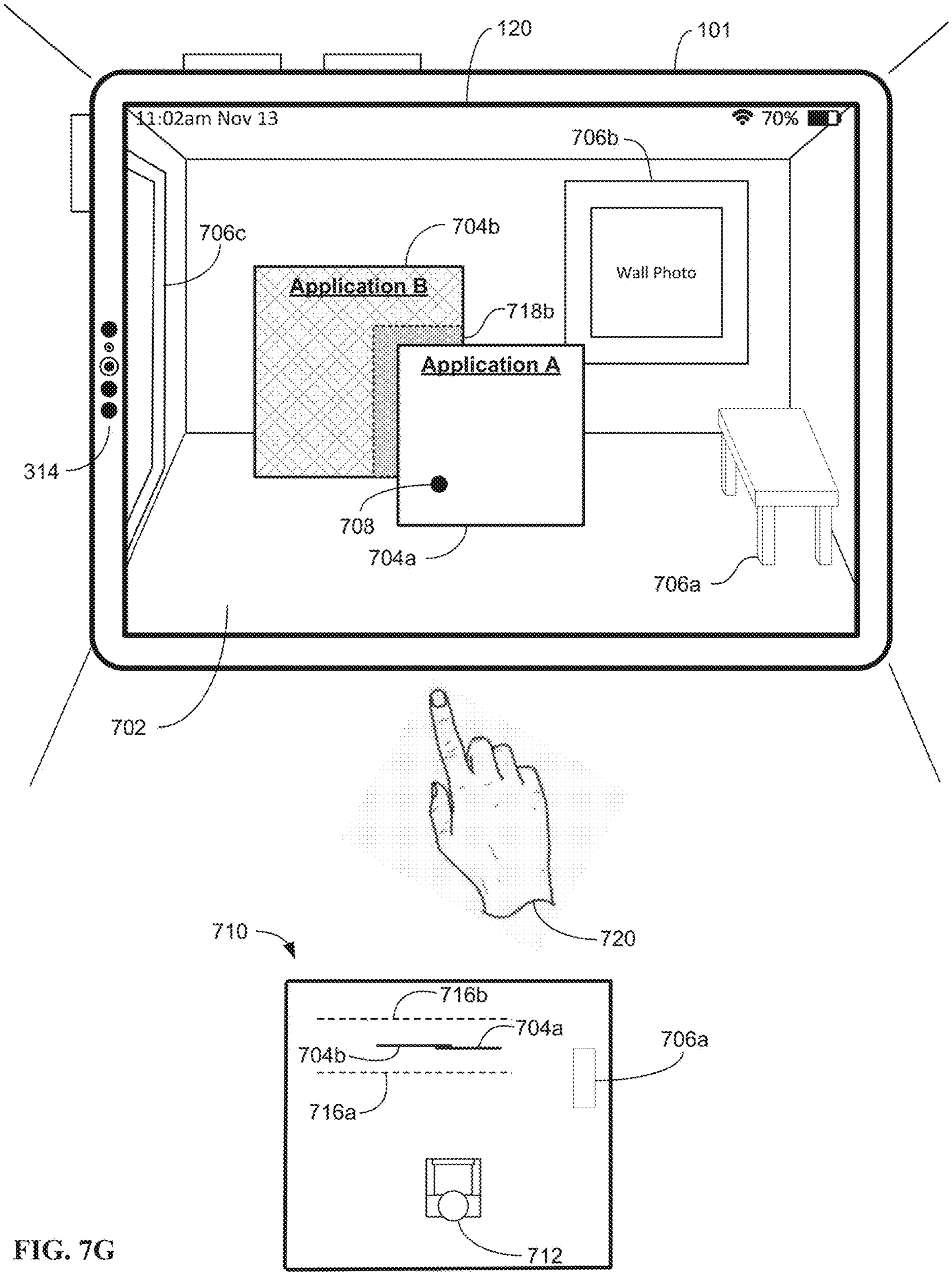

FIG. 7G illustrates movement of first virtual object 704*a* in three-dimensional environment 702 in response to the input provided by user 712 in FIG. 7F. As shown in overhead view 710, first virtual object 704*a* spatially conflicts with second virtual object 704*b* relative to three-dimensional environment 702 (e.g., a portion of first virtual object 704*a* is at the same location in three-dimensional environment 702 as a portion of second virtual object 704*b*) (e.g., the first virtual object overlaps with the second virtual object from a viewpoint of the user and, optionally, the first virtual object is within a threshold distance of the second virtual object in a depth dimension). In some embodiments, in FIG. 7G, first virtual object 704*a* is at a same distance from the current viewpoint of user 712 as second virtual object 704*b* in three-dimensional environment 702.

As a result of the spatial location of first virtual object 704*a* with respect to second virtual object 704*b* changing (e.g., first virtual object 704*a* has moved in three-dimensional environment 702 closer to second virtual object 704*b* compared to as previously shown and described in FIG. 7F), the visual prominence of second virtual object 704*b* is reduced by a greater magnitude in FIG. 7G. For example, portion 718*b* has a second size, larger than the first size of portion 718*b* (e.g., as shown and described with reference to FIG. 7F), relative to three-dimensional environment 702. For example, portion 718*b* is displayed with a greater amount of transparency compared to portion 718*b* shown in FIG. 7F. In some embodiments, the size of portion 718*b* is a maximum size relative to three-dimensional environment 702 (e.g., because first virtual object 704*a* is located at a same distance from the current viewpoint of user 712 as second virtual object 704*b* in three-dimensional environment 702). In some embodiments, portion 718*b* is displayed with a maximum amount of transparency (e.g., because first virtual object 704*a* is located at a same distance from the current viewpoint of user 712 as second virtual object 704*b* in three-dimensional environment 702). In FIG. 7G, as portion 718*b* of second virtual object 704*b* is displayed with the greater amount of transparency, a portion of second virtual object 704*b* different from portion 718*b* (e.g., the remainder of second virtual object 704*b* outside of portion 718*b*) continues to be displayed with the second amount of visual prominence. In FIG. 7G, a portion of second virtual object 704*b* that spatially conflicts with (e.g., is visually obscured by) first virtual object 704*a* relative to the current viewpoint of user 712 ceases to be displayed in three-dimensional environment 702 (e.g., as shown and described with reference to FIG. 7C) (e.g., the portion of the second virtual object is overlapped by the first virtual object from a viewpoint of the user and, optionally, the second virtual object is within a threshold distance of the first virtual object in a depth dimension).

As shown in FIG. 7G, an input is directed to first virtual object 704*a* corresponding to a request to move first virtual object 704*a* in three-dimensional environment 702 (e.g., the input shown in FIG. 7G has one or more characteristics of the input shown and described with reference to FIG. 7E). In some embodiments, FIG. 7G illustrates computer system 101 continuing to receive the input initiated in FIG. 7E by user 712. For example, the input shown in FIG. 7G is a continuation of the input shown in FIGS. 7E-7F (e.g., user 712 continues to move first virtual object 704*a* in three-dimensional environment 702 by continuing to direct gaze 708 to first virtual object 704*a* while concurrently performing the air gesture and/or hand movement initiated in FIG. 7E). In some embodiments, the input shown in FIG. 7G corresponds to a request to move first virtual object 704*a* in a second (e.g., and/or third) dimension different from the first dimension (e.g., the input corresponds to a request to move first virtual object 704*a* laterally and/or vertically (e.g., and not in a direction of depth)) relative to the current viewpoint of user 712.

Figure 7H:
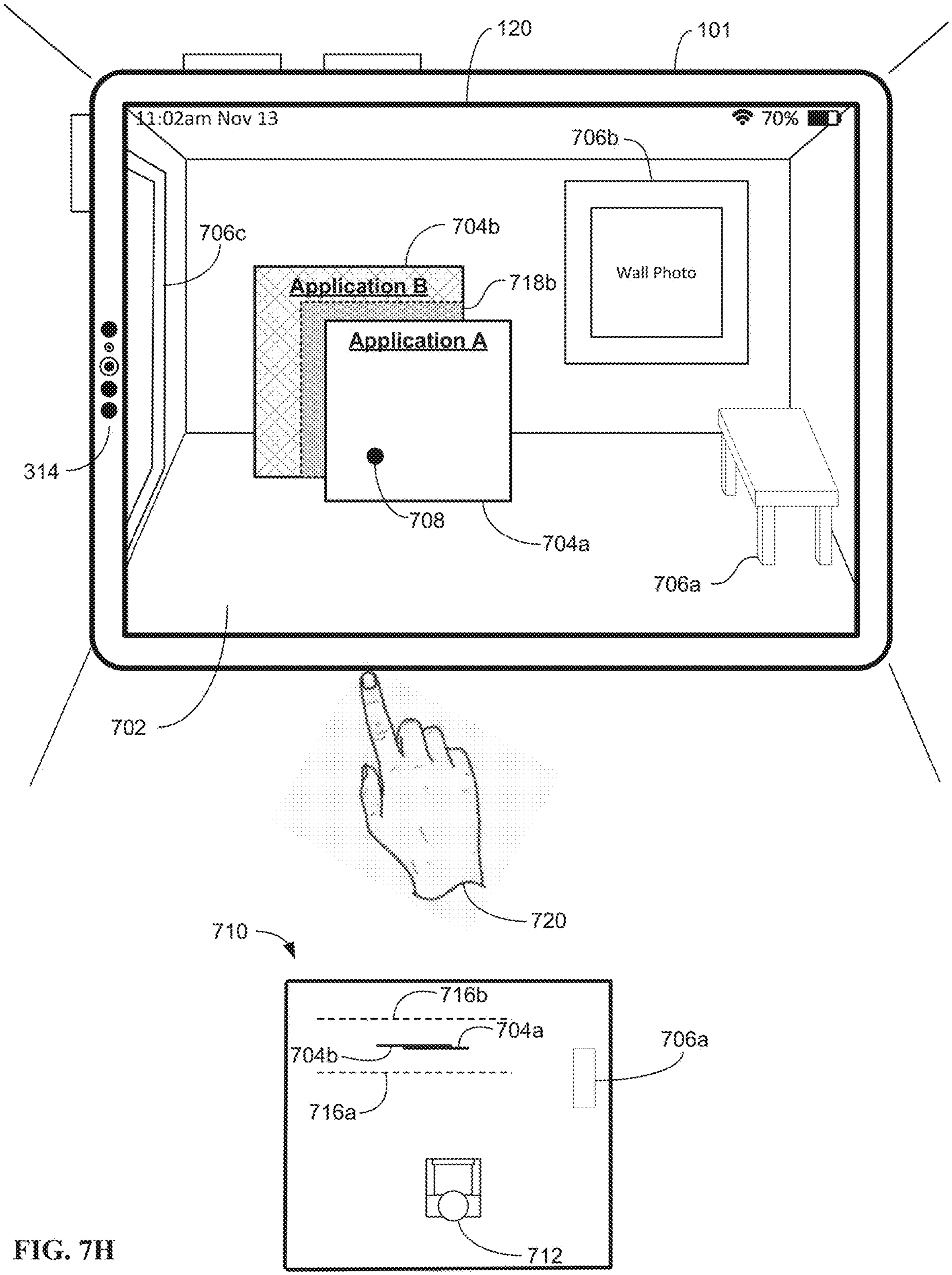

FIG. 7H illustrates movement of first virtual object 704*a* in three-dimensional environment 702 in response to the input provided by user 712 in FIG. 7G. Particularly, first virtual object 704*a* is moved vertically and laterally in three-dimensional environment 702 relative to the current viewpoint of user 712. As a result of the movement of first virtual object 704*a* in three-dimensional environment 702 (e.g., relative to the current viewpoint of user 712), the spatial conflict (e.g., amount of overlap) between first virtual object 704*a* and second virtual object 704*b* changes (e.g., first virtual object 704*a* overlaps second virtual object 704*b* by a greater amount (e.g., a larger region of first virtual object 704*a* and second virtual object 704*b* overlap relative to the current viewpoint of user 712)). In response to the movement of first virtual object 704*a*, computer system 101 changes the display of portion 718*b* of second virtual object 704*b* displayed with the greater amount of transparency and changes the size of the portion of second virtual object 704*b* that ceases to be displayed in three-dimensional environment 702 (e.g., changing the display of portion 718*b* of second virtual object and changing the size of the portion of second virtual object that ceases to be displayed in three-dimensional environment 702 includes one or more characteristics of redisplaying the first portion of the at least the portion of the second virtual object in the three-dimensional environment and ceasing to display a third portion, different from the first portion, of the at least the portion of the second virtual object in the three-dimensional environment based on the change in the spatial conflict of the second virtual object with respect to the first virtual object during the movement of the first virtual object in the three-dimensional environment as described with reference to method 900). As shown in FIG. 7H, portion 718*b* of second virtual object 704*b* corresponds to a different portion of second virtual object 704*b* (e.g., because a different portion of second virtual object 704*b* spatially conflicts with first virtual object 704*a* (e.g., the portion of the second virtual object overlaps with the first virtual object from a viewpoint of the user and, optionally, the second virtual object is within a threshold distance of the first virtual object in a depth dimension) relative to the current viewpoint of user 712 compared to as shown in FIG. 7G). In FIG. 7H, a different portion (e.g., a portion of a larger size compared to as shown in FIG. 7G) of second virtual object 704*b* ceases to be displayed in three-dimensional environment 702 (e.g., because a larger portion of first virtual object 704*a* spatially conflicts with second virtual object 704*b* (e.g., the portion of the first virtual object overlaps with the second virtual object from a viewpoint of the user and, optionally, the first virtual object is within a threshold distance of the second virtual object in a depth dimension) relative to the current viewpoint of user 712 compared to as shown in FIG. 7G). In FIG. 7H, as portion 718*b* of second virtual object 704*b* is displayed with the greater amount of transparency, a portion of second virtual object 704*b* different from portion 718*b* (e.g., the remainder of second virtual object 704*b* outside of portion 718*b* (e.g., optionally of a different size relative to three-dimensional environment 702 compared to as shown in FIG. 7G due to the change in spatial conflict between first virtual object 704*a* and second virtual object 704*b*)) continues to be displayed with the second amount of visual prominence.

As shown in FIG. 7H, an input (e.g., an air pinch input, an air tap input, a pinch input, a tap input, an air pinch and drag input, an air drag input, a drag input, a click and drag input, a gaze input, and/or other input) is directed to first virtual object 704*a* corresponding to a request to move first virtual object 704*a* in three-dimensional environment 702 (e.g., the input shown in FIG. 7H has one or more characteristics of the input shown and described with reference to FIG. 7E). In some embodiments, FIG. 7F illustrates computer system 101 continuing to receive the input initiated in FIG. 7E by user 712. For example, the input shown in FIG. 7F is a continuation of the input shown in FIGS. 7E-7G (e.g., user 712 continues to move first virtual object 704*a* in three-dimensional environment 702 by continuing to direct gaze 708 to first virtual object 704*a* while concurrently performing the air gesture and/or hand movement initiated in FIG. 7E). In some embodiments, the input shown in FIG. 7H corresponds to a request to move first virtual object 704*a* in the first dimension (e.g., in a direction of depth) relative to the current viewpoint of user 712.

Figure 7I:
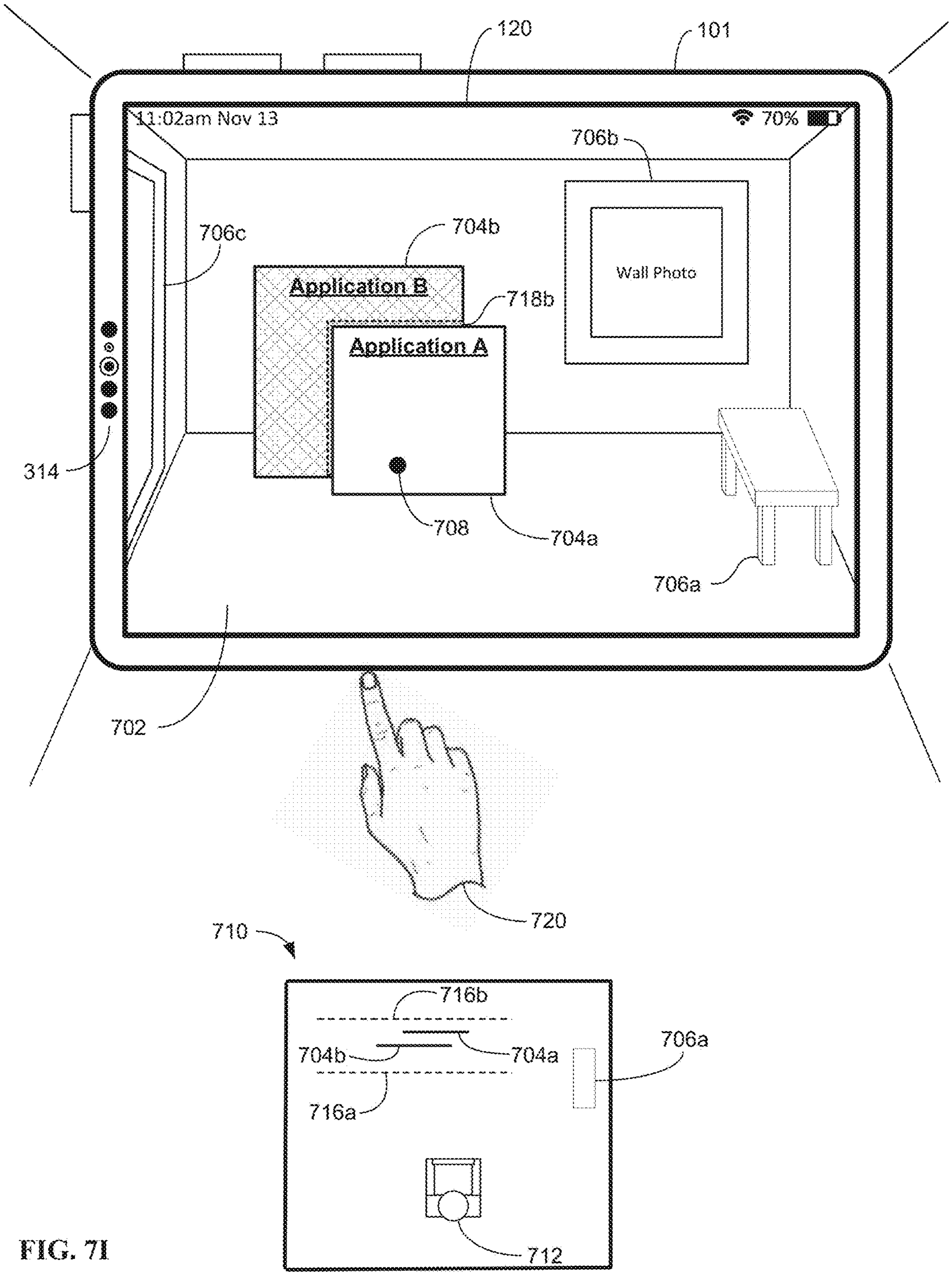

FIG. 7I illustrates movement of first virtual object 704*a* in three-dimensional environment 702 in response to the input provided by user 712 in FIG. 7H. As shown in overhead view 710, first virtual object 704*a* is moved in three-dimensional environment 702 to a location with a greater distance relative to the current viewpoint of user 712 compared to the distance of second virtual object 704*b* relative to the current viewpoint of user 712. Further, as shown in overhead view 710, first virtual object 704*a* is displayed at a location in three-dimensional environment 702 within spatial location thresholds 716*a* and 716*b*. As a result of the movement of first virtual object 704*a* (e.g., the change in spatial arrangement of first virtual object 704*a* relative to the current viewpoint of user 712) in three-dimensional environment 702, the spatial location of first virtual object 704*a* with respect to second virtual object 704*b* changes (e.g., compared to as shown in FIG. 7H (e.g., first virtual object 704*a* is no longer located at the same distance from the current viewpoint of user 712 as second virtual object 704*b* in three-dimensional environment 702)). Based on the change in spatial location of first virtual object 704*a* with respect to second virtual object 704*b*, computer system 101 changes the visual prominence second virtual object 704*b* is displayed with. In some embodiments, because of the difference between the distance of first virtual object 704*a* relative to the current viewpoint of user 712 and the distance of second virtual object 704*b* relative to the current viewpoint of user 712 is greater compared to as shown in FIG. 7H (e.g., and because first virtual object 704*a* is displayed within spatial location thresholds 716*a* and 716*b*), computer system 101 displays second virtual object 704*b* with a greater amount of visual prominence compared to as shown in FIG. 7H. For example, as shown in FIG. 7I, portion 718*b* is displayed with a reduced size relative to three-dimensional environment 702 compared to as shown in FIG. 7H. In some embodiments, portion 718*b* is displayed with a reduced amount of transparency compared to as shown in FIG. 7H. In FIG. 7I, as portion 718*b* of second virtual object 704*b* is displayed with the greater amount of transparency, a portion of second virtual object 704*b* different from portion 718*b* (e.g., the remainder of second virtual object 704*b* outside of portion 718*b* (e.g., optionally of a different size relative to three-dimensional environment 702 compared to as shown in FIG. 7H due to the change in size of portion 718*b*)) continues to be displayed with the second amount of visual prominence. In FIG. 7I, a portion of second virtual object 704*b* that spatially conflicts with (e.g., is visually obscured by) first virtual object 704*a* relative to the current viewpoint of user 712 ceases to be displayed in three-dimensional environment 702 (e.g., as shown and described with reference to FIG. 7H) (e.g., the portion of the second virtual object is overlapped by the first virtual object from a viewpoint of the user and, optionally, the second virtual object is within a threshold distance of the first virtual object in a depth dimension).

As shown in FIG. 7I, an input (e.g., an air pinch input, an air tap input, a pinch input, a tap input, an air pinch and drag input, an air drag input, a drag input, a click and drag input, a gaze input, and/or other input) is directed to first virtual object 704*a* corresponding to a request to move first virtual object 704*a* in three-dimensional environment 702 (e.g., the input shown in FIG. 7I has one or more characteristics of the input shown and described with reference to FIG. 7E). In some embodiments, FIG. 7I illustrates computer system 101 continuing to receive the input initiated in FIG. 7E by user 712. For example, the input shown in FIG. 7I is a continuation of the input shown in FIGS. 7E-7H (e.g., user 712 continues to move first virtual object 704*a* in three-dimensional environment 702 by continuing to direct gaze 708 to first virtual object 704*a* while concurrently performing the air gesture and/or hand movement initiated in FIG. 7E). In some embodiments, the input shown in FIG. 7I corresponds to a request to further move first virtual object 704*a* in the first dimension (e.g., in a direction of depth) relative to the current viewpoint of user 712.

Figure 7J:
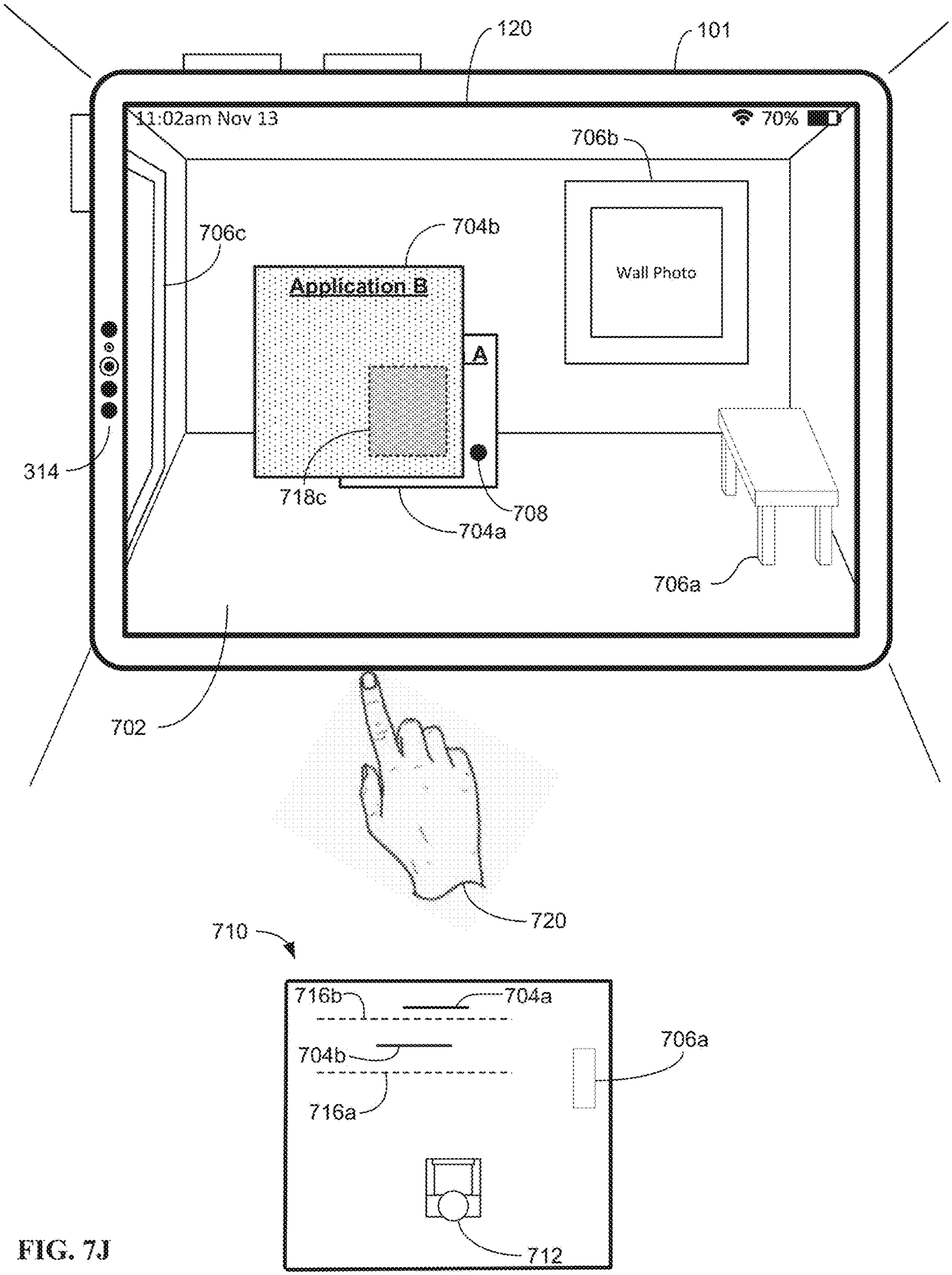

FIG. 7J illustrates movement of first virtual object 704*a* in three-dimensional environment 702 in response to the input provided by user 712 in FIG. 7I. As shown in overhead view 710, first virtual object 704*a* is moved to a location in three-dimensional environment 702 with a greater distance relative to the current viewpoint of user 712 compared to the distance of first virtual object 704*a* relative to the current viewpoint of user 712 shown in FIG. 7I. As a result of the movement of first virtual object 704*a*, first virtual object 704*a* is not displayed at a spatial location with respect to second virtual object 704*b* within spatial location thresholds 716*a* and 716*b*. Due to the movement of first virtual object 704*a* to a location in three-dimensional environment 702 not within spatial location thresholds 716*a* and 716*b*, computer system 101 changes the amount of visual prominence that second virtual object 704*b* is displayed with. Particularly, as shown in FIG. 7J, second virtual object 704*b* visually obscures first virtual object 704*a* relative to the current viewpoint of user 712 (e.g., a greater portion of first virtual object 704*a* is not visible from the current viewpoint of user 712 compared to as shown in FIG. 7I). In some embodiments, computer system 101 displays a portion of second virtual object 704*b* with transparency (e.g., different from portion 718*b*) in accordance with first virtual object 704*a* being displayed at a greater distance relative to the current viewpoint of user 712 (e.g., compared to second virtual object 704*b*) and not within spatial location thresholds 716*b* and 716*b* while being moved in three-dimensional environment 702. For example, as shown in FIG. 7J, a portion 718*c* of second virtual object 704*b* is displayed with a greater amount of transparency (e.g., in some embodiments, a portion of first virtual object 704*a* corresponding to the size of portion 718*c* is visible relative to the current viewpoint of user 712 (e.g., because portion 718*c* is displayed as transparent)). Optionally, computer system 101 ceases to display portion 718*c* of second virtual object 704*b* in three-dimensional environment 702 (e.g., portion 718*c* corresponds to a smaller size of the portion of second virtual object 704*b* that computer system 101 ceases to display while first virtual object 704*a* is moved within spatial location thresholds 716*a* and 716*b* (e.g., as shown in FIGS. 7F-7I)). In some embodiments, in accordance with first virtual object 704*a* being moved outside of spatial location thresholds 716*b* and 716*a* in three-dimensional environment 702 and at a location corresponding to a greater distance from the current viewpoint of user 712 than second virtual object 704*b*, second virtual object 704*b* visually obscures the entire portion of first virtual object 704*a* that overlaps with second virtual object 704*b* while first virtual object 704*a* is moved in three-dimensional environment 702 (e.g., second virtual object 704*b* is not displayed with the transparent portion 718*c*, and the portion of first virtual object 704*a* that overlaps with second virtual object 704*b* is not visible relative to the current viewpoint of user 712).

As shown in FIG. 7J, an input (e.g., an air pinch input, an air tap input, a pinch input, a tap input, an air pinch and drag input, an air drag input, a drag input, a click and drag input, a gaze input, and/or other input) is directed to first virtual object 704*a* corresponding to a request to move first virtual object 704*a* in three-dimensional environment 702 (e.g., the input shown in FIG. 7J has one or more characteristics of the input shown and described with reference to FIG. 7E). In some embodiments, FIG. 7J illustrates computer system 101 continuing to receive the input initiated in FIG. 7E by user 712. For example, the input shown in FIG. 7I is a continuation of the input shown in FIGS. 7E-7I (e.g., user 712 continues to move first virtual object 704*a* in three-dimensional environment 702 by continuing to direct gaze 708 to first virtual object 704*a* while concurrently performing the air gesture and/or hand movement initiated in FIG. 7E). In some embodiments, the input shown in FIG. 7I corresponds to a request to further move first virtual object 704*a* in the first dimension (e.g., in a direction of depth) relative to the current viewpoint of user 712. In some embodiments, in accordance with first virtual object 704*a* moving to a further distance relative to the current viewpoint of user 712 in three-dimensional environment 702 in response to the input shown in FIG. 7J, computer system 101 continues to change the visual prominence of second virtual object 704*b*. For example, the size of portion 718*c* relative to three-dimensional environment 702 continues to change (e.g., as first virtual object 704*a* is moved farther from the current viewpoint of user 712 in three-dimensional environment 702, the size of portion 718*c* (e.g., and the amount of first virtual object 704*a* that is visible from the current viewpoint of user 712) is reduced relative to three-dimensional environment 702). In some embodiments, in accordance with first virtual object 704*a* being moved to a location in three-dimensional environment 702 within spatial location thresholds 716*a* and 716*b*, computer system 101 changes the visual prominence of second virtual object 704*b* such that first virtual object 704*a* is entirely visible from the current viewpoint of user 712 (e.g., because computer system 101 ceases to display the portion of second virtual object 704*b* that spatially conflicts with first virtual object 704*a* and displays portion 718*b* with a greater amount of transparency as shown and described with reference to FIGS. 7F-7I).

Figure 7K:
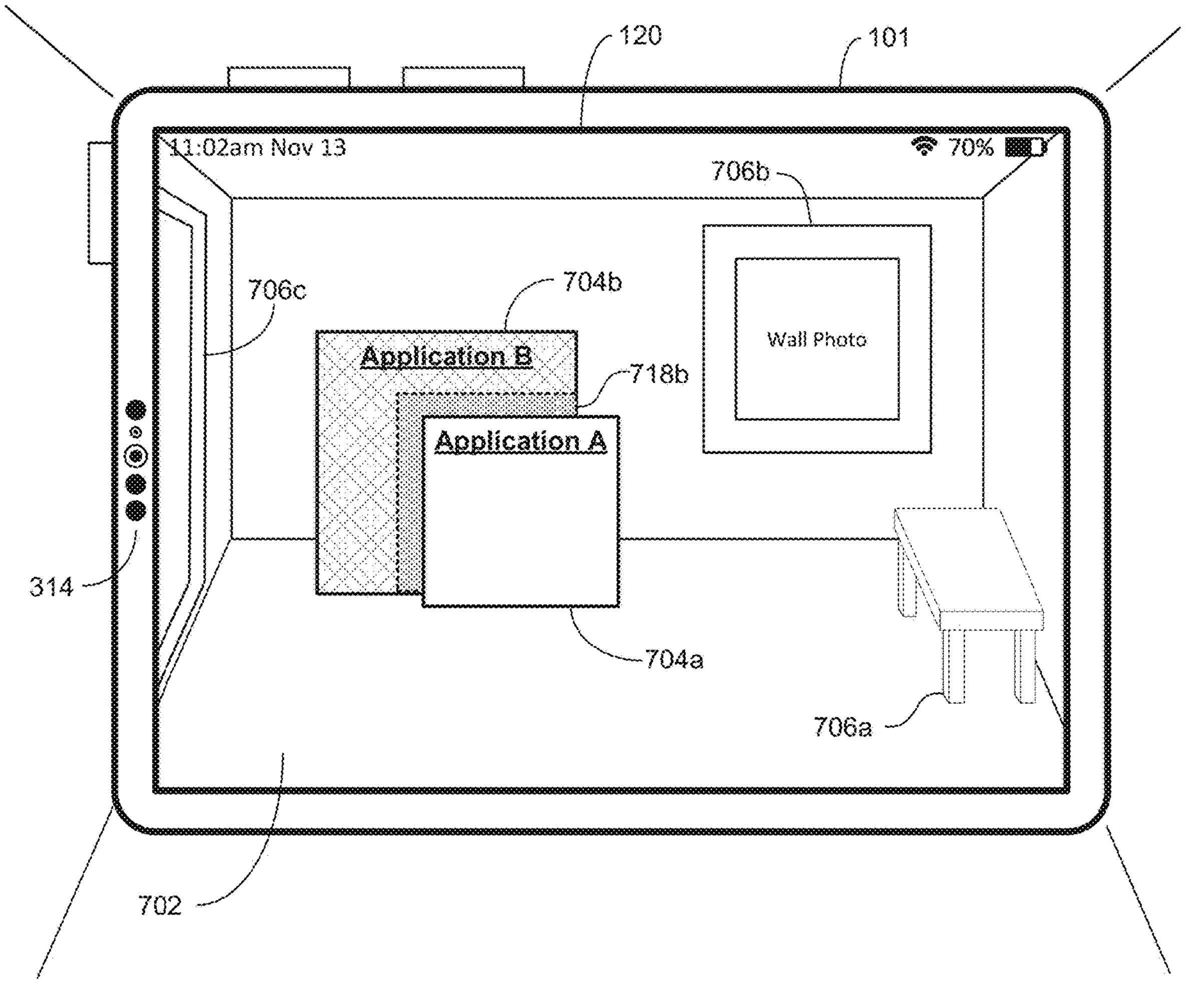
Figure 7K:
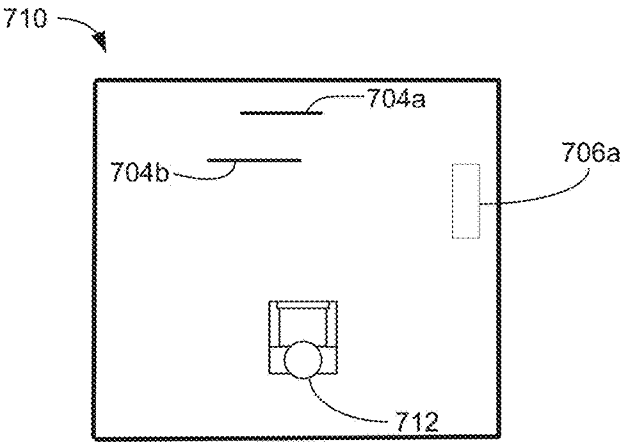

FIG. 7K illustrates second virtual object 704*b* displayed with the second amount of visual prominence and first virtual object 704*a* displayed with the first amount of visual prominence (e.g., first virtual object 704*a* is visible relative to the current viewpoint of user 712) based on user 712 ceasing to provide the input(s) shown and described with reference to FIGS. 7E-7J (e.g., movement of first virtual object 704*a* in three-dimensional environment 702 is in accordance with an input corresponding to continued movement of first virtual object 704*a* provided by user 712 in FIGS. 7E-7J). In some embodiments, user 712 ceases to provide an air gesture and/or hand movement (e.g., with hand 720 as shown in FIGS. 7E-7J) relative to three-dimensional environment 702. In some embodiments, displaying second virtual object 704*b* with the second amount of visual prominence includes one or more characteristics of displaying second virtual object 704*b* with the second amount of visual prominence as described with reference to FIG. 7G (e.g., a portion of second virtual object 704*b* that overlaps first virtual object 704*a* ceases to be displayed in three-dimensional environment 702 and portion 718*b* is displayed with a greater amount of transparency (e.g., compared to displaying second virtual object 704*b* with the first amount of visual prominence)). In some embodiments, displaying second virtual object 704*b* with the second amount of visual prominence and first virtual object 704*a* with the first amount of visual prominence based on user 712 ceasing to provide the input(s) shown and described with reference to FIGS. 7E-7K includes one or more characteristics of reducing the visual prominence of the at least the portion of the second virtual object to a visual prominence less than the third visual prominence relative to the three-dimensional environment in response to detecting termination of the first input as described with reference to method 900. In some embodiments, in FIG. 7K, first virtual object 704*a* is displayed with the first amount of visual prominence and second virtual object 704*b* is displayed with the second amount of visual prominence because user 712 previously directed an input to first virtual object 704*a* (e.g., and has not since directed an input to second virtual object (e.g., first virtual object 704*a* is the active virtual object)). In some embodiments, displaying first virtual object 704*a* with the first amount of visual prominence and second virtual object 704*b* with the second amount of visual prominence in FIG. 7K includes one or more characteristics of displaying the first virtual object with the first visual prominence without regard to whether or not the first virtual object overlaps with other virtual objects in accordance with the determination that the first virtual object is the active virtual object as described with reference to method 800. In some embodiments, in response to an input provided by user 712 directed to second virtual object 704*b* (e.g., as shown and described with reference to FIG. 7C) or optionally to empty space in three-dimensional environment 702 (e.g., as shown and described with reference to FIG. 7D), computer system 101 displays second virtual object 704*b* with the first amount of visual prominence and first virtual object 704*a* with the second amount of visual prominence (e.g., second virtual object is made the active virtual object in response to the input and the first virtual object 704*a* is not displayed with portion 718*a* that includes a greater amount of transparency because first virtual object 704*a* is at a location in three-dimensional environment 702 at a greater distance relative to the current viewpoint of user 712 than second virtual object 704*b*).

Figure 7L:
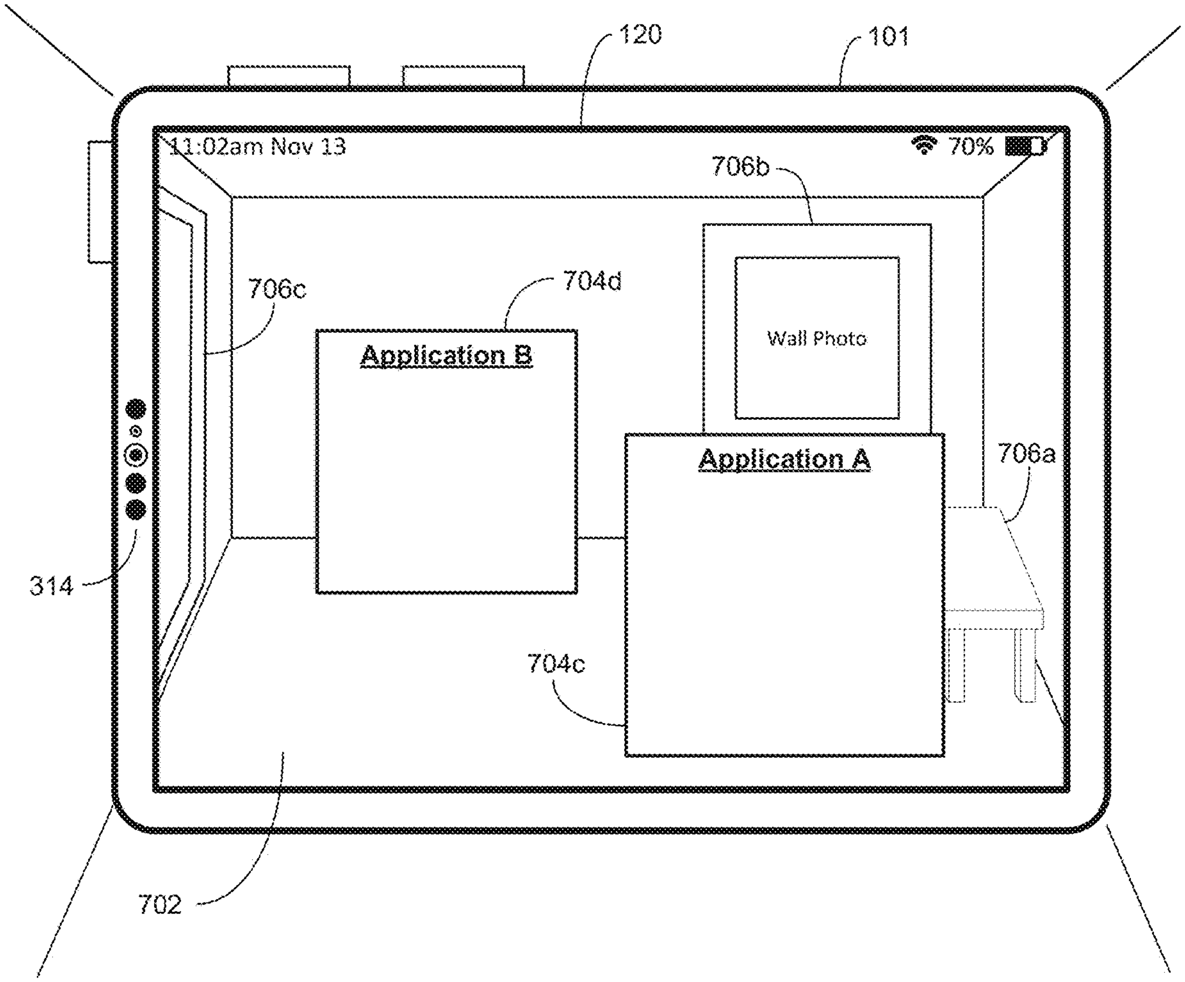
Figure 7L:
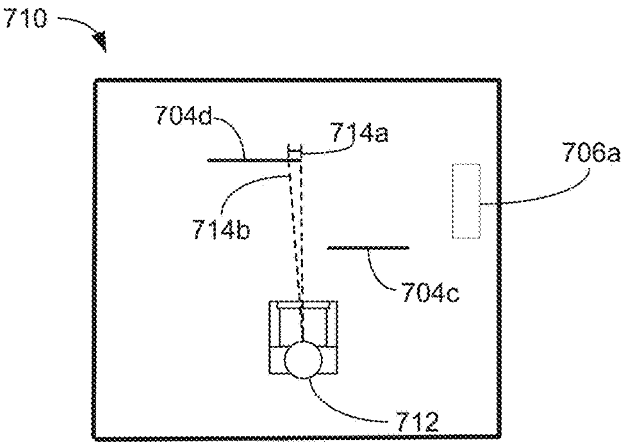

FIG. 7L illustrates a first virtual object 704*c* and a second virtual object 704*d* displayed in three-dimensional environment 702. In some embodiments, first virtual object 704*c* has one or more characteristics of first virtual object 704*a* shown and described with reference to FIGS. 7A-7K. In some embodiments, second virtual object 704*d* has one or more characteristics of second virtual object 704*b* shown and described with reference to FIGS. 7A-7K. As shown in overhead view 710 in FIG. 7L, the difference between the distance of first virtual object 704*c* from the current viewpoint of user 712 and second virtual object 704*d* from the current viewpoint of user 712 is greater than the difference between the distance of first virtual object 704*a* from the current viewpoint of user 712 and second virtual object 704*b* from the current viewpoint of user 712 as shown in FIGS. 7A-7E (e.g., the distance of first virtual object 704*c* relative to second virtual object 704*d* in FIG. 7L is greater than the distance of first virtual object 704*a* relative to second virtual object 704*b* shown in FIGS. 7A-7E). In accordance with the difference between the distance of first virtual object 704*c* from the current viewpoint of user 712 and second virtual object 704*d* from the current viewpoint of user 712 in FIG. 7L being different from the difference between the distance of first virtual object 704*a* from the current viewpoint of user 712 and second virtual object 704*b* from the current viewpoint of user 712 in FIGS. 7A-7E, the threshold amount of overlap (e.g., for displaying a respective virtual object with the second amount of visual prominence) between first virtual object 704*c* and second virtual object 704*d* shown in FIG. 7L is different from the threshold amount of overlap between first virtual object 704*a* and second virtual object 704*b* shown in FIGS. 7B-7D.

As shown in overhead view 710 in FIG. 7L, the region of overlap threshold 714*a* and the angle of overlap threshold 714*b* are reduced compared to as shown in FIGS. 7B-7D (e.g., because the difference between the distance of first virtual object 704*c* from the current viewpoint of user 712 and second virtual object 704*d* from the current viewpoint of user 712 is greater than the difference between the distance of first virtual object 704*a* from the current viewpoint of user 712 and second virtual object 704*b* from the current viewpoint of user 712). In some embodiments, in accordance with the difference in the distance of first virtual object 704*c* from the current viewpoint of user 712 and second virtual object 704*d* from the current viewpoint of user 712 being greater (e.g., compared to first virtual object 704*a* and second virtual object 704*b*), the threshold amount of overlap (e.g., the region of overlap 714*a* and/or the angle of overlap threshold 714*b*) are increased. In some embodiments, changing the threshold amount of overlap based on the difference in distance of a first respective virtual object (e.g., first virtual object 704*c*) and a second respective virtual object (e.g., second virtual object 704*d*) from the current viewpoint of user 712 includes one or more characteristics of the threshold amount being the first threshold amount and/or the second threshold amount in accordance with the difference in distance between the first virtual object and the current viewpoint of the user and the second virtual object and the current viewpoint of the user being the first distance or the second distance as described with reference to method 800.

Figure 7M:
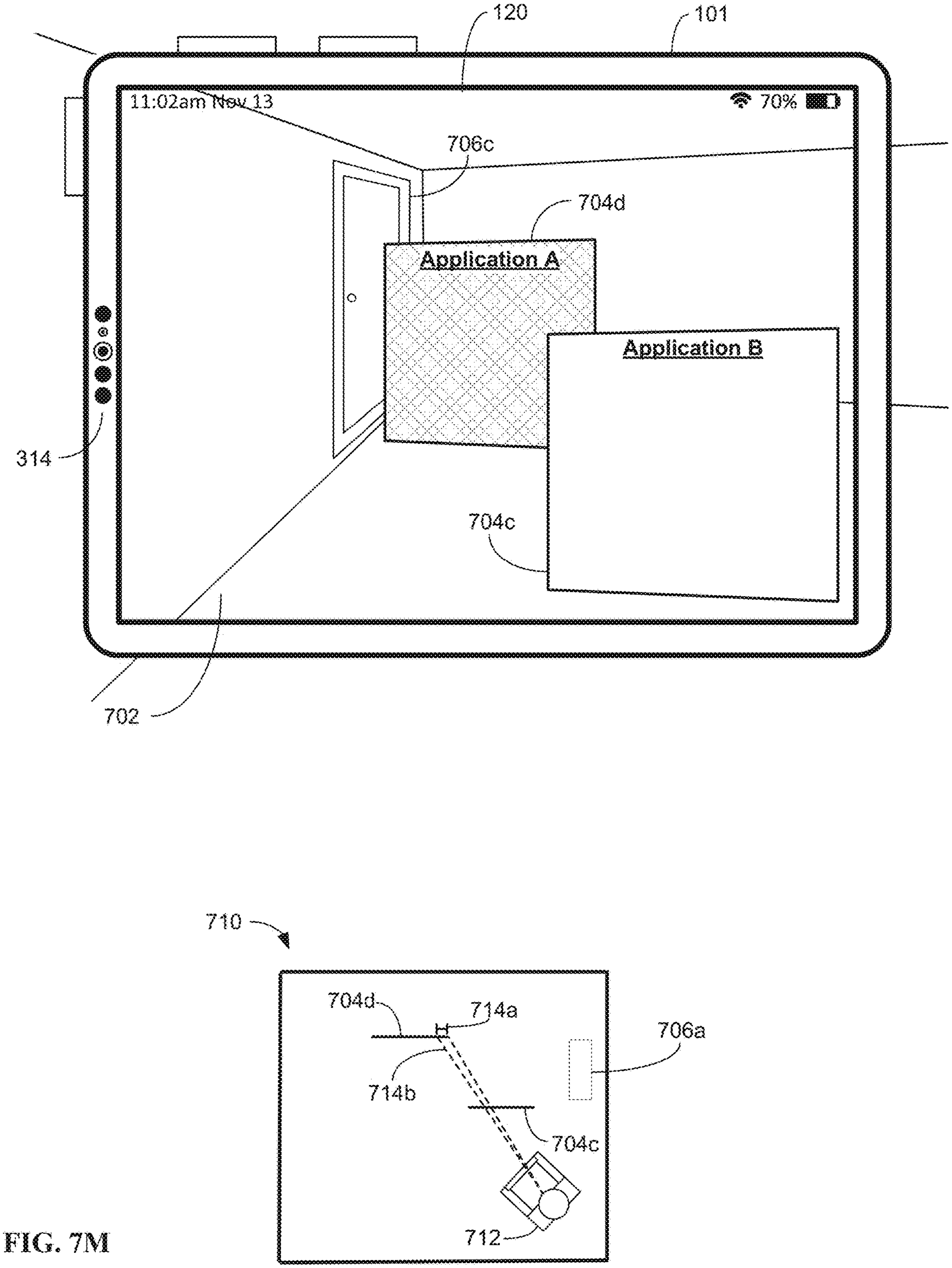

FIG. 7M illustrates second virtual object 704*d* displayed with the second amount of visual prominence and first virtual object 704*c* displayed with the first amount of visual prominence after a change in the current viewpoint of user 712 relative to three-dimensional environment 702. As shown in overhead view 710, the current viewpoint of user 712 has changed spatial arrangement (e.g., location and orientation) relative to three-dimensional environment 702 (e.g., compared to as shown in FIGS. 7A-7L). In some embodiments, movement of the current viewpoint of user 712 has one or more characteristics of movement of the current viewpoint of the user from the first viewpoint relative to the three-dimensional environment to the second viewpoint relative to the three-dimensional environment as described with reference to method 800. As shown in overhead view 710, movement of the current viewpoint of user 712 causes first virtual object 704*c* to overlap second virtual object 704*d* by more than the threshold amount of overlap (e.g., more than the threshold angle of overlap 714*b* relative to the current viewpoint of user 712). Based on the movement of the current viewpoint of user 712 causing first virtual object 704*c* to overlap second virtual object 704*d* by more than the threshold amount, computer system 101 changes the visual prominence of second virtual object 704*d* (e.g., because an input was previously directed to first virtual object 704*c* prior to or during the movement of the current viewpoint of user 712 (e.g., first virtual object 704*c* is the active virtual object)). In some embodiments, in accordance with an input being previously directed to second virtual object 704*d* prior to or during the movement of the current viewpoint of user 712 (e.g., second virtual object 704*d* is the active virtual object), computer system 101 displays first virtual object 704*c* with the second amount of visual prominence and second virtual object 704*d* with the first amount of visual prominence (e.g., computer system 101 ceases to display a first portion of first virtual object 704*c* that spatially conflicts with second virtual object 704*d* (e.g., the first virtual object overlaps with the second virtual object from a viewpoint of the user and, optionally, the first virtual object is within a threshold distance of the second virtual object in a depth dimension) relative to the current viewpoint of user 712 and displays a second portion of first virtual object 704*c* (e.g., including one or more characteristics of portion 718*a* shown and described with reference to FIG. 7D) that surrounds the first portion with a greater amount of transparency).

Figure 7N:
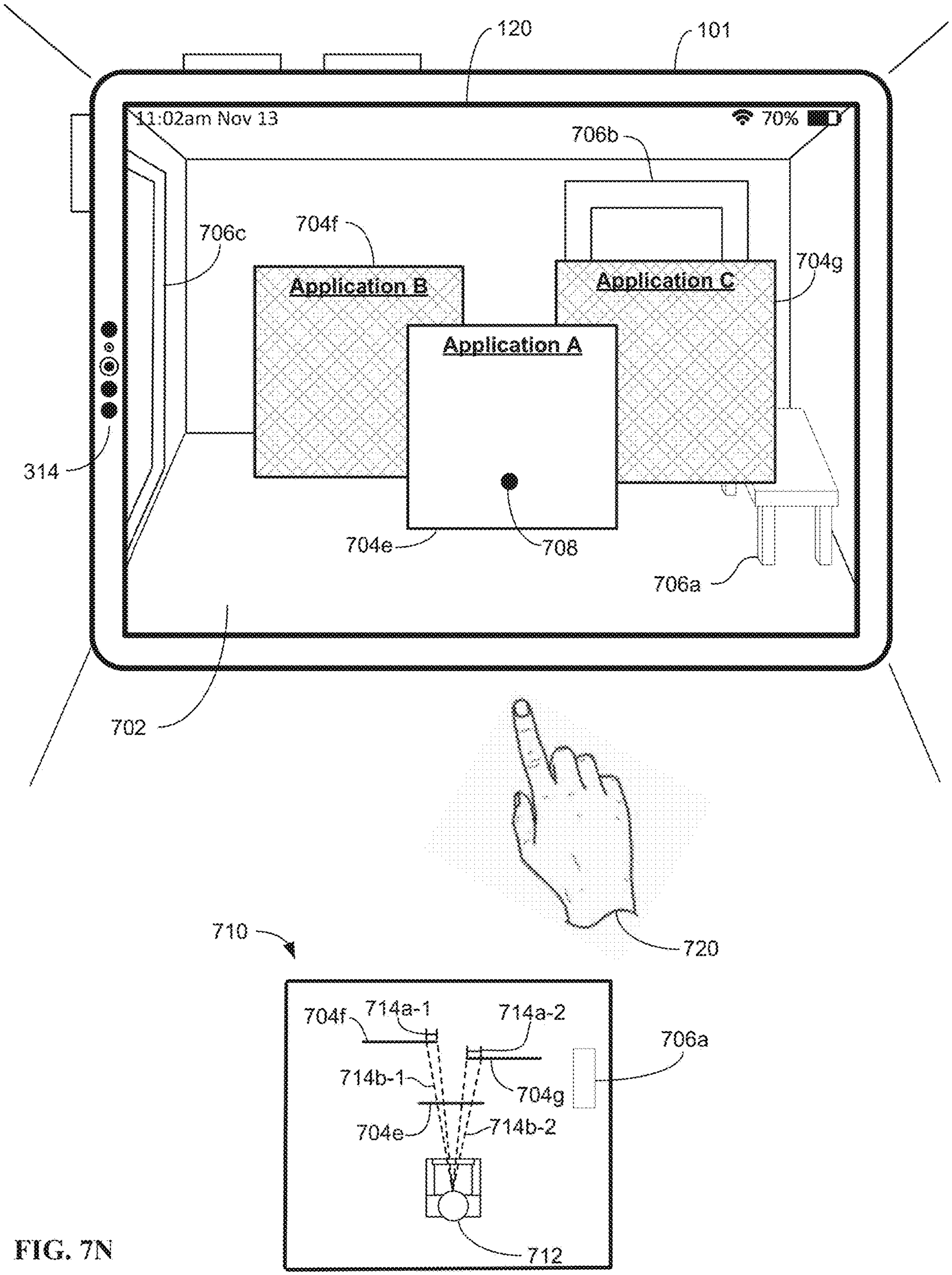

FIG. 7N illustrates a first virtual object 704*e* displayed with the first amount of visual prominence, a second virtual object 704*f* displayed with the second amount of visual prominence, and a third virtual object 704*g* displayed with the second amount of visual prominence in three-dimensional environment 702. In some embodiments, first virtual object 704*e*, second virtual object 704*f*, and third virtual object 704*g* have one or more characteristics of first virtual object 704*a* and/or second virtual object 704*b* described above. As shown in overhead view 710, first virtual object 704*e* is displayed at a first distance relative to the current viewpoint of user 712, second virtual object 704*f* is displayed at a second distance, different from the first distance, relative to the current viewpoint of user 712, and third virtual object 704*g* is displayed at a third distance, different from the first distance and second distance, relative to the current viewpoint of user 712. As shown in overhead view 710, based on the difference in distance of first virtual object 704*e* from the current viewpoint of user 712 and second virtual object 704*f* from the current viewpoint of user 712 being a first distance, the threshold amount of overlap between first virtual object 704*e* and second virtual object 704*f* corresponds to a first region of overlap threshold amount 714*a*-1 and a first angle of overlap threshold amount 714*b*-1. As shown in overhead view 710, based on the difference in distance of first virtual object 704*e* from the current viewpoint of user 712 and third virtual object 704*g* from the current viewpoint of user 712 being a second distance, different from the first distance, the threshold amount of overlap between first virtual object 704*e* and third virtual object 704*g* corresponds to a second region of overlap threshold amount 714*a*-2, different from first region of overlap threshold amount 714*a*-1, and a second angle of overlap threshold amount 714*b*-2, different from first angle of overlap threshold amount 714*b*-1. In overhead view 710, first region of overlap threshold amount 714*a*-1 is less than second region of overlap threshold amount 714*a*-2. In some embodiments, first region of overlap threshold amount 714*a*-1 is greater than second region of overlap threshold amount 714*a*-2 in accordance with the first distance being less than the second distance. In overhead view 710, first angle of overlap threshold amount 714*b*-1 is less than second angle of overlap threshold amount 714*b*-2. In some embodiments, first angle of overlap threshold amount 714*b*-1 is greater than second angle of overlap threshold amount 714*b*-2 in accordance with the first distance being less than the second distance. As shown in FIG. 7N (e.g., in overhead view 710), first virtual object 704*e* overlaps (e.g., has a spatial conflict with) second virtual object 704*f* by more than the first threshold amount (e.g., first region of overlap threshold amount 714*a*-1 and/or first angle of overlap threshold amount 714*b*-1) and third virtual object 704*g* by more than the second threshold amount (e.g., second region of overlap threshold amount 714*a*-2 and/or second angle of overlap threshold amount 714*b*-2). In accordance with first virtual object 704*e* overlapping second virtual object 704*f* and third virtual object 704*g* by more than the respective threshold amounts of overlap, computer system 101 displays second virtual object 704*f* and third virtual object 704*g* with the second amount of visual prominence (e.g., because attention of user 712 is directed to first virtual object 704*e*).

As shown in FIG. 7N, an input is directed to first virtual object 704*e*. In some embodiments, the input corresponds to a request to move first virtual object 704*a* in three-dimensional environment in the first dimension (e.g., in the direction of depth relative to the current viewpoint of user 712). In some embodiments, the input shown in FIG. 7N has one or more characteristics of the input shown and described with reference to FIG. 7E.

Figure 7O:
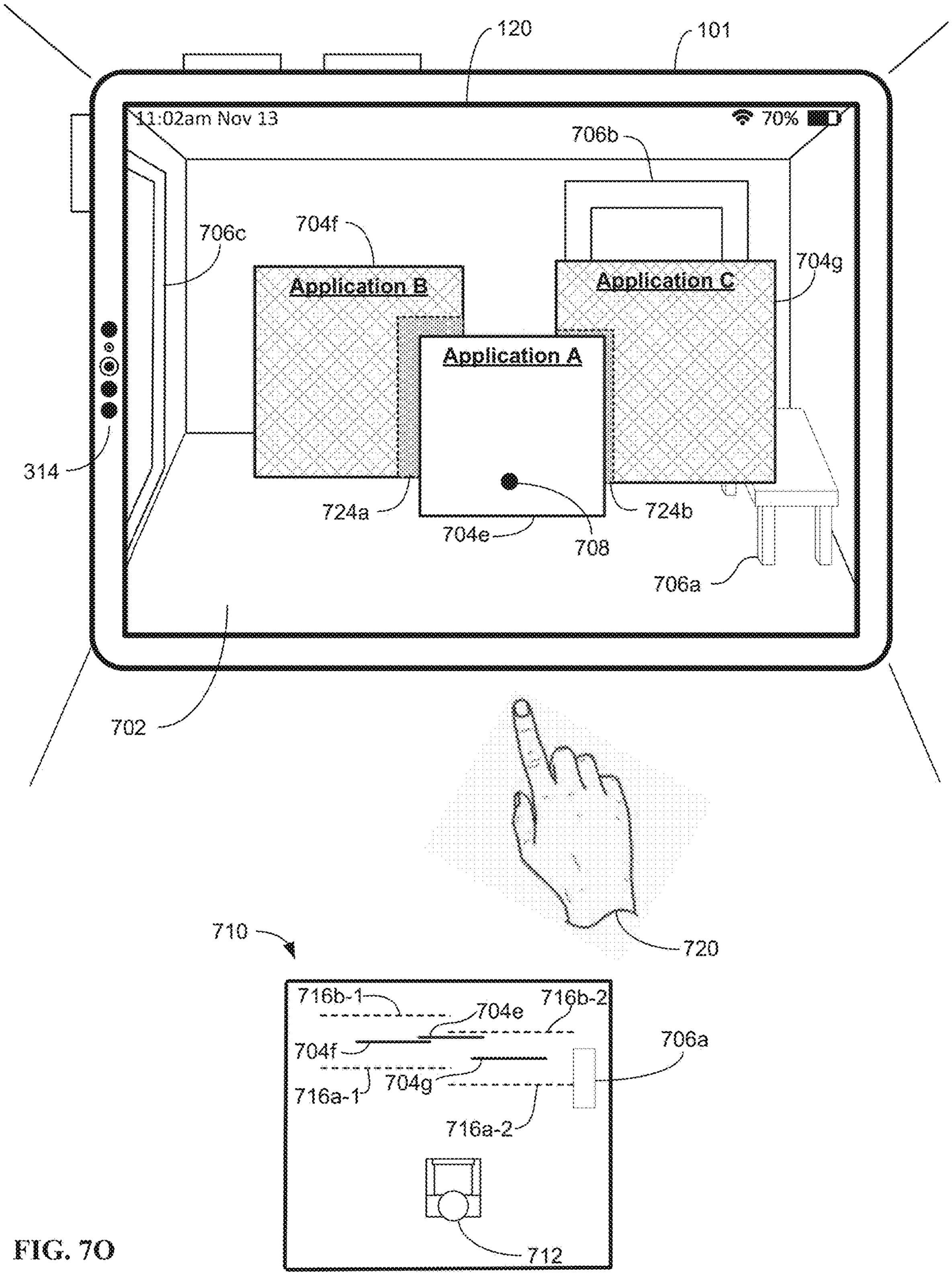

FIG. 7O illustrates movement of first virtual object 704*e* in three-dimensional environment 702 in response to the input provided by user 712 in FIG. 7N. As shown in overhead view 710, first virtual object 704*e* is moved to a greater distance relative to the current viewpoint of user 712 in three-dimensional environment 702 compared to second virtual object 704*f* and third virtual object 704*g*. In some embodiments, computer system 101 changes the visual prominence of second virtual object 704*f* and third virtual object 704*g* during the movement (e.g., change in spatial arrangement) of first virtual object 704*e* relative to the current viewpoint of user 712 based on the spatial location of first virtual object 704*e* with respect to second virtual object 704*f* and first virtual object 704*e* with respect to third virtual object 704*g*. In some embodiments, computer system 101 changes the visual prominence of second virtual object 704*f* independent of (e.g., not based on) the spatial location of first virtual object 704*e* with respect to third virtual object 704*g*. In some embodiments, computer system 101 changes the visual prominence of third virtual object 704*g* independent of (e.g., not based on) the spatial location of first virtual object 704*e* with respect to second virtual object 704*f*. As shown in overhead view 710, first spatial location thresholds 716*a*-1 and 716*b*-1 are shown relative to the location of second virtual object 704*f* in three-dimensional environment 702, and second spatial location thresholds 716*a*-2 and 716*b*-2 are shown relative to the location of third virtual object 704*g* in three-dimensional environment. In some embodiments, spatial location thresholds 716*a*-1, 716*a*-2, 716*b*-1, 716*b*-2 have one or more characteristics of spatial location thresholds 716*a* and 716*b* shown and described with reference to FIGS. 7E-7J.

In some embodiments, computer system 101 reduces the visual prominence of second virtual object 704*f* by a first amount based on the spatial location of first virtual object 704*e* with respect to second virtual object 704*f*. For example, as shown in FIG. 7O reducing the visual prominence of second virtual object 704*f* by the first amount includes ceasing to display a portion of second virtual object 704*f* that spatially conflicts with first virtual object 704*e* (e.g., the portion of second virtual object 704*f* has a size corresponding to a size of the portion of first virtual object 704*e* that overlaps second virtual object 704*f*) (e.g., the portion of the second virtual object overlaps with the first virtual object from a viewpoint of the user and, optionally, the second virtual object is within a threshold distance of the first virtual object in a depth dimension). For example, as shown in FIG. 7O, reducing the visual prominence of second virtual object 704*f* by the first amount includes displaying a portion 724*a* (e.g., including one or more characteristics of portions 718*a* and/or 718*b* described above) including a first size relative to three-dimensional environment 702 with a greater amount of transparency compared to displaying portion 724*a* with the first amount of visual prominence. In some embodiments, computer system 101 reduces the visual prominence of third virtual object 704*g* by a second amount, less than the first amount based on the spatial location of first virtual object 704*e* with respect to third virtual object 704*g* (e.g., the second amount is less than the first amount because the difference in distance of first virtual object 704*e* from the current viewpoint of user 712 and second virtual object 704*f* from the current viewpoint of user 712 is less than the difference in distance of first virtual object 704*e* from the current viewpoint of user 712 and third virtual object 704*g* from the current viewpoint of user 712). For example, as shown in FIG. 7O, reducing the visual prominence of third virtual object 704*g* by the second amount includes ceasing to display a portion of third virtual object 704*g* that spatially conflicts with first virtual object 704*e* (e.g., the portion of third virtual object 704*g* has a size corresponding to a size of the portion of first virtual object 704*e* that overlaps second third virtual object 704*g*) (e.g., the portion of the third virtual object overlaps with the first virtual object from a viewpoint of the user and, optionally, the third virtual object is within a threshold distance of the first virtual object in a depth dimension). For example, as shown in FIG. 7O, reducing the visual prominence of third virtual object 704*g* by the second amount includes displaying a portion 724*b* (e.g., including one or more characteristics of portions 718*a* and/or 718*b* described above) including a second size, less than the first size, relative to the three-dimensional environment 702 with a greater amount of transparency compared to displaying portion 724*b* with the first amount of visual prominence (e.g., the second size is less than the first size because the difference in distance of first virtual object 704*e* from the current viewpoint of user 712 and second virtual object 704*f* from the current viewpoint of user 712 is less than the difference in distance of first virtual object 704*e* from the current viewpoint of user 712 and third virtual object 704*g* from the current viewpoint of user 712).

As shown in FIG. 7O, an input is directed to first virtual object 704*e* corresponding to a request to move first virtual object 704*e* in three-dimensional environment 702 (e.g., the input shown in FIG. 7O has one or more characteristics of the input shown and described with reference to FIG. 7E). In some embodiments, in accordance with first virtual object 704*e* moving to a different spatial location in three-dimensional environment 702 with respect to second virtual object 704*f* and/or third virtual object 704*g*, computer system 101 changes the visual prominence of second virtual object 704*f* and/or third virtual object 704*g* during the movement of first virtual object 704*e*. For example, in accordance with movement of first virtual object 704*e* including displaying first virtual object 704*e* at a location in three-dimensional environment 702 within first spatial location thresholds 716*a*-land 716*b*-1 and not within second spatial location thresholds 716*a*-2 and 716*b*-2, third virtual object 704*g* visually obscures first virtual object 704*e* relative to the current viewpoint of user 712 and second virtual object 704*f* does not visually obscure first virtual object 704*e* relative to the current viewpoint of user 712 (e.g., computer system 101 ceases to display a portion of second virtual object 704*f* corresponding to a first portion of first virtual object 704*e* that overlaps second virtual object 704*f* and does not cease to display a portion of third virtual object 704*f* that corresponds to a second portion of first virtual object 704*e* that overlaps second virtual object 704 relative to the current viewpoint of user 712). For example, in accordance with movement of first virtual object 704*e* including displaying first virtual object 704*e* at a location in three-dimensional environment 702 within second spatial location thresholds 716*a*-2 and 716*b*-2 and not within first spatial location thresholds 716*a*-1 and 716*b*-1, second virtual object 704*f* is not displayed with transparent portion 724*a* (e.g., because first virtual object 704*e* is displayed at a location in three-dimensional environment corresponding to a closer distance from the current viewpoint of the user 712 compared to second virtual object 704*f* and not within spatial location thresholds 716*a*-1 and 716*b*-1) and third virtual object 704*g* is displayed with transparent portion 724*b* (e.g., because first virtual object 704*e* is at a location within second spatial location thresholds 716*a*-2 and 716*b*-2).

Figure 7P:
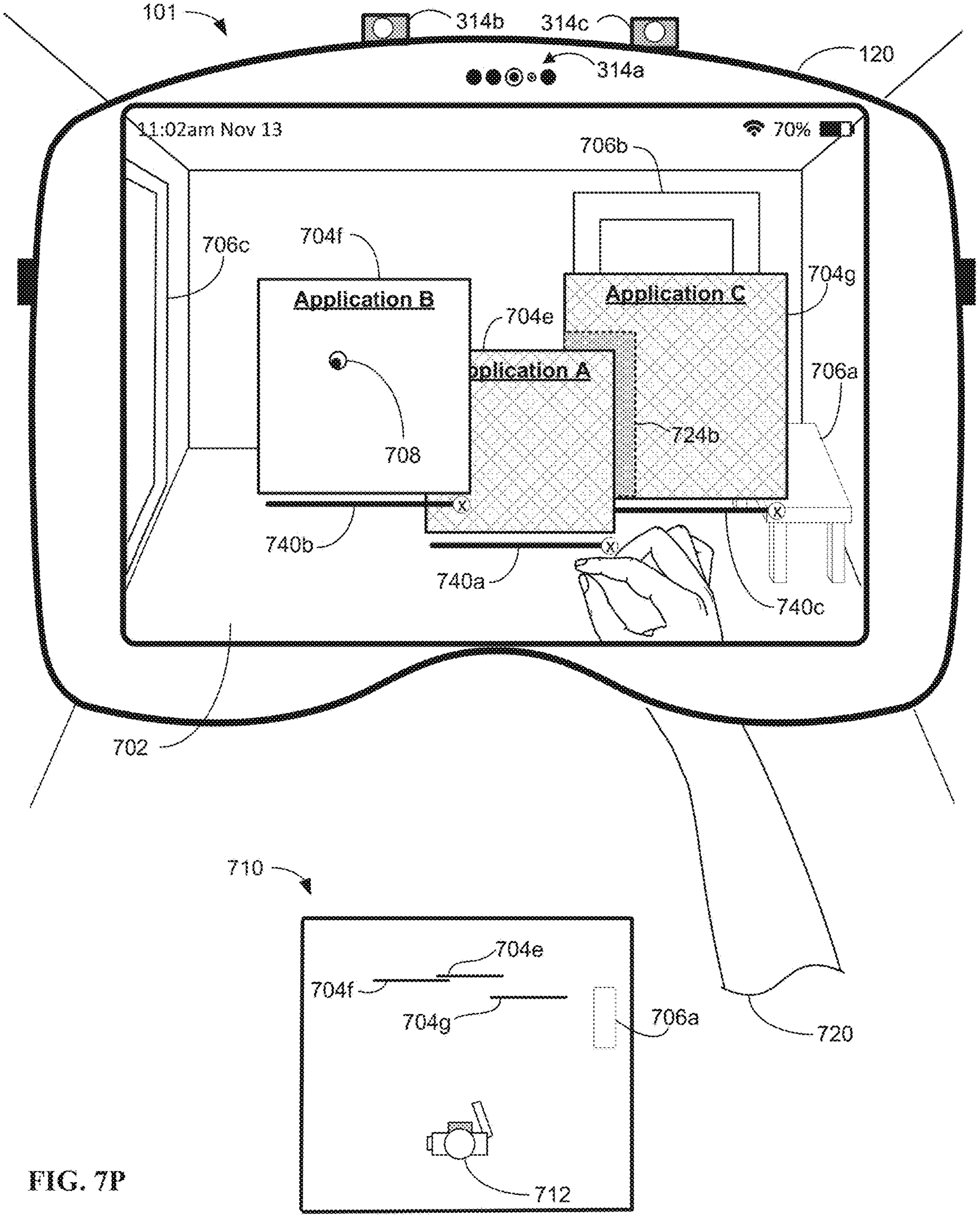

FIG. 7P illustrates user 712 performing an input corresponding to attention directed to second virtual object 704*f*. As shown in FIG. 7P, the input corresponds to gaze 708 (e.g., represented by an eye in FIG. 7P) being directed to virtual object 704*f* while user 712 concurrently performs an air gesture (e.g., an air pinch as shown in FIG. 7P) with hand 720 (e.g., for a threshold period of time (e.g., 0.1, 0.2, 0.5, 1, 2, 5 or 10 seconds)). In response to the input corresponding to attention directed to second virtual object 704*f*, computer system 101 increases the visual prominence of second virtual object 704*f* (e.g., compared to as shown in FIG. 7O (e.g., to the first amount of visual prominence)) and reduces the visual prominence of first virtual object 704*e* (e.g., compared to as shown in FIG. 7O (e.g., to the second amount of visual prominence). For example, in response to the input corresponding to attention directed to second virtual object 704*f*, computer system 101 increases the opacity, brightness, color, saturation and/or sharpness of second virtual object 704*f* and reduces the opacity, brightness, color, saturation and/or sharpness of first virtual object 704*e*. Further, as shown in FIG. 7P, in response to the input corresponding to attention directed to virtual object 704*f*, computer system 101 maintains display of third virtual object 704*g* with the same amount of (e.g., the second amount and/or a reduced amount of) visual prominence (e.g., compared to the amount of visual prominence third virtual object 704*g* is displayed with in FIG. 7O). In some embodiments, computer system 101 maintains display of third virtual object 704*g* with the second amount of visual prominence in accordance with first virtual object 704*e* continuing to overlap third virtual object 704*g* by more than the threshold amount. In FIG. 7P, portion 724*b* of third virtual object 704*g* is displayed with a greater magnitude of transparency (e.g., portion 724*b* is displayed with an increased amount of transparency and/or with a larger size) compared to as shown in FIG. 7O (e.g., because user 712 terminates the input shown in FIG. 7O corresponding to the request to move virtual object 704*e* which causes third virtual object 704*g* to be displayed with an increased and/or a maximum magnitude of the second amount of visual prominence). In some embodiments, computer system 101 does not display portion 724*b* with the increased amount transparency (e.g., computer system 101 does not cease to display portion 724*b* in three-dimensional environment 702) in response to the input corresponding to attention directed to second virtual object 704*f* (e.g., causing at least a portion of first virtual object 704*e* to be visually obscured by third virtual object 704*g* from the current viewpoint of user 712).

As shown in FIG. 7P (e.g., and FIGS. 7Q-7X), first virtual object 704*e*, second virtual object 704*f*, and third virtual object 704*g* are displayed with virtual elements 740*a*, 740*b* and 740*c*, respectively. In some embodiments, virtual elements 740*a*-740*c* are selectable by user 712 to move virtual objects 704*e*-704*g* in three-dimensional environment 702. For example, to move virtual object 704*f* in three-dimensional environment 702, user 712 provides an input corresponding to attention (e.g., gaze) directed to virtual element 704*a* while concurrently performing an air gesture (e.g., such as the air pinch shown in FIG. 7P) that includes movement of a hand (e.g., hand 720) of user 712 relative to three-dimensional environment 702. As shown in FIG. 7P, virtual elements 740a-740c are displayed with virtual affordances (e.g., on the right side of each respective virtual element 740a-740c). In some embodiments, these virtual affordances are selectable by user 712 (e.g., by an input corresponding to attention directed to the virtual affordance while performing an air gesture) to cease display of a respective virtual object in three-dimensional environment 702. For example, in response to a user input corresponding to selection of the virtual affordance associated virtual element 740a, computer system 101 ceases display of first virtual object 704e in three-dimensional environment.

Figure 7Q:
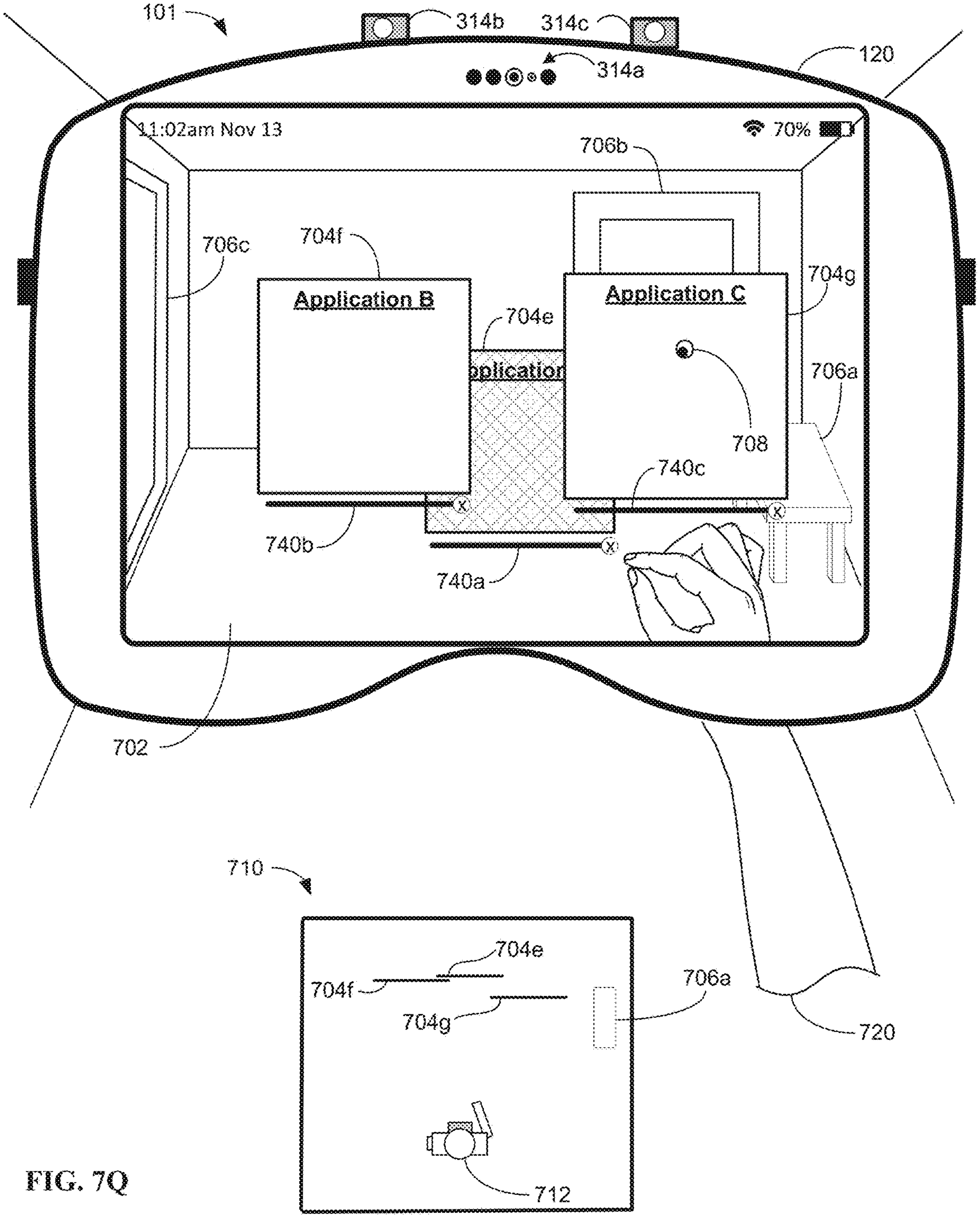

FIG. 7Q illustrates user 712 performing an input corresponding to attention directed to third virtual object 704g. As shown in FIG. 7Q, the input includes gaze 708 directed to virtual object 704g while user 712 performs an air gesture (e.g., air pinch as shown in FIG. 7Q) with hand 720 (e.g., for a threshold period of time (e.g., 0.1, 0.2, 0.5, 1, 2, 5 or 10 seconds)). In response to detecting the input shown in FIG. 7Q, computer system 101 displays third virtual object 704g with an increased amount of visual prominence (e.g., the first amount of visual prominence) compared to as shown in FIG. 7P. For example, third virtual object 704g is displayed in FIG. 7Q with a greater amount of opacity, brightness, color, saturation and/or sharpness compared to as shown in FIG. 7P. Further, in response to detecting the input shown in FIG. 7Q, computer system 101 maintains display of second virtual object 704f with the same amount of visual prominence (e.g., the first amount of visual prominence) as shown in FIG. 7P. For example, computer system 101 does not reduce the visual prominence of second virtual object 704f in response to the input shown in FIG. 7Q because third virtual object 704g does not overlap second virtual object 704f by more than the threshold amount. As shown in FIG. 7Q, in response to detecting the input shown in FIG. 7Q, computer system 101 maintains display of first virtual object 704e with the same amount of visual prominence (e.g., the second amount of visual prominence) as shown in FIG. 7P. For example, computer system 101 maintains display of first virtual object 704e with the reduced amount of visual prominence because first virtual object 704e is overlapped by third virtual object 704g (e.g., which is displayed with the increased amount of visual prominence) by more than the threshold amount. Further, for example, computer system 101 maintains display of first virtual object 704e with the reduced amount of visual prominence because second virtual object 704f, which is previously displayed with the increased amount of visual prominence, continues to overlap first virtual object 704e by more than the threshold amount while the input shown in FIG. 7Q is detected.

Figure 7R:
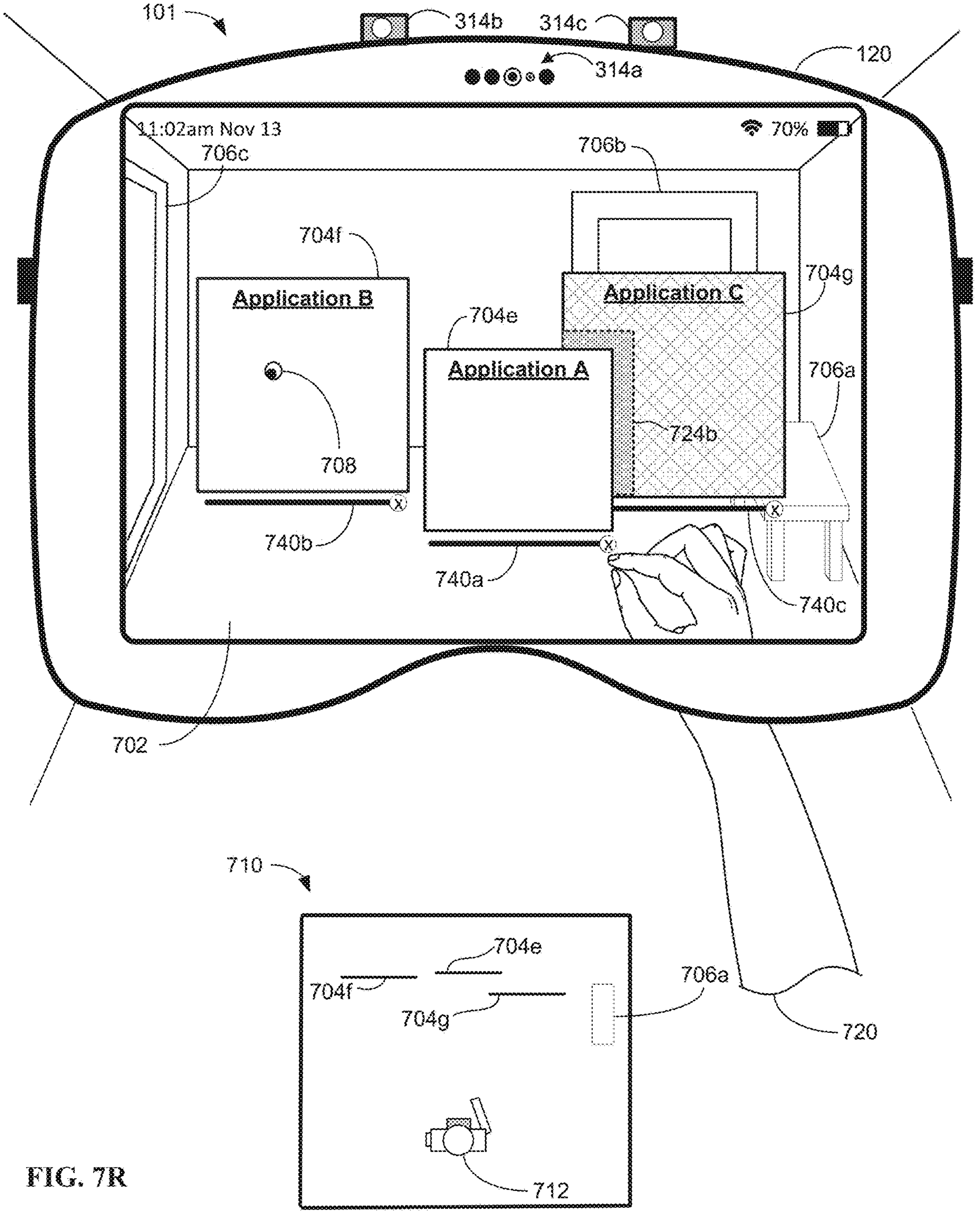

FIG. 7R illustrates an alternative embodiment to FIG. 7P that includes user 712 performing the input corresponding to attention directed to second virtual object 704f when second virtual object 704f does not overlap first virtual object 704e by more than the threshold amount. As shown in FIG. 7R, in response to detecting the input corresponding to attention directed to second virtual object 704f, computer system 101 displays second virtual object 704f with an increased amount of visual prominence (e.g., the first amount of visual prominence) relative to three-dimensional environment 702. Further, as shown in FIG. 7R, in response to detecting the input corresponding to attention directed to second virtual object 704f, computer system 101 maintains display of first virtual object 704e with the first amount of visual prominence and third virtual object 704g with the second amount of visual prominence. In some embodiments, computer system 101 maintains display of first virtual object 704e with the first amount of visual prominence because second virtual object 704f, which the input shown in FIG. 7R is directed to, does not overlap first virtual object 704e by more than the threshold amount. In some embodiments, computer system 101 maintains display of third virtual object 704g with the second amount of visual prominence because, while detecting the input shown in FIG. 7R, first virtual object 704e continues to overlap third virtual object 704g by more than the threshold amount and first virtual object 704e is last displayed with the first amount of visual prominence when the input shown in FIG. 7R is detected (e.g., since first virtual object 704e is displayed with the first amount of visual prominence and there is an overlap between first virtual object 704e and third virtual object 704g that exceeds the threshold amount, computer system 101 displays virtual object 704g with the second amount of visual prominence). In some embodiments, portion 724b is displayed with an increased and/or a maximum magnitude of the increased transparency (e.g., corresponding to an increased amount of transparency and/or an increased size relative to three-dimensional environment 702) because the input corresponding to the request to move first virtual object 704e in three-dimensional environment 702 as shown in FIG. 7O is terminated (e.g., compared to the decreased and/or minimum magnitude of the increased transparency of portion 724b that is shown in FIG. 7O during the movement of first virtual object 704e relative to third virtual object 704g in three-dimensional environment 702).

Figure 7S:
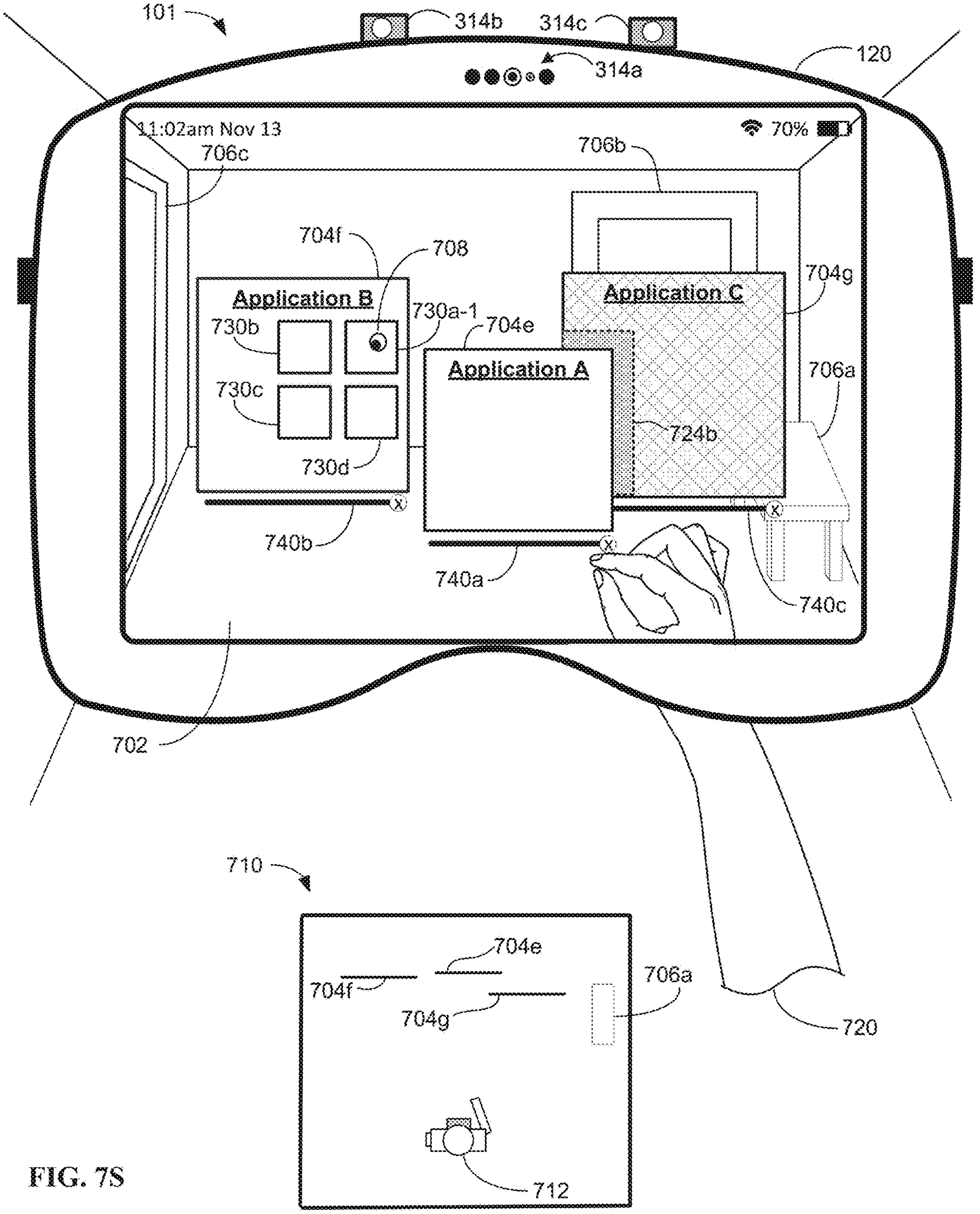

FIG. 7S illustrates a plurality of virtual elements displayed within second virtual object 704f. Particularly, virtual elements 730a-730d are included within second virtual object 704f in three-dimensional environment 702. In some embodiments, virtual elements 730a-730d have one or more characteristics of the virtual element that is moved in the three-dimensional environment in response to detection of the second input as described with reference to method 800. For example, virtual elements 730a-730d are content such as images, files, documents and/or text. In some embodiments, virtual elements 730a-730d are content associated with a respective application (e.g., a file (e.g., image) storage application) that is associated with second virtual object 704f. In some embodiments, virtual elements 730a-730d are displayed in one or more locations in three-dimensional environment 702 not associated with a respective virtual object (e.g., virtual elements 730a-730d are not included within virtual objects 704e-704g in three-dimensional environment 702). It should be appreciated that although four virtual elements are displayed within second virtual object 704f, more or less virtual elements may also be displayed. In some embodiments, second virtual object 704f includes a user interface that can be scrolled by user 712 (e.g., through a user input) to display one or more additional virtual elements not previously displayed within second virtual object 704f.

As shown in FIG. 7S, user 712 performs an input that is directed to virtual element 730a. The input includes gaze 708 directed to virtual element 730a while an air gesture (e.g., air pinch) is performed with hand 720 (e.g., the air gesture is performed for a threshold period of time (e.g., 0.1, 0.2, 0.5, 1, 2, 5 or 10 seconds)). In some embodiments, the input shown in FIG. 7S corresponds to a selection of virtual element 730a. In some embodiments, upon selection of virtual element 730a, user 712 can move virtual element 730a relative to three-dimensional environment 702 by maintaining the air gesture (e.g., the air pinch as shown in FIG. 7S) and performing movement with hand 720 relative to three-dimensional environment 702.

Figure 7T:
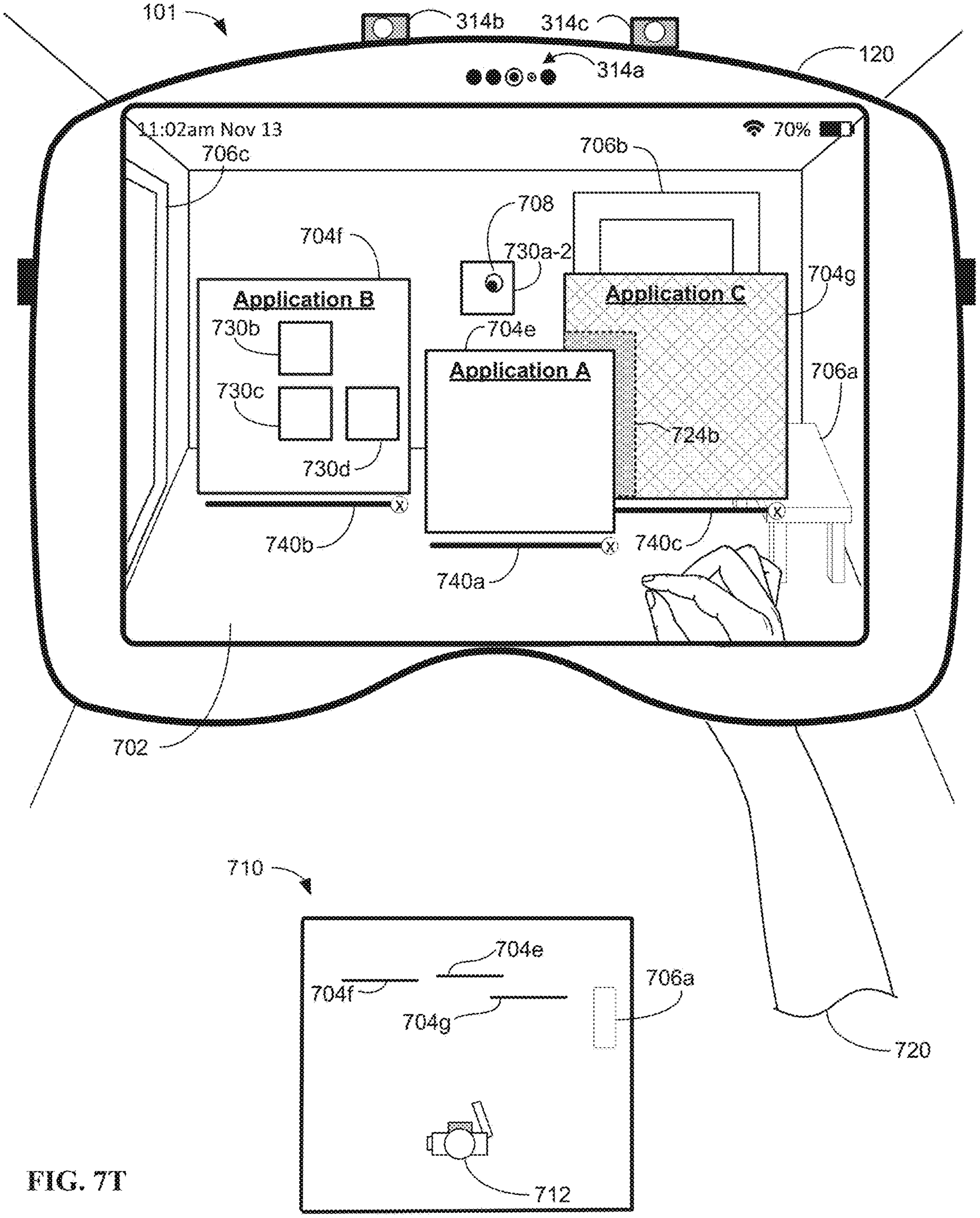

FIG. 7T illustrates user 712 performing an input corresponding to a request to move virtual element 730*a* in three-dimensional environment 702 toward third virtual object 704*g*. In some embodiments, the input shown in FIG. 7T is a continuation of the input initiated in FIG. 7S (e.g., user 712 maintains the air gesture performed by hand 720 while moving hand 720 relative to three-dimensional environment 702). In some embodiments, the movement of virtual element 730*a*-2 in three-dimensional environment 702 corresponds to movement of hand 720 relative to three-dimensional environment 702 (e.g., user 712 moves hand 720 toward a location in three-dimensional environment 702 corresponding to third virtual object 704*g*). As shown in FIG. 7T, as computer system 101 detects the input corresponding to the request to move virtual element 730*a* in three-dimensional environment 702 toward third virtual object 704*g*, computer system 101 maintains display of first virtual object 704*e* with the increased amount of visual prominence (e.g., the first amount of visual prominence), second virtual object 704*f* with the increased amount of visual prominence, and third virtual object 704*g* with the reduced amount of visual prominence (e.g., the second amount of visual prominence).

In some embodiments, while moving virtual element 730*a* in three-dimensional environment 702 in accordance with the input shown in FIG. 7T, computer system 101 changes a visual appearance of virtual element 730*a*. In some embodiments, in FIG. 7S, virtual element 730*a* is displayed with a first visual appearance (e.g., the first visual appearance of virtual element 730*a* is referenced as 730*a*-1 in FIG. 7S). For example, virtual element 730*a*-1 shown in FIG. 7S includes a first size, shape and/or amount of opacity, brightness, color, saturation and/or sharpness. In some embodiments, in FIG. 7T, virtual element 730*a* is displayed with a second visual appearance different from the first visual appearance (e.g., the second visual appearance of virtual element 730*a* is referenced as 730*a*-2 in FIG. 7T). For example, virtual element 730*a*-2 shown in FIG. 7T includes a second size, shape and/or amount of opacity, brightness, color, saturation and/or sharpness (e.g., virtual element 730*a*-2 shown in FIG. 7T is displayed with a smaller size, different shape and/or with more or less opacity, brightness, color, saturation and/or sharpness compared to virtual element 730*a*-1 shown in FIG. 7S).

Figure 7U:
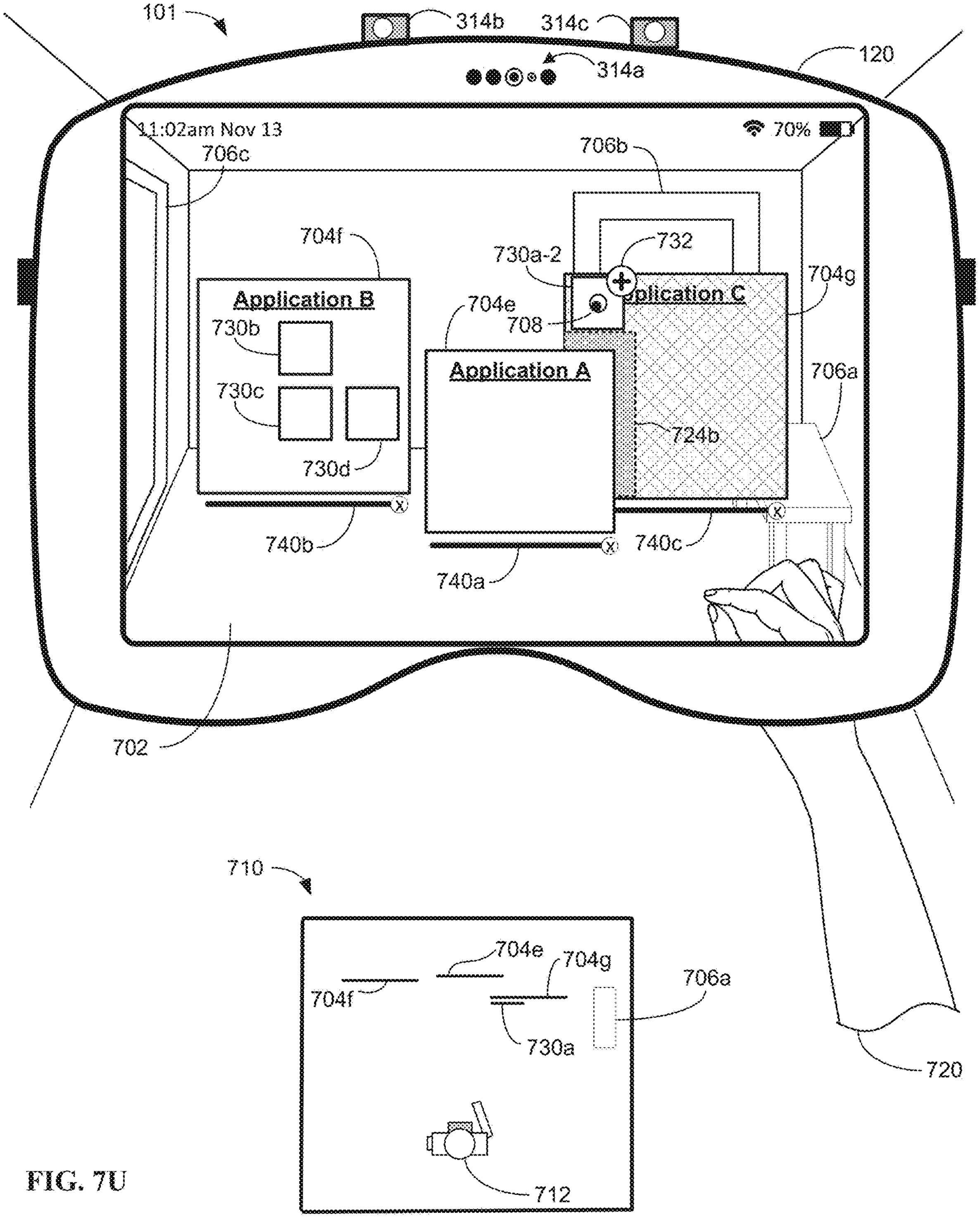

FIG. 7U illustrates movement of virtual element 730*a* to third virtual object 704*g* in three-dimensional environment 702. As shown in FIG. 7U, user 712 continues to provide the input corresponding to the request to move virtual element 730*a* toward third virtual object 704*g* that is shown in FIG. 7T (e.g., and initiated in FIG. 7S). In some embodiments, in accordance with virtual element 730*a* being within a threshold distance (e.g., 0.01, 0.05, 0.1, 0.2, 0.5 or 1 m) of third virtual object 704*g* during the movement of virtual element 730*a* in three-dimensional environment 702, computer system 101 moves virtual element 730*a* to third virtual object 704*g* (e.g., as described with reference to method 800). As shown in FIG. 7U, virtual element 730*a* is displayed at a location in three-dimensional environment 702 corresponding to third virtual object 704*g*. For example, computer system 101 moves virtual element 730*a* to the location in three-dimensional environment 702 corresponding to third virtual object 704*g* in accordance with virtual element 730*a* being within the threshold distance of third virtual object 704*g* during the movement of virtual element 730*a* in three-dimensional environment 702. As shown in FIG. 7U, in accordance with computer system 101 moving virtual element 730*a* to the location in three-dimensional environment 702 corresponding to third virtual object 704*g*, computer system 101 maintains display of third virtual object 704*g* with the reduced amount of visual prominence. Further, as shown in FIG. 7U, computer system 101 maintains display of first virtual object 704*e* and second virtual object 704*f* with the increased amount of visual prominence.

As shown in FIG. 7U, virtual element 730*a* is displayed with visual item 732. In some embodiments, visual item 732 corresponds to visual feedback that is displayed in three-dimensional environment 702 in accordance with virtual element 730*a* being moved to the location in three-dimensional environment 702 corresponding to third virtual object 704*g*. In some embodiments, when visual item 732 is displayed in three-dimensional environment 702, in accordance with user 712 terminating the input corresponding to the request to move virtual element 730*a* toward third virtual object 704*g*, computer system 101 adds virtual element 730*a* to third virtual object 704*g* (e.g., as described with reference to FIG. 7V). Displaying the visual item 732 in three-dimensional environment 702 informs user 712 that if user 712 ceases to provide the input shown in FIG. 7U (e.g., user 712 ceases to perform the air pinch with hand 720), computer system 101 will add virtual element 730*a* to third virtual object 704*g* (e.g., and provides user 712 the opportunity to move virtual element 730*a* to a different location in three-dimensional environment 702 that is outside of the threshold distance from third virtual object 704*g* prior to terminating the input (e.g., in order to avoid virtual element 730*a* from being added to third virtual object 704*g*)).

Figure 7V:
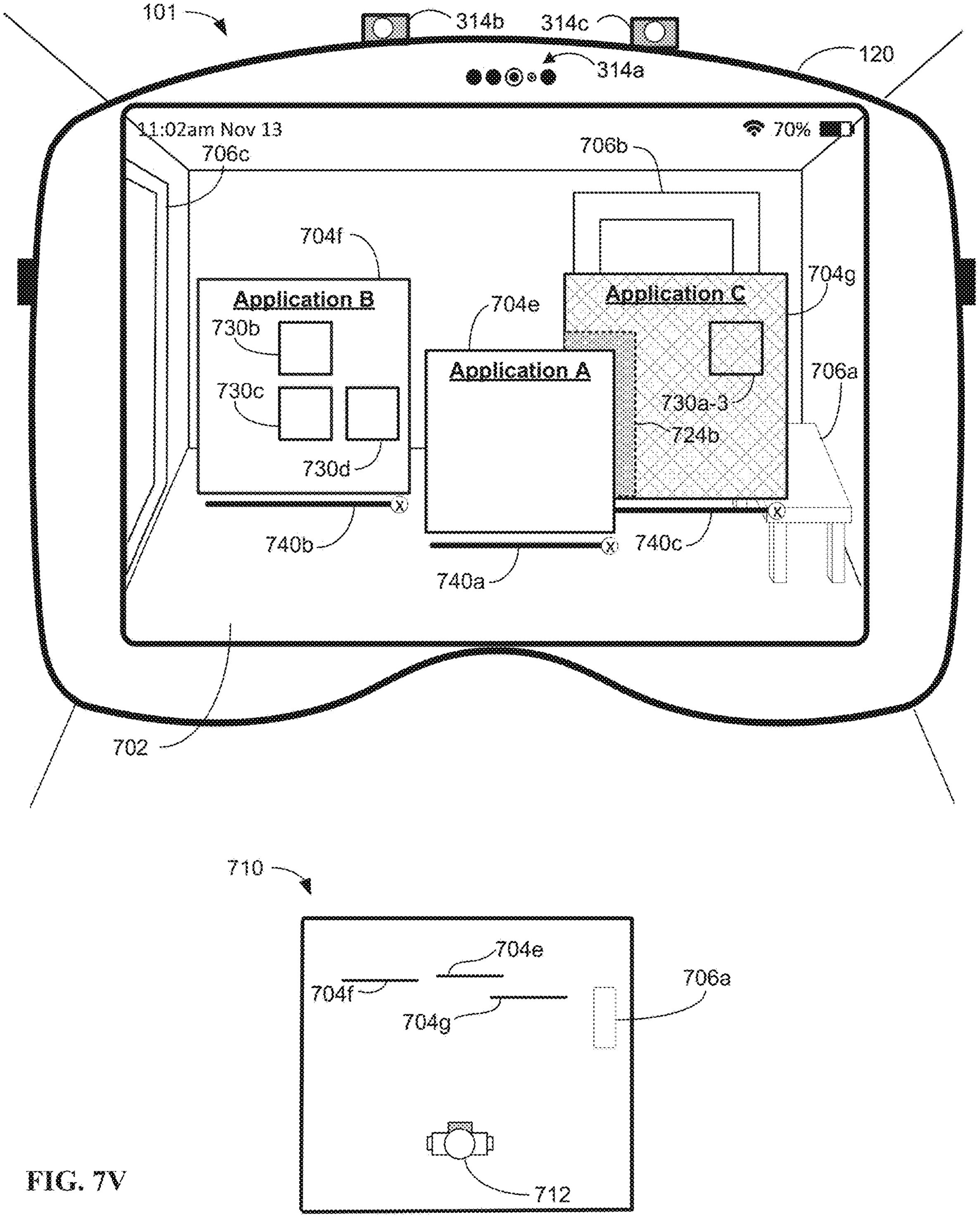

FIG. 7V illustrates virtual element 730*a* added to third virtual object 704*g* after user 712 terminates the input corresponding to the request to move virtual element 730*a* toward third virtual object 704*g*. In some embodiments, adding virtual element 730*a* to third virtual object 704*g* includes one or more characteristics of adding the virtual element to the respective virtual object in the three-dimensional environment as described with reference to method 800. For example, as shown in FIG. 7V, virtual element 730*a* is displayed within third virtual object 704*g*. Further, in FIG. 7V, computer system 101 maintains display of third virtual object 704*g* with the second amount of visual prominence when virtual element 730*a* is added to third virtual object 704*g*. Additionally, as shown in FIG. 7V, computer system 101 maintains display of first virtual object 704*e* and second virtual object 704*f* with the increased amount of visual prominence. In some embodiments, after adding virtual element 730*a* to third virtual object 704*g*, computer system 101 displays third virtual object 704*g* with an increased amount of visual prominence (e.g., the first amount of visual prominence, or the third visual prominence greater than the second visual prominence as described with reference to method 800). For example, computer system 101 does not display third virtual object 704*g* with the increased amount of visual prominence prior to virtual element 730*a* being added to third virtual object 704*g* or while virtual element 730*a* is added to third virtual object 704*g* (e.g., computer system 101 maintains display of third virtual object 704*g* with the second amount of visual prominence). In some embodiments, in accordance with third virtual object 704*g* being displayed with the increased amount of visual prominence, computer system 101 displays first virtual object 704*e* with a reduced amount of visual prominence (e.g., the second amount of visual prominence).

In some embodiments, adding virtual element 730*a* to third virtual object 704*g* includes changing a visual appearance of virtual element 730*a*. For example, virtual element 730*a* is displayed with a third visual appearance (e.g., the third visual appearance of virtual element 730*a* is referenced as 730-3 in FIG. 7V). Displaying virtual element 730*a* with the third visual appearance is optionally different from displaying virtual element 730*a* with the first visual appearance and/or the second visual appearance. In some embodiments, the third visual appearance of virtual element 730*a* includes displaying virtual element 730*a* with less opacity, color, brightness, saturation and/or sharpness compared to displaying virtual element 730*a* with the first visual appearance (e.g., because in FIG. 7V, virtual element 730*a* is included in a respective virtual object that is displayed with less opacity, color, brightness, saturation and/or sharpness compared to the respective virtual object that virtual element 730*a* was included in when virtual element 730*a* is displayed with the first visual appearance). In some embodiments, virtual element 730*a*-3 includes a different size and/or shape compared to virtual element 730-2 (e.g., shown in FIGS. 7T-7U).

Figure 7W:
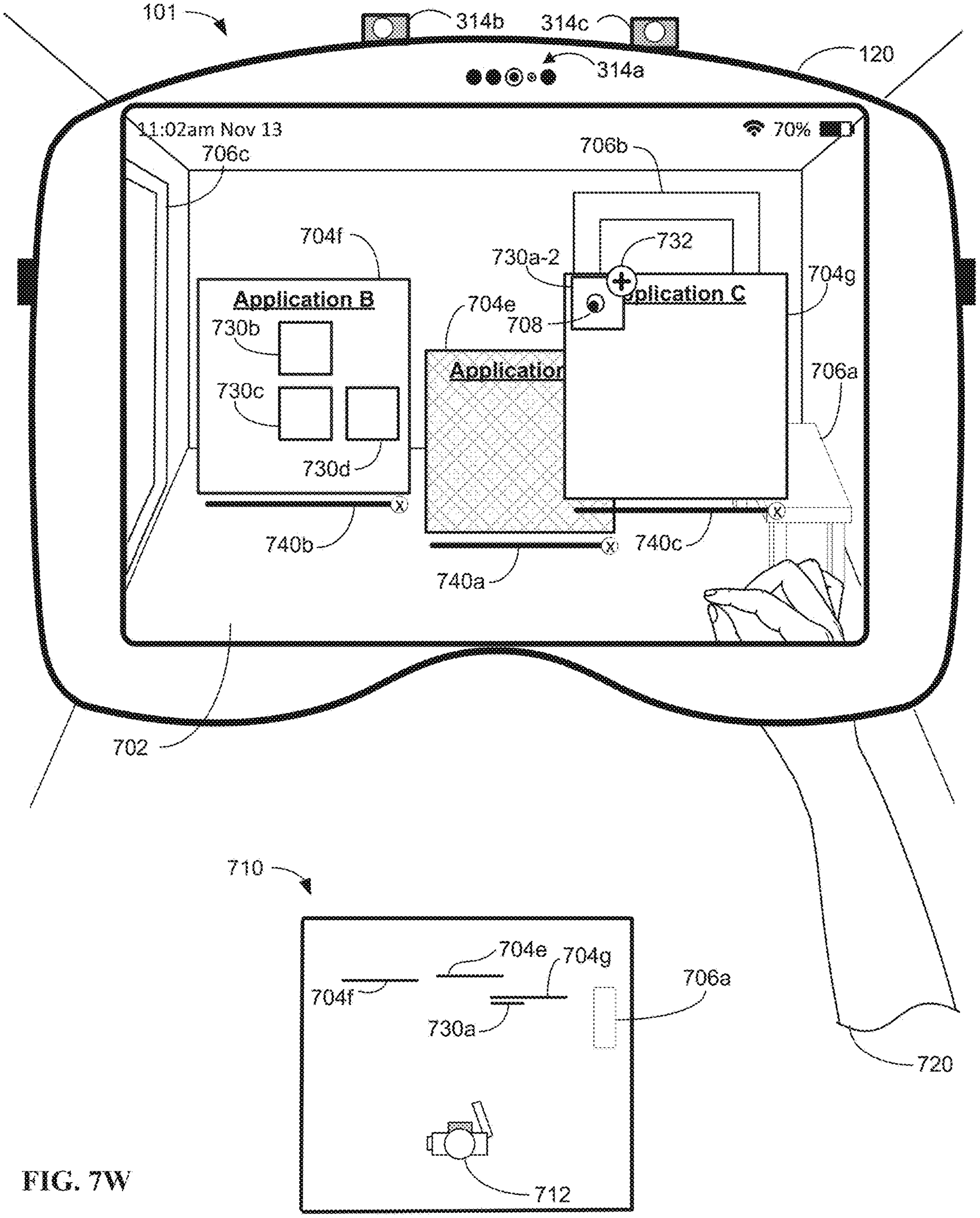

FIG. 7W illustrates an alternative embodiment from FIG. 7U that includes computer system 101 displaying third virtual object 704*g* with an increased amount of visual prominence (e.g., first amount of visual prominence, or the third visual prominence greater than the second visual prominence as described with reference to method 800) in accordance with one or more criteria being satisfied during the movement of virtual element 730*a* in three-dimensional environment 702. In some embodiments, the one or more criteria have one or more characteristics of the one or more first criteria described with reference to method 800. In some embodiments, computer system 101 displays third virtual object 704*g* with the increased amount of visual prominence in accordance with virtual element 730*a* being within the threshold distance of third virtual object 704*g* (e.g., for a threshold period of time (e.g., 0.1, 0.2, 0.5, 1, 2, 5 or 10 seconds)) during the movement of virtual element 730*a* in three-dimensional environment 702. In some embodiments, computer system 101 displays third virtual object 704*g* with the increased amount of visual prominence in accordance with movement of virtual element 730*a* being less than a threshold amount of movement (e.g., less than 0.01, 0.05, 0.1, 0.2, 0.5 or 1 m relative to three-dimensional environment 702 over 0.1, 0.2, 0.5, 1, 2, 5 or 10 seconds, or less than an average velocity of 0.01, 0.02, 0.05, 0.1, 0.2, 0.5 or 1 m/s over 0.1, 0.2, 0.5, 1, 2, 5 or 10 seconds). For example, while the input corresponding to the request to move virtual element 730*a* toward virtual object 704*g* is being performed, virtual element 730*a* is displayed at the location in three-dimensional environment 702 corresponding to third virtual object 704*g* for more than a threshold period of time (e.g., 0.1, 0.2, 0.5, 1, 2, 5 or 10 seconds). In accordance with virtual element 730*a* being displayed at the location in three-dimensional environment 702 corresponding to third virtual object 704*g* for more than the threshold period of time, computer system 101 displays third virtual object 704*g* with the increased amount of visual prominence. In some embodiments, computer system 101 displays third virtual object 704*g* with the increased amount of visual prominence in accordance with a threshold amount of third virtual object 704*g* being visible in three-dimensional environment 702 (e.g., as described with reference to the one or more first criteria including a criterion that is satisfied in accordance with the first portion of the respective virtual object being visible in the three-dimensional environment in method 800). As shown in FIG. 7W, in accordance with computer system 101 displaying third virtual object 704*g* with the increased amount of visual prominence, computer system 101 displays first virtual object 704*e* (e.g., which continues to be overlapped by third virtual object 704*g* by more than the threshold amount) with a reduced amount of visual prominence (e.g., the second amount of visual prominence). Further, as shown in FIG. 7W, computer system 101 maintains display of second virtual object 704*f* with the increased amount of visual prominence (e.g., because second virtual object 704*f* is displayed with the increased amount of visual prominence prior to the change in visual prominence of first virtual object 704*e* and third virtual object 704*g*, and second virtual object 704*f* does not overlap first virtual object 704*e* or third virtual object 704*g* by more than the threshold amount).

Figure 7X:
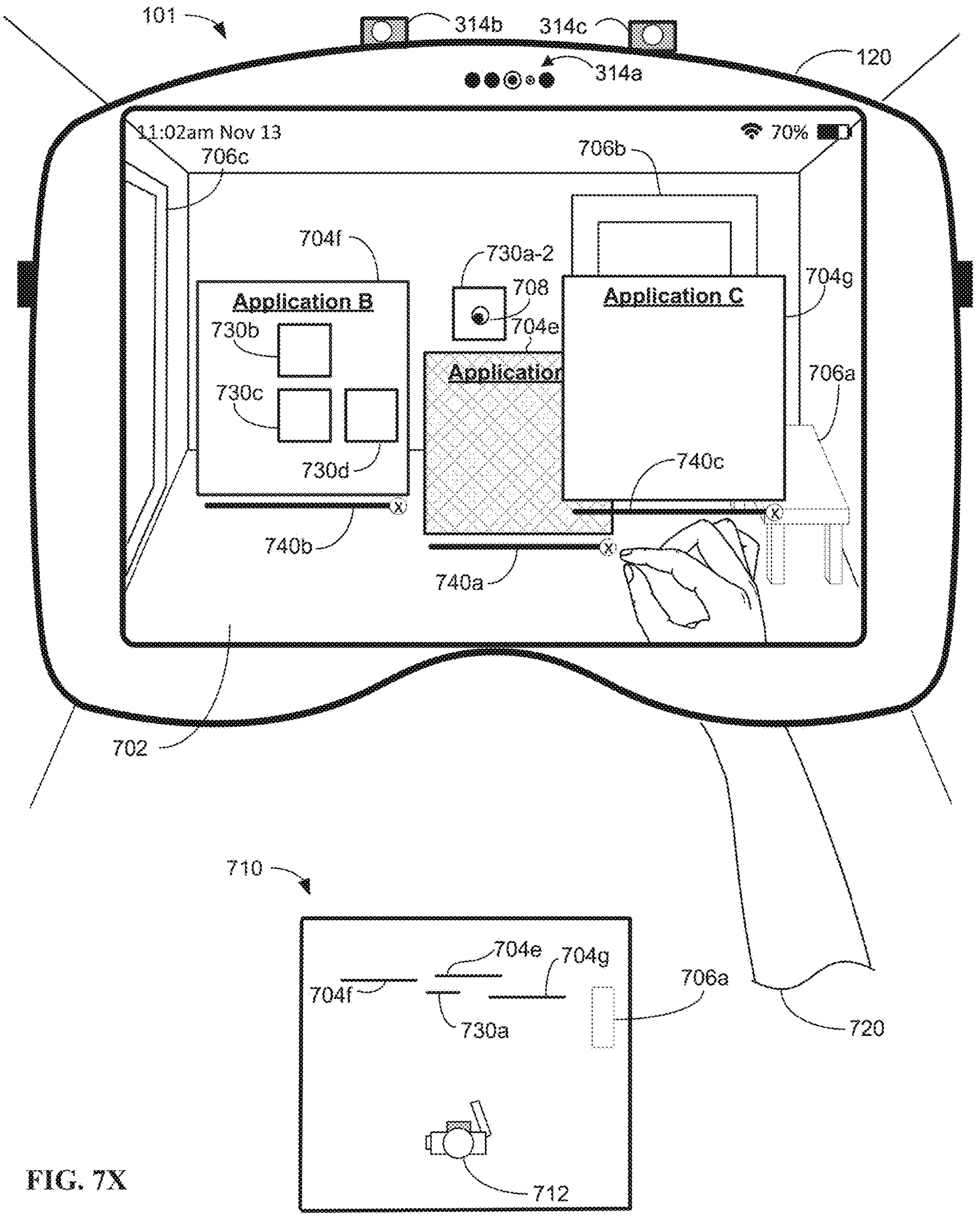

FIG. 7X illustrates user 712 performing an input corresponding to a request to move virtual element 730*a* in three-dimensional environment 702 away from third virtual object 704*g*. In some embodiments, the input shown in FIG. 7X is a continuation of the input initiated in FIG. 7S and shown in FIGS. 7T and 7W (e.g., user 712 maintains the air gesture (e.g., air pinch) and performs movement with hand 720 relative to three-dimensional environment 702). As shown in FIG. 7X, virtual element 730*a* is moved to a location in three-dimensional environment 702 that does not correspond to third virtual object 704*g* (e.g., user 712 moves virtual element 730*a* away from third virtual object 704*g* after computer system 101 moves virtual element 730*a* to third virtual object 704*g* in accordance with virtual element 730*a* being within the threshold distance of third virtual object 704*g*). In some embodiments, user 712 moves virtual element 730*a* away from third virtual object 704*g* after the one or more criteria are met (e.g., as described with reference to FIG. 7W) to increase the visual prominence of third virtual object 704*g*. As shown in FIG. 7X, in accordance with virtual element 730*a* being moved away from the location in three-dimensional environment 702 corresponding to third virtual object 704*g*, computer system 101 maintains display of third virtual object 704*g* with the increased amount of visual prominence. In some embodiments, in accordance with computer system 101 detecting termination of the input corresponding to the request to move virtual element 730*a* in three-dimensional environment 702 while virtual element 730*a* is displayed at the location away from third virtual object 704*g*, computer system 101 maintains display of third virtual object 704*g* with the increased amount of visual prominence (e.g., and first virtual object 704*e* with the reduced amount of visual prominence and second virtual object 704*f* with the increased amount of visual prominence). In some embodiments, in accordance with computer system 101 detecting termination of the input corresponding to the request to move virtual element 730*a* in three-dimensional environment 702 while virtual element 730*a* is displayed at the location away from third virtual object 704*g*, computer system 101 forgoes adding virtual element 730*a* to third virtual object 704*g* (e.g., because virtual element 730*a* is not within the threshold distance of third virtual object 704*g* and/or is not displayed at the location corresponding to third virtual object 704*g* in three-dimensional environment 702). For example, after detecting termination of the input, computer system 101 maintains display of virtual element 730*a* at the location away from third virtual object 704*g*. For example, after detecting termination of the input, computer system 101 adds (e.g., returns) virtual element 730*a* to second virtual object 704*f*.

Figure 7Y:
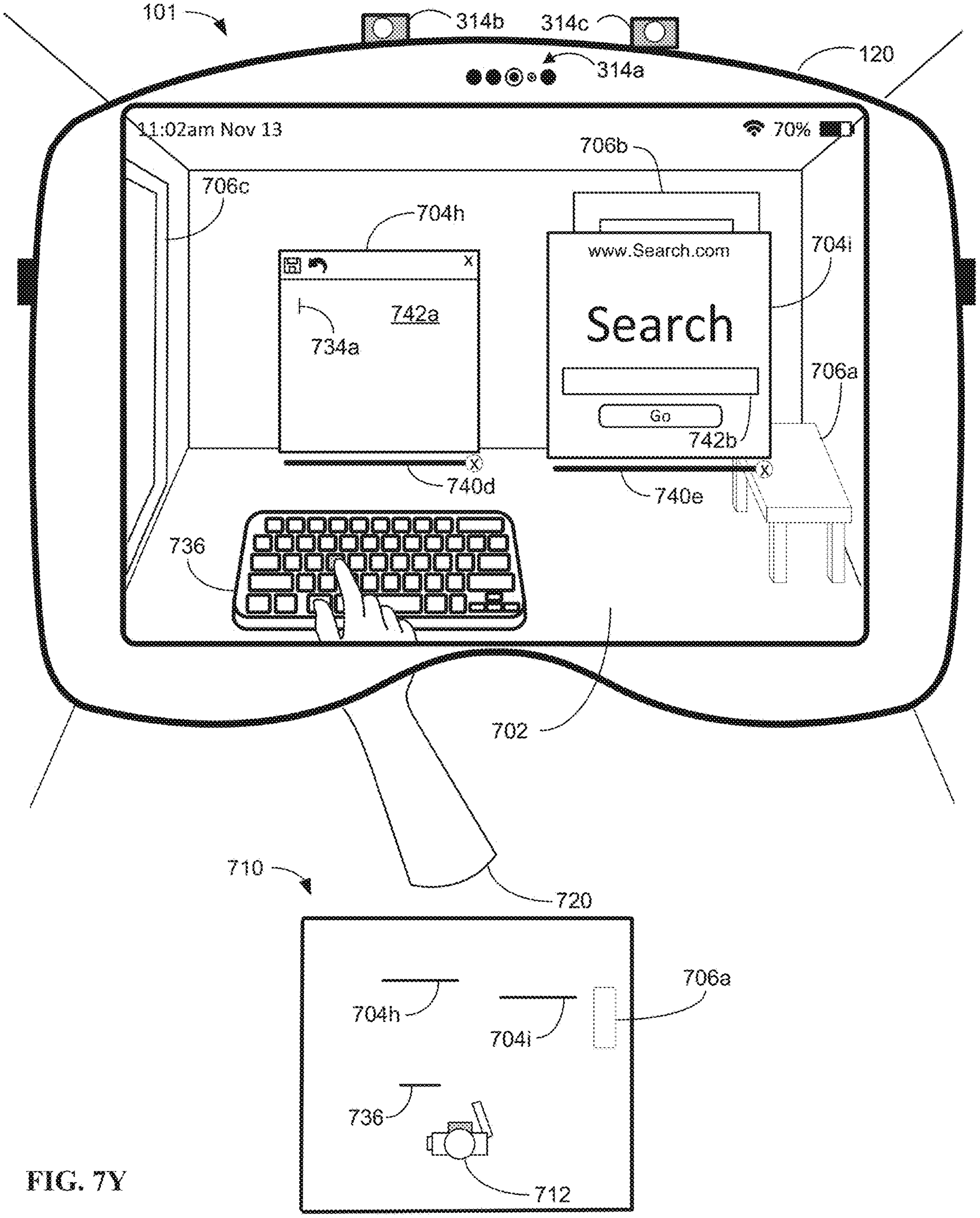

FIG. 7Y illustrates a first virtual object and a second virtual object displayed in three-dimensional environment 702 with an input interface. In some embodiments, first virtual object 704*h* and second virtual object 704*i* are associated with applications that user 712 can provide input to. For example, first virtual object 704*h* is associated with a word processing application and second virtual object 704*i* is associated with a web browsing application or a search engine application. In FIG. 7Y, first virtual object 704*h* and second virtual object 704*i* are displayed with virtual elements 740*d* and 740*e*, respectively. In some embodiments, virtual elements 740*d* and 740*e* are selectable (e.g., through an input corresponding to gaze directed to virtual element 740*d* or virtual element 740*e* and an air gesture) to move first virtual object 704*h* or second virtual object 704*i* relative to three-dimensional environment 702 (e.g., selection of virtual element 740*d* corresponds to initiating movement of first virtual object 704*h* relative to three-dimensional environment 702). As shown in FIG. 7Y, virtual elements 740*d* and 740*e* are displayed with virtual affordances that have one or more characteristics of the virtual affordances described above.

As shown in FIG. 7Y, input interface 736 is a virtual keyboard (e.g., input interface 736 has one or more characteristics of the input element described with reference to method 800). In some embodiments, input interface 736 is associated with first virtual object 704*h* (e.g., inputs provided through input interface 736 correspond to inputs provided to a respective application associated with first virtual object 704*h*). In some embodiments, in accordance with input interface 736 being associated with first virtual object 704*h*, user 712 can provide inputs through input interface 736 to add and/or edit text in a user interface of first virtual object 704*h*. Particularly, with reference to FIG. 7Y, input provided by user 712 through input interface 736 corresponds to adding and/or editing text to a text entry user interface 742*a* associated with first virtual object 704*h*. For example, text entry user interface 742*a* is associated with a document. As shown in FIG. 7Y, a cursor 734*a* is shown to represent a location in text entry user interface 742*a* where text will be added in response to input provided through input interface 736.

In some embodiments, in accordance with input interface 736 being associated with first virtual object 704*h*, input interface 736 is displayed at a location in three-dimensional environment 702 that is based on a location of first virtual object 704*h* in three-dimensional environment 702. For example, as shown in FIG. 7Y, input interface 736 is displayed to align with first virtual object 704*h* (e.g., from the current viewpoint of user 712 (e.g., input interface 736 is centered with first virtual object 704*h* from the current viewpoint of user 712)). In some embodiments, input interface 736 is displayed at a location in three-dimensional environment 702 that is independent of a location of a respective virtual object that input interface 736 is associated with. For example, in some embodiments, input interface 736 is displayed at a location that is based on the current viewpoint of user 712 (e.g., at a location that is aligned with a center of the current viewpoint of user 712). As shown in overhead view 710 in FIG. 7Y, input interface 736 is displayed at a location in three-dimensional environment 702 that is within a closer proximity to the current viewpoint of user 712 than first virtual object 704*h*. In some embodiments, input interface 736 is displayed at a location in three-dimensional environment 702 that enables user 712 to be able to successfully interact with input interface 736. For example, in accordance with input interface 736 being a virtual keyboard (e.g., as shown in FIG. 7Y), input interface 736 is displayed at a distance from the current viewpoint of user 712 such that user 712 can read the keys of the virtual keyboard. For example, input interface 736 is displayed at a distance from the current viewpoint of user 712 such that input interface 736 is within a proximity to one or more portions of user 712 (e.g., in proximity to hand 720 such that user 712 can move hand 720 to a location in three-dimensional environment 702 corresponding to input interface 736 (e.g., and/or to one or more keys of the virtual keyboard). As shown in FIG. 7Y, user 712 provides an input directed to input interface 736 (e.g., corresponding to an air gesture (e.g., air tap) directed to a key of the virtual keyboard). The input includes an air gesture (e.g., air tap) performed by hand 720 to a portion of input interface 736 that corresponds to a key of the virtual keyboard. In some embodiments, the input includes attention (e.g., gaze) directed to the portion of input interface 736 that corresponds to the key of the virtual keyboard while user 712 performs the air gesture.

Figure 7Z:
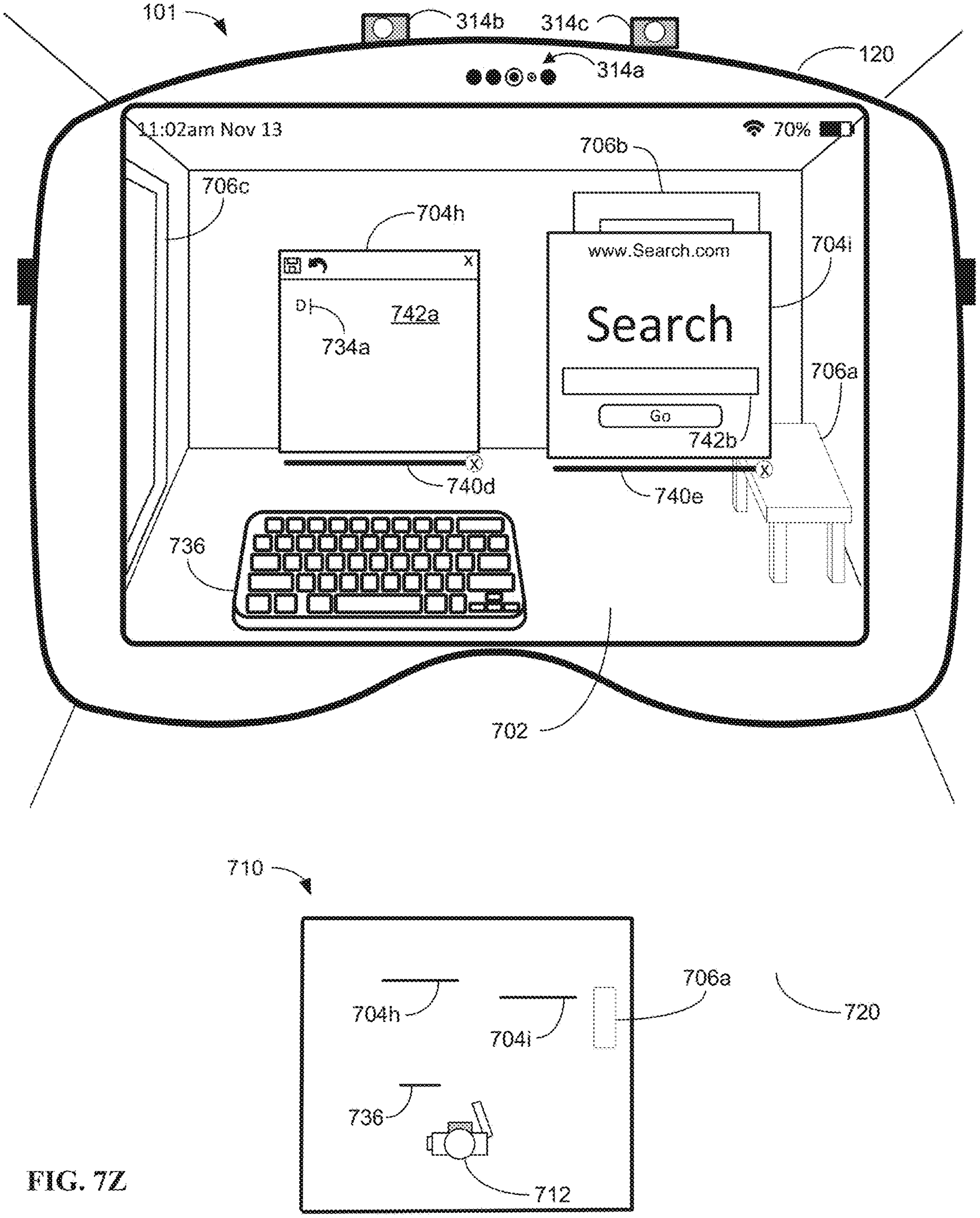
Figure 7A:
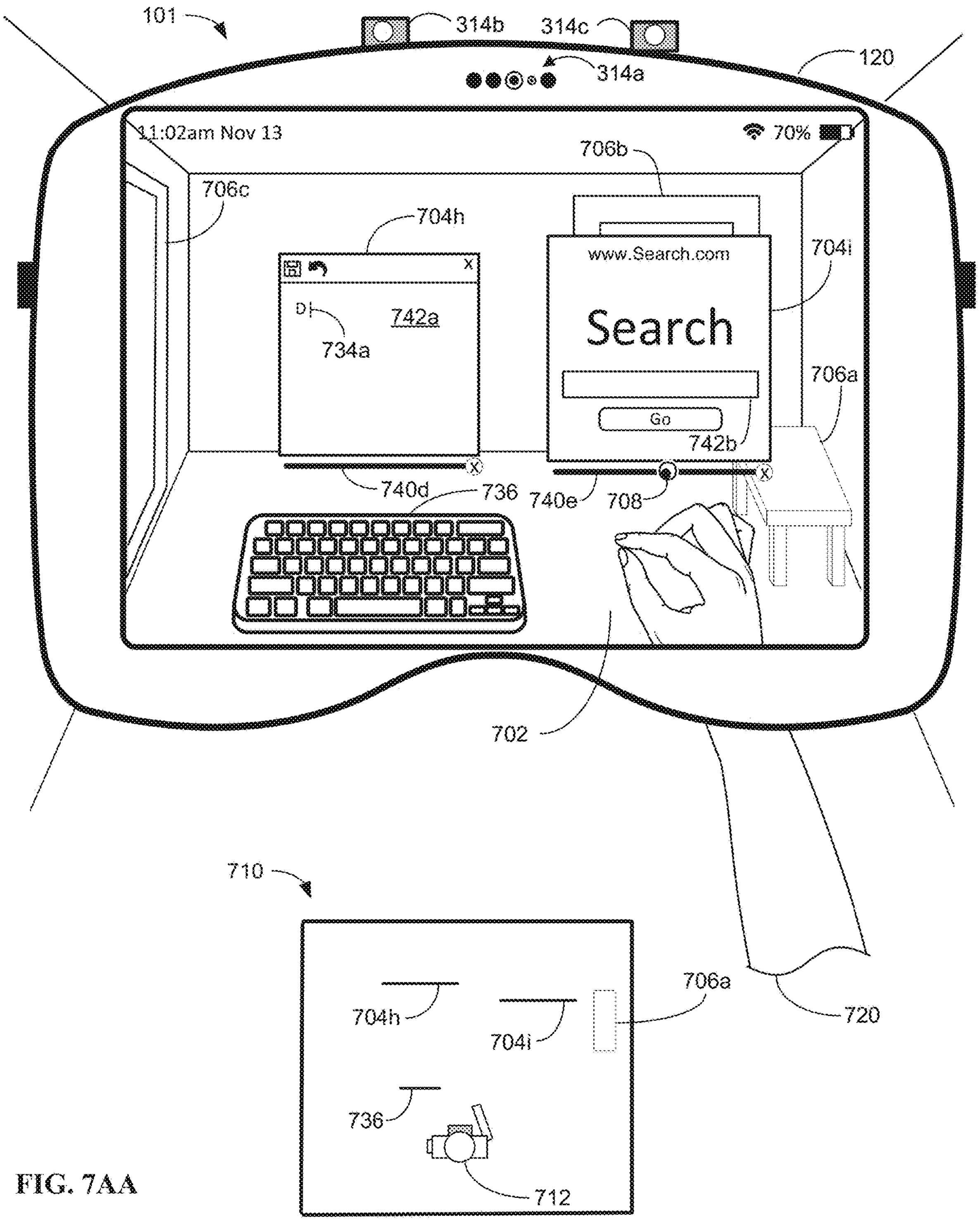
Figure 7B:
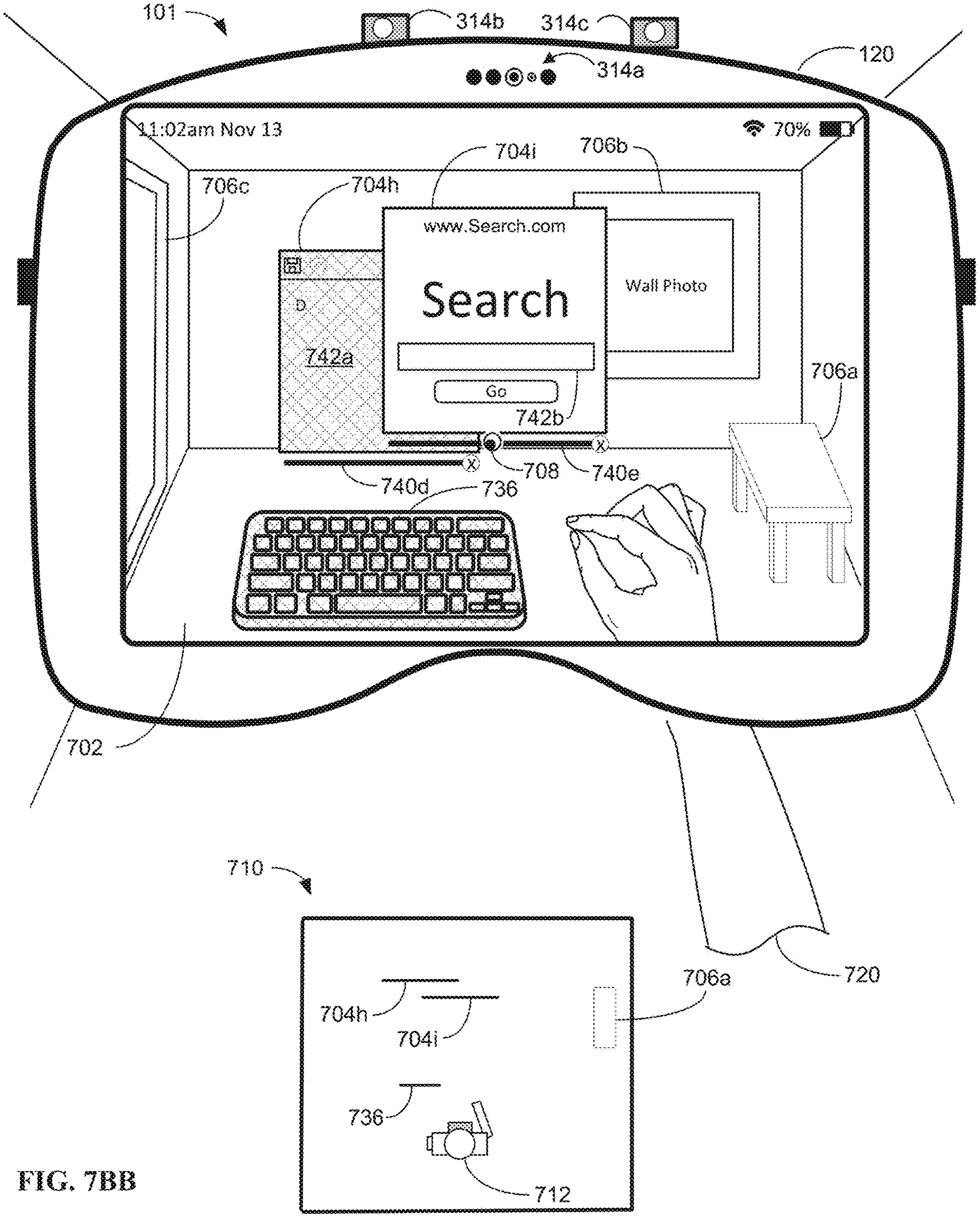
Figure 7C:
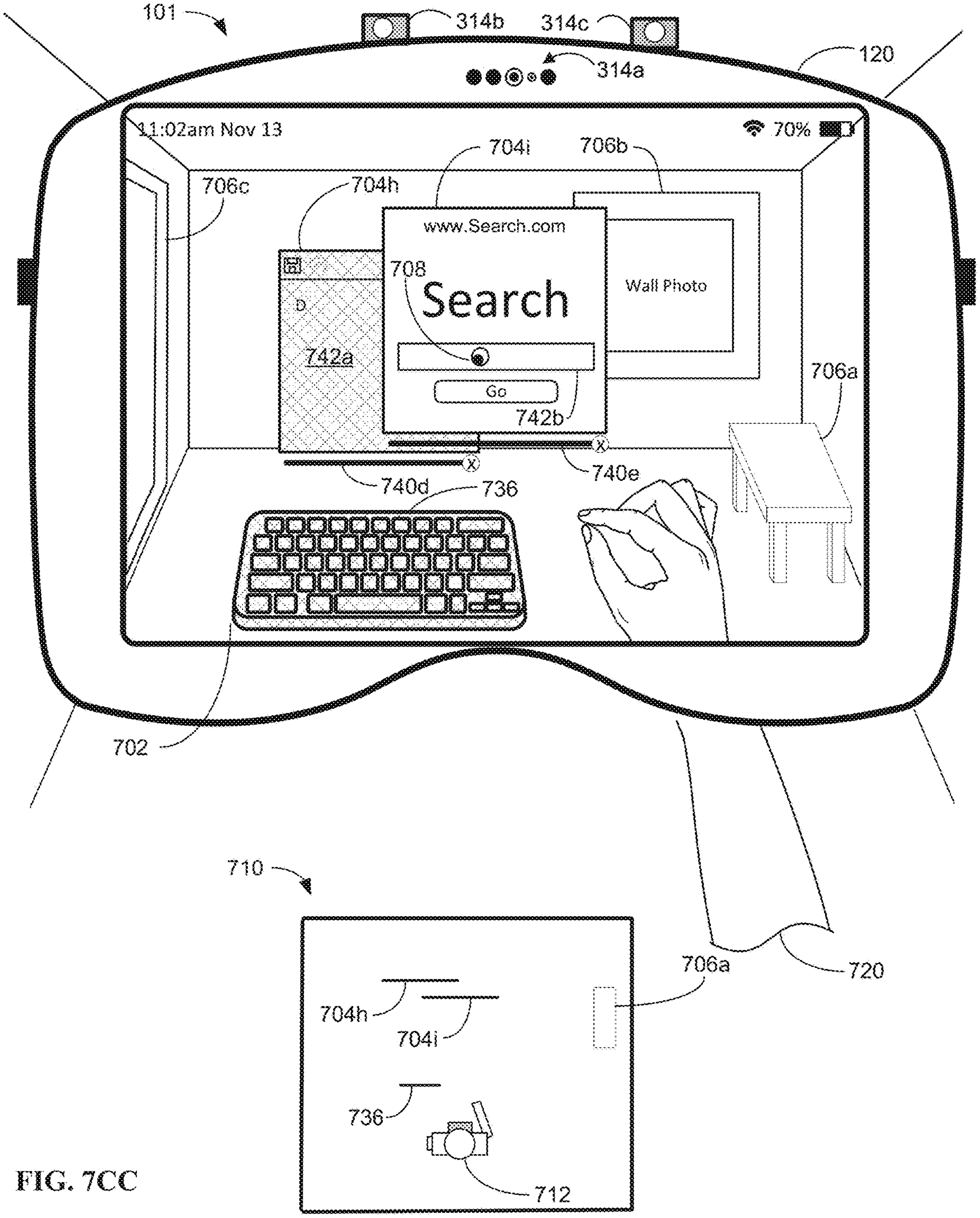
Figure 7D:
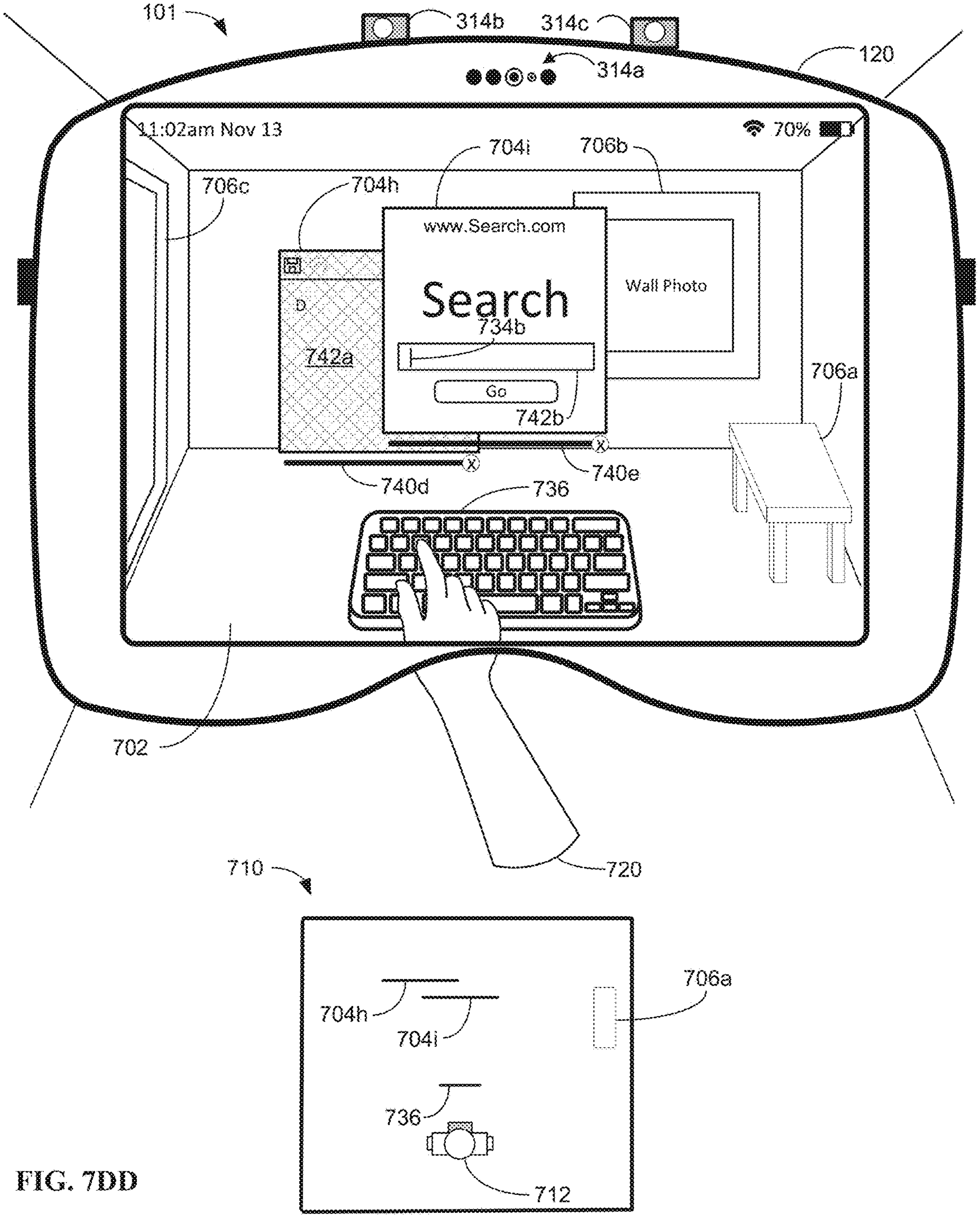
Figure 7E:
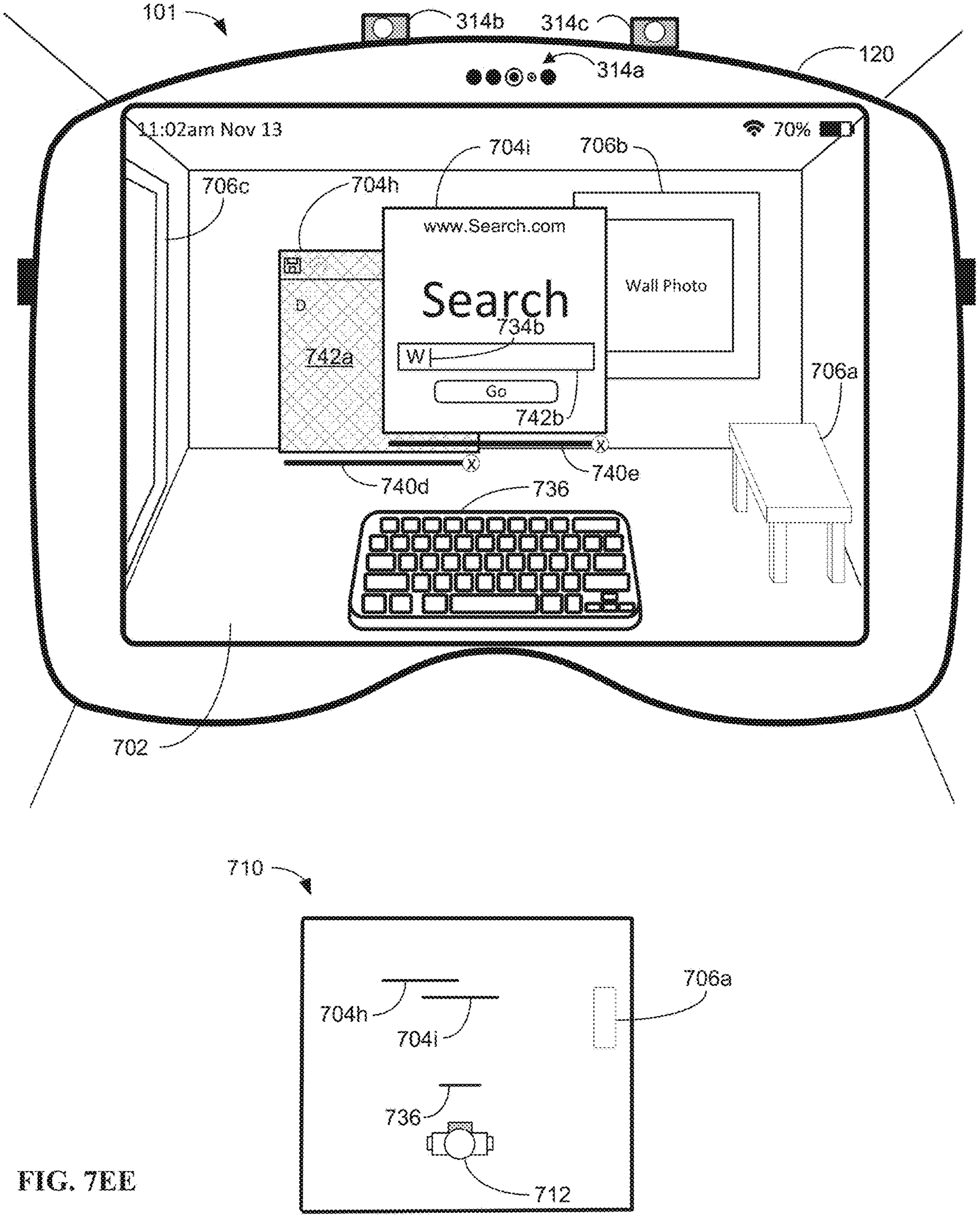

FIG. 7Z illustrates text typed in text entry user interface 742*a* associated with first virtual object 704*h* as a result of the input directed to input interface 736 in FIG. 7Y. As shown in FIG. 7Z, the letter "D" is typed in text entry user interface 742*a* as a result of the input (e.g., the letter "D" corresponds to the key of the virtual keyboard that the input is directed to in FIG. 7Y). In FIG. 7Z, as a result of the addition of text in text entry user interface 742*a*, the location of cursor 734*a* is updated within text entry user interface 742*a* (e.g., the updated location of cursor 734*a* corresponds to the location in text entry user interface 742*a* where additional text will be inserted as a result of additional input provided through input interface 736). In some embodiments, the location of cursor 734*a* is further updated in response to the addition, revision and/or removal of text in text entry user interface 742*a* that occurs in response to input provided through input interface 736 (e.g., the location of cursor 734*a* is further updated in response to an input provided through input interface 736 corresponding to a request to move cursor 734*a* within text entry user interface 742*a*).

FIG. 7AA illustrates user 712 providing an input corresponding to a request to move second virtual object 704*i* in three-dimensional environment 702. As shown in FIG. 7AA, gaze 708 is directed to virtual element 740*e* while user 712 concurrently performs an air gesture (e.g., an air pinch) with hand 720. In some embodiments, the input shown in FIG. 7AA corresponds to selection of second virtual object 704*i*. While second virtual object 704*i* is selected, second virtual object 704*i* can be moved in three-dimensional environment 702 in response to user 712 maintaining the air gesture (e.g., air pinch) with hand 720 while performing movement of hand 720 relative to three-dimensional environment 702. In some embodiments, movement of second virtual object 704*i* in three-dimensional environment 702 is based on the movement of hand 720 that is associated with the input shown in FIG. 7AA.

FIG. 7BB illustrates input interface 736 displayed with a reduced amount of visual prominence in response to movement of second virtual object 704*i* that causes more than the threshold amount of overlap between first virtual object 704*h* and second virtual object 704*i*. As shown in FIG. 7BB, the movement of second virtual object 704*i* caused by the input initiated in FIG. 7AA causes second virtual object 704*i* to overlap first virtual object 704*h* by more than the threshold amount. In accordance with second virtual object 704*i* overlapping first virtual object 704*h* by more than the threshold amount, computer system 101 displays first virtual object 704*h* with the second amount of visual prominence. In some embodiments, as shown in FIG. 7BB, since input interface 736 is associated with first virtual object 704*h* and first virtual object 704*h* is displayed with the second amount of visual prominence, computer system 101 displays input interface 736 with the reduced amount of visual prominence. For example, displaying input interface 736 with the reduced amount of visual prominence includes displaying input interface 736 with less opacity, brightness, color, saturation and/or sharpness compared to displaying input interface 736 with the amount of visual prominence shown in FIGS. 7Y-7AA. In some embodiments, in accordance with computer system 101 detecting an input provided by user 712 directed to input interface 736 while input interface 736 is displayed with the reduced amount of visual prominence (e.g., and while second virtual object 704*i* overlaps first virtual object 704*h* by more than the threshold amount), computer system 101 forgoes updating (e.g., by adding and/or revising text) text entry user interface 742*a* in accordance with the input. In some embodiments, computer system 101 displays input interface 736 with the reduced amount of visual prominence based on first virtual object 704*h* being displayed with a reduced amount of visual prominence (e.g., in accordance with first virtual object 704*h* being displayed with an increased amount of visual prominence, computer system 101 displays input interface 736 with an increased amount of visual prominence). In some embodiments, computer system 101 displays input interface 736 with the reduced visual prominence independent of an amount of overlap between second virtual object 704*i* and input interface 736 (e.g., input interface 736 is displayed with the reduced amount of visual prominence because first virtual object 704*h* is displayed with a reduced amount of visual prominence as opposed to because input interface 736 overlaps with second virtual object 704*i* by more than a threshold amount (e.g., as shown in FIG. 7BB, second virtual object 704*i* does not overlap input interface 736 in three-dimensional environment 702 from the current viewpoint of user 712)).

FIG. 7CC illustrates user 712 providing an input to a text entry user interface of second virtual object 704*i*. In some embodiments, text entry user interface 742*b* of second virtual object 704*i* is a text field associated with a search engine. As shown in FIG. 7CC, the input includes gaze 708 directed to text entry user interface 742*b* while user 712 concurrently performs an air gesture with hand 720. In some embodiments, the input shown in FIG. 7CC corresponds to a request to associate input interface 736 with second virtual object 704*i* (e.g., user 712 requests to use input interface 736 to type text in the text field associated with second virtual object 704*i*).

FIG. 7DD illustrates input interface 736 displayed in three-dimensional environment 702 associated with second virtual object 704*i* as a result of the input provided by user 712 in FIG. 7CC. As shown in FIG. 7DD, input interface 736 is displayed in three-dimensional environment 702 with an increased amount of visual prominence (e.g., corresponding to the amount of visual prominence input interface 736 is displayed with in FIGS. 7Y-7AA). For example, input interface 736 is displayed with a greater amount of opacity, brightness, color, saturation and/or sharpness compared to as shown in FIGS. 7BB-7CC. In some embodiments, associating input interface 736 with second virtual object 704*i* includes ceasing to display input interface 736 in three-dimensional environment 702 associated with first virtual object 704*h* and displaying input interface 736 in three-dimensional environment 702 associated with second virtual object 704*i*. As shown in FIG. 7DD (e.g., in overhead view 710), computer system 101 displays input interface 736 at a location in three-dimensional environment 702 that is based on a location of second virtual object 704*i* (e.g., input interface 736 is aligned (e.g., centered) with second virtual object 704*i*). Further, as shown in overhead view 710, computer system 101 displays input interface 736 within a closer proximity of the current viewpoint of user 712 compared to second virtual object 704*i* (e.g., computer system 101 displays input interface 736 at the distance in the direction of depth from the current viewpoint of user 712 compared to as shown in FIGS. 7Y-7CC). In some embodiments, associating input interface 736 with second virtual object 704*i* does not include moving input interface 736 in three-dimensional environment 702. For example, as a result of the input provided by user 712 in FIG. 7CC, and while input interface 736 is displayed at a location in three-dimensional environment 702 that is independent of a location of a respective virtual object (e.g., first virtual object 704*h*) that input interface 736 is associated with (e.g., as described above), computer system 101 maintains display of input interface 736 at the location in three-dimensional environment 702 that is independent of the location of the respective virtual object that input interface 736 is associated with (e.g., and increases the visual prominence of input interface 736 in accordance with input interface 736 being displayed with a reduced amount of visual prominence at the time the input is detected). In some embodiments, as shown in FIG. 7DD, in accordance with second virtual object 704*i* continuing to overlap first virtual object 704*h* by more than the threshold amount (e.g., and because an input corresponding to gaze and/or an air gesture is not directed to first virtual object 704*h*), computer system 101 maintains display of first virtual object 704*h* with the second amount of visual prominence.

As shown in FIG. 7DD, as a result of the input provided by user 712 in FIG. 7CC, a cursor 734*b* is displayed in text entry user interface 742*b*. In some embodiments, cursor 734*b* informs user 712 that input interface 736 is associated with second virtual object 704*i* (e.g., and any inputs provided through input interface 736 will correspond to input provided to text entry user interface 742*b*). In FIG. 7DD, user 712 provides an input directed to input interface 736 (e.g., corresponding to an air gesture (e.g., air tap) directed to a key of the virtual keyboard). In some embodiments, the input includes attention (e.g., gaze) directed to the portion of input interface 736 that corresponds to the key of the virtual keyboard while user 712 performs the air gesture.

FIG. 7EE illustrates text typed in text entry user interface 742*b* associated with second virtual object 704*i* as a result of the input directed to input interface 736 in FIG. 7DD. As shown in FIG. 7EE, the letter "W" is typed in text entry user interface 742*b* as a result of the input (e.g., the letter "W" corresponds to the key of the virtual keyboard that the input is directed to in FIG. 7DD). In FIG. 7EE, as a result of the typing of text in text entry user interface 742*b*, the location of cursor 734*b* is updated within text entry user interface 742*b* (e.g., the updated location of cursor 734*b* corresponds to the location in text entry user interface 742*b* where additional text will be inserted as a result of additional input provided through input interface 736). In some embodiments, the location of cursor 734*b* is further updated in response to the addition, revision and/or removal of text in text entry user interface 742*b* that occurs in response to input provided through input interface 736 (e.g., the location of cursor 734*b* is further updated in response to an input provided through input interface 736 corresponding to a request to move cursor 734*b* within text entry user interface 742*b*).

FIG. 8 is a flowchart illustrating an exemplary method 800 of changing a visual prominence of a respective virtual object relative to a three-dimensional environment in response to detecting a threshold amount of overlap between a first virtual object and a second virtual object in accordance with some embodiments. In some embodiments, the method 800 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, and/or a projector) and one or more cameras (e.g., a camera (e.g., color sensors, infrared sensors, and other depth-sensing cameras) that points downward at a user's hand or a camera that points forward from the user's head). In some embodiments, the method 800 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 800 are, optionally, combined and/or the order of some operations is, optionally, changed.

In some embodiments, method 800 is performed at a computer system (e.g., computer system 101) in communication with (e.g., including and/or communicatively linked with) one or more input devices (e.g., one or more input devices 314) and a display generation component (e.g., display generation component 120). In some embodiments, the computer system is or includes an electronic device, such as a mobile device (e.g., a tablet, a smartphone, a media player, or a wearable device), or a computer. In some embodiments, the display generation component is a display integrated with the electronic device (optionally a touch screen display), external display such as a monitor, projector, television, or a hardware component (optionally integrated or external) for projecting a user interface or causing a user interface to be visible to one or more users. In some embodiments, the one or more input devices include an electronic device or component capable of receiving a user input (e.g., capturing a user input or detecting a user input) and transmitting information associated with the user input to the electronic device. Examples of input devices include an image sensor (e.g., a camera), location sensor, hand tracking sensor, eye-tracking sensor, motion sensor (e.g., hand motion sensor) orientation sensor, microphone (and/or other audio sensors), touch screen (optionally integrated or external), remote control device (e.g., external), another mobile device (e.g., separate from the electronic device), a handheld device (e.g., external), and/or a controller.

In some embodiments, the computer system displays (802*a*), via the display generation component, a plurality of virtual objects including a first virtual object and a second virtual object (e.g., first virtual object 704*a* and second virtual object 704*b* as shown in FIGS. 7A and 7A1), with a first spatial relationship in a three-dimensional environment relative to a current viewpoint of a user of the computer system (e.g., such as the spatial relationship displayed between first virtual object 704*a* and second virtual object 704*b* in FIGS. 7A and 7A1), wherein displaying the first virtual object and the second virtual object with the first spatial relationship includes displaying the first virtual object and the second virtual object without an overlapping portion relative to the current viewpoint of the user (e.g., such as first virtual object 704*a* and second virtual object 704*b* not being displayed with an overlapping portion in FIGS. 7A and 7A1), and the first virtual object and the second virtual object are displayed with a first visual prominence relative to the three-dimensional environment, such as the first visual prominence of first virtual object 704*a* and second virtual object 704*b* shown in FIGS. 7A and 7A1. In some embodiments, the three-dimensional environment is generated, displayed, or otherwise caused to be viewable by the computer system. For example, the three-dimensional environment is an extended reality (XR) environment, such as a virtual reality (VR) environment, a mixed reality (MR) environment, or an augmented reality (AR) environment. In some embodiments, the three-dimensional environment includes one or more virtual objects (e.g., different from the first virtual object and/or second virtual object) and/or representations of objects in a physical environment of a user of the computer system. In some embodiments, the first virtual object and/or second virtual object are virtual windows, containers, applications and/or user interfaces displayed in the three-dimensional environment. For example, the first virtual object and/or second virtual object display respective media including content (e.g., audio and/or video content (e.g., such as from a movie and/or television show from a streaming service application, and/or an online video from a video sharing service or social media application), images and/or text (e.g., from a web browsing application), or interactive content (e.g., from video game media)). In some embodiments, displaying the first virtual object and the second virtual object with the first spatial relationship includes displaying the first virtual object and the second virtual object overlapping relative to the current viewpoint of the user by less than the threshold amount described below. In some embodiments, the first spatial relationship includes a spatial arrangement of the first virtual object relative to the second virtual object (e.g., relative position and/or relative orientation) in the three-dimensional environment, and/or a spatial arrangement of the second virtual object relative to the first virtual object (e.g., relative position and/or relative orientation) in the three-dimensional environment. For example, the location of the first virtual object is displayed at a distance from the second virtual object in the three-dimensional environment, and/or the first virtual object is displayed with an orientation (e.g., based on spherical or polar coordinates) relative to the second virtual object. For example, the location of the second virtual object is displayed at a distance from the first virtual object in the three-dimensional environment, and/or the second virtual object is displayed with an orientation (e.g., based on spherical or polar coordinates) relative to the first virtual object. In some embodiments, the position of the first virtual object and the second virtual object in the three-dimensional environment is such that the first virtual object does not visually obscure (optionally any part of) the second virtual object relative to the current viewpoint of the user, and the second virtual object does not visually obscure (optionally any part of) the first virtual object relative to the current viewpoint of the user. In some embodiments, displaying the first virtual object and the second virtual object with the first visual prominence includes displaying the first virtual object and the second virtual object with one or more visual characteristics, including opacity, brightness, size and/or color saturation. In some embodiments, displaying the first virtual object and the second virtual object in the three-dimensional environment with the first visual prominence includes content associated with the first virtual object and the second virtual object being visible to the user relative to their current viewpoint. For example, the content of, and/or the first virtual object and/or second virtual object, are displayed with 100 percent opacity (e.g., or optionally opacity greater than a threshold opacity percentage, such as 75, 80, 85, 90 or 95 percent opacity).

In some embodiments, the computer system detects (802*b*), via the one or more input devices, a first input corresponding to a request to change the spatial relationship between the first virtual object and the second virtual object from the first spatial relationship to a second spatial relationship, different from the first spatial relationship, relative to the current viewpoint of the user, such as the input (e.g., provided by gaze 708 and hand 720) shown and described with reference to FIGS. 7A and 7B. In some embodiments, changing the spatial relationship between the first virtual object and the second virtual object includes changing a location of the first virtual object and/or the second virtual object in the three-dimensional environment. In some embodiments, changing the spatial relationship between the first virtual object and the second virtual object includes changing the position and/or orientation (e.g., angular position) of the first virtual object and/or second virtual object relative to the current viewpoint of the user. In some embodiments, the first input corresponds to a request to move the first virtual object and/or the second virtual object from a first location in the three-dimensional environment to a second location in the three-dimensional environment. In some embodiments, the first input includes the user directing attention to the first virtual object or the second virtual object. For example, the user directs gaze to the first virtual object or the second virtual object (e.g., optionally for a threshold period of time (e.g., 0.1, 0.2, 0.5, 1, 2, 5 or 10 seconds)). In some embodiments, while attention is directed to the first virtual object or the second virtual object, the user performs an air gesture (e.g., an air tap, air pinch, air drag and/or air long pinch (e.g., an air pinch for a duration of time (e.g., 0.1, 0.5, 1, 2, 5 or 10 seconds)) in order to select the first virtual object or the second virtual object. The user optionally performs hand movement while concurrently performing the above-described hand gesture (e.g., moving their hand while in an air pinch hand shape in a direction relative to the three-dimensional environment (e.g., toward the second location in the three-dimensional environment) to which the user desires to move the first virtual object or the second virtual object). In some embodiments, movement of the first virtual object and/or second virtual object in the three-dimensional environment in response to the first input includes the movement corresponding to the performed hand movement (e.g., the distance and/or direction of the hand movement) relative to the three-dimensional environment. In some embodiments, the first input corresponds to a touch input on a touch-sensitive surface in communication with the computer system (e.g., a trackpad or a touch screen). In some embodiments, the first input corresponds to an input provided through a keyboard and/or mouse in communication with the computer system. In some embodiments, the first input corresponds to an audio input (e.g., a verbal command) provided by the user.

In some embodiments, in response to detecting the first input (802*c*), and in accordance with a determination that at least a portion of the first virtual object overlaps the second virtual object by more than a threshold amount from the current viewpoint of the user, the computer system displays (802*d*), via the display generation component, a respective portion of a respective virtual object of the plurality of virtual objects (e.g., one of the first virtual object or the second virtual object) with a second visual prominence less than the first visual prominence relative to the three-dimensional environment, such as displaying second virtual object 704*b* with the second amount of visual prominence in FIG. 7C. In some embodiments, the threshold amount of overlap between the at least portion of the first virtual object and the second virtual object includes a threshold angle of overlap (e.g., angular distance from the current viewpoint of the user). For example, the at least portion of the first virtual object overlaps the second virtual object by more than 0.1, 0.5, 1, 2, 5, 10, 15, 20, 25, 30, 35, 40 or 45 degrees relative to the current viewpoint of the user. In some embodiments, the threshold amount of overlap is a threshold area of the second virtual object relative to the current viewpoint of the user. For example, the threshold area of overlap is 0.5, 1, 2, 5, 10, 25, 35 or 50 percent of the total area of the second virtual object relative to the current viewpoint of the user. In some embodiments, the respective portion of the respective virtual object is a respective portion of the first virtual object or the second virtual object. In some embodiments, the respective virtual object corresponds to a virtual object that attention is not directed to (e.g., if attention is directed to the first virtual object, the respective virtual object is the second virtual object, or if attention is directed to the second virtual object, the respective virtual object is the first virtual object). In some embodiments, if the respective virtual object is the first virtual object, the respective portion of the first virtual object corresponds to a region (e.g., or optionally a portion of the region) of the first virtual object that is not overlapped by at least a portion of the second virtual object from the current viewpoint of the user. In some embodiments, if the respective virtual object is the second virtual object, the respective portion of the second virtual object corresponds to the region (e.g., or optionally a portion of the region) of the second virtual object that is not overlapped by the at least the portion of the first virtual object from the current viewpoint of the user. In some embodiments, if the respective virtual object is the second virtual object, the respective portion is a portion of the second virtual object that surrounds a perimeter of the at least the portion of the first virtual object overlapping the second virtual object from the current viewpoint of the user. For example, the respective portion of the second virtual object includes a region of the second virtual object that is within a threshold distance (e.g., 0.5, 1, 2, 5, 10, 20, 25, 30, 35, 40, 45 or 50 cm) of the perimeter of the at least portion of the first virtual object overlapping the second virtual object from the current viewpoint of the user. In some embodiments, if the respective virtual object is the first virtual object, the respective portion is a portion of the first virtual object that surrounds a perimeter of at least a portion of the second virtual object overlapping the first virtual object from the current viewpoint of the user. For example, the respective portion of the first virtual object includes a region of the first virtual object that is within a threshold distance (e.g., 0.5, 1, 2, 5, 10, 20, 25, 30, 35, 40, 45 or 50 cm) of the perimeter of the at least the portion of the second virtual object overlapping the first virtual object from the current viewpoint of the user. In some embodiments, displaying the respective portion of the respective virtual object with the second visual prominence includes displaying the respective portion of the respective virtual object with less opacity, brightness, size and/or color saturation compared to displaying the respective portion of the respective virtual object with the first visual prominence. In some embodiments, displaying the respective portion of the respective virtual object with the second visual prominence includes displaying the respective portion of the respective virtual object with more transparency and/or sharpness compared to displaying the respective portion of the respective virtual object with the first visual prominence. In some embodiments, a second portion of the respective virtual object that is different from the respective portion of the respective virtual object is displayed with the first visual prominence while the respective portion of the respective virtual object is displayed with the second visual prominence (e.g., the second portion of the respective virtual object is a portion of the respective virtual object that is not visually obscured by the at least portion of the first virtual object or second virtual object and is optionally not within the threshold distance of the perimeter of the at least portion of the first virtual object or second virtual object). In some embodiments, the respective portion of the respective virtual object includes the entire portion of the respective virtual object that is not overlapped by the at least portion of the first virtual object or second virtual object (e.g., the entire portion of the respective virtual object that is not visually obscured by the at least portion of the first virtual object or second virtual object relative to the current viewpoint of the user). In some embodiments, the first virtual object or the second virtual object maintains the first visual prominence after and/or during the change in spatial relationship between the first virtual object and the second virtual object (e.g., based on whether attention is directed to the first virtual object or the second virtual object). In some embodiments, the respective portion of the respective virtual object includes a portion of the respective virtual object that is at a distance closer to the current viewpoint of the user compared to the distance of a different respective virtual object from the current viewpoint of the user in the three-dimensional environment (e.g., the respective virtual object is the second virtual object, and the first virtual object is positioned in the three-dimensional environment at a greater distance from the current viewpoint of the user in the three-dimensional environment compared to the second virtual object). In some embodiments, displaying the respective portion of the respective virtual object with the second visual prominence includes reducing the visual prominence of the respective portion of the respective virtual object (e.g., that optionally overlaps with the first virtual object or second virtual object) such that the first virtual object or second virtual object is visible (e.g., due to an increase in transparency of the respective portion of the respective virtual object) from the current viewpoint of the user.

In some embodiments, in accordance with a determination that the first virtual object does not overlap the second virtual object by more than the threshold amount from the current viewpoint of the user, the computer system displays (802*e*), via the display generation component, the respective portion of the respective virtual object with the first visual prominence relative to the three-dimensional environment, such as displaying second virtual object 704*b* with the first amount of visual prominence in FIG. 7B. In some embodiments, the first virtual object overlaps the second virtual object by an amount that is less than the threshold amount (e.g., less than the angle threshold and/or threshold area of the second virtual object) relative to the current viewpoint of the user. In some embodiments, changing the spatial relationship between the first virtual object and the second virtual object does not cause overlap of the first virtual object with the second virtual object. In some embodiments, the respective portion of the respective virtual object (e.g., the first virtual object or the second virtual object) maintains the same visual prominence displayed before the change in spatial relationship between the first virtual object and the second virtual object. In some embodiments, the first virtual object and the second virtual object maintains the first visual prominence after the change in spatial relationship between the first virtual object and the second virtual object. Displaying a portion of a virtual object with less visual prominence in a three-dimensional environment as a result of a change in spatial relationship between a respective virtual object and the virtual object that includes at least a portion of the respective virtual object overlapping the virtual object by more than a threshold amount relative to a current viewpoint of a user provides visual feedback to the user that the change in the spatial relationship caused a spatial conflict between the virtual object and the respective virtual object in the three-dimensional environment, provides an opportunity to the user to correct the spatial conflict between the virtual object and the respective virtual object, and permits continued interaction with the respective virtual object despite the spatial conflict, thereby avoiding errors in interaction and improving user device interaction.

In some embodiments, in accordance with a determination that the first input includes attention directed to the first virtual object, the respective virtual object of the plurality of virtual objects is the second virtual object (e.g., second virtual object 704*b* is displayed with the second amount of visual prominence in FIG. 7C based on the input in FIGS. 7A-7B being directed to first virtual object 704*a*). In some embodiments, attention directed to the first virtual object has one or more characteristics of attention directed to the first virtual object as described with reference to step(s) 802. For example, the first input includes gaze and/or an air gesture directed to the first virtual object.

In some embodiments, after detecting the first input, the computer system detects a second input corresponding to attention directed to the second virtual object, such as the input shown in FIG. 7C (e.g., including gaze 708 directed to second virtual object 704*b*). In some embodiments, attention directed to the second virtual object has one or more characteristics of attention directed to the second virtual object as described with reference to step(s) 802. For example, the first input includes gaze and/or an air gesture directed to the second virtual object.

In some embodiments, in response to detecting the second input, in accordance with a determination that at least a portion of the first virtual object overlaps the second virtual object by more than the threshold amount from the current viewpoint of the user, the computer system displays the respective portion of the second virtual object (e.g., the respective portion of the respective virtual object of the plurality of virtual objects as described above) with the first visual prominence relative to the three-dimensional environment (e.g., including one or more characteristics of the first visual prominence described with reference to step(s) 802), such as second virtual object 704*b* being displayed with the first amount of visual prominence in FIG. 7D in response to the input shown in FIG. 7C, and the computer system displays a respective portion of the first virtual object with the second visual prominence relative to the three-dimensional environment (e.g., including one or more characteristics of the second visual prominence described with reference to step(s) 802), such as first virtual object 704*a* being displayed with the second amount of visual prominence in FIG. 7D in response to the input shown in FIG. 7C. In some embodiments, the determination that at least a portion of the first virtual object overlaps the second virtual object by more than the threshold amount from the current viewpoint of the user has one or more characteristics of the determination that the at least the portion of the first virtual object overlaps the second virtual object by more than the threshold amount as described with reference to step(s) 802. In some embodiments, the respective portion of the first virtual object corresponds to a region (e.g., or optionally a portion of the region) of the first virtual object that is not overlapped by the second virtual object from the current viewpoint of the user. In some embodiments, the respective portion of the first virtual object surrounds a perimeter (e.g., including a region of the first virtual object that is within a threshold distance (e.g., 0.5, 1, 2, 5, 10, 20, 25, 40, 40, 45 or 50 cm) of the perimeter) of at least a portion of the second virtual displayed with a spatial conflict with (e.g., overlapping) the first virtual object from the current viewpoint of the user. Displaying a portion of a virtual object with less visual prominence in a three-dimensional environment when at least a portion of the virtual object is overlapping a respective virtual object by more than a threshold amount in response to attention of a user directed to the respective virtual object permits interaction with the respective virtual object that the user directs their attention to despite the spatial conflict, thereby improving user device interaction.

In some embodiments, after detecting the first input and while displaying the first virtual object with the first visual prominence, the computer system detects a second input corresponding to attention directed to the second virtual object, such as the input corresponding to attention directed to second virtual object 704*b* shown in FIG. 7C. In some embodiments, attention directed to the second virtual object has one or more characteristics of attention directed to the first virtual object as described with reference to step(s) 802. For example, the second input includes gaze and/or an air gesture (e.g., an air tap, air pinch, air drag and/or air long pinch (e.g., an air pinch for a duration of time (e.g., 0.1, 0.5, 1, 2, 5 or 10 seconds))) directed to the second virtual object. In some embodiments, the first virtual object is displayed with the first visual prominence in accordance with the second virtual object being the respective virtual object.

In some embodiments, in response to detecting the second input, in accordance with a determination that at least a portion of the first virtual object overlaps the second virtual object by more than the threshold amount from the current viewpoint of the user, the computer system displays a respective portion of the second virtual object with the first visual prominence relative to the three-dimensional environment, such as second virtual object 704*b* being displayed with the first amount of visual prominence FIG. 7D, and displays a respective portion of the first virtual object with the second visual prominence relative to the three-dimensional environment, such as first virtual object 704*a* being displayed with the second amount of visual prominence in FIG. 7D. In some embodiments, the determination that the first virtual object overlaps the second virtual object by more than the threshold amount from the current viewpoint of the user has one or more characteristics of the determination that the first virtual object overlaps that second virtual object by more than the threshold amount from the current viewpoint of the user as described with reference to step(s) 802. In some embodiments, displaying the respective portion of the second virtual object with the first visual prominence relative to the three-dimensional environment includes one or more characteristics of displaying the respective portion of the second virtual object with the first visual prominence as described above. In some embodiments, displaying the respective portion of the first virtual object with the second visual prominence includes one or more characteristics of displaying the respective portion of the first virtual object with the second visual prominence as described above. Displaying a portion of a virtual object with less visual prominence in a three-dimensional environment in response to attention of a user being directed to a respective virtual object when at least a portion of the virtual object overlaps the respective virtual object by more than a threshold amount permits interaction with the respective virtual object that the user directs their attention to despite the spatial conflict, thereby improving user device interaction.

In some embodiments, after detecting the second input and while displaying the respective portion of the second virtual object with the first visual prominence, the computer system detects a third input corresponding to attention directed to a third virtual object of the plurality of virtual objects in the three-dimensional environment, such as the input directed to second virtual object 704*f* in FIG. 7P. In some embodiments, the third virtual object has one or more characteristics of the first virtual object and/or the second virtual object of the plurality of virtual objects in the three-dimensional environment. In some embodiments, the third input has one or more characteristics of the second input described above. For example, the third input includes gaze of the user directed to the third virtual object (e.g., for a threshold period of time (e.g., 0.1, 0.2, 0.5, 1, 2, 5 or 10 seconds). For example, the third input includes gaze of the user directed to the third virtual object while concurrently performing an air gesture (e.g., including one or more air gestures described above (e.g., with reference to step(s) 802)).

In some embodiments, in response to detecting the third input, in accordance with a determination that at least a portion of the third virtual object overlaps the second virtual object by more than the threshold amount from the current viewpoint of the user (e.g., such as the portion of third virtual object 704*g* that overlaps first virtual object 704*e* in FIG. 7Q), the computer system displays the respective portion of the second virtual object with the second visual prominence relative to the three-dimensional environment, such as first virtual object 704*e* being displayed with the reduced amount of visual prominence in response to the input directed to second virtual object 704*f* in FIG. 7P, and maintaining display of the respective portion of the first virtual object with the second visual prominence relative to the three-dimensional environment, such as computer system 101 maintaining display of third virtual object 704*g* with the reduced amount of visual prominence in response to the input shown in FIG. 7P. In some embodiments, detecting that the at least the portion of the third virtual object overlaps the second virtual object by more than the threshold amount from the current viewpoint of the user has one or more characteristics of detecting that the at least the portion of the first virtual object overlaps the second virtual object by more than the threshold amount as described with reference to step(s) 802. In some embodiments, while the at least the portion of the third virtual object overlaps the second virtual object by more than the threshold amount from the current viewpoint of the user, the at least the portion of the first virtual object overlaps the second virtual object by more than the threshold amount from the current viewpoint of the user. In some embodiments, while the at least the portion of the third virtual object overlaps the second virtual object by more than the threshold amount from the current viewpoint of the user, the at least the portion of the first virtual object does not overlap the second virtual object by more than the threshold amount from the current viewpoint of the user. In some embodiments, maintaining display of the respective portion of the first virtual object with the second visual prominence relative to the three-dimensional environment includes maintaining the display of the respective portion of the first virtual object with the same visual prominence displayed prior to detecting the third input independent of an amount of overlap between the first virtual object and the second virtual object. For example, in accordance with the respective portion of the first virtual object being displayed with the second visual prominence prior to detection of the third input and the third virtual object overlapping the first virtual object by less than the threshold amount, the computer system maintains display of the first virtual object with the second visual prominence. For example, in accordance with the respective portion of the first virtual object being displayed with the first visual prominence prior to detection of the third input and the third virtual object overlapping the first virtual object by less than the threshold amount, the computer system maintains display of the first virtual object with the first visual prominence. The second virtual object and/or the first virtual object are optionally in the field of view of the user of the three-dimensional environment while providing the third input. In some embodiments, in accordance with the second virtual object and/or the first virtual object not being in the field of view of the user of the three-dimensional environment while the computer system detects the third input, the computer system changes the visual prominence of the second virtual object from the first visual prominence to the second visual prominence while maintaining the visual prominence (e.g., the first visual prominence) of the first virtual object (e.g., such that, in accordance with a change in the current viewpoint of the user that causes a change in the field of view of the user of the three-dimensional environment that causes the first virtual object and/or the second virtual object to be visible in the users' field of view of the three-dimensional environment, the first virtual object and/or the second virtual object are displayed with the second visual prominence relative to the three-dimensional environment). Displaying a first virtual object and a second virtual object that overlaps the first virtual object by more than a threshold amount with less visual prominence than a respective virtual object that overlaps the second virtual object by more than the threshold amount in response to attention of a user being directed to the respective virtual object permits continued interaction with the respective virtual object despite the spatial conflict with the second virtual object, minimizes distraction from the respective virtual object that the user is interacting with (e.g., that would be caused by displaying the first virtual object with a greater amount of visual prominence despite the spatial conflict with the second virtual object), and avoids displaying the first virtual object and the second virtual object with an unnecessary amount of visual prominence, thereby avoiding errors in interaction, improving user device interaction and conserving computing resources.

In some embodiments, in response to detecting the third input, in accordance with a determination that the third virtual object does not overlap the second virtual object by more than the threshold amount from the current viewpoint of the user (e.g., such as second virtual object **704*f* not overlapping first virtual object 704*e* in FIG. 7R), the computer system maintains display of the respective portion of the second virtual object with the first visual prominence relative to the three-dimensional environment, such as computer system 101 maintaining display of first virtual object 704*e* with the increased amount of visual prominence in response to the input shown in FIG. 7R, and maintains display of the respective portion of the first virtual object with the second visual prominence relative to the three-dimensional environment, such as computer system 101 maintaining display of third virtual object 704*g* with the reduced amount of visual prominence in response to the input shown in FIG. 7**R. In some embodiments, maintaining display of the respective portion of the second virtual object with the first visual prominence includes maintaining the same amount of opacity, brightness, color, saturation and/or sharpness of the respective portion of the second virtual object that is displayed prior to detecting the third input. In some embodiments, maintaining display of the respective portion of the first virtual object with the second visual prominence includes maintaining the same amount of opacity, brightness, color, saturation and/or sharpness of the respective portion of the first virtual object that is displayed prior to detecting the third input. In some embodiments, in accordance with the second virtual object not being in the field of view of the user of the three-dimensional environment while detecting the second input, the computer system maintains the first visual prominence of the second virtual object relative to the three-dimensional environment (e.g., such that, in accordance with a change in the current viewpoint of the user that causes the second virtual object to be visible in the user's field of view of the three-dimensional environment, the second virtual object is displayed with the first visual prominence relative to the three-dimensional environment). In some embodiments, in accordance with the first virtual object not being in the field of view of the user of the three-dimensional environment, the computer system maintains the respective portion of the first virtual object with the second visual prominence (e.g., such that, in accordance with a change in the current viewpoint of the user that causes the first virtual object to be visible in the user's field of view of the three-dimensional environment, the first virtual object is displayed with the second visual prominence relative to the three-dimensional environment). In some embodiments, maintaining display of the first virtual object with the second visual prominence includes maintaining ceasing to display a portion of the first virtual object in the three-dimensional environment (e.g., the first portion of the respective virtual object as described below). Maintaining a visual prominence of a first virtual object and a second virtual object that overlaps the first virtual object by more than a threshold amount in response to attention of a user being directed to a respective virtual object that does not overlap the second virtual object by more than the threshold amount avoids changing the visual prominence of the first virtual object and the second virtual object when a change in visual prominence is not necessary (e.g., because the third virtual object does not have a spatial conflict with the second virtual object) and minimizes distraction from the respective virtual object that the user is interaction with (e.g., that would be caused by changing the visual prominence of the first virtual object or the second virtual object), thereby avoiding errors in interaction and improving user device interaction.

In some embodiments, in response to detecting the second input, in accordance with a determination that at least a portion of the first virtual object overlaps the second virtual object by more than the threshold amount from the current viewpoint of the user and at least a portion of the second virtual object overlaps a third virtual object of the plurality of virtual objects in the three-dimensional environment by more than the threshold amount from the current viewpoint of the user (e.g., such as first virtual object **704*e* overlapping second virtual object 704*f* and third virtual object 704*g* by more than the threshold amount while an input is directed to first virtual object 704*e* in FIG. 7O), the computer system displays the respective portion of the second virtual object with the first visual prominence relative to the three-dimensional environment (e.g., such as computer system 101 displaying first virtual object 704*e* with the first amount of visual prominence in FIG. 7O), displays the respective portion of the first virtual object with the second visual prominence relative to the three-dimensional environment (e.g., such as computer system 101 displaying second virtual object 704*f* with the second amount of visual prominence in FIG. 7O), and displays a respective portion of the third virtual object with the second visual prominence relative to the three-dimensional environment (e.g., such as computer system 101 displaying third virtual object 704*g* with the second amount of visual prominence in FIG. 7**O). In some embodiments, the third virtual object has one or more characteristics of the first virtual object and/or the second virtual object as described above. In some embodiments, in accordance with a determination that the at least the portion of the first virtual object overlaps the second virtual object by more than the threshold amount and the at least the portion of the second virtual object does not overlap the third virtual object by more than the threshold amount from the current viewpoint of the user, the computer system displays the respective portion of the second virtual object with the first visual prominence, the respective portion of the first virtual object with the second visual prominence, and maintains display of the respective portion of the third virtual object with the first visual prominence. In some embodiments, in accordance with a determination that the at least the portion of the first virtual object does not overlap the second virtual object by more than the threshold amount and the at least the portion of the second virtual object overlaps the third virtual object by more than the threshold amount from the current viewpoint of the user, the computer system displays the respective portion of the second virtual object with the first visual prominence, maintains display of the first virtual object with the first visual prominence, and displays the respective portion of the third virtual object with the second visual prominence relative to the three-dimensional environment. Displaying a portion of a first virtual object that overlaps with a respective virtual object by more than a threshold amount and a second virtual object that overlaps with the respective virtual object by more than the threshold amount with less visual prominence in a three-dimensional environment in response to attention of a user being directed to the respective virtual object permits interaction with the respective virtual object that the user directs their attention to despite the spatial conflicts, thereby improving user device interaction.

In some embodiments, while displaying the plurality of virtual objects in the three-dimensional environment, the computer system displays an input element in the three-dimensional environment associated with the respective virtual object, such as input interface 736 displayed in three-dimensional environment 702 in FIGS. 7Y-7EE. In some embodiments, the input element is a virtual keyboard (e.g., for typing text into a text field of a respective application associated with the respective virtual object (e.g., such as input interface 736 shown in FIGS. 7Y-7EE)). In some embodiments, the input element is a menu for a respective application associated with the respective virtual object (e.g., including one or more selectable elements associated with one or more settings of the respective application). In some embodiments, the input element includes selectable options corresponding to playback controls (e.g., for controlling playback of content of a respective application associated with the respective virtual object). In some embodiments, the input element is displayed concurrently with the respective virtual object (e.g., the input element is a virtual object that is displayed in the three-dimensional environment that is different from the respective virtual object). In some embodiments, the input element is displayed within the respective virtual object. In some embodiments, the input element is displayed at a location adjacent to a location of the respective virtual object in the three-dimensional environment (e.g., to the side of, above, below and/or in front of the respective virtual object relative to the current viewpoint of the user). In some embodiments, the input element is displayed at a location in the three-dimensional environment that is within a threshold distance from a location corresponding to the current viewpoint of the user in the three-dimensional environment (e.g., the threshold distance corresponds to a distance that is accessible to the user from their current viewpoint (e.g., 0.01, 0.05, 0.1, 0.2, 0.3, 0.4, 0.5 or 1 m)). For example, the input element is displayed at a location in the three-dimensional environment that is closer to the current viewpoint of the user in the three-dimensional environment than a location of the respective virtual object in the three-dimensional environment. In some embodiments, the input element is displayed at a location in the three-dimensional environment that is based on a location of the respective virtual object in the three-dimensional environment relative to the current viewpoint of the user (e.g., the input element is centered with the respective virtual object and/or is arranged at an orientation relative to the current viewpoint of the user that is based on an orientation of the respective virtual object relative to the current viewpoint of the user). In some embodiments, the input element is displayed in response to an input corresponding to a request to display the input element in the three-dimensional environment (e.g., the input corresponds to a request to type text into a text field displayed within the respective virtual object). In some embodiments, while displaying the input element in the three-dimensional environment associated with the respective virtual object, the input element is displayed with a visual prominence that is based on the visual prominence of the respective virtual object. For example, in accordance with the respective virtual object being displayed with the first visual prominence relative to the three-dimensional environment, the input element is displayed with the first visual prominence relative to the three-dimensional environment (e.g., or optionally with a visual prominence that is greater than the second visual prominence (e.g., the fourth visual prominence as described below)).

In some embodiments, in response to detecting the first input, in accordance with the determination that the at least the portion of the first virtual object overlaps the second virtual object by more than the threshold amount from the current viewpoint of the user, the computer system displays the input element with a third visual prominence less than the first visual prominence relative to the three-dimensional environment, such as computer system 101 displaying input interface 736 with the reduced amount of visual prominence in FIG. 7BB. In some embodiments, the third visual prominence includes one or more characteristics of the second visual prominence as described with reference to step(s) 802. For example, displaying the input element with the third visual prominence includes displaying the input element with less opacity, brightness, color, saturation and/or sharpness compared to displaying the input element with the amount of visual prominence the input element is displayed with prior to receiving the first input (e.g., the first visual prominence or the fourth visual prominence as described below). In some embodiments, in accordance with the user of the computer system changing their current viewpoint relative to the three-dimensional environment (e.g., such that the input element is no longer in the field of view of the user of the three-dimensional environment), the computer system maintains display of the input element in the three-dimensional environment with the third visual prominence (e.g., such that the input element is visible to the user in the three-dimensional environment with the third visual prominence in accordance with a change in the current viewpoint of the user that causes the input element to be in the field of view of the user of the three-dimensional environment).

In some embodiments, in response to detecting the first input, in accordance with the determination that the first virtual object does not overlap the second virtual object by more than the threshold amount from the current viewpoint of the user, displaying the input element with a fourth visual prominence greater than the second visual prominence relative to the three-dimensional environment, such as computer system 101 displaying input interface 736 with the increased amount of visual prominence in FIG. 7Y. In some embodiments, the fourth visual prominence includes one or more characteristics of the first visual prominence as described above. In some embodiments, displaying the input element with the fourth visual prominence includes maintaining display of the input element with the fourth visual prominence (e.g., the input element is displayed with the fourth visual prominence relative to the three-dimensional environment prior to the computer system detecting the first input). In some embodiments, displaying the input element with the fourth visual prominence includes displaying the input element with a greater amount of opacity, brightness, color, saturation and/or sharpness compared to displaying the input element with the amount of visual prominence the input element is displayed with when the at least the portion of the first virtual object overlaps the second virtual object by more than the threshold amount from the current viewpoint of the user (e.g., the second visual prominence or the third visual prominence as described above). In some embodiments, in accordance with the user of the computer system changing their current viewpoint relative to the three-dimensional environment (e.g., such that the input element is no longer in the field of view of the user of the three-dimensional environment), the computer system maintains the input element with the fourth visual prominence in the three-dimensional environment (e.g., such that, in accordance with a change in the current viewpoint of the user that causes the input element to be visible in the field of view of the user of the three-dimensional environment, the input element is displayed with the fourth visual prominence relative to the three-dimensional environment). Displaying an input element in a three-dimensional environment with a different amount of visual prominence based on whether a respective virtual object that the input element is associated overlaps with a virtual object different from the respective virtual object by more than a threshold amount prevents the input element from being displayed with an unnecessary amount of visual prominence in the three-dimensional environment when interaction with the input element is unlikely or not permitted (e.g., due to the spatial conflict), thereby conserving computing resources.

In some embodiments, after detecting the first input, the computer system detects a second input corresponding to a request to display an input element associated with a third virtual object of the plurality of virtual objects in the three-dimensional environment, such as the input directed to text entry user interface 742*b* (e.g., to associate input interface 736 with second virtual object 704*i*) shown in FIG. 7CC. In some embodiments, the input element associated with the third virtual object has one or more characteristics of the input element associated with the respective virtual object. In some embodiments, the second input corresponds to a request to change the input element from being associated with the respective virtual object to being associated with the third virtual object (e.g., the input element is a virtual keyboard, and the second input corresponds to a request to use the virtual keyboard with a respective application associated with the third virtual object (e.g., and cease using the virtual keyboard with a respective application associated with the respective virtual object)). In some embodiments, the second input includes gaze and/or an air gesture being directed to the third virtual object. In some embodiments, a virtual element is displayed within the third virtual object (e.g., a text field that is associated with a respective application that is associated with the third virtual object), and the second input includes gaze and/or an air gesture directed to the virtual element. In some embodiments, the second input includes an audio input (e.g., a verbal command) or a touch input provided on a touch-sensitive surface (e.g., a trackpad) in communication with the computer system.

In some embodiments, in response to detecting the second input, the computer system ceases to display the input element in the three-dimensional environment associated with the respective virtual object and displays the input element in the three-dimensional environment associated with the third virtual object, such as shown by computer system 101 changing input interface 736 from being associated with first virtual object 704*h* in FIG. 7CC to being associated with second virtual object 704*i* in FIG. 7DD (e.g., including movement of input interface 736 in three-dimensional environment 702). In some embodiments, in response to detecting the second input, in accordance with the third virtual object being displayed with the first visual prominence (e.g., or with a visual prominence that is greater than the second visual prominence), the computer system displays the input element with the fourth visual prominence relative to the three-dimensional environment (e.g., or with a visual prominence that is greater than the second visual prominence). In some embodiments, in accordance with the third virtual object being displayed with the second visual prominence (e.g., or with a visual prominence that is less than the first visual prominence), the computer system displays the input element with the third visual prominence relative to the three-dimensional environment (e.g., or with a visual prominence that is less than the first visual prominence relative to the three-dimensional environment). In some embodiments, ceasing to display the input element associated with the respective virtual object and displaying the input element in the three-dimensional environment associated with the third virtual object includes ceasing to display the input element at a location in the three-dimensional environment that is based on a location of the respective virtual object in the three-dimensional environment and displaying the input element at a location in the three-dimensional environment that is based on a location of the third virtual object in the three-dimensional environment (e.g., the input element is displayed at a location that is centered with the third virtual object in the three-dimensional environment from the current viewpoint of the user). In some embodiments, the input element that is displayed associated with the third virtual object in response to detecting the second input is the same input element that is displayed associated with the respective virtual object prior to detecting the second input. For example, in response to detecting the second input, the computer system maintains display of the input element at the same location and/or orientation in the three-dimensional environment while associating the input element with the third virtual object (e.g., associating the input element with the third virtual object includes ceasing to associate the input element with the respective virtual object). In some embodiments, prior to detecting the second input, the input element is displayed at a location in the three-dimensional environment that is within the threshold distance of the location corresponding to the current viewpoint of the user as described above, and, in response to detecting the second input, the computer system maintains display of the input element at the location (e.g., and optionally changes the visual prominence of the input element based on a difference in visual prominence between the respective virtual object and the third virtual object). For example, the location of the input element that is within the threshold distance of the location corresponding to the current viewpoint of the user in the three-dimensional environment is a default location (e.g., or a preferred location that is set by the user and stored in a memory of the computer system) that the input element is displayed at relative to the current viewpoint of the user (e.g., the input element is displayed at the default location independent of the respective virtual object of the plurality of virtual objects in the three-dimensional environment that the input element is currently associated with). Ceasing to display an input element in a three-dimensional environment that is associated with a virtual object and displaying an input element in a three-dimensional environment that is associated with a respective virtual object in response to a request to display the input element associated with the respective virtual object avoids displaying the input element associated with the virtual object when it is unnecessary and provides visual feedback to a user of which virtual object a respective input element is associated with, thereby conserving computing resources and avoiding errors in interaction.

In some embodiments, the respective portion of the respective virtual object of the plurality of virtual objects is a respective portion of the second virtual object (e.g., second virtual object 704*b* is displayed with the second amount of visual prominence in FIG. 7C. In some embodiments, after detecting the first input, the computer system detects a second input corresponding to attention directed to a location in the three-dimensional environment corresponding to empty space in the three-dimensional-environment (e.g., different from one or more locations in the three-dimensional environment associated with the plurality of virtual objects), such as the input directed to empty space as shown and described with reference to FIG. 7D. In some embodiments, the location in the three-dimensional environment is associated with (e.g., arranged within) a region of the three-dimensional environment (e.g., a volume of the three-dimensional environment) that does not include one or more virtual objects displayed by the computer system (e.g., does not include the first virtual object and the second virtual object). In some embodiments, the second input corresponds to gaze directed to the empty space in the three-dimensional environment (e.g., optionally for a threshold period of time (e.g., 0.1, 0.5, 1, 2, 5 or 10 seconds)). In some embodiments, the second input corresponds to an air gesture (e.g., including one or more characteristics of one or more air gestures described with reference to step(s) 802) performed while gaze is directed to the empty space.

In some embodiments, in response to detecting the second input, in accordance with a determination that at least a portion of the first virtual object overlaps the second virtual object by more than the threshold amount from the current viewpoint of the user, the computer system displays the respective portion of the second virtual object (e.g., the respective portion of the respective virtual object as described with reference to step(s) 802) with the first visual prominence relative to the three-dimensional environment (e.g., including one or more characteristics of displaying the respective portion of the respective virtual object with the first visual prominence relative to the three-dimensional environment described with reference to step(s) 802) and the computer system displays a respective portion of the first virtual object with the second visual prominence relative to the three-dimensional environment, such as first virtual object 704*a* being displayed with the first amount of visual prominence and second virtual object 704*b* being displayed with the second amount of visual prominence in FIG. 7E in response to the input provided by user 712 in FIG. 7D. In some embodiments, the determination that at least a portion of the first virtual object overlaps the second virtual object by more than the threshold amount from the current viewpoint of the user has one or more characteristics of the determination that the at least the portion of the first virtual object overlaps the second virtual object by more than the threshold amount from the current viewpoint of the user as described with reference to step(s) 802. In some embodiments, displaying the respective portion of the first virtual object with the second visual prominence relative to the three-dimensional environment includes one or more characteristics of displaying the respective portion of the first virtual object with the second visual prominence as described above. Displaying a portion of a virtual object with less visual prominence in a three-dimensional environment when at least a portion of the virtual object is overlapping a respective virtual object by more than a threshold amount in response to attention of a user directed to empty space in the three-dimensional environment provides an efficient method to the user to interact with the respective virtual object despite the spatial conflict of the virtual object with the respective virtual object, thereby improving user device interaction.

In some embodiments, in response to detecting the first input, the computer system moves the respective virtual object from a first location in the three-dimensional environment to a second location in the three-dimensional environment, wherein the movement of the respective virtual object causes at least the portion of the first virtual object to overlap the second virtual object, such as shown by the overlap between first virtual object 704*a* and second virtual object 704*b* in FIG. 7C caused by the movement of first virtual object 704*a* in FIGS. 7A-7C. In some embodiments, moving the respective virtual object from the first location in the three-dimensional environment to the second location in the three-dimensional environment includes changing a spatial arrangement of the respective virtual object in the three-dimensional environment from the current viewpoint of the user (e.g., a distance of the respective virtual object and/or an orientation of the respective virtual object relative to the current viewpoint of the user changes in the three-dimensional environment in accordance with the first input). In some embodiments, the movement of the respective virtual object is based on hand movement included in the first input (e.g., the hand movement is performed by the user relative to the three-dimensional environment while maintaining an air gesture (e.g., an air pinch) with the hand. For example, the hand movement relative to the three-dimensional environment includes movement of the hand from a direction corresponding to the first location in the three-dimensional environment to a direction corresponding to a second location in the three-dimensional environment. In some embodiments, the respective virtual object is moved by the computer system while receiving the first input (e.g., while the user is providing the hand movement relative to the three-dimensional environment). In some embodiments, termination of the first input corresponds to when the first user ceases to provide the hand movement and/or the air gesture (e.g., the first user ceases performing air pinch with their hand). In some embodiments, the respective virtual object moves in the three-dimensional environment along a path of movement that corresponds to a path of the hand movement of the user relative to the three-dimensional environment (e.g., including direction, distance and/or speed of movement relative to the three-dimensional environment). In some embodiments, movement of the respective virtual object that causes the at least the portion of the first virtual object to overlap the second virtual object corresponds to movement of the first virtual object in the three-dimensional environment (e.g., the first input is directed to the first virtual object) that causes the at least the portion of the first virtual object to overlap the second virtual object. In some embodiments, movement of the respective virtual object that causes that at least the portion of the first virtual object to overlap the second virtual object corresponds to movement of the second virtual object in the three-dimensional environment (e.g., the first input is directed to the second virtual object) that causes the at least the portion of the first virtual object to overlap the second virtual object. In some embodiments, movement of the respective virtual object causes at least a portion of the first virtual object and the second virtual object to be arranged at the same location in the three-dimensional environment (e.g., causing a spatial conflict relative to the three-dimensional environment). In some embodiments, movement of the respective virtual object causes the second virtual object to be at a greater distance from the current viewpoint of the user in the three-dimensional environment than the first virtual object (e.g., causing a spatial conflict relative to the current viewpoint of the first user). In some embodiments, movement of the respective virtual object causes the first virtual object to be at a greater distance from the current viewpoint of the user in the three-dimensional environment than the second virtual object (e.g., causing a spatial conflict relative to the current viewpoint of the user). Displaying a portion of a virtual object with less visual prominence in a three-dimensional environment as a result of movement of a respective virtual object in the three-dimensional environment that causes overlap of at least a portion of the respective virtual object with the virtual object that exceeds a threshold amount relative to a current viewpoint of a user provides visual feedback to the user that the movement of the respective virtual object caused a spatial conflict between the virtual object and the respective virtual object, provides an opportunity to the user to correct the spatial conflict between the virtual object and the respective virtual object, and permits continued interaction with the respective virtual object despite the spatial conflict, thereby avoiding errors in interaction and improving user device interaction.

In some embodiments, detecting the first input includes detecting movement of the current viewpoint of the user from a first viewpoint relative to the three-dimensional environment to a second viewpoint relative to the three-dimensional environment, wherein the movement of the current viewpoint of the user relative to the three-dimensional environment causes the at least the portion of the first virtual object to overlap the second virtual object from the current viewpoint of the user, such as the overlap between first virtual object 704*c* and second virtual object 704*d* caused by the movement of the current viewpoint of user 712 in FIG. 7M. In some embodiments, movement of the current viewpoint of the user relative to the three-dimensional environment corresponds to physical movement of a first portion of the user (e.g., the user's head and/or eyes) relative to a physical environment of the user. For example, the user moves to a new location in the user's physical environment, and/or rotates their first portion to a different orientation (e.g., the user turns their head to a new orientation relative to the physical environment). In some embodiments, movement of the current viewpoint of the user relative to the three-dimensional environment corresponds to a user input corresponding to a request to change the current viewpoint of the user relative to the three-dimensional environment independent of physical movement of the user (e.g., the user input is an audio input (e.g., a verbal command), a touch input provided on a touch-sensitive surface in communication with the computer system and/or a keyboard and/or mouse input provided through a keyboard and/or mouse in communication with the computer system). In some embodiments, movement of the current viewpoint of the user relative to the three-dimensional environment causes a viewing angle and/or perspective of the current viewpoint of the user to change relative to the first virtual object and/or second virtual object (e.g., movement of the current viewpoint of the user causes a change in spatial relationship between the first virtual object and the current viewpoint of the user and the second virtual object and the current viewpoint of the user relative to the three-dimensional environment). In some embodiments, movement of the current viewpoint of the user relative to the three-dimensional environment causes a difference in position of the first virtual object and/or second virtual object from the current viewpoint of the user (e.g., movement of the current viewpoint of the user causes simulated parallax between the location of the first virtual object and/or second virtual object from the first viewpoint to the second viewpoint of the user). In some embodiments, the difference in perspective and/or viewing angle of the current viewpoint of the user relative to the first virtual object and/or second virtual object from the first viewpoint to the second viewpoint causes the at least the first portion of the first virtual object to overlap the second virtual object from the current viewpoint of the user. In some embodiments, the movement of the viewpoint of the user from the first viewpoint to the second viewpoint relative to the three-dimensional environment does not cause the at least the portion of the first virtual object to overlap the second virtual object by more than the threshold amount. In accordance with the movement of the viewpoint of the user not causing the at least the portion of the first virtual object to overlap the second virtual object by more than the threshold amount, the computer system forgoes displaying the at least the respective portion of the respective virtual object with the second visual prominence. Displaying a portion of a virtual object with less visual prominence in a three-dimensional environment as a result of movement of a current viewpoint of a user relative to the three-dimensional environment that causes overlap of at least a portion of the respective virtual object with the virtual object that exceeds a threshold amount relative to the current viewpoint of a user provides visual feedback to the user that the movement of their current viewpoint caused a spatial conflict between the virtual object and the respective virtual object, provides an opportunity to the user to correct the spatial conflict between the virtual object and the respective virtual object, and permits continued interaction with the respective virtual object despite the spatial conflict, thereby avoiding errors in interaction and improving user device interaction.

In some embodiments, in accordance with a determination that a difference in distance between the first virtual object and the current viewpoint of the user and the second virtual object and the current viewpoint of the user is a first distance, the threshold amount is a first threshold amount, such as shown by region of overlap threshold 714*a* and angle of overlap threshold 714*b* shown in FIG. 7C. In some embodiments, the threshold amount is a threshold angle of overlap (e.g., angular distance from the current viewpoint of the user), and the first threshold amount is 0.1, 0.5, 1, 2, 5, 10, 15, 20, 25, 30, 35, 40 or 45 degrees relative to the current viewpoint of the user. In some embodiments, the threshold amount if a threshold distance of overlap, and the first threshold amount is an overlap of the first virtual object and the second virtual object that exceeds 0.5, 1, 2, 5, 10, 20, 25, 30, 35, 40, 45, 50 or 100 cm relative to the first viewpoint of the first user. In some embodiments, the difference in between the first virtual object and the current viewpoint of the user corresponds to a first spatial arrangement between the first virtual object and the current viewpoint of the user, and the difference in between the second virtual object and the current viewpoint of the user corresponds to a second spatial arrangement between the first virtual object and the current viewpoint of the user. In some embodiments, displaying the first virtual object with the first spatial arrangement relative to the current viewpoint of the user includes displaying the first virtual object at a first depth in the three-dimensional environment from the current viewpoint of the user. In some embodiments, displaying the second virtual object with the second spatial arrangement relative to the current viewpoint of the user includes displaying the second virtual object with a second depth, different from the first depth, in the three-dimensional environment from the current viewpoint of the user. In some embodiments, in accordance with the at least the portion of the first virtual object overlapping the second virtual object by more than the first threshold amount, the respective portion of the respective object is displayed with the second visual prominence relative to the three-dimensional environment. In some embodiments, in accordance with the at least the portion of the first virtual object overlapping the second virtual object by less than the first threshold amount, the respective portion of the respective object is displayed with the first visual prominence relative to the three-dimensional environment.

In some embodiments, in accordance with a determination that the difference in distance between the first virtual object and the current viewpoint of the user and the second virtual object and the current viewpoint of the user is a second distance, different from the first distance, the threshold amount is a second threshold amount different from the first threshold amount, such as shown by the region of overlap threshold 714*a* and angle of overlap threshold 714*b* shown in FIG. 7L. In some embodiments, the threshold amount is a threshold angle of overlap (e.g., angular distance from the current viewpoint of the user), and the second threshold amount is 0.1, 0.5, 1, 2, 5, 10, 15, 20, 25, 30, 35, 40 or 45 degrees relative to the current viewpoint of the user. In some embodiments, the threshold amount if a threshold distance of overlap, and the second threshold amount is an overlap of the first virtual object and the second virtual object that exceeds 0.5, 1, 2, 5, 10, 20, 25, 30, 35, 40, 45, 50 or 100 cm relative to the first viewpoint of the first user. In some embodiments, the first distance and the second distance correspond to distances relative to a first direction in the three-dimensional environment (e.g., in a direction of depth in the three-dimensional environment from the current viewpoint of the user). In some embodiments, in accordance with the at least the portion of the first virtual object overlapping the second virtual object by more than the second threshold amount, the respective portion of the respective object is displayed with the second visual prominence relative to the three-dimensional environment. In some embodiments, in accordance with the at least the portion of the first virtual object overlapping the second virtual object by less than the second threshold amount, the respective portion of the respective object is displayed with the first visual prominence relative to the three-dimensional environment. Changing a threshold amount of overlap between a respective virtual object and a virtual object that is required exceed to display a portion of the virtual object with less visual prominence in a three-dimensional environment based on a distance between the respective virtual object and the virtual object in the three-dimensional environment enables the visual prominence of the virtual object to be reduced only when the overlap between the respective virtual object and the virtual object causes a spatial conflict that impedes interaction with the respective virtual object, thereby improving user device interaction.

In some embodiments, in accordance with the first distance being greater than the second distance, the first threshold amount is greater than the second threshold amount, such as the region of overlap threshold 714*a* and angle of overlap threshold 714*b* (e.g., shown in FIG. 7C) being larger based on the difference in distance between first virtual object 704*a* relative to the current viewpoint of user 712 and second virtual object 704 relative to the current viewpoint of user 712 becoming greater. In some embodiments, the first distance being greater than the second distance corresponds to the first distance being greater than the second distance relative to a first direction in the three-dimensional environment (e.g., the first direction corresponds to a direction of depth from the current viewpoint of the user in the three-dimensional environment). For example, the first distance in between the first virtual object and the second virtual object corresponds to a greater distance between the first virtual object and the second virtual object relative to the first direction in the three-dimensional environment compared to the second distance between the first virtual object and the second virtual object relative to the first direction in the three-dimensional environment. In some embodiments, the first threshold amount and the second threshold amount correspond to amounts of angular overlap between the first virtual object and the second virtual object relative to the current viewpoint of the user, and the first threshold amount corresponds to a larger angle compared to the second threshold amount. In some embodiments, the first threshold amount and the second threshold amount correspond to distances of the overlap between the first virtual object and the second virtual object relative to the current viewpoint of the user, and the first threshold amount corresponds to a larger distance compared to the second threshold amount. In some embodiments, in accordance with the first distance being greater than the second distance, the first threshold amount is less than the second threshold amount (e.g., and the first threshold amount corresponds to an angle and/or distance that is less than the second threshold amount).

In some embodiments, in accordance with the second distance being greater than the first distance, the second threshold amount is greater than the first threshold amount, such as the region of overlap threshold 714*a* and angle of overlap threshold 714*b* (e.g., shown in FIG. 7C) being larger based on the difference in distance between first virtual object 704*a* relative to the current viewpoint of user 712 and second virtual object 704 relative to the current viewpoint of user 712 becoming greater. In some embodiments, the second distance being greater than the first distance corresponds to the second distance being greater than the first distance relative to a first direction in the three-dimensional environment (e.g., the first direction corresponds to a direction of depth from the current viewpoint of the user in the three-dimensional environment). For example, the second distance in between the first virtual object and the second virtual object corresponds to a greater distance between the first virtual object and the second virtual object relative to the first direction in the three-dimensional environment compared to the first distance between the first virtual object and the second virtual object relative to the first direction in the three-dimensional environment. In some embodiments, the first threshold amount and the second threshold amount correspond to amounts of angular overlap between the first virtual object and the second virtual object relative to the current viewpoint of the user, and the second threshold amount corresponds to a larger angle compared to the first threshold amount. In some embodiments, the first threshold amount and the second threshold amount correspond to distances of the overlap between the first virtual object and the second virtual object relative to the current viewpoint of the user, and the second threshold amount corresponds to a larger distance compared to the first threshold amount. In some embodiments, in accordance with the second distance being greater than the first distance, the second threshold amount is less than the first threshold amount (e.g., and the first threshold amount corresponds to an angle and/or distance that is greater than the second threshold amount). Increasing a threshold amount of overlap between a respective virtual object and a virtual object that is required exceed to display a portion of the virtual object with less visual prominence in a three-dimensional environment when a distance between the respective virtual object and the virtual object is a greater relative to the three-dimensional environment enables the visual prominence of the virtual object to be reduced only when the overlap between the respective virtual object and the virtual object causes a spatial conflict that impedes interaction with the respective virtual object, thereby improving user device interaction.

In some embodiments, displaying the respective portion of the respective virtual object of the plurality of virtual objects with the first visual prominence relative to the three-dimensional environment includes displaying the respective portion of the respective virtual object with a first value for a first visual characteristic, such as displaying second virtual object 704*b* with the amount of brightness shown in FIGS. 7A and 7A1. In some embodiments, displaying the respective portion of the respective virtual object of the plurality of virtual objects with the second visual prominence relative to the three-dimensional environment includes displaying the respective portion of the respective virtual object with a second value, less than the first value, for the first visual characteristic, such as displaying second virtual object 704*b* with the amount of brightness shown in FIG. 7C. In some embodiments, the first visual characteristic is brightness, color, saturation and/or opacity of the respective portion of the respective virtual object. In some embodiments, displaying the respective portion of the respective virtual object with the second visual prominence includes reducing the brightness by 10, 25, 50, 75, 95 or 100 percent relative to the three-dimensional environment compared to displaying the respective portion of the respective virtual object with the first visual prominence. In some embodiments, displaying the respective portion of the respective virtual object with the first visual prominence includes displaying the respective portion of the respective virtual object with one or more first colors, and displaying the respective portion of the respective virtual object with the second visual prominence includes displaying the respective portion of the respective virtual object with one or more second colors (e.g., a single color (e.g., grey)). In some embodiments, displaying the respective portion of the respective virtual object with the second visual prominence includes reducing the opacity of the respective portion of the respective virtual object by 10, 25, 50, 75, 95 or 100 percent relative to the three-dimensional environment compared to displaying the respective portion of the respective virtual object with the first visual prominence. In some embodiments, displaying the respective portion of the respective virtual object with the second visual prominence includes displaying the respective portion of the respective virtual object with a reduced amount of sharpness compared to displaying the respective portion of the respective virtual object with the first visual prominence (e.g., the respective portion of the respective virtual object is displayed with a greater amount of blur when displaying the respective portion of the respective virtual object with the second visual prominence compared to displaying the respective portion of the respective virtual object with the first visual prominence). Displaying a portion of a virtual object with a reduced visual characteristic (e.g., opacity, saturation and/or brightness) in a three-dimensional environment as a result of a change in spatial relationship between a respective virtual object and the virtual object that includes at least a portion of the respective virtual object overlapping the virtual object by more than a threshold amount relative to a current viewpoint of a user provides visual feedback to the user that the change in the spatial relationship caused a spatial conflict between the virtual object and the respective virtual object in the three-dimensional environment, provides an opportunity to the user to correct the spatial conflict between the virtual object and the respective virtual object, and permits continued interaction with the respective virtual object despite the spatial conflict, thereby avoiding errors in interaction and improving user device interaction.

In some embodiments, displaying the respective portion of the respective virtual object with the second visual prominence relative to the three-dimensional environment includes ceasing to display a first portion of the respective portion of the respective virtual object in the three-dimensional environment (e.g., such as the portion of first virtual object 704*a* that ceases to be displayed in FIG. 7D), wherein the first portion of the respective portion of the respective virtual object has a relative size that corresponds to a relative size of the at least the portion of the first virtual object that overlaps the second virtual object. In some embodiments, the first virtual object is displayed at a distance relative to the current viewpoint of the user that is closer compared to the second virtual object, and the respective virtual object is the first virtual object. In some embodiments, the first portion of the respective portion of the first virtual object visually obscures a portion of the second virtual object relative to the current viewpoint of the user (e.g., the portion of the second virtual object is displayed behind the first portion of the respective portion of the first virtual object from the current viewpoint of the user). In some embodiments, ceasing to display the first portion of the respective portion of the first virtual object causes the portion of the second virtual object to be visible in the three-dimensional environment from the current viewpoint of the user (e.g., because ceasing to display the first portion of the respective portion of the first virtual object removes the portion of the first virtual object from the three-dimensional environment that is visually obscuring the second virtual object from the current viewpoint of the user). In some embodiments, the second virtual object is displayed at a distance relative to the current viewpoint of the user that is closer compared to the first virtual object, and the respective virtual object is the second virtual object. In some embodiments, the first portion of the respective portion of the second virtual object visually obscures a portion of the first virtual object relative to the current viewpoint of the user (e.g., the portion of the first virtual object is displayed behind the first portion of the respective portion of the second virtual object from the current viewpoint of the user). In some embodiments, ceasing to display the first portion of the respective portion of the second virtual object causes the portion of the first virtual object to be visible in the three-dimensional environment from the current viewpoint of the user (e.g., because ceasing to display the first portion of the respective portion of the second virtual object removes the portion of the second virtual object from the three-dimensional environment that is visually obscuring the first virtual object from the current viewpoint of the user). In some embodiments, in accordance with a change in the spatial relationship of the first virtual object and the second virtual object that includes a change in the amount of overlap between the first virtual object and the second virtual object (e.g., a greater amount of overlap or a less amount of overlap), the size of the first portion of the respective portion of the respective virtual object that the computer system ceases to display changes based on the size of the overlap between the first virtual object and the second virtual object (e.g., if the change in spatial arrangement causes an increase in overlap between the first virtual object and the second virtual object, the computer system ceases to display a first portion of the respective portion of the respective virtual object of an increased size, or if the change in spatial arrangement causes a decrease in overlap between the first virtual object and the second virtual object (e.g., the decrease in overlap continues to exceed to threshold amount of overlap), the computer system ceases to display a first portion of the respective portion of the respective virtual object of a reduced size). In some embodiments, in accordance with a second input corresponding to a change in the spatial arrangement of the first virtual object relative to the second virtual object that causes the at least the portion of the first virtual object to not overlap the second virtual object by more than the threshold amount, the respective portion of the respective virtual object is redisplayed in the three-dimensional environment (e.g., with the first visual prominence). In some embodiments, ceasing to display the first portion of the respective portion of the respective virtual object has one or more characteristics of ceasing to display the first portion of the at least the portion of the second virtual object in the three-dimensional environment as described with reference to method 900. Ceasing to display a portion of a virtual object in a three-dimensional environment as a result of a change in spatial relationship between a respective virtual object and the virtual object that includes at least a portion of the respective virtual object overlapping the portion of the virtual object relative to a current viewpoint of a user provides visual feedback to the user that the change in the spatial relationship caused a spatial conflict between the virtual object and the respective virtual object in the three-dimensional environment, provides an opportunity to the user to correct the spatial conflict between the virtual object and the respective virtual object, and permits continued interaction with the respective virtual object despite the spatial conflict, thereby avoiding errors in interaction and improving user device interaction.

In some embodiments, displaying the respective portion of the respective virtual object with the second visual prominence relative to the three-dimensional environment includes displaying a second portion of the respective portion of the respective virtual object with a greater amount of transparency compared to displaying the second portion of the respective portion of the respective virtual object with the first visual prominence (e.g., such as portion 718*a* of first virtual object 704*a* shown in FIG. 7D), wherein the second portion of the respective portion of the respective virtual object surrounds the first portion of the respective portion of the respective virtual object. In some embodiments, displaying a second portion of the respective portion of the respective virtual object with a greater amount of transparency compared to displaying the second portion of the respective portion of the respective virtual object with the first visual prominence includes one or more characteristics of displaying the second portion of the at least the portion of the second virtual object with a greater amount of transparency compared to displaying the second portion of the at least the portion of the second virtual object with the first visual prominence relative to the three-dimensional environment as described with reference to method 900. In some embodiments, displaying the second portion of the respective portion of the respective virtual object with the second visual prominence includes displaying the second portion of the respective portion of the respective virtual object with 10, 20, 25, 30, 40, 50, 60, 70, 75, 80, 90, 95 or 100 percent more transparency compared to displaying the second portion of the respective portion of the respective virtual object with the first visual prominence. In some embodiments, different regions of the second portion of the respective portion of the respective virtual object are displayed with different amounts of transparency. For example, a first region of the second portion of the respective portion of the respective virtual object that is at a closer distance from the first portion of the respective portion of the respective virtual object is displayed with a greater amount of transparency compared to a second region of the second portion of the respective portion of the respective virtual object that is at a farther distance from the first portion of the respective portion of the respective virtual object (e.g., the amount of transparency of the second portion relative to the three-dimensional environment decreases (e.g., gradually) from the perimeter of the first portion of the respective virtual object). In some embodiments, the second portion of the respective portion of the respective virtual object appears to have a feathering effect from the first portion of the respective portion of the respective virtual object (e.g., and optionally from the portion of the first virtual object or second virtual object that is visually obscuring the respective portion of the respective virtual object from the current viewpoint of the user). Ceasing to display a first portion of a virtual object and displaying a second portion of the virtual object that surrounds the first portion with increased transparency in a three-dimensional environment while at least a portion of a respective virtual object overlaps the first portion of the virtual object relative to a current viewpoint of a user permits continued interaction with the respective virtual object despite the spatial conflict between the virtual object and the respective virtual object and improves the continued interaction by displaying content associated with the virtual object that would otherwise be directly adjacent to the at least the portion of the respective virtual object (e.g., because the second portion of the virtual object surrounds the at least the portion of the respective virtual object from the current viewpoint of the user) as transparent relative to the current viewpoint of the user, thereby improving user device interaction.

In some embodiments, displaying the respective portion of the respective virtual object with the second visual prominence relative to the three-dimensional environment includes, while the first virtual object is an active virtual object that overlaps with the second virtual object (e.g., such as first virtual object 704*a* being displayed with the first amount of visual prominence in FIG. 7K), in accordance with a determination that the first virtual object is further from a viewpoint of the user than the second virtual object (e.g., such as first virtual object 704*a* being displayed at a location in three-dimensional environment 702 further from the current viewpoint of user 712 compared to second virtual object 704*b* in FIG. 7K), ceasing to display a respective portion of the second virtual object in the three-dimensional environment (e.g., such as computer system 101 ceasing to display portion 718*b* in FIG. 7K), and in accordance with a determination that the first virtual object is closer to the viewpoint of the user than the second virtual object (e.g., such as first virtual object 704*a* being displayed at a location in three-dimensional environment 702 closer to the current viewpoint of user 712 compared to second virtual object 704*b* in FIG. 7K, maintaining display of the respective portion of the second virtual object in the three-dimensional environment (e.g., such as computer system 101 maintaining (e.g., forgoing ceasing) display of portion 718*b* in FIG. 7E). In some embodiments, an active virtual object corresponds to a virtual object of the plurality of virtual objects that is displayed with the first visual prominence relative to the three-dimensional environment (e.g., the first virtual object is displayed with the first visual prominence and the second virtual object is displayed with the second visual prominence). In some embodiments, the first virtual object overlaps the second virtual object by more than the threshold amount. In some embodiments, the viewpoint of the user corresponds to the current viewpoint of the user. In some embodiments, the first virtual object is the active virtual object as a result of the change in spatial relationship between the first virtual object and the second virtual object (e.g., the first virtual object is moved by the user to overlap the second virtual object by more than the threshold amount). In some embodiments, the change in spatial relationship between the first virtual object and the second virtual object includes movement of the first virtual object and/or the second virtual object in depth relative to the viewpoint of the user (e.g., the first virtual object and/or the second virtual object are moved to a location closer to the current viewpoint of the user in the three-dimensional environment or further from the viewpoint of the user in the three-dimensional environment). In some embodiments, in accordance with the determination that the first virtual object does not overlap the second virtual object by more than the threshold amount from the current viewpoint of the user and that the first virtual object is at a further distance from the viewpoint of the user than the second virtual object, the computer system maintains display of (e.g., forgoes ceasing to display) the respective portion of the second virtual object in the three-dimensional environment (e.g., because the second virtual object is displayed with the first visual prominence). In some embodiments, maintaining display of the respective portion of the second virtual object includes displaying the respective portion of the second virtual object in the three-dimensional environment with the amount of opacity, brightness, color, saturation and/or sharpness that is associated with displaying the second virtual object with the second visual prominence (e.g., in accordance with the at least the portion of the first virtual object overlapping the second virtual object by more than the threshold amount). Ceasing to display a portion of a virtual object in a three-dimensional environment that spatially conflicts with a respective virtual object when the virtual object is displayed at a distance in the three-dimensional environment that is closer to a current viewpoint of a user than the respective virtual object permits continued interaction with the respective virtual object despite the spatial conflict (e.g., because a portion of the virtual object that visually obscures the respective virtual object from the current viewpoint of the user is removed), thereby improving user device interaction.

In some embodiments, in response to detecting the first input, in accordance with a determination that a first portion of a third virtual object of the plurality of virtual objects overlaps the first virtual object by more than the threshold amount from the current viewpoint of the user (e.g., such as the overlap between first virtual object 704*e* and third virtual object 704*g* shown in FIG. 7N), and that (e.g., concurrently with) a second portion of the third virtual object overlaps the second virtual object by more than the threshold amount from the current viewpoint of the user (e.g., such as the overlap between first virtual object 704*e* and second virtual object 704*f* shown in FIG. 7N), the computer system displays a first respective portion of a first respective virtual object of the plurality of virtual objects with the second visual prominence, such as displaying third virtual object 704*g* with the second amount of visual prominence as shown in FIG. 7N, and the computer system displays a second respective portion of a second respective virtual object of the plurality of virtual objects with the second visual prominence, such as displaying second virtual object 704*f* with the second amount of visual prominence as shown in FIG. 7N. In some embodiments, the third virtual object has one or more characteristics of the first virtual object and/or the second virtual object described above (e.g., with reference to step(s) 802). In some embodiments, the first respective virtual object and the second respective virtual object has one or more characteristics of the respective virtual object described above (e.g., with reference to step(s) 802). The first respective virtual object is optionally the first virtual object, the second virtual object, or the third virtual object (e.g., the first respective virtual object is the first virtual object or the second virtual object if the first input is directed to the third virtual object, the first respective virtual object is the first virtual object or the third virtual object if the first input is directed to the second virtual object, or the first respective virtual object is the second virtual object or the third virtual object if the first input is directed to the first virtual object). The second respective virtual object is optionally the first virtual object, the second virtual object, or the third virtual object (e.g., the second respective virtual object is the first virtual object or the second virtual object if the first input is directed to the third virtual object, the second respective virtual object is the first virtual object or the third virtual object if the first input is directed to the second virtual object, or the second respective virtual object is the second virtual object or the third virtual object if the first input is directed to the first virtual object). In some embodiments, displaying the first respective portion of the first respective virtual object with the second visual prominence includes one or more characteristics of displaying the respective portion of the respective virtual object with the second visual prominence as described with reference to step(s) 802. In some embodiments, displaying the second respective portion of the second respective virtual object with the second visual prominence includes one or more characteristics of displaying the respective portion of the respective virtual object with the second visual prominence as described with reference to step(s) 802. In some embodiments, displaying the first respective portion of the first respective virtual object with the second visual prominence is independent of displaying the second respective portion of the second respective virtual object with the second visual prominence. For example, displaying the respective portion of the first respective virtual object (e.g., the first virtual object or the third virtual object) with the second visual prominence is based on the overlap between the third virtual object and the first virtual object (e.g., and is not based on the overlap between the third virtual object and the second virtual object). For example, displaying the respective portion of the second respective virtual object (e.g., the second virtual object or the third virtual object) with the second visual prominence is based on the overlap between the third virtual object and the second virtual object (e.g., and is not based on the overlap between the third virtual object and the first virtual object). Displaying a first portion of a first virtual object and a second portion of a second virtual object with less visual prominence in a three-dimensional environment as a result of a change in spatial relationship between a respective virtual object, the first virtual object and the second virtual object that includes at least a first portion of the respective virtual object overlapping the first virtual object by more than a threshold amount and at least a second portion of the respective virtual object overlapping the second virtual object by more than the threshold amount relative to a current viewpoint of a user provides visual feedback to the user that the change in the spatial relationship caused spatial conflicts between the respective virtual object, the first virtual object and the second virtual object in the three-dimensional environment, provides an opportunity to the user to correct the spatial conflicts, and permits continued interaction with the respective virtual object despite the spatial conflicts, thereby avoiding errors in interaction and improving user device interaction.

In some embodiments, displaying the plurality of virtual objects includes, in accordance with a determination that the first virtual object is an active virtual object (e.g., because the first virtual object is a most recent subject of user input such as an indirect input where attention of the user directed to the first virtual object while a selection input or interaction input such as an air gesture was detected, or a direct air gesture was detected at a location corresponding to the first virtual object), the first virtual object is displayed with the first visual prominence (e.g., the respective virtual object, that is deemphasized based on the overlap between the first virtual object and the second virtual object, is the second virtual object) without regard to whether or not the first virtual object overlaps with other virtual objects, such as shown by the display of first virtual object **704*a* with the first amount of visual prominence in FIG. 7K. In some embodiments, the first virtual object is the active virtual object after attention of the user is directed to the first virtual object (e.g., attention directed to the first virtual object has one or more characteristics of attention directed to the first virtual object as described with reference to step(s) 802). For example, the user directs gaze and/or an air gesture (e.g., including the one or more air gestures described above (e.g., with reference to step(s) 802**)) to the first virtual object. In some embodiments, while the first virtual object is displayed with the first visual prominence, the second virtual object is displayed at a location in the three-dimensional environment at a greater distance from the current viewpoint of the user compared to the first virtual object. In some embodiments, while the first virtual object is displayed with the first visual prominence, the first virtual object is displayed at a location in the three-dimensional environment at a greater distance from the current viewpoint of the user compared to the second virtual object.

In some embodiments, in accordance with a determination that the second virtual object is an active virtual object (e.g., because the second virtual object is a most recent subject of user input such as an indirect input where attention of the user directed to the second virtual object while a selection input or interaction input such as an air gesture was detected, or a direct air gesture was detected at a location corresponding to the second virtual object), the second virtual object is displayed with the first visual prominence (e.g., the respective virtual object, that is deemphasized based on the overlap between the first virtual object and the second virtual object, is the first virtual object) without regard to whether or not the first virtual object overlaps with other virtual objects, such as shown by the display of second virtual object **704*b* with the first amount of visual prominence in FIG. 7D. In some embodiments, the second virtual object is the active virtual object after attention of the user is directed to the second virtual object (e.g., attention directed to the second virtual object has one or more characteristics of attention directed to the second virtual object as described with reference to step(s) 802). For example, the user directs gaze and/or an air gesture (e.g., including the one or more air gestures described above (e.g., with reference to step(s) 802**)) to the second virtual object. In some embodiments, while the second virtual object is displayed with the first visual prominence, the first virtual object is displayed at a location in the three-dimensional environment at a greater distance from the current viewpoint of the user compared to the second virtual object. In some embodiments, while the second virtual object is displayed with the first visual prominence, the second virtual object is displayed at a location in the three-dimensional environment at a greater distance from the current viewpoint of the user compared to the first virtual object.

In some embodiments, in accordance with a determination that the first virtual object is not an active virtual object (e.g., because a virtual object other than the first virtual object is a most recent subject of user input such as an indirect input where attention of the user directed to another virtual object while a selection input or interaction input such as an air gesture was detected, or a direct air gesture was detected at a location corresponding to another virtual object), the first virtual object is displayed with a degree of visual prominence that is dependent on whether or not the first virtual object overlaps (e.g., from the viewpoint of the user) with other virtual objects (e.g., in accordance with a determination that the first virtual object does not overlap with other virtual objects, the first virtual object is displayed with the first visual prominence, whereas in accordance with a determination that the first virtual object does overlap (e.g., by more than a threshold amount) with one or more other virtual objects, the first virtual object is displayed with a lower degree of visual prominence such as the second visual prominence).

In some embodiments, in accordance with a determination that the second virtual object is not an active virtual object (e.g., because a virtual object other than the second virtual object is a most recent subject of user input such as an indirect input where attention of the user directed to another virtual object while a selection input or interaction input such as an air gesture was detected, or a direct air gesture was detected at a location corresponding to another virtual object), the second virtual object is displayed with a degree of visual prominence that is dependent on whether or not the second virtual object overlaps (e.g., from the viewpoint of the user) with other virtual objects (e.g., in accordance with a determination that the second virtual object does not overlap with other virtual objects, the second virtual object is displayed with the first visual prominence, whereas in accordance with a determination that the second virtual object does overlap (e.g., by more than a threshold amount) with one or more other virtual objects, the second virtual object is displayed with a lower degree of visual prominence such as the second visual prominence).

Displaying a portion of a virtual object with less visual prominence in a three-dimensional environment in accordance with attention of a user being directed to a respective virtual object and in accordance with at least a portion of the respective virtual object overlapping the virtual object by more than a threshold amount relative to a current viewpoint of a user provides visual feedback to the user that there is a spatial conflict between the virtual object and the respective virtual object, provides an opportunity to the user to correct the spatial conflict, and permits continued interaction with the respective virtual object that the attention of the user is directed to despite the spatial conflict, thereby avoiding errors in interaction and improving user device interaction.

In some embodiments, while displaying the respective virtual object with the second visual prominence, the computer system detects a second input corresponding to a request to move a virtual element in the three-dimensional environment toward a location associated with the respective virtual object in the three-dimensional environment, such as the input corresponding to the request to move virtual element 730*a* initiated by user 712 in FIG. 7S. In some embodiments, the virtual element is associated with a virtual object of the plurality of virtual objects in the three-dimensional environment that is different from the respective virtual object. For example, the virtual element is content (e.g., an image, file, document and/or text) associated with the virtual object that is different from the respective virtual object. In some embodiments, the virtual element is included in the virtual object that is different from the respective virtual object (e.g., prior to the second input being detected). In some embodiments, the virtual element is independent from (e.g., not associated with) a virtual object of the plurality of virtual objects displayed in the three-dimensional environment. In some embodiments, the virtual element is content associated with an application (e.g., a web-browsing application and/or an image, video, file and/or document storage application). In some embodiments, the respective virtual object is displayed with a third visual prominence that is less than the first visual prominence. For example, the third visual prominence includes less opacity, color, saturation, brightness and/or sharpness compared to the first visual prominence. In some embodiments, the second input has one or more characteristics of the first input. For example, the second input includes an air gesture directed to the virtual element (e.g., including one or more air gestures described above and/or with reference to method 900) and/or movement of a hand of the user of the computer system relative to the three-dimensional environment (e.g., while maintaining a hand pose associated with the air gesture).

In some embodiments, while detecting the second input, the computer system moves the virtual element in the three-dimensional environment in accordance with movement associated with the second input while the respective virtual object is displayed with the second visual prominence, such as the movement of virtual element 730*a* in three-dimensional environment shown in FIGS. 7S-7T while third virtual object 704*g* is displayed with the reduced amount of visual prominence. In some embodiments, movement of the virtual element in the three-dimensional environment corresponds to movement of a hand of the user of the computer system relative to the three-dimensional environment that is associated with the second input (e.g., associated with the air gesture included in the second input). For example, a direction, distance, magnitude, velocity and/or acceleration of movement of the virtual element in the three-dimensional environment corresponds to a direction, distance, magnitude, velocity and/or acceleration of movement of the hand of the user relative to the three-dimensional environment. In some embodiments, displaying the respective virtual object with the second visual prominence includes maintaining display of the respective virtual object with the second visual prominence while the virtual element is moved in the three-dimensional environment (e.g., the second visual prominence is maintained while the second input is detected). Displaying a virtual object in a three-dimensional environment with a reduced visual prominence while a virtual element is being moved in a three-dimensional environment in accordance with user input minimizes distraction from the virtual element that a user is interacting with in the three-dimensional environment, thereby improving user device interaction and avoiding errors in interaction.

In some embodiments, after moving the virtual element to the location associated with the respective virtual object (e.g., as shown by the location of virtual element 730*a* in FIG. 7U), the computer system detects, via the one or more input devices, a termination of the second input, such as user 712 ceasing to provide the air gesture associated with the input corresponding to the request to move virtual element 730*a* in three-dimensional environment 702 shown in FIG. 7V. In some embodiments, in response to detecting the termination of the second input, the computer system adds the virtual element to the respective virtual object in the three-dimensional environment while maintaining display of the respective portion of the respective virtual object with the second visual prominence, such as computer system 101 adding virtual element 730*a* to third virtual object 704*g* while third virtual object 704*g* is displayed with the reduced amount of visual prominence in FIG. 7V. In some embodiments, detecting termination of the second input includes detecting that the user ceases to perform the air gesture associated with the second input (e.g., the user ceases to perform an air pinch with their hand and/or ceases to perform hand movement). In some embodiments, detecting the termination of the second input includes detecting that the location of the virtual element relative to the three-dimensional environment is maintained for a threshold period of time (e.g., 0.1, 0.2, 0.5, 1, 2, 5 or 10 seconds). In some embodiments, adding the virtual element to the respective virtual object in the three-dimensional environment includes displaying the virtual element within the respective virtual object (e.g., the virtual element is visibly inside of the respective virtual object from the current viewpoint of the user). In some embodiments, the computer system adds the virtual element to the respective virtual object in the three-dimensional environment in accordance with the respective virtual object being with a threshold distance (e.g., 0.01, 0.05, 0.1, 0.2, 0.5 or 1 m) of the respective virtual object when termination of the second input is detected. In some embodiments, in accordance with the virtual element not being within the threshold distance of the respective virtual object when termination of the second input is detected, the computer system forgoes adding the virtual element to the respective virtual object in the three-dimensional environment. In some embodiments, the respective virtual object includes one or more respective virtual elements different from the virtual element, and adding the virtual element to the respective virtual object in the three-dimensional environment includes displaying the respective virtual object with the one or more respective virtual elements and the virtual element (e.g., the one or more respective virtual elements and the virtual element are all visibly inside of the respective virtual object from the current viewpoint of the user). In some embodiments, maintaining display of the respective virtual object with the second visual prominence includes maintaining the amount opacity, color, brightness, saturation and/or sharpness the respective virtual object is displayed with prior to and/or while detecting the second input. Maintaining display of a respective virtual object with a reduced amount visual prominence while adding a virtual element to the respective virtual object avoids displaying the respective virtual object with an unnecessary amount of visual prominence when an intent of a user is not to continue interacting with the respective virtual object after adding the virtual element, thereby conserving computing resources.

In some embodiments, while detecting the second input, in accordance with a determination that movement of the virtual element in the three-dimensional environment satisfies one or more first criteria, the computer system displays the respective portion of the respective virtual object with a third visual prominence greater than the second visual prominence, such as computer system 101 displaying third virtual object 704*g* with the increased amount of visual prominence in response to one or more criteria being satisfied in FIG. 7W. In some embodiments, in accordance with a determination that the movement of the virtual element in the three-dimensional environment does not satisfy the one or more first criteria, the computer system maintains display of the respective portion of the respective virtual object with the second visual prominence, such as computer system 101 displaying third virtual object 704*g* with the reduced amount of visual prominence in FIG. 7V. In some embodiments, the computer system stores the one or more first criteria in a memory of the computer system. In some embodiments, after determining that movement of the virtual element in the three-dimensional environment satisfies the one or more first criteria while detecting the second input (e.g., after termination of the second input), the computer system maintains display of the respective portion of the respective virtual object with the third visual prominence. In some embodiments, the computer system maintains display of the respective portion of the respective virtual object with the second visual prominence until the one or more first criteria are satisfied. In some embodiments, in accordance with the computer system detecting termination of the second input and the one or more first criteria not being satisfied, the computer system maintains display of the respective portion of the respective virtual object with the second visual prominence. In some embodiments, displaying the respective portion of the respective virtual object with the third visual prominence includes displaying the respective portion of the respective virtual object with a greater amount of opacity, brightness, color, saturation and/or sharpness compared to displaying the respective portion of the respective virtual object with the second visual prominence. In some embodiments, displaying the respective virtual object with the third visual prominence includes displaying (e.g., redisplaying) a portion of the respective virtual object in the three-dimensional environment that the computer system ceased to display while displaying the respective virtual object with the second visual prominence. In some embodiments, maintaining display of the respective portion of the respective virtual object with the second visual prominence includes one or more characteristics of maintaining display of the respective portion of the respective virtual object with the second visual prominence as described above. Displaying a respective virtual object with an increased amount of visual prominence when moving a virtual element in a three-dimensional environment based on the satisfaction of one or more criteria enables the respective virtual object to be displayed with an amount of visual prominence that is based on whether a user moving the virtual element intends to interact with the respective virtual object, thereby improving user device interaction and conserving computing resources.

In some embodiments, the one or more first criteria include a criterion that is satisfied when the virtual element is within a threshold distance of the respective virtual object, such as virtual element 730*a* being within the threshold distance of third virtual object 704*g* in FIG. 7W. In some embodiments, the threshold distance is 0.01, 0.05, 0.1, 0.2, 0.5 or 1 m from a location corresponding to the respective virtual object in the three-dimensional environment. In some embodiments, the criterion is satisfied when the virtual element is within the threshold distance of the respective virtual object in one or more directions relative to the respective virtual object in the three-dimensional environment from the current viewpoint of the user of the computer system. For example, the virtual element is within the threshold distance when the virtual element is within 0.01, 0.05, 0.1, 0.2, 0.5 or 1 m of the location corresponding to the respective virtual object in the direction of depth, the horizontal direction and/or the vertical direction in the three-dimensional environment from the current viewpoint of the user. In some embodiments, the threshold distance corresponds to a snapping distance of the virtual element from the respective virtual object. For example, in accordance with the virtual element being within the threshold distance of the respective virtual object during the movement of the virtual element (e.g., while detecting the second input), the computer system moves the virtual element to a location in the three-dimensional environment associated with the respective virtual object (e.g., the virtual element is added to the respective virtual object). For example, in accordance with the virtual element being within the threshold distance of the respective virtual object when termination of the second input is detected, the computer system moves the virtual element to the location in the three-dimensional environment associated with the respective virtual object (e.g., the virtual element is added to the respective virtual object). In some embodiments, in accordance with the virtual element not being within the threshold distance of the respective virtual object, the computer system maintains display of the respective portion of the respective virtual object with the second visual prominence. Displaying a respective virtual object with an increased amount of visual prominence when moving a virtual element in a three-dimensional environment based on the virtual element being within a threshold distance of the respective virtual object enables the respective virtual object to be displayed with an amount of visual prominence that is based on whether a user moving the virtual element intends to interact with the respective virtual object, thereby improving user device interaction and conserving computing resources.

In some embodiments, the one or more first criteria include a criterion that is satisfied when movement of the virtual element is less than a threshold amount of movement (e.g., for a threshold period of time (e.g., 0.1, 0.2, 0.5, 1, 2, 5 or 10 seconds)), such as the movement of virtual element 730*a* being less than a threshold amount of movement in FIG. 7W. In some embodiments, the threshold amount of movement corresponds to a distance and/or magnitude of movement (e.g., 0.001, 0.005, 0.01, 0.05, 0.1, 0.2, 0.5 or 1 m). In some embodiments, the threshold amount of movement corresponds to a velocity of movement (e.g., 0.01, 0.02, 0.05, 0.1, 0.2, 0.5, or 1 m/s). In some embodiments, the criterion is satisfied when movement of the virtual element is less than the threshold amount of movement and in accordance with a determination that the virtual element is within the threshold distance of the respective virtual object as described above. For example, in accordance with the movement of the virtual element being less than the threshold amount of movement and the virtual element not being within the threshold distance of the respective virtual object (e.g., when less than the threshold amount of movement of the virtual element is detected), the computer system maintains display of the respective portion of the respective virtual object with the second visual prominence. In some embodiments, in accordance with the movement of the virtual element being less than the threshold amount of movement, the computer system maintains display of the respective portion of the respective virtual object with the second visual prominence. Displaying a respective virtual object with an increased amount of visual prominence when moving a virtual element in a three-dimensional environment based on the virtual element having less than a threshold amount of movement (e.g., during the movement of the virtual element) enables the respective virtual object to be displayed with an amount of visual prominence that is based on whether a user moving the virtual element intends to interact with the respective virtual object, thereby improving user device interaction and conserving computing resources.

In some embodiments, the one or more first criteria include a criterion that is satisfied when the virtual element is within a threshold distance of the respective virtual object for more than a threshold period of time, such as virtual element 730*a* being within a threshold distance of third virtual object 704*g* for more than a threshold period of time in FIG. 7W. In some embodiments, the threshold distance has one or more characteristics of the threshold distance as described above. In some embodiments, the threshold period of time is 0.1, 0.2, 0.5, 1, 2, 5 or 10 seconds. In some embodiments, the criterion is satisfied when the virtual element is within the threshold distance of the respective virtual object for more than the threshold period of time and when movement of the virtual element is less than the threshold amount of movement as described above. In some embodiments, in accordance with the virtual element not being within the threshold distance of the respective virtual object for the threshold period of time, the computer system maintains display of the respective portion of the respective virtual object with the second visual prominence (e.g., the virtual element is not within the threshold distance or the virtual object is within the threshold distance of the respective virtual object for less than the threshold period of time). Displaying a respective virtual object with an increased amount of visual prominence when moving a virtual element in a three-dimensional environment based on the virtual element being within a threshold distance of the respective virtual object for more than a threshold period of time enables the respective virtual object to be displayed with an amount of visual prominence that is based on whether a user moving the virtual element intends to interact with the respective virtual object, thereby improving user device interaction and conserving computing resources.

In some embodiments, the one or more first criteria include a criterion that is satisfied when a first portion of the respective virtual object is visible in the three-dimensional environment from the current viewpoint of the user, such as the portion of third virtual object 704*g* that is visible from the current viewpoint of user 712 in FIGS. 7S-7V. In some embodiments, the first portion of the respective virtual object has one or more characteristics of the respective portion of the respective virtual object. In some embodiments, the first portion of the respective virtual object corresponds to a portion of the respective virtual object that is not overlapped by a virtual object (e.g., the first virtual object or the second virtual object) of the plurality of virtual objects that is different from the respective virtual object. In some embodiments, the first portion corresponds to a threshold amount of the respective virtual object (e.g., 1, 2, 5, 10, 20, 25, 50, 75 or 95 percent of the surface area of a surface of the respective virtual object, or a portion with a width of 0.5, 1, 2, 5, 10, 20, 25, 30, 35, 40, 45 or 50 cm). For example, in accordance with a portion of the respective virtual object that is visible in the three-dimensional environment from the current viewpoint of the user being less than the threshold amount of the respective virtual object, the computer system maintains display of the respective portion of the respective virtual object with the second visual prominence. Displaying a respective virtual object with an increased amount of visual prominence when moving a virtual element in a three-dimensional environment based on a portion of the respective virtual object being visible in the three-dimensional environment from a viewpoint of a user moving the virtual element prevents increasing a visual prominence of a virtual object in the three-dimensional environment that the user is unlikely and/or unable to interact with while moving the virtual element, thereby conserving computing resources.

In some embodiments, while detecting the second input, the computer system moves the virtual element within a threshold distance (e.g., 0.01, 0.05, 0.1, 0.2, 0.5 or 1 m) of the respective virtual object in accordance with the movement associated with the second input, such as computer system 101 moving virtual element 730*a* in accordance with the input provided by user 712 in FIG. 7T. In some embodiments, in accordance with a determination that the movement of the virtual element in the three-dimensional environment satisfies the one or more first criteria, the computer system 101 moves (e.g., without input for doing so) the virtual element to the respective virtual object (e.g., within a distance less than the threshold distance of the respective virtual object) in the three-dimensional environment prior to displaying the respective portion of the respective virtual object with the third visual prominence, such as computer system 101 moving virtual element 730 to the location corresponding to third virtual object 704*g* in FIG. 7U while third virtual object 704*g* is displayed with the reduced amount of visual prominence (e.g., prior to third virtual object 704*g* being displayed with the increased amount of visual prominence as shown in FIG. 7W). In some embodiments, moving the virtual element within the threshold distance of the respective virtual object includes one or more characteristics of the virtual element being within the threshold distance of the respective virtual object as described above. In some embodiments, moving the virtual element in accordance with the movement associated with the second input includes moving the virtual element in accordance with a direction, distance, magnitude, velocity and/or acceleration of movement of the hand of the user relative to the three-dimensional environment (e.g., while maintaining an air pinch shape with the hand). For example, the second input corresponds to an air gesture that includes hand movement toward a direction of a location of the respective virtual object in the three-dimensional environment. In some embodiments, moving the virtual element to the respective virtual object includes moving the virtual element in the three-dimensional environment to a location in the three-dimensional environment associated with the respective virtual object (e.g., the location is at least partially within the respective virtual object from the current viewpoint of the user). For example, the movement of the virtual element to the respective virtual object in the three-dimensional environment is not based on movement (e.g., hand movement of an air gesture) associated with the second input (e.g., the user does not control (e.g., through the movement associated with the second input) the movement of the virtual element to the respective virtual object once the virtual element is moved within the threshold distance of the respective virtual object). In some embodiments, in accordance with the virtual element being displayed at the location associated with the respective virtual object for a threshold period of time (e.g., having one or more characteristics of the threshold period of time described above), the computer system displays the respective portion of the respective virtual object with the third visual prominence (e.g., prior to adding the virtual element to the respective virtual object). In some embodiments, in accordance with termination of the second input being detected by the computer system while the virtual element is displayed at the location associated with the respective virtual object, the computer system adds the virtual element to the respective virtual object (e.g., adding the virtual element to the respective virtual object includes one or more characteristics of adding the virtual element to the respective virtual object in the three-dimensional environment as described above). In some embodiments, the computer system maintains display of the respective portion of the respective virtual object with the second visual prominence after adding the virtual element to the respective virtual object in the three-dimensional environment. In some embodiments, the computer system displays the respective portion of the respective virtual object with the third visual prominence in response to (e.g., after) the virtual element is added to the respective virtual object. In some embodiments, the one or more first criteria include one or more of the criterion described above. In some embodiments, in accordance with a determination that the movement of the virtual element in the three-dimensional environment does not satisfy the one or more first criteria, the computer system forgoes moving the virtual element to the respective virtual object in the three-dimensional environment (e.g., and maintains display of the respective portion of the respective virtual object with the second visual prominence). Increasing a visual prominence of a respective virtual object after adding a virtual element to the respective virtual object in a three-dimensional environment based on the satisfaction of one or more criteria prevents displaying an unnecessary amount of visual prominence when an intent of a user is not to continue to interact with the respective virtual object after adding the virtual element, and provides visual feedback to a user that intends to continue to interact with the respective virtual object that the virtual element has been added to the respective virtual object, thereby improving user device interaction and conserving computing resources.

In some embodiments, while displaying the respective portion of the respective virtual object with the third visual prominence in accordance with the determination that the movement of the virtual element in the three-dimensional environment satisfies the one or more first criteria, the computer system detects, via the one or more input devices, a termination of the second input, such as the termination of the input provided by user 712 to move virtual element 730*a* in three-dimensional environment 702 shown in FIG. 7V. In some embodiments, detecting termination of the second input includes one or more characteristics of detecting termination of the second input as described above. In some embodiments, in response to detecting the termination of the second input, in accordance with the virtual element being at a location in the three-dimensional environment that is away from the respective virtual object (e.g., such as the location of virtual element 730*a* shown in FIG. 7X), the computer system maintains display of the respective portion of the respective virtual object with the third visual prominence, such as computer system 101 maintaining display of third virtual object 704*g* with the increased amount of visual prominence while virtual element 730*a* is displayed away from third virtual object 704*g* in FIG. 7X. In some embodiments, the virtual element being at a location in the three-dimensional environment that is away from the respective virtual object corresponds to the virtual element not being added to the respective virtual object in accordance with the second input. For example, the virtual element is not displayed within the respective virtual object (e.g., in accordance with the movement of the virtual element or in response to detecting the termination of the second input). In some embodiments, the virtual element being at a location in the three-dimensional environment that is away from the respective virtual object corresponds to the virtual element not being within the threshold distance of the respective virtual object (e.g., as described above) while the termination of the second input is detected. For example, the movement of the virtual element in accordance with the second input does not cause the respective virtual object to be moved within the threshold distance prior to detecting termination of the second input. For example, the virtual element is moved within the threshold distance while detecting the second input but is moved away from the threshold distance prior to the termination of the second input being detected (e.g., such that the virtual element is not within the threshold distance of the respective virtual object when termination of the second input is detected). In some embodiments, in response to detecting the termination of the second input, in accordance with the virtual element being at a location in the three-dimensional environment that is within (e.g., or within the threshold distance of) the respective virtual object, the computer system maintains display of the respective portion of the respective virtual object with the third visual prominence. In some embodiments, in response to detecting the termination of the second input, in accordance with the virtual element being at a location in the three-dimensional environment that is within the respective virtual object, the computer system maintains display of the respective portion of the respective virtual object with the third visual prominence (e.g., and the virtual element is optionally added to the respective virtual object). Increasing a visual prominence of a virtual object in a three-dimensional environment in response to a user input that causes movement of a virtual element in the three-dimensional environment toward the virtual object that satisfies one or more criteria, and maintaining display of the virtual object with the increased visual prominence after detecting termination of the user input and while the virtual element is away from the virtual object ensures that a user can interact with the respective virtual object when it is determined that the user intends to interact with the virtual object based on the movement of the virtual element, thereby improving user device interaction.

It should be understood that the particular order in which the operations in method 800 have been described is merely exemplary and is not intended to indicate that the described order is the only order in which the operations could be performed. One of ordinary skill in the art would recognize various ways to reorder the operations described herein.

FIG. 9 is a flowchart illustrating an exemplary method 900 of changing a visual prominence of a respective virtual object based on a change in spatial location of a first virtual object with respect to a second virtual object in a three-dimensional environment in accordance with some embodiments. In some embodiments, the method 900 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, and/or a projector) and one or more cameras (e.g., a camera (e.g., color sensors, infrared sensors, and other depth-sensing cameras) that points downward at a user's hand or a camera that points forward from the user's head). In some embodiments, the method 900 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 900 are, optionally, combined and/or the order of some operations is, optionally, changed.

In some embodiments, method 900 is performed at a computer system in communication with (e.g., including and/or communicatively linked with) one or more input devices and a display generation component: In some embodiments, the computer system has one or more of the characteristics of the computer system(s) described with reference to methods 800, 1100, 1300, and/or 1500. In some embodiments, the input device(s) has one or more of the characteristics of the input device(s) described with reference to methods 800, 1100, 1300, and/or 1500. In some embodiments, the display generation component has one or more of the characteristics of the display generation component described with reference to methods 800, 1100, 1300, and/or 1500.

In some embodiments, computer system displays (902*a*), via the display generation component, a first virtual object and a second virtual object in a three-dimensional environment (e.g., such as first virtual object 704*a* and second virtual object 704*b* displayed in three-dimensional environment 702 in FIGS. 7A and 7A1), wherein the three-dimensional environment is visible from a current viewpoint of a user of the computer system, the second virtual object has a first visual prominence (e.g., such as the second virtual object 704*b* displayed with the first amount of visual prominence in FIGS. 7A and 7A1) relative to the three-dimensional environment, and the second virtual object does not spatially conflict with the first virtual object (e.g., such as first virtual object 704*a* and second virtual object 704*b* not spatially conflicting in FIGS. 7A and 7A1). In some embodiments, the three-dimensional environment includes one or more characteristics of the three-dimensional environment described with reference to method 800, and/or one or more characteristics of three-dimensional and/or virtual environments described with reference to methods 1100, 1300 and/or 1500. In some embodiments, the first virtual object and/or the second virtual object include one or more characteristics of the first virtual object and/or the second virtual object described with reference to method 800. In some embodiments, the first virtual object and the second virtual object are included in the user's field of view relative to the three-dimensional environment. In some embodiments, displaying the second virtual object with the first visual prominence includes one or more characteristics of displaying the first virtual object and/or second virtual object with the first visual prominence as described with reference to method 800. In some embodiments, the first virtual object and the second virtual object are displayed with the first visual prominence concurrently. In some embodiments, the first virtual object and the second virtual object are not displayed with overlapping portions relative to the current viewpoint of the user (e.g., the first virtual object does not visually obscure the second virtual object, and the second virtual object does not visually obscure the first virtual object, relative to the current viewpoint of the user). In some embodiments, the first virtual object and the second virtual object are displayed with a first spatial relationship in the three-dimensional environment (e.g., including one or more characteristics of the first spatial relationship between the first virtual object and the second virtual object described with reference to method 800).

In some embodiments, while displaying the first virtual object and the second virtual object in the three-dimensional environment, the computer system detects (902*b*), via the one or more input devices, a first input corresponding to a request to change a location of the first virtual object in the three-dimensional environment from a first location to a second location, such as the input shown and described with reference to FIGS. 7A and 7A1. In some embodiments, the first input corresponds to a request to change the spatial relationship between the first virtual object and the second virtual object as described with reference to method 800. In some embodiments, moving the first virtual object includes changing the position and/or orientation (e.g., angular position) of the first virtual object relative to the current viewpoint of the user. In some embodiments, the first input includes the user directing attention toward the first virtual object (e.g., optionally for a threshold period of time (e.g., 0.1, 0.2, 0.5, 1, 2, 5 or 10 seconds)). In some embodiments, while directing attention toward the first virtual object, the user performs an air gesture (e.g., an air tap, air pinch, air drag and/or air long pinch (e.g., an air pinch for a duration of time (e.g., 0.1, 0.5, 1, 2, 5 or 10 seconds)) in order to select the first virtual object. The user optionally performs hand movement while concurrently performing the above-described air gesture (e.g., moving their hand while in an air pinch hand shape in a direction relative to the three-dimensional environment (e.g., toward the second location in the three-dimensional environment) to which the user desires to move the first virtual object to). In some embodiments, the first input includes a touch input on a touch-sensitive display, an input provided through a keyboard and/or mouse, or an audio input as described with reference to the first input in method 800.

In some embodiments, in response to receiving the first input, the computer system moves (902*c*) the first virtual object from the first location to the second location in the three-dimensional environment, such as the movement of first virtual object 704*a* shown in FIGS. 7A-7C, and/or in FIGS. 7E-7K. In some embodiments, the first location is a location in the three-dimensional environment that includes less distance from the location of the current viewpoint of the user in the three-dimensional environment compared to the second location (e.g., the first virtual object is moved farther in depth relative to the current viewpoint of the user in response to receiving the first input). In some embodiments, the first location is a location in the three-dimensional environment that includes a greater distance from the location of the current viewpoint of the user in the three-dimensional environment compared to the second location (e.g., the first virtual object is moved closer in depth relative to the current viewpoint of the user in response to receiving the first input). In some embodiments, the second virtual object is displayed at a location in the three-dimensional environment with a depth between the depth of the first location and the depth of the second location relative to the current viewpoint of the user. In some embodiments, if the first input is not received by the computer system, the computer system maintains the first virtual object at the first location in the three-dimensional environment.

In some embodiments, moving the first virtual object from the first location to the second location includes, while the second virtual object spatially conflicts with at least a portion of the first virtual object relative to the current viewpoint of the user (902*d*), such as the spatial conflict between first virtual object 704*a* and second virtual object 704*b* during the movement of first virtual object 704*a* shown in FIGS. 7E-7K, reducing a visual prominence of at least a portion of the second virtual object from the first visual prominence to a second visual prominence, less than the first visual prominence, relative to the three-dimensional environment (902*e*), such as shown by the second amount of visual prominence of second virtual object 704*b* shown in FIGS. 7E-7K, and changing the visual prominence of the at least the portion of the second virtual object relative to the three-dimensional environment based on a change in a spatial location of the first virtual object with respect to the second virtual object during the movement of the first virtual object in the three-dimensional environment (902*f*), such as the change in portion 718*b* of second virtual object 704*b* in FIGS. 7F-7I.

In some embodiments, the second virtual object does not spatially conflict with the at least the portion of the first virtual object relative to the current viewpoint of the user for a portion of the movement of the first virtual object from the first location to the second location (e.g., the at least the portion of the first virtual object is not spatially conflicting with the second virtual object during the entire duration of movement of the first virtual object from the first location to the second location). In some embodiments, the second virtual object spatially conflicts with the at least the portion of the first virtual object by at least a threshold amount (e.g., including one or more characteristics of the threshold amount of overlap as described with reference to method 800). In some embodiments, the second virtual object spatially conflicting with the at least the portion of the first virtual object relative to the current viewpoint of the user includes the second virtual object spatially conflicting with the first virtual object relative to the three-dimensional environment (e.g., movement of the first virtual object from the first location to the second location causes the first virtual object to spatially intersect the location, area and/or volume of the second virtual object in the three-dimensional environment). In some embodiments, the second virtual object spatially conflicting with the at least the portion of the first virtual object relative to the current viewpoint of the user does not include the second virtual object spatially conflicting with the first virtual object relative to the three-dimensional environment (e.g., movement of the first virtual object from the first location to the second location does not cause the first virtual object to spatially intersect the location, area and/or volume of the second virtual object in the three-dimensional environment).

In some embodiments, reducing the visual prominence of the at least the portion of the second virtual object to the second visual prominence includes one or more characteristics of displaying the first portion of the second virtual object with the second visual prominence as described with reference to method 800 (e.g., the at least the portion of the second virtual object is displayed with less than 100 percent opacity, and/or displayed with more transparency, less brightness, less sharpness and/or less color compared to the first visual prominence). In some embodiments, the at least the portion of the second virtual object displayed with the second visual prominence includes a portion of the second virtual object within a threshold distance of (e.g., 0.5, 1, 2, 5, 10, 20, 25, 30, 35, 40, 45 or 50 cm of) a perimeter of the at least the portion of the first virtual object relative to the current viewpoint of the user (e.g., the at least the portion of the second virtual object displayed with the second visual prominence is displayed with a feathered appearance from the at least the portion of the first virtual object relative to the current viewpoint of the user). In some embodiments, the at least the portion of the second virtual object displayed with the second visual prominence is and/or includes a portion of the second virtual object that visually obscures the at least the portion of the first virtual object relative to the current viewpoint of the user. In some embodiments, the at least the portion of the first virtual object that is visually obscured by the second virtual object is visible relative to the current viewpoint of the user (e.g., because the visual prominence of the at least the portion of the second virtual object is reduced). In some embodiments, the at least the portion of the second virtual object displayed with the second visual prominence does not include the entire portion of the second virtual object that does not spatially conflict with the at least the portion of the first virtual object (e.g., a portion of the second virtual object is displayed with the first visual prominence concurrently with a portion of the second virtual object displayed with the second visual prominence). In some embodiments, the at least the portion of the second virtual object displayed with the second visual prominence is the entire portion of the second virtual object that does not spatially conflict with the at least the portion of the first virtual object. In some embodiments, the computer system maintains display of the first virtual object with the first visual prominence while the at least the portion of the second virtual object is displayed with the second visual prominence (e.g., and while the first virtual object is moved from the first location to the second location).

In some embodiments, changing the visual prominence of the at least the portion of the second virtual object relative to the three-dimensional environment includes changing the magnitude of the second visual prominence of the at least the portion of the second virtual object relative to the three-dimensional environment. For example, the at least the portion of the second virtual object is displayed with a different amount (e.g., based on a percentage of the corresponding visual effect) of opacity, transparency, sharpness, brightness and/or color based on the spatial location (e.g., distance and/or orientation) of the first virtual object with respect to the second virtual object during the movement of the first virtual object from the first location to the second location. For example, the first virtual object is displayed with the first visual prominence when the first input is received by the computer system, and movement of the first virtual object from the first location to the second location includes the first virtual object intersecting (e.g., spatially relative to the three-dimensional environment) the location of the second virtual object (e.g., the location of the second virtual object includes a spatial location between the first location and the second location relative to the current viewpoint of the user). As the first virtual object intersects the location of the second virtual object in the three-dimensional environment, the magnitude of the second visual prominence of the at least the portion of the second virtual object optionally decreases (e.g., the at least the portion of the second virtual object is optionally displayed with less opacity, more transparency, less brightness, less sharpness and/or less color compared to displaying the at least the portion of the second virtual object with a decreased magnitude of the second visual prominence). In some embodiments, as the first virtual object is moved farther in spatial location (e.g., in distance and/or orientation) from the second virtual object to the second location, the magnitude of the second visual prominence of the at least the portion of the second virtual object optionally increases (e.g., the at least the portion of the second virtual object is optionally displayed with more opacity, less transparency, more brightness, more sharpness and/or more color compared to displaying the at least the portion of the second virtual object with a decreased magnitude of the second visual prominence). In some embodiments, if the first virtual object is moved closer in spatial location (e.g., in distance and/or orientation) with respect to the second virtual object relative to the current viewpoint of the user, the at least the portion of the second virtual object is displayed with a reduced magnitude of the second visual prominence (e.g., compared to if the virtual object is moved farther in spatial location (e.g., in distance and/or orientation) with respect to the second virtual object relative to the current viewpoint of the user). In some embodiments, as the first virtual object moves farther in spatial location (e.g., in distance and/or orientation) with respect to the second virtual object relative to the current viewpoint of the user, the at least the portion of the second virtual object is displayed with a greater magnitude of the second visual prominence. Changing the visual prominence of a portion of a respective virtual object in a three-dimensional environment based on the spatial location of the virtual object with respect to the respective virtual object in the three-dimensional environment provides visual feedback to a user that moving the virtual object in the three-dimensional environment causes a spatial conflict with the respective virtual object, provides visual feedback to the user regarding how to resolve the spatial conflict (e.g., or one or more characteristics of the spatial conflict), and prevents the display of content that would otherwise not be viewable to the user based on the spatial conflict caused by the movement of the virtual object, thereby conserving computing resources and reducing errors in interaction.

In some embodiments, changing the visual prominence of the at least the portion of the second virtual object based on the spatial location of the first virtual object with respect to the second virtual object includes changing the visual prominence of the at least the portion of the second virtual object based on a change in depth of the first virtual object relative to the current viewpoint of the user, such as shown by the change in portion 718*b* based on the change in depth of first virtual object 704*a* relative to the current viewpoint of user 712 shown in FIGS. 7F-7I. In some embodiments, movement of the first virtual object from the first location to the second location in the three-dimensional environment includes changing the depth of the first virtual object relative to the current viewpoint of the user. For example, the first location is a first distance from the current viewpoint of the user in the three-dimensional environment, and the second location is a second distance, different from the first distance, from the current viewpoint of the user in the three-dimensional environment. In some embodiments, the first distance is greater than the second distance. In some embodiments, the second distance is greater than the first distance. In some embodiments, the magnitude of the second visual prominence of the at least the portion of the second virtual object is changed based on the change in depth of the first virtual object relative to the current viewpoint of the user. For example, at the first distance from the current viewpoint of the user in the three-dimensional environment, the at least the portion of the second virtual object is displayed with a first amount of opacity, transparency, sharpness, brightness and/or color, and at the second distance from the current viewpoint of the user in the three-dimensional environment, the at least the portion of the second virtual object is displayed with a second amount, different from the first amount, of opacity, transparency, sharpness, brightness and/or color. In some embodiments, the computer system changes the visual prominence of the at least the portion of the second virtual object based on the depth of the first virtual object relative to the current viewpoint of the user in relation to the depth of the second virtual object relative to the current viewpoint of the user. For example, in accordance with the second virtual object being at a location in the three-dimensional environment at a first distance relative to the current viewpoint of the user in the three-dimensional environment, the computer system changes the visual prominence of the at least the portion of the second virtual object in accordance with a respective distance of the first virtual object relative to the current viewpoint of the user being within a threshold amount of the first distance (e.g., 0.1, 0.5, 1, 2, 5 or 10 m). In some embodiments, changing the visual prominence of the at least the portion of the second virtual object in accordance with the respective distance of the first virtual object relative to the current viewpoint of the user being within the threshold amount of the first distance includes changing the magnitude of the second visual prominence of the at least the portion of the second virtual object based on the difference between the first distance and the respective distance of the first virtual object relative to the current viewpoint of the user during the movement of the first virtual object. For example, during the movement of the first virtual object, the first virtual object moves from a second distance relative to the current viewpoint of the user in the three-dimensional environment to a third distance relative to the current viewpoint of the user in the three-dimensional environment. In some embodiments, in accordance with the second distance being different by the first distance by a first amount, and the third distance being different from the first distance by a second amount less than the first amount, the at least the portion of the second virtual object is displayed with a greater magnitude of the second visual prominence when the second virtual object is at the third distance relative to the current viewpoint of the user in the three-dimensional environment compared to at the second distance relative to the current viewpoint of the user in the three-dimensional environment. In some embodiments, the at least the portion of the second virtual object is displayed with a maximum magnitude of the second visual prominence in accordance with the first virtual object being at the first distance relative to the current viewpoint of the user during the movement of the first virtual object. Changing the visual prominence of a portion of a respective virtual object in a three-dimensional environment based on a change in depth of the virtual object with respect to the respective virtual object in the three-dimensional environment provides visual feedback to a user that moving the virtual object in the three-dimensional environment causes a spatial conflict with the respective virtual object, provides visual feedback to the user regarding how to resolve the spatial conflict (e.g., or one or more characteristics of the spatial conflict), and prevents the display of content that would otherwise not be viewable to the user based on the spatial conflict caused by the movement of the virtual object, thereby conserving computing resources and reducing errors in interaction.

In some embodiments, changing the visual prominence of the at least the portion of the second virtual object includes changing a magnitude of the second visual prominence of the at least the portion of the second virtual object based on the change in the spatial location of the first virtual object with respect to the second virtual object during the movement of the first virtual object in the three-dimensional environment, such as the change in size and/or transparency of portion 718*b* of second virtual object 704*b* during the movement of first virtual object 704*a* shown in FIGS. 7F-7I. In some embodiments, changing the magnitude of the second visual prominence of the at least the portion of the second virtual object includes changing the amount of change of the opacity, transparency, sharpness, brightness and/or color of the at least the portion of the second virtual object during the movement of the first virtual object in the three-dimensional environment. In some embodiments, in accordance with the spatial location of the first virtual object with respect to the second virtual object corresponding to a first distance of the first virtual object relative to the second virtual object during the movement of the first virtual object in the three-dimensional environment, the at least the portion of the second virtual object is displayed with a first magnitude of the second visual prominence. In some embodiments, in accordance with the spatial location of the first virtual object with respect to the second virtual object corresponding to a second distance, different from the first distance, of the first virtual object relative to the second virtual object during the movement of the first virtual object in the three-dimensional environment, the at least the portion of the second virtual object is displayed with a second magnitude, different from the first magnitude, of the second visual prominence. In some embodiments, in accordance with the first distance being greater than the second distance, the at least the portion of the second virtual object is displayed with a greater magnitude of the second visual prominence when the first virtual object is at the second distance relative to the second virtual object compared to when the first virtual object is at the first distance relative to the second virtual object (e.g., the closer the first virtual object is to the second virtual object in the three-dimensional environment during the movement of the first virtual object in the three-dimensional environment, the greater the magnitude of the second visual prominence the at least the portion of the second virtual object is displayed with). In some embodiments, as the first virtual object is moved toward a location corresponding to the second virtual object in the three-dimensional environment, the computer system increases the magnitude of the second visual prominence of the at least the portion of the second virtual object. In some embodiments, as the first virtual object is moved away from the location corresponding to the second virtual object in the three-dimensional environment, the computer system decreases the magnitude of the second visual prominence of the at least the portion of the second virtual object. Changing the magnitude of the visual prominence of a portion of a respective virtual object in a three-dimensional environment based on the spatial location of the virtual object with respect to the respective virtual object in the three-dimensional environment provides visual feedback to a user that moving the virtual object in the three-dimensional environment causes a spatial conflict with the respective virtual object, provides visual feedback to the user regarding how to resolve the spatial conflict (e.g., or one or more characteristics of the spatial conflict), and prevents the display of content that would otherwise not be viewable to the user based on the spatial conflict caused by the movement of the virtual object, thereby conserving computing resources and reducing errors in interaction.

In some embodiments, changing the visual prominence of the at least the portion of the second virtual object includes changing a size of the at least the portion of the second virtual object that is displayed with the reduced visual prominence relative to the three-dimensional environment, such as the change in size of portion 718*b* of second virtual object 704*b* during the movement of first virtual object 704*a* shown in FIGS. 7F-7I. In some embodiments, changing the size of the at least the portion of the second virtual object that is displayed with the reduced visual prominence relative to the three-dimensional environment includes changing the region of the second virtual object that is displayed with a different amount opacity, transparency, sharpness, brightness and/or color during the movement of the first virtual object in the three-dimensional environment. In some embodiments, in accordance with the first virtual object being a first distance relative to the second virtual object during the movement of the first virtual object in the three-dimensional environment, the at least the portion of the second virtual object is a first size relative to the three-dimensional environment. In some embodiments, in accordance with the first virtual object being a second distance, different from the first distance, relative to the second virtual object during the movement of the first virtual object in the three-dimensional environment, the at least the portion of the second virtual object is a second size, different from the first size, relative to the three-dimensional environment. In some embodiments, in accordance with the first distance being greater than the second distance, the second size of the at least the portion of the second virtual object is greater than the first size of the at least the portion of the second virtual object. In some embodiments, in accordance with the first virtual object spatially conflicting with the second virtual object in the three-dimensional environment (e.g., a location of the first virtual object during the movement of the first virtual object in the three-dimensional environment corresponds to the location of the second virtual object in the three-dimensional environment), the at least the portion of the second virtual object includes a maximum size (e.g., the at least the portion of the second virtual object includes the maximum magnitude of the second visual prominence). In some embodiments, as the first virtual object is moved toward a location corresponding to the second virtual object in the three-dimensional environment, the at least the portion of the second virtual object increases in size relative to the three-dimensional environment. In some embodiments, as the first virtual object is moved away from the location corresponding to the second virtual object in the three-dimensional environment, the at least the portion of the second virtual object decreases in size relative to the three-dimensional environment. Changing a size of a portion of a respective virtual object in a three-dimensional environment that is displayed with a reduced visual prominence based on the spatial location of a virtual object with respect to the respective virtual object in the three-dimensional environment provides visual feedback to a user that moving the virtual object in the three-dimensional environment causes a spatial conflict with the respective virtual object, provides visual feedback to the user regarding how to resolve the spatial conflict (e.g., or one or more characteristics of the spatial conflict), and prevents the display of content that would otherwise not be viewable to the user based on the spatial conflict caused by the movement of the virtual object, thereby conserving computing resources and reducing errors in interaction.

In some embodiments, while displaying the at least the portion of the second virtual object with a third visual prominence less than the first visual prominence relative to the three-dimensional environment while receiving the first input, the computer system detects termination of the first input, such as detecting user 712 ceasing to provide the input corresponding to movement of first virtual object 704*a* as shown in FIG. 7K. In some embodiments, the third visual prominence corresponds to a greater magnitude of the second visual prominence. For example, displaying the at least the portion of the second virtual object with the third visual prominence includes displaying the at least the portion of the second virtual object with a reduced amount of opacity, sharpness, brightness and/or color, and/or an increased amount of transparency compared to displaying the at least the portion of the second virtual object with the second visual prominence. In some embodiments, termination of the first input corresponds to the user ceasing to provide an air gesture (e.g., including one or more characteristics of the air gesture described with reference to step(s) 902). For example, the user ceases to perform an air pinch. In some embodiments, termination of the first input corresponds to the user ceasing to provide hand movement relative to the three-dimensional environment (e.g., while performing the air gesture). In some embodiments, termination of the first input corresponds to attention of the user no longer being directed to the first virtual object (e.g., gaze is directed to different location in the three-dimensional environment that does not correspond to first virtual object).

In some embodiments, in response to detecting the termination of the first input, the computer system reduces the visual prominence of the at least the portion of the second virtual object to a visual prominence less than the third visual prominence relative to the three-dimensional environment, such as the change in the size and/or transparency of portion 718*b* of second virtual object 704*b* in FIG. 7K compared to FIG. 7I. In some embodiments, displaying the at least the portion of the second virtual object with the visual prominence less than the third visual prominence includes displaying the at least the portion of the second virtual object with a greater amount of transparency compared to displaying the at least the portion of the second virtual object with the second visual prominence and/or the first visual prominence. In some embodiments, displaying the at least the portion of the second virtual object with the visual prominence less than the third visual prominence includes displaying the at least the portion of the second virtual object with a reduced amount of opacity, sharpness, brightness and/or color compared to displaying the at least the portion of the second virtual object with the second visual prominence and/or the first visual prominence. In some embodiments, displaying the at least the portion of the second virtual object with the visual prominence less than the third visual prominence includes displaying the at least the portion of the second virtual object with a greater size compared to the second visual prominence and the third visual prominence. In some embodiments, the visual prominence less than the third visual prominence relative to the three-dimensional environment corresponds to a maximum magnitude of the second visual prominence (e.g., the at least the portion of the second virtual object is displayed with a maximum size and/or with a maximum amount of transparency and/or with a minimum amount of opacity, sharpness, brightness and/or color). Changing the visual prominence of a portion of a respective virtual object in a three-dimensional environment after moving a virtual object with respect to a respective virtual object in the three-dimensional environment prevents the display of content that would otherwise not be viewable to the user based on a spatial conflict caused by the movement of the virtual object in the three-dimensional environment and allows continued interaction with the virtual object despite the spatial conflict, thereby conserving computing resources, reducing errors in interaction, and improving user device interaction.

In some embodiments, changing the visual prominence of the at least the portion of the second virtual object includes reducing a visual prominence of the at least the portion of the second virtual object as a distance between the first virtual object and the current viewpoint of the user increases in the three-dimensional environment during the movement of the first virtual object, such as the increase in size of portion 718*b* of second virtual object 704*b* as first virtual object 704*a* is moved to a greater distance relative to the current viewpoint of user 712 shown from FIG. 7F to FIG. 7G. In some embodiments, the first location in the three-dimensional environment is a first distance relative to the current viewpoint of the user in the three-dimensional environment, and the second location in the three-dimensional environment is a second distance, greater than the first distance, relative to the current viewpoint of the user in the three-dimensional environment (e.g., moving the first virtual object from the first location to the second location corresponds to moving the first virtual object to a greater distance relative to the current viewpoint of the user. In some embodiments, movement of the first virtual object from the first location to the second location includes increasing a distance of the first virtual object from the current viewpoint of the user while moving the first virtual object toward a location of the second virtual object in the three-dimensional environment (e.g., the second virtual object is located at a greater distance relative to the current viewpoint of the user compared to the first virtual object during the movement of the first virtual object). For example, as the first virtual object is moved from the first location to the second location, a respective distance of the first virtual object relative to the current viewpoint of the user becomes more similar in value to the distance of the second virtual object relative to the current viewpoint of the user. As the respective distance of the first virtual object relative to the current viewpoint of the user and the distance of the second virtual object relative to the current viewpoint of the user become more similar in value during the movement of the first virtual object, the visual prominence of the at least the portion of the second virtual object is optionally reduced by a greater amount (e.g., as the first virtual object is moved closer in depth to the second virtual object relative to the current viewpoint of the user, the visual prominence of the at least the portion of the second virtual object is reduced by a greater amount). In accordance with the first virtual object spatially conflicting (e.g., occupying the same location in the three-dimensional environment as) the second virtual object, the visual prominence of the at least the portion of the second virtual object is optionally reduced by a greatest amount. In some embodiments, the computer system reduces the visual prominence as the first virtual object is moved within a threshold distance of the second virtual object relative to the current viewpoint of the user (e.g., within 0.1, 0.5, 1, 2, 5 or 10 m of the second virtual object). In some embodiments, the computer system initiates reduction of the visual prominence of the at least the portion of the second virtual object once the first virtual object is within the threshold distance of the second virtual object (e.g., after being moved within the threshold distance of the second virtual object). For example, after the first virtual object is within the threshold distance of the second virtual object relative to the current viewpoint of the user, the first computer system increases the transparency and/or the size of the at least the portion of the second virtual object as the first virtual object is moved farther from the current viewpoint of the user toward the location of the second virtual object. In some embodiments, changing the visual prominence of the at least the portion of the second virtual object includes increasing a visual prominence of the at least the portion of the second virtual object as a distance between the first virtual object and the current viewpoint of the user decreases in the three-dimensional environment during the movement of the first virtual object. For example, movement of the first virtual object from the first location to the second location includes decreasing a distance of the first virtual object relative to the current viewpoint of the user while moving the first virtual object away from a location of the second virtual object in the three-dimensional environment. In some embodiments, as the first virtual object is moved away from the location of the second virtual object toward a location corresponding to the current viewpoint of the user, the transparency of the at least the portion of the second virtual object decreases (e.g., and/or the opacity, sharpness, brightness and/or color of the at least portion of the second virtual object increases) relative to the three-dimensional environment. In some embodiments, as the first virtual object is moved away from the location of the second virtual object toward a location corresponding to the current viewpoint of the user, the size of the at least the portion of the second virtual object decreases relative to the three-dimensional environment. Decreasing a visual prominence of a portion of a respective virtual object in a three-dimensional environment while moving a virtual object to a greater distance from a current viewpoint of a user provides visual feedback to a user that moving the virtual object to the greater distance in the three-dimensional environment causes a spatial conflict with the respective virtual object, provides visual feedback to the user regarding how to resolve the spatial conflict (e.g., or one or more characteristics of the spatial conflict), and prevents the display of content that would otherwise not be viewable to the user based on the spatial conflict caused by the movement of the virtual object, thereby conserving computing resources and reducing errors in interaction.

In some embodiments, changing the visual prominence of the at least the portion of the second virtual object includes increasing a visual prominence of the at least the portion of the second virtual object as a distance between the first virtual object and the current viewpoint of the user increases in the three-dimensional environment during the movement of the first virtual object, such as the decrease in size of portion 718*b* while first virtual object 704*b* is moved to a greater distance relative to the current viewpoint of user 712 shown from FIG. 7H to FIG. 7I. In some embodiments, movement of the first virtual object from the first location to the second location includes increasing a distance of the first virtual object from the current viewpoint of the user while moving the first virtual object away from a location of the second virtual object in the three-dimensional environment (e.g., the first virtual object is located at a greater distance relative to the current viewpoint of the user compared to the distance of the second virtual object relative to the current viewpoint of the user during the movement of the first virtual object). For example, as the first virtual object is moved from the first location to the second location, a respective distance of the first virtual object relative to the current viewpoint of the user becomes more different in value to the distance of the second virtual object relative to the current viewpoint of the user. As the respective distance of the first virtual object relative to the current viewpoint of the user becomes more different in value during the movement of the first virtual object, the at least the portion of the second virtual object is optionally increased by a greater amount (e.g., as the first virtual object is moved farther in depth to the second virtual object relative to the current viewpoint of the user, the visual prominence of the at least the portion of the second virtual object is increased by a greater amount). In some embodiments, the computer system increases the visual prominence of the at least the portion of the second virtual object as the first virtual object is moved within a threshold distance of the second virtual object relative to the current viewpoint of the user (e.g., within 0.1, 0.5, 1, 2, or 10 m of the second virtual object). In some embodiments, the computer system increases the visual prominence of the at least the portion of the second virtual object until the first virtual object is outside of the threshold distance to the second virtual object relative to the current viewpoint of the user. In some embodiments, changing the visual prominence of the at least the portion of the second virtual object includes reducing a visual prominence of the at least the portion of the second virtual object as a distance between the first virtual object and the current viewpoint of the user decreases in the three-dimensional environment during the movement of the first virtual object. For example, movement of the first virtual object from the first location to the second location includes decreasing a distance of the first virtual object relative to the current viewpoint of the user while moving the first virtual object toward a location of the second virtual object in the three-dimensional environment. In some embodiments, as the first virtual object is moved toward the location of the second virtual object (e.g., and toward a location corresponding to the current viewpoint of the user in the three-dimensional environment), the transparency of the at least the portion of the second virtual object increases (e.g., and/or the opacity, sharpness, brightness and/or color of the at least the portion of the second virtual object increases) relative to the three-dimensional environment. In some embodiments, as the first virtual object is moved toward the location of the second virtual object (e.g., and toward the location corresponding to the current viewpoint of the user in the three-dimensional environment), the size of the at least the portion of the second virtual object increases relative to the three-dimensional environment. Increasing a visual prominence of a portion of a respective virtual object in a three-dimensional environment while moving a virtual object to a greater distance from a current viewpoint of a user provides visual feedback to a user that moving the virtual object to the greater distance in the three-dimensional environment causes a spatial conflict with the respective virtual object and provides visual feedback to the user regarding how to resolve the spatial conflict (e.g., or one or more characteristics of the spatial conflict), thereby reducing errors in interaction.

In some embodiments, changing the visual prominence of the at least the portion of the second virtual object includes decreasing a visual prominence of the at least the portion of the second virtual object as a distance between the first virtual object and the current viewpoint of the user increases in the three-dimensional environment during a first portion of the movement of the first virtual object (e.g., the increase in size of portion 718*b* of second virtual object 704*b* as first virtual object 704*a* is moved to a greater distance relative to the current viewpoint of user 712 shown from FIG. 7F to FIG. 7G) and, after the first portion of the movement of the first virtual object and after decreasing the visual prominence of the at least the portion of the second virtual object, increasing a visual prominence of the at least the portion of the second virtual object as the distance between the first virtual object and the current viewpoint of the user increases in the three-dimensional environment during a second portion of the movement of the first virtual object (e.g., the decrease in size of portion 718*b* while first virtual object 704*b* is moved to a greater distance relative to the current viewpoint of user 712 shown from FIG. 7H to FIG. 7I).

In some embodiments, the first portion of the movement of the first virtual object corresponds moving the first virtual object toward a location in the three-dimensional environment corresponding to the second virtual object while concurrently increasing the distance of the first virtual object relative to the current viewpoint of the user (e.g., the first location in the three-dimensional environment is a location that is closer to the current viewpoint of the user than the second virtual object, and the first portion of the movement of the first virtual object includes movement from the first location to the location of the second virtual object in the three-dimensional environment), such as shown by the movement of first virtual object 704*a* toward second virtual object 704*b* in FIGS. 7E-7G. In some embodiments, the visual prominence of the at least the portion of the second virtual object is decreased while the computer system continues to receive movement input (e.g., through hand movement and/or an air gesture relative to the three-dimensional environment) corresponding to movement of the first virtual object in a first direction in the three-dimensional environment (e.g., movement in the first direction in the three-dimensional environment corresponds to movement in a direction away from the current viewpoint of the user relative to the three-dimensional environment). In some embodiments, decreasing the visual prominence of the at least the portion of the second virtual object as a distance between the first virtual object and the current viewpoint of the user increases in the three-dimensional environment includes one or more characteristics of decreasing the visual prominence of the at least the portion of the second virtual object as a distance between the first virtual object and the current viewpoint of the user increases in the three-dimensional environment as described above. In some embodiments, the first portion of the movement of the first virtual object corresponds to moving the first virtual object toward a location in the three-dimensional environment corresponding to the second virtual object while concurrently decreasing the distance of the first virtual object relative to the current viewpoint of the user (e.g., the first location in the three-dimensional environment is a location that is farther from the current viewpoint of the user than the second virtual object, and the first portion of the movement of the first virtual object includes movement from the first location to the location of the second virtual object in the three-dimensional environment). In some embodiments, the visual prominence of the at least the portion of the second virtual object is decreased while the computer system continues to receive movement input (e.g., through hand movement and/or an air gesture relative to the three-dimensional environment) corresponding to movement of the first virtual object in a second direction in the three-dimensional environment (e.g., movement in the second direction in the three-dimensional environment corresponds to movement in a direction toward the current viewpoint of the user relative to the three-dimensional environment). In some embodiments, the computer system decreases the visual prominence of the at least the portion of the second virtual object as the distance between the first virtual object and the current viewpoint of the user decreases in the three-dimensional environment (e.g., including one or more characteristics of decreasing the visual prominence of the at least the portion of the second virtual object as the distance between the first virtual object and the current viewpoint of the user decreases as described above).

In some embodiments, the second portion of the movement of the first virtual object corresponds to a continuation of the first portion of the movement of the first virtual object (e.g., the first virtual object continues to be moved in the same direction in the three-dimensional environment), such as shown by the movement of first virtual object 704*a* in FIGS. 7H-7J. In some embodiments, the second portion of the movement of the first virtual object corresponds to moving the first virtual object away from a location in the three-dimensional environment corresponding to the second virtual object while concurrently increasing the distance of the first virtual object relative to the current viewpoint of the user (e.g., the second location in the three-dimensional environment is a location that is farther from the current viewpoint of the user than the second virtual object, and the second portion of the movement of the first virtual object includes movement from the location of the second virtual object to the second location in the three-dimensional environment). In some embodiments, increasing the visual prominence of the at least the portion of the second virtual object as the distance between the first virtual object and the current viewpoint of the user increases in the three-dimensional environment includes one or more characteristics of increasing the visual prominence of the at least the portion of the second virtual object as the distance between the first virtual object and the current viewpoint of the user increases in the three-dimensional environment as described above. In some embodiments, the second portion of the movement of the first virtual object corresponds to moving the first virtual object away from a location in the three-dimensional environment corresponding to the second virtual object while concurrently decreasing the distance of the first virtual object relative to the current viewpoint of the user (e.g., the second location in the three-dimensional environment is a location that is closer to the current viewpoint of the user than the second virtual object, and the second portion of the movement of the first virtual object includes movement from the location of the second virtual object to the second location in the three-dimensional environment). In some embodiments, the computer system increases the visual prominence of the at least the portion of the second virtual object as the distance between the first virtual object and the current viewpoint of the user decreases in the three-dimensional environment during the second portion of the movement of the first virtual object (e.g., including one or more characteristics of increasing the visual prominence of the at least the portion of the second virtual object as the distance between the first virtual object and the current viewpoint of the user decreases in the three-dimensional environment during the movement of the first virtual object as described above). Changing a visual prominence of a portion of a respective virtual object in a three-dimensional environment while moving a virtual object to a greater distance from a current viewpoint of a user provides visual feedback to a user that moving the virtual object to the greater distance in the three-dimensional environment causes a spatial conflict with the respective virtual object, provides visual feedback to the user regarding how to resolve the spatial conflict (e.g., or one or more characteristics of the spatial conflict), and prevents the display of content that would otherwise not be viewable to the user based on the spatial conflict caused by the movement of the virtual object, thereby conserving computing resources and reducing errors in interaction.

In some embodiments, while displaying the first virtual object and the second virtual object in the three-dimensional environment, the computer system displays a third virtual object in the three-dimensional environment (e.g., such as third virtual object 704*g* shown in FIG. 7N), wherein the third virtual object does not spatially conflict with the first virtual object and the second virtual object. In some embodiments, the third virtual object has one or more characteristics of the first virtual object and/or the second virtual object described above. In some embodiments, a location of the third virtual object does not correspond to a location of the first virtual object or the second virtual object in the three-dimensional environment (e.g., from the current viewpoint of the user).

In some embodiments, while displaying the first virtual object, the second virtual object, and the third virtual object in the three-dimensional environment, the computer system detects a second input corresponding to a request to change a location of the first virtual object in the three-dimensional environment from the second location to a third location, such as the input directed to first virtual object 704*e* shown and described with reference to FIG. 7N. In some embodiments, the second input corresponding to the request to change the location of the first virtual object in the three-dimensional environment from the second location to the third location has one or more characteristics of the first input corresponding to the request to change the location of the first virtual object in the three-dimensional environment from the first location to the second location.

In some embodiments, in response to receiving the second input, and while the second virtual object spatially conflicts with at least a first portion of the first virtual object, and the third virtual object spatially conflicts with at least a second portion of the first virtual object relative to the current viewpoint of the user (e.g., such as the spatial conflicts shown between first virtual object 704*e* and second virtual object 704*f* and first virtual object 704*e* and third virtual object 704*g* in FIG. 7N), the computer system reduces a visual prominence of at least a portion of the second virtual object from the first visual prominence to a third visual prominence relative to the three-dimensional environment that is lower than the first visual prominence, such as shown by the visual prominence of second virtual object 704*f* in FIG. 7N).

In some embodiments, movement of the first virtual object while receiving the second input causes the second virtual object to spatially conflict with the at least the first portion of the first virtual object and the third virtual object to spatially conflict with the at least the second portion of the first virtual object relative to the current viewpoint of the user. In some embodiments, the second virtual object spatially conflicting with the at least the first portion of the first virtual object has one or more characteristics of the second virtual object spatially conflicting with the at least the portion of the first virtual object as described with reference to step(s) 902. In some embodiments, the third virtual object spatially conflicting with the at least the second portion of the first virtual object has one or more characteristics of the second virtual object spatially conflicting with the at least the portion of the first virtual object as described with reference to step(s) 902.

In some embodiments, the third visual prominence has one or more characteristics of the second visual prominence as described above. In some embodiments, reducing the visual prominence of the at least the portion of the second virtual object from the first visual prominence to the third visual prominence includes one or more characteristics of reducing the visual prominence of the at least the portion of the second virtual object from the first visual prominence to the second visual prominence as described with reference to step(s) 902. In some embodiments, the computer system reduces the visual prominence of the at least the portion of the second virtual object independent of reducing the visual prominence of the at least the portion of the third virtual object (e.g., the computer system reduces the visual prominence of the at least the portion of the second virtual object based on the spatial conflict between the first virtual object and the second virtual object and not based on the spatial conflict between the first virtual object and the third virtual object).

In some embodiments, the computer system reduces a visual prominence of at least a portion of the third virtual object from the first visual prominence to a fourth visual prominence relative to the three-dimensional environment that is lower than the first visual prominence, such as shown by the visual prominence of third virtual object 704*g* in FIG. 7N. In some embodiments, the fourth visual prominence has one or more characteristics of the second visual prominence as described above (e.g., with reference to step(s) 902). In some embodiments, the at least the portion of the third virtual object has one or more characteristics of the at least the portion of the second virtual object as described above (e.g., with reference to step(s) 902). In some embodiments, reducing the visual prominence of the at least the portion of the second virtual object from the first visual prominence to the fourth visual prominence includes one or more characteristics of reducing the visual prominence of the at least the portion of the second virtual object from the first visual prominence to the second visual prominence as described with reference to step(s) 902. In some embodiments, the computer system reduces the visual prominence of the at least the portion of the third virtual object independent of reducing the visual prominence of the at least the portion of the second virtual object (e.g., the computer system reduces the visual prominence of the at least the portion of the third virtual object based on the spatial conflict between the first virtual object and the third virtual object and not based on the spatial conflict between the first virtual object and the second virtual object).

In some embodiments, the computer system changes the visual prominence of the at least the portion of the second virtual object relative to the three-dimensional environment based on a change in the spatial location of the first virtual object with respect to the second virtual object during the movement of the first virtual object in the three-dimensional environment, such as shown by the display of portion 724*a* with the greater amount of transparency in FIG. 7O. In some embodiments, changing the visual prominence of the at least the portion of the second virtual object relative to the three-dimensional environment includes one or more characteristics of changing the visual prominence of the at least the portion of the second virtual object relative to the three-dimensional environment as described above (e.g., with reference to step(s) 902). In some embodiments, the computer system changes the visual prominence of the at least the portion of the second virtual object independent of changing the visual prominence of the at least the portion of the third virtual object (e.g., the computer system changes the visual prominence of the at least the portion of the second virtual object based on the change in the spatial location of the first virtual object with respect to the second virtual object during the movement of the first virtual object and not based on the change in spatial location of the first virtual object with respect to the third virtual object during the movement of the first virtual object).

In some embodiments, the computer system changes the visual prominence of the at least the portion of the third virtual object relative to the three-dimensional environment based on a change in the spatial location of the first virtual object with respect to the third virtual object during the movement of the first virtual object in the three-dimensional environment, such as shown by the display of portion 724*b* with the greater amount of transparency in FIG. 7O. In some embodiments, changing the visual prominence of the at least the portion of the third virtual object relative to the three-dimensional environment includes one or more characteristics of changing the visual prominence of the at least the portion of the second virtual object relative to the three-dimensional environment as describe above (e.g., with reference to step(s) 902). In some embodiments, the computer system changes the visual prominence of the at least the portion of the third virtual object independent of changing the visual prominence of the at least the portion of the second virtual object (e.g., the computer system changes the visual prominence of the at least the portion of the third virtual object based on the change in the spatial location of the first virtual object with respect to the third virtual object during the movement of the first virtual object and not based on the change in spatial location of the first virtual object with respect to the second virtual object during the movement of the first virtual object). Changing the visual prominence of a plurality of portions of a plurality of respective virtual objects in a three-dimensional environment based on the spatial location of a virtual object with respect to the plurality of respective virtual objects in the three-dimensional environment provides visual feedback to a user that moving the virtual object in the three-dimensional environment cause one or more spatial conflicts with the plurality of respective virtual objects, provides visual feedback to the user regarding how to resolve the one or more spatial conflicts (e.g., or one or more characteristics of the one or more spatial conflicts), and prevents the display of content that would otherwise not be viewable to the user based on the one or more spatial conflicts caused by the movement of the virtual object, thereby conserving computing resources and reducing errors in interaction.

In some embodiments, reducing the visual prominence of the at least the portion of the second virtual object to the second visual prominence relative to the three-dimensional environment includes, ceasing to display a first portion of the at least the portion of the second virtual object in the three-dimensional environment (e.g., such as the portion of second virtual object 704*b* that ceases to be displayed by computer system 101 in FIG. 7G), wherein the first portion of the at least the portion of the second virtual object has a first size that corresponds to a relative size of the at least the portion of the first virtual object, and displaying a second portion of the at least the portion of the second virtual object with a greater amount of transparency compared to displaying the second portion of the at least the portion of the second virtual object with the first visual prominence relative to the three-dimensional environment (e.g., portion 718*b* of second virtual object 704*b* as shown in FIG. 7G), wherein the second portion of the at least the portion of the second virtual object at least partially surrounds a perimeter of the first portion of the at least the portion of the second virtual object, such as shown by portion 718*b* surrounding the perimeter of the portion of second virtual object 704*b* the computer system 101 ceases to display in three-dimensional environment 702 in FIG. 7G.

In some embodiments, the first portion of the at least the portion of the second virtual object corresponds to a portion of the second virtual object that overlaps the first virtual object relative to the current viewpoint of the user, such as the portion of second virtual object 704*b* that ceases to be displayed in three-dimensional environment 702 in FIG. 7G. In some embodiments, the first portion of the at least the portion of the second virtual object spatially conflicts with the at least the portion of the first virtual object. In some embodiments, after ceasing to display the first portion of the at least the portion of the second virtual object in the three-dimensional environment, the at least the portion of the first virtual object is visible in the three-dimensional environment from the current viewpoint of the user. In some embodiments, changing the visual prominence of the at least the portion of the second virtual object includes changing a size of the at least the first portion of the at least the portion of the second virtual object relative to the three-dimensional environment based on the spatial location of the first virtual object with respect to the second virtual object. In some embodiments, the size of the at least the first portion of the at least the portion of the second virtual object expands relative to the three-dimensional environment as the distance of the first virtual object increases relative to the current viewpoint of the user during the movement of the first virtual object. In some embodiments, the size of the at least the first portion of the at least the portion of the second virtual object reduces relative to the three-dimensional environment as the distance of the first virtual object increases relative to the current viewpoint of the user during the movement of the first virtual object. In some embodiments, the size of the at least the first portion of the at least the portion of the second virtual object reduces relative to the three-dimensional environment as the distance of the first virtual object decreases relative to the current viewpoint of the user during the movement of the first virtual object. In some embodiments, the size of the at least the portion of the at least the portion of the second virtual object increases relative to the three-dimensional environment as the distance of the first virtual object decreases relative to the current viewpoint of the user during the movement of the first virtual object.

In some embodiments, the second portion of the at least the portion of the second virtual object is displayed with 10, 20, 25, 30, 40, 50, 60, 70, 75, 80, 90, 95 or 100 percent more transparency compared to displaying the second portion of the at least the portion of the second virtual object with the first visual prominence. In some embodiments, the second portion of the at least the portion of the second virtual object has one or more characteristics of the second portion of the respective portion of the respective virtual object as described with reference to method 800. In some embodiments, displaying the second portion of the at least the portion of the second virtual object with the greater amount of transparency compared to displaying the second portion of the at least the portion of the second virtual object with the first visual prominence includes one or more characteristics of displaying a second portion of the respective portion of the respective virtual object with a greater amount of transparency compared to displaying the second portion of the respective portion of the respective virtual object with the first visual prominence as described with reference to method 800. Ceasing to display a first portion of a virtual object and displaying a second portion of the virtual object that surrounds the first portion with increased transparency in a three-dimensional environment while at least a portion of a respective virtual object spatially conflicts with the first portion of the virtual object relative to a current viewpoint of a user permits continued interaction with the respective virtual object despite the spatial conflict between the virtual object and the respective virtual object despite the spatial conflict between the virtual object and the respective virtual object and improves the continued interaction by displaying content associated with the virtual object that would otherwise be directly adjacent to the at least the portion of the respective virtual object (e.g., because the second portion of the virtual object surrounds the at least the portion of the respective virtual object from the current viewpoint of the user) as transparent relative to the current viewpoint of the user, thereby improving user device interaction.

In some embodiments, changing the visual prominence of the at least the portion of the second virtual object relative to the three-dimensional environment based on the change in the spatial location of the first virtual object with respect to the second virtual object includes redisplaying the first portion of the at least the portion of the second virtual object in the three-dimensional environment and ceasing to display a third portion, different from the first portion, of the at least the portion of the second virtual object in the three-dimensional environment based on a change in the spatial conflict of the second virtual object with the first virtual object during the movement of the first virtual object in the three-dimensional environment, such as changing the portion of second virtual object 704*b* that ceases to be displayed in three-dimensional environment 702 in FIG. 7H compared to FIG. 7G, and displaying a fourth portion, different from the third portion, of the at least the portion of the second virtual object with a greater amount of transparency compared to displaying the fourth portion of the at least the portion of the second virtual object with the first visual prominence relative to the three-dimensional environment, wherein the fourth portion of the at least the portion of the second virtual object at least partially surrounds a perimeter of the third portion of the at least the portion of the second virtual object, such as shown by the change in portion 718*b* in FIG. 7H compared to FIG. 7G.

In some embodiments, the change in the spatial conflict of the second virtual object with the first virtual object during the movement of the first virtual object in the three-dimensional environment corresponds to a change in the size of overlap between the second virtual object and the at least the portion of the first virtual object relative to the current viewpoint of the user, such as the change in the size of overlap shown between first virtual object 704*a* and second virtual object 704*b* in FIGS. 7G-7H. For example, during the movement of the first virtual object in the three-dimensional environment, the region of overlap between the second virtual object and the at least the portion of the first virtual object changes (e.g., increases or decreases) relative to the current viewpoint of the user. For example, the first virtual object is moved laterally and/or vertically relative to the current viewpoint of the user (e.g., causing the first virtual object to overlap a different region of the second virtual object relative to the current viewpoint of the user). For example, the first virtual object is moved to a location in the three-dimensional environment corresponding to a different distance (e.g., depth) from the current viewpoint of the user (e.g., causing the display of the first virtual object to overlap a different display region of the second virtual object relative to the current viewpoint of the user). In some embodiments, in accordance with the region of overlap between the second virtual object and the at least the portion of the first virtual object changing, the size of the portion of the at least the portion of the second virtual object that the computer system ceases to display changes (e.g., based on the change in the region of overlap between the second virtual object and the at least the portion of the first virtual object relative to the current viewpoint of the user). In some embodiments, the third portion of the at least the portion of the second virtual object has one or more characteristics of the first portion of the at least the portion of the second virtual object as described above. In some embodiments, the third portion of the at least the portion of the second virtual object and the first portion of the at least the portion of the second virtual object at least partially overlap relative to the current viewpoint of the user (e.g., a region of the second virtual object is included in both the first portion of the at least the portion of the second virtual object and the third portion of the at least the portion of the second virtual object). In some embodiments, the third portion of the at least the portion of the second virtual object do not overlap relative to the current viewpoint of the user.

In some embodiments, the fourth portion (e.g., portion 718*b* shown in FIG. 7H) of the at least the portion of the second virtual object has one or more characteristics of the second portion of the at least the portion of the second virtual object as described above. In some embodiments, displaying the fourth portion of the at least the portion of the second virtual object with the greater amount of transparency compared to displaying the fourth portion of the at least the portion of the second virtual object with the first visual prominence includes one or more characteristics of displaying the second portion of the at least the portion of the second virtual object with the greater amount of transparency compared to displaying the second portion of the at least the portion of the second virtual object with the first visual prominence as described above. In some embodiments, the size of the fourth portion of the at least the portion of the second virtual object is based on the change in the spatial conflict of the second virtual object (e.g., because the fourth portion of the at least the portion of the second virtual object surrounds the perimeter of the third portion of the at least the portion of the second virtual object, and ceasing to display the third portion of the at least the portion of the second virtual object is based on the change in the spatial conflict of the second virtual object with the first virtual object. Changing a first portion of a virtual object that ceases to be displayed in a three-dimensional environment and a second portion of the virtual object that surrounds the first portion and has increased transparency based on a change in spatial conflict of at least a portion of a respective virtual object with respect to the virtual object permits continued interaction with the respective virtual object despite the change in spatial conflict between the respective virtual object and the virtual object and improves the continued interaction by displaying content associated with the virtual object that would otherwise be adjacent to the at least the portion of the respective virtual object as transparent relative to the current viewpoint of the user, thereby improving user device interaction.

In some embodiments, the at least the portion of the second virtual object at least partially surrounds a perimeter of the at least the portion of the first virtual object relative to the current viewpoint of the user, such as shown by portion 718*b* of second virtual object 704*b* surrounding the perimeter of the portion of first virtual object 704*a* that overlap second virtual object 704*b* in FIG. 7G. In some embodiments, changing the visual prominence of the at least the portion of the second virtual object includes changing the transparency of the at least the portion of the second virtual object that at least partially surrounds the perimeter of the at least the portion of the first virtual object relative to the current viewpoint of the user has one or more characteristics of displaying the second portion of the at least the portion of the second virtual object with the greater amount of transparency compared to displaying the second portion of the at least the portion of the second virtual object with the first visual prominence relative to the three-dimensional environment as described above. In some embodiments, different regions of the at least the portion of the second virtual object are displayed with different amounts of transparency (e.g., based on a distance of a respective region of the at least the portion of the second virtual object with respect to the perimeter of the at least the portion of the first virtual object). For example, a first region of the at least the portion of the second virtual object is displayed with a greater amount of transparency compared to a second region of the at least the portion of the second virtual object that is a greater distance from the at least the portion of the first virtual object relative to the current viewpoint of the user. In some embodiments, the amount of transparency of the at least the portion of the second virtual object relative to the three-dimensional environment decreases (e.g., gradually) from the perimeter of the at least the portion of the first virtual object. In some embodiments, the at least the portion of the second virtual object appears to have a feathering effect from the perimeter of the at least the portion of the first virtual object relative to the current viewpoint of the user. In some embodiments, a size of the at least the portion of the second virtual object (e.g., a displayed thickness of the at least the portion of the second virtual object extending from the perimeter of the at least the portion of the first virtual object) changes based on the spatial location of the first virtual object with respect to the second virtual object relative to the current viewpoint of the user. For example, in accordance with the spatial location of the first virtual object with respect to the second virtual object relative to the current viewpoint of the user being associated with a first distance, the at least the portion of the second virtual object is displayed with a first size, and in accordance with the spatial location of the first virtual object with respect to the second virtual object being a second distance, different from the first distance, the at least the portion of the second virtual object is displayed with a second size, different from the first size. In some embodiments, in accordance with the first distance being greater than the second distance, the second size of the at least the portion of the second virtual object is larger compared to the first size of the at least the portion of the second virtual object relative to the current viewpoint of the user. In some embodiments, in accordance with the second distance being greater than the first distance, the first size of the at least the portion of the second virtual object is larger compared to the second size of the at least the portion of the second virtual object relative to the current viewpoint of the user. Changing the visual prominence of a portion of a respective virtual object in a three-dimensional environment that surrounds a portion of a virtual object based on the spatial location of the virtual object with respect to the respective virtual object in the three-dimensional environment provides visual feedback to a user that moving the virtual object in the three-dimensional environment causes a spatial conflict with the respective virtual object, provides visual feedback to the user regarding how to resolve the spatial conflict (e.g., or one or more characteristics of the spatial conflict), prevents the display of content that would otherwise be directly adjacent to the portion of the respective virtual object (e.g., because the at least the portion of the virtual object surrounds the at least the portion of the virtual object from the current viewpoint of the user), thereby conserving computing resources and reducing errors in interaction.

In some embodiments, while reducing the visual prominence of the at least the portion of the second virtual object, the computer system displays the first virtual object at a first distance in the three-dimensional environment from the current viewpoint of the user and the second virtual object at a second distance in the three-dimensional environment, greater than the first distance, from the current viewpoint of the user, such as shown by the distance of first virtual object 704*a* from the current viewpoint of user 712 compared to the distance of second virtual object 704*b* from the current viewpoint of user 712 as shown in FIG. 7F. In some embodiments, while reducing the visual prominence of the at least the portion of the second virtual object, the computer system displays the first virtual object at a third distance in the three-dimensional environment from the current viewpoint of the user and the second virtual object at a fourth distance in the three-dimensional environment, less than the third distance, from the current viewpoint of the user. In some embodiments, changing the visual prominence of the at least the portion of the second virtual object relative to the three-dimensional environment based on the change in a spatial location of the first virtual object with respect to the second virtual object includes changing the visual prominence of the at least the portion of the second virtual object while displaying the first virtual object at one or more respective distances relative to the current viewpoint of the user during the movement of the first virtual object in the three-dimensional environment less than a distance of the second virtual object relative to the current viewpoint of the user. In some embodiments, changing the visual prominence of the at least the portion of the second virtual object relative to the three-dimensional environment based on the change in spatial location of the first virtual object with respect to the second virtual object includes changing the visual prominence of the at least the portion of the second virtual object with displaying the first virtual object at one or more respective distances greater than a distance of the second virtual object relative to the current viewpoint of the user. In some embodiments, the computer system reduces the visual prominence in accordance with the difference between the second distance relative to the current viewpoint of the user and the first distance relative to the current viewpoint of the user being less than a threshold amount (e.g., 0.01, 0.02, 0.05, 0.1, 0.2, 0.5, 1, 2, 5, or 10 meters). For example, if the difference between the first distance and the second distance is less than the threshold amount, the computer system reduces the visual prominence of the at least the portion of the second virtual object. In some embodiments, the visual prominence of the at least the portion of the second virtual object is changed while the first virtual object is within a threshold distance (e.g., 0.01, 0.02, 0.05, 0.1, 0.2, 0.5, 1, 2, 5, or 10 meters) relative to the second virtual object in the three-dimensional environment, whether behind or in front of the second virtual object (e.g., in accordance with the first virtual object being within the threshold distance relative to the second virtual object in the three-dimensional environment, the computer system reduces the visual prominence of the at least the portion of the second virtual object, and in accordance with the first virtual object not being within the threshold distance relative to the second virtual object in the three-dimensional environment, the computer system forgoes reducing the visual prominence of the at least the portion of the second virtual object). Changing the visual prominence of a portion of a respective virtual object displayed in a three-dimensional environment at a location closer to a current viewpoint of a user compared to a virtual object based on the spatial location of the virtual object with respect to the respective virtual object in the three-dimensional environment provides visual feedback to a user that moving the virtual object in the three-dimensional environment causes a spatial conflict with the respective virtual object, provides visual feedback to the user regarding how to resolve the spatial conflict, and prevent the display of content that would otherwise not be viewable to the user based on the spatial conflict caused by the movement of the virtual object, thereby conserving computing resources and reducing errors in interaction.

In some embodiments, after receiving the first input, the computer system detects a second input directed to the second virtual object (e.g., such as the input shown and described with reference to FIG. 7C). In some embodiments, directing the second input to the second virtual object includes directing attention to the second virtual object. For example, the user directs gaze to the second virtual object (e.g., optionally for a threshold period of time (e.g., 0.1, 0.2, 0.5, 1, 2, 5 or 10 second(s))). In some embodiments, the user performs an air gesture (e.g., optionally toward a direction of the second virtual object in the three-dimensional environment and optionally while concurrently directing gaze to the second virtual object). For example, the air gesture is an air tap, air pinch, air drag, and/or air long pinch (e.g., an air pinch for a duration of time (e.g., 0.1, 0.5, 1, 2, 5 or 10 seconds)). In some embodiments, performing the air gesture and directing gazes to the second virtual object corresponds to selection of the second virtual object in the three-dimensional environment. In some embodiments, the second input corresponds to attention directed to a location in the three-dimensional environment corresponding to empty space in the three-dimensional environment (e.g., as described with reference to method 800). In some embodiments, the second input corresponds to selection of the second virtual object made through a touch input on a touch-sensitive surface (e.g., a trackpad or a touch-sensitive display in communication with the computer system), an audio input (e.g., a voice command), or an input provided through a mouse and/or keyboard in communication with the computer system.

In some embodiments, in response to detecting the second input, the computer system displays the at least the portion of the second virtual object with the first visual prominence relative to the three-dimensional environment, such as the visual prominence of second virtual object 704*b* shown in FIG. 7D. In some embodiments, displaying the at least the portion of the second virtual object with the first visual prominence includes changing the display of the at least the portion of the second virtual object from the second visual prominence (e.g., or from a visual prominence greater or less than the second visual prominence based on the spatial location of the first virtual object relative to the second virtual object during the movement of the first virtual object) to the first visual prominence. In some embodiments, displaying the at least the portion of the second virtual object with the first visual prominence relative to the three-dimensional environment includes one or more characteristics of displaying the second virtual object with the first visual prominence relative to the three-dimensional environment as described with reference to step(s) 902. In some embodiments, in response to detecting the second input, the entire second virtual object (e.g., including the at least the portion of the second virtual object) is displayed with the first visual prominence (e.g., the computer system maintains display of a respective portion of the second virtual object different from the at least the portion of the second virtual object with the first visual prominence).

In some embodiments, the computer system displays at least a portion of the first virtual object with a third visual prominence, less than the first visual prominence, relative to the three-dimensional environment, such as the visual prominence of first virtual object 704*a* shown in FIG. 7D. In some embodiments, displaying the at least the portion of the second virtual object with the first visual prominence relative to the three-dimensional environment and displaying the at least the portion of the first virtual object with the third visual prominence relative to the three-dimensional environment in response to detecting the second input includes one or more characteristics of displaying the respective portion of the second virtual object with the first visual prominence relative to the three-dimensional environment and displaying the respective portion of the first virtual object with the second visual prominence relative to the three-dimensional environment in response to detecting the second input as described with reference to method 800. In some embodiments, the computer system displays the at least the portion of the second virtual object with the first visual prominence relative to the three-dimensional environment and the at least the portion of the first virtual object with the third visual prominence relative to the three-dimensional environment in accordance with a determination that at least the portion of the first virtual object overlaps the second virtual object by more than a threshold amount (e.g., including one or more characteristics of the threshold amount described with reference to step(s) 802 in method 800) from the current viewpoint of the user (e.g., as described with reference to displaying the respective portion of the second virtual object with the first visual prominence relative to the three-dimensional environment and the respective portion of the first virtual object with the second visual prominence relative to the three-dimensional environment in method 800). In some embodiments, the third visual prominence has one or more characteristics of the second visual prominence. For example, displaying the at least the portion of the first virtual object with the third visual prominence includes displaying the at least the portion of the first virtual object with less than 100 percent opacity, and/or displayed with a greater amount of transparency, reduced brightness, reduced sharpness and/or less color and/or saturation compared to displaying the at least the portion of the first virtual object with the first visual prominence. In some embodiments, the at least the portion of the first virtual object has one or more characteristics of the at least the portion of the second virtual object. For example, the at least the portion of the first virtual object includes a portion of the first virtual object within a threshold distance of (e.g., 0.5, 1, 2, 5, 10, 20, 25, 30, 35, 40, 45, 50 or 100 cm of) a perimeter of the at least the portion of the second virtual object relative to the current viewpoint of the user (e.g., the at least the portion of the first virtual object displayed with the second visual prominence is displayed with a feathered appearance from the at least the portion of second virtual object relative to the current viewpoint of the user. In some embodiments, the at least the portion of the first virtual object includes a portion of the first virtual object that visually obscures the at least the portion of the second virtual object relative to the current viewpoint of the user. In some embodiments, the at least the portion of the first virtual object that is visually obscured by the portion of the at least the portion of the first virtual object is visible from the current viewpoint of the user (e.g., because the portion of the at least the portion of the first virtual that visually obscures the at least the portion of the second virtual object is displayed with a reduced visual prominence (e.g., the third visual prominence) compared to the first visual prominence). In some embodiments, while displaying the at least the portion of the first virtual object with the third visual prominence, the first virtual object is displayed at a location in the three-dimensional environment at a greater distance from the current viewpoint of the user compared to the second virtual object. In some embodiments, while displaying the at least the portion of the first virtual object with the third prominence, the second virtual object is displayed at a location in the three-dimensional environment at a greater distance from the current viewpoint of the user compared to the first virtual object. Displaying a portion of a virtual object with less visual prominence in a three-dimensional environment when there is a spatial conflict between the at least the portion of the virtual object and a respective virtual object in response to a user input directed to the respective virtual object permits interaction with the respective virtual object that a user directs their attention to despite the spatial conflict, thereby improving user device interaction.

It should be understood that the particular order in which the operations in method 900 have been described is merely exemplary and is not intended to indicate that the described order is the only order in which the operations could be performed. One of ordinary skill in the art would recognize various ways to reorder the operations described herein.

FIGS. 10A-10N illustrate examples of a computer system applying a visual effect to a real-world object when a passthrough visibility event associated with the real-world object is detected while the computer system is displaying virtual content that is associated with the visual effect (e.g., when a real-world object moves into the field of view of the computer system, for example, or when a spatial conflict between a real-world object and the virtual content is detected).

FIG. 10A illustrates a computer system (e.g., an electronic device) 101 that is presenting (e.g., displaying or otherwise making visible, such as via optical passthrough), via a display generation component (e.g., display generation component 120 of FIG. 1), a three-dimensional environment 1002 from a viewpoint of a user (e.g., user 1010) of the computer system 101 (e.g., facing the back wall of the physical environment in which computer system 101 is located). In some embodiments, computer system 101 includes a display generation component (e.g., a touch screen), a plurality of image sensors (e.g., image sensors 314 of FIG. 3), and one or more physical or solid-state buttons 1003. The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces (e.g., virtual environments and/or other virtual content) illustrated and described below could also be implemented on a head-mounted display that includes a display generation component that displays the user interface or three-dimensional environment to the user, and sensors to detect the physical environment and/or movements of the user's hands (e.g., external sensors facing outwards from the user), and/or attention (e.g., gaze) of the user (e.g., internal sensors facing inwards towards the face of the user).

In the example of FIG. 10A, the computer system 101 displays, in the three-dimensional environment 1002, virtual content that includes a virtual object 1006*a* and a first virtual environment 1020*a*. Virtual object 1006*a* optionally corresponds to a virtual application window, virtual media content, or other type of virtual content described with reference to method 1100. In the example of FIG. 10A, the first virtual environment 1020*a* is displayed at a first immersion level (e.g., an immersion level such as described with reference to method 1300) that is less than 100% immersion (e.g., such that the first virtual environment 1020*a* does not obscure all of the physical environment in the field of view of the computer system 101). For example, a portion of representation of a physical environment 1008 is visible in the three-dimensional environment 1002 and another portion of representation of the physical environment is obscured by the first virtual environment 1020*a* and/or by the first virtual object 1006*a* (e.g., is not visible). The representation of the physical environment 1008 includes a representation of a table 1004 (e.g., a representation of real-world table). Overhead view 1014 depicts spatial relationships between various elements in three-dimensional environment 1002 relative to a user 1010 (e.g., when user 1010 is holding or wearing computer system 101 such that computer system 101 has the same or similar field of view as user 1010).

In FIG. 10A, a representation of real-world (physical) object, representation of table 1004, is visible within the physical environment 1008. Optionally, first virtual environment 1020*a*, physical environment 1008, and/or representation of table 1004 are presented, by computer system 101, with a virtual visual effect (e.g., a visual effect as described with reference to method 1100, such as a dimming and/or tinting effect) applied to some or all of the three-dimensional environment 1002, such as to first virtual environment 1020*a*, representation of physical environment 1008, and/or representation of table 1004. (In FIG. 10A, the visual effect is illustrated by the patterning overlaying the representation of the physical environment 1008 and the representation of table 1004, along with the pattern of the first virtual environment 1020*a*.) For example, computer system 101 optionally applies a virtual dimming effect and/or a virtual tinting effect to the first virtual environment 1020*a*, the visible portion of physical environment 1008, and/or representation of table 1004 such that they appear, to the user of computer system 101, to be dimmed and/or tinted relative to their appearance when the visual effect is not applied and/or relative to first virtual object 1006*a*. Optionally, computer system 101 applies a composite visual effect that is based on a visual effect associated with the virtual environment 1020*a* and a visual effect associated with first virtual object 1006*a*. Optionally, computer system 101 applies a visual effect associated with virtual environment 1020*a* to some or all of the three-dimensional environment 1002 when the virtual environment 1020*a* is displayed (e.g., in response to a request to display the virtual environment 1020*a*), and does not display the visual effect associated with the virtual environment 1020*a* before the virtual environment 1020*a* is displayed.

Optionally, computer system 101 applies the first visual effect based on a state of the virtual content (e.g., based on a state of first virtual object 1006*a* and/or based on a state of first virtual environment 1020*a*), such as based on a dimming and/or tinting setting associated with the first virtual object 1006*a* and/or based on a time-of-day setting associated with the first virtual environment 1020*a*. For example, an application associated with the first virtual object 1006*a* can optionally request that a dimming and/or tinting effect be applied to portions of the three-dimensional environment 1002 outside of the first virtual object 1006*a* to visually emphasize the first virtual object 1006*a* relative to the other portions of the three-dimensional environment 1002 (e.g., to decrease the visual prominence of the other portions of the three-dimensional environment 1002 relative to the first virtual object 1006*a*). For example, a virtual environment, such as first virtual environment 1020*a*, can be associated with a visual effect that causes the computer system 101 to apply dimming and/or tinting effects to portions of the three-dimensional environment 1002 outside of first virtual environment 1020*a* (such as to the representation of physical environment 1008).

In some embodiments, if first virtual object 1006*a* is associated with a visual effect, computer system 101 applies the visual effect associated with the first virtual object 1006*a* when (e.g., while) the first virtual object 1006*a* is in an active state and does not apply the visual effect associated with the first virtual object 1006*a* when the first virtual object 1006*a* is not in the active state (e.g., as described with reference to method 1500). For example, in FIG. 10A, first virtual object 1006*a* is optionally associated with a visual effect and is in an active state such that the visual effect is applied to portions of the three-dimensional environment 1002 outside of first virtual object 1006*a*.

Figure 10B:
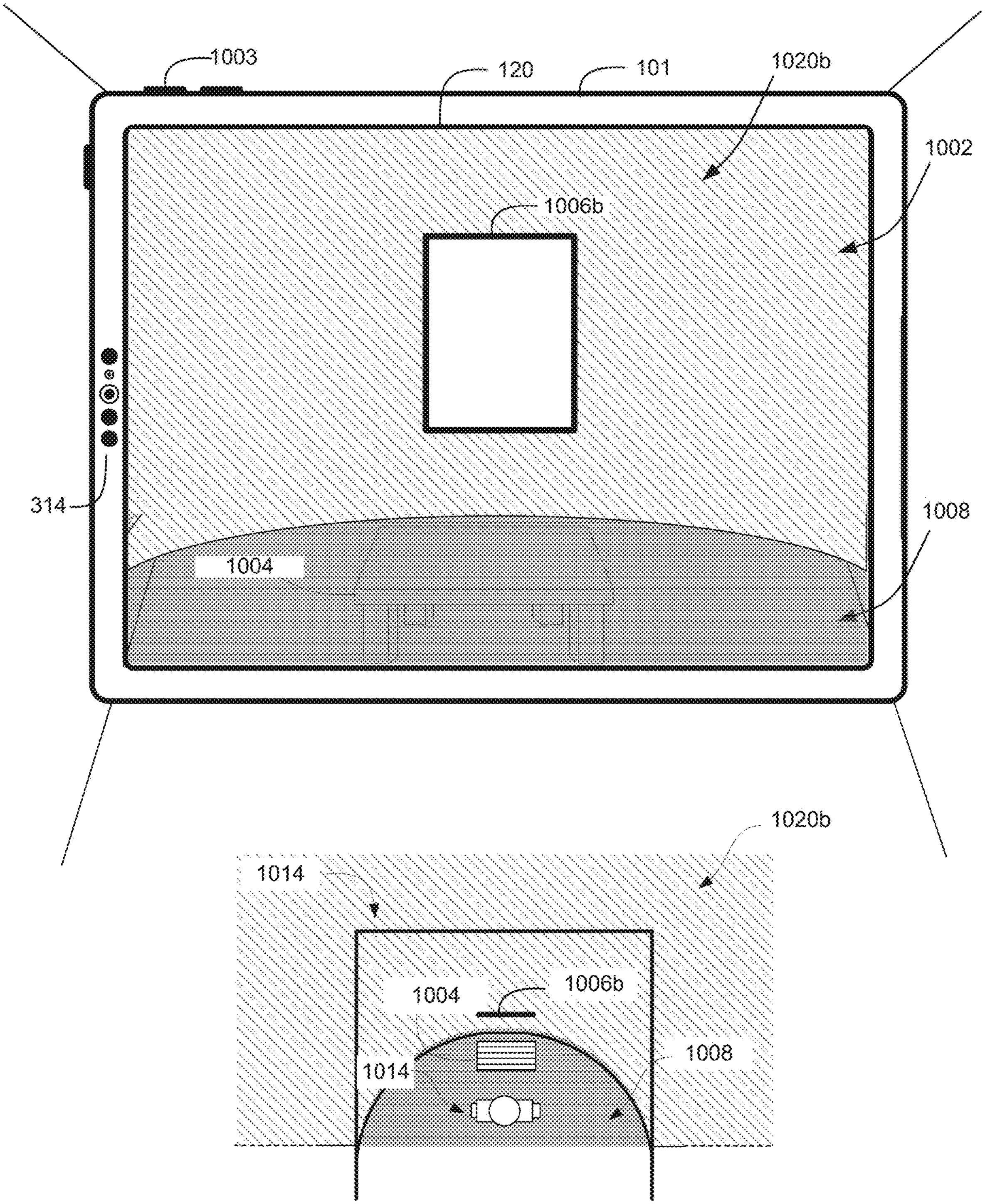

FIG. 10B depicts an example that is similar to FIG. 10A but in which a second virtual environment 1020*b* is displayed in three-dimensional environment 1002. In some cases, different virtual environments can request (e.g., be associated with) different dimming and/or tinting effects. For example, optionally second virtual environment 1020*b* is associated with a different visual effect than first virtual environment 1020*a*, and computer system 101 displays the different visual effect applied to the representation of the physical environment 1008 (as indicated by different patterning on representation of physical environment 1008 and representation of table 1004 relative to FIG. 10A).

Figure 10C:
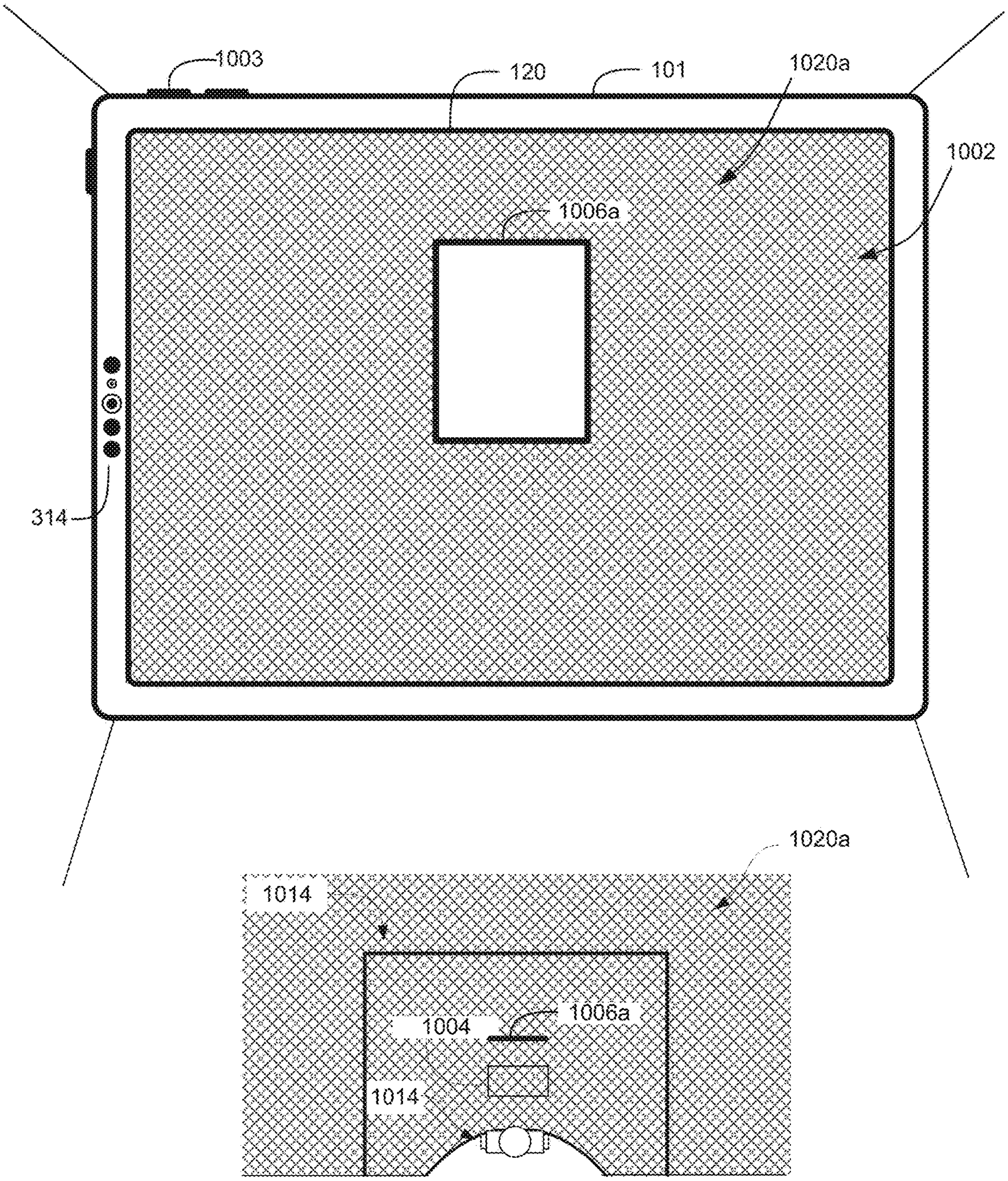

FIG. 10C is similar to FIG. 10A but in this case first virtual environment 1020*a* is displayed at 100% immersion (optionally at 100% opacity), thereby obscuring all of the physical environment that is within the field of view of computer system 101; e.g., none of the physical environment is visible via computer system 101.

Figure 10D:
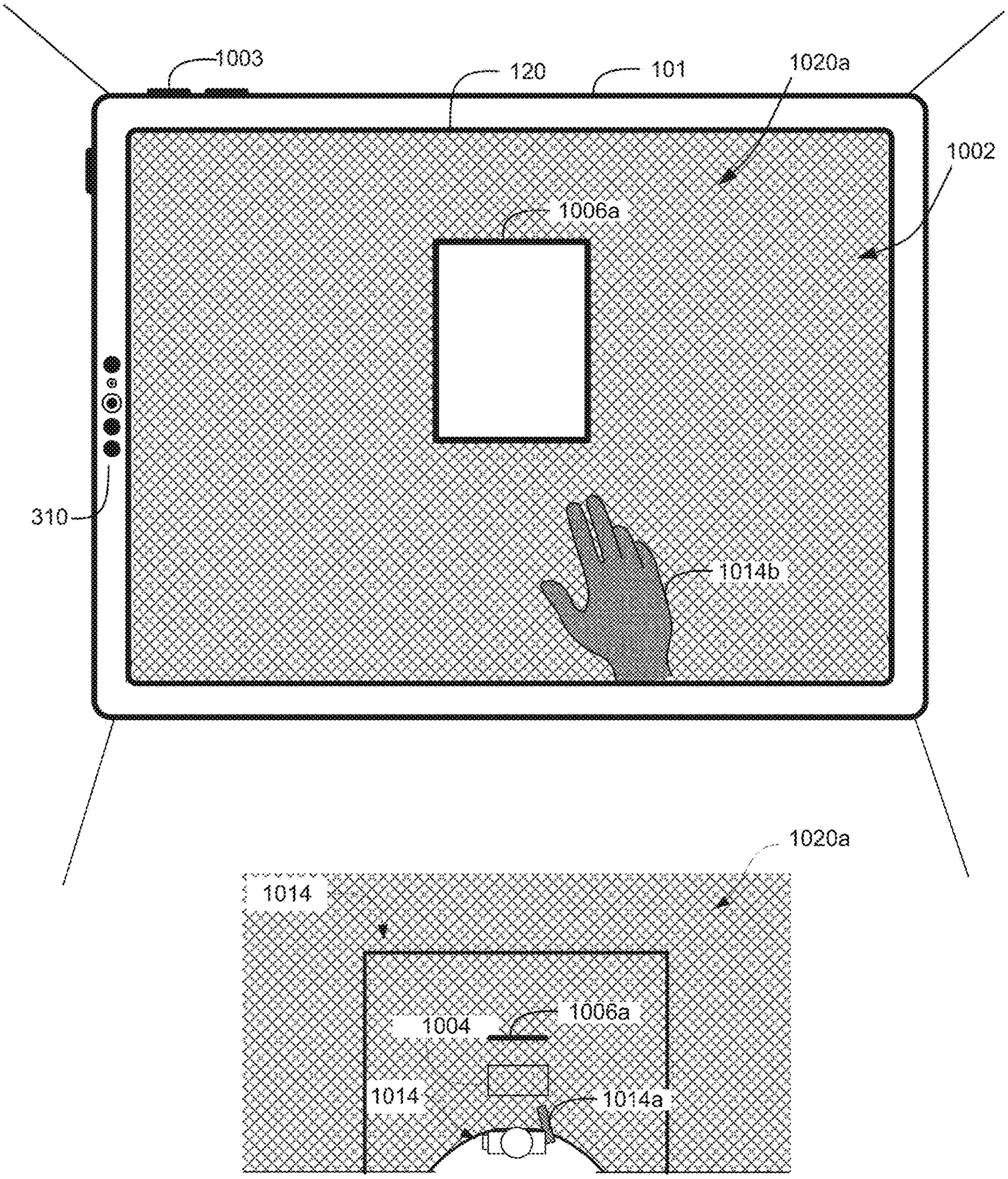

From FIG. 10C to FIG. 10D, the user 1010 raises their arm such that their hand 1010*a* (a real-world object) moves into the field of view of computer system 101 (e.g., as shown in overhead view 1414, when user 1010 is holding or wearing computer system 101 with the field of view of computer system 101 as depicted), thereby constituting a passthrough visibility event. In response to detecting that the user 1010 has moved their hand 1010*a* into the field of view of computer system 101, computer system 101 replaces the display of a portion of first virtual environment 1020*a* with presentation of a representation of the hand 1010*b* of the user (e.g., as described with reference to method 1100) and applies the first visual effect to the representation of the hand 1010*b* of the user, as indicated by the patterning shown on the representation of hand 1010*b*. In some embodiments, applying the visual effect to the representation of the hand 1010*b* includes applying a dimming effect to the representation of the hand 1010*b* such that the representation of the hand 1010*b* appears dimmer (less bright) than it would without the first visual effect applied and/or dimmer than first virtual object 1006*a* (e.g., it is presented with less visual prominence). For example, if first virtual object 1006*a* is associated with a dimming effect and/or if first virtual environment 1020*a* is operating in a dark time-of-day setting, computer system 101 optionally dims representation of hand 1010*b*. In the example of FIG. 10D, the first visual effect optionally includes a high dimming effect, in which the representation of hand 1010*b* is dimmed by a relatively large percentage relative to its appearance if the first visual effect were not applied. In some embodiments, when the first virtual object 1006*a* includes media content (e.g., a movie) and the first virtual object is in an active state, computer system 101 applies a high dimming effect to the representation of hand 1010*b*. Optionally, computer system 101 applies a composite visual effect to representation of hand 1010*b* that is based on a visual effect associated with the virtual environment 1020*a* and on the visual effect associated with first virtual object 1006*a*.

In some embodiments, applying the visual effect to the representation of the hand 1010*b* includes applying a tinting effect to the representation of hand 1010*b* such that it appears to be tinted a particular color. For example, if virtual object 1006*a* is associated with a yellow (or other color) tint effect, computer system 101 optionally applies the yellow (or other color) tint to representation of hand 1010*b*. For example, if the first virtual environment 1020*a* is operating in a dark time-of-day setting, computer system 101 optionally applies a blue and/or gray (or other color) tint to representation of hand 1010*b*.

Figure 10E:
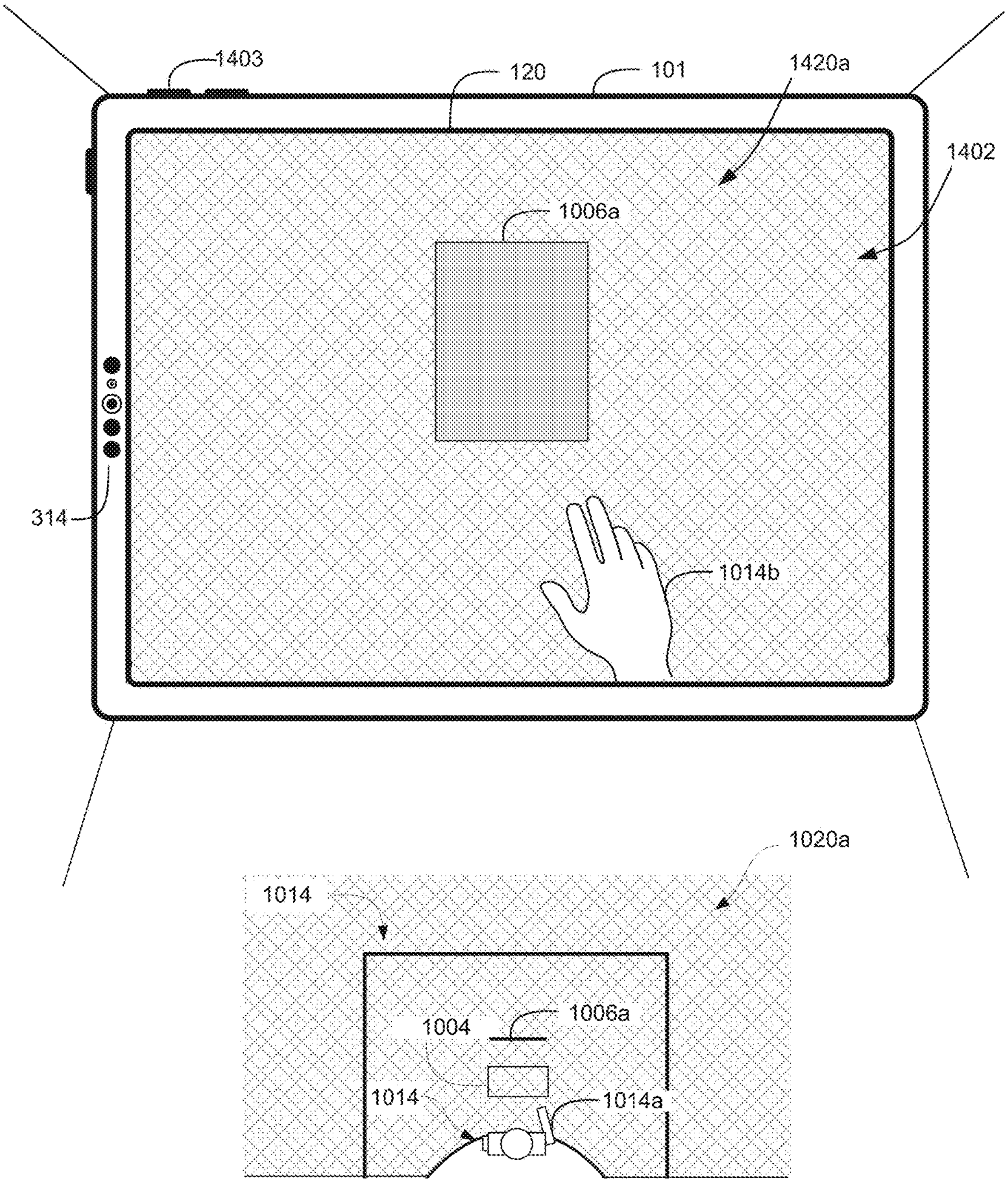

FIG. 10E depicts an example in which first virtual object 1006*a* is optionally associated with the first visual effect (e.g., optionally including high dimming, such as described with reference to FIG. 10D), but computer system 101 forgoes applying the first visual effect to representation of hand 1010*b* and/or first virtual environment 1020*a* because first virtual object 1006*a* is in a second state because it is an application window and/or because it is not in an active state (e.g., it is optionally inactive, as indicated by the grayed out interior area and lighter border of first virtual object 1006*a* in FIG. 10E relative to FIG. 10D). In this case, computer system 101 optionally applies a second visual effect to representation of hand 1010*b* and/or first virtual environment 1020*a* (not shown) or forgoes applying any visual effect to representation of hand 1010*b* and/or first virtual environment 1020*a*.

Figure 10F:
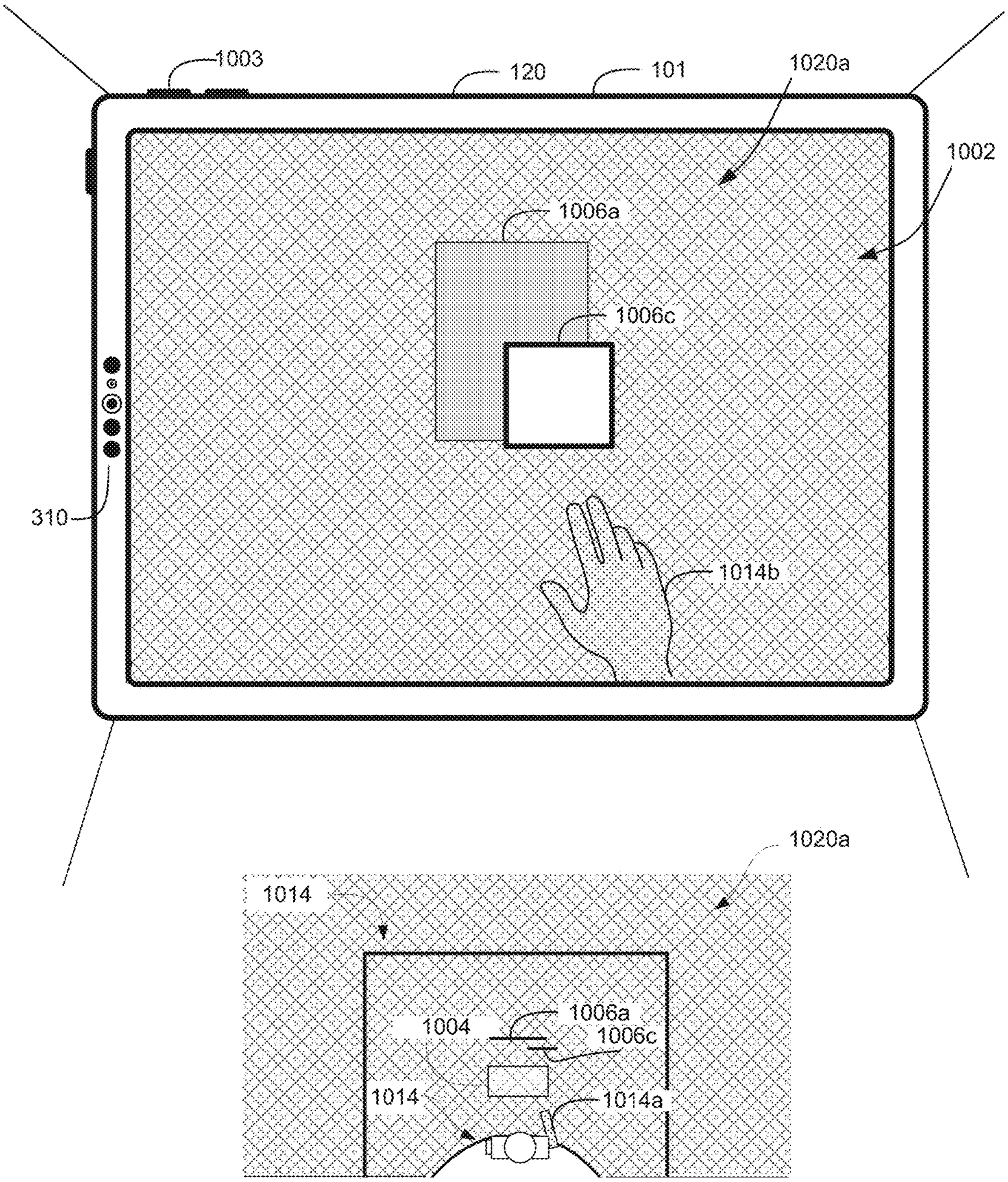

FIG. 10F depicts an example in which the first virtual object 1006*a* corresponds to a window associated with an application, and a third virtual object 1006*c* displayed in three-dimensional environment 1002 corresponds to a user interface associated with the same application (e.g., a pop-up window or menu for entering information for the application). Optionally, third virtual object 1006*c* is overlaid on at least a portion of first virtual object 1006*a* (e.g., from the viewpoint of the user), as shown in FIG. 10F. Third virtual object 1006*c* is optionally displayed by computer system 101 in response to a user input directed to first virtual object 1006*a*, such as a selection of an affordance displayed in first virtual object 1006*a*. In some embodiments, first virtual object 1006*a* (e.g., corresponding to a first window associated with an application) is referred to as being in a modal state when a user interface associated with the application is open and active, such as shown in FIG. 10F. In some embodiments, when first virtual object 1006*a* is in a modal state, in response to detecting that the user has moved hand 1010*a* into the field of view of computer system 101 (or optionally, in response to detecting that first virtual object 1006*a* has changed state to the modal state), computer system 101 presents a representation of the hand 1010*b* of the user with a low dimming effect applied to representation of hand 1010*b* (e.g., dimming by a lesser amount than that depicted in FIG. 10D, as indicated by the lighter patterning on representation of hand 1010*b* relative to that shown in FIG. 10D). Optionally, computer system 101 also applies the low dimming effect to first virtual environment 1020*a*.

Figure 10G:
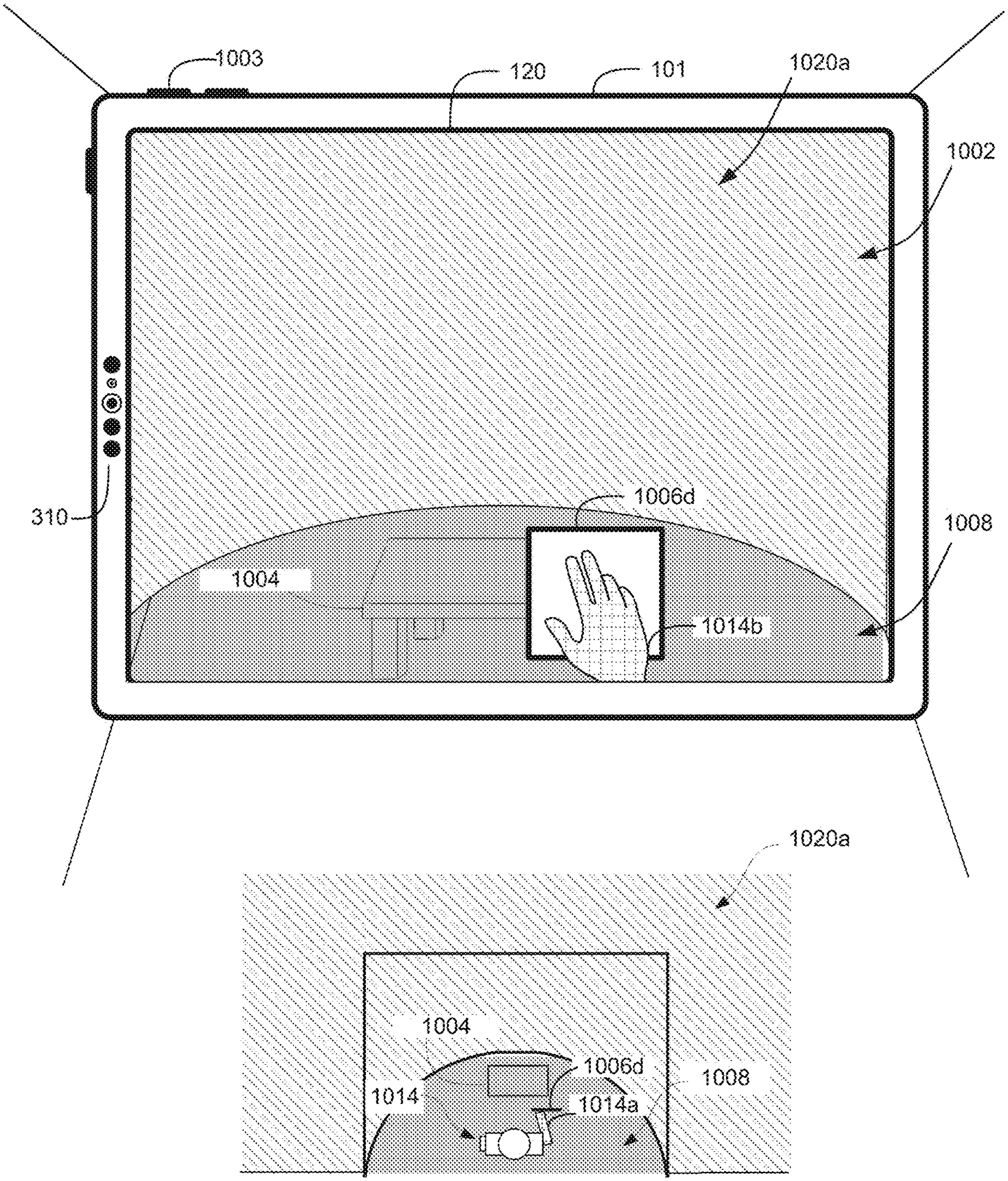
Figure 10H:
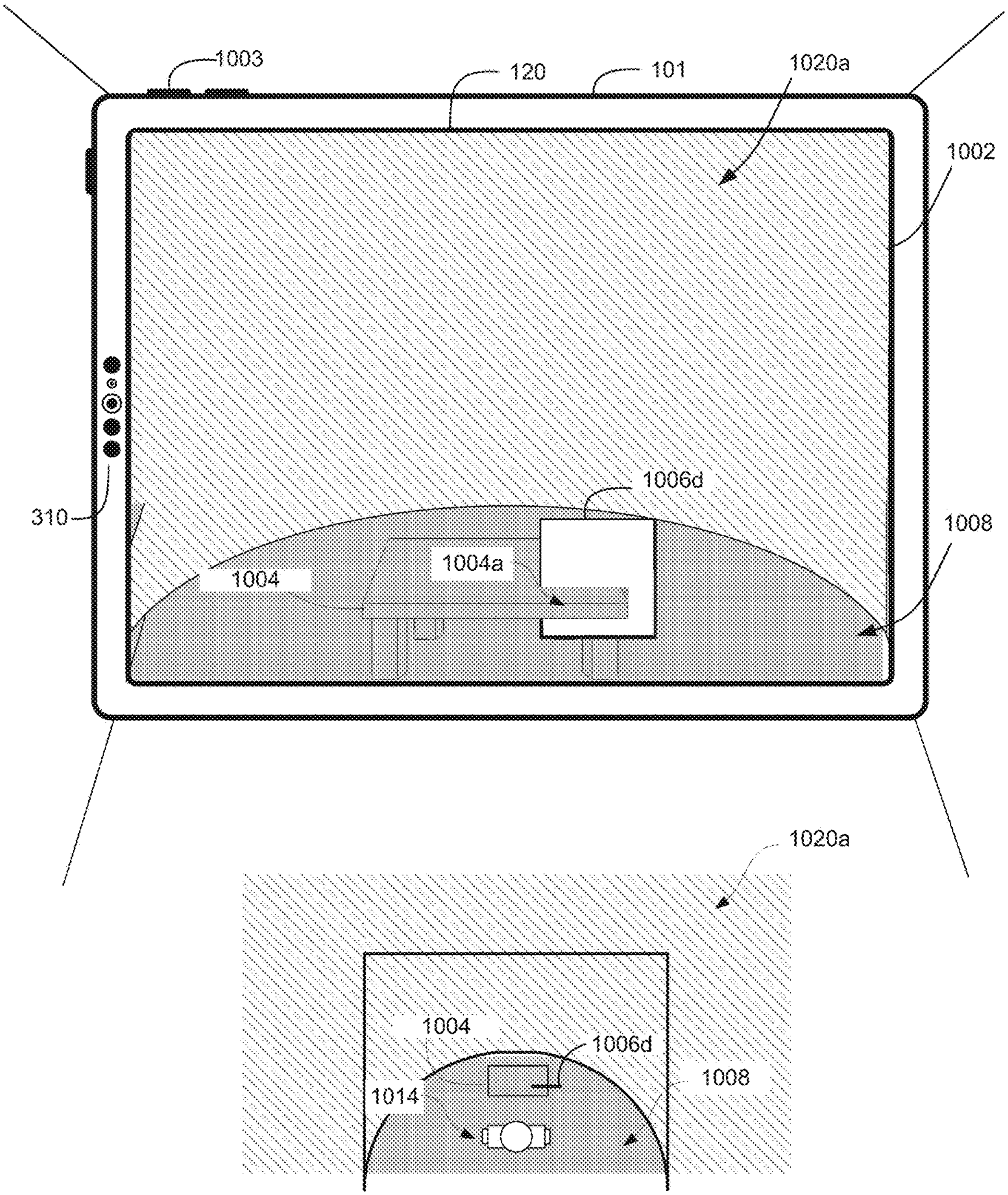

FIG. 10G depicts an example in which a user is interacting with a virtual object 1006*d* (e.g., an application window) while a visual effect is applied to the three-dimensional environment 1002 (including first virtual environment 1020*a* and representation of physical environment 1008) and to the representation of the user's hand 1010*b* (e.g., as described with reference to FIGS. 10D and 10F). For example, the representation of the user's hand 1010*b* is optionally dimmed and/or tinted in the same manner as the representation of the physical environment 1008. In FIG. 10G, virtual object 1006*d* is displayed in the foreground of the three-dimensional environment 1002 (e.g., at a spatial depth that places it in front of representation of table 1004 from the perspective of the user 1010) and virtual object 1006*d* obscures a portion of representation of table 1004 (e.g., a right-hand corner of representation of table 1004, as seen from the perspective of the user 1010). In this example, the user is providing inputs (e.g., an air gesture) to change the spatial depth of the virtual object 1006*d*, such as to "push" the virtual object 1006*d* backwards into the three-dimensional environment 1002, towards the representation of table 1004, such that virtual object 1006*d* will be displayed at a greater spatial depth relative to the perspective of the user 1010.

From FIG. 10G to FIG. 10H, the user 1010 has "pushed" the virtual object 1006*d* backwards to a depth at which it has a spatial conflict with a portion 1004*a* of the representation of table 1004, such as described with reference to method 1100, thereby constituting a passthrough visibility event. In this case, computer system 101 allows the portion 1004*a* of representation of table 1004 to "break through" virtual object 1006*d*, such as by replacing display of a portion of virtual object 1006*d* (e.g., the portion that would obscure portion 1004*a* of representation of table 1004) with presentation of portion 1004*a* of the representation of table 1004. For example, computer system 101 makes portion 1004*a* of representation of table 1004 visible, such as by increasing a transparency of the portion of virtual object 1006*d* that has the spatial conflict with portion 1004*a* of representation of table 1004. As shown in FIG. 10G, computer system 101 applies the visual effect to portion 1004*a* of representation of table 1004 (as indicated by the patterning of portion 1004*a*).

Figure 10I:
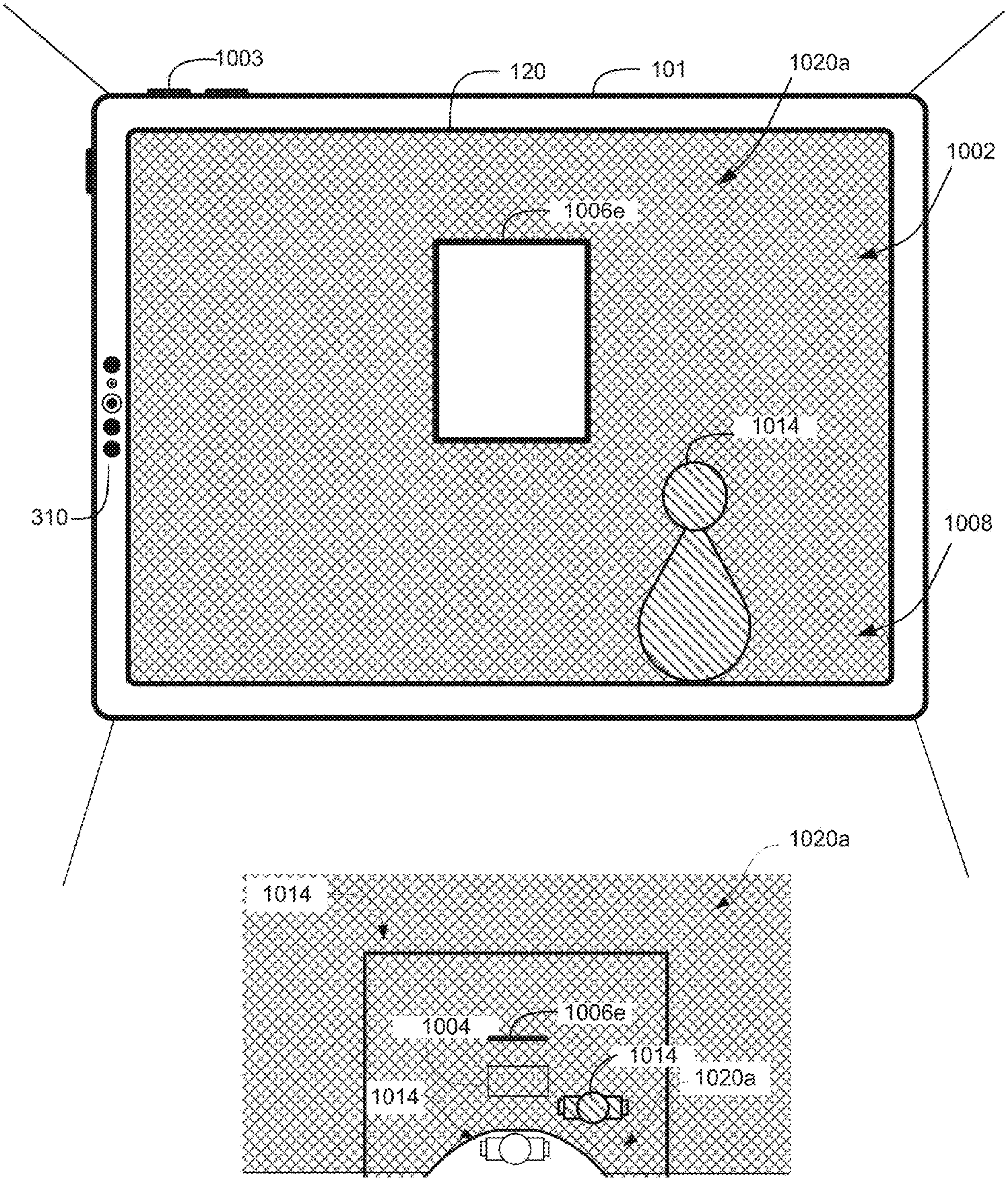

FIG. 10I depicts an example in which a real-world object (e.g., a person) that would otherwise be obscured by a displayed first virtual environment 1020*a* (e.g., obscured from the perspective of user 1010) has satisfied criteria for being made visible (to the user) by computer system 101, such as by having moved to within a threshold distance of user 1010 (e.g., in a physical environment of user 1010) and/or by initiating an interaction with user 1010, such as by looking at user 1010 and/or speaking to user 1010 (e.g., as described with reference to method 1100), thereby constituting a passthrough visibility event. In the example of FIG. 10I, the computer system 101 is displaying a visual effect applied to virtual environment 1120*a* (e.g., a visual effect associated with virtual object 1006*e*, which is depicted as being in an active state and optionally to which the attention of user 1010 is directed) at the time computer system 101 detects that the person has satisfied the criteria. For example, user 1010 is optionally watching media content (e.g., via virtual object 1006*e*) that applies a dimming effect to first virtual environment 1020*a* when the person walks towards user 1010 or begins speaking to user 1010 (and optionally, visibility of the person was previously obscured by first virtual environment 1020*a*). In response to a determination that the person has satisfied the criteria, computer system 101 replaces display of a portion of first virtual environment 1020*a* (e.g., the portion that would otherwise obscure representation of person 1012) with a representation of person 1012, and applies the visual effect to the representation of person 1012 (such as indicated by the patterning on representation of person 1012).

Figure 10J:
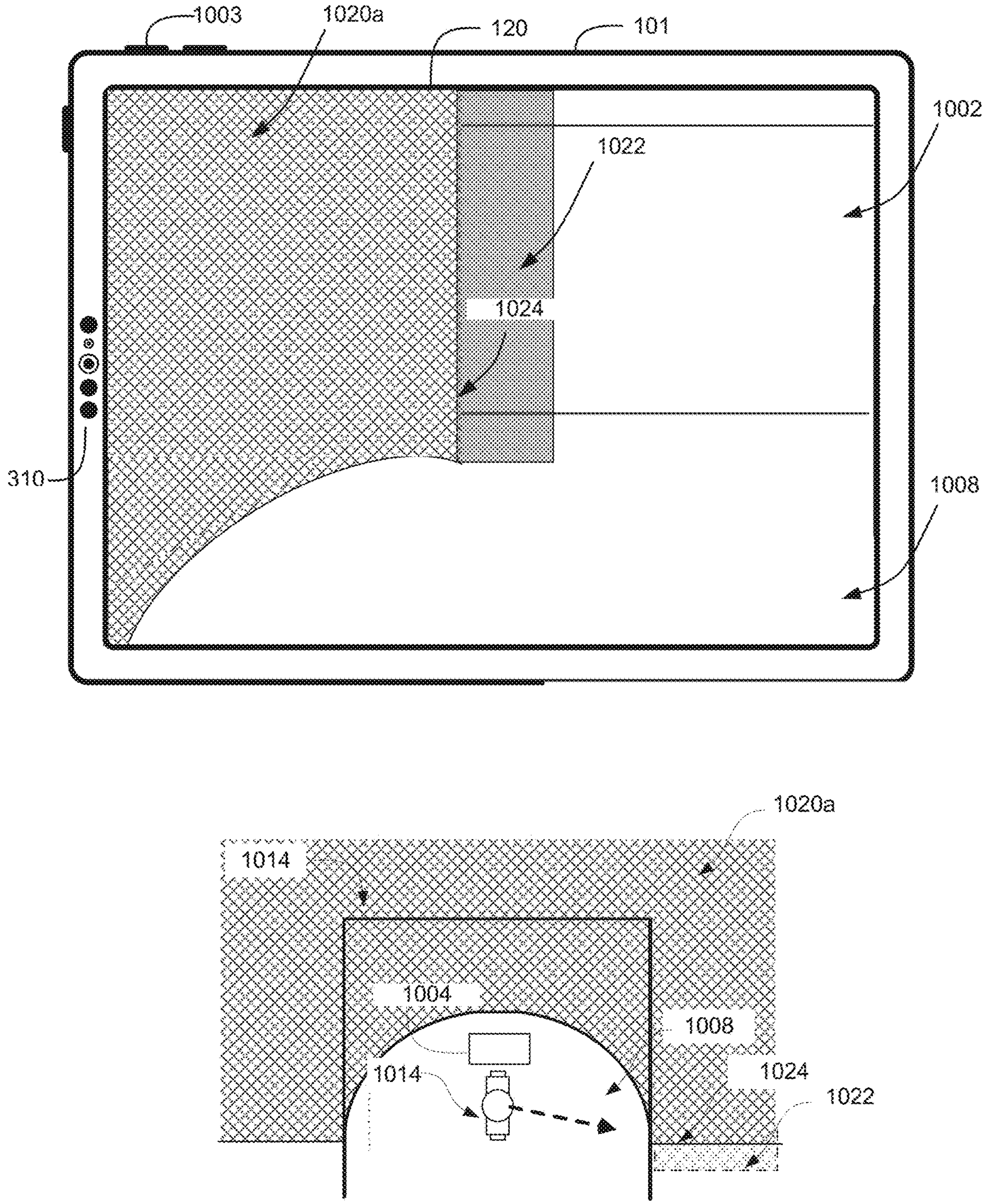

FIG. 10J depicts an example in which a user 1010 has shifted their viewpoint and turned away from first virtual environment 1020*a* such that the viewpoint of the user 1010 is directed towards a boundary 1024 of first virtual environment 1020*a* (e.g., as described with reference to method 1100). Optionally, boundary 1024 is an edge of first virtual environment 1020*a* that is in a vertical plane and/or axis relative to the three-dimensional environment 1002, as shown in FIG. 10J. Optionally, portions of the representation of the physical environment 1008 (optionally, including real-world objects) that are near the boundary 1024 of first virtual environment 1020*a* are made at least partially visible (to the user 1010) by computer system 101, such as by increasing a transparency of a portion of the first virtual environment 1020*a* that is near (within a threshold distance of) the boundary 1024. Optionally, if first virtual environment 1020*a* is associated with a visual effect, computer system 101 applies the visual effect to portions of the physical environment that are overlaid by and/or within a threshold distance of the boundary 1024 of the first virtual environment 1020*a*. For example, in FIG. 10J, a visual effect associated with first virtual environment 1020*a* is applied to the representation of the physical environment 1008 within region 1022 near boundary 1024. Optionally, an amount of the visual effect applied in region 1022 decreases at greater distances from first virtual environment 1020*a* and/or boundary 1024 (e.g., the visual effect fades out) until it is no longer displayed outside of region 1022.

Figure 10K:
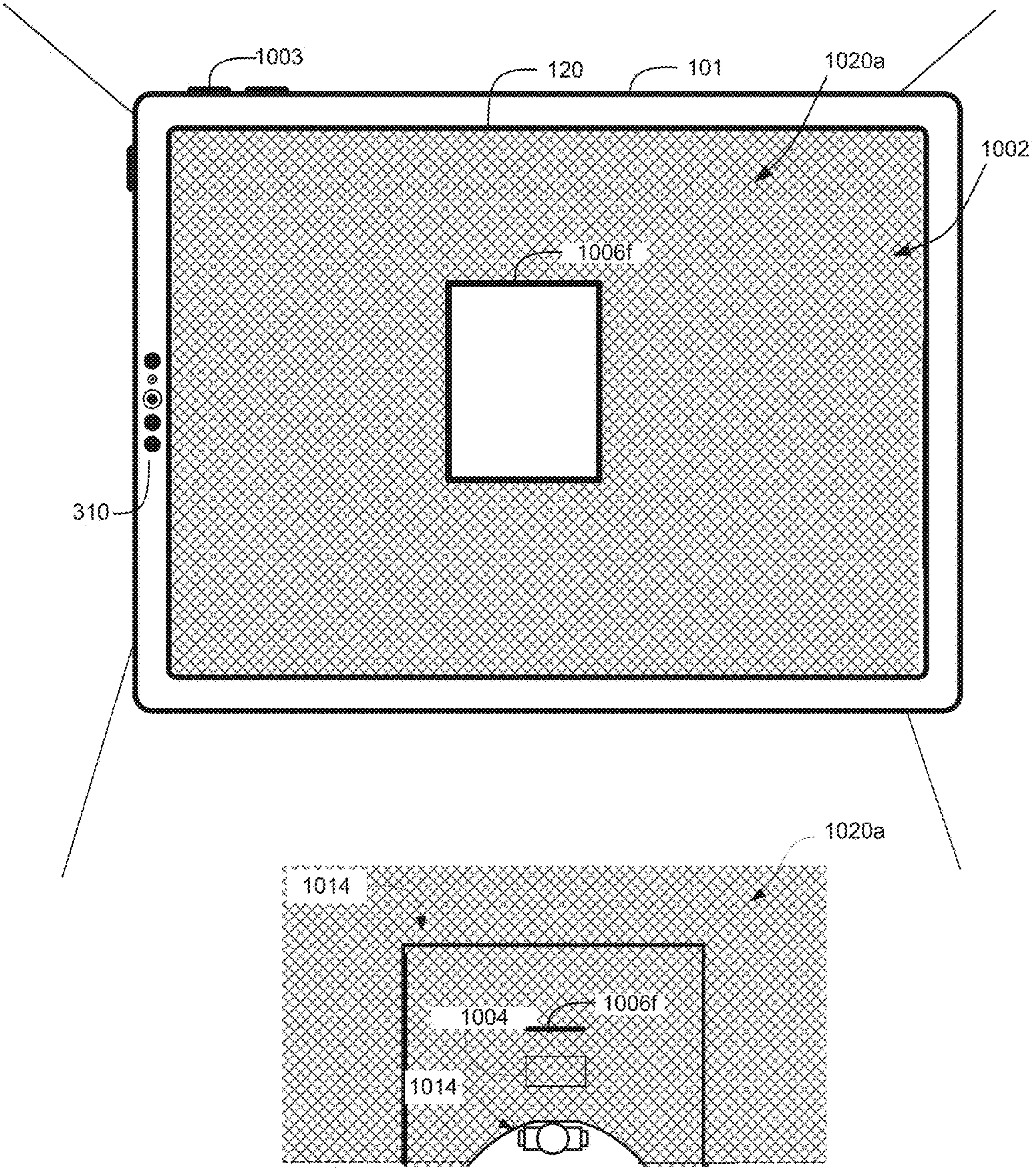

FIG. 10K depicts an example in which a first virtual environment 1020*a* is displayed, by computer system 101, at 100% immersion and 100% opacity (e.g., such that the physical environment is not visible), and a virtual object 1006*f* is displayed within the three-dimensional environment 1002. In some embodiments, the virtual object 1006*f* is associated with a visual effect, and the visual effect is applied to the first virtual environment 1020*a* (optionally, while virtual object 1006*f* is in an active state, as shown, and/or while the attention of user 1010 is directed to virtual object 1006*f*).

Figure 10L:
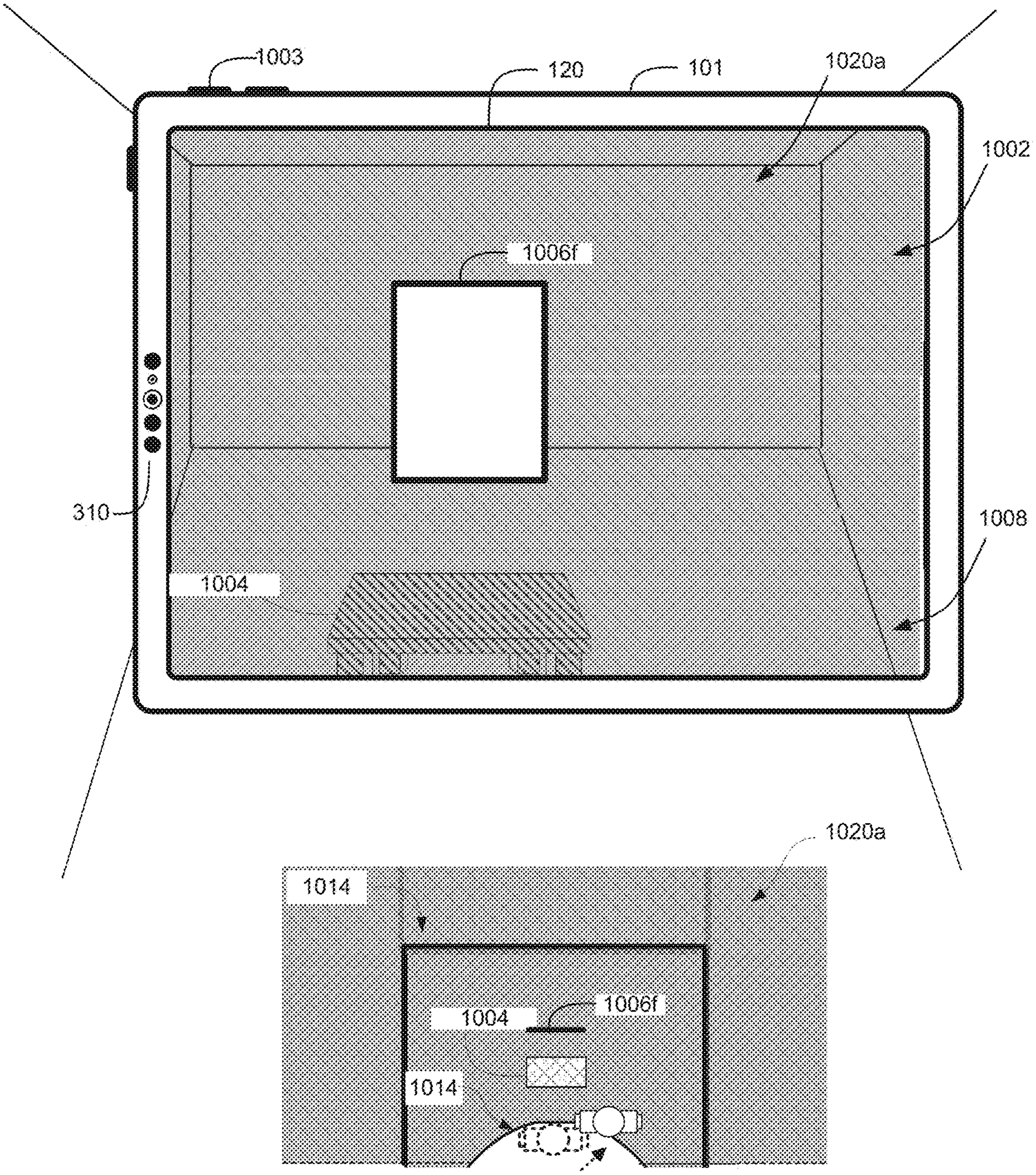

From FIG. 10K to FIG. 10L, the user 1010 has moved a relatively short distance from the initial location (e.g., changing the location of the viewpoint of the user), and in response to detecting the movement of the user, the computer system 101 increases the transparency of the first virtual environment 1020*a* by an amount that corresponds to the amount of the user's movement. In this case, a representation of the physical environment 1008 becomes visible through first virtual environment 1020*a*, including a representation of table 1004. In some embodiments, the computer system 101 displays the visual effect (e.g., associated with virtual object 1006*f*) applied to the representation of table 1004 (e.g., as indicated by the pattern on the representation of table 1004) and/or the representation of the physical environment 1008.

Figure 10M:
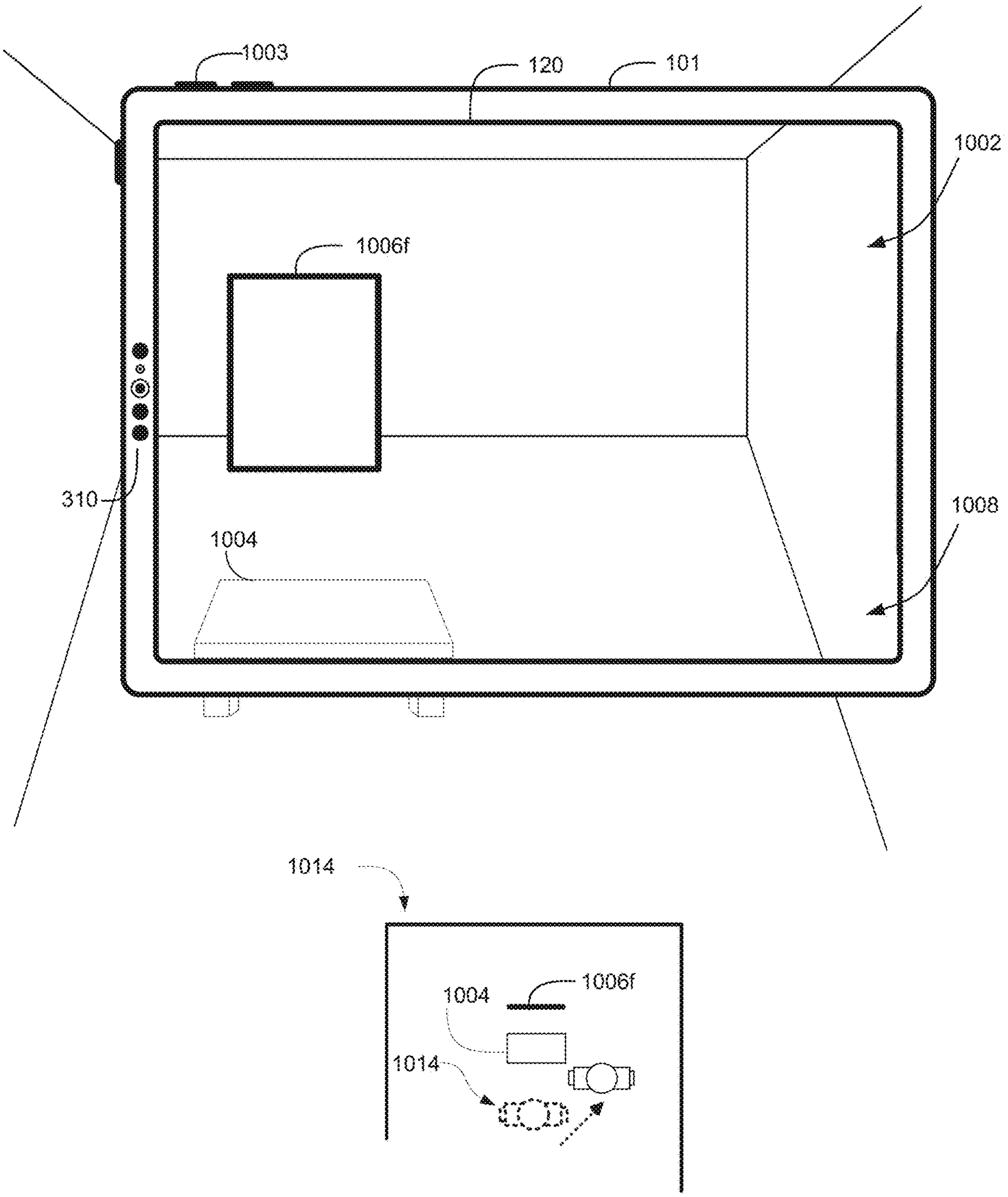
Figure 10N:
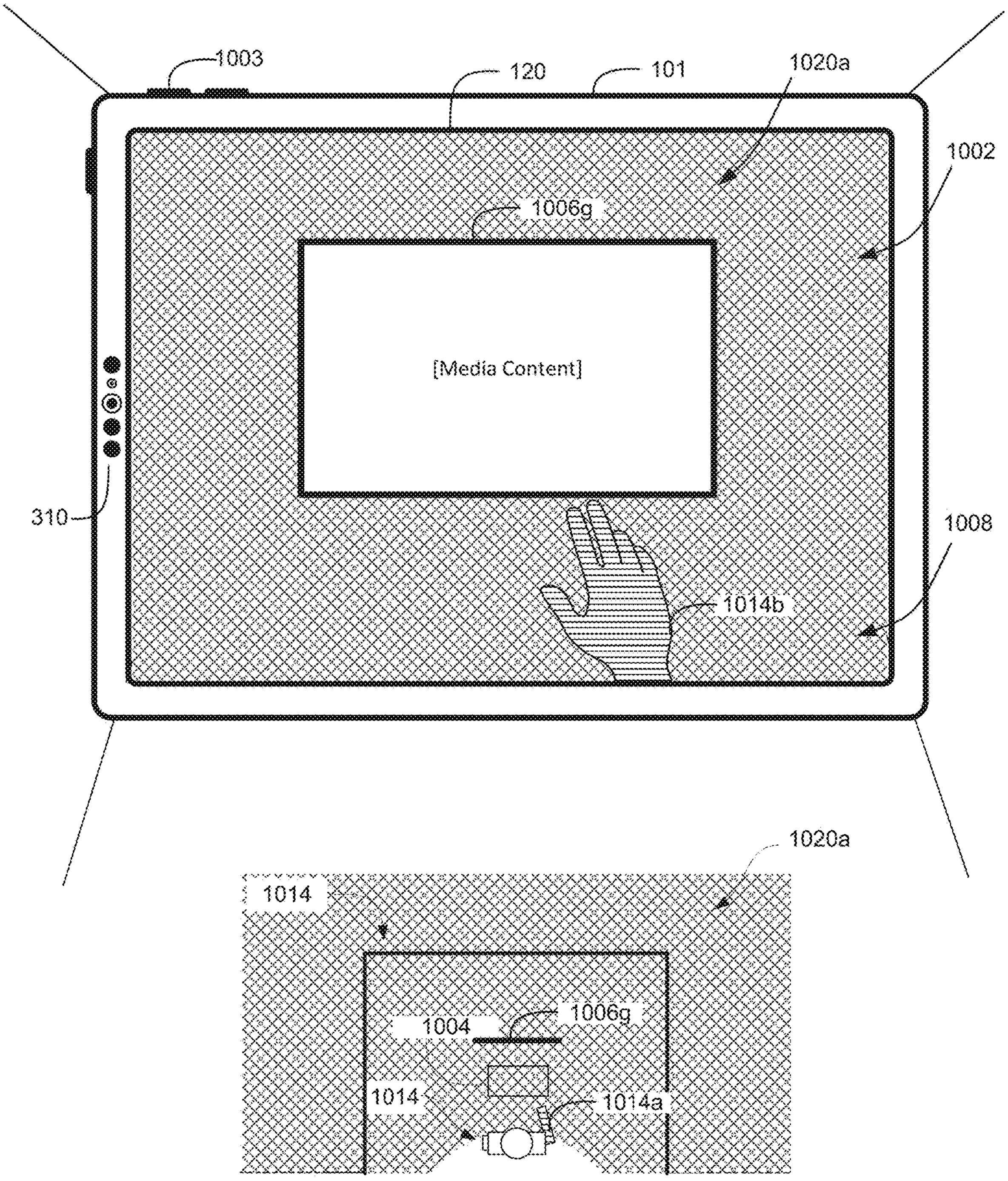

From FIG. 10L to FIG. 10M, the user has moved more than a threshold distance from the initial location of the user 1010 (e.g., the location shown in FIG. 10K), and in response to detecting that the viewpoint of the user has moved more than a threshold distance, the computer system ceases to display first virtual environment 1020*a* (optionally, while continuing to display virtual object 1006*f*). In the example of FIG. 10M, in response to detecting that the viewpoint of the user has moved more than the threshold distance, the computer system 101 ceases to display the visual effect to the representation of the table 1004 and/or to the representation of the physical environment 1008. In some embodiments, the computer system 101 continues to display the visual effect applied to the representation of the table 1004 and/or to the representation of the physical environment 1008 after ceasing to display the first virtual environment 1020*a*.

In some embodiments, when computer system 101 displays virtual media content within a three-dimensional environment, computer system 101 displays a visual effect associated with the media content applied to the three-dimensional environment. In the example of FIG. 10N, the computer system 101 displays, in three-dimensional environment 1002, virtual content that includes a virtual object 1006*g* (e.g., including media content) and first virtual environment 1020*a*. In some embodiments, virtual object 1006*g* (and/or the media content) is associated with a virtual effect that is based on the media content, such as a dimming effect and/or a color tint effect where the color is based on the color of the media content. In some embodiments, in response to detecting that the user has moved their hand 1010*a* into the field of view of computer system 101 (such as described with reference to FIG. 10D), computer system 101 displays a representation of the user's hand 1010*b* with the visual effect applied to the representation of the user's hand 1010*b*, such as indicated by the patterning on representation of user's hand 1010*b*. In some embodiments, computer system 101 applies the visual effect associated with the media content when the media content is playing and does not apply the visual effect when the media content is stopped or paused, such as described with reference to method 1300.

FIG. 10N1 illustrates similar and/or the same concepts as those shown in FIG. 10N (with many of the same reference numbers). It is understood that unless indicated below, elements shown in FIG. 10N1 that have the same reference numbers as elements shown in FIGS. 10A-10N have one or more or all of the same characteristics. Further, the dashed box around hand 1014*b* in FIG. 10N1 corresponds to the pattern shown on hand 1014*b* in FIG. 10N. FIG. 10N1 includes computer system 101, which includes (or is the same as) display generation component 120. In some embodiments, computer system 101 and display generation component 120 have one or more of the characteristics of computer system 101 shown in FIGS. 10A-10N and display generation component 120 shown in FIGS. 1 and 3, respectively, and in some embodiments, computer system 101 and display generation component 120 shown in FIGS. 10A-10N have one or more of the characteristics of computer system 101 and display generation component 120 shown in FIG. 10N1.

In FIG. 10N1, display generation component 120 includes one or more internal image sensors 314*a* oriented towards the face of the user (e.g., eye tracking cameras 540 described with reference to FIG. 5). In some embodiments, internal image sensors 314*a* are used for eye tracking (e.g., detecting a gaze of the user). Internal image sensors 314*a* are optionally arranged on the left and right portions of display generation component 120 to enable eye tracking of the user's left and right eyes. Display generation component 120 also includes external image sensors 314*b* and 314*c* facing outwards from the user to detect and/or capture the physical environment and/or movements of the user's hands. In some embodiments, image sensors 314*a*, 314*b*, and 314*c* have one or more of the characteristics of image sensors 314 described with reference to FIGS. 10A-10N.

In FIG. 10N1, display generation component 120 is illustrated as displaying content that optionally corresponds to the content that is described as being displayed and/or visible via display generation component 120 with reference to FIGS. 10A-10N. In some embodiments, the content is displayed by a single display (e.g., display 510 of FIG. 5) included in display generation component 120. In some embodiments, display generation component 120 includes two or more displays (e.g., left and right display panels for the left and right eyes of the user, respectively, as described with reference to FIG. 5) having displayed outputs that are merged (e.g., by the user's brain) to create the view of the content shown in FIG. 10N1.

Display generation component 120 has a field of view (e.g., a field of view captured by external image sensors 314*b* and 314*c* and/or visible to the user via display generation component 120) that corresponds to the content shown in FIG. 10N1. Because display generation component 120 is optionally a head-mounted device, the field of view of display generation component 120 is optionally the same as or similar to the field of view of the user.

In FIG. 10N1, the user is depicted as performing an air pinch gesture (e.g., with hand 1014*b*) to provide an input to computer system 101 to provide a user input directed to content displayed by computer system 101. Such depiction is intended to be exemplary rather than limiting; the user optionally provides user inputs using different air gestures and/or using other forms of input as described with reference to FIGS. 10A-10N.

In some embodiments, computer system 101 responds to user inputs as described with reference to FIGS. 10A-10N.

In the example of FIG. 10N1, because the user's hand is within the field of view of display generation component 120, it is visible within the three-dimensional environment. That is, the user can optionally see, in the three-dimensional environment, any portion of their own body that is within the field of view of display generation component 120. It is understood than one or more or all aspects of the present disclosure as shown in, or described with reference to FIGS. 10A-10N and/or described with reference to the corresponding method(s) are optionally implemented on computer system 101 and display generation unit 120 in a manner similar or analogous to that shown in FIG. 10N1.

FIG. 11 is a flowchart illustrating a method 1100 of applying a visual effect to a real-world object, in accordance with some embodiments. In some embodiments, the method 1100 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, and/or a projector) and one or more cameras (e.g., a camera (e.g., color sensors, infrared sensors, and other depth-sensing cameras) that points downward at a user's hand or a camera that points forward from the user's head). In some embodiments, the method 1100 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1100 are, optionally, combined and/or the order of some operations is, optionally, changed.

In some embodiments, the method 1100 is performed at a computer system in communication with (e.g., including and/or communicatively linked with) one or more input devices and a display generation component. In some embodiments, the first computer system has one or more of the characteristics of the computer system(s) described with reference to methods 800, 900, 1300, and/or 1500. In some embodiments, the input device(s) has one or more of the characteristics of the input device(s) described with reference to methods 800, 900, 1300, and/or 1500. In some embodiments, the display generation unit has one or more of the characteristics of the display generation component described with reference to methods 800, 900, 1300, and/or 1500.

In some embodiments, while displaying, via the display generation component, virtual content (e.g., content generated by the computer system that optionally includes a virtual environment, virtual objects, virtual media content, and/or a virtual application window for interacting with an application, such as virtual content described with reference to methods 800, 900, 1300, and/or 1500), wherein at least a portion of the virtual content obscures visibility of at least a portion of a physical environment of a user of the computer system (e.g., a portion of the physical environment that would otherwise be visible via optical or virtual pass-through), the computer system detects (1102*a*), via the one or more input devices, a passthrough visibility event. For example, the computer system displays virtual content that includes virtual objects (e.g., virtual object 1006*a*) and virtual environments (e.g., a first virtual environment 1020*a*) that obscure a portion of a representation of a physical environment 1008 in FIGS. 10A-10N, and detects pass-through visibility events such as described with reference to FIGS. 10D-10N. In some embodiments, the virtual content is displayed, by the computer system, in a three-dimensional environment, such as a three-dimensional environment that is generated, displayed, or otherwise caused to be viewable (e.g., visible) by the computer system (e.g., an extended reality (XR) environment such as a virtual reality (VR) environment, a mixed reality (MR) environment, or an augmented reality (AR) environment). In some embodiments, the three-dimensional environment has one or more of the characteristics of the three-dimensional environments of methods 800, 900, 1300, and/or 1500. In some embodiments, virtual content obscures visibility of the portion of the physical environment when and/or while the display of the virtual content prevents the user from viewing the portion of the physical environment through lenses of the computer system, when the display of the virtual content overlays the user's view (e.g., through lenses of the computer system and/or via the display generation component) of the portion of the physical environment, and/or when the display of the at least the portion of the virtual content replaces display of the portion of the physical environment.

In some embodiments, virtual content obscures visibility of the portion of the physical environment when and/or while the display of the virtual content replaces display of the portion of the physical environment via the display generation component such that the user cannot see the portion of the physical environment at all (e.g., such portions of the physical environment are not displayed by the computer system). In some embodiments, virtual content obscures visibility of a portion of the physical environment when and/or while the display of the virtual content overlays the display of the portion of the physical environment such that the portion of the physical environment has less visual prominence (e.g., having one or more of the characteristics of the visual prominence described with reference to method 800) than the virtual content, such as when the virtual content is displayed with increased transparency (e.g., with 5%, 10%, 20%, 30%, 40%, 50%, 60%, 70%, 80%, 90%, or 99% transparency) such that the physical environment is visible through the virtual content, or when the physical environment is displayed with increased transparency (e.g., with 5%, 10%, 20%, 30%, 40%, 50%, 60%, 70%, 80%, 90%, or 99% transparency) relative to the display of the virtual content. In some embodiments, the passthrough visibility event includes an event in which the computer system detects that a real-world object (e.g., an object in the physical environment) has moved into the obscured portion of the physical environment (e.g., into the field of view of the computer system). For example, the computer system optionally detects that a user has moved their hand into the obscured portion of the physical environment, or a person has walked into the obscured portion of the physical environment, or a ball has been thrown into the obscured portion of the physical environment, one or more of which optionally constitutes a passthrough visibility event.

In some embodiments, the passthrough visibility event includes an event in which the computer system causes a physical object to be visible in an area of the physical environment that was previously obscured by the virtual content, thereby enabling the user of the computer system to see the physical object. For example, the computer system optionally detects that a portion of the user (e.g., the user's hand) and/or another physical object (e.g., another person) has moved into the field of view of the computer system and/or within a threshold distance of a physical location of the user (e.g., within 0.01, 0.1, 0.5, 1, 1.5, 5, or 10 meters). Additional details regarding passthrough visibility events are described with reference to FIGS. 10D-10N.

In some embodiments, in response to detecting the pass-through visibility event, the computer system replaces display (1102*b*), via the display generation component, of the at least the portion of the virtual content with presentation (e.g., by displaying or otherwise making visible) of a representation of a real-world object in the physical environment of the user, such as by replacing display of a portion of virtual environment 1020*a* with a representation of a user's hand 1010*b* in FIG. 10D. For example, the computer system optionally presents (e.g., using optical or virtual passthrough) the representation of the real-world object (e.g., the real-world object itself or a virtual representation of the real-world object) in the portion of the physical environment that had been obscured by the display of the virtual content such as by increasing a visual prominence (e.g., by increasing a brightness, reducing a dimming, increasing opacity, and/or increasing a tint) of the representation of the real-world object relative to its visual prominence prior to detecting the passthrough visibility event, or relative to the virtual content, and/or relative to the rest of the three-dimensional environment; by ceasing to display the at least the portion of the virtual content; and/or by displaying the virtual content with reduced visual prominence relative to the three-dimensional environment and/or relative to the displayed representation of the physical object).

In some embodiments, presenting the representation of the real-world object includes, in accordance with a determination that a state of the virtual content is a first state, presenting (1102*c*) the representation of the real-world object with a first visual effect (e.g., a virtual and/or simulated visual effect associated with the virtual content, such as a visual effect that the virtual content is configured to request to be applied) applied to the representation of the real-world object, such as presenting the representation of the user's hand 1010*b* with a visual effect in FIG. 10D. In some embodiments, the state of the virtual content corresponds to a dimming and/or tinting setting associated with the virtual content, such as a setting associated with a virtual environment, virtual media content, a virtual application window, and/or virtual objects of the virtual content. In some embodiments, a state of the virtual content can be configured by a user of the computer system and/or by a provider of the virtual content, such as by an application developer. In some embodiments, a first state of the virtual content corresponds to a first dimming and/or tinting state (e.g., a control setting) associated with the virtual content, in which at least a portion of the three-dimensional environment (e.g., excluding the virtual content) is displayed with a reduced visual brightness (e.g. dimmed) based on the state. For example, the first state optionally corresponds to a high dimming state, in which the representation of the real-world object is presented with increased dimming (reduced brightness) relative to the ambient lighting in the physical environment and/or relative to the brightness of the virtual content, optionally with more dimming than is applied when the virtual content is in a second state (e.g., a low dim state and/or a no-dim state). For example, virtual media content displayed in a three-dimensional environment is optionally associated with (e.g., configured to operate in) the first state such that portions of the three-dimensional environment outside the virtual media content are displayed with reduced visual prominence (e.g., dimmed), thereby mimicking the real-world behavior of turning down the lights to watch media content.

Optionally, the state of the virtual content corresponds to a time of day associated with the virtual content and/or with the computer system, such as daytime, morning, dawn, nighttime, evening, or dusk. For example, a virtual environment such as a virtual beach scene is optionally displayed with a first appearance (such as with first virtual elements, increased brightness, and/or a first color tint (e.g., yellow)) when the state of the virtual environment corresponds to a daytime state, and is displayed with a second appearance (such as with second virtual elements different from the first virtual elements, decreased brightness, and a second color tint (e.g., blue)) when the state corresponds to a nighttime state. Optionally, the three-dimensional environment outside of the virtual content (e.g., outside of the virtual beach scene) is also displayed with a different appearance (e.g., with different brightness and/or color tint) based on the state of the virtual environment.

In some embodiments, presenting the representation of the real-world object with the first virtual effect includes presenting the representation of the real-world object with a first brightness, first dimming, and/or a first color tint based on the state of the virtual content being the first state. For example, if a user moves their hand into the field of view of the computer system (an example of a passthrough visibility event) while media content is displayed in the three-dimensional environment, and the media content is associated with a first state (e.g., a state in which at least a portion of the three-dimensional environment is displayed with a reduced visual brightness relative to a second state, and/or with a first color tint), the computer system optionally presents the representation of the user's hand with reduced brightness and/or tinted with the first color. For example, if the user moves their hand into the field of view of the computer system while a virtual environment is displayed, and the virtual environment is associated with a nighttime state as described earlier, the computer system optionally presents the representation of the user's hand with reduced brightness and/or with a blue tint.

In some embodiments, presenting the representation of the real-world object includes, in accordance with a determination that the state of the virtual content is not the first state, presenting (1102*d*) the representation of the real-world object without the first visual effect applied to the representation of the real-world object, such as presenting the representation of the user's hand 1010*b* without a visual effect in FIG. 10E.

In some embodiments, when the state of the virtual content is not the first state, it is one of one or more different states, such as a second state, a third state, or another state. For example, the first state is optionally a first dimming and/or tinting state or a first time-of-day state, a second state is optionally a second dimming and/or tinting state and/or a second time-of-day state, and a third state is optionally a third dimming and/or tinting state and/or a third time-of-day state.

Optionally, when the computer system displays the representation of the real-world object without the first visual effect, the computer system displays the representation of the real-world object without any visual effect (e.g., without any tint and/or brightness adjustment), such as by presenting the representation of the real-world object in a manner similar to its appearance in the real world and/or based on default brightness settings. Optionally, when the computer system displays the representation of the real-world object without the first visual effect, the computer system displays the representation of the real-world object with a second, third, or other visual effect different from the first visual effect, where the second, third, or other visual effect corresponds to a different (e.g., second, third, or other) state of the virtual content. For example, when the virtual content is associated with a second state, the computer system optionally displays the representation of the real-world object with a different brightness and/or tinted with a different color than when the virtual content is associated with the first state. Presenting representations of real-world objects in a computer-generated environment based on the detection of various passthrough visibility events allows the users to see real-world objects when such visibility is useful for safety reasons, for ease of interaction with the computer system, and/or for other reasons. Presenting representations of real-world objects with visual effects that are based on a state of displayed visual content provides a less jarring and/or distracting intrusion of real-world objects (e.g., they partially blend in with the three-dimensional environment), thereby reducing the likelihood that the user will provide unintentional inputs to the computer system.

In some embodiments, detecting the passthrough visibility event (e.g., as described with reference to step 1102*a*) comprises detecting, via the one or more input devices, that a portion of the user (e.g., a hand, arm, leg, and/or other portion of the user) has moved into the at least the portion of the physical environment (e.g., the user has moved the portion of the user into the field of view of the computer system, such as by raising their arm or elevating their leg in front of the computer system), such as shown in FIG. 10D, and presenting the representation of the real-world object includes presenting a representation of the portion of the user, such as presenting representation of the user's hand 1010*b* in FIG. 10D. For example, if the portion of the user is the user's arm and the state of the virtual content is the first state, the computer system optionally displays or otherwise makes visible (e.g., with optical passthrough) a virtual representation of the user's arm with the first visual effect applied to (e.g., overlaid on, filtering, and/or otherwise modifying) the representation of the user's arm such that the representation of the user's arm appears to be tinted, dimmed, or otherwise visually altered in accordance with the first visual effect. In some embodiments, if the state of the virtual content is not the first state, then depending on the state of the virtual content (e.g., whether the virtual content is in a second state, a third state, or another state), the computer system optionally displays or otherwise makes visible the user's arm without any visual effect (e.g., such that its appearance is in the three-dimensional environment is similar to its appearance in the physical world) or displays the representation of the user's arm with a second visual effect applied to the representation of the user's arm such that the representation of the user's arm appears to be tinted, dimmed, or otherwise visually altered in accordance with the second visual effect. For example, if the user moves their arm into the field of view of the device while the three-dimensional environment is dimmed (based on a state of the virtual content), the representation of the user's arm is optionally also dimmed to avoid distracting the user and to maintain the realism of the three-dimensional environment. Presenting a representation of a portion of the user that moves into the field of view of the device with a visual effect applied (or not applied) based on a state of the virtual content provides the user with visual feedback about the position of their body relative to the three-dimensional environment while maintaining a realistic and cohesive visual presentation of the three-dimensional environment.

In some embodiments, detecting the passthrough visibility event (e.g., as described with reference to step 1102*a*) comprises detecting, via the one or more input devices, that the at least the portion of the virtual content has a spatial conflict with at least a portion of the real-world object (such as shown in FIG. 10H), and presenting the representation of the real-world object includes presenting the at least the portion of the real-world object (e.g., presenting the portion 1004*a* of the representation of table 1004 in FIG. 10H). In some embodiments, a spatial conflict exists between virtual content and a real-world object when the virtual content occupies (or attempts to occupy) the same three-dimensional area in the three-dimensional environment as the real-world object; for example, if the virtual content were a real-world object, it would not physically be able to occupy the space because another real-world object is already there. Such a spatial conflict can arise, for example, if the user provides an input to move the virtual content into a location in the three-dimensional environment that is already occupied by a real-world object. In this case, the portion of the real-world object that has a spatial conflict with the virtual content is optionally presented to the user (e.g., displayed or made visible, rather than occluded by the virtual content) so that the user can continue to see objects in the physical environment around them. In some embodiments, if the virtual content is in the first state, the computer system displays or otherwise makes visible (e.g., with optical passthrough) a representation of the portion of the real-world object with the first visual effect applied to (e.g., overlaid on) the representation of the portion of the real-world object such that the representation of the portion of the real-world object appears to be tinted, dimmed, or otherwise visually altered in accordance with the first visual effect. In some embodiments, if the state of the virtual content is not the first state, then depending on the state of the virtual content (e.g., whether the virtual content is in a second state, a third state, or another state), the computer system optionally displays or otherwise makes visible the portion of the real-world object without any visual effect (e.g., such that its appearance is in the three-dimensional environment is similar to its appearance in the physical world) or displays the representation of the portion of the real-world object with a second visual effect applied to the representation of the real-world object such that the representation of the real-world object appears to be tinted, dimmed, or otherwise visually altered in accordance with the second visual effect. Presenting a representation of a real-world object that has a spatial conflict with the virtual content provides the user with visual feedback about their physical environment relative to the three-dimensional environment. Presenting the representation of the real-world object with a visual effect applied (or not applied) based on a state of the virtual content reduces distractions associated with presenting the representation of the real-world object and provides a more realistic and cohesive visual presentation of the three-dimensional environment.

In some embodiments, detecting the passthrough visibility event (e.g., as described with reference to step 1102*a*) comprises detecting, via the one or more input devices, that the real-world object has moved to within (e.g., has reached and/or crossed) a threshold distance (e.g., within 0.001, 0.1, 0.5, 1, 1.5, 3, 5, or 10 m) of a location (e.g., a physical location) of the user in the physical environment, such as shown in FIG. 10I. For example, if a person (an example of a real-world object) walks towards the user in the physical environment and moves to within the threshold distance of the user, a representation of the person (or optionally, only the portion of the person that is within the threshold distance of the user) is optionally presented to the user (e.g., displayed or made visible, rather than occluded by the virtual content) so that the user can see the person moving towards them. In some embodiments, if the virtual content is in the first state, the computer system displays or otherwise makes visible (e.g., with optical passthrough) a representation of the person with the first visual effect applied to (e.g., overlaid on) the representation of the person, such as described earlier with reference to applying the first visual effect to the representation of the real-world object. In some embodiments, if the state of the virtual content is not the first state, then depending on the state of the virtual content (e.g., whether the virtual content is in a second state, a third state, or another state), the computer system optionally displays or otherwise makes visible the person without any visual effect or displays the representation of the person with a second visual effect applied to the representation person, such as described earlier with reference to the representation of the real-world object. Presenting a representation of a real-world object that moves within a threshold distance of the user alerts the user that a real-world object has moved close to them, thereby providing the user with visual feedback about their physical environment. Presenting the representation of the real-world object with a visual effect applied (or not applied) based on a state of the virtual content reduces distractions associated with presenting the representation of the real-world object and provides a more realistic and cohesive visual presentation of the three-dimensional environment.

In some embodiments, detecting the passthrough visibility event (e.g., as described with reference to step 1102*a*) comprises detecting, via the one or more input devices, that a viewpoint of the user is directed towards a boundary of the virtual content, (e.g., a discrete edge of the virtual content, beyond which the virtual content is not displayed) wherein the real-world object is overlaid by the at least the portion of the virtual content, (e.g., partially or fully occluded by the virtual content from the viewpoint of the user, such as when an edge of the virtual content is near the real-world object and/or traverses the real-world object) and wherein the at least the portion of the virtual content is adjacent to (e.g., within a threshold distance, such as 0.01, 0.1, 0.5, 1, 1.5, 3, 5, or 10 m of) the boundary of the virtual content, such as shown in FIG. 10J (e.g., the portion of the virtual content that is near the discrete edge, such as in a boundary region, optionally a region in which the virtual content visually fades out according to a spatial gradient). For example, if a boundary of the virtual content is near a coffee table and a portion of the virtual content near the boundary overlays the coffee table, a representation of the coffee table (or optionally, only the portion of the coffee table that is overlaid by the virtual content) is optionally presented to the user (e.g., displayed or made visible, rather than occluded by the virtual content) so that the user can see the coffee table. The computer system optionally applies a visual effect to the coffee table based on the state of the virtual content, as described earlier. In some embodiments, the boundary is in a vertical plane (e.g., a left-right edge of the virtual environment, from the viewpoint of the user) and excludes a top and/or bottom edge of the virtual environment such that the visual effect is applied to real-world objects next to a left-right edge of the virtual environment and the visual effect is not applied to real-world objects that lie between a top and/or bottom edge of the virtual environment (e.g., coincident with a floor or ceiling of the three-dimensional environment) and the viewpoint of the user. Presenting a representation of a real-world object near the boundary of the virtual content provides the user with visual feedback about their physical environment. Presenting the representation of the real-world object with a visual effect applied (or not applied) based on a state of the virtual content reduces distractions associated with presenting the representation of the real-world object and provides a more realistic and cohesive visual presentation of the three-dimensional environment.

In some embodiments, detecting the passthrough visibility event (e.g., as described with reference to step 1102*a*) comprises detecting, via the one or more input devices, that a viewpoint of the user (e.g., within the three-dimensional environment) has moved more than a threshold distance (e.g., more than 0.01, 0.1, 0.5, 1, 1.5, 3, 5, or 10 m) from a location of the viewpoint of the user when the virtual content was first displayed, such as shown in FIGS. 10L-10M (e.g., from the location of the viewpoint of the user when the user requested the display of the virtual content and/or when the virtual content was launched). In some embodiments, the computer system detects that a viewpoint of the user has moved based on detecting that the user has moved within the physical environment of the user (e.g., based on data detected by cameras, accelerometers, or other input devices). For example, if the viewpoint of the user is in a first location in the three-dimensional environment when the virtual content is first displayed, and the user walks away from that location (e.g., by walking in their physical environment), the computer system optionally presents a representation of some or all of the physical environment (e.g., including one or more real-world objects) around the user, optionally with a visual effect applied to the representation of the physical environment based on the state of the virtual content (e.g., as described earlier). Optionally, the computer system gradually reduces a visual prominence of the virtual content (e.g., by increasing transparency and/or decreasing display area and/or size) relative to the representation of the physical environment in accordance with the movement of the user. For example, as the user moves toward and/or beyond the threshold distance, the virtual content becomes increasingly transparent and/or shrinks in size, optionally until it ceases to be displayed. Optionally, the computer system ceases to display the virtual content. Presenting a representation of some or all of the physical environment of the user when the user moves more than a threshold distance in the physical environment provides the user with visual feedback about their physical environment. Presenting the representation of the physical environment with a visual effect applied (or not applied) based on a state of the virtual content reduces distractions associated with presenting the representation of the physical environment and provides a more realistic and cohesive visual presentation of the three-dimensional environment.

In some embodiments, detecting the passthrough visibility event (e.g., as described with reference to step 1102*a*) comprises detecting, via the one or more input devices, a user input (e.g., a touch, button, gesture, gaze, and/or verbal input, as described earlier) corresponding to a request to cease to display an application associated with the virtual content (e.g., an application associated with displaying the virtual content, generating the virtual content, and/or interacting with the virtual content) in the three-dimensional environment, such as a request to cease to display virtual object 1006*a* and/or virtual environment 1020*a* of FIG. 10A, thereby allowing additional portions of representation of physical environment 1008 to become visible. In some embodiments, displaying the virtual content includes displaying the application associated with the virtual content. In some embodiments, displaying the application includes displaying affordances or other virtual elements associated with displaying and/or interacting with the virtual content, such as transport controls, editing controls, menus, an exit button (to close the virtual content and/or the application), and/or other virtual elements. In some embodiments, the request to cease to display the application includes a request to switch to a different application and/or a request to close the application. In some embodiments, ceasing to display the application associated with the virtual content includes ceasing to display an application window of the application, such as an application window in which the virtual content is displayed, and/or ceasing to display the virtual content itself. In some embodiments, when the computer system ceases to display the application associated with the virtual content, the computer system presents a representation of the physical environment that was previously overlaid by (e.g., occluded by) the virtual content from the viewpoint of the user. In some embodiments, if the computer system was applying a visual effect (e.g., the first visual effect or another visual effect) to a real-world object based on the state of the virtual content (e.g., as described earlier) while the application was displayed, the computer system ceases to apply the visual effect to the real-world object when the computer system ceases to display the application associated with the virtual content. In some embodiments, after ceasing to display the application associated with the virtual content, the computer system presents a representation of the real-world object with a different visual effect (e.g., based on a state of different virtual content) or presents the representation of the real-world object without a visual effect (e.g., based on a state of different virtual content or based on an absence of a display of virtual content). Presenting a representation of some or all of the physical environment of the user (e.g., that was previously occluded by an application) when an application ceases to be displayed provides the user with visual feedback about their physical environment. Presenting the representation of some or all of the physical environment with or without a visual effect based on a state of other virtual content in the environment (or based on the lack of other virtual content in the environment) provides a more realistic and cohesive visual presentation of the three-dimensional environment.

In some embodiments, in response to detecting the passthrough visibility event and in accordance with a determination that the state of the virtual content is the second state (e.g., a state that is different from the first state and is optionally not associated with a visual effect), wherein in the second state the virtual content comprises an application window (e.g., a virtual window of an application that is associated with the virtual content and in which the virtual content is displayed, optionally with other virtual elements associated with the application, where the application window is displayed in a vertical plane relative to the three-dimensional environment. Optionally, the virtual content excludes media content; e.g., the application is not a media content application), the representation of the real-world object is presented without a visual effect applied to the representation of the real-world object based on the state of the virtual content being the second state, such as shown in FIG. 10E when virtual object 1006*a* is in the second state because it is an application window. In some embodiments, the computer system does not apply a visual effect to real-world objects when the virtual content is displayed in an application window, such as when the virtual content is text-messaging content in a text-messaging application window, or optionally a media content application displaying media content in a windowed mode (rather than a docked mode or immersive mode as described with references to methods 800, 900, 1300, and/or 1500. Forgoing applying a visual effect when the virtual content is windowed content reduces processing overhead and maintains the visibility and realistic presentation of the real-world object when the windowed content is displayed.

In some embodiments, the virtual content is in a second state (e.g., different from the first state and optionally associated with a second visual effect) when the virtual content comprises a user interface for entering information associated with an application (e.g., for entering text, graphical elements, or other forms of content; for selecting a menu item or affordance; or for entering other types of information) where the user interface is displayed concurrently with an application window associated with the application, such as shown in FIG. 10F. For example, the user interface is optionally a pop-up window of the application for entering information associated with the application, and is optionally partially or full overlaid on the application window. In some embodiments, the user interface is displayed in response to a user input requesting the display of the user interface from the application window, such as a request to enter information into the application window. In some embodiments, the virtual content is in the first state before the user interface is displayed. and in response to detecting the passthrough visibility event (e.g., as described with reference to step 1102*a*) and in accordance with a determination that the virtual content is in the second state, the representation of the physical object is presented with a second visual effect different from the first visual effect, such as illustrated by the visual effect applied to the representation of the user's hand 1010*a* in FIG. 10F. In some embodiments, presenting the representation of the real-world object with the second visual effect includes presenting the representation of the real-world object with a second brightness, second dimming, and/or a second color tint based on the state of the virtual content being the second state. For example, the second state optionally corresponds to a low dimming state, in which the representation of the real-world object is presented with increased dimming (reduced brightness) relative to the ambient lighting in the physical environment and/or relative to the brightness of the virtual content, but with less dimming (more brightness) than is applied when the virtual content is in the first state (e.g., when the application window is displayed without displaying the user interface). Applying an intermediate visual effect when the user is entering information increases the visual prominence of the user interface while maintaining visibility of other portions of the environment.

In some embodiments, the virtual content is in the first state (e.g., as described with reference to step 1102*a*) based at least in part on a determination that attention of the user is directed to the virtual content, such as when the user's attention is directed to virtual object 1006*a* of FIG. 10A. In some embodiments, the computer system determines that the attention of the user is directed to the virtual content when the user is gazing at the virtual content (e.g., as detected by eye-tracking sensors), and/or has activated the content by selecting the virtual content (e.g., by providing a selection input directed to the content, such as by tapping on the content and/or providing an air pinch gesture while gazing at the content), playing the virtual content, or otherwise interacting with the virtual content. In some embodiments, the computer system determines the state of the virtual content based on a setting associated with the virtual content in combination with a determination that the user is directing their attention to the virtual content. For example, if the virtual content is configured to operate in the first state and the user is looking at and/or otherwise directing their attention to the virtual content, the computer system optionally determines, based on the determination that the attention of the user is directed to the virtual content in combination with a determination that the virtual content is configured to operate in the first state, that the virtual content is in the first state. For example, if the virtual content is configured to operate in the first state but the user is not directing their attention to the virtual content, the computer system optionally determines, based on the determination that the user is not directed to the virtual content, that the virtual content is not in the first state (e.g., is in a second state). Applying a first visual effect to the representation of the real-world object based on determining that the user's attention is directed to the real-world object (and forgoing applying the visual effect if the user's attention is not directed to the virtual content) provides an additional layer of control such that the visual effect is only applied when appropriate and/or desirable.

In some embodiments, presenting the representation of the real-world object with the first visual effect (e.g., as described with reference to step 1102*c*) comprises reducing a visual prominence of the representation of the real-world object, such as by dimming the representation of the user's hand 1010*a* in FIG. 10D (e.g., by increasing dimming, reducing brightness, reducing opacity, and/or reducing a tint of the representation of the real-world object relative to the dimming, brightness, opacity, and tint of the real-world object in the physical environment, relative to the three-dimensional environment, relative to the virtual content, and/or relative to the representation of the real-world object presented without the first visual effect). Reducing the visual prominence of the representation of the real-world object reduces distractions associated with presenting the representation of the real-world object, thereby reducing the likelihood of erroneous interactions with the computer system.

In some embodiments, the first visual effect comprises a tint effect (e.g., a color tint) applied to the representation of the real-world object, such as described with reference to FIG. 10A. In some embodiments, the color of the tint is associated with the virtual content (e.g., as a setting associated with the virtual content and/or determined based on characteristics of the virtual content). In some embodiments, the color of the tint corresponds to a color that reduces the visual prominence of the representation of the real-world object (e.g., gray, blue, or another color), or that corresponds to colors of the virtual content (e.g., red if red virtual content is displayed, green if green virtual content is displayed, or blue if blue virtual content is displayed), and/or that corresponds to a time-of-day setting of the three-dimensional environment (e.g., blue for nighttime, yellow for daytime, or another color). Applying a tint to the representation of the real-world object based on various factors reduces distractions associated with presenting the representation of the real-world object, thereby reducing the likelihood of erroneous interactions with the computer system.

In some embodiments, the virtual content includes virtual media content and the tint effect is associated with one or more colors included in the virtual media content, such as described with reference to FIGS. 10N and 10N1. For example, the tint effect is optionally based on one or more colors of the media content such that the tint effect simulates the indirect simulated lighting effect of the media content outside of the media content (e.g., the tint that would be cast on the environment outside of the media content if the media content were real-world content). Applying a tint to the real-world object that is based on the media content results in the real-world object blending in with the three-dimensional environment, reducing distractions associated with presenting the representation of the real-world object and improving the realism of the environment, thereby reducing the likelihood of erroneous interactions with the computer system.

In some embodiments, the virtual content is associated with an application (e.g., as described earlier), and the tint effect is selected (e.g., by the computer system) based on the application associated with the virtual content, such as if virtual object 1006*a* in FIG. 10D is associated with an application and selects the tint effect applied to the representation of the user's hand 1010*b*. For example, the computer system optionally selects a first tint effect when the virtual content is associated with a first application (such as a media application) and a second tint when the virtual content is associated with a second application (such as a gaming application). Optionally, the computer system selects the tint effect based on a setting associated with the application (e.g., a configuration setting that specifies the tint). For example, different applications are optionally configured to request different tint effects. Applying an application-specific tint effect to the representation of the real-world object enables more granular control (e.g., by the computer system and/or by the application developers) over the application of the visual effect relative to the virtual content, reducing distractions associated with presenting the representation of the real-world object and improving the realism of the environment, thereby reducing the likelihood of erroneous interactions with the computer system.

In some embodiments, the first visual effect comprises a change in saturation (e.g., the intensity of a color) of the representation of the real-world object, such as if the visual effect applied to representation of the user's hand 1010*b* in FIG. 10D included changing the saturation of the representation of the user's hand 1010*b* (e.g., relative to its saturation prior to detecting the passthrough visibility event, relative to the virtual content, relative to the rest of the three-dimensional environment, and/or relative to the representation of the real-world object presented without the first visual effect or any visual effect). For example the first visual effect optionally comprises a reduction in the saturation of the real-world object (e.g., to reduce its visual prominence), or an increase in the saturation of the real-world object (e.g., to increase its visual prominence. Changing the saturation of the representation of the real-world object reduces distractions associated with presenting the representation of the real-world object, thereby reducing the likelihood of erroneous interactions with the computer system.

In some embodiments, the virtual content includes an application window (e.g., as described earlier, and as shown in FIG. 10E, for example) and a virtual environment (e.g., a computer-generated and/or simulated three-dimensional environment, such as virtual environment 1020*a*), and the first visual effect is based at least in part on the application window and on the virtual environment, such as described with reference to FIG. 10D. In some embodiments, a virtual environment represents a simulated physical space. Some examples of a virtual environment include a lake environment, a mountain environment, a sunset scene, a sunrise scene, a nighttime environment, a grassland environment, and/or a concert scene. In some embodiments, a virtual environment is based on a real physical location, such as a museum, and/or an aquarium. In some embodiments, a virtual environment is an artist-designed location. Thus, displaying a virtual environment optionally provides the user with a virtual experience as if the user is physically located in the virtual environment. In some embodiments, the first visual effect optionally includes a first tint effect, where the color of the tint is based on the color(s) of both the application window and the virtual environment to provide a combined tint effect, such as a superposition or combination of a tint effect associated with the application window and a tint effect associated with the virtual environment. For example, the first visual effect optionally includes a first amount of dimming, where the amount of dimming is based on a combination of a dimming setting associated with the application window and a dimming setting associated with the virtual environment. Applying a visual effect to the representation of the real-world object based on both the application window and the virtual environment reduces distractions associated with presenting the representation of the real-world object, thereby reducing the likelihood of erroneous interactions with the computer system.

In some embodiments, the virtual content includes a virtual environment (e.g., as described earlier) and presenting the representation of the real-world object with the first visual effect applied to the representation of the real-world object (e.g., as described with reference to step 1102*a*) comprises, in accordance with a determination that the virtual environment is a first virtual environment (e.g., if the virtual environment was virtual environment 1020*a* of FIG. 10A), presenting the representation of the real-world object with the first visual effect including a first tint effect associated with the first virtual environment. In some embodiments, the first tint effect corresponds to tinting the representation of the real-world object with a first color that is based on the color(s) of the first virtual environment.

In some embodiments, the virtual content includes a virtual environment (e.g., as described earlier) and presenting the representation of the real-world object with the first visual effect applied to the representation of the real-world object (e.g., as described with reference to step 1102*c*) comprises, in accordance with a determination that the virtual environment is a second virtual environment different from the first virtual environment (e.g., if the virtual environment was virtual environment 1020*b* of FIG. 10B), presenting the representation of the real-world object with the first visual effect including a second tint effect associated with the second virtual environment, the second tint effect different from the first tint effect. For example, if the virtual environment of FIG. 10D were virtual environment 1020*b* instead of virtual environment 1020*a*, the visual effect would optionally be different than shown in FIG. 10D. In some embodiments, the second tint effect corresponds to tinting the representation of the real-world object with a second color that is based on the color(s) of the second virtual environment. In some embodiments, different virtual environments are associated with (e.g., request) different tints, and the computer system applies a tint based on the request from the virtual environment. Applying a tint to the representation of the real-world object based on the particular virtual environment that is displayed reduces distractions associated with presenting the representation of the real-world object, thereby reducing the likelihood of erroneous interactions with the computer system.

In some embodiments, before presenting the representation of the real-world object with the first visual effect applied to the representation of the real-world object, the computer system presents the representation of the real-world object without the first visual effect applied to the representation of the real-world object, such as described with reference to FIG. 10A. Optionally, the representation of the real-world object is presented without any visual effect applied to the representation of the real-world object or is presented with a second (different) visual effect applied to the representation of the real-world object. For example, the representation of the real-world object is optionally presented without the first visual effect before the virtual environment associated with the first visual effect is displayed.

In some embodiments, while presenting the representation of the real-world object without the first visual effect applied to the representation of the real-world object (e.g., as described above), the computer system detects a request to display the virtual environment. Optionally, the request to display the virtual environment includes a user input selecting the virtual environment for display. Optionally, the virtual environment is displayed in response to a request from the computer system or from another computer system in communication with the computer system.

In some embodiments, in response to detecting the request to display the virtual environment, the computer system displays the virtual environment, wherein the representation of the real-world object is presented with the first visual effect applied to the representation of the real-world object (e.g., as described with reference to claim 1) based on (e.g., after and/or while) displaying the virtual environment, such as described with reference to FIG. 10A. For example, a visual effect associated with the virtual environment is optionally applied to the representation of the user's hand 1010*b*. Applying the visual effect to the representation of the real-world object when the virtual environment is displayed (and not before the virtual environment is displayed) reduces distractions associated with presenting the representation of the real-world object, thereby reducing the likelihood of erroneous interactions with the computer system.

It should be understood that the particular order in which the operations in method 1100 have been described is merely exemplary and is not intended to indicate that the described order is the only order in which the operations could be performed. One of ordinary skill in the art would recognize various ways to reorder the operations described herein.

FIGS. 12A-12Q illustrate examples of a computer system applying a visual effect to a background (e.g., including a virtual environment and/or a representation of a physical environment) based on a state of the background and in response to detecting various events.

FIG. 12A illustrates a computer system (e.g., an electronic device) 101 that is presenting (e.g., displaying or otherwise making visible, such as via optical passthrough), via a display generation component (e.g., display generation component 120 of FIG. 1), a three-dimensional environment 1202 from a viewpoint of a user (e.g., user 1210) of the computer system 101 (e.g., facing the back wall of the physical environment in which computer system 101 is located). In some embodiments, computer system 101 includes a display generation component (e.g., a touch screen), a plurality of image sensors (e.g., image sensors 314 of FIG. 3), and one or more physical or solid-state buttons 1203. The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces (e.g., virtual environments and/or other virtual content) illustrated and described below could also be implemented on a head-mounted display that includes a display generation component that displays the user interface or three-dimensional environment to the user, and sensors to detect the physical environment and/or movements of the user's hands (e.g., external sensors facing outwards from the user), and/or attention (e.g., gaze) of the user (e.g., internal sensors facing inwards towards the face of the user).

In the example of FIG. 12A, the computer system 101 displays, in the three-dimensional environment 1202, virtual content 1206*a* (e.g., as described with reference to methods 800, 900, 1100, 1300, 1500) while a background that includes a first virtual environment 1220*a* and a representation of a physical environment 1208 (e.g., as described with reference to methods 1100 and/or 1300) is visible in the three-dimensional environment 1202. For example, the background is visible because it is displayed by computer system 101 and/or is visible via optical passthrough. Optionally, some or all of the background appears to be behind the virtual content 1206, such as at a greater depth than the virtual content 1206 from the perspective of the user 1210 (e.g., as depicted by the spatial relationships shown in overhead view 1212). For example, the virtual content 1206*a* optionally obscures a portion of the background from the perspective of the user 1210. In FIG. 12A, the background is in a first state (indicated by the legend "State 1") that optionally corresponds to a light time-of-day setting (e.g., in which the virtual environment 1220*a* and/or representation of physical environment 1208 are displayed with a daytime brightness and/or tint, such as described with reference to method 1300). Optionally, virtual content 1206*a* is associated with a visual effect such as described with reference to methods 1100, 1300, and/or 1500. For example, virtual content 1206*a* optionally is associated with a dimming effect (e.g., to dim the background relative to the virtual content 1206*a* such that the virtual content 1206*a* is more visually prominent than the background) and/or a tinting effect (e.g., to tint the background a particular color, and/or to change a saturation of the background, such as to change it from color to black and white). In FIG. 12A, the user 1210 is currently directing their attention away from virtual content 1206*a*, such as by looking elsewhere in three-dimensional environment 1202 (e.g., indicated by gaze point 1205*a*), and the visual effect associated with virtual content 1206*a* is not applied to the background (e.g., to virtual environment 1220*a* and representation of physical environment 1208). In some embodiments, in accordance with a determination that the user 1210 is not directing their attention to the virtual content 1206*a*, the computer system 101 forgoes applying a visual effect associated with the virtual content 1206*a*.

Figure 12B:
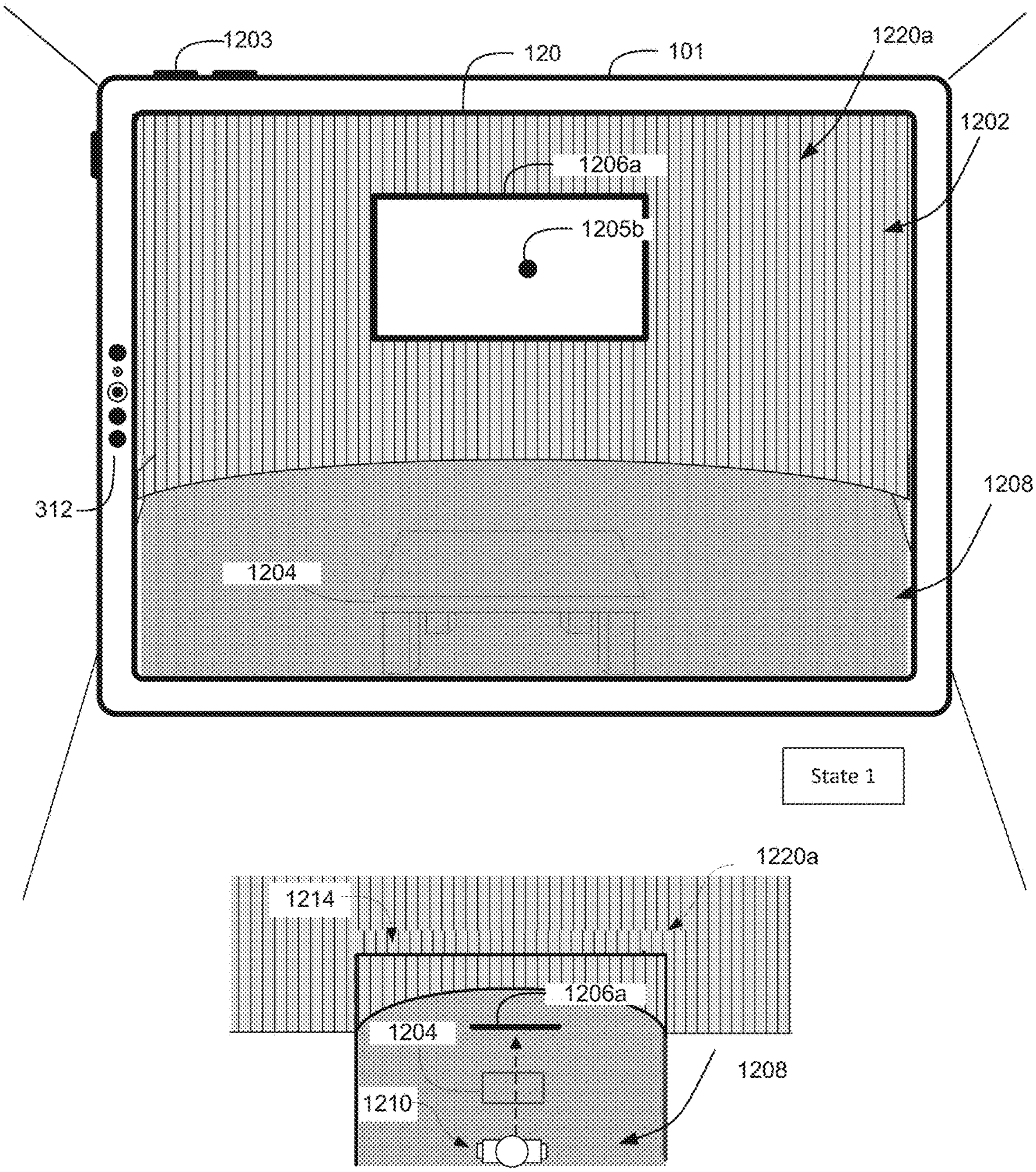

From FIG. 12A to FIG. 12B, the user 1210 has directed their attention to virtual content 1206*a*, such as by looking at virtual content 1206*a* (e.g., indicated by gaze point 1205*b*) and/or providing inputs directed to virtual content 1206. In response to detecting that the user has directed their attention to virtual content 1206*a*, and in accordance with a determination that the background is in the first state, the computer system 101 applies the visual effect associated with the virtual content 1206*a* to the background, such as by dimming and/or tinting the background in accordance with the visual effect. In the example of FIG. 12B, the computer system 101 dims and/or tints virtual environment 1220*a* and representation of physical environment 1208 (e.g., in accordance with the visual effect), as indicated by the patterning and shading on these elements relative to FIG. 12A.

Figure 12C:
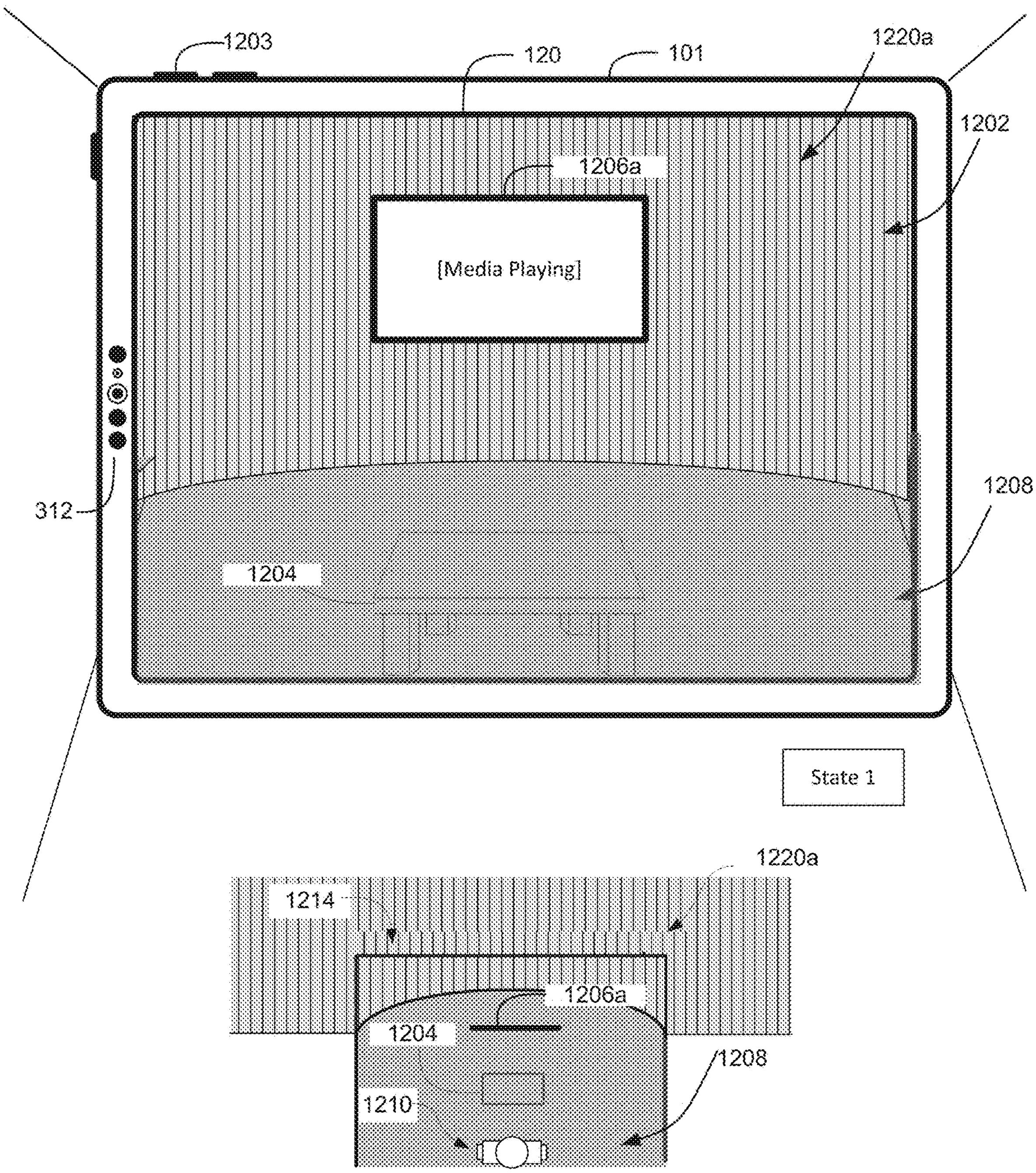
Figure 12D:
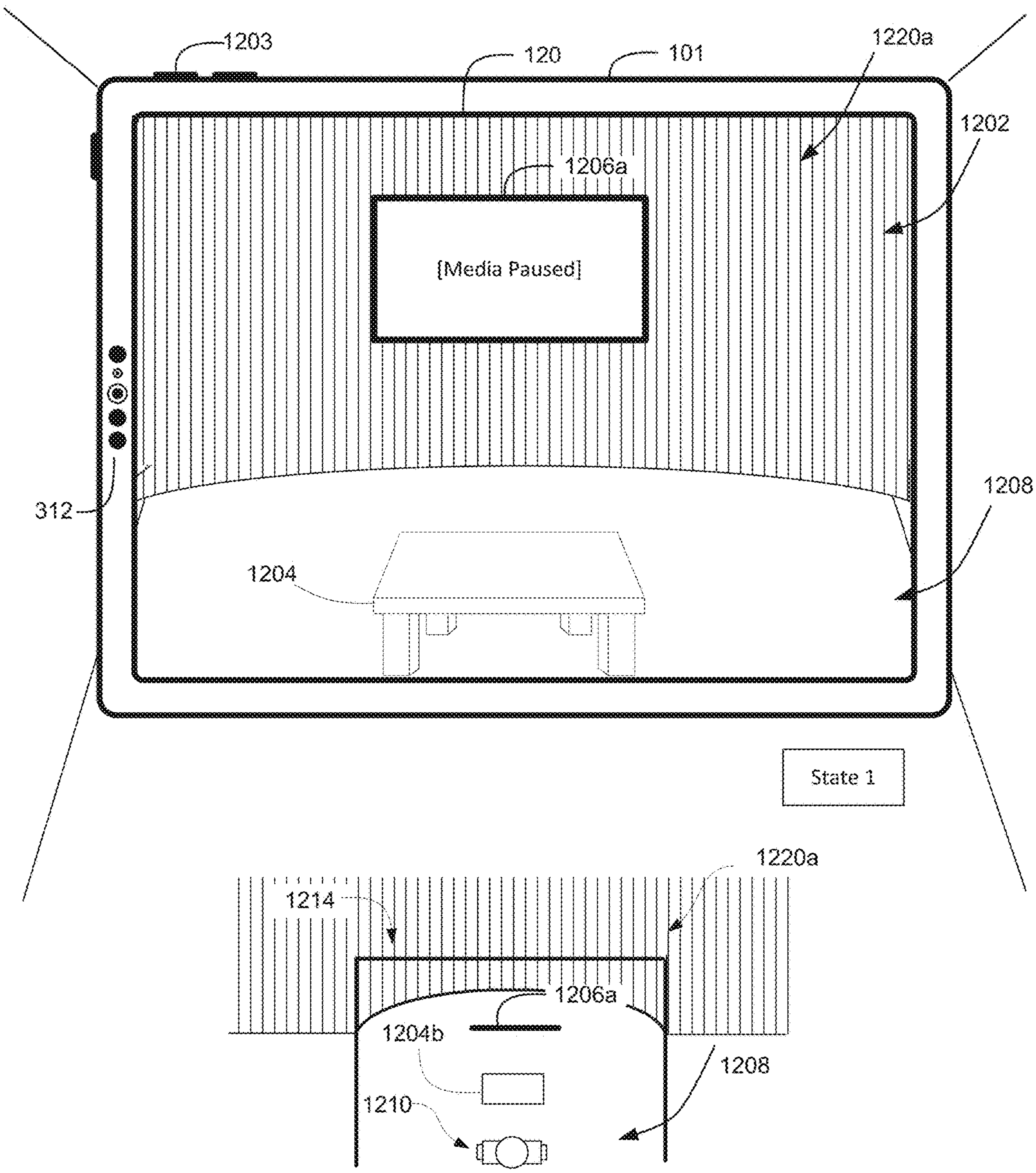

Optionally, if virtual content 1206*a* includes visual media content (e.g., a movie or video), computer system 101 applies or forgoes applying the visual effect to the background based on the state of the media content (e.g., the playback state), such as described with reference to method 1300. For example, computer system 101 optionally applies the visual effect to the background when the media content is playing (e.g., in response to detecting that the user 1210 has directed their attention to the media content), such as shown in FIG. 12C, and forgoes applying the visual effect to the background when the media content is stopped or paused, such as shown in FIG. 12D. For example, the computer system 101 optionally does not apply the visual effect to the background when the media content is stopped or paused even when the computer system 101 detects that the user 1210 has directed their attention to the media content, such as depicted by the example of FIG. 12D. Optionally, computer system 101 applies the visual effect when the media content is playing (e.g., as shown in FIG. 12C) without changing the state of the background (e.g., in FIG. 12C, the background is still in the first state after and/or while computer system 101 applies the visual effect to the background).

Figure 12E:
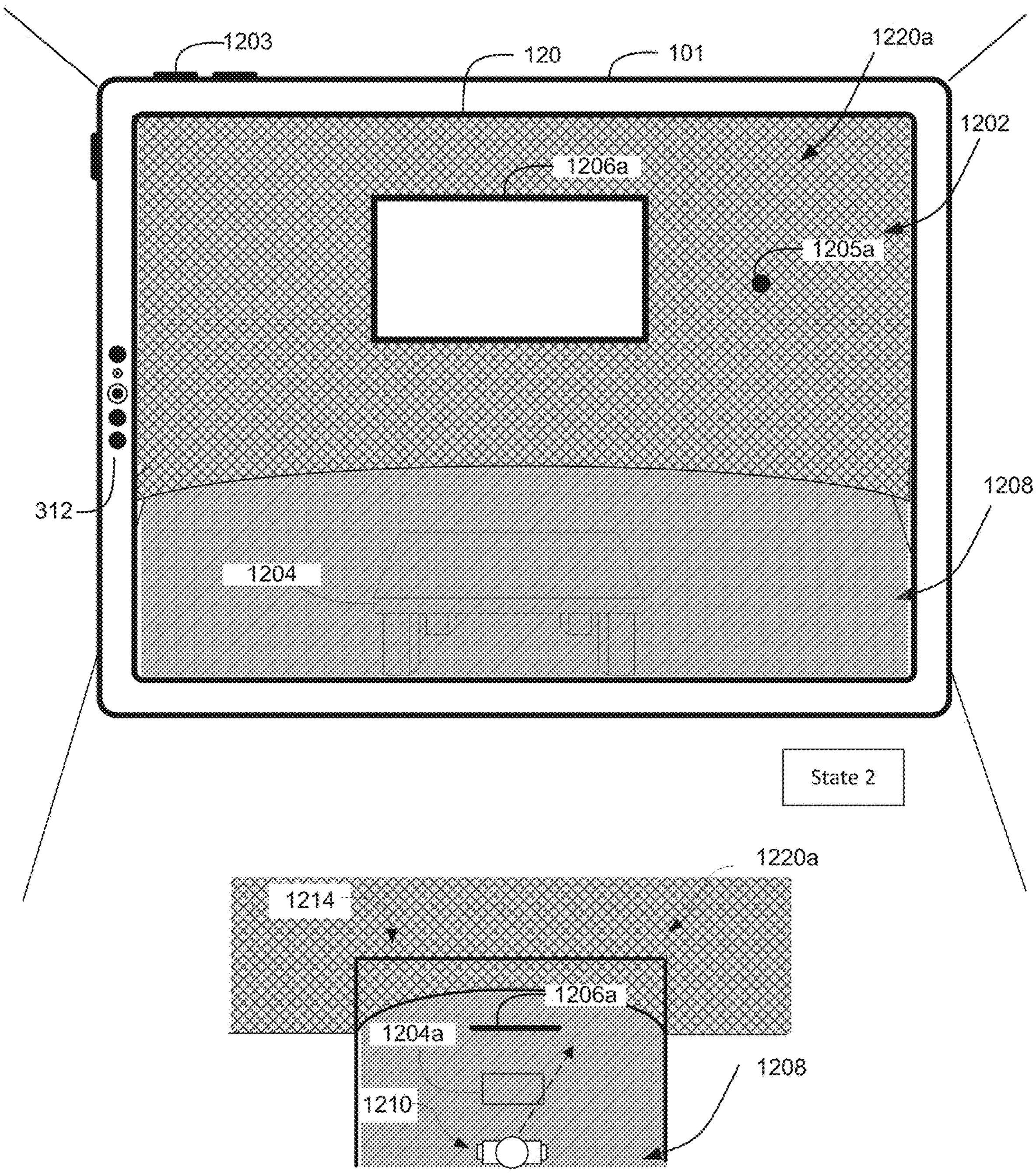
Figure 12F:
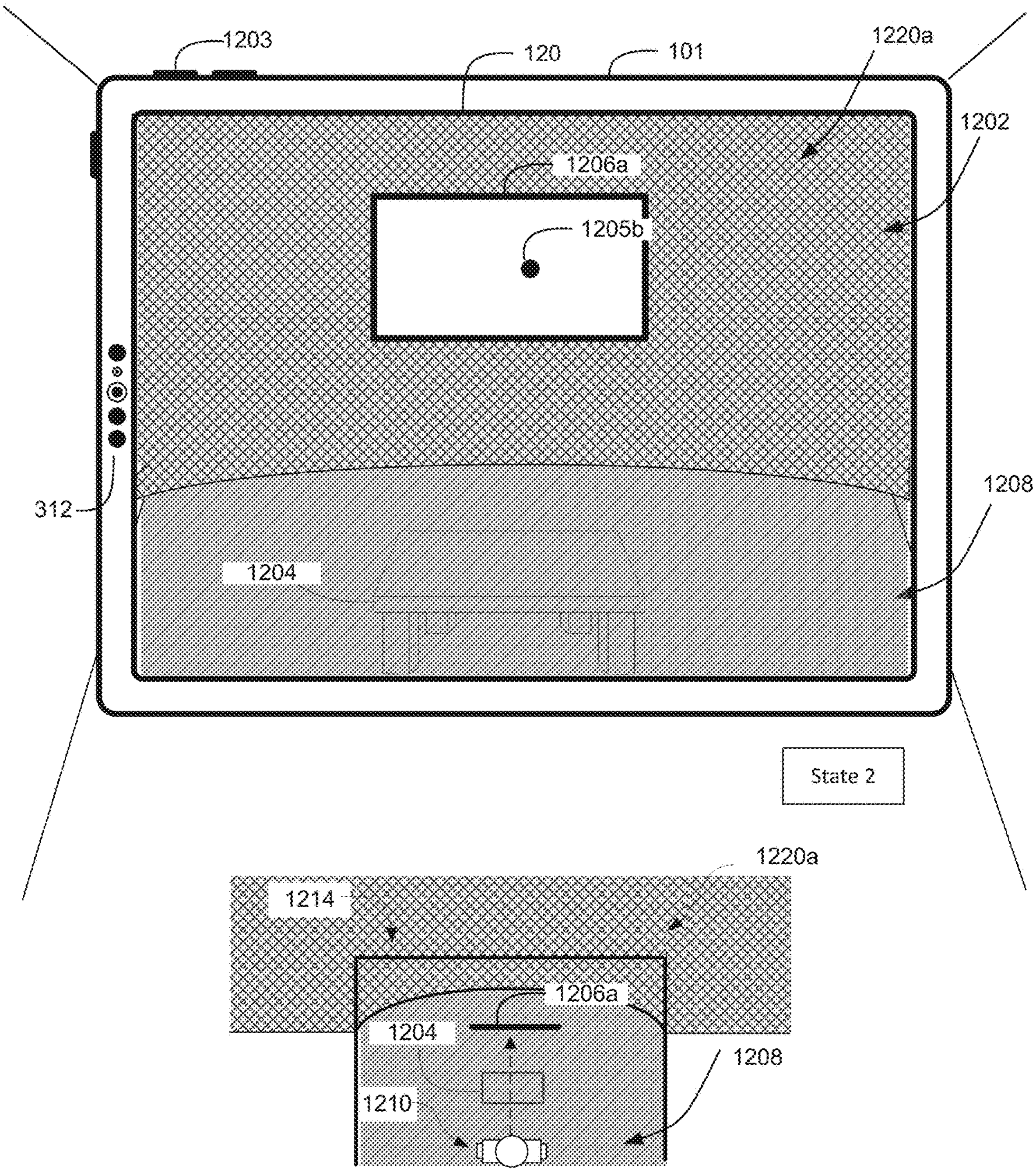

FIGS. 12E to 12F depict an alternative to FIGS. 12A and 12B, in which the background is in a second state that optionally corresponds to a dark time-of-day setting (e.g., in which the virtual environment 1220*a* and/or representation of physical environment 1208 are displayed with a nighttime brightness and/or tint, such as described with reference to method 1300). For example, virtual environment 1220*a* and/or representation of physical environment 1208 are optionally displayed by computer system 101 with less brightness (more dimming) when operating in the second state than when operating in the first state and/or with a different color tint. Optionally, virtual environment 1220*a* includes different virtual elements when displayed in the second state then when displayed in the first state, such as by including a sun when virtual environment 1220*a* is displayed in the first state and including a moon when virtual environment 1220*a* is displayed in the second state. Optionally, when the background is in the second state, computer system 101 forgoes applying the visual effect to the background even when the attention of the user is directed to the virtual content 1206*a* associated with the visual effect, such as depicted by the sequence of FIGS. 12E to 12F. For example, in FIG. 12F, the computer system 101 optionally presents the background without the visual effect (even though the user's attention is directed to virtual content 1206*a*) because the background in the second state is optionally already dimmed and/or tinted (e.g., based on the background operating in the second state).

In some embodiments, the computer system 101 applies the visual effect to the background in response to detecting that the state of the background has changed from the second state to the first state. For example, in FIG. 12F, the computer system 101 forgoes applying the visual effect because the background is in the second state (e.g., as described above). In some embodiments, if the state of the background changes from the second state to the first state, computer system 101 optionally applies the visual effect to the background (e.g., as shown in FIG. 12B) in response to detecting that the background has changed to the first state (and optionally, in response to a determination that the user 1210 is directing their attention to the virtual content 1206*a*).

In some embodiments, the computer system 101 ceases to apply the visual effect in response to detecting that the state of the background has changed from the first state to the second state. For example, if computer system 101 is applying the visual effect as shown in FIG. 12B (e.g., while the background is in the first state) and detects that the background has changed to the second state, computer system 101 optionally ceases to display the visual effect (e.g., forgoes displaying the visual effect) in response to detecting that the background has changed to the second state, such as shown in FIG. 12F.

Optionally, computer system 101 changes the state of the background to the second state in response to detecting a user input corresponding to a request to dock media content, such as described with reference to method 1300. For example, in FIG. 12G, the user has requested to dock the virtual content 1206*a* (e.g., including visual media content) within virtual environment 1220*a*, and in response to detecting the request, the computer system 101 docks the virtual content 1206*a* and sets the state of the background to the second state (e.g., by either changing to the second state from another state, or by maintaining the state of the background in the second state if the background is already in the second state). Optionally, docking the virtual content 1206*a* includes moving the virtual content 1206*a* (e.g., updating a virtual location of the virtual content 1206*a*) to a greater spatial depth (e.g., farther away) relative to the viewpoint of the user 1210, optionally such that it appears (to the user 1210) to be farther away from the user 1210 than a barrier in a physical environment of the user, such as a wall. Optionally, docking the virtual content 1206*a* includes expanding a size of the virtual content 1206*a* relative to its size before docking. For example, docking the virtual content 1206*a* optionally causes the virtual content 1206*a* to appear as though it is a large movie screen located at a spatial depth from the user 1210 similar to what would be experienced in a movie theater, such as to provide a more immersive viewing experience.

Figure 12G:
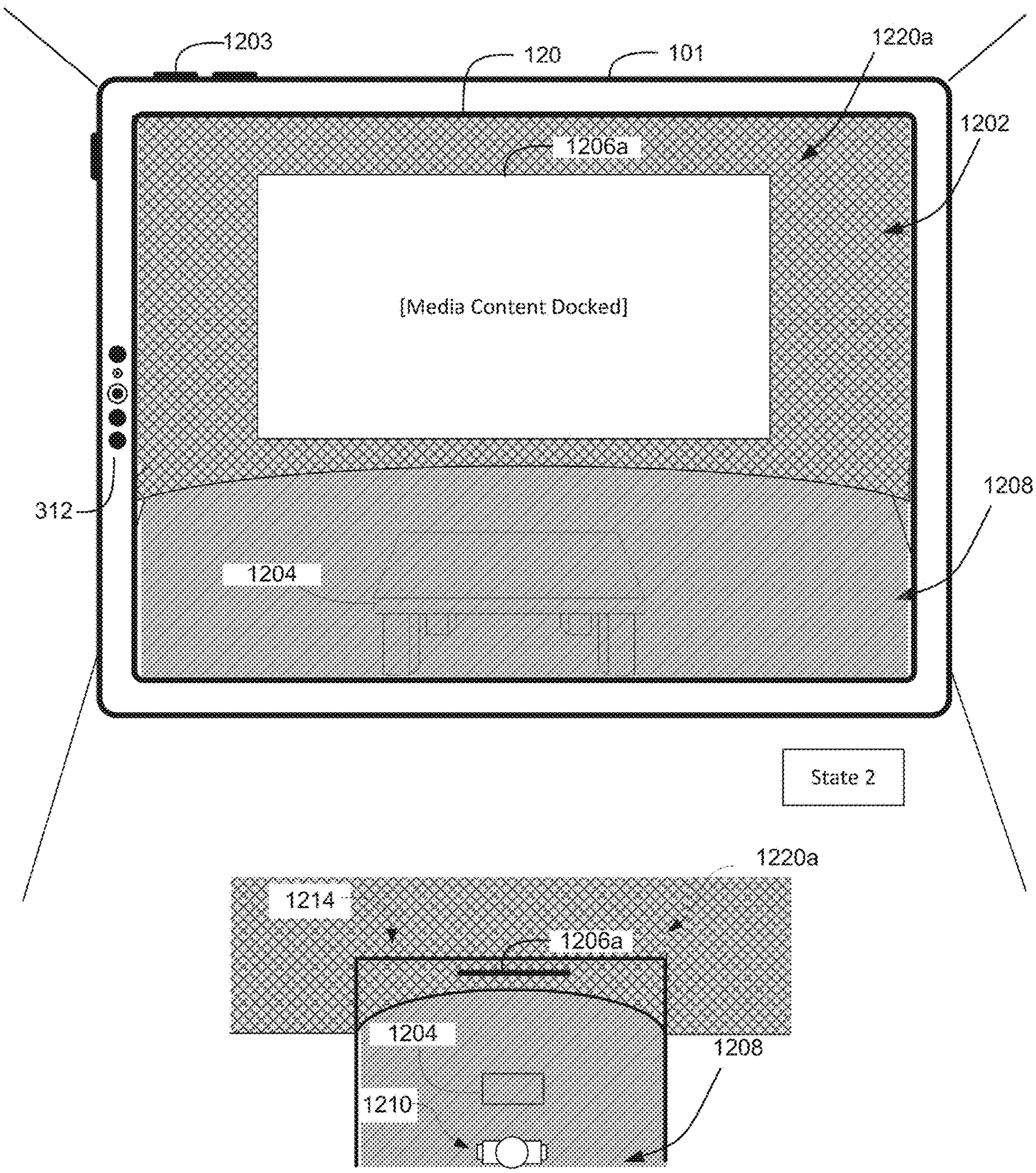

As shown in FIG. 12G, when the background is in the second state, the computer system 101 applies a visual effect to the background based on the background being in the second state, such as indicated by the shading and patterning shown in FIG. 12G (which is optionally the same as that shown in FIG. 12F, based on the background also being in the second state in FIG. 12F).

In some embodiments, the computer system 101 selects a visual effect to apply to the background based on a virtual environment displayed in the background. For example, the computer system optionally applies different visual effects to the background depending on which virtual environment is displayed in the background.

Figure 12H:
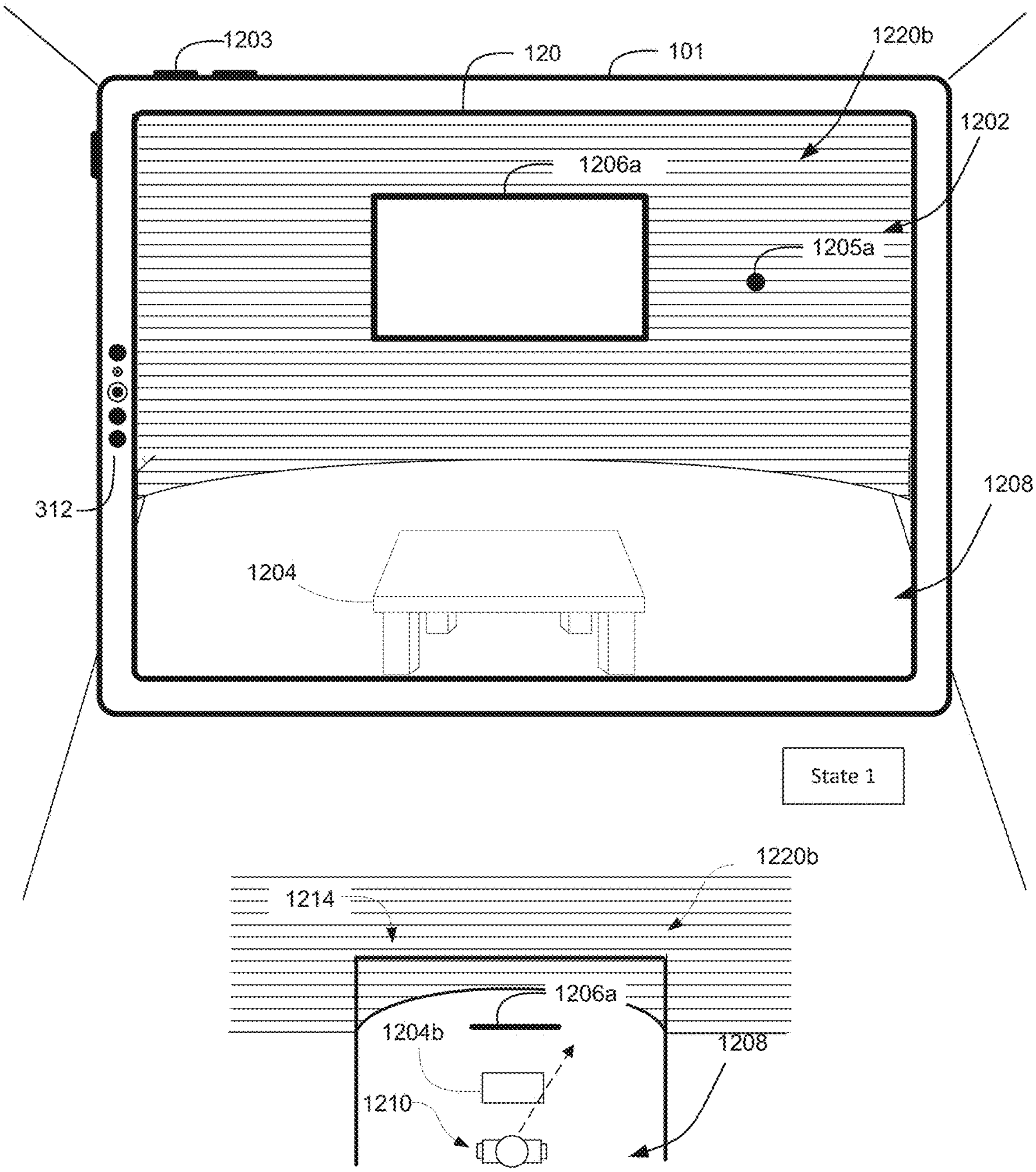
Figure 12I:
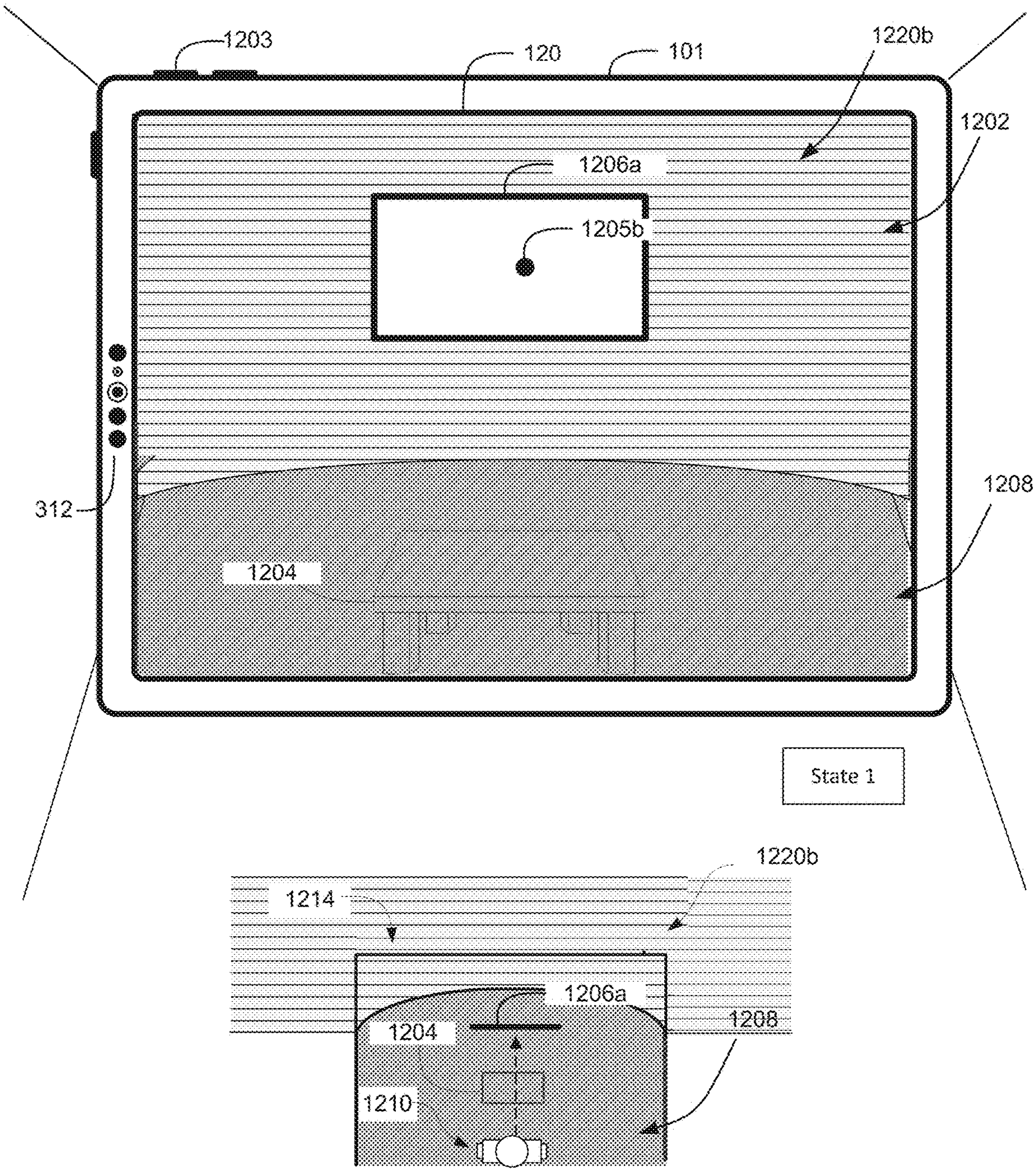

For example, FIGS. 12H and 12I depict an alternative to FIGS. 12A and 12B, in which computer system 101 is displaying a second virtual environment 1220*b* (different from virtual environment 1220*a* shown in FIGS. 12A and 12B). In response to detecting that the attention of the user is directed to the virtual content 1206*a* (and/or in response to detecting that the background is operating in the first state or has changed to operating in the first state), computer system 101 applies a second visual effect to the background (e.g., to second virtual environment 1220*b* and/or representation of physical environment 1208). The second visual effect is optionally different from the visual effect depicted in FIG. 12B, such as indicated by the different patterning and shading in FIG. 12I relative to FIG. 12B.

Figure 12J:
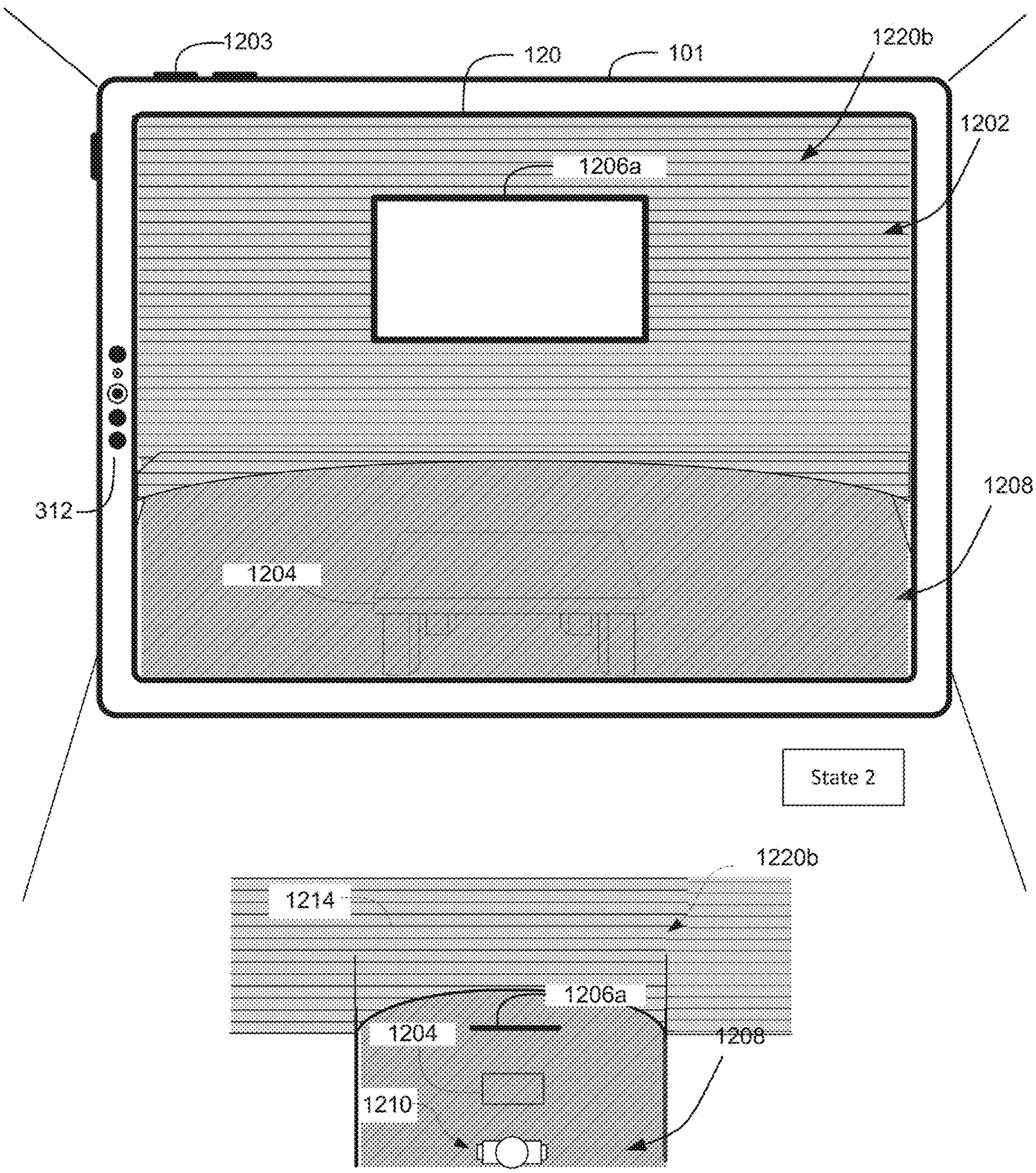

In some embodiments, when the background is in the second state, the computer system 101 applies the same tint to the background (e.g., a tint corresponding to the second state) independent of which virtual environment is displayed, or applies the same tint to the background for multiple different virtual environments. For example, returning to FIG. 12F, computer system 101 applies a first tint to virtual environment 1220*a* and/or representation of physical environment 1208 based on the background being in the second state. FIG. 12J depicts an example in which the background includes a different virtual environment than in FIG. 12F, second virtual environment 1220*b*, and the computer system 101 applies the same tint to the background as in FIG. 12F (e.g., in spite of displaying a different virtual environment) based on the background being in the second state.

Figure 12K:
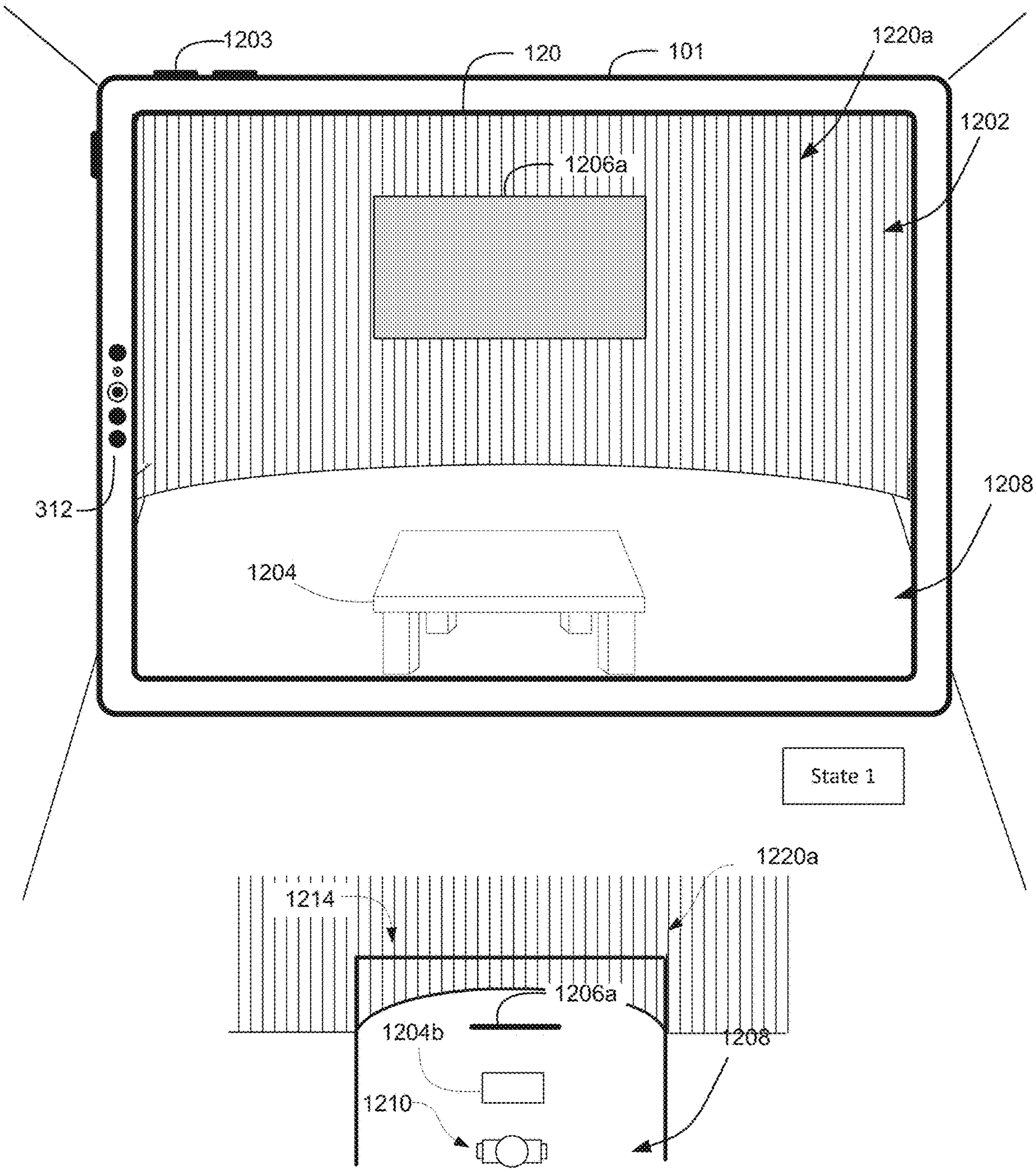

In some embodiments, computer system 101 applies a visual effect associated with virtual content when the virtual content is in an active state, but does not apply the visual effect when the virtual content is not in an active state (such as described with reference to method 1500, for example). FIG. 12K depicts an example in which virtual content 1206*a* is not in an active state, and computer system 101 forgoes applying a visual effect associated with virtual content 1206 based on virtual content 1206*a* not being in the active state (optionally, regardless of whether the user 1210 is directing their attention to virtual content 1206*a*).

Figure 12L:
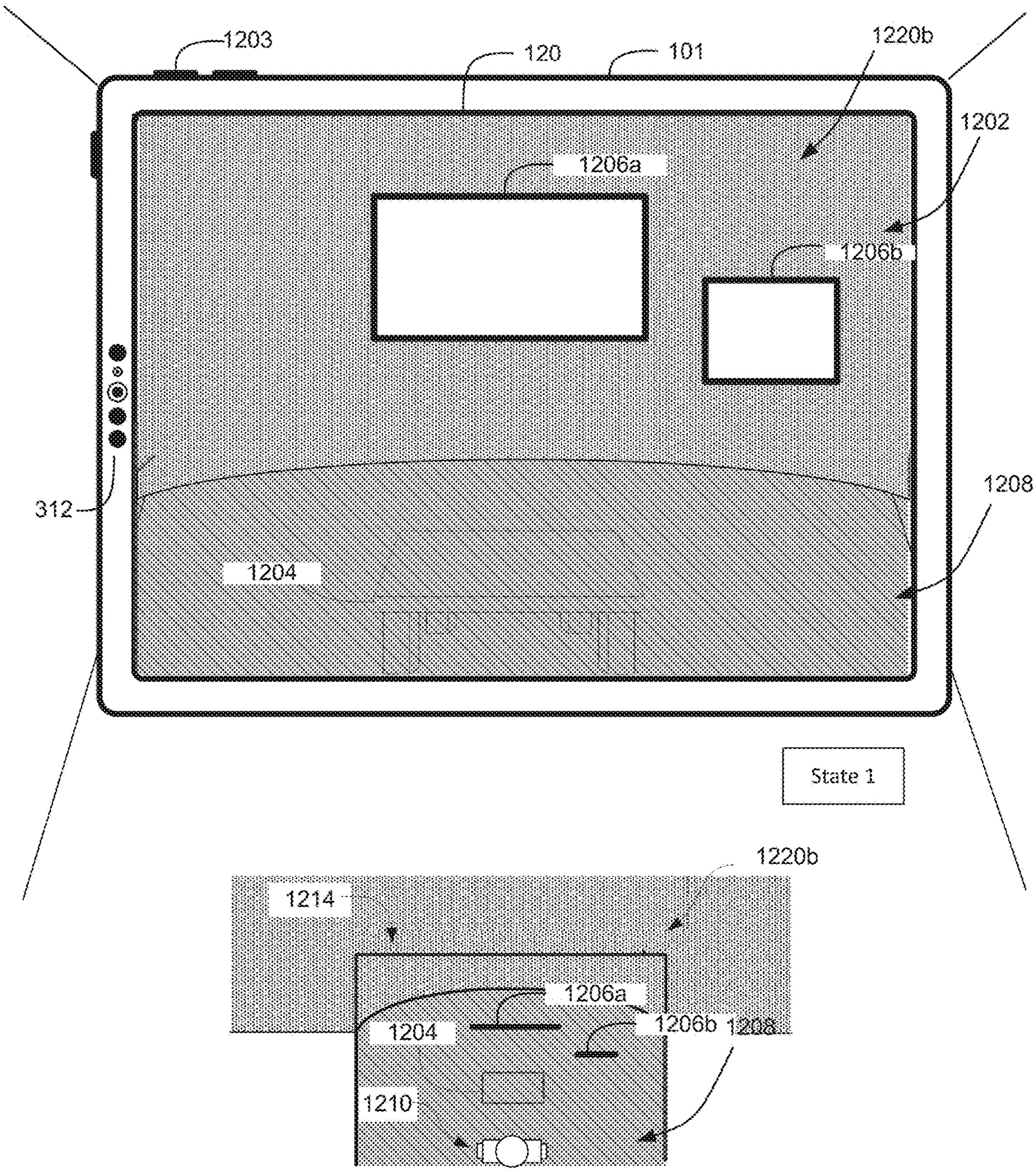

FIG. 12L depicts a three-dimensional environment 1002 that includes virtual content 1206*a* (e.g., optionally associated with a first visual effect as previously described) and virtual application window 1206*b* (e.g., an application window for interacting with an application, such as described with reference to method 1300), along with a background that includes second virtual environment 1220*b* and representation of physical environment 1208. In some embodiments, when an application window 1206*b* is displayed by computer system 101 in three-dimensional environment 1202 such as shown in FIG. 12L, and the application window 1206*b* is associated with a second visual effect, when computer system 101 applies a visual effect to some or all of the background (e.g., to second virtual environment 1220*b* and/or representation of physical environment 1208), computer system applies a visual effect that includes the first visual effect associated with virtual content 1206*a* (if any) and the second visual effect associated with application window 1206*b*. For example, computer system 101 optionally applies a composite visual effect based on the first visual effect and the second visual effect rather than only applying the first visual effect associated with virtual content 1206*a*, such as indicated by the different shading and patterning of FIG. 12L relative to FIG. 12I.

Figure 12M:
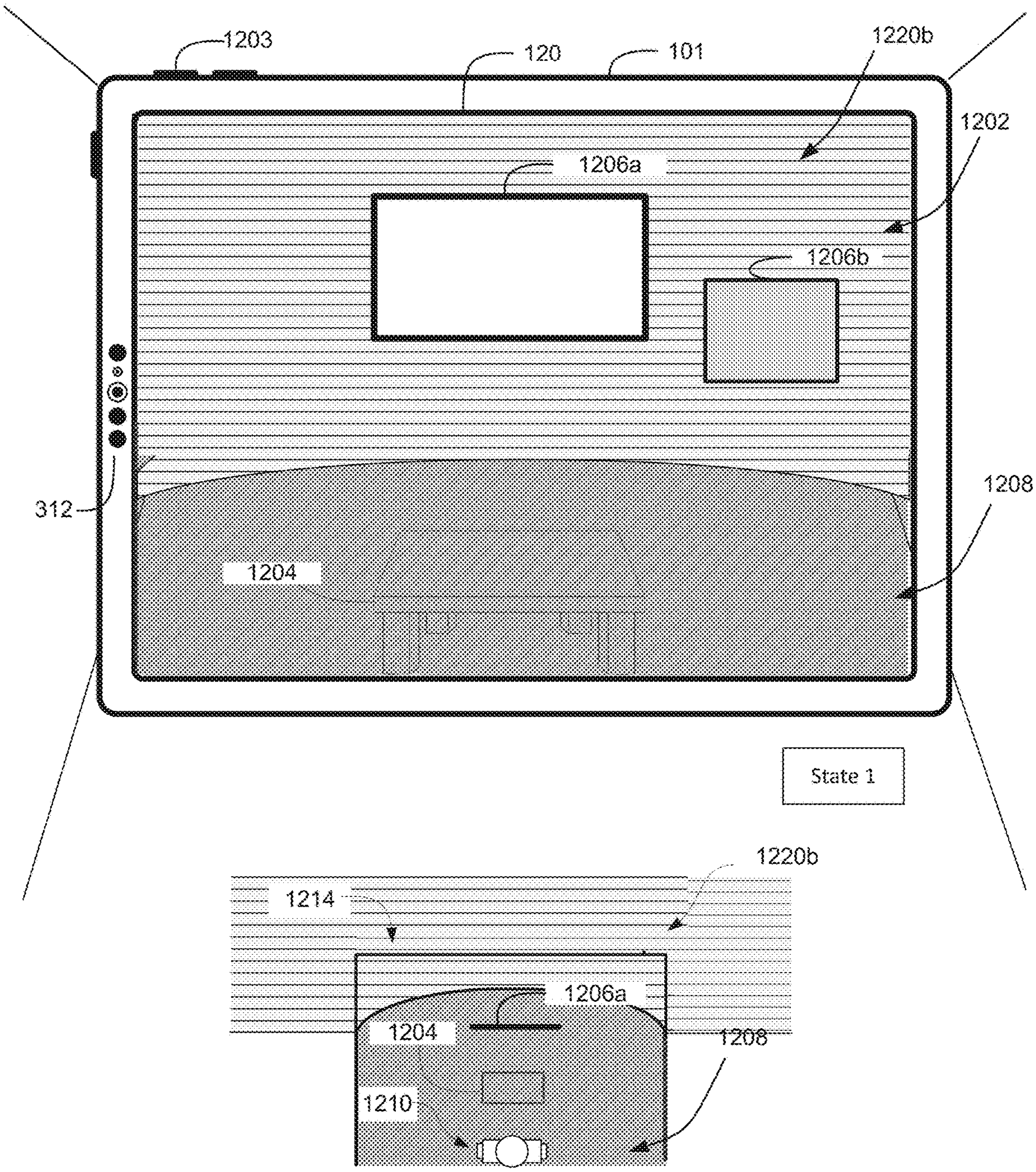

Optionally, the second visual effect (e.g., the visual effect associated with application window 1206*b*) applied by the computer system 101 depends on a state of the application window 1206*b*. For example, the application window 1206*b* is optionally configured to request a first respective visual effect (with high dimming of the background, for example) when the application window is in a first state, such as when it is active and/or displaying content of significant interest or emotional intensity (such as a cutscene in a video game), and request a second respective visual effect (with less dimming of the background, for example) when the application window 1206*b* is in a second state, such as when it is inactive and/or displaying content that is less significant. Thus, computer system 101 optionally selects the second visual effect (e.g., the visual effect associated with the application window 1206*b*) based on the state of the application window 1206*b*. For example, in FIG. 12L, computer system 101 optionally applies a first respective visual effect associated with application window 1206*b* (optionally, in combination with a first visual effect associated with the virtual content 1206*a*) in accordance with a determination that application window is in a first state. In FIG. 12M, computer system 101 optionally applies a second respective visual effect associated with application window 1206*b* (optionally, in combination with a first visual effect associated with the virtual content 1206*a*) in accordance with a determination that application window 1206*b* is in a second state (e.g., indicated by the gray interior and reduced border thickness of application window 1206*b*).

In some embodiments, computer system 101 applies the same amount of a visual effect (e.g., as a percentage of the dimming and/or tinting) to the background independent of a level of immersion (e.g., such as a level of immersion described with reference to method 1300) of a virtual environment displayed in the background. For example, computer system 101 optionally applies the same amount of a visual effect to the background in FIG. 12N (in which virtual environment 1220*a* is displayed at a first immersion level) as in FIG. 12O (in which virtual environment 1220*a* is displayed at a second immersion level, greater than the first immersion level), as indicated by the same shading and patterning on the background in both figures. In some embodiments, computer system 101 gradually increases an amount of a visual effect applied to the background as the immersion level increases, optionally until it reaches a threshold immersion level (such as 45% immersion, for example) after which the amount of visual effect is not further increased.

In some embodiments, computer system 101 reduces an amount of a visual effect applied to the background when the user turns away from the virtual environment in the background, such as described with reference to method 1300. For example, from FIG. 12N to 12P, the user 1210 has turned away from facing virtual environment 1220*a* (e.g., the viewpoint of the user is no longer directed to the virtual environment 1220*a*), and in response, the computer system 101 reduces an amount of visual effect applied to the background (e.g., as shown by the lighter shading and patterning in FIG. 12P relative to FIG. 12N). In some embodiments, the computer system 101 gradually reduces the amount of visual effect applied to the background in accordance with the movement (e.g., turning) of the user 1210. In some embodiments, computer system 101 does not begin to reduce the amount of visual effect applied to the background until the user 1210 has rotated their viewpoint more than a threshold angle away from the virtual environment 1220*a*, such that small changes in the user's viewpoint do not result in a reduction in the amount of the visual effect. In some embodiments, the threshold angle at which the computer system 101 begins to reduce the amount of the visual effect is smaller when the immersion level of the virtual environment is lower. For example, if the user 1210 is less immersed in the virtual environment, it is easier (e.g., requires less rotation) for the user 1210 to turn away a sufficient amount to cause the amount of the visual effect to decrease. For example, if the virtual environment is displayed at 75% immersion, the computer system 101 optionally reduces the amount of the visual effect if the user rotates away from facing the virtual environment 1220*a* by a first angle. In contrast, if the virtual environment is displayed at 30% immersion, the computer system 101 optionally reduces the amount of the visual effect if the user rotates away from facing the virtual environment 1220*a* by a second angle, where the second angle is smaller than the first angle.

In some embodiments, the computer system 101 applies the visual effect to real-world objects that are visible via computer system 101, such as real-world objects that have moved into the field of view of computer system 101. For example, from FIG. 12B to FIG. 12Q, the user 1210 has moved their hand 1210*a* into the field of view of computer system 101 while computer system 101 is applying a visual effect to the background, and in response, computer system 101 applies the visual effect to a representation of the user's hand 1210*b* that is visible via computer system 101. Additional details regarding the application of visual effects to real-world objects are provided with reference to method 1100.

FIG. 12Q1 illustrates similar and/or the same concepts as those shown in FIG. 12Q (with many of the same reference numbers). It is understood that unless indicated below, elements shown in FIG. 12Q1 that have the same reference numbers as elements shown in FIGS. 12A-12Q have one or more or all of the same characteristics. Further, the dashed box around hand 1210*b* in FIG. 12Q1 corresponds to the pattern shown on hand 1210*b* in FIG. 12Q. FIG. 12Q1 includes computer system 101, which includes (or is the same as) display generation component 120. In some embodiments, computer system 101 and display generation component 120 have one or more of the characteristics of computer system 101 shown in FIGS. 12A-12Q and display generation component 120 shown in FIGS. 1 and 3, respectively, and in some embodiments, computer system 101 and display generation component 120 shown in FIGS. 12A-12Q have one or more of the characteristics of computer system 101 and display generation component 120 shown in FIG. 12Q1.

In FIG. 12Q1, display generation component 120 includes one or more internal image sensors 314*a* oriented towards the face of the user (e.g., eye tracking cameras 540 described with reference to FIG. 5). In some embodiments, internal image sensors 314*a* are used for eye tracking (e.g., detecting a gaze of the user). Internal image sensors 314*a* are optionally arranged on the left and right portions of display generation component 120 to enable eye tracking of the user's left and right eyes. Display generation component 120 also includes external image sensors 314*b* and 314*c* facing outwards from the user to detect and/or capture the physical environment and/or movements of the user's hands. In some embodiments, image sensors 314*a*, 314*b*, and 314*c* have one or more of the characteristics of image sensors 314 described with reference to FIGS. 12A-12Q.

In FIG. 12Q1, display generation component 120 is illustrated as displaying content that optionally corresponds to the content that is described as being displayed and/or visible via display generation component 120 with reference to FIGS. 12A-12Q. In some embodiments, the content is displayed by a single display (e.g., display 510 of FIG. 5) included in display generation component 120. In some embodiments, display generation component 120 includes two or more displays (e.g., left and right display panels for the left and right eyes of the user, respectively, as described with reference to FIG. 5) having displayed outputs that are merged (e.g., by the user's brain) to create the view of the content shown in FIG. 12Q1.

Display generation component 120 has a field of view (e.g., a field of view captured by external image sensors 314*b* and 314*c* and/or visible to the user via display generation component 120) that corresponds to the content shown in FIG. 12Q1. Because display generation component 120 is optionally a head-mounted device, the field of view of display generation component 120 is optionally the same as or similar to the field of view of the user.

In FIG. 12Q1, the user is depicted as performing an air pinch gesture (e.g., with hand 1210*b*) to provide an input to computer system 101 to provide a user input directed to content displayed by computer system 101. Such depiction is intended to be exemplary rather than limiting; the user optionally provides user inputs using different air gestures and/or using other forms of input as described with reference to FIGS. 12A-12Q.

In some embodiments, computer system 101 responds to user inputs as described with reference to FIGS. 12A-12Q.

In the example of FIG. 12Q1, because the user's hand is within the field of view of display generation component 120, it is visible within the three-dimensional environment. That is, the user can optionally see, in the three-dimensional environment, any portion of their own body that is within the field of view of display generation component 120. It is understood than one or more or all aspects of the present disclosure as shown in, or described with reference to FIGS. 12A-12Q and/or described with reference to the corresponding method(s) are optionally implemented on computer system 101 and display generation unit 120 in a manner similar or analogous to that shown in FIG. 12Q1.

FIG. 13 is a flowchart illustrating a method of a computer system applying a visual effect to a background in accordance with some embodiments. In some embodiments, the method 1300 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, and/or a projector) and one or more cameras (e.g., a camera (e.g., color sensors, infrared sensors, and other depth-sensing cameras) that points downward at a user's hand or a camera that points forward from the user's head). In some embodiments, the method 1300 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1300 are, optionally, combined and/or the order of some operations is, optionally, changed.

In some embodiments, the method 1300 is performed at a computer system in communication with a display generation component. In some embodiments, the computer system has one or more of the characteristics of the computer system described with reference to method 800, 900, 1100, and/or 1500. In some embodiments, the display generation component has one or more of the characteristics of the display generation component described with reference to method 800, 900, 1100, and/or 1500.

In some embodiments, while displaying (1302*a*), via the display generation component, virtual content in a first portion of a three-dimensional environment while a background (e.g., a representation of a portion of a physical environment of a user of the computer system and/or a representation of a virtual environment, such as a virtual environment described with reference to method 1100) is visible in a second portion of the three-dimensional environment behind the virtual content, such as virtual content 1006*a* and background described with reference to FIG. 12A, (e.g., at a greater spatial depth than the virtual content from a viewpoint of a user of the computer system, optionally surrounding the virtual content), the computer system detects (1302*b*) an event corresponding to the virtual content, such as detecting that the user has shifted their attention to virtual content 1206*a* in FIG. 12B (e.g., an event that indicates a focus state for the virtual content such as user attention directed to the virtual content, user attention directed to the virtual content for more than a time threshold, an input directed to the virtual content, a change in a state of the virtual content such as the virtual content starting to play, and/or another event corresponding to the content that indicates that the virtual content should be emphasized relative to the background). In some embodiments, the three-dimensional environment has one or more of the characteristics of the three-dimensional environments described with reference to methods 800, 900, 1100, and/or 1500. In some embodiments, the virtual content has one or more of the characteristics of the virtual content described with reference to methods 800, 900, 1100, and/or 1500. Optionally, a portion of the background that is overlaid by the virtual content is occluded by the virtual content (e.g., it is not visible at all if the virtual content is opaque, or it is visible with reduced visual prominence relative to other portions of the background if the virtual content is partially transparent).

In some embodiments, in response to detecting the event corresponding to the virtual content, in accordance with a determination that a state of the background is a first state (e.g., a first state such as depicted in FIG. 12B), the computer system presents (1302*d*) (e.g., display or otherwise making visible, such as using virtual or optical passthrough) the background with a first visual effect (e.g., a virtual and/or simulated visual effect associated with the virtual content, such as a visual effect that the virtual content is configured to request to be applied) applied to the background, such as shown in FIG. 12B. In some embodiments, the first visual effect has one or more of the characteristics of the first visual effect described with reference to method 1100. In some embodiments, applying the first visual effect to the background includes dimming the background, reducing the brightness of the background, reducing a saturation of the background, and/or changing a tint of the background. In some embodiments, the state of the background corresponds to a lighting setting associated with the background (e.g., configured for some or all of the background and/or for the computer system) that specifies a baseline (e.g., before the visual effect is applied) brightness, saturation, and/or color tint of the background, such as a time-of-day setting (e.g., morning, daytime, evening, nighttime, or another time of day), a light mode setting (e.g., in which some or all of the background and/or the virtual content is presented with lighter colors, increased brightness, increased saturation, and/or a first color tint), and/or a dark mode setting (e.g., in which some or all of the background and/or the virtual content are presented with darker colors, decreased brightness, decreased saturation, and/or a second color tint). For example, in some embodiments, the first state corresponds to the computer system operating in the light mode.

In some embodiments, in response to detecting the event corresponding to the virtual content, in accordance with a determination that the state of the background is not the first state, such as when it is in a second state as shown in FIG. 12F, (e.g., the state of the background is a second state, a third state or another state), the computer system presents (1302*e*) the background without the first visual effect, such as described with reference to FIG. 12F. Optionally, when the computer system presents the background without the first visual effect, the computer system presents the background without any visual effect (e.g., without any tint and/or brightness adjustment), such as based on default (or otherwise configured) brightness and/or tint settings and/or based on ambient brightness and/or tint (e.g., for a representation of a portion of a physical environment). Optionally, when the computer system presents the background without the first visual effect, the computer system presents the background with a second, third, or other visual effect different from the first visual effect, where the second, third, or other visual effect corresponds to a different (e.g., second, third, or other) state of the background. For example, when the background is associated with a second state (e.g., when the state of the background is the second state), the computer system optionally presents the background with a different brightness and/or tinted with a different color than when the background is associated with the first state.

For example, if the background is operating in a light and/or daytime mode such that a virtual environment and/or representation of a physical environment in the background are presented with lighter colors and increased brightness, the computer system optionally applies the first visual effect to the background (e.g., in response to detecting the event) to dim the background (e.g., to make the background less visually prominent relative to the virtual content and thereby emphasize the virtual content). For example, if the background is operating in a dark and/or nighttime mode such that a virtual environment and/or representation of a physical environment in the background are presented with darker colors and reduced brightness, the computer system optionally forgoes applying the first visual effect to the background in response to the event since the background is optionally already less visually prominent than the virtual content. Applying a visual effect that is associated with the virtual content to the background (e.g., applying a dimming or tinting effect that reduces the visual prominence of the background) when the background is in a first state (e.g., a daytime state, in which the background is optionally relatively light) and either forgoing applying a visual effect or applying a different visual effect when the background is in a second state (e.g., a nighttime state, in which the background is optionally already relatively dark) improves visibility of the virtual content relative to the background without changing the visibility of the background unnecessarily (e.g., without further dimming the background if it is already dark).

In some embodiments, the background includes a representation of a physical environment of a user of the computer system, such as representation of physical environment 1208 described with reference to FIG. 12A. In some embodiments, the representation of the physical environment of the user of the computer system has one or more of the characteristics of the representation of the physical environment described with reference to methods 1100 and/or 1500. In some embodiments, the representation of the physical environment is presented (e.g., visible) using virtual or optical passthrough. In some embodiments, presenting the background with the first visual effect includes presenting the representation of the physical environment via optical passthrough with a virtual visual effect overlaid on and/or filtering the optical passthrough. In some embodiments, presenting the background with the first visual effect includes displaying a virtual representation of the physical environment with a virtual visual effect applied to the virtual representation. Applying the visual effect to the representation of the physical environment (when it is included in the background) improves visibility of the virtual content relative to the representation of the physical environment.

In some embodiments, wherein the background includes a virtual environment, such as virtual environment 1220*a* described with reference to FIG. 12A (e.g., a computer-generated and/or simulated three-dimensional environment, such as described with reference to methods 800, 900, 1100, and/or 1500). Applying the visual effect to the virtual environment (when it is included in the background) improves visibility of the virtual content relative to the virtual environment.

In some embodiments, the virtual content comprises visual media content (e.g., gaming and/or video content that changes over time when it is playing), such as shown in FIG. 12C. In some embodiments, detecting the event comprises detecting that the state of the visual media content is a first state (e.g., the visual media content is or has begun playing, such as shown in FIG. 12C). In some embodiments, if the state of the visual media content is a first state (e.g., the visual media content is or has begun currently playing at a normal playback speed for viewing), the computer system applies the first visual effect to the background. In some embodiments, if the state of the visual media content is a first state, the visual effect comprises a first tint and/or a first brightness associated with the visual media content. In some embodiments, if the state of the visual media content is a second state (e.g., the visual media content is not actively playing, such as when it is paused, stopped, and/or being rewound or fast-forwarded), the computer system forgoes applying the first visual effect, and optionally does not apply any visual effect to the background. In some embodiments, if the state of the visual media content is the second state, the computer system applies a second visual effect to the background, where the second visual effect optionally comprises a second tint and/or a second brightness associated with the visual media content (e.g., different from the first tint and/or the first brightness). For example, the computer system optionally applies more dimming and/or tinting to the background when the content is currently playing than when the content is stopped or paused. Applying the visual effect to the background based on a state of the content (such as whether the content is playing or not) improves visibility of the content relative to the background when it is playing while maintaining better visibility of the background when the content is stopped or paused (e.g., when the user may not be actively watching the content).

In some embodiments, detecting the event comprises detecting that user attention is directed to the virtual content, such as described with reference to FIG. 12B. (e.g., detecting that a gaze of the user is directed to the virtual content, that the virtual content is currently playing, that the user has interacted (or is currently interacting) with the virtual content (e.g., recently interacted with, within a threshold amount of time), and/or that the user has activated the virtual content, such as by selecting the virtual content and/or providing inputs to an application associated with the virtual content. In some embodiments, if the user's attention is directed to the virtual content, the computer system applies the first visual effect to the background. In some embodiments, if the user's attention is not directed to the virtual content, the computer system forgoes applying the first visual effect, and optionally does not apply any visual effect to the background. In some embodiments, if the user's attention is not directed to the virtual content, the computer system applies a second visual effect to the background, where the second visual effect is optionally associated with other virtual content to which the user's attention is directed. Applying the visual effect to the background based on whether the user is directing their attention to the virtual content improves visibility of the virtual content relative to the background when the user is viewing and/or interacting with the virtual content while maintaining better visibility of the background when the user is not viewing and/or interacting with the virtual content.

In some embodiments, the background includes a virtual environment and the first state of the background corresponds to a first time-of-day setting of the virtual environment (e.g., a first setting that governs the colors, tints, brightness, and/or virtual content of the virtual environment, such as a light mode and/or time-of-day setting described earlier) and a second state of the virtual environment corresponds to a second time-of-day setting different from the first time-of-day setting, such as described with reference to FIG. 12A (e.g., a second mode that governs the colors, tints, brightness, and/or virtual content of the virtual environment, such as a dark mode described earlier). For example, the computer system optionally applies a visual effect to the background (such as dimming) when the virtual environment is displayed as a simulated daytime virtual environment (e.g., a beach or sky during the day, which is optionally relatively bright, includes lighter colors, and/or is tinted more yellow or orange relative to the same environment when it is simulated as a nighttime environment) and forgoes applying the visual effect (or applies a different visual effect, such as less dimming and/or different tinting) when the virtual environment is displayed as a simulated nighttime virtual environment (e.g., a beach or sky at night, which is optionally less bright, includes darker colors, and/or is tinted more blue or gray relative to the same virtual environment when it is simulated as a daytime environment). Applying a different visual effect (or forgoing applying any visual effect) to the background based on the time-of-day characteristics of a virtual environment in the background improves visibility of the virtual content relative to the background (e.g., relative to the virtual environment and optionally a passthrough environment) when the background would otherwise be too visually prominent (e.g., when the virtual environment is in a daytime mode) while maintaining better visibility of the background when background is not too visually prominent relative to the content (e.g., when the virtual environment is in a nighttime mode).

In some embodiments, the first state corresponds to a light time-of-day setting (e.g., as described above), a second state corresponds to a dark time-of-day setting (e.g., as described above), and the background is in the second state. In some embodiments, presenting the background without the first visual effect, in accordance with the determination that the state is not the first state (e.g., as described with reference to step 1302*e*), comprises presenting the background without any visual effect that is based on the background being in the second state, as described with reference to FIG. 12F. In some embodiments, a visual effect is applied to the background when the background is in some states but not in others-even when a visual effect is requested by an application. For example, the visual effect is optionally not displayed when the background is in a dark time-of-day mode, in which the background is already dimmed and/or tinted. Forgoing applying the visual effect when the background is in a dark time-of-day state maintains better visibility of the background when background is not too visually prominent relative to the content (e.g., when a virtual environment in the background is in a nighttime mode).

In some embodiments, detecting the event comprises detecting that the state of the background has changed (e.g., from a second state, which is optionally associated with a dark time-of-day setting as described above) to the first state (e.g., a state associated with a light time-of-day setting as described above) while the virtual content is displayed, such as when the state of the background changes from the second state in FIG. 12F to the first state in FIG. 12B. In some embodiments, detecting that the state of the background has changed comprises detecting a user input requesting to change the state of the background, such as by changing a configuration setting associated with the computer system and/or with a virtual environment of the background. In some embodiments, detecting that the state of the background has changed includes detecting that a time of day of the computer system (e.g., the time of day reported by a clock of the computer system) has reached a threshold time of day (e.g., dawn, dusk, noon, midnight, or another threshold time of day). In some embodiments, detecting that the state of the background has changed includes detecting that the ambient lighting around the computer system has reached a threshold lighting value (e.g., in terms of radiance, lumens, lux, or other quantities that characterize daytime lighting, nighttime lighting, dawn lighting, dusk lighting, or other lighting). In some embodiments, when the computer system detects that the state has changed to the first state, the computer system begins to apply the first visual effect to the background and continues to apply the first visual effect to the background while the background is in the first state (and optionally, based on the attention of the user being directed to the virtual content). Applying the visual effect when the background switches to the first state (e.g., when switching from a nighttime state to a daytime state) improves the visibility of the content relative to the background when the background becomes more visually prominent.

In some embodiments, detecting the event comprises detecting that the state of the background has changed to the second state (e.g., a second state associated with a dark time-of-day setting as described above) while the virtual content is displayed, and wherein presenting the background without the first visual effect comprises presenting the background without a visual effect corresponding to the second state (e.g., without any visual effect or with a different visual effect that does not correspond to the dark time-of-day setting) independent of whether the virtual content is associated with the first visual effect, such as described with reference to FIG. 12F. For example, if the virtual content is associated with a first visual effect that specifies an amount of dimming, the first visual effect is optionally applied to the background when (e.g., while) it is in the first state and ceases to be applied when the background changes to the second state. Forgoing the application of the visual effect to the background when the background switches to the second state (e.g., when switching from a daytime state to a nighttime state) maintains better visibility of the background when the background is not too visually prominent relative to the content.

In some embodiments, the virtual content comprises media content (e.g., virtual audio-visual media content that changes over time when it is playing) and the background is in the first state, such as shown in FIG. 12D.

In some embodiments, while displaying the media content in the three-dimensional environment including the background (e.g., displaying the media content in an area of the three-dimensional environment that is outside and/or in front of (from the perspective of the viewpoint of the user) of a virtual environment of the background, such as in a passthrough portion of the three-dimensional environment, and not at a dedicated respective position in the three-dimensional environment for media content), and while the media content is not playing, as shown in FIG. 12D, (e.g., the media content is paused or stopped), the computer system detects, via the one or more input devices, a first input corresponding to a request to play the media content (e.g., a selection of an affordance for playing the media content and/or a gaze directed to the media content (optionally, for more than a threshold duration, such as more than 0.01, 0.1, 0.5, 1. 1.5, 5, or 10 seconds)).

In some embodiments, in response to detecting the first input, the computer system plays the media content in the three-dimensional environment including the background, such as shown in FIG. 12C (e.g., such that the media content changes over time). Optionally, in response to detecting the first input (e.g., as the event corresponding to the virtual content), the computer system displays the first visual effect applied to the background. In some embodiments, the background remains in the first state in response to detecting the first input. In some embodiments, the background transitions to the second state, described further below, in response to detecting the first input.

In some embodiments, while displaying the media content while it is playing in the three-dimensional environment including the background as shown in FIG. 12C, the computer system detects, via the one or more input devices, a second input corresponding to a request to display the media content at a respective position for the media content in the background, such as a request to dock the media content (e.g., within the virtual environment of the background). In some embodiments, the respective position for the media content is a predetermined position in the background for displaying media content (e.g., any media content), such as a position in which media content can be docked. In some embodiments, the second input includes a selection of an affordance for displaying the media content at the respective position (e.g., for docking the media content), and optionally in response to detecting the selection of the affordance, the computer system displays an animation moving the media content to the respective position. In some embodiments, the second input includes a gaze directed to the media content and/or shifting to the respective location. In some embodiments, the second input includes an air gesture, such as a pushing or pinching gesture that virtually "pushes" the media content into the respective position in the background.

In some embodiments, in response to detecting the second input, the computer system displays the media content at the respective position for the media content in the background (e.g., in a virtual environment of the background) and changes the state of the background to the second state, such as shown in FIG. 12G. Optionally, changing the state of the background to the second state includes ceasing to display the first visual effect applied to the background. Optionally, displaying the media content at the respective position for the media content in the background includes changing a visual characteristic of the media content, such as increasing a display size of the media content and/or increasing an immersion level of the media content. Changing the time-of-day setting of a virtual environment (e.g., to a dark time-of-day setting) when media content is docked in the virtual environment increases the visual prominence of the media content relative to the virtual environment, providing better visibility for the user.

In some embodiments, detecting the event (e.g., as described with reference to step 1302*a*) comprises detecting the first input (e.g., as described above). For example, a virtual environment displayed in the background is optionally displayed with a light time-of-day setting, and applying the visual effect applies dimming and/or tinting to the virtual environment without changing the virtual environment to a dark time-of-day setting. Applying the visual effect to the background without changing the time of day (e.g., while playing media content) increases the visual prominence of the media content relative to the background without changing the time-of-day of a virtual environment displayed in the background, potentially avoiding the need for the user to change the time-of-day of the virtual environment back to its original value when the media content stops playing (or ceases to be displayed).

In some embodiments, presenting the background with the first visual effect (e.g., as described with reference to step 1302*d*) includes, in accordance with a determination that the background comprises a first virtual environment (e.g., a virtual environment as described earlier and with reference to method 1100), presenting the background with a first respective visual effect corresponding to the first virtual environment, such as described with reference to FIG. 12H. For example, the first respective visual effect optionally includes a first dimming effect and/or first tinting effect (e.g., using a first color tint). Optionally, the first virtual environment is configured to request the first respective visual effect. Optionally, the computer system determines the first respective visual effect based on a visual characteristic of the first virtual environment, such as a color of the first virtual environment.

In some embodiments, presenting the background with the first visual effect (e.g., as described with reference to step 1302*d*) includes, in accordance with a determination that the background comprises a second virtual environment, different from the first virtual environment, presenting the background with a second respective visual effect, different from the first respective visual effect, corresponding to the second virtual environment, such as described with reference to FIG. 12I. For example, the second respective visual effect optionally includes a second dimming effect and/or second tinting effect (e.g., using a second color tint, different from the first color tint). Applying different visual effects based on the particular virtual environment that is displayed provides better customization of the visual effect to the background, thereby improving the visibility of the virtual content relative to the background.

In some embodiments, presenting the background without the first visual effect in accordance with the determination that the background is in the second state (e.g., as described with reference to step 1302*e*) comprises presenting the background with a third respective visual effect, different from the first and second respective visual effects (e.g., optionally including a third dimming effect and/or third tinting effect, where one or both of the third dimming effect and the third tinting effect are different from the first dimming effect, the second dimming effect, the first tinting effect, and/or the second tinting effect), that is independent of (e.g., does not depend on) whether the background includes the first virtual environment or the second virtual environment, such as if the visual effect applied in FIG. 12E when the background is in the second state is applied independently of whether the virtual environment is virtual environment 1220*a* (as shown) or is a different virtual environment. In some embodiments, when the background is in the first state (e.g., a light time-of-day state), different visual effects are applied to the background based on which virtual environment is displayed in the background, whereas when the background is in the second state (e.g., a dark time-of-day state), the same visual effect is applied to the background when any one of multiple virtual environments (optionally, all virtual environments) is displayed in the background. Applying different visual effects based on the particular virtual environment that is displayed when the background is in the first state and applying the same visual effect when the background is in the second state provides better customization of the visual effect to the background in the first state while maintaining consistency of the background when the background is in the second state.

In some embodiments, presenting the background with the first visual effect (e.g., as described with reference to step 1302*d*) comprises dimming the background, such as if the visual effect depicted in FIG. 12B included a dimming effect (e.g., reducing a brightness of the background, such as by 1, 3, 5, 10, 15, 25, 50, 75, or 90%, relative to the background when it is undimmed and/or relative to the virtual content). Dimming the background improves the visibility of the virtual content relative to the background.

In some embodiments, presenting the background with the first visual effect (e.g., as described with reference to step 1302*d*) comprises applying a color tint to the background, such as if the visual effect depicted in FIG. 12B included applying a color tint (e.g., a yellow, orange, red, blue, gray, green, or other color tint). Applying a color tint to the background improves the visibility of the virtual content relative to the background.

In some embodiments, the background comprises a representation of a physical environment of a user of the computer system (e.g., as described earlier with respect to the representation of the physical environment).

In some embodiments, the computer system displays second virtual content (e.g., virtual application window 1206*b* of FIG. 12L) in the three-dimensional environment, (e.g., an application window or other virtual content). Optionally, the second virtual content is associated with a second visual effect, different from the first visual effect, such as a visual effect that includes a second dimming effect and/or a second tinting effect.) wherein presenting the background with the first visual effect (e.g., as described with reference to step 1302*d*) comprises presenting the representation of the physical environment with a combination of the first visual effect and the second visual effect, such as described with reference to FIG. 12L. (e.g., applying a combination of a first dimming effect and a second dimming effect and/or a combination of a first tinting effect and a second tinting effect, such as described with reference to method 1100, to the representation of the physical environment). Optionally, an application associated with (e.g., displaying) the first virtual content and/or an application associated with (e.g., displaying) the second virtual content are configured to request respective virtual effects to be applied to the representation of the physical environment when the respective application is active and/or when their respective virtual content is displayed. Applying a visual effect to the representation of the physical environment based on multiple application windows (e.g., first and second virtual content) balances the requests of the application windows to improve the visibility of the first and second virtual content relative to the representation of the physical environment.

In some embodiments, the background comprises a first virtual environment (e.g., a virtual environment as described with reference to methods 1100 and/or 1500). In some embodiments, presenting the background with the first visual effect comprises presenting the first virtual environment with the combination of the first visual effect and the second visual effect, such as shown in FIG. 12L (e.g., by dimming and/or tinting the first virtual environment based on the combination of the first visual effect and the second visual effect). Optionally, an application associated with (e.g., displaying) the first virtual content and/or an application associated with (e.g., displaying) the second virtual content are configured to request respective virtual effects to be applied to the virtual environment when the respective application is active and/or when their respective virtual content is displayed. Applying a visual effect to the representation of the physical environment based on multiple application windows (e.g., first and second virtual content) balances the requests of the application windows to improve the visibility of the first and second virtual content relative to the virtual environment.

In some embodiments, presenting the background with the first visual effect (e.g., as described with reference to step 1302*d*) includes, in accordance with a determination that a state of the virtual content is a first state of the virtual content (e.g., an active state, a high-intensity state (with respect to the emotional intensity of the content, such as for gaming content or media content), and/or a state associated with a need for increased visual prominence relative to the background, such as a state specified for a first time segment of the virtual content), presenting the background with a first respective visual effect (e.g., a first dimming effect and/or a first tinting effect), such as described with reference to FIG. 12L.

In some embodiments, presenting the background with the first visual effect (e.g., as described with reference to step 1302*d*) includes, in accordance with a determination that the state of the virtual content is a second state of the virtual content (e.g., an inactive state, a low-intensity state, and/or a state that is not associated with a need for increased visual prominence relative to the background), forgoing presenting the background with the first respective visual effect (and optionally presenting the background with a second respective visual effect different from the first respective visual effect), such as described with reference to FIG. 12M. Applying different visual effects depending on the state of the virtual content allows the virtual content to be visually emphasized relative to the background when needed (e.g., when the virtual content is active, when a segment of the virtual content is particularly of interest, or under other circumstances) while maintaining the visibility of the background when emphasis of the virtual content is not needed.

Figure 12N:
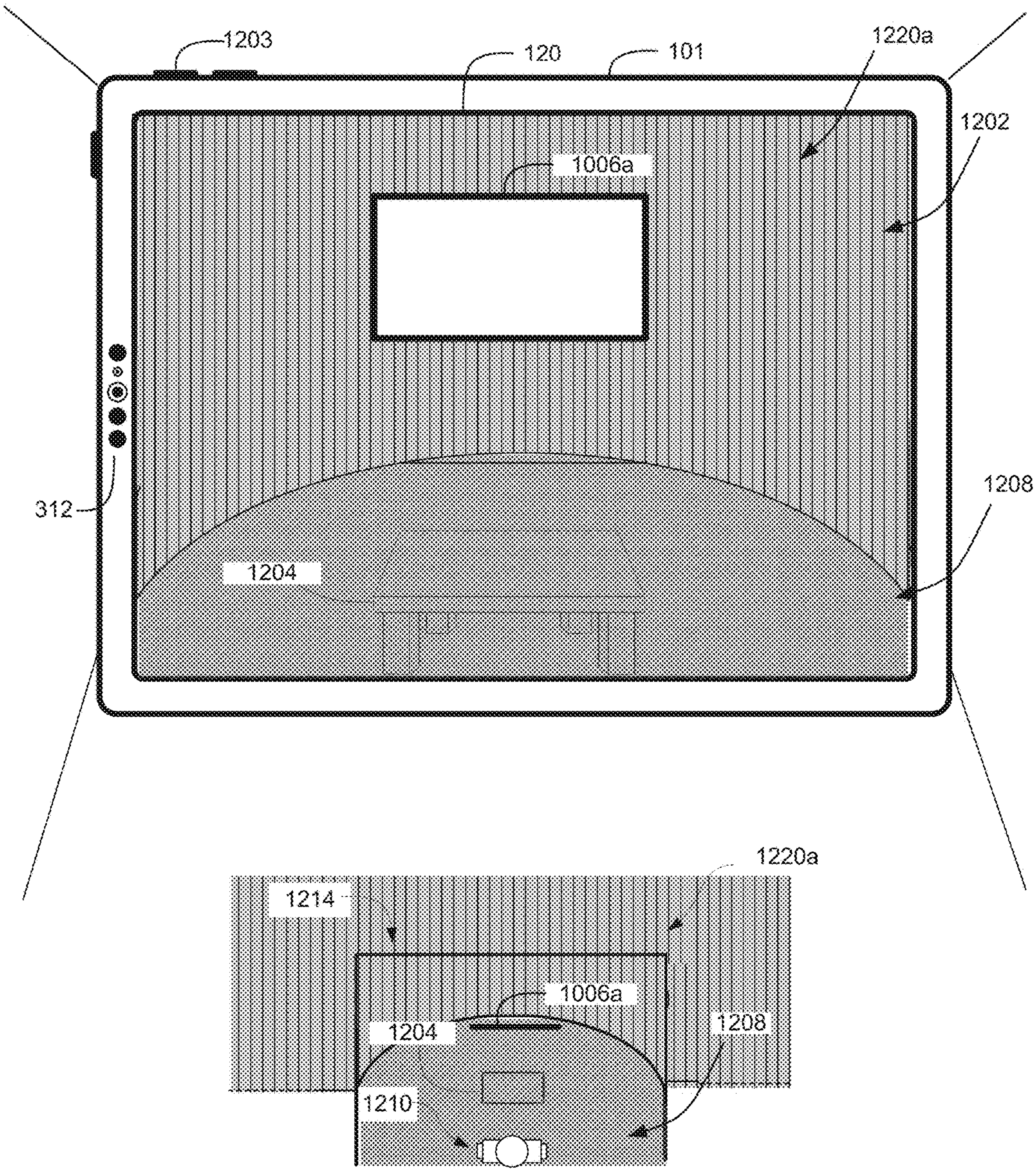
Figure 12O:
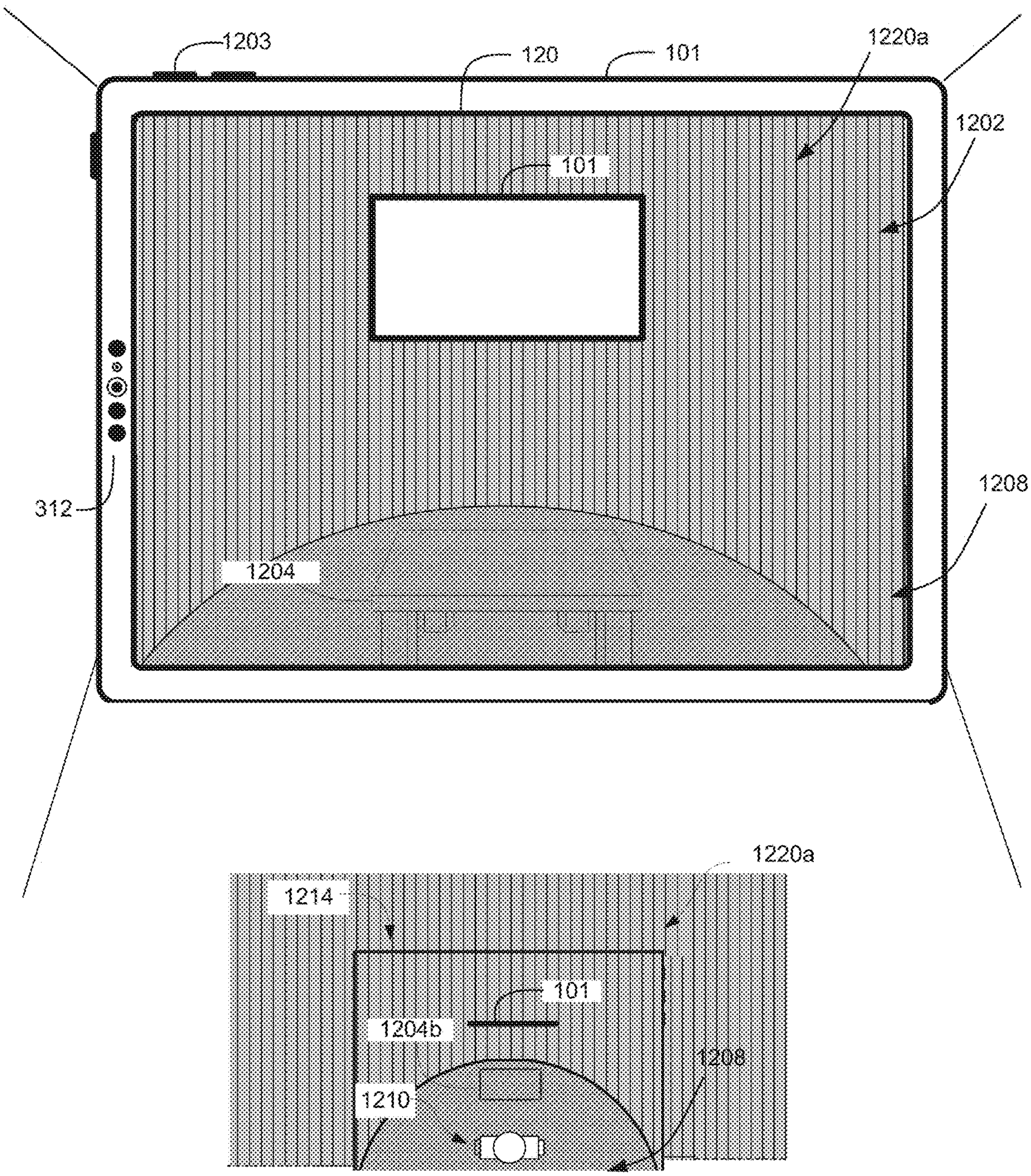

In some embodiments, the background comprises a first virtual environment (e.g., as described above), and presenting the background with the first visual effect includes presenting the background with a first amount of the first visual effect applied to the background (e.g., a first percentage of the dimming and/or tinting associated with the first visual effect, such as 1, 5, 10, 20, 50, 75, or 100% of the first visual effect) independent of (e.g., without regard to) a level of immersion of the first virtual environment, such as described with reference to FIGS. 12N and 120. In some embodiments, a level of immersion specifies an amount of a view of the physical environment that is obscured (e.g., replaced) by the virtual environment. In some embodiments, the computer system presents the background with a different amount (e.g., percentage) of the first visual effect applied to the background depending on the immersion level (e.g., optionally a lower percentage of the first visual effect is applied at lower immersion levels and a higher percentage of the first visual effect is applied at higher immersion levels, up to 100% of the first visual effect at 100% immersion), optionally up to a threshold immersion level (e.g., 10, 20, 30, 45, 75, or 95% immersion) after which it applies the same amount (e.g., 100%) of the first visual effect to the background. Applying the same amount of the visual effect at different immersion levels maintains consistency in the display of the visual effect, thereby reducing the likelihood of erroneous interactions with the computer system.

In some embodiments, the background comprises a virtual environment (e.g., as described earlier). In some embodiments, while displaying the virtual content and while presenting the background with the first visual effect (e.g., as described with reference to step 1302*d*), the computer system detects that a viewpoint of a user of the computer system has changed orientation (e.g., has rotated away from) from a first orientation relative to the virtual environment (e.g., a first viewing angle into the virtual environment) to a second orientation relative to the virtual environment (e.g., a second viewing angle into the virtual environment). For example, the computer system detects that the user has turned away from the virtual environment, such as by rotating their head or body, such as depicted in FIG. 12P.

Figure 12P:
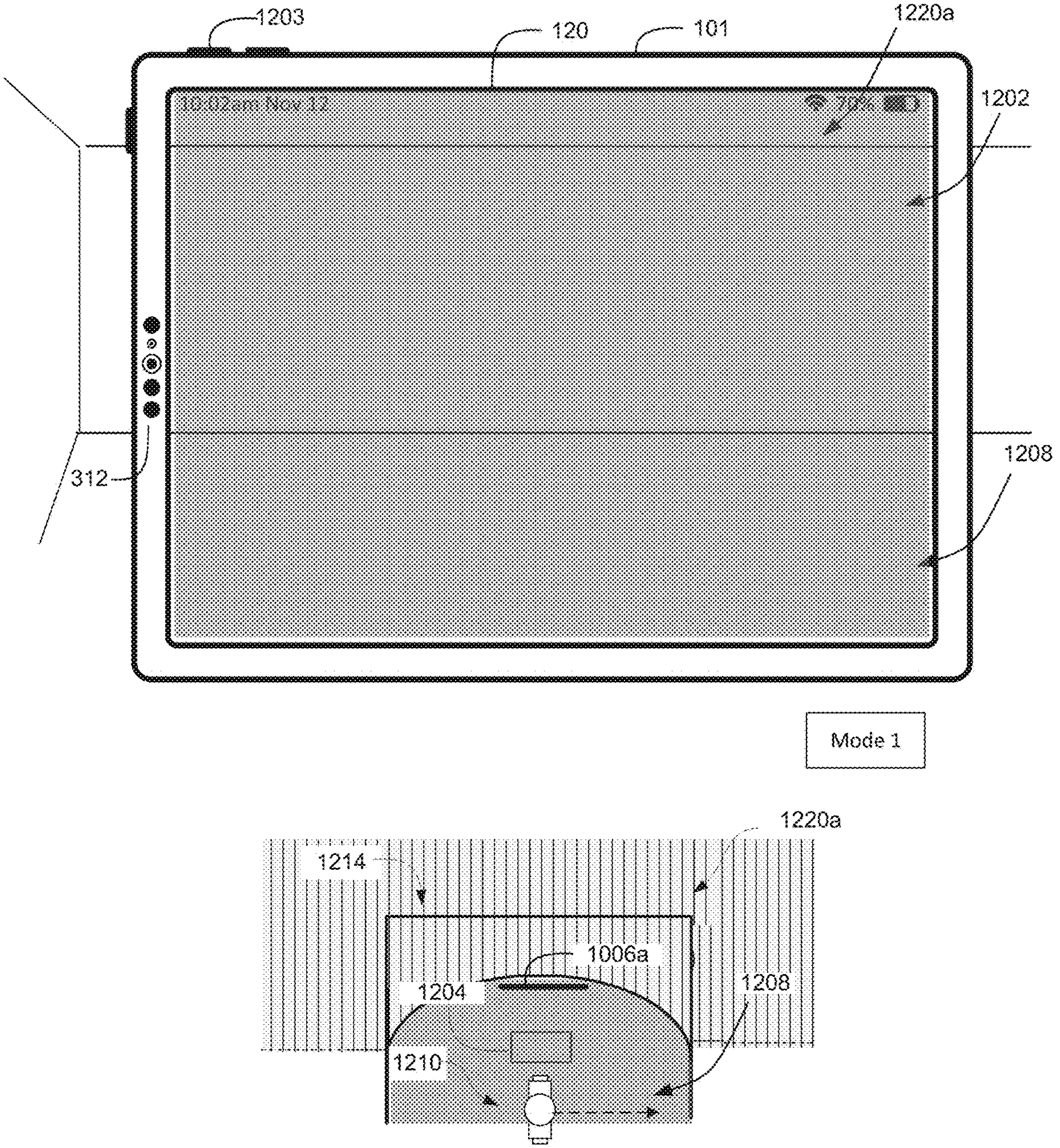

In some embodiments, in response to detecting that the viewpoint of the user has changed orientation relative to the virtual environment and in accordance with a determination that the second orientation is greater than a threshold orientation (e.g., greater than a threshold amount of rotation, such as 1, 3, 5, 10, 20, 30, 50, 75, or 90 degrees of rotation) away from the virtual environment, the computer system reduces the first visual effect (e.g., reducing the dimming and/or tinting, such as by 1, 5, 10, 20, 30, 40 50, 75, 90, or 100%) applied to the background, as shown in FIG. 12P. For example, if the user is oriented towards the virtual environment (e.g., the user is facing the virtual environment), the computer system optionally applies the first visual effect to the background at 100%. If the user subsequently turns away from the virtual environment by more than a threshold amount, the computer system optionally applies the first visual effect to the background at a reduced level or ceases to apply the first visual effect to the background entirely. Reducing the visual effect applied to the background (e.g., including the virtual environment and a representation of the physical environment) when the user turns away from the virtual environment (e.g., indicating that the user's attention is not directed to the virtual environment) provides better visibility of the three-dimensional environment around the user.

In some embodiments, in accordance with a determination that a level of immersion of the virtual environment is a first level of immersion (e.g., 5, 10, 20, 40, 75, or 90% immersion), the threshold orientation (e.g., as described above) is a first threshold orientation (e.g., a first threshold amount of rotation, such as 1, 3, 5, 10, 20, 30, 50, 75, or 90 degrees of rotation). For example, if the virtual environment 1220*a* in FIG. 12P is at the level of immersion shown, the user optionally needs to rotate by a first amount (e.g., 90 degrees shown in FIG. 12P, for example) to meet the threshold orientation.

In some embodiments, in accordance with a determination that the level of immersion of the virtual environment is a second level of immersion, greater than the first level of immersion (e.g., 10, 20, 40, 75, 90, or 100% immersion), the threshold orientation is a second threshold orientation, greater than the first threshold orientation (e.g., a second threshold amount of rotation, such as 2, 3, 5, 10, 20, 30, 50, 75, or 90 degrees of rotation). For example, if the virtual environment 1220*a* in FIG. 12P is at a higher level of immersion than shown, the user optionally needs to rotate by a second amount (e.g., less than the 90 degrees shown in FIG. 12P, for example) to meet the threshold orientation. For example, if the user is more immersed in the virtual environment (the virtual environment is displayed at a higher immersion level), the user must turn away more from the virtual environment to decrease the first visual effect than if the user is less immersed in the virtual environment. Increasing the threshold orientation at which the visual effect is reduced based on an increased level of immersion reduces the likelihood that the user will inadvertently cause the visual effect to be reduced when the user intended to continue directing their attention to the virtual environment.

In some embodiments, the background comprises a virtual environment and a representation of a physical environment of a user of the computer system (e.g. as described earlier). In some embodiments, presenting the background with the first visual effect (e.g., as described with reference to step 1302*d*) comprises presenting a portion of the three-dimensional environment including a transition region between the virtual environment and the representation of the physical environment (e.g., a region between an edge or boundary of the virtual environment, such as described with reference to method 1100 and FIG. 10J, and a portion of the representation of the physical environment that is close to the edge) with the first visual effect (and optionally including the entire virtual environment and/or excluding a portion of the representation of the physical environment outside of the transition region). Applying the visual effect to a portion of the representation of the physical environment that is near the boundary of the virtual environment smooths the spatial transition between the virtual environment and the representation of the physical environment, thereby reducing distractions to the user.

In some embodiments, while presenting the background with the first virtual effect in accordance with the determination that the background is in the first state (e.g., as described with reference to step 1302*d*), the computer system detects a passthrough visibility event associated with a real-world object in a physical environment of the computer system (e.g., as described with reference to method 1100).

In some embodiments, in response to detecting the passthrough visibility event, the computer system presents a representation of the real-world object with the first visual effect applied to the representation of the real-world object, as shown in FIGS. 12Q and 12Q1 and described in more detail with reference to method 1100. Applying the visual effect to the representation of the real-world object provides a less jarring and/or distracting intrusion of real-world objects (e.g., they partially blend in with the three-dimensional environment), thereby reducing the likelihood that the user will provide unintentional inputs to the computer system.

It should be understood that the particular order in which the operations in method 1300 have been described is merely exemplary and is not intended to indicate that the described order is the only order in which the operations could be performed. One of ordinary skill in the art would recognize various ways to reorder the operations described herein.

FIGS. 14A-14K illustrate examples of a computer system applying (or forgoing applying) a visual effect associated with a virtual object to a virtual environment and/or a representation of a physical environment based on a state of the virtual object, such as based on whether the virtual object is in an active state or not.

Figure 14A:
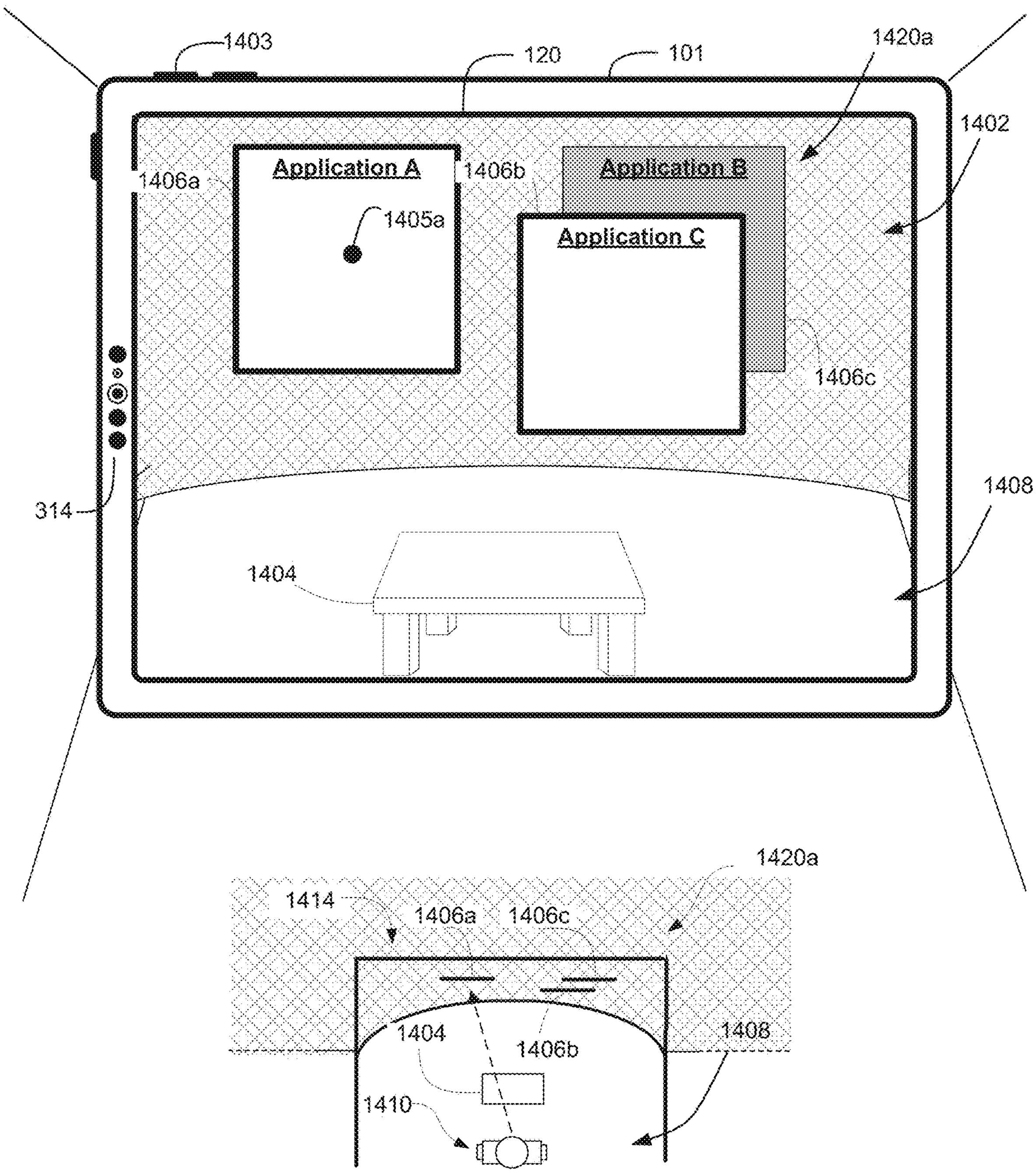
FIGS. 14A-14K illustrate examples of applying a visual effect based on a state of a virtual object.
Figure 15:
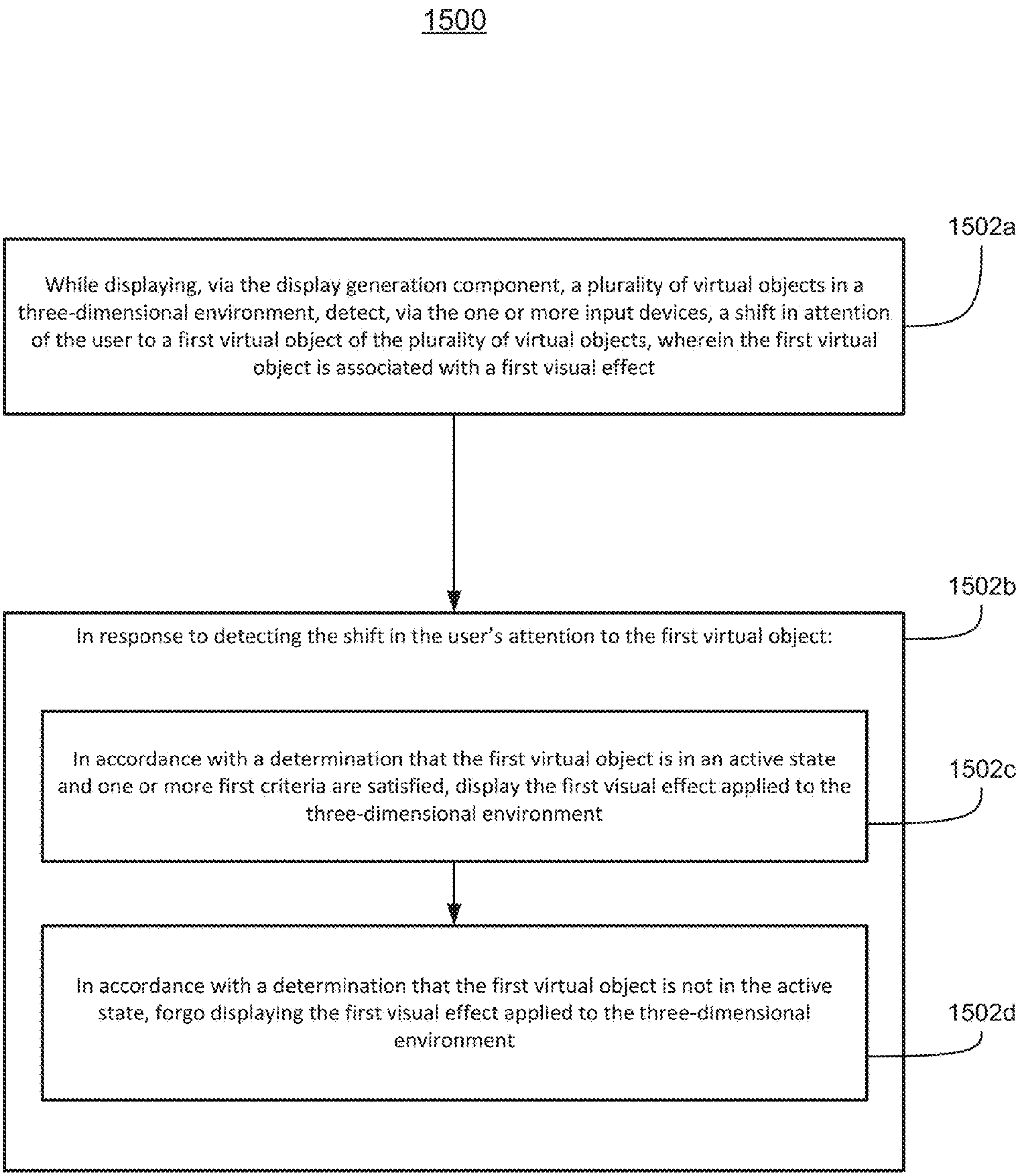
FIG. 15 is a flowchart illustrating a method of applying a visual effect based on a state of a virtual object.

FIG. 14A illustrates a computer system (e.g., an electronic device) 101 that is presenting (e.g., displaying or otherwise making visible, such as via optical passthrough), via a display generation component (e.g., display generation component 120 of FIG. 1), a three-dimensional environment 1402 from a viewpoint of a user (e.g., user 1410) of the computer system 101 (e.g., facing the back wall of the physical environment in which computer system 101 is located). In some embodiments, computer system 101 includes a display generation component (e.g., a touch screen), a plurality of image sensors (e.g., image sensors 314 of FIG. 3), and one or more physical or solid-state buttons 1403. The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces (e.g., virtual environments and/or other virtual content) illustrated and described below could also be implemented on a head-mounted display that includes a display generation component that displays the user interface or three-dimensional environment to the user, and sensors to detect the physical environment and/or movements of the user's hands (e.g., external sensors facing outwards from the user), and/or attention (e.g., gaze) of the user (e.g., internal sensors facing inwards towards the face of the user).

In the example of FIG. 14A, the computer system 101 displays, in the three-dimensional environment 1402, a first virtual object 1406*a*, a second virtual object 1406*b*, and a third virtual object 1406*c*, which optionally represent virtual application windows for interacting with respective applications (optionally, virtual objects 1406*a*, 1406*b*, and 1406*c* are associated with different applications, such as "Application A," "Application B," and "Application C"). In some embodiments, virtual objects 1406*a*, 1406*b*, and 1406*c* have one or more of the characteristics of virtual objects described with reference to method 1500. In some embodiments, different applications can request (e.g., be associated with) different visual effects, such as described with reference to methods 1300 and 1500.

In the example of FIG. 14A, third virtual object 1406*c* is displayed partially behind second virtual object 1406*b* and partially obscured by second virtual object 1406*b*. In some embodiments, computer system 101 displays virtual objects 1406*a*, 1406*b*, and 1406*c* within a three-dimensional environment 1402 that includes a first virtual environment 1420*a* and a representation of a physical environment 1408 (e.g., as described with reference to methods 1100, 1300, and/or 1500). For example, computer system 101 optionally displays virtual environment 1420*a*, and representation of physical environment 1408 is optionally visible via virtual or optical passthrough. Overhead view 1414 depicts spatial relationships among the various elements of FIG. 14A.

In FIG. 14A, virtual object 1406*a* and 1406*b* are currently in an active state (e.g., such as described with reference to method 1500 and indicated in FIG. 14A by their darker border and white fill) and virtual object 1406*c* is currently not in the active state (e.g., such as described with reference to method 1500, and as indicated in FIG. 14A by the lighter border and gray fill). In some embodiments, multiple virtual objects can be concurrently in the active state when they are not overlapping (e.g., not overlapping from the perspective of user 1410). In some embodiments, when two virtual objects are overlapping (e.g., as shown for second virtual object 1406*b* overlapping third virtual object 1406*c* from the perspective of user 1410), only one of the overlapping virtual objects (e.g., virtual object 1406*b* or 1406*c*) can be in the active state at a time and an inactive (overlapped) application is optionally displayed as less visually prominent than an overlapping active application, such as described with reference to method 800.

In FIG. 14A, user 1410 is directing their attention towards virtual object 1406*a*, such as by looking at virtual object 1406*a* (e.g., indicated by gaze point 1405*a*). In this example, virtual object 1406*a* is not associated with a visual effect (e.g., a visual effect such as described with reference to methods 1100, 1300, and/or 1500), and thus computer system 101 does not display a visual effect applied to virtual environment 1420*a* or representation of physical environment 1208 in response to detecting that the user is directing their attention to first virtual object 1406*a*. (Optionally, if virtual environment 1420*a* were associated with a visual effect, computer system 101 would display that visual effect, such as described with reference to FIG. 14J)

Figure 14B:
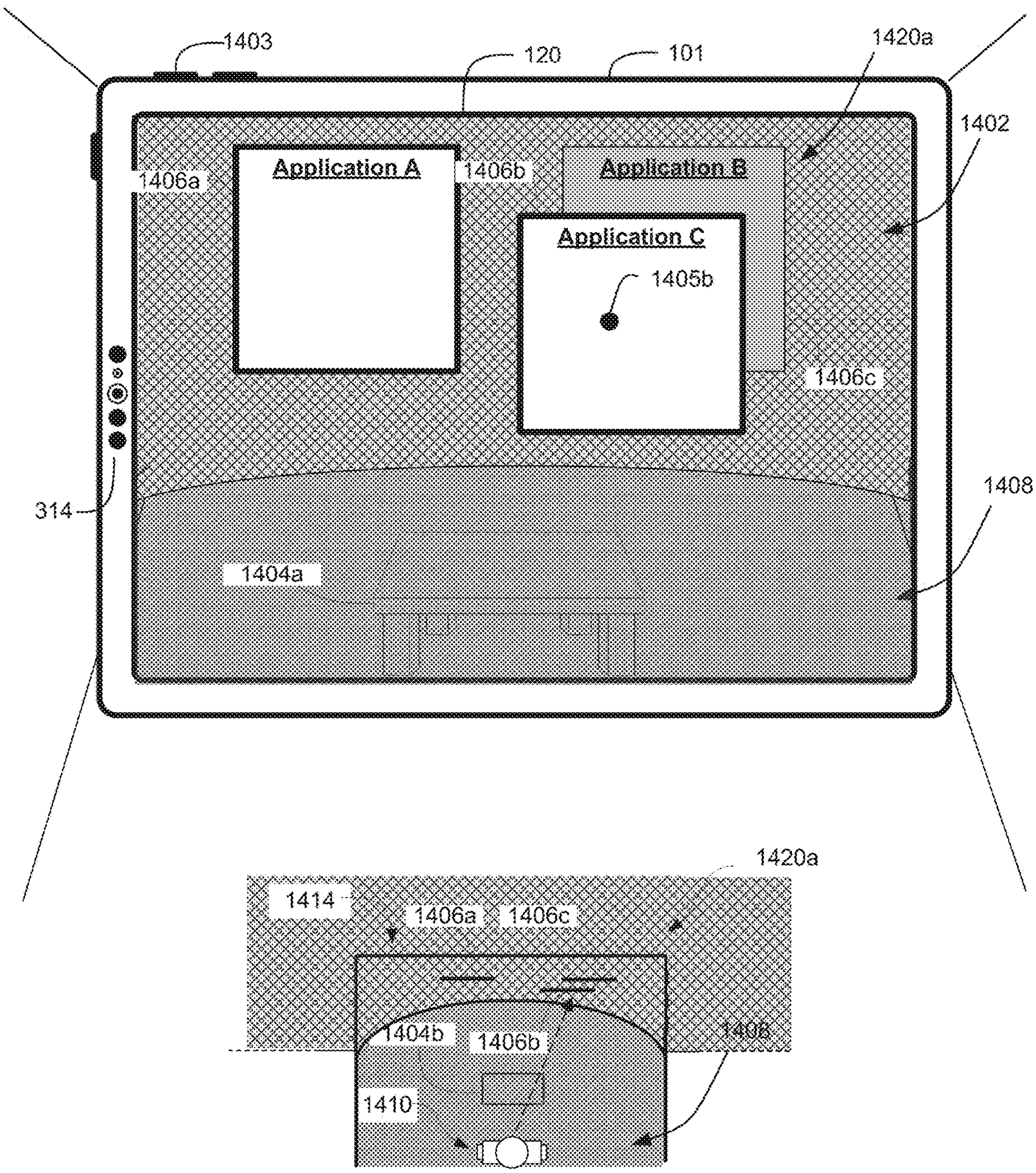

From FIG. 14A to FIG. 14B, the user has shifted their attention to virtual object 1406*b* (e.g., indicated by gaze point 1405*b*). Virtual object 1406*b* is currently in the active state and is associated with a first virtual effect (e.g., optionally including a dimming effect and/or a tinting effect). In response to detecting that the user 1410 is directing their attention to virtual object 1406*b* and in accordance with a determination that virtual object 1406*b* is currently in the active state (and is associated with the first visual effect), computer system 101 displays the first visual effect applied to the representation of the physical environment 1208 and/or applied to the first virtual environment 1220*a* (e.g., in a manner such as described with reference to methods 1100, 1300, and/or 1500), as indicated by the shading and patterning on these elements relative to FIG. 14A. Optionally, computer system 101 gradually fades in the first visual effect; e.g. by gradually increasing the visual prominence of the first visual effect over a time duration until it is displayed at a final prominence as shown in FIG. 14B (e.g., as described with reference to method 1500). Optionally, the time duration depends on where the user's attention was directed prior to the shift in the user's attention to the second virtual object 1006*b* (optionally including whether the user's attention was directed to a virtual object that was associated with a visual effect or not). In the example sequence of FIG. 14A to 14B, the user's attention was directed to first virtual object 1006*a* prior to being shifted to second virtual object 1006*b*, and first virtual object 1006*a* was not associated with a visual effect (e.g., no visual effect was applied to virtual environment 1220*a* and representation of physical environment 1008). In this case, computer system 101 optionally selects a first time duration over which to increase the visual prominence of the first visual effect. If instead the user's attention had previously been directed to a (different) virtual object associated with a different visual effect, the computer system 101 optionally selects a second (different) time duration over which to increase the visual prominence of the first visual effect, such as a time duration that is longer than or shorter than the first time duration. Optionally, the computer system 101 concurrently decreases the visual prominence of the different visual effect over the time duration (such as by cross-fading the visual effects).

In some embodiments, computer system 101 applies a visual effect associated with a virtual object (e.g., as shown in FIG. 14B) if the virtual environment 1420*a* and/or representation of physical environment 1408 are in a first state (e.g., corresponding to a light time-of-day setting), and forgoes applying the first visual effect if the virtual environment 1420*a* and/or representation of physical environment 1408 are in a second state (e.g., corresponding to a dark time-of-day setting), such as described with reference to method 1300. For example, if the virtual environment 1420*a* and/or representation of physical environment 1408 are in the second state, the virtual environment 1420*a* and/or representation of physical environment 1408 may already have dimming and/or tinting applied to them, based on being in the second state, and therefore computer system 101 optionally forgoes applying the dimming and/or tinting of the first visual effect.

Figure 14C:
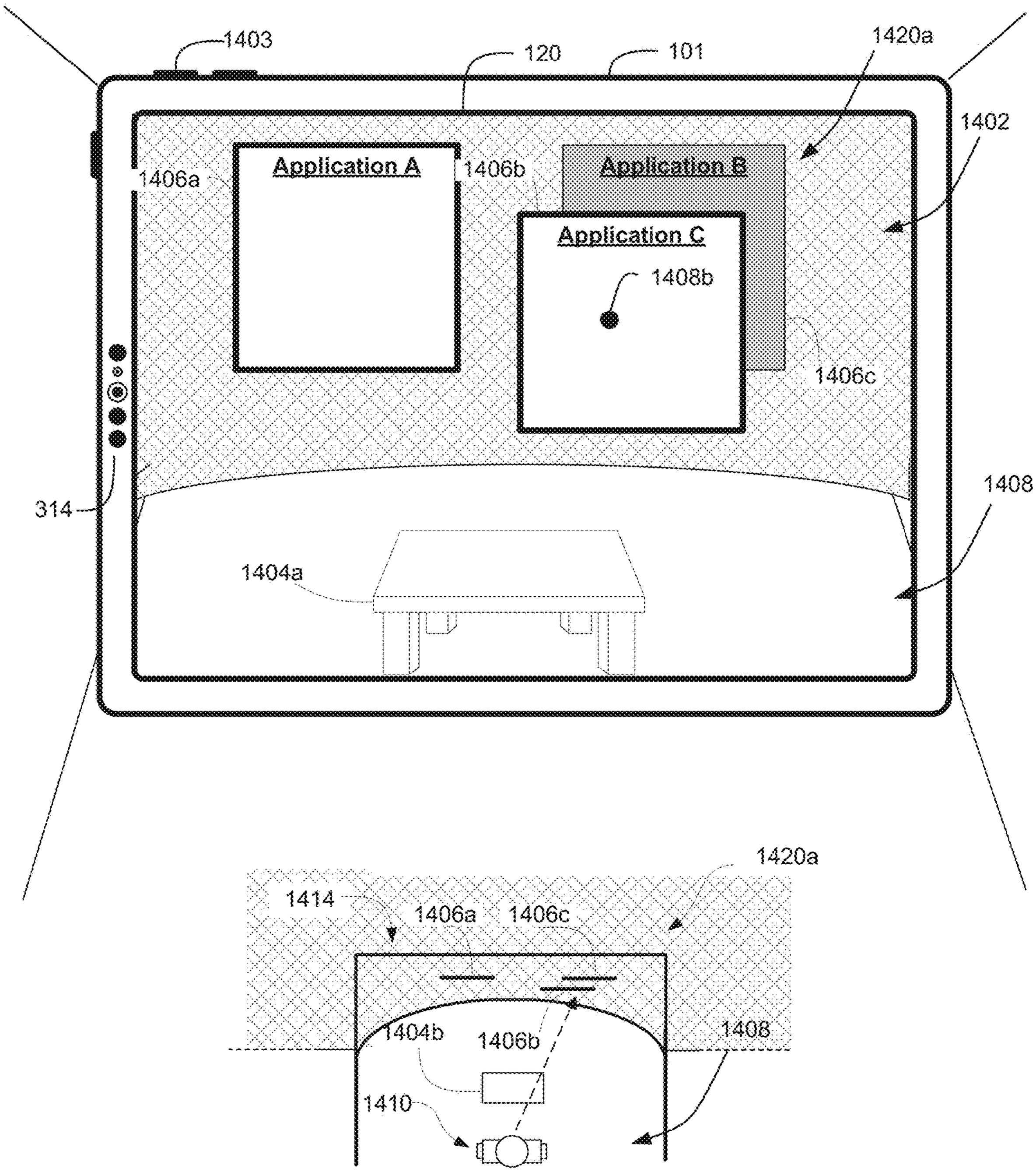

FIG. 14C depicts an alternative to FIG. 14B, in which the computer system 101 forgoes displaying the first visual effect applied to the representation of the physical environment 1408 and/or the first virtual environment 1420*a* (e.g., in spite of detecting that the user's attention is directed to second virtual object 1406*b* while second virtual object 1406*b* is in the active state) because the first virtual environment 1420*a* is in a second state (e.g., corresponding to a dark time-of-day setting).

In some embodiments, computer system 101 applies a visual effect associated with a virtual object if the virtual object is in an active state and forgoes applying the visual effect associated with the virtual object if the virtual object is not in the active state (e.g., it is in an inactive state).

For example, from FIG. 14A to FIG. 14D, the user 1410 has shifted their attention to third virtual object 1406*c* (e.g., by looking at third virtual object 1406*c*, as indicated by gaze point 1405*c*) while the third virtual object 1406*c* is not in the active state. Third virtual object 1406*c* is associated with a second visual effect (optionally different from the first visual effect associated with second virtual object 1406*b*), but computer system 101 forgoes applying the second visual effect to the representation of the physical environment 1408 and/or the first virtual environment 1420*a* (e.g., in spite of detecting that the user 1410 has directed their attention to the third virtual object 1406*c*) because third virtual object 1406*c* is not in the active state. Optionally, computer system 101 continues to display a different visual effect applied to virtual environment 1420*a* and/or representation of physical environment 1408, if computer system was displaying the different visual effect at the time the user shifted their attention to third virtual object 1406*c*. In some embodiments, computer system 101 does not change the state of a virtual object from inactive to active in response to a user looking at the virtual object. For example, in FIG. 14D, third virtual object 1406*c* remains inactive after user 1410 looks at third virtual object 1406*c*. Alternatively, in some embodiments, computer system 101 does change the state of a virtual object to the active state in response to a user looking at the virtual object, optionally after the user looks at the virtual object for a threshold time duration.

Figure 14D:
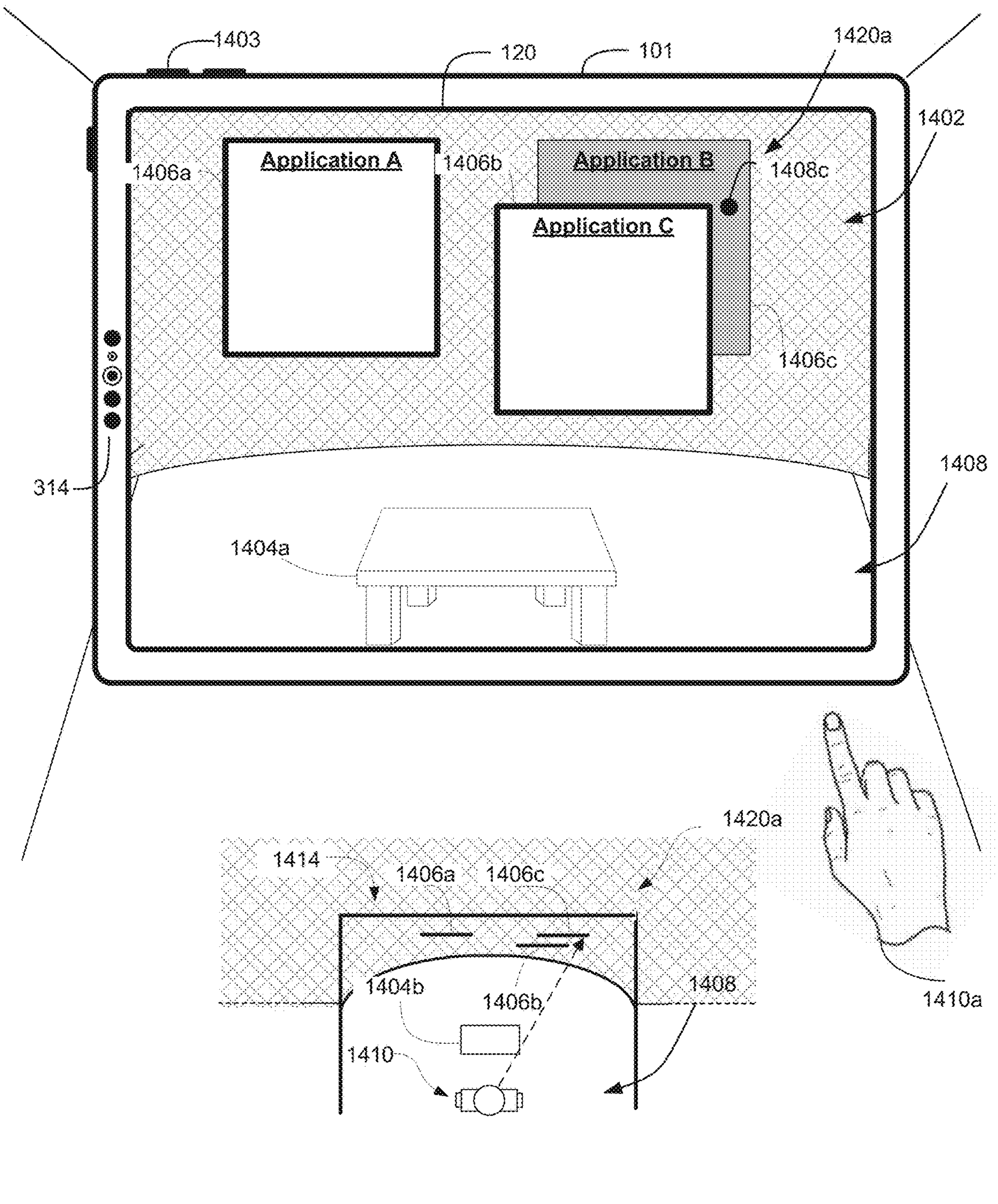
Figure 14E:
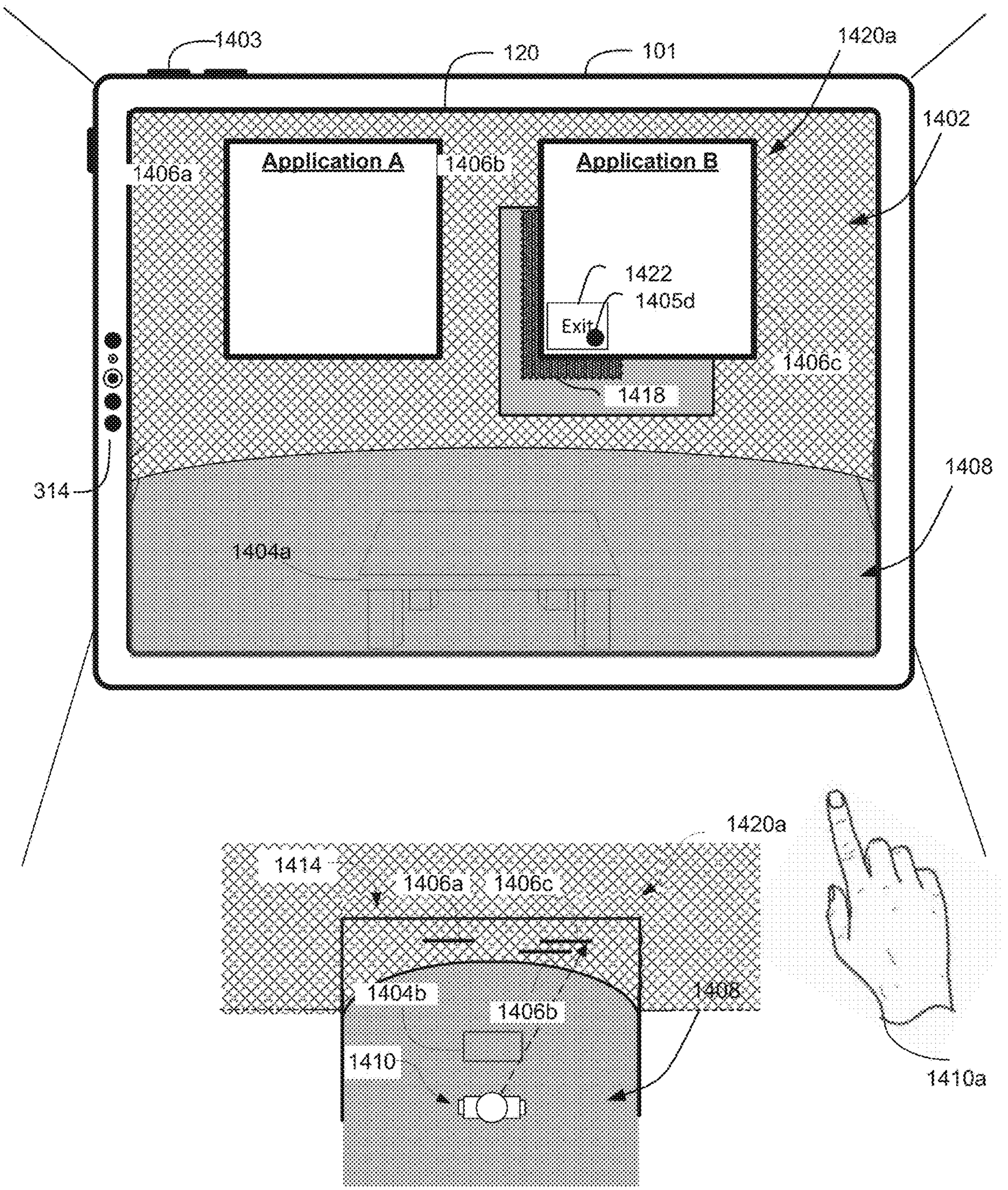

In some embodiments, computer system 101 changes the state of a virtual object to the active state in response to detecting a user input, such as an air gesture, while the user is looking at the virtual object (e.g., as described with reference to method 1500). In FIG. 14D, for example, the user 1410 provides an input with the user's hand 1410*a*, such as an air pinch gesture, while looking at third virtual object 1406*c*, and in response to detecting the input from the user's hand 1410*a* while the user is looking at third virtual object 1406*c*, computer system 101 changes the state of third virtual object 1046*c* to the active state, as shown in FIG. 14E. Optionally, when computer system 101 changes the state of a virtual object to the active state, and the virtual object is associated with a visual effect, computer system applies the visual effect based on changing the state of the virtual object to the active state.

FIG. 14D1 illustrates similar and/or the same concepts as those shown in FIG. 14D (with many of the same reference numbers). It is understood that unless indicated below, elements shown in FIG. 14D1 that have the same reference numbers as elements shown in FIGS. 14A-14K have one or more or all of the same characteristics. FIG. 14D1 includes computer system 101, which includes (or is the same as) display generation component 120. In some embodiments, computer system 101 and display generation component 120 have one or more of the characteristics of computer system 101 shown in FIGS. 14A-14K and display generation component 120 shown in FIGS. 1 and 3, respectively, and in some embodiments, computer system 101 and display generation component 120 shown in FIGS. 14A-14K have one or more of the characteristics of computer system 101 and display generation component 120 shown in FIG. 14D1.

In FIG. 14D1, display generation component 120 includes one or more internal image sensors 314*a* oriented towards the face of the user (e.g., eye tracking cameras 540 described with reference to FIG. 5). In some embodiments, internal image sensors 314*a* are used for eye tracking (e.g., detecting a gaze of the user). Internal image sensors 314*a* are optionally arranged on the left and right portions of display generation component 120 to enable eye tracking of the user's left and right eyes. Display generation component 120 also includes external image sensors 314*b* and 314*c* facing outwards from the user to detect and/or capture the physical environment and/or movements of the user's hands. In some embodiments, image sensors 314*a*, 314*b*, and 314*c* have one or more of the characteristics of image sensors 314 described with reference to FIGS. 14A-14K.

In FIG. 14D1, display generation component 120 is illustrated as displaying content that optionally corresponds to the content that is described as being displayed and/or visible via display generation component 120 with reference to FIGS. 14A-14K. In some embodiments, the content is displayed by a single display (e.g., display 510 of FIG. 5) included in display generation component 120. In some embodiments, display generation component 120 includes two or more displays (e.g., left and right display panels for the left and right eyes of the user, respectively, as described with reference to FIG. 5) having displayed outputs that are merged (e.g., by the user's brain) to create the view of the content shown in FIG. 14D1.

Display generation component 120 has a field of view (e.g., a field of view captured by external image sensors 314*b* and 314*c* and/or visible to the user via display generation component 120) that corresponds to the content shown in FIG. 14D1. Because display generation component 120 is optionally a head-mounted device, the field of view of display generation component 120 is optionally the same as or similar to the field of view of the user.

In FIG. 14D1, the user is depicted as performing an air pinch gesture (e.g., with hand 1410*a*) to provide an input to computer system 101 to provide a user input directed to content displayed by computer system 101. Such depiction is intended to be exemplary rather than limiting; the user optionally provides user inputs using different air gestures and/or using other forms of input as described with reference to FIGS. 14A-14K.

In some embodiments, computer system 101 responds to user inputs as described with reference to FIGS. 14A-14K.

In the example of FIG. 14D1, because the user's hand is within the field of view of display generation component 120, it is visible within the three-dimensional environment. That is, the user can optionally see, in the three-dimensional environment, any portion of their own body that is within the field of view of display generation component 120. It is understood than one or more or all aspects of the present disclosure as shown in, or described with reference to FIGS. 14A-14K and/or described with reference to the corresponding method(s) are optionally implemented on computer system 101 and display generation unit 120 in a manner similar or analogous to that shown in FIG. 14D1.

For example, in FIG. 14E, computer system 101 applies a second visual effect to first virtual environment 1420*a* and/or representation of physical environment 1420*b* in response to detecting that third virtual object 1406*c* has changed to the active state (and optionally, in response to determining that the user 1410 continues to direct their attention to the third virtual object 1406). The second visual effect is optionally different from the first visual effect associated with second virtual object 1406*b*, as indicated by the different shading and patterning in FIG. 14E relative to FIG. 14B. Optionally, changing the state of third virtual object 1410*c* to the active state includes changing one or more visual characteristics of the third virtual object 1406*c*, such as by bringing third virtual object 1406*c* to the foreground (e.g., changing the spatial depth of third virtual object 1406*c* such that it appears to be in front of second virtual object 1406*b*) and/or increasing a visual prominence (e.g., as described with reference to method 1500) of third virtual object 1406*c* (such as indicated in FIG. 14E by the increased border width and white fill relative to FIG. 14D).

Optionally, a portion 1418 of second virtual object 1406*b* is displayed with greater transparency relative to other portions of second virtual object 1406*b* such as described with reference to method 800. In some embodiments, changing the state of third virtual object 1406*c* to the active state includes changing the state of (overlapping) second virtual object 1406*b* to an inactive state and optionally reducing a visual prominence of second virtual object 1406*b* relative to third virtual object 1406*c*.

Figure 14F:
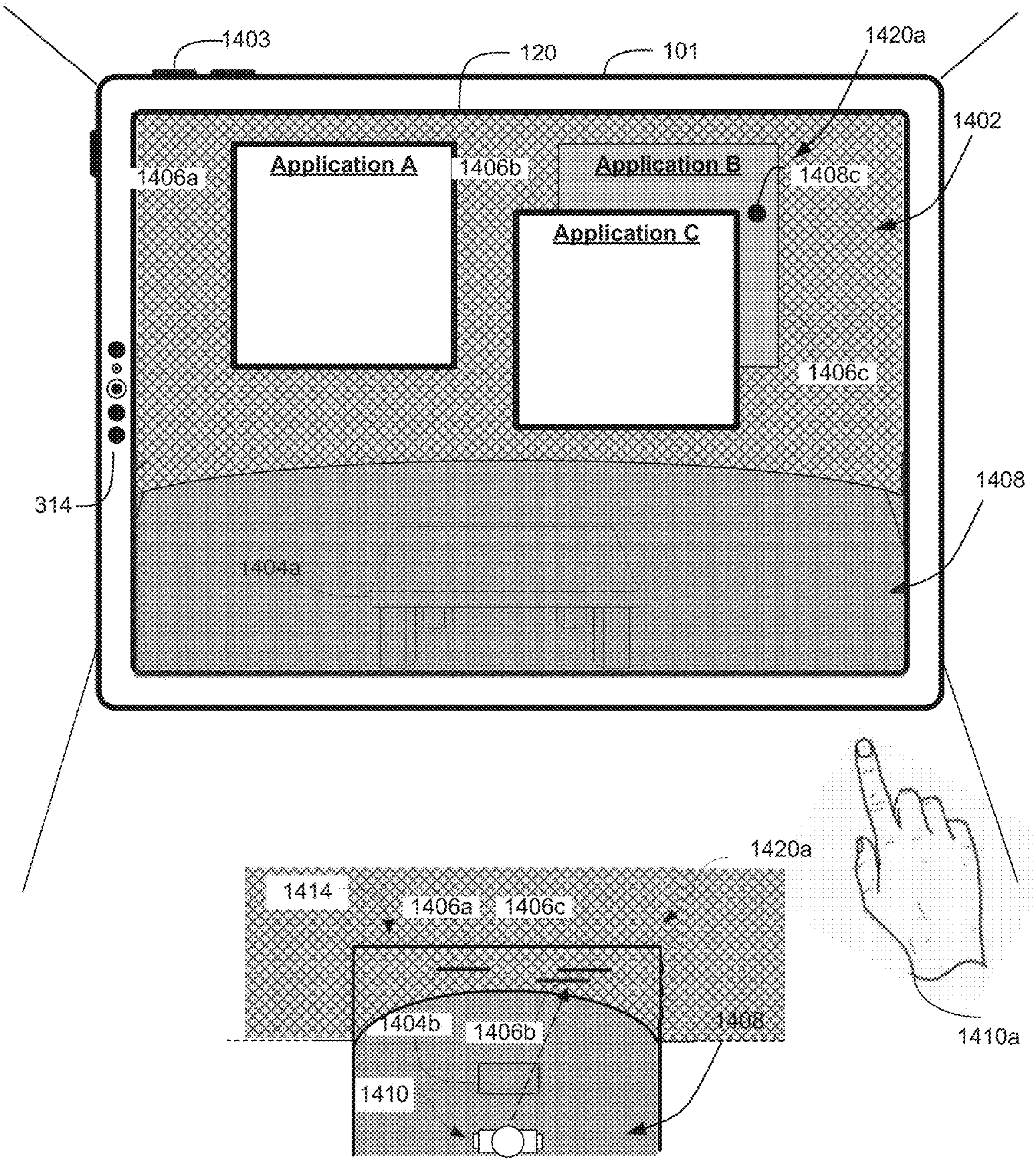
Figure 14G:
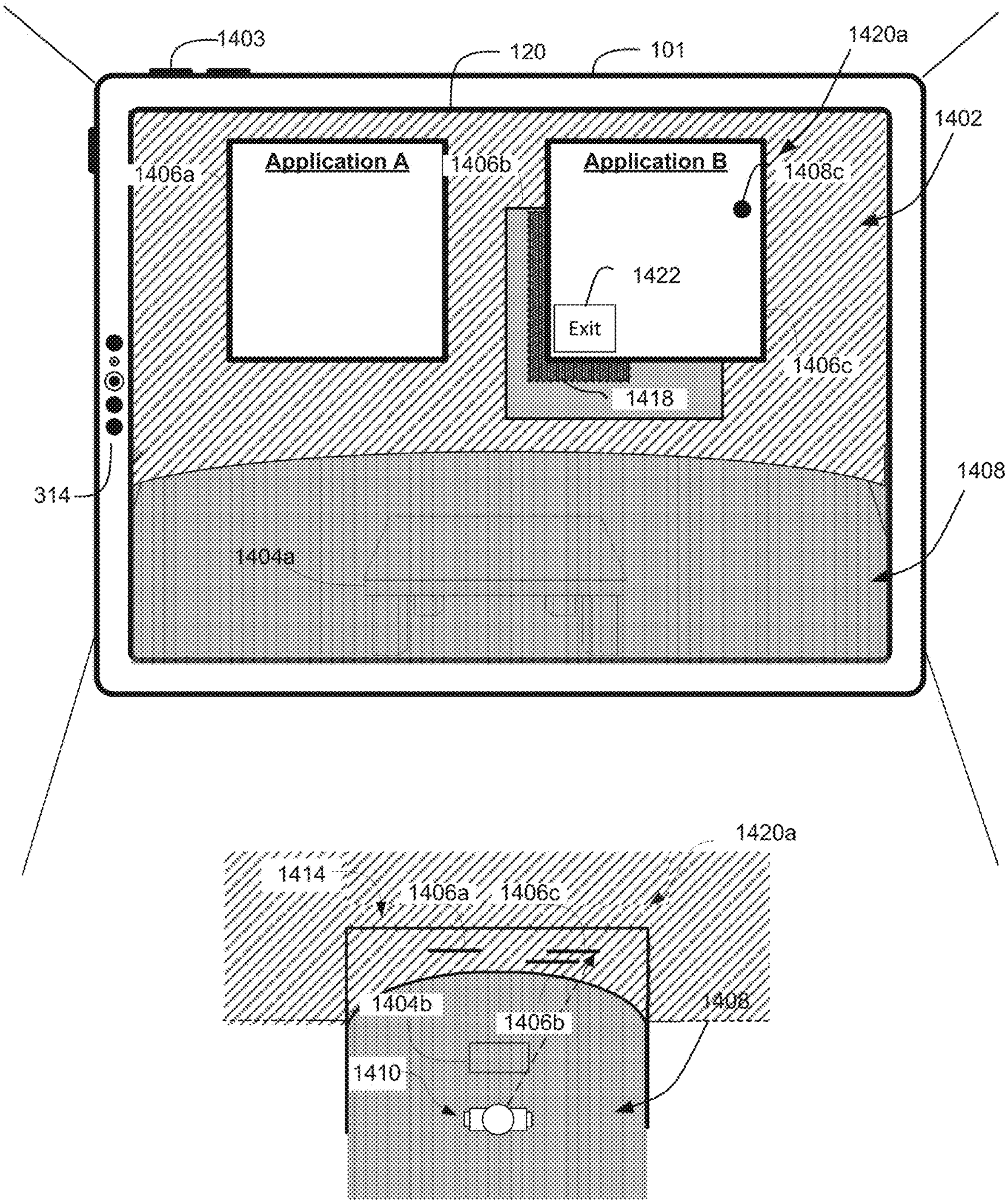

In some embodiments, when a user directs their attention to a virtual object that is in the active state and is associated with applying a visual effect, the computer system 101 selects the visual effect to be applied based on where the user was previously directing their attention (e.g., based on a visual effect displayed at the time the computer system detects the shift in the user's attention to the virtual object, such as a visual effect associated with a different virtual object or with a virtual environment). For example, in response to detecting a shift in the user's attention from first virtual object 1406*a* to the third virtual object 1406*d* (e.g., as represented by the sequence of FIGS. 14A, 14D, and 14E), computer system optionally selects a first respective visual effect as the second visual effect (e.g., the visual effect associated with third virtual object 1406*c*). In contrast, in response to detecting a shift in the user's attention from second virtual object 1406*b* to third virtual object 1406*c* (e.g., including changing second virtual object 1406*b* to the active state, as represented by the sequence of FIGS. 14B, 14F, and 14G), computer system optionally selects a second (different) respective visual effect as the second visual effect, as shown in FIG. 14G.

Figure 14H:
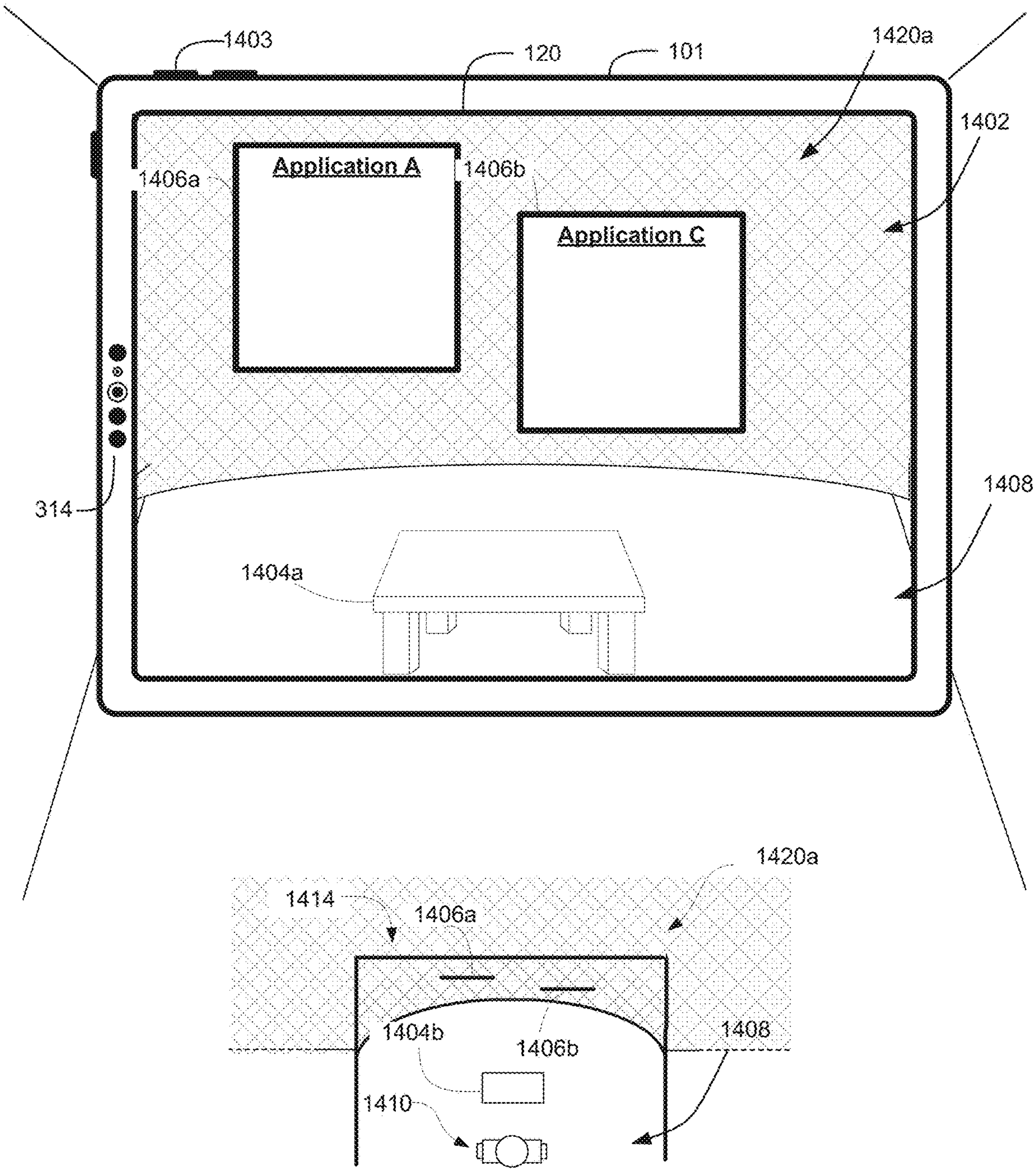

In some embodiments, computer system 101 ceases to apply a visual effect associated with a virtual object if the virtual object ceases to be displayed, such as described with reference to method 1500. For example, returning to FIG. 14E, the user 1410 optionally selects exit affordance 1422 (e.g., by looking at exit affordance 1422, such as indicated by gaze point 1405*d*, and/or by providing an input with hand 1410*a*, such as an air gesture, optionally while looking at exit affordance 1422). In response to detecting the selection of exit affordance 1422 in FIG. 14E, computer system 101 ceases to display third virtual object 1406*c* and ceases to display the second visual effect applied to virtual environment 1420*a* and representation of physical environment 1408, as shown in FIG. 14H. Although not shown in FIG. 14H, in some embodiments, when computer system 101 ceases to display a virtual object (e.g., third virtual object 1406*c*) and ceases to apply a visual effect associated with that virtual object (e.g., the second visual effect), computer system 101 applies a different visual effect to virtual environment 1420*a* and/or to representation of physical environment 1408, such as a visual effect associated with a virtual object to which the user previously directed their attention (e.g., before shifting their attention to the third virtual object 1406*c*, for example), or a visual effect associated with virtual environment 1420*a* (such as a dimming effect corresponding to virtual environment 1420*a* operating in a dark time-of-day state), or another visual effect.

In some embodiments, if a user 1410 shifts their attention away from a virtual object while a visual effect associated with the virtual object is displayed, the computer system 101 gradually decreases the amount of the visual effect in accordance with the shift in the user's attention (e.g., based on a distance by which the user has shifted their attention away from the virtual object). In some embodiments, if the user directs their attention sufficiently far from the virtual object (e.g., more than a threshold distance, optionally for more than a threshold duration) the computer system 101 optionally ceases to apply the visual effect at all.

Figure 14I:
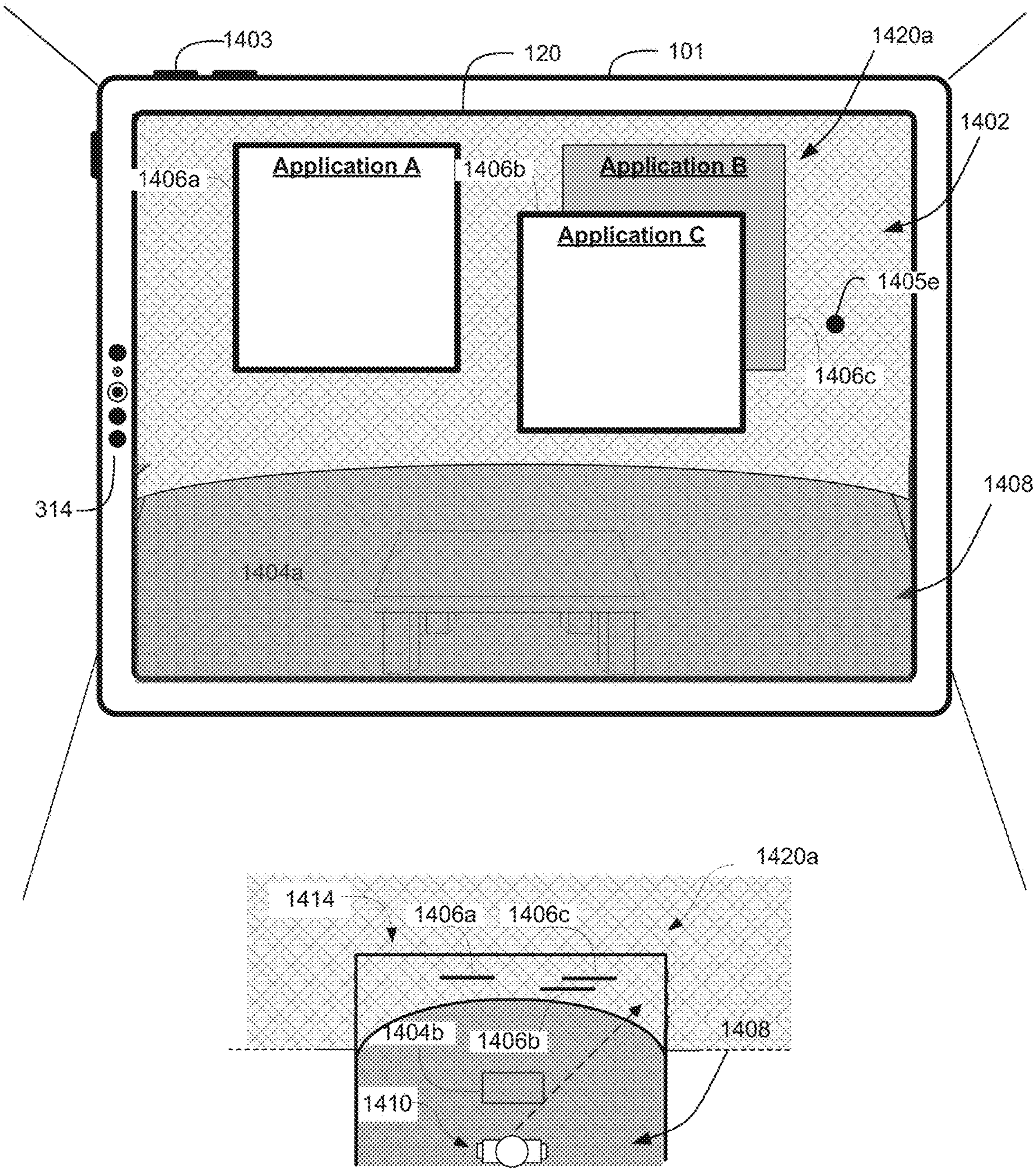

From FIG. 14B to 141, for example, the user 1410 has shifted their attention away from second virtual object 1406*b* while the first visual effect (associated with second virtual object 1406*b*) was displayed (e.g., as indicated by the shift in the gaze point from gaze point 1405*b* in FIG. 14B to gaze point 1405*e* in FIG. 14I). In response to detecting the shift, computer system has decreased the amount of the first visual effect applied to the virtual environment 1420*a* and representation of physical environment 1408*b* as shown in FIG. 14I. For example, the computer system 101 decreases the visual prominence of the first visual effect as described with reference to method 1500. Optionally, the computer system 101 begins to decrease the amount of the first visual effect after a delay (e.g., after a threshold time duration) after the user shifts their attention away from the second virtual object. For example, the computer system 101 waits until the user has directed their attention away from the second virtual object 1006*b* for a threshold time duration before beginning to decrease the amount of the first visual effect. In some embodiments, if the user 1410 shifts their attention to redirect their attention to the second virtual object 1006*b*, the computer system 101 increases the visual prominence of the first visual effect in accordance with the shift in the user's attention, optionally without waiting for a time duration (e.g., a delay). Optionally, the computer system 101 increases and/or decreases the visual prominence of the first visual effect (e.g., based on the user 1410 shifting their attention, as described above) in a manner that emulates a critically damped spring, such that there are no oscillations in visual prominence as the computer system 101 changes the visual prominence of the first visual effect.

Figure 14J:
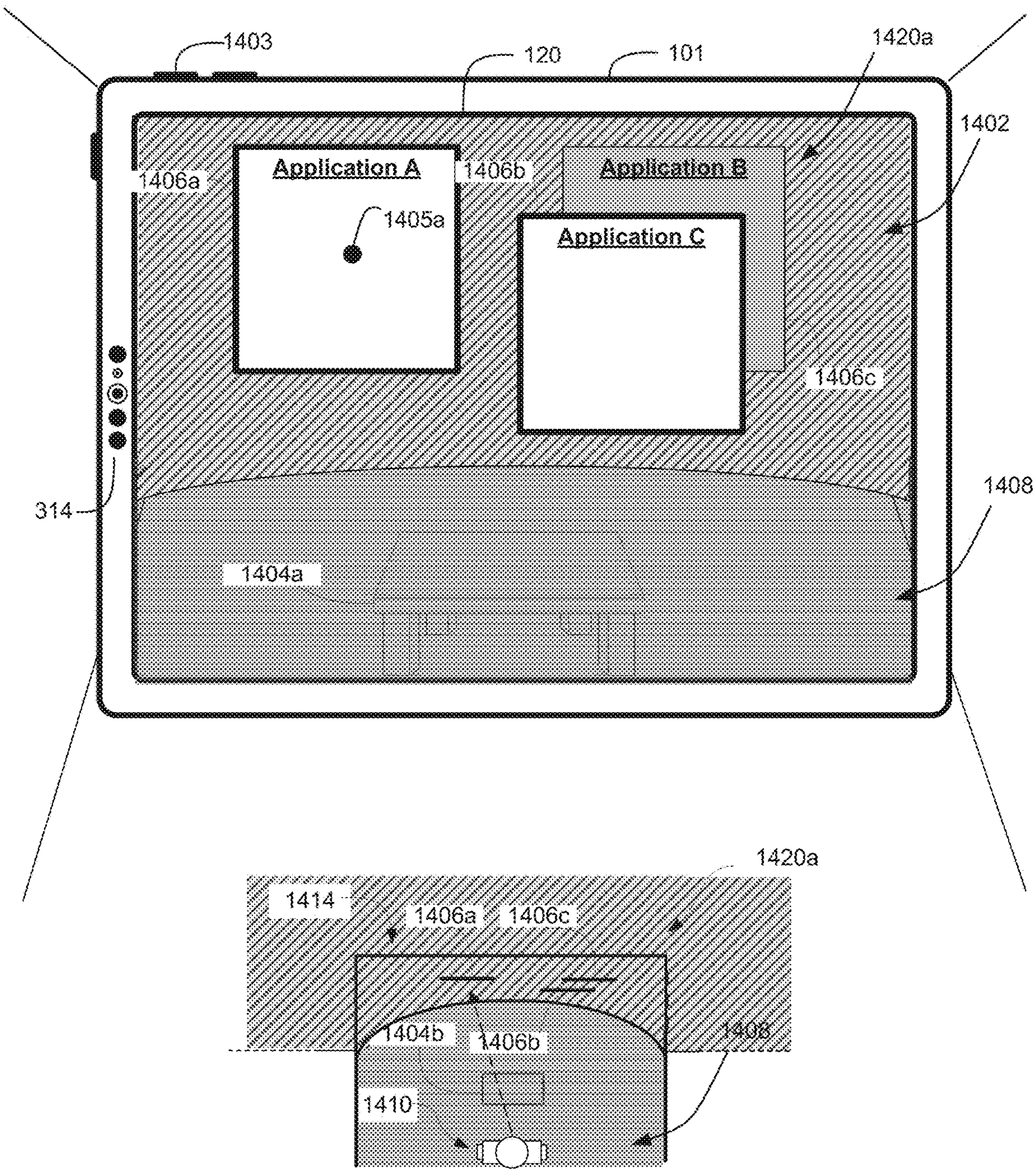
Figure 14K:
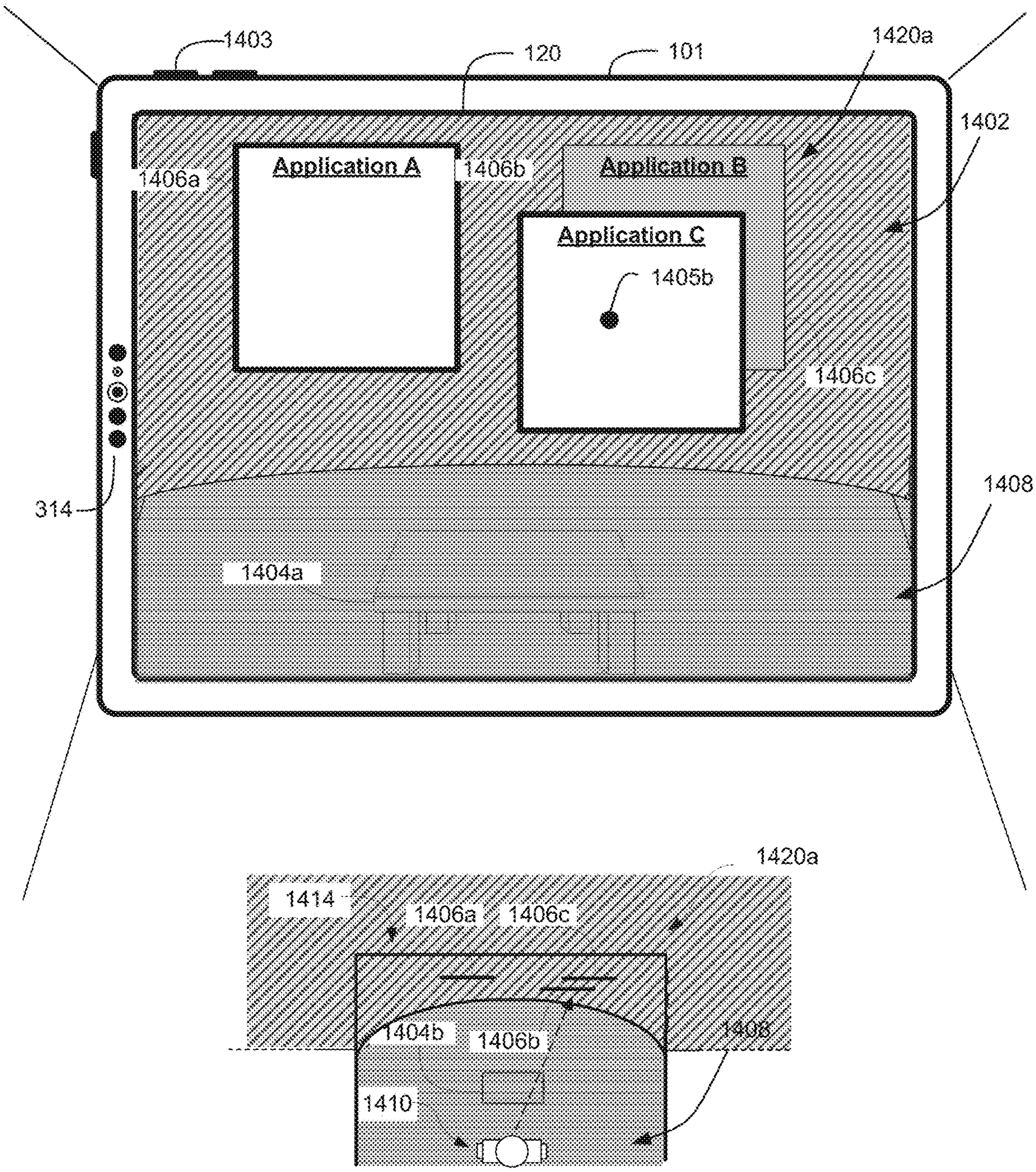

In some embodiments, a virtual environment and/or an atmosphere environment (e.g., as described with reference to method 1500) are optionally associated with a visual effect (e.g., a system-level visual effect rather than a visual effect associated with an application) such as a visual effect corresponding to a time-of-day setting and/or a season (e.g., as described with reference to method 1300). In this case, the visual effect associated with the virtual environment and/or atmosphere environment optionally overrides a visual effect associated with a virtual object (e.g., a visual effect associated with an application). For example, FIGS. 14J and 14K represent an alternative to FIGS. 14A and 14B in which virtual environment 1420*a* is associated with a third visual effect (e.g., different from the second visual effect associated with second virtual object 1006*b*). In FIG. 14J, computer system 101 applies the third visual effect to the virtual environment 1420*a* and/or representation of physical environment 1008 based on the virtual environment 1420*a* and/or representation of physical environment 1008 being associated with the third visual effect.

In FIG. 14K, the user 1410 directs their attention to second virtual object 1006*b* as in FIG. 14B, but in this case the computer system 101 continues to apply the third visual effect to the virtual environment 1420*a* and the representation of physical environment 1008 based on the virtual environment 1420*a* being associated with the third visual effect.

Alternatively, in some embodiments, visual effects associated with applications (e.g., with virtual objects such as virtual object 1006*a*, 1006*b*, and 1006*c*) override system-level effects. In this case, in response to detecting the shift in the user's attention to second virtual object 1006*b* (e.g., from FIG. 14J), computer system 101 replaces display of the third visual effect shown in FIG. 14J with display of the second visual effect shown in FIG. 14B.

FIG. 15 is a flowchart illustrating a method 1500 of facilitating initiation of a virtual computer experience in a three-dimensional environment in accordance with some embodiments. In some embodiments, the method 1500 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, and/or a projector) and one or more cameras (e.g., a camera (e.g., color sensors, infrared sensors, and other depth-sensing cameras) that points downward at a user's hand or a camera that points forward from the user's head). In some embodiments, the method 1500 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1500 are, optionally, combined and/or the order of some operations is, optionally, changed.

In some embodiments, the method 1500 is performed at a computer system in communication with one or more input devices and a display generation component, the computer system associated with a user. In some embodiments, the computer system has one or more of the characteristics of the computer system described with reference to method 800, 900, 1100, and/or 1300. In some embodiments, the display generation component has one or more of the characteristics of the display generation component described with reference to methods 800, 900, 1100, and/or 1300. In some embodiments, the input devices have one or more of the characteristics of the input devices described with reference to methods 800, 900, 1100, and/or 1300.

In some embodiments, while displaying, via the display generation component, a plurality of virtual objects in a three-dimensional environment, (e.g., virtual objects 1406*a*, 1406*b*, and 1406*c* as shown in FIG. 14A and as described with reference to methods 800, 900, 1100, and/or 1300) the computer system detects (1502*a*), via the one or more input devices, a shift in attention of the user to a first virtual object (e.g., a shift to second virtual object 1406*b* as shown in FIG. 14B) of the plurality of virtual objects, wherein the first virtual object is associated with a first visual effect. In some embodiments, the plurality of virtual objects includes one or more of virtual application windows (e.g., application user interfaces), virtual media content, virtual representations of real-world objects, and/or other types of virtual objects. In some embodiments, the first visual effect has one or more of the characteristics of the first visual effect described with reference to methods 1100 and/or 1300. In some embodiments, the first virtual object is associated with the first visual effect based on a setting of the first virtual object that is optionally configured by the user, by the computer system, by an application that controls or defines display of the first virtual object and/or by a vendor of the first virtual object. For example, a vendor of a virtual media content application optionally configures the virtual media content application to be associated with a dimming setting that indicates and/or requests dimming of the environment around (e.g., excluding) the media content application. In some embodiments, detecting the shift in the attention of the user to the first virtual object includes detecting that a gaze of the user has been shifted (e.g., changed and/or moved) to the first virtual object (optionally, for a threshold duration such as 0.01, 0.1, 0.5, 1, 3, 5, or 10 seconds) from another location in the three-dimensional environment (e.g., a location not including the first virtual object and/or including a second virtual object, different from the first virtual object, such as from first virtual object 1406*a* in FIG. 14A)), or that the user has selected the first virtual object for activation (such as by gazing at the first virtual object and providing an input such as an air pinch gesture), or that the user has otherwise interacted with the first virtual object (such as by providing inputs to an application user interface associated with the first virtual object).

In some embodiments, in response to detecting the shift in the user's attention to the first virtual object (1502*b*), in accordance with a determination that the first virtual object is in an active state and one or more first criteria are satisfied (e.g., the three-dimensional environment does not include an environment (or other virtual object) associated with a different visual effect that is configured to override the first visual effect), the computer system displays (1502*c*) the first visual effect applied to the three-dimensional environment. (e.g., such as depicted in FIG. 14B) In some embodiments, the computer system determines that the first virtual object is in an active state based on determining that the user has previously activated the first virtual object (such as by launching activation of the first virtual object via selection of an icon associated with the first virtual object and/or by gazing at the first virtual object and providing an input such as an air pinch gesture), and/or based on determining that the first virtual object has remained in the active state after the most recent activation of the first virtual object. In some embodiments, displaying the first visual effect applied to the three-dimensional environment includes presenting (e.g., displaying and/or making visible) a representation of a physical object and/or a representation of a physical environment with the first visual effect applied to the physical object and/or the representation of the physical environment (e.g., overlaid on or otherwise applied to the physical object or representation of the physical environment), as described with reference to methods 1100 and/or 1300. In some embodiments, displaying the first visual effect applied to the three-dimensional environment includes displaying additional virtual objects of the plurality of virtual objects, additional virtual content, and/or a virtual environment (e.g., such as described with reference to method 1100) with the first visual effect applied to additional virtual objects of the plurality of virtual objects, additional virtual content, and/or a virtual environment, such as by dimming and/or tinting the additional virtual objects, the additional virtual content, and/or the virtual environment. In some embodiments, before detecting the shift in the user's attention to the first virtual object, the computer system presents (e.g., displays or makes visible) the three-dimensional environment without applying the first visual effect to the three-dimensional environment (e.g., such as depicted in FIG. 14A).

In some embodiments, in accordance with a determination that the first virtual object is not in the active state (e.g., the first virtual object is inactive), the computer system forgoes (1502*d*) displaying the first visual effect applied to the three-dimensional environment. For example, in FIGS. 14D and 14D1, third virtual object 1408*c* is inactive and the computer system forgoes displaying a visual effect associated with virtual object 1408*c*. In some embodiments, forgoing displaying the first visual effect applied to the three-dimensional environment includes presenting the three-dimensional environment without any visual effect applied to the three-dimensional environment (e.g., without any dimming or tinting associated with the virtual object), such as shown in FIGS. 14D and 14D1. In some embodiments, forgoing displaying the first visual effect applied to the three-dimensional environment includes applying a second, third, or other visual effect to the three-dimensional environment (e.g., different from the first visual effect), such as by applying a second visual effect (e.g., including a second dimming effect and/or a second tinting effect) associated with a second virtual object that was already in an active state when the attention of the user shifted to the first virtual object (e.g., such as described with reference to FIG. 14F). Applying a visual effect associated with an active virtual object (e.g., an object to which the user's attention is directed) to the three-dimensional environment (e.g., optionally including representations of physical objects, a representation of a physical environment, virtual objects, and/or a virtual environment) provides a less jarring and/or less distracting view of the three-dimensional environment, enables the user to better focus on virtual objects of interest, and provides visual feedback as to the state of the virtual object, thereby reducing the likelihood that the user will provide unintentional inputs to the computer system.

In some embodiments, before (optionally when) detecting the shift in attention of the user to the first virtual object (e.g., as described with reference to step 1502*a*), the computer system presents (e.g., displaying or otherwise making visible, such as via optical passthrough) the three-dimensional environment without any visual effect applied to the three-dimensional environment (e.g., as shown in FIG. 14A). For example, the three-dimensional environment is optionally presented without any dimming effect, without any tinting effect, and/or without any other visual effect applied to the three-dimensional environment that changes the visual prominence of the three-dimensional environment. Displaying the virtual effect associated with the first virtual object only when the users attention is directed to the first virtual object (and refraining from displaying the visual effect when the users attention is not directed to the first virtual object) maintains the visibility of the three-dimensional environment when the visual effect is not needed, thereby reducing the likelihood that the user will provide unintentional inputs to the computer system.

In some embodiments, before (optionally when) detecting, via the one or more input devices, the shift in attention of the user to the first virtual object (e.g., as described with reference to step 1502*a*), in accordance with a determination that second criteria are satisfied (e.g., including a criterion that is satisfied when attention of the user is directed to a virtual object and/or area of the three-dimensional environment that is associated with a second visual effect (e.g., an application requesting the visual effect), and/or a criterion that is satisfied when some or all of the three-dimensional environment is in a state associated with displaying a second visual effect, such as the first state described with reference to method 1300, the computer system displays a second visual effect applied to the three-dimensional environment, the second visual effect different from the first visual effect (e.g., as shown in FIG. 14E). For example, the second visual effect optionally includes a second dimming effect and/or a second tinting effect different from the dimming effect and/or tinting effect of the first visual effect. In some embodiments, displaying the first visual effect includes ceasing to display the second visual effect. Displaying a different visual effect based on various criteria allows the computer system to tailor the visual effect to different content and/or different operating states of the computer system and/or of the three-dimensional environment.

In some embodiments, the second visual effect is a visual effect selected (e.g., by the computer system) based on an application that was active (e.g., in an active state as described earlier, and optionally to which the user's attention was directed) prior to detecting the shift in attention of the user to the first virtual object (e.g., as described with reference to step 1502*a*). For example, if (e.g., in accordance with a determination that) a first application was active before the shift in the user's attention to the first virtual object (and optionally, if the user was directing their attention to the first application and/or to a second virtual object displayed in the three-dimensional environment and associated with the first application), the computer system selects a third visual effect based on the first application being active before the shift in the users attention, such as depicted in the sequence of FIGS. 14A, 14D, and 14E. In this case, displaying the second visual effect applied to the three-dimensional environment includes displaying the selected third visual effect applied to the three-dimensional environment. For example, if (e.g., in accordance with a determination that) a second application (different from the first application) was active before the shift in the user's attention to the first virtual object (and optionally, if the user was directing their attention to the second application and/or to a third virtual object displayed in the three-dimensional environment and associated with the second application), the computer system selects a fourth visual effect (different from the third visual effect) based on the second application being active before the shift in the user's attention, such as depicted in the sequence of FIGS. 14B, 14F, and 14G. In this case, displaying the second visual effect applied to the three-dimensional environment includes displaying the selected fourth visual effect applied to the three-dimensional environment. Displaying a different visual effect based on which application(s) was active before the user directed their attention to the first virtual object allows the computer system to tailor the visual effect to different content, such as by allowing different applications to request different visual effects.

In some embodiments, the second visual effect is a visual effect selected (e.g., by computer system 101) based on a system visual effect (e.g., a currently active system-level visual effect rather than a visual effect associated with a single application) that is part of an augmented three-dimensional environment in which the first virtual object is displayed (e.g., a representation of a physical environment with a system-applied tint or other visual effect that modifies a virtual or optical passthrough feed or that modifies a virtual environment that replaces (e.g., obscures) some or all of a virtual or optical passthrough feed), such as shown in FIG. 14J. For example, if (e.g., in accordance with a determination that) a first system visual effect is active (e.g., the system is configured to apply the first system visual effect to some or all of the three-dimensional environment) before the computer system detects the shift in the user's attention to the first virtual object, the computer system selects a third visual effect based on the first system effect being active. In this case, displaying the second visual effect applied to the three-dimensional environment includes displaying the selected third visual effect applied to the three-dimensional environment. For example, if (e.g., in accordance with a determination that) a second system effect (different from the first system effect) is active before the computer system detects the shift in the user's attention to the first virtual object, the computer system selects a fourth visual effect (different from the third visual effect) based on the second system visual effect being active. In this case, displaying the second visual effect applied to the three-dimensional environment includes displaying the selected fourth visual effect applied to the three-dimensional environment. Displaying a visual effect associated with an augmented three-dimensional environment based on the state of the environment enables the computer system to more effectively simulate a time of day in the environment.

In some embodiments, the first virtual object is not in the active state (e.g., the user is not directing their attention to the first virtual object and/or interacting with the first virtual object, and/or the user has not provided an input to activate the first virtual object) before (and/or when) detecting that shift in the attention of the user to the first virtual object (e.g., as described with reference to step 1502*a*), such as depicted in FIG. 14A. In some embodiments, the active or inactive state of the first virtual object has one or more of the characteristics of the active and inactive states described with reference to methods 800 and/or 900.

In some embodiments, after detecting the shift in the attention of the user to the first virtual object (e.g., after which the first virtual object remains in an inactive state and the first visual effect is not yet applied to the three-dimensional environment, such as described with reference to third virtual object 1406*c* in FIGS. 14D and 14D1) and while the attention of the user is directed to the first virtual object (e.g., while the user continues to gaze at the first virtual object), the computer system detects, via the one or more input devices, a user input (e.g., a touch input, an air gesture input such as an air pinch gesture, a press or rotation of a physical button, or another user input).

In some embodiments, in response to detecting the user input while the attention of the user is directed to the first virtual object (e.g., in response to detecting an air pinch gesture or other user input while the user is gazing at the first virtual object), the computer system changes the state of the first virtual object to the active state (e.g., a state in which the first visual effect associated with the first virtual object is applied to the three-dimensional environment), such as described with reference to changing the state of third virtual object 1406*c* to the active state in FIG. 14E. Optionally, changing the state of the first virtual object to the active state includes changing a visual characteristic of the first virtual object, such as increasing a thickness of a border of the first virtual object, increasing a brightness, saturation, and/or opacity of the first virtual object, bringing the first virtual object into the foreground of the display, and/or providing another visual indication that the first virtual object is in the active state.

In some embodiments, the displaying of the first visual effect applied to the three-dimensional environment is based on the state of the first virtual object being in the active state, such as depicted in FIG. 14E Activating a virtual object in response to a user input avoids inadvertent activation of virtual objects and corresponding inadvertent application of visual effects to the three-dimensional environment when the user looks around the environment, thereby reducing the likelihood of erroneous interactions with the computer system.

In some embodiments, before (optionally when) detecting the user input (e.g., while the attention of the user is directed to the first virtual object or before the attention of the user is directed to the first virtual object), the first virtual object is displayed at least partially behind (e.g., at a greater depth than, relative to a viewpoint of the user) and obscured by (e.g., partially or fully occluded by, from the viewpoint of the user) a second virtual object relative to a current viewpoint of the user (e.g., such as described with reference to method 800). For example, third virtual object 1406*c* is obscured by second virtual object 1406*b* in FIGS. 14D and 14D1. Allowing the user to activate a virtual object that is at least partially overlapped by another virtual object by looking at the overlapped virtual object and providing an air gesture input (for example) enables the user to quickly activate virtual objects of interest, with corresponding visual effects applied upon activation.

In some embodiments, the first virtual object is not in the active state (and optionally, the first visual effect is not applied to the three-dimensional environment) after detecting the shift in the attention of the user to the first virtual object (e.g., as described with reference to step 1502*a*) and before detecting the user input (e.g., as described earlier with reference to the user input that activates the first virtual object), such as depicted in FIGS. 14D and 14D1. In some embodiments, detecting that the user is directing their attention to a virtual object is not sufficient to activate the virtual object (e.g., the computer system does not activate the virtual object in response to detecting that the user's attention has shifted to the virtual object); the user also needs to provide an input (such as described above) to activate the virtual object, such as described in more detail with reference to methods 800 and/or 900. Waiting to activate a virtual object (such as an application window) until the user has provided an input indicating that the user wishes to activate the virtual object avoids inadvertent activation of virtual objects (and application of corresponding visual effects) if the user simply looks at different virtual objects, such as while the user is looking around the three-dimensional environment.

In some embodiments, displaying the first virtual object includes, in accordance with a determination that the first virtual object is in the active state (e.g., as described above and with reference to methods 800 and 900), displaying the first virtual object with a first visual appearance (e.g., with a first brightness, opacity, saturation, border thickness, color, spatial depth relative to other virtual objects, or other visual aspect of the first virtual object).

In some embodiments, displaying the first virtual object includes, in accordance with a determination that the first virtual object is in not in the active state, displaying the first virtual with a second visual appearance, different from the first visual appearance (e.g., with a second brightness, opacity, saturation, border thickness, color, spatial depth relative to other virtual objects, or other visual aspect of the first virtual object). For example, third virtual object 1406*c* is displayed with a first visual appearance in FIGS. 14D and 14D1 when it is not in the active state, and with a second visual appearance in FIG. 14E when it is in the active state. In some embodiments, the computer system changes the visual appearance of the first virtual object when it is activated, such as by bringing the first virtual object to the foreground (e.g., in front of another virtual object that previously overlaid the first virtual object) and/or changing other visual characteristics of the first virtual object. Changing the visual characteristics of the virtual object when it is activated provides feedback to the user that the virtual object is now active, and makes the virtual object more visually prominent to enable more efficient interactions with the virtual object.

In some embodiments, while displaying the first virtual object and while the first virtual object is in the active state (e.g., as described earlier and with reference to methods 800 and 900), the computer system displays a second virtual object of the plurality of virtual objects (e.g., a second application window or another type of virtual object), wherein the second virtual object is in the active state. For example, both first virtual object 1406*a* and second virtual object 1406*b* are in the active state in FIG. 14A. Optionally, the second virtual object does not overlap with the first virtual object (e.g., from the viewpoint of the user). For example, in some embodiments, multiple virtual objects can be active at the same time if they are not overlapping from the viewpoint of the user. Optionally, the second virtual object is not associated with a visual effect. Optionally, the second virtual object is associated with a second visual effect that is optionally the same as or different from the first visual effect, and optionally the computer system applies the first visual effect (associated with the first virtual object) or the second visual effect (associated with the second virtual object) based on which virtual object the user is directing their attention to. For example, if the user looks at the first virtual object, the computer system applies the first visual effect, and if the user looks at the second virtual object, the computer system applies the second visual effect. Allowing two virtual objects to be simultaneously active reduces the time, processing overhead, and/or number of user inputs associated with activating (or re-activating) the virtual objects.

In some embodiments, while displaying the first visual effect applied to the three-dimensional environment in accordance with the determination that the first virtual object is in the active state (e.g., as described with reference to step 1520*a*), the computer system detects, via the one or more input devices, an event corresponding to ceasing display of the first virtual object, such as the user selecting the exit affordance in FIG. 14E. In some embodiments, detecting the event corresponds to detecting a user input requesting to close (e.g., exit or quit) the first virtual object, such as by selecting an "exit" affordance, providing an air gesture corresponding to a request to close the virtual object, or by providing another type of user input. In some embodiments, detecting the event corresponds to detecting that the virtual object has unexpectedly crashed (e.g., due to an error at the computer system or elsewhere).

In some embodiments, in response to detecting the event, the computer system ceases to display the first virtual object and ceases to display the first visual effect applied to the three-dimensional environment, such as shown in FIG. 14H. In some embodiments, ceasing to display the first virtual object includes presenting (e.g., displaying or otherwise making visible) a portion of a background that was previously occluded by the first virtual object, such as a portion of a virtual environment and/or a portion of a representation of a physical environment. For example, a portion of virtual environment 1420*a* that was occluded by third virtual object 1406*a* (e.g., in FIG. 14E) is displayed in FIG. 14H, In some embodiments, ceasing to display the first visual effect applied to the three-dimensional environment includes presenting the three-dimensional environment with no visual effect applied, or with a different visual effect applied if criteria for displaying that different visual effect (e.g., having one or more of the characteristics of the first criteria for displaying the first visual effect) are satisfied. Ceasing to display the visual effect when the virtual object with which the visual effect is associated ceases to be displayed restores the visual prominence of the three-dimensional background when the visual effect is no longer needed, thereby reducing the likelihood of erroneous interactions with the computer system.

In some embodiments, displaying the first visual effect applied to the three-dimensional environment (e.g., as described with reference to step 1502*a*) comprises gradually changing (e.g., increasing or decreasing), a visual prominence (e.g., a brightness, opacity, saturation, or other visual feature) of the first visual effect to a final visual prominence through a plurality of intermediate states over a period of time (e.g., over 0.01, 0.1, 0.5, 1, 1.5, 3, 5, or 10 seconds) (e.g., a visual prominence after which the visual prominence does not change until another event causes the visual prominence to change, such as when another visual effect is applied or the first visual effect ceases to be applied), such as described with reference to FIG. 14B. In some embodiments, if the user looks away from the first virtual object, the first visual effect optionally gradually decreases such that the visual prominence changes from an initial visual prominence (e.g., dimming and tinting) to a final visual prominence (e.g., no dimming or tinting), such as described with reference to FIG. 14I. Optionally, if the user looks back towards the first virtual object, the computer system again changes the visual prominence over time, such as back to the initial visual prominence associated with the first visual effect. Gradually applying the first visual effect (e.g., by gradually increasing a dimming and/or tinting of the three-dimensional environment) results in a smoother and less jarring transition, thereby reducing the likelihood of erroneous interactions with the computer system.

In some embodiments, the visual prominence of the first visual effect is changed over the time duration (e.g., as described above and with reference to FIG. 14I) in a manner that emulates a critically dampened spring. For example, the visual prominence is gradually changed in a monotonic fashion (e.g., linearly or non-linearly), without oscillations. Applying (and/or removing) the first visual effect (e.g., by gradually increasing or decreasing a dimming and/or tinting of the three-dimensional environment) in a manned that emulates a critically dampened spring results in a smoother and less jarring transition, thereby reducing the likelihood of erroneous interactions with the computer system.

In some embodiments, the time duration over which the visual prominence of the first visual effect is changed (e.g., as described above) occurs after a time delay (e.g., after 0.01, 0.1, 0.5, 1, 1.5, 3, 5, or 10 seconds) following the detection of the shift in the user attention to the first virtual object and the determination that the first virtual object is in the active state (such as following the earlier or later of these two events). For example, the computer system optionally waits for the time delay to elapse before initiating the change in the visual prominence to ensure that the user intentionally shifted their attention to the first virtual object and/or intends to view and/or interact with the first virtual object rather than briefly looking at the first virtual object. In some embodiments, in response to detecting that the user has shifted their attention away from the first virtual object, the computer system changes the visual prominence of the first virtual effect over time (e.g., as described above) after a time delay. For example, the computer system optionally waits until the user's attention has been directed away from the first virtual object for the time delay before beginning to decrease the visual prominence of the first visual effect (optionally, while gradually increasing the visual prominence of a second visual effect associated with a different virtual object to which the user has directed their attention). Waiting to change the visual prominence of the visual effect until a time delay has elapsed reduces the likelihood of false positives in which the computer system undesirably changes the prominence of the visual effect based on a brief change in the direction of the user's attention.

In some embodiments, changing, over the time duration, the visual prominence of the first visual effect to the final visual prominence (e.g., as described above) comprises, in accordance with a determination that the shift in the user's attention is from a portion of the three-dimensional environment that is associated with a second visual effect different from the first visual effect (e.g., from a second virtual object associated with the second visual effect, such as an application window (e.g., second virtual object 1406*b* in FIG. 14B), or from a virtual environment associated with the second visual effect), changing the visual prominence of the first visual effect to the final visual prominence (e.g., as described above) over a first time duration (e.g., over 0.01, 0.1, 0.5, 1, 5, or 10 seconds).

In some embodiments, changing, over the time duration, the visual prominence of the first visual effect to the final visual prominence (e.g., as described above) comprises, in accordance with a determination that the shift in the users attention is from a portion of the three-dimensional environment that is not associated with a visual effect (e.g., an empty region of the three-dimensional environment or an application that has not requested a visual effect, such as first virtual object 1406*a* in FIG. 14A), changing the visual prominence of the first visual effect to the final visual prominence (e.g., as described above) over a second time duration (e.g., over 0.01, 0.1, 0.5, 1, 5, or 10 seconds) different from the first time duration. In some embodiments, the second time duration is shorter than the first time duration. In some embodiments, the time duration over which the visual prominence of the visual effect is changed (and optionally, whether the computer system waits to change the visual prominence until a time delay has elapsed) depends on whether the user has previously directed their attention to the first virtual object. For example, the time duration is optionally shorter if the user has previously directed their attention to the first object (optionally, within a threshold time duration, such as within the last 5, 10, 50, 80, 120, 150, 300, or 500 seconds) than if the user has not previously directed their attention to the first object (optionally, within the threshold time duration). Changing the duration over which the visual prominence of the visual effect is changed based on where the user was previously directing their attention before directing their attention to the virtual object, and/or based on whether the user previously directed their attention to the virtual object (e.g., and then directed their attention away) avoids jarring transitions and helps to avoid false positives to ensure that the visual effect is applied or not applied based on the likelihood that the user intends to continue directing their attention to the virtual object.

In some embodiments, after detecting the shift in the user's attention to the first virtual object (e.g., as described with reference to step 1502*a*), the computer system detects a shift in the user's attention (e.g., as described with reference to step 1502*a*) to a second virtual object of the plurality of virtual objects (e.g., having one or more of the characteristics of the first virtual object), such as detecting a shift in the user's attention from second virtual object 1406*b* to third virtual object 1406*c* as shown in FIG. 14C to FIGS. 14D and 14D1

In some embodiments, in response to detecting the shift in the user's attention to the second virtual object, in accordance with a determination that the second virtual object is associated with a second visual effect (e.g., as described earlier with reference to the first virtual object being associated with the first visual effect), the computer system displays the second visual effect applied to the three-dimensional environment (e.g., in a manner similar to that described for displaying the first visual effect), such as depicted in FIG. 14E. Optionally the second visual effect is displayed further in accordance with a determination that the second virtual object is in the active state. Optionally, displaying the second visual effect includes ceasing to display the first visual effect. Optionally, the second visual effect is displayed concurrently with the first visual effect, such as to generate a composite visual effect.

In some embodiments, in accordance with a determination that the second virtual object is not associated with the second visual effect (e.g., the second virtual object is not associated with any visual effect, or is associated with a third visual effect), the computer system forgoes displaying the second visual effect applied to the three-dimensional environment. For example, when the user directs their attention to first virtual object 1406*a* in FIG. 14A, the computer system does not display a visual effect. Optionally, the first visual effect continues to be displayed. Changing (or removing) the displayed visual effect based on the virtual object to which the user is directing their attention enables different virtual objects to assert different visual effects corresponding to different desired prominence of the virtual object relative to the three-dimensional environment.

In some embodiments, the first visual effect is displayed in accordance with the determination that the first virtual object is in the active state (e.g., as described above) independent of (e.g., without regard to) whether the three-dimensional environment is associated with a second visual effect (such as a system-level visual effect as described above) different from the first visual effect (and optionally without displaying the second visual effect applied to the three-dimensional environment), such as depicted in the sequence of FIG. 14J transitioning to FIG. 14B. For example, some or all of the three-dimensional environment (such as a virtual environment as described above and with reference to method 1100, and/or an atmosphere environment, in which a dimming effect, lighting effect, and/or tint effect is applied to a representation of a physical environment, such as an optical passthrough of virtual passthrough environment, to simulate a time of day, weather condition, mood, and/or a season) is optionally associated with a second visual effect (e.g., a second dimming and/or tinting effect, different from a dimming and/or tinting effect associated with the first visual effect). In this case, the first visual effect associated with the first virtual object overrides the second visual effect when the user shifts their attention to the first virtual object (optionally, after activating the first virtual object). For example, if (e.g., in accordance with a determination that) the three-dimensional environment includes a first atmosphere environment that is associated with (e.g., configured to display) a first respective visual effect (and is optionally applying the first respective visual effect at the time when the user shifts their attention to the first virtual object), in response to detecting the shift in the user's attention to the first virtual object, the computer system displays the first visual effect applied to the three-dimensional environment (and optionally ceases to display the first respective visual effect). For example, if (e.g., in accordance with a determination that) the three-dimensional environment includes a second atmosphere environment that is associated with (e.g., configured to display) a second respective visual effect (and is optionally applying the second respective visual effect at the time when the user shifts their attention to the first virtual object), in response to detecting the shift in the user's attention to the first virtual object, the computer system displays the first visual effect applied to the three-dimensional environment (and optionally ceases to display the second respective visual effect). As an illustrative example, if an atmosphere environment in the three-dimensional environment is associated with a visual effect that includes medium dimming and/or blue tinting (such as to simulate a dusk and/or winter atmosphere) and the user shifts their attention to media content that is associated with a visual effect that includes high dimming and media-based tinting, the computer system optionally applies the high dimming and media-based tinting to the three-dimensional environment (and optionally ceases to apply the visual effect associated with the atmosphere environment) independent of the fact that the atmosphere environment is associated with the medium dimming and blue tinting. Allowing the visual effect associated with a virtual object to override the visual effect associated with the three-dimensional environment enables better visibility of the virtual object when the user is directing their attention to the virtual object.

In some embodiments, while displaying the first visual effect applied to the three-dimensional environment (e.g., as described with reference to step 1502*a*), the computer system detects a shift in the user's attention away from the first virtual object (e.g., detecting that the user is looking at another area of or virtual object in the three-dimensional environment).

In some embodiments, in response to detecting the shift in the user's attention away from the first virtual object, the computer system displays the second visual effect (e.g., a system-level visual effect associated with a virtual environment and/or with an atmosphere environment, such as described earlier) applied to the three-dimensional environment. For example, if the user shifts their attention away from second virtual object 1406*b* in FIG. 14B (such as towards virtual environment 1420*a* or to representation of physical environment 1408), the computer system optionally applies the system-level visual effect as shown in FIG. 14J. In some embodiments, if the user directs their attention away from the first virtual object (optionally, for a threshold duration as described above), the computer system applies the second visual effect (e.g., associated with the virtual environment and/or the atmosphere environment) to the three-dimensional environment. For example, when the user is not directing their attention to the first virtual object the computer system reverts (e.g., defaults) to applying any visual effect associated with a virtual environment or other portion of the three-dimensional environment. For example, if (e.g., in accordance with a determination that) the user shifts attention away from the first virtual object while the three-dimensional environment is associated with a first system-level visual effect (optionally, without shifting attention to a second virtual object associated with a different visual effect), the computer system displays the first system-level visual effect applied to the three-dimensional environment. For example, if (e.g., in accordance with a determination that) the user shifts attention away from the first virtual object while the three-dimensional environment is associated with a second system-level visual effect, different from the first system-level visual effect (optionally, without shifting attention to a second virtual object associated with a different visual effect), the computer system displays the second system-level visual effect applied to the three-dimensional environment. Asserting (e.g., applying) a visual effect associated with a portion of the three-dimensional environment when the user is no longer directing their attention to the first virtual object (e.g., the object that requested the first visual effect to be applied) enables the computer system to apply appropriate dimming and/or tinting based on the user's current direction of attention without requiring the user to manually change the dimming and/or tinting.

In some embodiments, the first criteria include a criterion that is satisfied when the three-dimensional environment does not include a virtual environment associated with a second visual effect (e.g., a second visual effect such as described with reference to step 1502*a*) different from the first visual effect (e.g., the first visual effect is applied to the three-dimensional environment when there is not another visual effect being requested by a virtual environment in the three-dimensional environment). For example, in FIG. 14A, virtual environment 1420*a* is not associated with a visual effect.

In some embodiments, in response to detecting the shift in the user's attention to the first virtual object (e.g., as described with reference to step 1502*a*) and in accordance with a determination that the first criteria are not satisfied because the three-dimensional environment includes the virtual environment that is associated with the second visual effect (e.g., as described above and depicted in FIG. 14J), the computer system displays the second visual effect applied to the three-dimensional environment (e.g., in a manner similar to that described for displaying the first visual effect applied to the three-dimensional environment) independent of whether the state of the first virtual object is active or not (such as shown in FIG. 14K). In some embodiments, visual effects associated with virtual environments in the three-dimensional environment override visual effects associated with applications (such as the first visual effect associated with the first virtual object), such that the user directing their attention to the first virtual object does not cause the computer system to display the first visual effect; instead, the computer system continues to display the visual effect associated with the virtual environment (essentially ignoring a request by the first virtual object to display the first visual effect). In contrast, visual effects requested by atmosphere environments (e.g., such as described earlier) can optionally be overridden by visual effects requested by applications. In some embodiments, if the computer system detects that the virtual environment associated with the second visual effect has ceased to be displayed and the user subsequently directs their attention to the first virtual object (e.g., while the virtual environment and/or atmosphere environment are not displayed), the computer system applies the first visual effect to the three-dimensional environment. Allowing virtual environments and/or atmosphere environments to override the visual effects associated with virtual objects maintains consistency in the display of the virtual environments and/or atmosphere environments It should be understood that the particular order in which the operations in method 1500 have been described is merely exemplary and is not intended to indicate that the described order is the only order in which the operations could be performed. One of ordinary skill in the art would recognize various ways to reorder the operations described herein.

FIGS. 16A-16K illustrate examples of a computer system changing a visual prominence of a virtual object based on display of overlapping objects of different types in a three-dimensional environment in accordance with some embodiments.

Figure 16A:
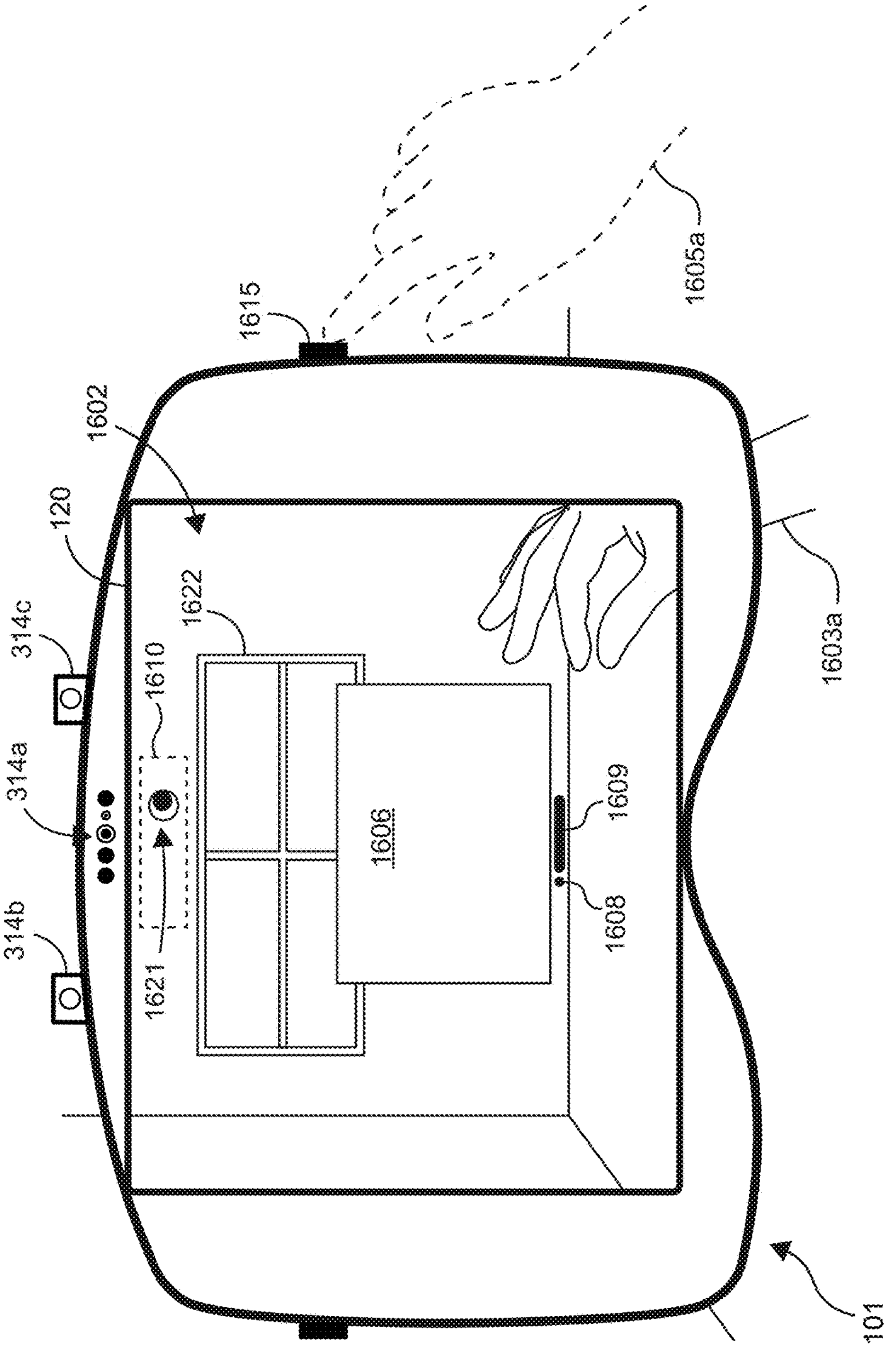
FIGS. 16A-16K illustrate examples of a computer system changing a visual prominence of a virtual object based on display of overlapping objects of different types in a three-dimensional environment in accordance with some embodiments.

FIG. 16A illustrates a computer system 101 (e.g., an electronic device) displaying, via a display generation component (e.g., display generation component 120 of FIGS. 1 and 3), a three-dimensional environment 1602 from a viewpoint of a user (e.g., facing the back wall of the physical environment in which computer system 101 is located).

In some embodiments, computer system 101 includes a display generation component 120. In FIG. 16A, the display generation component 120 includes one or more internal image sensors 314*a* oriented towards the face of the user (e.g., eye tracking cameras 540 described with reference to FIG. 5). In some embodiments, internal image sensors 314*a* are used for eye tracking (e.g., detecting a gaze of the user). Internal image sensors 314*a* are optionally arranged on the left and right portions of display generation component 120 to enable eye tracking of the user's left and right eyes. Display generation component 120 also includes external image sensors 314*b* and 314*c* facing outwards from the user to detect and/or capture the physical environment and/or movements of the user's hands. In some embodiments, image sensors 314*a*, 314*b*, and 314*c* have one or more of the characteristics of image sensors 314 described with reference to the FIGS. 7, 10, 12, and 14 series.

As shown in FIG. 16A, computer system 101 captures one or more images of the physical environment around computer system 101 (e.g., operating environment 100), including one or more objects in the physical environment around computer system 101. In some embodiments, computer system 101 displays representations of the physical environment in three-dimensional environment 1602. For example, three-dimensional environment 1602 includes a representation of a window 1622, which is optionally a representation of a physical window in the physical environment.

As discussed in more detail below, in FIG. 16A, display generation component 120 is illustrated as displaying content in the three-dimensional environment 1602. In some embodiments, the content is displayed by a single display (e.g., display 510 of FIG. 5) included in display generation component 120. In some embodiments, display generation component 120 includes two or more displays (e.g., left and right display panels for the left and right eyes of the user, respectively, as described with reference to FIG. 5) having displayed outputs that are merged (e.g., by the user's brain) to create the view of the content shown in FIGS. 16A-16K.

Display generation component 120 has a field of view (e.g., a field of view captured by external image sensors 314*b* and 314*c* and/or visible to the user via display generation component 120) that corresponds to the content shown in FIG. 16A. Because display generation component 120 is optionally a head-mounted device, the field of view of display generation component 120 is optionally the same as or similar to the field of view of the user.

As discussed herein, the user of the computer system 101 performs one or more air pinch gestures (e.g., with hand 1603A) to provide one or more inputs to computer system 101 to provide one or more user inputs directed to content displayed by computer system 101. Such depiction is intended to be exemplary rather than limiting; the user optionally provides user inputs using different air gestures and/or using other forms of input as described with reference to the FIGS. 7, 10, 12, and 14 series.

In the example of FIG. 16A, because the user's hand is within the field of view of display generation component 120, it is visible within the three-dimensional environment 1602. That is, the user can optionally see, in the three-dimensional environment, any portion of their own body that is within the field of view of display generation component 120.

As mentioned above, the computer system 101 is configured to display content in the three-dimensional environment 1602 using the display generation component 120. In FIG. 16A, three-dimensional environment 1602 also includes a virtual object 1606. In some embodiments, the virtual object 1606 is optionally a user interface of an application containing content (e.g., a plurality of selectable options), three-dimensional objects (e.g., virtual clocks, virtual balls, virtual cars, etc.) or any other element displayed by computer system 101 that is not included in the physical environment of display generation component 120. For example, in FIG. 16A, the virtual object 1606 is a user interface of a web-browsing application containing website content, such as text, images, video, hyperlinks, and/or audio content, from the website, or a user interface of an audio playback application including a list of selectable categories of music and a plurality of selectable user interface objects corresponding to a plurality of albums of music. It should be understood that the content discussed above is exemplary and that, in some embodiments, additional and/or alternative content and/or user interfaces are provided in the three-dimensional environment 1602, such as the content described below with reference to method 1700. Additionally, in some embodiments, as shown in FIG. 16A, the virtual object 1606 is displayed with an exit option 1608 and a grabber bar 1609. In some embodiments, the exit option 1608 is selectable to initiate a process to cease displaying the virtual object 1606 in the three-dimensional environment 1602. In some embodiments, as discussed below, the grabber bar 1609 is selectable to initiate a process to move the virtual object 1606 within the three-dimensional environment 1602. In some embodiments, as shown in FIG. 16A, the virtual object 1606 is displayed at a first location within the three-dimensional environment 1602 relative to a viewpoint of the user of the computer system 101. Additionally, as shown in FIG. 16A, while the virtual object 1606 is displayed at the first location in the three-dimensional environment 1602, the virtual object 1606 is at least partially obscuring a portion of the physical window 1622 in the three-dimensional environment 1602 from the viewpoint of the user (e.g., because the virtual object 1606 is spatially located in front of the physical window 1622).

In some embodiments, as discussed herein, the computer system 101 facilitates changing of a visual prominence of a virtual object displayed in three-dimensional environment 1602 based on display of overlapping elements of particular types. In some embodiments, as discussed throughout the below, changing the visual prominence of a respective virtual object includes changing a brightness level of the virtual object (e.g., including the content that is displayed within the respective virtual object and/or that is otherwise associated with the respective virtual object). For example, decreasing the visual prominence of the respective virtual object (e.g., visually deemphasizing the respective virtual object relative to the three-dimensional environment 1602) includes decreasing the brightness level of the respective virtual object (e.g., dimming the content of the respective virtual object). In some embodiments, changing the visual prominence of a respective virtual object includes changing a translucency/opacity of the virtual object (e.g., including the content that is displayed within the respective virtual object and/or that is otherwise associated with the respective virtual object). For example, decreasing the visual prominence of the respective virtual object (e.g., visually deemphasizing the respective virtual object relative to the three-dimensional environment 1602) includes increasing a translucency of the respective virtual object (e.g., decreasing an opacity of the content of the respective virtual object).

Additional details regarding changing the visual prominence of a respective virtual object are provided with reference to method 1700.

In some embodiments, the display of the three-dimensional environment 1602 is associated with predetermined region 1610. In some embodiments, the predetermined region 1610 corresponds to a predetermined region of the display generation component 120 (e.g., a top center region of the display generation component 120). In some embodiments, the predetermined region 1610 corresponds to a predetermined region of the three-dimensional environment 1602, such as a far-field region/location in the three-dimensional environment 1602, such as the back wall of the physical environment shown in FIG. 16A. In some embodiments, the predetermined region 1610 is responsive to user input. For example, gaze-based and/or hand-based input directed to the predetermined region 1610 causes the computer system 101 to display one or more user interface elements in the three-dimensional environment 1602.

In FIG. 16A, while displaying the virtual object 1606, the computer system 101 detects an input provided by hand 1603*a* corresponding to a request to display a respective user interface in the three-dimensional environment 1602. For example, as shown in FIG. 16A, the computer system 101 detects hand 1603*a* provide an air gesture, such as an air pinch gesture in which an index finger and thumb of the hand of the user come together to make contact, while a gaze 1621 of the user is directed toward the predetermined region 1610. In some embodiments, the computer system 101 detects the gaze 1621 directed toward the predetermined region 1610 for a threshold amount of time (e.g., 0.5, 1, 1.5, 2, 3, 5, 10, or 15 seconds). Additionally, in FIG. 16A, the computer system 101 detects a selection (e.g., a press) of physical button 1615 of the computer system 101 provided by hand 1605*a*. In some embodiments, the selection of the physical button 1615 corresponds to a long press in which contact with the physical button is sustained for a threshold amount of time (e.g., 0.5, 1, 1.5, 2, 3, 4, or 5 seconds). It should be understood that while multiple hands and corresponding inputs are illustrated in FIG. 16A, such hands and inputs need not be detected by computer system 101 concurrently; rather, in some embodiments, computer system 101 independently responds to the hands and/or inputs illustrated and described in response to detecting such hands and/or inputs independently.

Figure 16B:
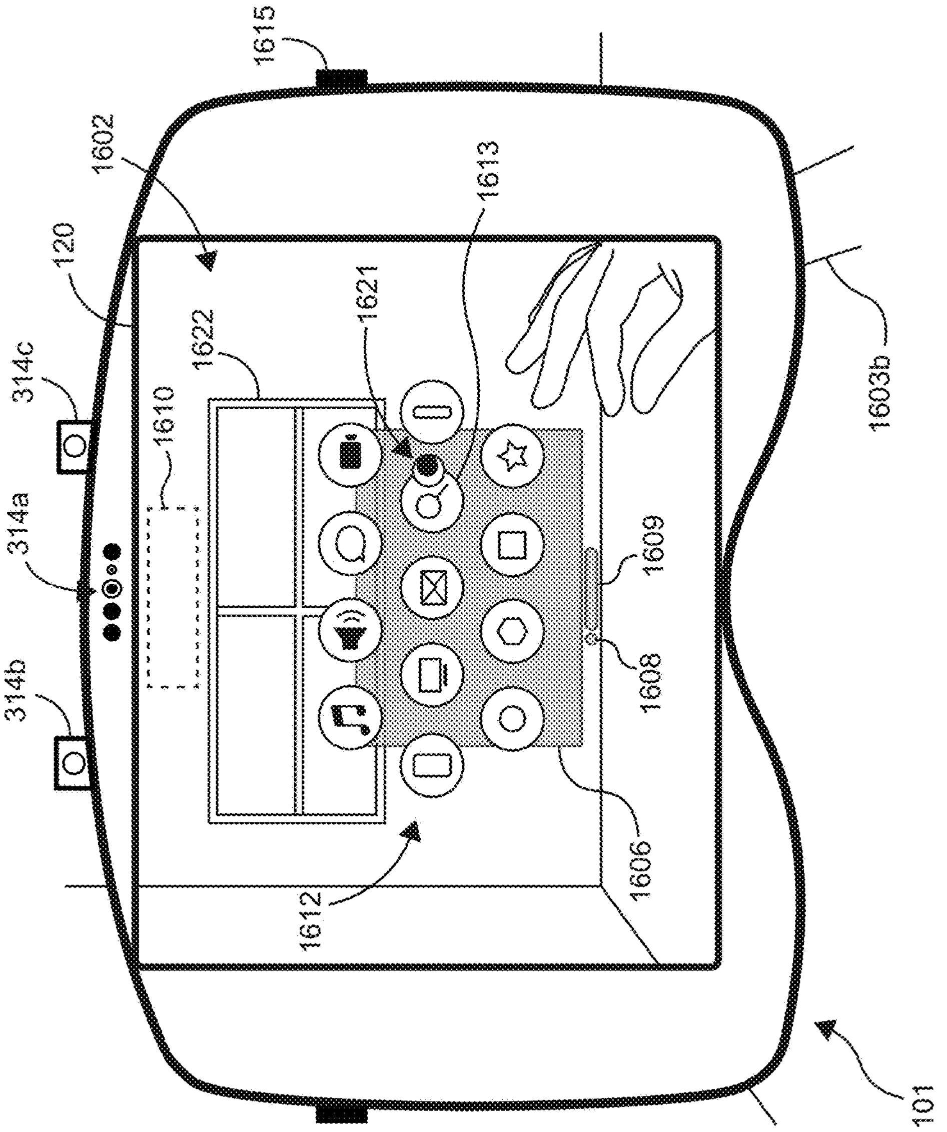

In some embodiments, as shown in FIG. 16B, in response to detecting the input provided by the hand 1603*a* and/or the input provided by the hand 1605*a*, the computer system 101 displays a home user interface 1612 in the three-dimensional environment 1602. In some embodiments, the home user interface 1612 corresponds to a home user interface of the computer system 101 that includes a plurality of selectable icons associated with respective applications configured to be run on the computer system 101, as shown in FIG. 16B. In some embodiments, as shown in FIG. 16B, the home user interface 1612 is displayed at a center of the field of view of the display generation component 120.

In some embodiments, as shown in FIG. 16B, when the computer system 101 displays the home user interface 1612 in the three-dimensional environment 1602, the computer system 101 changes a visual prominence of the virtual object 1606. For example, as similarly discussed above, the computer system 101 visually deemphasizes the virtual object 1606 relative to the three-dimensional environment 1602 in a first manner. In some embodiments, visually deemphasizing the virtual object 1606 in the first manner includes decreasing a brightness of and/or increasing a translucency of an entirety of the virtual object 1606 in the three-dimensional environment 1602, such that a portion of the physical window 1622 becomes more visible through the virtual object 1606 from the viewpoint of the user, as shown in FIG. 16B. In some embodiments, the display of the home user interface 1612 causes the computer system 101 to visually deemphasize the virtual object 1606 relative to the three-dimensional environment 1602 irrespective of whether the home user interface 1612 is overlapping the virtual object 1606 when the home user interface 1612 is displayed. For example, in FIG. 16B, though the home user interface 1612 is overlapping the virtual object 1606 when the home user interface 1612 is displayed, even if the home user interface 1612 were not overlapping any portion of the virtual object 1606, the computer system 101 would still visually deemphasize the virtual object 1606 relative to the three-dimensional environment 1602 (e.g., because the home user interface 1612 is a type of user interface that results in such behavior).

In FIG. 16B, while the home user interface 1612 is displayed in the three-dimensional environment 1602, the computer system 101 detects an input provided by hand 1603*b* corresponding to selection of a first icon 1613 of the plurality of icons included in the home user interface 1612. For example, as shown in FIG. 16B, the computer system 101 detects an air gesture, such as an air pinch gesture or an air tap gesture, while the gaze 1621 of the user is directed to the first icon 1613. In some embodiments, the first icon 1613 is associated with a web-based searching application (e.g., a search engine).

Figure 16C:
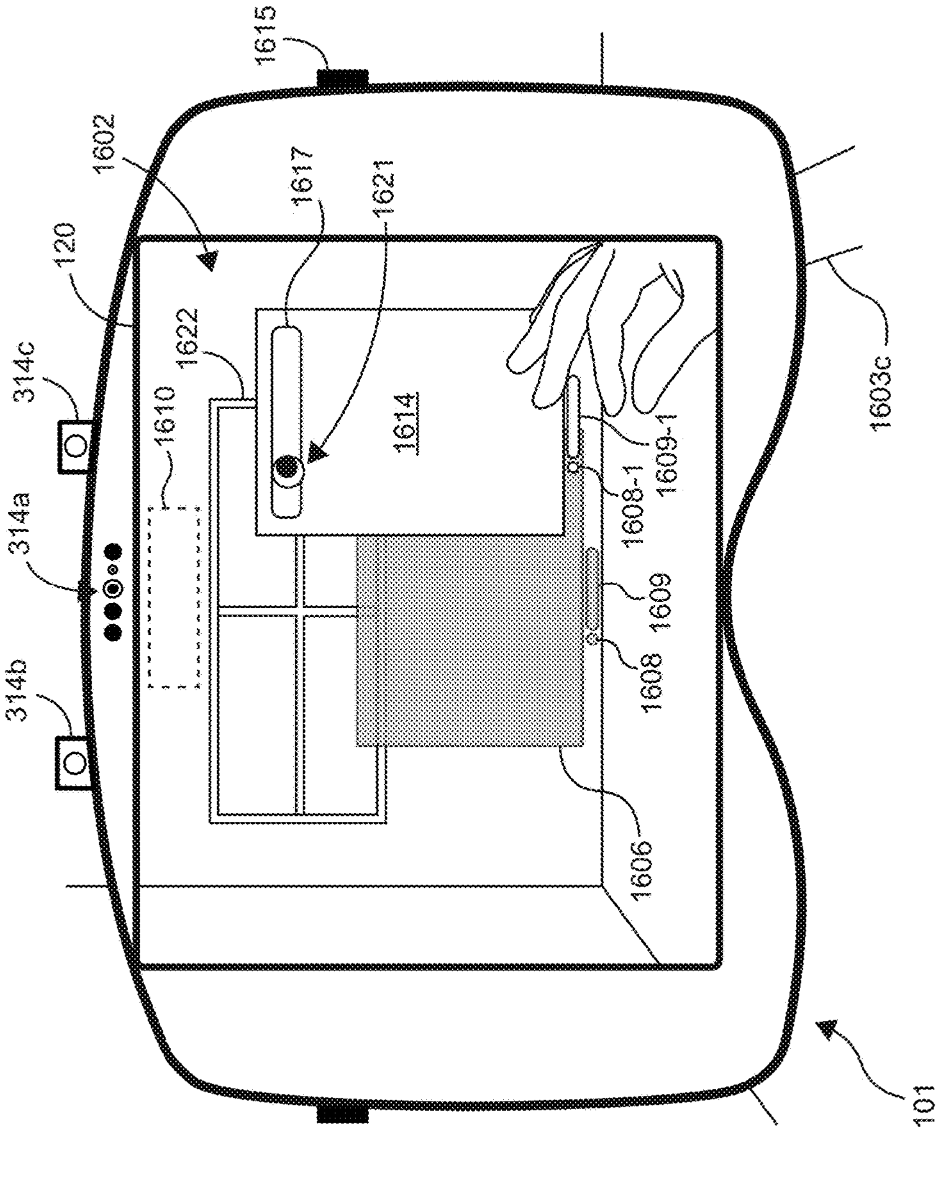

In some embodiments, as shown in FIG. 16C, in response to detecting the input provided by the hand 1603*b*, the computer system 101 activates the first icon in the home user interface 1612. For example, as shown in FIG. 16C, the computer system 101 ceases display of the home user interface 1612 and displays a search user interface 1614 (e.g., within a second virtual object, such as an application window) in the three-dimensional environment 1602. In some embodiments, as shown in FIG. 16C, the search user interface 1614 includes a text-entry field 1617 (e.g., a search field) that is selectable to initiate a process to enter text into the text-entry field 1617 for providing a search query. In some embodiments, as similarly discussed above, the search user interface 1614 is displayed with an exit option 1608-1 (e.g., having one or more characteristics of the exit option 1608 of the virtual object 1606) and a grabber bar 1609-1 (e.g., having one or more characteristics of the grabber bar 1609 of the virtual object 1606).

In some embodiments, as shown in FIG. 16C, when the search user interface 1614 is displayed in the three-dimensional environment 1602, the search user interface 1614 at least partially overlaps the virtual object 1606 relative to the current viewpoint of the user. Accordingly, as similarly discussed above, the computer system 101 (e.g., continues to) reduce the visual prominence of the virtual object 1606 in the three-dimensional environment 1602 in the first manner (e.g., the computer system 101 increases the translucency of and/or decreases the brightness of the content of the virtual object 1606), as shown in FIG. 16C. In some embodiments, the computer system 101 visually deemphasizes the virtual object 1606 relative to the three-dimensional environment 1602 in the first manner discussed above because the search user interface 1614 is an object of a particular type (e.g., an application window) that results in such behavior.

In FIG. 16C, while the search user interface 1614 is displayed in the three-dimensional environment 1602, the computer system 101 detects an input provided by hand 1603*c* directed to the text-entry field 1617 of the search user interface 1614. For example, the computer system 101 detects the hand 1603*c* provide an air gesture, such as an air pinch or air tap gesture, while the gaze 1621 is directed to the text-entry field 1617 in the search user interface 1614.

Figure 16D:
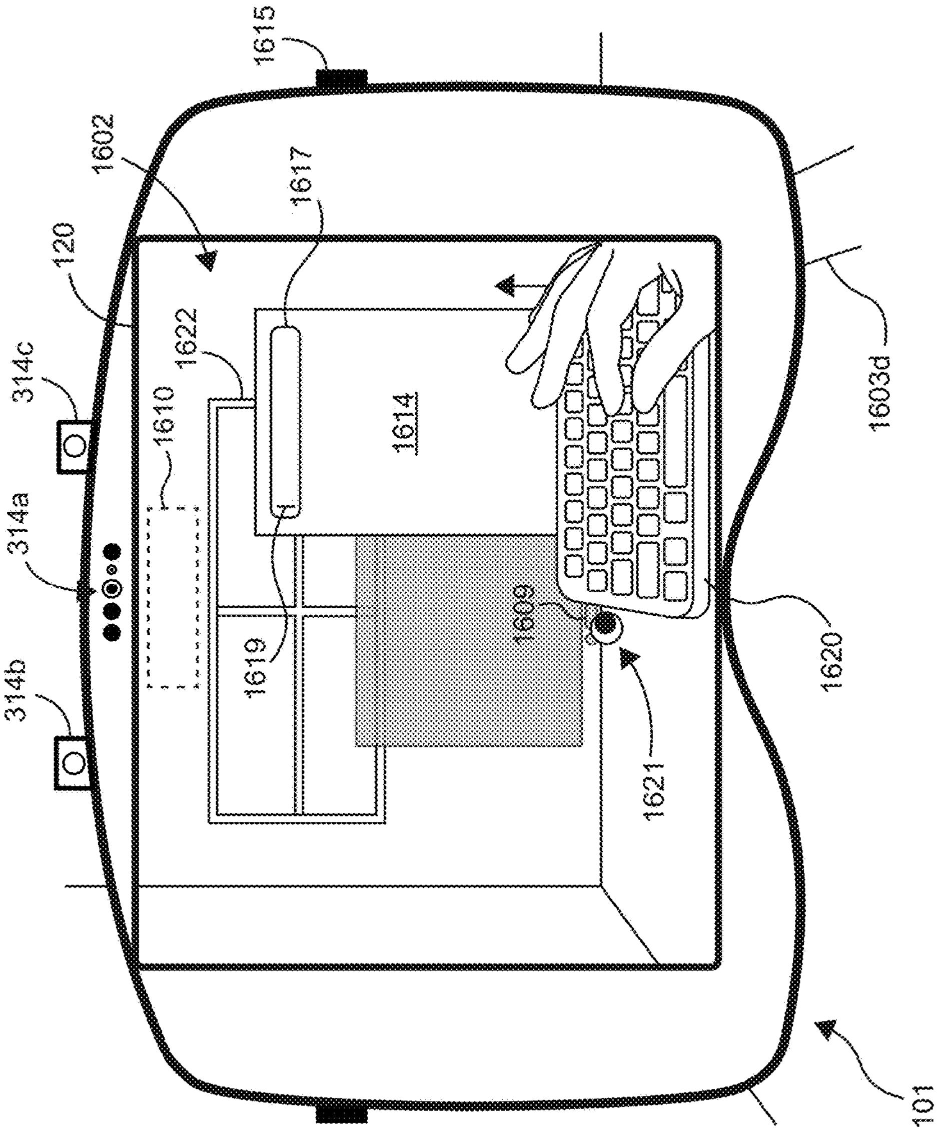

In some embodiments, as shown in FIG. 16D, in response to detecting the input provided by the hand 1603*c*, the computer system 101 selects the text-entry field 1617. In some embodiments, when the computer system 101 selects the text-entry field 1617, the computer system 101 initiates a process for entering text in the text-entry field 1617, which includes displaying virtual keyboard 1620 in the three-dimensional environment 1602, as shown in FIG. 16D. Additionally, as shown in FIG. 16D, the computer system 101 optionally updates the text-entry field 1617 to include text cursor 1619 that indicates a location in the text-entry field 1617 at which text (e.g., letters, numbers, and/or special characters) will be entered (e.g., displayed) in response to detecting selection of one or more keys of the virtual keyboard 1620.

In some embodiments, as shown in FIG. 16D, when the virtual keyboard 1620 is displayed in the three-dimensional environment 1602, the virtual keyboard 1620 is overlapping a portion of the search user interface 1614 (e.g., a bottom edge of the search user interface 1614) relative to the viewpoint of the user. As shown in FIG. 16D, though the virtual keyboard 1620 is overlapping the search user interface 1614, the computer system 101 optionally forgoes changing a visual prominence of the search user interface 1614 in the first manner. For example, the computer system 101 forgoes decreasing a brightness of and/or increasing a translucency of the search user interface 1614 when the virtual keyboard 1620 is displayed overlapping the search user interface 1614. In some embodiments, the computer system 101 forgoes reducing the visual prominence of the search user interface 1614 (e.g., though the virtual keyboard is overlapping the search user interface 1614) because, when the virtual keyboard 1620 is displayed, the virtual keyboard 1620 is associated with the search user interface 1614 (e.g., as a virtual input device for the search user interface 1614).

In FIG. 16D, while the virtual keyboard 1620 is displayed in the three-dimensional environment 1602, the computer system 101 detects an input provided by hand 1603*d* directed toward the virtual object 1606 (e.g., that is currently overlapped by the search user interface 1614). For example, as shown in FIG. 16D, the computer system 101 detects the hand 1603*d* provide an air gesture pinch and drag gesture, while the gaze 1621 of the user is directed to the grabber bar 1609 that is displayed with the virtual object 1606. In some embodiments, the computer system 101 detects movement of the hand 1603*d* upward in space relative to the viewpoint of the user while the hand 1603*d* maintains the pinch hand shape.

Figure 16E:
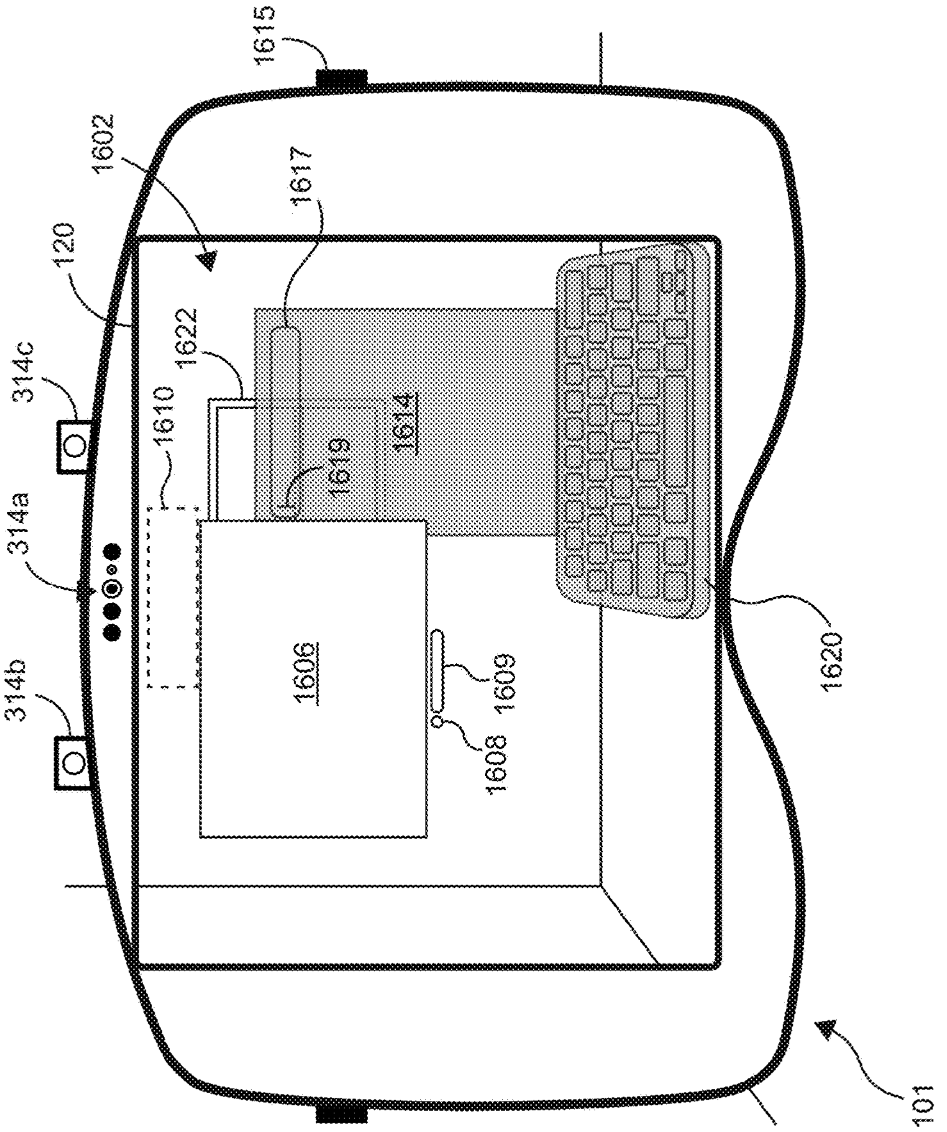

In some embodiments, as shown in FIG. 16E, in response to detecting the input provided by the hand 1603*d*, the computer system 101 moves the virtual object 1606 in the three-dimensional environment 1602 in accordance with the movement of the hand 1603*d*. For example, as shown in FIG. 16E, the computer system 101 moves the virtual object 1606 upward in the three-dimensional environment 1602 relative to the viewpoint of the user. Additionally, in some embodiments, when the computer system 101 moves the virtual object 1606 in the three-dimensional environment 1602, because the virtual object 1606 was overlapped by the search user interface 1614 when the input provided by the hand 1603*d* in FIG. 16D was detected, the computer system 101 moves the virtual object 1606 spatially forward in the three-dimensional environment 1602, such that the virtual object 1606 is located spatially closer to the viewpoint of the user than the search user interface 1614. In some embodiments, as shown in FIG. 16E, when the virtual object 1606 is moved forward in the three-dimensional environment 1602, the virtual object 1606 now at least partially obscures the search user interface 1614 from the viewpoint of the user. Because the virtual object 1606 is overlapping the search user interface 1614 and the virtual object 1606 corresponds to an application window (e.g., a type of object that causes an entire portion of an underlying object to become visually deemphasized, as discussed above), the computer system 101 visually deemphasizes the search user interface 1614 relative to the three-dimensional environment 1602 in the first manner discussed above (e.g., increases a translucency of the search user interface 1614, such that a portion of the physical window 1622 becomes more visible through the search user interface 1614, and/or decreases a brightness of the search user interface 1614).

In some embodiments, as shown in FIG. 16E, because the virtual keyboard 1620 is associated with the search user interface 1614 (e.g., as a virtual input device as discussed above) in the three-dimensional environment 1602, when the computer system 101 reduces the visual prominence of the search user interface 1614 in the first manner, the computer system 101 also reduces the visual prominence of the virtual keyboard 1620 in the first manner (e.g., even though the virtual object 1606 is not currently overlapping any portion of the virtual keyboard 1620 relative to the viewpoint of the user). For example, as similarly discussed above, the computer system 101 increases a translucency of the virtual keyboard 1620 (e.g., including the keys of the virtual keyboard 1620), such that a portion of the back wall of the physical environment and/or the floor of the physical environment become more visible through the virtual keyboard 1620, and/or decreases a brightness of the virtual keyboard 1620 in the three-dimensional environment 1602.

Figure 16F:
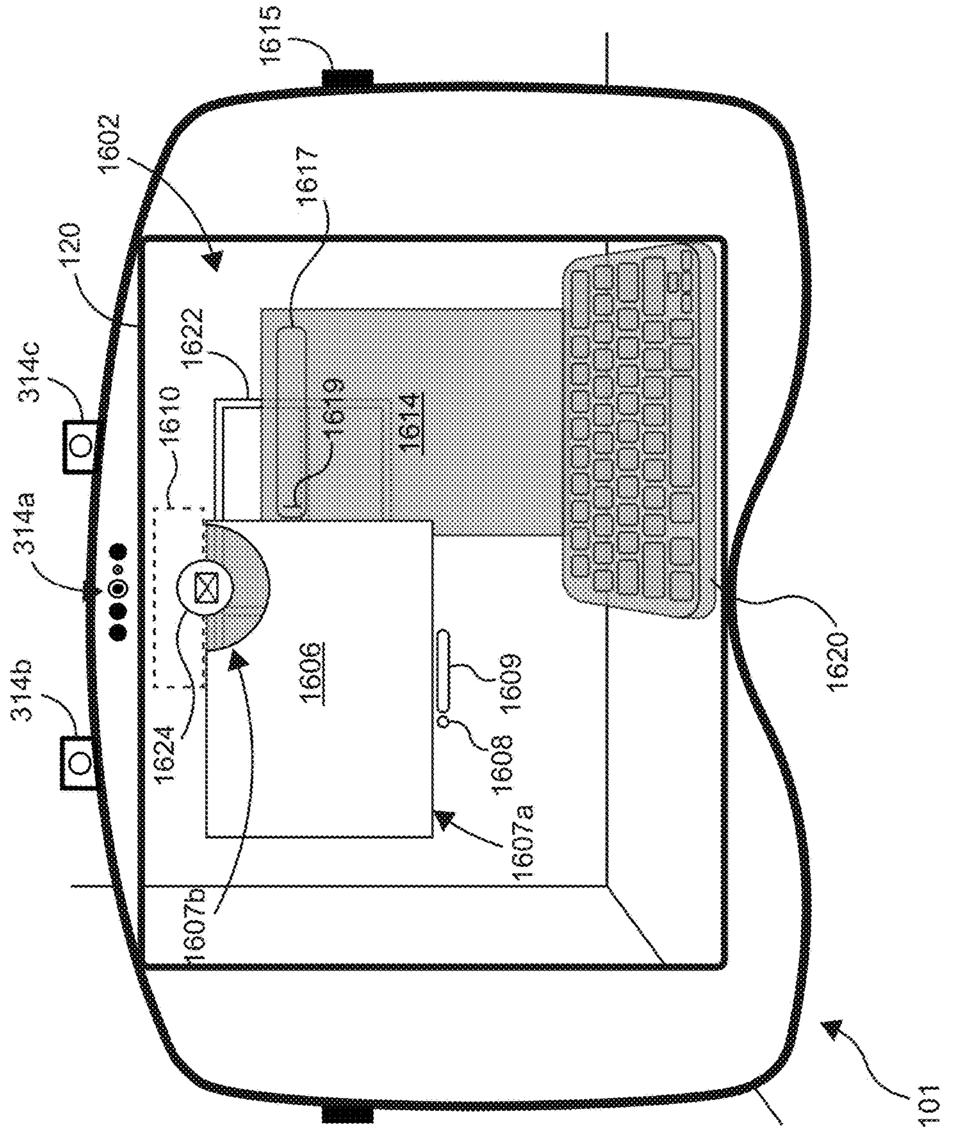

From FIGS. 16E-16F, while the virtual object 1606 is displayed at a forefront of the three-dimensional environment 1602 (e.g., relative to the viewpoint of the user), the computer system 101 detects a notification event (or another alert event). For example, the computer system 101 detects an incoming email event (e.g., received at a mail application running on the computer system 101), though other types of notification events are possible, such as any one of those described with reference to method 1700.

In some embodiments, as shown in FIG. 16F, in response to detecting the notification event, the computer system 101 displays a notification element 1624 (e.g., a notification dot or badge) corresponding to the detected notification event in the three-dimensional environment 1602. For example, as shown in FIG. 16F, the notification element 1624 includes an indication (e.g., an image, an icon, a drawing, or other representation) of the type of notification with which the notification element 1624 is associated (e.g., an email notification). Additionally, in some embodiments, the computer system 101 displays the notification element 1624 at a region of the display generation component 120 corresponding to a notification center (e.g., an upper center region of the display generation component 120), as shown in FIG. 16F.

In some embodiments, as shown in FIG. 16F, when the computer system 101 displays the notification element 1624 in the three-dimensional environment 1602, the notification element 1624 overlaps at least a portion of the virtual object 1606 from the current viewpoint of the user. In some embodiments, as shown in FIG. 16F, because the notification element 1624 is overlapping the virtual object 1606, the computer system 101 changes a visual prominence of the virtual object 1606 as similarly discussed above. In some embodiments, the computer system 101 visually deemphasizes the virtual object 1606 relative to the three-dimensional environment 1602 in a second manner, different from the first manner discussed above. For example, in FIG. 16F, because the notification element 1624 is a notification/alert-related object, the computer system 101 applies localized visual deemphasis to the portion of the virtual object 1606 the notification element 1624 overlaps. As shown in FIG. 16F, the computer system 101 optionally visually deemphasizes a first portion 1607*b* of the virtual object 1606 that is overlapped by the notification element 1624 without visually deemphasizing a second portion 1607*a* of the virtual object 1606 that is not overlapped by the notification element 1624. For example, as shown in FIG. 16F, the computer system 101 increases a translucency of the first portion 1607*b* of the virtual object 1606, such that a portion of the physical window 1622 becomes more visible through the first portion 1607*b* of the virtual object 1606 and does not become more visible through the second portion 1607*a* of the virtual object 1606, and/or decreases a brightness of the first portion 1607*b* of the virtual object 1606 without decreasing a brightness of the second portion 1607*a* of the virtual object 1606 in the three-dimensional environment 1602.

Figure 16G:
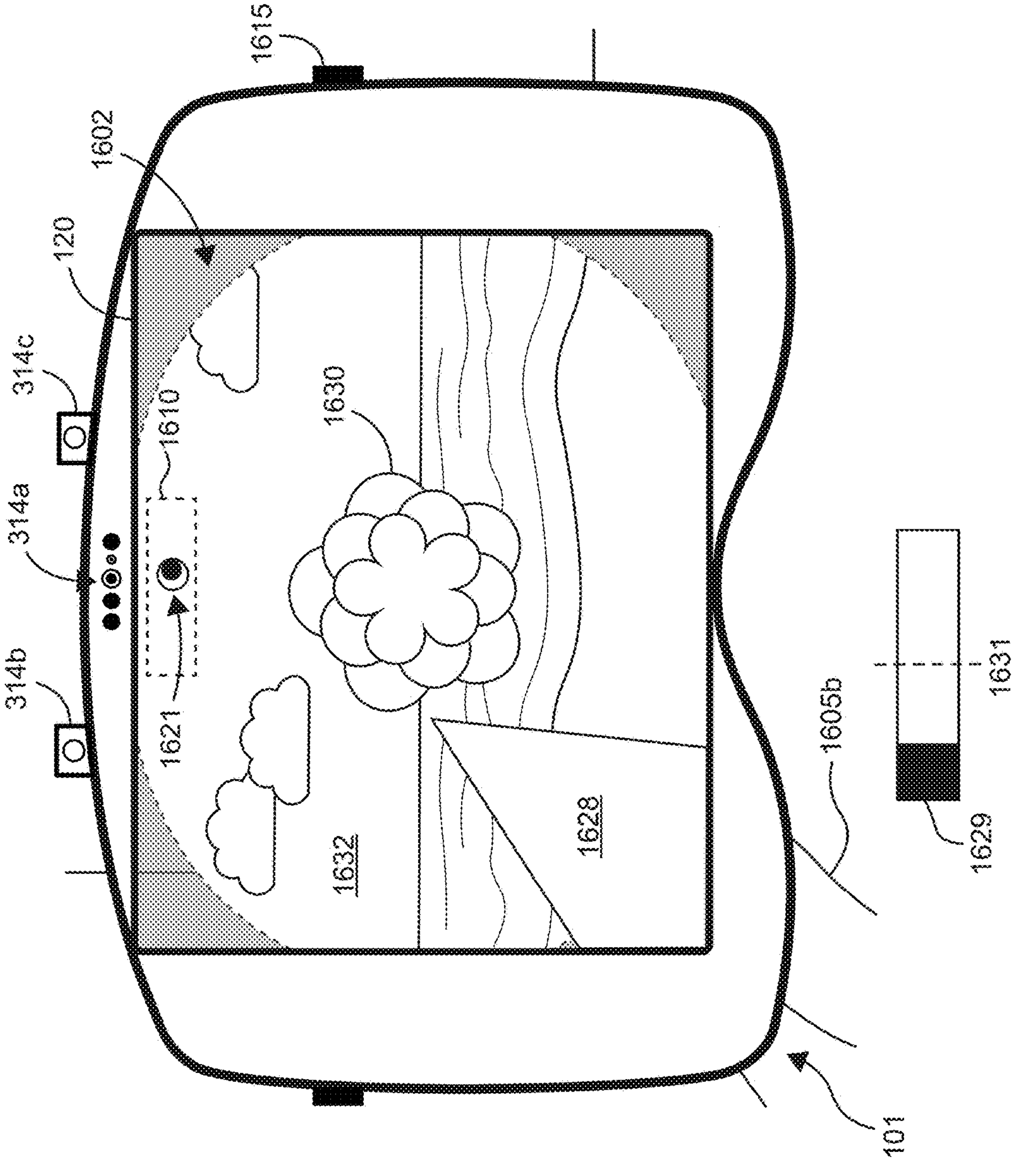

In FIG. 16G, the computer system 101 is displaying immersive content associated with an immersive application (e.g., a mixed reality application, such as a video game application, a meditation application, and/or a media playback application). In some embodiments, as shown in FIG. 16G, displaying the immersive content includes displaying an immersive virtual object 1630 (e.g., a three-dimensional flower that occupies volumetric space in the three-dimensional environment 1602). In some embodiments, the immersive virtual object 1630 is displayed within an immersive environment 1632 (e.g., a beach environment including sand, ocean, and/or clouds) in a three-dimensional environment 1602. As shown in FIG. 16G, the immersive environment 1632 is displayed at less than full immersion (e.g., such that the immersive environment 1632 is not occupying the entire field of view of the display generation component 120). Additionally, in some embodiments, as shown in FIG. 16G, the computer system 101 applies a visual effect to hand 1605*b* of the user that causes the portion of the hand 1605*b* in the field of view of the display generation component 120 to be displayed as a virtual representation 1628 (e.g., a virtual object). Additional details regarding the display of immersive content are provided below with reference to method 1700.

In FIG. 16G, while displaying the immersive content discussed above in the three-dimensional environment 1602, the computer system 101 detects that an event has occurred. In some embodiments, detecting that the event has occurred includes detecting user input. For example, as shown in FIG. 16G, the computer system 101 detects the gaze 1621 of the user directed to the predetermined region 1610, optionally for a threshold amount of time (e.g., 0.5, 1, 1.5, 2, 3, 5, 10, or 15 seconds), as represented by time 1631 in time bar 1629. In some embodiments, detecting that the event has occurred includes detecting a notification/alert event, as previously discussed above, such as an incoming email, text message, phone call, and/or video call.

Figure 16H:
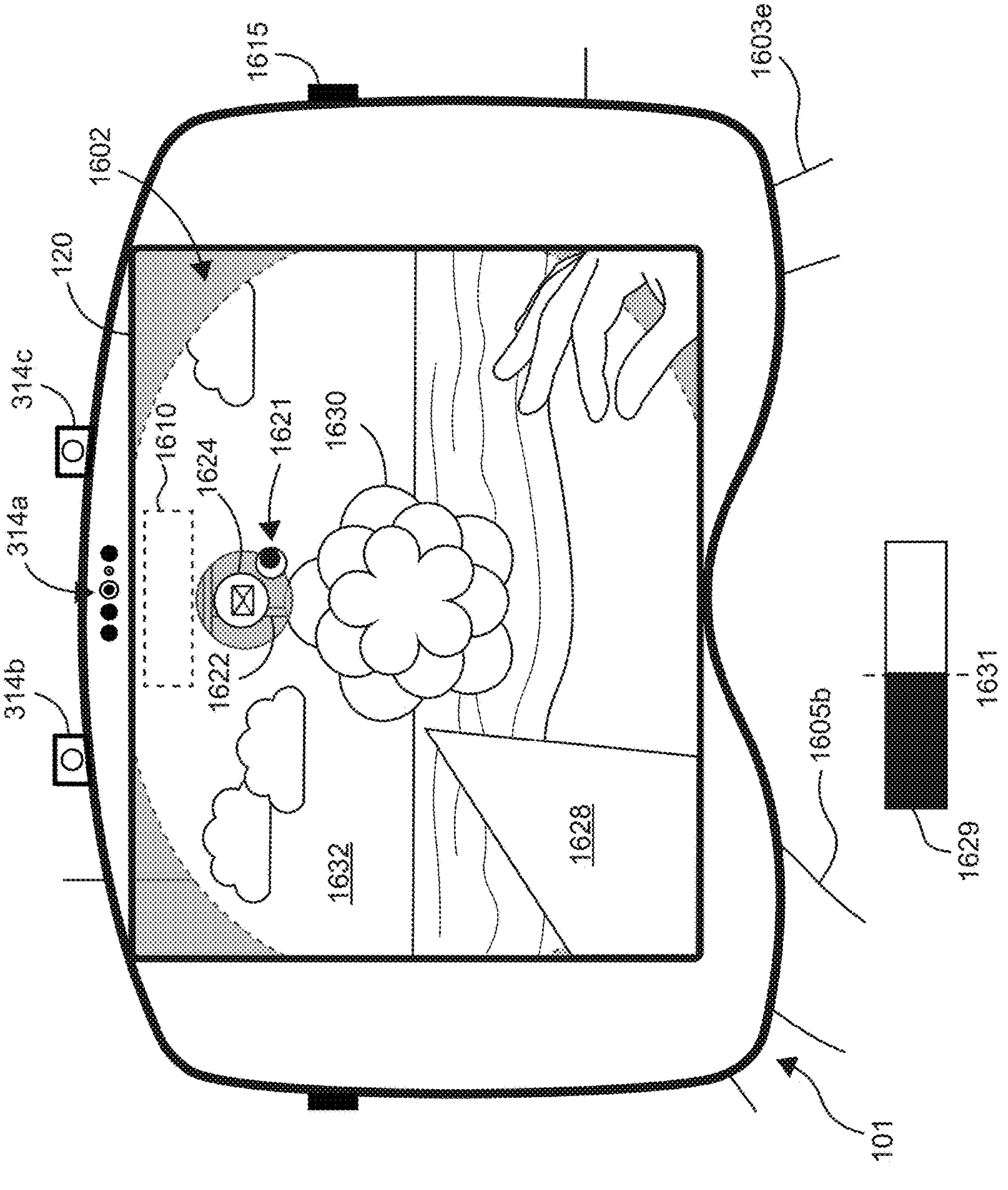

In some embodiments, as shown in FIG. 16H, in response to detecting that the event has occurred, the computer system 101 displays notification element 1624 in the three-dimensional environment 1602. For example, as similarly discussed above, the computer system 101 displays a notification dot or badge corresponding to a respective notification event, such as an incoming email as shown in FIG. 16H. In some embodiments, as shown in FIG. 16H, when the notification element 1624 is displayed in the three-dimensional environment 1602, the notification element 1624 overlaps a portion of the immersive content, particularly a portion of the immersive environment 1632. Accordingly, as similarly discussed above, the computer system 101 optionally reduces a visual prominence of the immersive content in the second manner in the three-dimensional environment. For example, as discussed above, the computer system 101 applies a local visual deemphasis for notification/alert objects, such that, as shown in FIG. 16H, when the notification element 1624 is displayed in the three-dimensional environment 1602, the computer system 101 only visually deemphasizes the portion of the immersive environment 1632 that is overlapped by the notification element 1624. In some embodiments, the computer system 101 therefore forgoes visually deemphasizing any portion of the immersive virtual object 1630 and the virtual representation 1628 (e.g., because the notification element 1624 is not overlapping the immersive virtual object 1630 or the virtual representation 1628). As shown in FIG. 16H, when the computer system 101 visually deemphasizes the portion of the immersive environment 1632 that is overlapped by the notification element 1624, a portion of the physical window 1622 becomes more visible through the portion of the immersive environment 1632 that is visually deemphasized, as similarly discussed above In FIG. 16H, while displaying the notification element 1624 in the three-dimensional environment 1602, the computer system 101 detects an input provided by hand 1603*e* corresponding to selection of the notification element 1624. For example, as shown in FIG. 16H, the computer system 101 detects the hand 1603*e* perform an air pinch gesture while the gaze 1621 is directed to the notification element 1624 in the three-dimensional environment 1602.

Figure 16I:
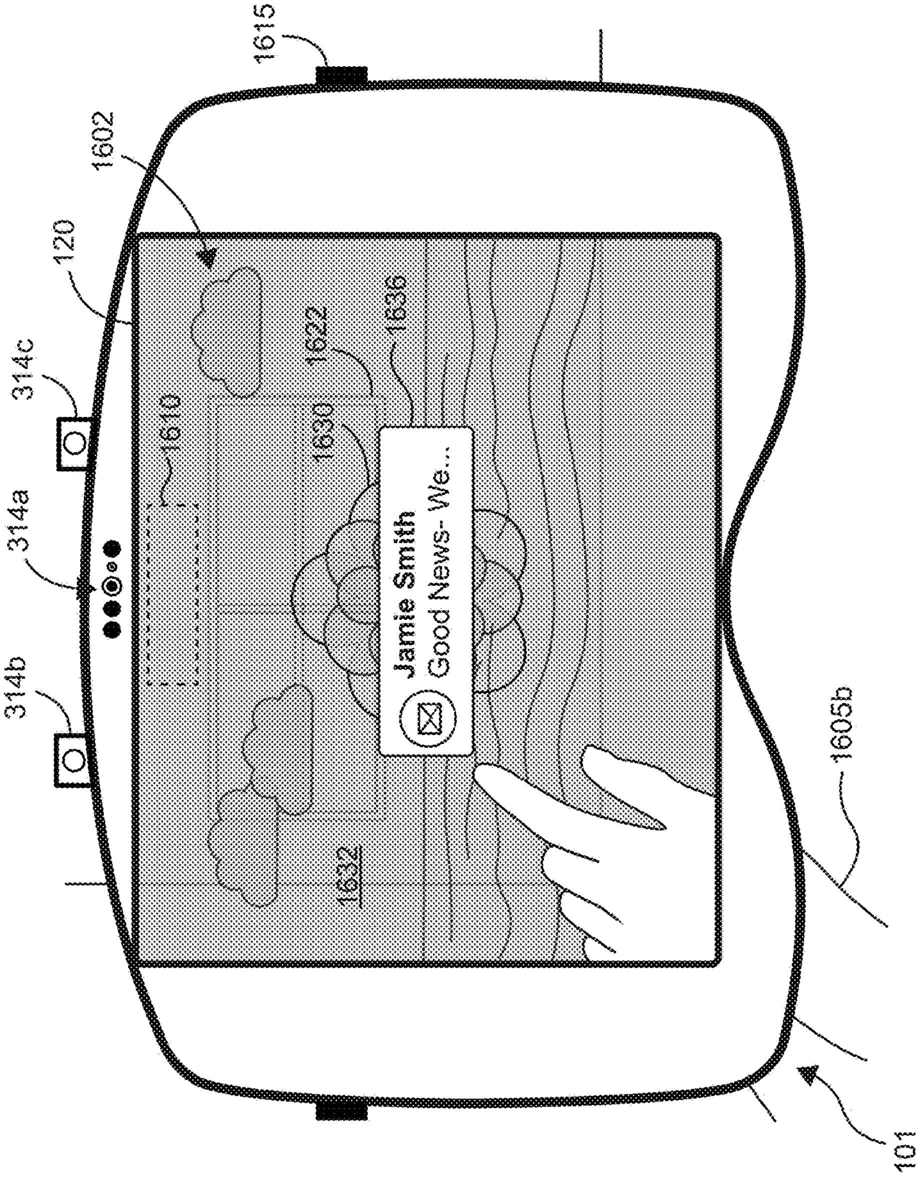

In some embodiments, as shown in FIG. 16I, in response to detecting the input provided by the hand 1603*e*, the computer system 101 selects the notification element 1624, which includes displaying a preview 1636 of the notification associated with the notification element 1624. For example, as shown in FIG. 16I, the computer system 101 expands the notification element 1624 to include the preview 1636, which includes a preview of the email notification detected at the computer system 101 (e.g., a name of a sender of the email, a subject line of the email, and/or a portion of the body of the email). In some embodiments, as shown in FIG. 16I, the computer system 101 displays the preview 1636 in a center of the field of view of the display generation component 120.

In some embodiments, as shown in FIG. 16I, when the preview 1636 is displayed in the three-dimensional environment 1602, the preview 1636 at least partially overlaps the immersive virtual object 1630 and the immersive environment 1632. In some embodiments, as shown in FIG. 16I, when the preview 1636 is displayed overlapping the immersive content in the three-dimensional environment 1602, the computer system 101 visually deemphasizes the immersive content relative to the three-dimensional environment 1602 in the first manner discussed previously above (e.g., because the preview 1636 is a type of overlapping object that causes such behavior). For example, as shown in FIG. 16I, the computer system 101 visually deemphasizes the immersive virtual object 1630, the immersive environment 1632, and the virtual representation 1628. In some embodiments, as similarly discussed above, when the computer system 101 visually deemphasizes the immersive virtual object 1630, the immersive environment 1632 and the physical environment, including the physical window 1622, become more visible through the immersive virtual object 1630. Similarly, as shown in FIG. 16I, when the computer system 101 visually deemphasizes the immersive environment 1632, the physical environment, including the physical window 1622, optionally becomes more visible through the immersive environment 1632. In some embodiments, as shown in FIG. 16I, when the computer system 101 visually deemphasizes the virtual representation 1628 relative to the three-dimensional environment 1602, the computer system 101 ceases display of the virtual representation 1628. For example, the computer system 101 ceases applying the visual effect that causes the portion of the hand 1605*b* that is within the field of view of the display generation component 120 to be displayed as the virtual representation 1628. Accordingly, in FIG. 16I, the portion of the hand 1605*b* of the user is visible again as a representation of the hand 1605*b* (e.g., a passthrough representation or a computer-generated representation).

Figure 16J:
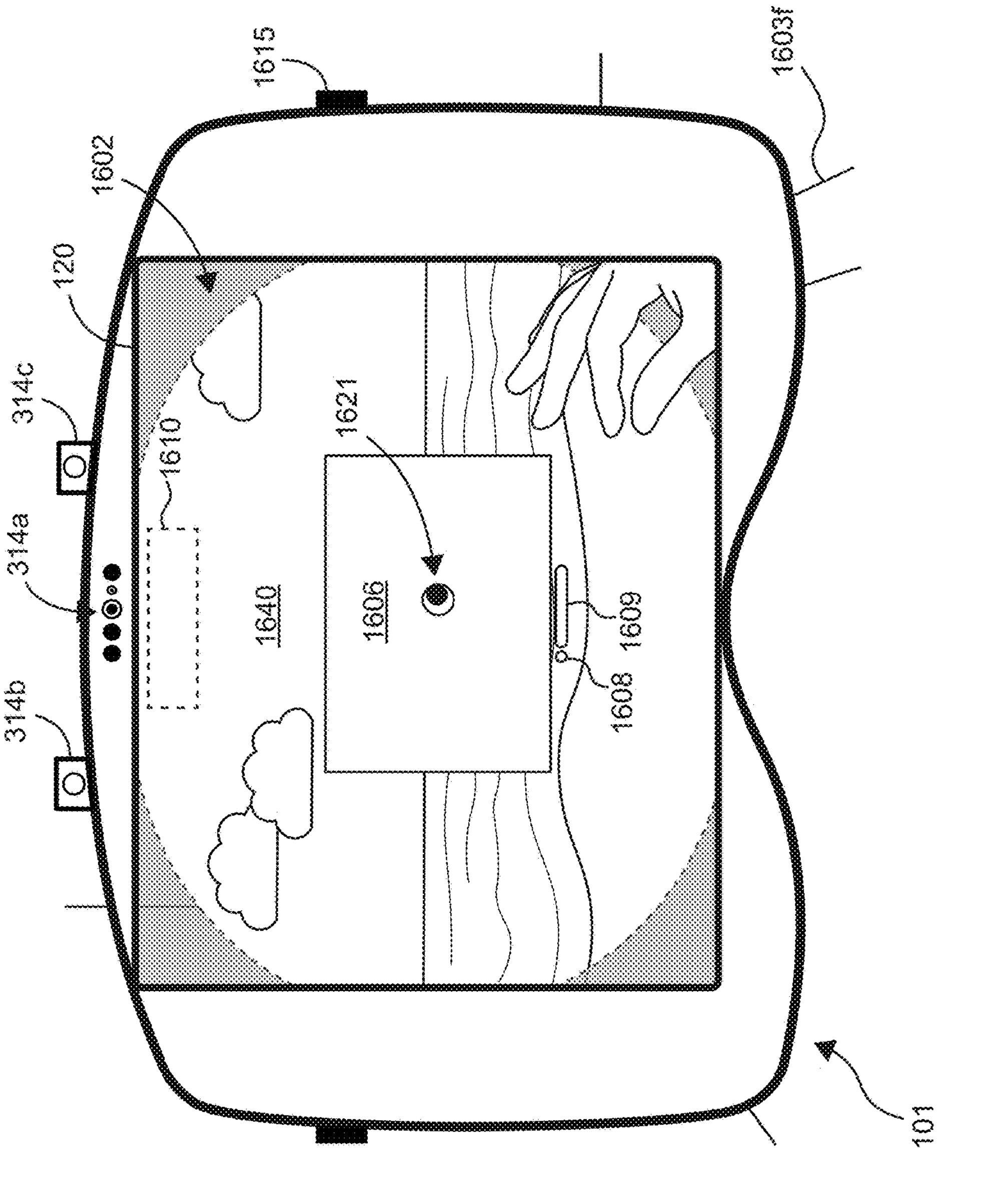

In FIG. 16J, the computer system 101 is displaying the virtual object 1606 in three-dimensional environment 1602 that includes a virtual environment 1640 (e.g., a system environment associated with the computer system 101). In some embodiments, as shown in FIG. 16J, the virtual environment 1640 corresponds to a beach environment (e.g., an environment or scene that includes virtual sand, ocean, and/or clouds). As shown in FIG. 16J, the virtual environment 1640 is optionally displayed in the three-dimensional environment 1602 at less than full immersion, as similarly described above. In FIG. 16J, the virtual environment 1640 is spatially located behind the virtual object 1606, such that, from the current viewpoint of the user, the virtual object 1606 appears to be displayed within the virtual environment 1640 in the three-dimensional environment 1602. In some embodiments, the virtual environment 1640 is different from the immersive environment 1632 discussed above. For example, as mentioned above, the immersive environment 1632 is immersive content that is associated with a particular immersive application (e.g., along with the immersive virtual object 1630), while the virtual environment 1640 is a system environment of the computer system 101 (e.g., and thus is not associated with a particular application running on the computer system 101).

In FIG. 16J, the computer system 101 detects an input provided by hand 1603*f* directed to the virtual object 1606. For example, as shown in FIG. 16J, the computer system 101 detects the hand 1603*f* perform an air pinch gesture while the gaze 1621 is directed toward the virtual object 1606 (optionally content included in the virtual object 1606, such as a selectable option).

Figure 16K:
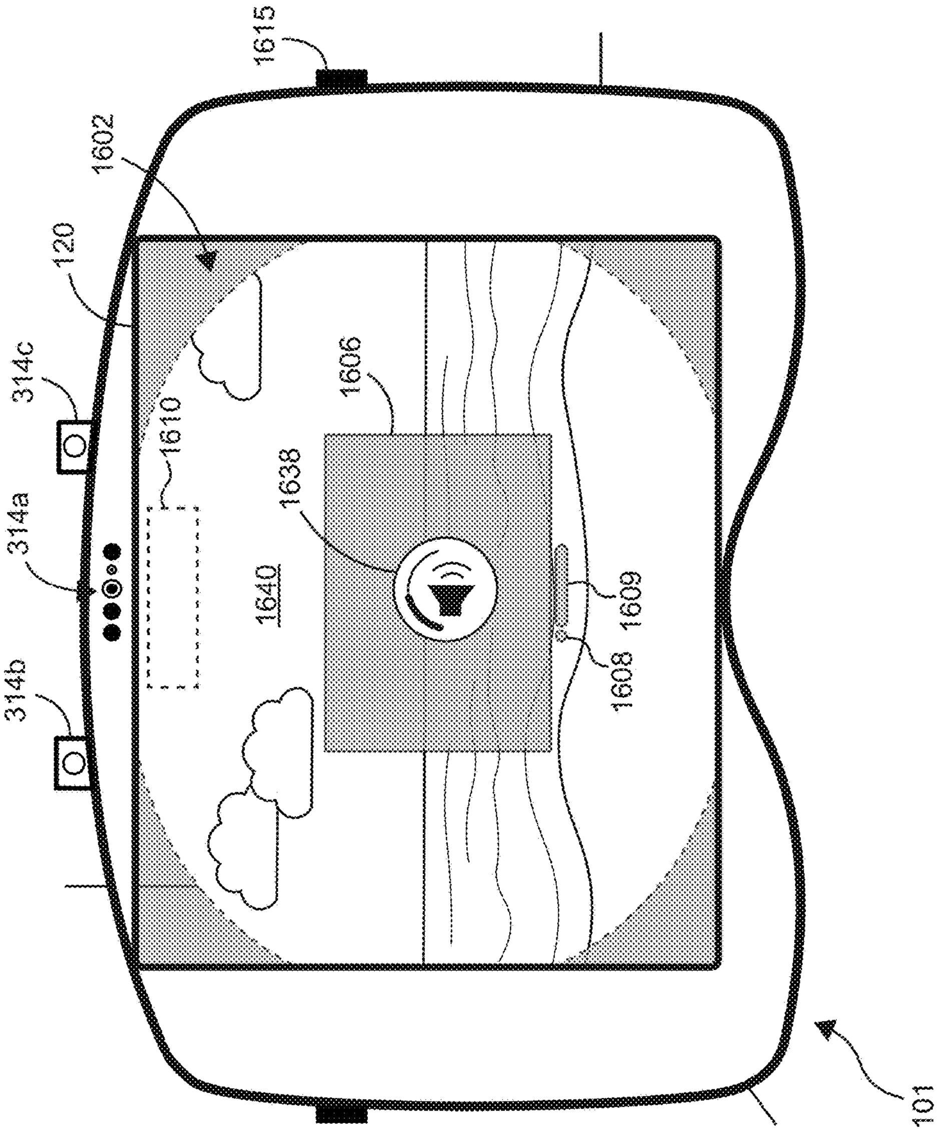

In some embodiments, as shown in FIG. 16K, in response to detecting the input provided by the hand 1603*f*, the computer system 101 displays a control element 1638 in the three-dimensional environment 1602 for controlling one or more parameters of the content of the virtual object 1606. For example, as shown in FIG. 16K, the control element 1638 enables the user to control a volume of audio that is associated with the virtual object 1606 (e.g., such as volume level of video content that is being played back in the virtual object 1606).

In some embodiments, as shown in FIG. 16K, when the computer system 101 displays the control element 1638 in the three-dimensional environment 1602, the control element 1638 is displayed overlaid on the virtual object 1606. In some embodiments, the control element 1638 corresponds to an overlay object that results in the visual deemphasis behavior discussed above. Particularly, in FIG. 16K, because the control element 1638 is displayed overlapping the virtual object 1606, the computer system 101 visually deemphasizes the virtual object 1606 relative to the three-dimensional environment 1602 in the first manner described above. For example, as shown in FIG. 16K, the computer system 101 increases the translucency of and/or decreases the brightness of (e.g., the entire portion of) the virtual object 1606.

As mentioned above, the virtual environment 1640 is optionally not associated with the virtual object 1606. Accordingly, when the computer system 101 decreases the visual prominence of the virtual object 1606 in the three-dimensional environment 1602, the computer system 101 does not change the visual prominence of the virtual environment 1640. For example, as shown in FIG. 16K, when the virtual object 1606 is visually deemphasized, the virtual environment 1640 becomes more visible through the virtual object 1606, but the physical environment, including the physical window 1622, does not become more visible through the virtual environment 1640.

FIG. 17 is a flowchart illustrating a method of changing a visual prominence of a virtual object based on display of overlapping objects of different types in accordance with some embodiments. In some embodiments, the method 1700 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, and/or a projector) and one or more cameras (e.g., a camera (e.g., color sensors, infrared sensors, and other depth-sensing cameras) that points downward at a user's hand or a camera that points forward from the user's head). In some embodiments, the method 1700 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1700 are, optionally, combined and/or the order of some operations is, optionally, changed.

In some embodiments, the method 1700 is performed at a computer system in communication with a display generation component and one or more input devices. In some embodiments, the computer system has one or more of the characteristics of the computer system described with reference to method 800, 900, 1100, 1300, and/or 1500. In some embodiments, the display generation component has one or more of the characteristics of the display generation component described with reference to methods 800, 900, 1100, 1300, and/or 1500. In some embodiments, the input devices have one or more of the characteristics of the input devices described with reference to methods 800, 900, 1100, 1300, and/or 1500.

In some embodiments, while displaying, via the display generation component, a first user interface element (e.g., virtual object 1606 in FIG. 16A) in an environment (e.g., three-dimensional environment 1602) from a current viewpoint of a user of the computer system, the computer system detects (1702*a*), via the one or more input devices, that a first event has occurred, such as an air gesture performed by hand 1603*a* or selection of physical button 1615 provided by hand 1605*a* as shown in FIG. 16A. In some embodiments, the environment is or includes a three-dimensional environment as described with reference to methods 800, 900, 1100, 1300, and/or 1500. In some embodiments, the first user interface element is one of one or more virtual objects that are displayed in the three-dimensional environment. In some embodiments, the first user interface element is or includes a virtual application window (e.g., an application user interface associated with an application running on the computer system), virtual media content (e.g., virtual movie, television show episode, video clip, and/or music video), a virtual representations of a real-world object (e.g., displayed in and/or visible in a physical environment of the computer system), an immersive virtual object (e.g., a virtual environment, a mixed reality object, and/or an immersive video game), and/or other types of virtual objects. In some embodiments, the first user interface element has one or more characteristics of virtual objects described with reference to methods 800, 900, 1100, 1300, and/or 1500. In some embodiments, detecting that the first event has occurred includes detecting an occurrence of an alert event (e.g., an incoming notification (e.g., text message, email, internet-based message, telephone call, and/or video call), a system alert (e.g., generated by an operating system of the computer system relating to the operation of the computer system), and/or an application alert (e.g., generated by an application operating on the computer system)). In some embodiments, detecting the occurrence of the alert event is independent of user input. For example, the computer system detects the alert event without detecting a selection, press, and/or rotation of a button or other mechanical element of the computer system provided by the user of the computer system, a selection of a virtual button displayed in the three-dimensional environment provided by the user, an air gesture (e.g., an air pinch gesture or air tap gesture), and/or attention-based (e.g., gaze-based) interaction provided by the user. In some embodiments, detecting the first event has occurred includes detecting, via the one or more input devices, user input provided by the user of the computer system, such as one or more of the user inputs discussed above.

In some embodiments, in response to detecting that the first event has occurred, the computer system displays (1702*b*) a second user interface element, different from the first user interface element, in the environment, such as home user interface 1612 as shown in FIG. 16B or notification element 1624 as shown in FIG. 16F. For example, in response to detecting that the first event has occurred, the computer system displays a notification/alert dot or badge in the three-dimensional environment. In some embodiments, the computer system displays a list, menu, carousel, and/or tray of one or more system-based user interface elements (e.g., selectable icons, folders, and/or other images) that are selectable to control one or more aspects of the display of the first user interface element and/or to display additional content in the three-dimensional environment. In some embodiments, displaying the second user interface element includes displaying a second virtual application window (or similar virtual object) in the three-dimensional environment. In some embodiments, a type of the second user interface element (e.g., as discussed in more detail below) that is displayed in the three-dimensional environment is based on the first event that is detected. For example, in accordance with a determination that the first event is a notification event corresponding to an incoming email message, the second user interface element corresponds to an email notification. As another example, in accordance with a determination that the first event is a notification event corresponding to an incoming phone call, the second user interface element corresponds to an incoming phone call notification.

In some embodiments, the second user interface element at least partially overlaps (e.g., a respective portion of) the first user interface element from the current viewpoint of the user of the computer system (1702*c*), such as home user interface 1612 overlapping the virtual object 1606 as shown in FIG. 16B. For example, when the computer system displays the second user interface element in the three-dimensional environment, the second user interface element is overlaid on at least a portion of the first user interface element, such that the at least the portion of the first user interface element is obscured by the second user interface element (and is optionally not visible through the second user interface element) from the current viewpoint of the user. In some embodiments, when the second user interface element is displayed in the three-dimensional environment the second user interface element is spatially located closer to the current viewpoint of the user in the three-dimensional environment than the first user interface element.

In some embodiments, in accordance with a determination that the second user interface element is a first type of user interface element overlapping the first user interface element, the first user interface element is visually deemphasized relative to the environment in a first manner (1702*d*) (optionally without visually deemphasizing the second user interface element relative to the environment in the first manner), such as visually deemphasizing an entire portion of the virtual object 1606 as shown in FIG. 16B For example, the determination that the second user interface element is the first type of user interface element is in accordance with a determination that the second user interface element is a system user interface element as similarly described above, such as a list, menu, carousel, and/or tray of selectable icons, folders, and/or other images that are associated with applications configured to run on the computer system. In some embodiments, the determination that the second user interface element is the first type of user interface element is in accordance with a determination that the second user interface element is a control user interface element as similarly discussed above for controlling one or more aspects of the display of the first user interface element, such as a brightness control, a volume level control, an image size control, and/or other controls. In some embodiments, the determination that the second user interface element is the first type of user interface element is in accordance with a determination that the second user interface element is an application window that is or includes content, such as a user interface, media content, text-based content, and/or the like.

In some embodiments, visually deemphasizing the first user interface element relative to the environment in the first manner includes changing one or more visual characteristics of the first user interface element, such as opacity, brightness, size, and/or color saturation. For example, before the second user interface element is displayed in the three-dimensional environment, the first user interface element is displayed with a first visual prominence relative to the three-dimensional environment. In some embodiments, when the computer system visually deemphasizes the first user interface element, the computer system displays the first user interface element with a second visual prominence, different from (e.g., less than or more than) the first visual prominence, relative to the three-dimensional environment. For example, the computer system displays a respective portion or more or all of the first user interface element with less opacity, brightness, size and/or color saturation compared to displaying the first user interface element with the first visual prominence discussed above. In some embodiments, visually deemphasizing the first user interface element relative to the three-dimensional environment includes displaying the respective portion of the first user interface element with more transparency and/or sharpness compared to displaying the first user interface element with the first visual prominence. In some embodiments, a second portion of the first user interface element that is not overlapping with the second user interface element is displayed with the first visual prominence while the respective portion of the first user interface element has the second visual prominence. In some embodiments, the respective portion of the first user interface element includes an entirety of the first user interface element, including the portions of the first user interface element that are not overlapped by the second user interface element. In some embodiments, changing the visual emphasis of the first user interface element has one or more characteristics of the same in methods 800 and/or 900.

In some embodiments, in accordance with a determination that the second user interface element is a second type of user interface element, different from the first type of user interface element, overlapping the first user interface element, the first user interface element is not visually deemphasized relative to the environment in the first manner (1702*e*), such as visually deemphasizing a first portion 1607*b* of the virtual object 1606 as shown in FIG. 16F. For example, the computer system maintains display of the first user interface element with the first visual prominence discussed above relative to the three-dimensional environment. In some embodiments, the determination that the second user interface element is the second type of user interface element is in accordance with a determination that the second user interface element is an alert user interface element, such as a notification dot or badge. In some embodiments, the alert user interface element is displayed in the three-dimensional environment for a threshold amount of time (e.g., 1, 2, 3, 5, 10, 15, 20, or 30 seconds) (e.g., during which the user is able to interact with the alert user interface element, such as via attention-based and/or hand-based interaction, to view the contents of the alert (e.g., a preview of the incoming text message, email, application notification, and the like)). In some embodiments, as discussed in more detail below, if the computer system detects, via the one or more input devices, user input directed to the second user interface element that causes a user interface element of the first type to be displayed that overlaps at least a portion of the first user interface element (e.g., causes additional content to be presented via the second user interface element and/or an additional user interface element to be displayed in the three-dimensional environment), the computer system visually deemphasizes the first user interface element relative to the three-dimensional environment. Displaying a first user interface element with less visual prominence in a three-dimensional environment when a second user interface element is displayed overlapping the first user interface element in response to detecting that an event has occurred provides visual feedback to the user that detection of the event caused a spatial conflict between the first user interface element and the second user interface element in the three-dimensional environment, which provides an opportunity to the user to correct the spatial conflict, and/or facilitates user input for interacting with the second user interface element, thereby avoiding errors in interaction directed to the first user interface element and improving user-device interaction.

In some embodiments, the first user interface element includes first content, such as a user interface as described with reference to FIG. 16A. For example, as similarly described above with reference to step(s) 1702, the first user interface element is a virtual application window that is displaying one or more user interfaces in the three-dimensional environment. In some embodiments, the first content corresponds to a first image, one or more first lines of text, and/or a first video that is displayed within the first user interface element.

In some embodiments, visually deemphasizing the first user interface element relative to the environment in the first manner includes visually dimming the first content of the first user interface element relative to the environment, such as decreasing a brightness of the virtual object 1606 as shown in FIG. 16B. For example, when the second user interface element is displayed in the three-dimensional environment, the second user interface element overlaps at least a portion of the first content (e.g., such that the first content is visually obscured by the second user interface element). In some embodiments, as similarly described above with reference to step(s) 1702, the computer system decreases a brightness of the first content (e.g., the portion of the first content that is overlapped by the second user interface element and/or an entire portion of the first content, including the portion that is overlapped by the second user interface element). In some embodiments, the computer system visually dims the first content without visually dimming an entire portion of the first user interface element relative to the environment. For example, the first user interface element includes second content that is not overlapped by the second user interface element and is thus not visually dimmed relative to the three-dimensional environment. Visually dimming content of a first user interface element in a three-dimensional environment when a second user interface element is displayed overlapping the first user interface element in response to detecting that an event has occurred provides visual feedback to the user that detection of the event caused a spatial conflict between the first user interface element and the second user interface element in the three-dimensional environment, which provides an opportunity to the user to correct the spatial conflict, and/or facilitates user input for interacting with the second user interface element, thereby avoiding errors in interaction directed to the first user interface element and improving user-device interaction.

In some embodiments, visually deemphasizing the first user interface element relative to the environment in the first manner includes increasing a translucency of the first user interface element relative to the environment such that a first portion of the environment (e.g., a physical environment of the display generation component that is included in the three-dimensional environment or a virtual environment that is displayed in the three-dimensional environment) that is occluded by the first user interface is visible (or optionally, more visible) relative to the viewpoint of the user, such as increasing a translucency of the virtual object 1606 as shown in FIG. 16B. For example, the computer system decreases an opacity of the first user interface element such that a physical environment or a virtual environment is revealed and visible to the user of the computer system through the first user interface element. In some embodiments, the first portion of the environment is not visible to the user of the computer system while displaying the first user interface element or is partially visible to the user before displaying the second user interface element (e.g., the first portion of the environment is visually obscured by the first user interface element relative to the viewpoint of the user). In some embodiments, the physical environment includes one or more physical objects that become visible or become more visible to the user when the translucency of the first user interface element is increased. In some embodiments, the virtual environment occupies all or portions of the three-dimensional environment. In some embodiments, the virtual environment includes a scene that at least partially veils at least a part of the three-dimensional environment (and/or the physical environment surrounding the display generation component) such that it appears as if the user were located in the scene (e.g., and optionally no longer located in the three-dimensional environment). In some embodiments, the virtual environment is an atmospheric transformation that modifies one or more visual characteristics of the three-dimensional environment such that it appears as if the three-dimensional environment is located at a different time, place, and/or condition (e.g., morning lighting instead of afternoon lighting, sunny instead of overcast, and/or evening instead of morning). Increasing a translucency of a first user interface element in a three-dimensional environment when a second user interface element is displayed overlapping the first user interface element in response to detecting that an event has occurred provides visual feedback to the user that detection of the event caused a spatial conflict between the first user interface element and the second user interface element in the three-dimensional environment, which provides an opportunity to the user to correct the spatial conflict, and/or facilitates user input for interacting with the second user interface element, thereby avoiding errors in interaction directed to the first user interface element and providing the user with an understanding of their spatial context.

In some embodiments, in accordance with the determination that the second user interface element is the second type of user interface element overlapping the first user interface element, the first user interface element is visually deemphasized relative to the environment in a second manner, different from the first manner, such as visually deemphasizing a first portion 1607*b* of the virtual object 1606 as shown in FIG. 16F. For example, the computer system visually deemphasizes the first user interface element relative to the three-dimensional environment in the second manner rather than the first manner when the second user interface element of the second type is displayed in the three-dimensional environment. In some embodiments, visually deemphasizing the first user interface element relative to the environment in the second manner includes forgoing visually deemphasizing the first user interface element relative to the environment. In some embodiments, visually deemphasizing the first user interface element relative to the environment in the second manner includes changing one or more visual characteristics of the first user interface element, such as opacity, brightness, size, and/or color saturation, by an amount and/or intensity that is less than those when visually deemphasizing the first user interface element relative to the environment in the first manner as discussed above. Displaying a first user interface element with less visual prominence in a three-dimensional environment when a second user interface element of a first type is displayed than when a second user interface element of a second type is displayed that overlaps the first user interface element provides visual feedback for the type of user interface element that is displayed in the three-dimensional environment, and/or facilitates user input for interacting with the second user interface element, thereby avoiding errors in interaction directed to the first user interface element and improving user-device interaction.

In some embodiments, visually deemphasizing the first user interface element relative to the environment in the first manner includes visually deemphasizing the first user interface element relative to a three-dimensional environment (e.g., three-dimensional environment 1602 in FIG. 16B) in which the first user interface element is displayed via the display generation component (e.g., as similarly described above with reference to step(s) 1702). Displaying a first user interface element with less visual prominence in a three-dimensional environment when a second user interface element is displayed overlapping the first user interface element in response to detecting that an event has occurred provides visual feedback to the user that detection of the event caused a spatial conflict between the first user interface element and the second user interface element in the three-dimensional environment, which provides an opportunity to the user to correct the spatial conflict, and/or facilitates user input for interacting with the second user interface element, thereby avoiding errors in interaction directed to the first user interface element and improving user-device interaction.

In some embodiments, in response to detecting that the first event has occurred, in accordance with a determination that the second user interface element is a third type of user interface element, different from the first type of user interface element and the second type of user interface element, overlapping the first user interface element, such as an application window as described with reference to search user interface 1614 in FIG. 16C, the first user interface element is visually deemphasized relative to the environment in a third manner, different from the first manner (e.g., and/or the second manner described above), such as visually deemphasizing the virtual object 1606 as shown in FIG. 16C. For example, the computer system visually deemphasizes the first user interface element relative to the three-dimensional environment in the third manner rather than the first manner and the second manner when the second user interface element of the third type is displayed in the three-dimensional environment. In some embodiments, the third type of user interface element corresponds to an alert user interface element that is associated with an application running on the computer system or a home user interface of the computer system (e.g., displaying one or more icons or other user interface objects associated with applications configured to be run on the computer system). In some embodiments, visually deemphasizing the first user interface element relative to the environment in the third manner includes forgoing visually deemphasizing the first user interface element relative to the environment at all. In some embodiments, visually deemphasizing the first user interface element relative to the environment in the third manner includes changing one or more visual characteristics of the first user interface element, such as opacity, brightness, size, and/or color saturation, by an amount and/or intensity that is different from (e.g., less than or more than) those when visually deemphasizing the first user interface element relative to the environment in the first manner and/or the second manner as discussed above. Displaying a first user interface element with a different visual prominence in a three-dimensional environment when a second user interface element of a first type is displayed than when a second user interface element of a second type is displayed that overlaps the first user interface element provides visual feedback for the type of user interface element that is displayed in the three-dimensional environment, and/or facilitates user input for interacting with the second user interface element, thereby avoiding errors in interaction directed to the first user interface element and improving user-device interaction.

In some embodiments, while displaying the first user interface element in the environment, the computer system detects, via the one or more input devices, that a second event has occurred, such as selection of the physical button 1615 as shown in FIG. 16A. In some embodiments, the second event has one or more characteristics of the first event described previously above.

In some embodiments, in response to detecting that the second event has occurred, the computer system displays a third user interface element, different from the first user interface element and the second user interface element, in the environment, such as home user interface 1612 as shown in FIG. 16B. For example, in response to detecting that the second event has occurred, the computer system displays a notification/alert dot or badge in the three-dimensional environment. In some embodiments, the computer system displays a list, menu, carousel, and/or tray of one or more system-based user interface elements (e.g., selectable icons, folders, and/or other images) that are selectable to control one or more aspects of the display of the first user interface element and/or to display additional content in the three-dimensional environment. In some embodiments, displaying the third user interface element includes displaying a second virtual application window (or similar virtual object) in the three-dimensional environment. In some embodiments, a type of the third user interface element (e.g., as discussed in more detail below) that is displayed in the three-dimensional environment is based on the second event that is detected. For example, in accordance with a determination that the first event is a notification event corresponding to an incoming email message, the third user interface element corresponds to an email notification. As another example, in accordance with a determination that the second event is a notification event corresponding to an incoming phone call, the third user interface element corresponds to an incoming phone call notification.

In some embodiments, in accordance with a determination that the third user interface element is a third type of user interface element (e.g., the third type discussed above), different from the first type of user interface element and the second type of user interface element, such as preview 1636 as shown in FIG. 16I, the first user interface element is visually deemphasized relative to the environment in a third manner (e.g., the third manner described above, optionally different from the first manner and/or the second manner), irrespective of whether the third user interface element overlaps the first user interface element, as similarly described with reference to home user interface 1612 in FIG. 16B. For example, when the third user interface element is displayed in the three-dimensional environment, if the third user interface element is the third type of element, the computer system changes one or more visual characteristics of the first user interface element, such as opacity, brightness, size, and/or color saturation, by an amount or intensity that is different from (e.g., less than or more than) those when visually deemphasizing the first user interface element relative to the environment in the first manner and/or the second manner as discussed above. In some embodiments, the third user interface element overlaps at least a portion of the first user interface element, as previously discussed above. In some embodiments, the third user interface element is displayed adjacent to the first user interface element (e.g., to a side of the first user interface element), above or below the first user interface element, or in front of the first user interface element (but not obscuring the first user interface element) in the three-dimensional environment relative to the viewpoint of the user. Accordingly, in some embodiments, the computer system visually deemphasizes the first user interface element in the third manner relative to the three-dimensional environment irrespective of where and/or how the third user interface element is displayed relative to the first user interface element from the viewpoint of the user if the third user interface element is the third type of user interface element. Displaying a first user interface element with a different visual prominence in a three-dimensional environment when a third user interface element of a third type is displayed than when a second user interface element of a first type or a second type is displayed in a three-dimensional environment provides visual feedback for the type of user interface element that is displayed in the three-dimensional environment, and/or facilitates user input for interacting with the third user interface element, thereby avoiding errors in interaction directed to the first user interface element and improving user-device interaction.

In some embodiments, in response to detecting that the second event has occurred, the second user interface element is visually deemphasized relative to the environment in the third manner, such as visually deemphasizing immersive environment 1632 as shown in FIG. 16I. In some embodiments, when the computer system displays the third user interface element that is the third type of user interface element in the three-dimensional environment, the computer system visually deemphasizes both the first user interface element and the second user interface element (and/or other user interface elements that are displayed in the three-dimensional environment) relative to the three-dimensional environment in the third manner discussed above. Displaying one or more first user interface elements with a different visual prominence in a three-dimensional environment when a second user interface element of a third type is displayed than when a second user interface element of a first type or a second type is displayed in a three-dimensional environment provides visual feedback for the type of user interface element that is displayed in the three-dimensional environment, and/or facilitates user input for interacting with the second user interface element, thereby avoiding errors in interaction directed to the first user interface element and improving user-device interaction.

In some embodiments, in response to detecting that the second event has occurred, in accordance with a determination that the third user interface element is a fourth type of user interface element, different from the first type of user interface element, the second type of user interface element, and the third type of user interface element, such as virtual keyboard 1620 in FIG. 16D, the first user interface element is visually deemphasized relative to the environment in a fourth manner, different from the third manner, irrespective of whether the third user interface element overlaps the first user interface element, such as forgoing visually deemphasizing the search user interface 1614 as shown in FIG. 16D. For example, when the third user interface element is displayed in the three-dimensional environment, if the third user interface element is the fourth type of element, the computer system changes one or more visual characteristics of the first user interface element, such as opacity, brightness, size, and/or color saturation, by an amount and/or intensity that are more than those when visually deemphasizing the first user interface element relative to the environment in the first manner, the second manner, and/or the third manner discussed above. As an example, if the third user interface element is the fourth type of user interface element, the first user interface element is displayed with a brightness that is less than the brightness of the first user interface element when the third user interface is the first type, the second type, or the third type of user interface element. Similarly, if the third user interface element is the fourth type of user interface element, the first user interface element is optionally displayed with a translucency that is greater than the translucency of the first user interface element when the third user interface is the first type, the second type, or the third type of user interface element. In some embodiments, the fourth type of user interface element corresponds to a home user interface of the computer system (e.g., displaying one or more icons or other user interface objects associated with applications configured to be run on the computer system). In some embodiments, the third user interface element overlaps at least a portion of the first user interface element, as previously discussed above. In some embodiments, the third user interface element is displayed adjacent to the first user interface element (e.g., to a side of the first user interface element), above or below the first user interface element, or in front of the first user interface element (but not obscuring the first user interface element) in the three-dimensional environment relative to the viewpoint of the user. Accordingly, in some embodiments, the computer system visually deemphasizes the first user interface element in the fourth manner relative to the three-dimensional environment irrespective of where and/or how the third user interface element is displayed relative to the first user interface element from the viewpoint of the user if the third user interface element is the fourth type of user interface element. Displaying a first user interface element with a different visual prominence in a three-dimensional environment when a second user interface element of a fourth type is displayed than when a second user interface element of a first type, a second type, and/or a third type is displayed in a three-dimensional environment provides visual feedback for the type of user interface element that is displayed in the three-dimensional environment, and/or facilitates user input for interacting with the second user interface element, thereby avoiding errors in interaction directed to the first user interface element and improving user-device interaction.

In some embodiments, in response to detecting that the first event has occurred, in accordance with a determination that the second user interface element is a fourth type of user interface element, different from the first type of user interface element and the second type of user interface element (e.g., and the third type of user interface element described above), overlapping the first user interface element, the first user interface element is not visually deemphasized relative to the environment, such as forgoing visually deemphasizing the search user interface 1614 as shown in FIG. 16D. For example, the computer system maintains display of the first user interface element with the same visual prominence in the three-dimensional environment as prior to the first event occurring. In some embodiments, as discussed in more detail below, the fourth type of user interface element corresponds to a virtual keyboard including a plurality of selectable keys for inputting text into a text-entry field in the three-dimensional environment. Forgoing displaying a first user interface element with less visual prominence in a three-dimensional environment when a second user interface element of a fourth type is displayed overlapping the first user interface element in response to detecting that an event has occurred provides visual feedback for the type of user interface element that is displayed in the three-dimensional environment, and/or facilitates user input for interacting with the second user interface element of the fourth type, thereby avoiding errors in interaction directed to the first user interface element using the second user interface element and improving user-device interaction.

In some embodiments, the fourth type of user interface includes a virtual keyboard (e.g., as discussed above), such as virtual keyboard 1620 in FIG. 16D. In some embodiments, the virtual keyboard is a system keyboard of the computer system. For example, the virtual keyboard is displayed in the three-dimensional environment in response to detecting a selection of a text-entry field or other option in or associated with the first user interface element. Accordingly, in some embodiments, detecting that the first event has occurred includes detecting user input selecting a user interface object that causes the virtual keyboard to be displayed, such as user input corresponding to a request to enter text in the first user interface element. In some embodiments, the virtual keyboard is associated with an application running on the computer system, such as the application with which the first user interface element is associated (e.g., a keyboard of a text-messaging or web messaging application). In some embodiments, though the virtual keyboard at least partially overlaps the first user interface element in the three-dimensional environment, the computer system forgoes visually deemphasizing the first user interface element when the virtual keyboard is displayed to allow the user to maintain visibility of the first user interface element (e.g., such that the user is able to view the text-entry field and/or text that is input into the text-entry field in response to detecting selection of one or more keys of the virtual keyboard). Forgoing displaying a first user interface element with less visual prominence in a three-dimensional environment when a virtual keyboard is displayed overlapping the first user interface element in response to detecting that an event has occurred provides visual feedback for the type of user interface element that is displayed in the three-dimensional environment, and/or facilitates user input for interacting with the virtual keyboard, thereby avoiding errors in interaction directed to the first user interface element using the virtual keyboard and improving user-device interaction.

In some embodiments, while displaying the second user interface element (e.g., the virtual keyboard described above) without visually deemphasizing the first user interface element relative to the environment in accordance with the determination that the second user interface element is the fourth type of user interface element, the computer system detects, via the one or more input devices, that a second event has occurred, such as input provided by hand 1603*d* that is directed to virtual object 1606 as shown in FIG. 16D. In some embodiments, the second event has one or more characteristics of the first event described previously above. In some embodiments, as similarly discussed above, the virtual keyboard is associated with the first user interface element in the three-dimensional environment. For example, the keys of the virtual keyboard are selectable via user input (e.g., tap or touch input by a hand of the user) to input text (e.g., letters, numbers, and special characters) into a text-entry field of the first user interface element.

In some embodiments, in response to detecting that the second event has occurred, the computer system displays a third user interface element, different from the first user interface element and the second user interface element, in the environment, such as moving the virtual object 1606 forward in the three-dimensional environment 1602 as shown in FIG. 16E. For example, the computer system displays a virtual application window or other user interface object having one or more characteristics of the first user interface element or the second user interface element in the three-dimensional environment.

In some embodiments, the third user interface element at least partially overlaps (e.g., a respective portion of) the first user interface element from the current viewpoint of the user of the computer system, such as virtual object 1606 overlapping the search user interface 1614 as shown in FIG. 16E. In some embodiments, the third user interface element also at least partially overlaps the second user interface element from the current viewpoint of the user when the third user interface element is displayed.

In some embodiments, in accordance with a determination that the third user interface element is the first type of user interface element (e.g., the first type of user interface element discussed previously above) overlapping the first user interface element, the first user interface element and the second user interface element are visually deemphasized relative to the environment in the first manner (optionally without visually deemphasizing the third user interface element relative to the environment in the first manner), such as visually deemphasizing the search user interface 1614 and the virtual keyboard 1620. For example, because the virtual keyboard is associated with the first user interface element (e.g., as a virtual input device in the three-dimensional environment), the computer system reduces a visual prominence of both the first user interface element and the virtual keyboard relative to the three-dimensional environment when the third user interface element of the first type is displayed in the three-dimensional environment. In some embodiments, the computer system changes one or more visual characteristics of the first user interface element, such as opacity, brightness, size, and/or color saturation of the first user interface element, and one or more visual characteristics of the second user interface element, such as opacity, brightness, size, and/or color saturation of the second user interface element, by a same amount and/or intensity relative to the three-dimensional environment. In some embodiments, the computer system changes one or more of the visual characteristics of the first user interface element by a different amount and/or intensity compared to the change in the visual characteristics of the second user interface element.

In some embodiments, in accordance with a determination that the third user interface element is the second type of user interface element overlapping the first user interface element, the first user interface element and the second user interface element are not visually deemphasized relative to the environment in the first manner (e.g., as similarly described above with reference to step(s) 1702), such as forgoing visually deemphasizing the search user interface 1614 and the virtual keyboard 1620 if the virtual object 1606 does not overlap the search user interface 1614 in FIG. 16E. In some embodiments, the computer system forgoes visually deemphasizing the first user interface element and the second user interface element in any manner relative to the environment when the third user interface element of the second type is displayed. Displaying a first user interface element and a second user interface element that is associated with the first user interface element with less visual prominence in a three-dimensional environment when a third user interface element is displayed overlapping the first user interface element in response to detecting that an event has occurred provides visual feedback to the user that detection of the event caused a spatial conflict between the first user interface element and the third user interface element in the three-dimensional environment, which provides an opportunity to the user to correct the spatial conflict, and/or facilitates user input for interacting with the third user interface element, thereby avoiding errors in interaction directed to the first user interface element and/or the second user interface element and improving user-device interaction.

In some embodiments, in response to detecting that the first event has occurred, in accordance with a determination that the second user interface element does not at least partially overlap the first user interface element from the current viewpoint of the user when the second user interface element is displayed (and optionally does not overlap any other user interface elements, different from the first user interface element, in the three-dimensional environment), the computer system forgoes visually deemphasizing the first user interface element relative to the environment (in optionally any manner), as similarly described above with reference to method 800, such as forgoing visually deemphasizing the virtual object 1606 if the search user interface 1614 does not overlap the virtual object 1606 in FIG. 16C. Forgoing displaying a first user interface element with less visual prominence in a three-dimensional environment when a second user interface element is displayed that does not overlap the first user interface element in response to detecting that an event has occurred provides visual feedback to the user that detection of the event has not caused a spatial conflict between the first user interface element and the second user interface element in the three-dimensional environment, which facilitates discovery that the user is able to interact with either user interface element in the three-dimensional environment, thereby improving user-device interaction.

In some embodiments, visually deemphasizing the first user interface element relative to the environment in the first manner includes, in accordance with a determination that the second user interface element overlaps a first portion (e.g., first portion 1607*b* in FIG. 16F) of the first user interface element (e.g., and without overlapping a second portion of the first user interface element), visually deemphasizing the first portion of the first user interface element relative to the environment, without visually deemphasizing a second portion (e.g., second portion 1607*a* in FIG. 16F), different from the first portion, of the first user interface element that is not overlapped by the second user interface element relative to the environment. For example, the computer system visually deemphasizes the portion of the first user interface element that is obscured by the second user interface element relative to the viewpoint of the user without visually deemphasizing other portions of the first user interface element that are not obscured by the second user interface element relative to the viewpoint of the user in the three-dimensional environment. In some embodiments, the computer system visually deemphasizes the first portion of the first user interface element relative to the environment without visually deemphasizing the second portion of the first user interface element relative to the environment based on the type of user interface element that is displayed overlapping the first user interface element. For example, if the second user interface element is an overlay user interface element, such as a notification badge or dot that overlaps less than a threshold amount of the first user interface element (e.g., less than 5, 10, 15, 20, 25, 30, 35, or 50% of the first user interface element), the computer system changes the one or more visual characteristics of the portion of the first user interface element that is obscured by the second user interface element from the viewpoint of the user as discussed above. In some embodiments, the computer system visually deemphasizes the first portion of the first user interface element relative to the environment without visually deemphasizing the second portion of the first user interface element relative to the environment in accordance with a determination that the second user interface element is an alert user interface element, such as a notification badge or dot associated with an incoming notification event as discussed previously above. In some embodiments, the computer system visually deemphasizes the first portion of the first user interface element and the second portion of the first user interface element relative to the environment (e.g., even though the second portion is not overlapped by the second user interface element), as discussed below, in accordance with a determination that the second user interface element is a user interface that is displayed in response to user input, such as a home user interface or a virtual application window as discussed previously above. Displaying a first portion of a first user interface element with less visual prominence in a three-dimensional environment when a second user interface element is displayed overlapping the first portion of the first user interface element in response to detecting that an event has occurred provides visual feedback for the type of user interface element that is displayed in the three-dimensional environment, and/or facilitates user input for interacting with the second user interface element or maintaining interaction with the first user interface element, thereby avoiding errors in interaction directed to the first user interface element and improving user-device interaction.

In some embodiments, visually deemphasizing the first user interface element relative to the environment in the first manner includes, in accordance with a determination that the second user interface element overlaps a first portion of the first user interface element (e.g., and without overlapping a second portion of the first user interface element), visually deemphasizing the first portion of the first user interface element relative to the environment and visually deemphasizing a second portion, different from the first portion, of the first user interface element that is not overlapped by the second user interface element relative to the environment, such as visually deemphasizing an entire portion of the virtual object 1606 as shown in FIG. 16C. For example, the computer system visually deemphasizes the portion of the first user interface element that is obscured by the second user interface element relative to the viewpoint of the user and other portions of the first user interface element that are not obscured by the second user interface element relative to the viewpoint of the user in the three-dimensional environment. In some embodiments, the computer system visually deemphasizes the first portion of the first user interface element relative to the environment and visually deemphasizes the second portion of the first user interface element relative to the environment based on the type of user interface element that is displayed overlapping the first user interface element. For example, if the second user interface element is a virtual application window that is or includes one or more user interfaces, such as a home screen user interface, a system settings user interface, a notification region in which notification alerts are displayed, or a search user interface as similarly described above, the computer system changes the one or more visual characteristics of the first user interface element, optionally irrespective of an amount of the first user interface element that is overlapped by the second user interface element from the viewpoint of the user. Displaying a first user interface element with less visual prominence in a three-dimensional environment when a second user interface element is displayed overlapping a first portion of the first user interface element in response to detecting that an event has occurred provides visual feedback for the type of user interface element that is displayed in the three-dimensional environment, and/or facilitates user input for interacting with the second user interface element, thereby avoiding errors in interaction directed to the first user interface element and improving user-device interaction.

In some embodiments, detecting that the first event has occurred includes detecting a first alert event at the computer system, such as a notification event as described with reference to FIG. 16F. For example, as similarly described above with reference to step(s) 1702, the computer system detects a first notification event that causes the computer system to display the second user interface element (e.g., a notification or alert user interface element). In some embodiments, the first alert event is associated with another computer system (e.g., the first alert event corresponds to an incoming text message, email, phone call, and/or video call originating from a second computer system). In some embodiments, the first alert event is associated with an application running on the computer system (e.g., the first alert event corresponds to a system alert, or an alert associated with operation of an application). In some embodiments, the first alert event is detected at the computer system without detecting user input corresponding to a request to display the second user interface element. In some embodiments, in accordance with a determination that the first event is a different type of event that does not cause the computer system to display the second user interface element in the three-dimensional environment, the computer system forgoes displaying the first notification discussed above or displays an alternative user interface element that is different from the second user interface element, such as one of the user interface elements discussed below. Displaying a first user interface element with less visual prominence in a three-dimensional environment when a second user interface element is displayed overlapping the first user interface element in response to detecting an alert event at the computer system provides visual feedback to the user that detection of the event caused a spatial conflict between the first user interface element and the second user interface element in the three-dimensional environment, which provides an opportunity to the user to correct the spatial conflict, and/or facilitates user input for interacting with the second user interface element, thereby avoiding errors in interaction directed to the first user interface element and improving user-device interaction.

In some embodiments, detecting that the first event has occurred includes detecting, via the one or more input devices, a first input corresponding to a request to display the second user interface element in the environment, such as an air gesture performed by the hand 1603*a* in FIG. 16A. For example, as similarly described above with reference to step(s) 1702, the computer system detects user input that causes the computer system to display the second user interface element (e.g., an air gesture, a gaze-based input, and/or interaction with a hardware button of the computer system). In some embodiments, detecting the first input includes detecting an air pinch or an air tap gesture that is directed to a user interface object displayed in the three-dimensional environment. For example, the computer system detects selection of an option in the first user interface element (or an option displayed in another user interface element) and/or directed to a predetermined region of the display generation component, based on the location of the gaze of the user. In some embodiments, detecting the first input includes detecting a gaze and dwell input, such as detecting that the gaze of the user is directed toward a user interface object (e.g., a selectable option) for more than a threshold amount of time (e.g., 0.25, 0.5, 1, 1.5, 2, 3, 4, 5, or 10 seconds). In some embodiments, detecting the first input includes detecting a press, a press and hold (e.g., for more than a threshold amount of time, such as 0.1, 0.25, 0.5, 1, 1.5, 2, 3, or 5 seconds), a sequence of presses, and/or a rotation of a physical button or rotational element of the computer system. Displaying a first user interface element with less visual prominence in a three-dimensional environment when a second user interface element is displayed overlapping the first user interface element in response to detecting respective user input provides visual feedback to the user that detection of the event caused a spatial conflict between the first user interface element and the second user interface element in the three-dimensional environment, which provides an opportunity to the user to correct the spatial conflict, and/or facilitates user input for interacting with the second user interface element, thereby avoiding errors in interaction directed to the first user interface element and improving user-device interaction.

In some embodiments, detecting the first input includes detecting gaze of the user directed to a predetermined portion of the display generation component (optionally for a threshold amount of time, such as 0.1, 0.25, 0.5, 0.75, 1, 2, 3, 5, 8, or 10 seconds), such as gaze 1621 directed to predetermined region 1610 for threshold amount of time 1631 as shown in FIG. 16G. In some embodiments, the predetermined portion of the display generation component corresponds to a location of the first user interface element in the three-dimensional environment. In some embodiments, the predetermined portion of the display generation component corresponds to a top region, a side region, and/or a bottom region of the display generation component. In some embodiments, the computer system detects the gaze directed to the predetermined portion of the display generation component without also detecting a hand-based input, such as an air gesture or selection of a physical button as discussed above. Displaying a first user interface element with less visual prominence in a three-dimensional environment when a second user interface element is displayed overlapping the first user interface element in response to detecting gaze-based input provides visual feedback to the user that detection of the gaze-based input caused a spatial conflict between the first user interface element and the second user interface element in the three-dimensional environment, which provides an opportunity to the user to correct the spatial conflict, and/or facilitates user input for interacting with the second user interface element, thereby avoiding errors in interaction directed to the first user interface element and improving user-device interaction.

In some embodiments, while displaying the second user interface element in the environment in response to detecting the first input, the computer system detects, via the one or more input devices, a second input directed to the second user interface element, such as an air gesture provided by hand 1603*e* while the gaze 1621 is directed to notification element 1624 as shown in FIG. 16H. For example, while the second user interface element is displayed in the three-dimensional environment, the computer system detects an air gesture (e.g., an air pinch or tap gesture) or a press/selection of a physical button of the computer system provided by the hand of the user, optionally while the gaze of the user is directed to the second user interface element. In some embodiments, detecting the second input includes detecting the gaze of the user directed to the second user interface element for more than a threshold amount of time (e.g., 0.1, 0.25, 0.5, 0.75, 1, 2, 3, 5, 8, or 10 seconds). In some embodiments, the second input has one or more characteristics of the first input discussed above.

In some embodiments, in response to detecting the second input, the computer system ceases display, via the display generation component, of the second user interface element, such as ceasing display of the notification element 1624 in FIG. 16I. In some embodiments, the computer system displays, via the display generation component, a third user interface element, different from the first user interface element and the second user interface element, in the environment, wherein the third user interface element is associated with the second user interface element, such as display of preview 1636 as shown in FIG. 16I. For example, the computer system replaces display of the second user interface element with the third user interface element in the three-dimensional environment. In some embodiments, displaying the third user interface element includes displaying an animation of the second user interface element growing and/or expanding into the third user interface element (e.g., the third user interface element includes additional information, images, or other content not included in the second user interface element). For example, as similarly discussed above, the second user interface element is a notification badge or dot that includes an image (e.g., icon or other representation) corresponding to an application with which the notification is associated (e.g., an icon of a text bubble for a text message notification or an icon of an envelope for an email notification). When the computer system displays the third user interface element, the computer system optionally expands the second user interface element and/or replaces display of the second user interface element to display a preview of the notification (e.g., a portion of the text message or email detected at the computer system). In some embodiments, when the third user interface element is displayed, if the third user interface element at least partially overlaps the first user interface element, as similarly described above, the computer system visually deemphasizes the first user interface element based on the type of user interface element of the third user interface element relative to the three-dimensional environment. Displaying a third user interface element in a three-dimensional environment in response to detecting user input directed to a second user interface element that is displayed overlapping a first user interface element in the three-dimensional environment helps avoid errors in interaction directed to the first user interface element, thereby improving user-device interaction.

In some embodiments, detecting the first input includes detecting, via the one or more input devices, selection of a hardware button (or physical rotational element) of the computer system (e.g., as similarly described above), such as selection of the physical button 1615 provided by the hand 1605*a* as shown in FIG. 16A. In some embodiments, in response to detecting the selection of the hardware button of the computer system, the computer system specifically displays a home user interface of the computer system, as similarly discussed above. For example, the computer system does not display the home user interface of the computer system in response to detecting an alternative input, such as an air gesture or a gaze-based input. In some embodiments, the home user interface is a user interface element of the first type as discussed previously above with reference to step(s) 1702. Displaying a first user interface element with less visual prominence in a three-dimensional environment when a second user interface element is displayed overlapping the first user interface element in response to detecting selection of a hardware button of the computer system provides visual feedback to the user that detection of the selection caused a spatial conflict between the first user interface element and the second user interface element in the three-dimensional environment, which provides an opportunity to the user to correct the spatial conflict, and/or facilitates user input for interacting with the second user interface element, thereby avoiding errors in interaction directed to the first user interface element and improving user-device interaction.

In some embodiments, the first user interface element corresponds to a virtual application window (e.g., search user interface 1614 in FIG. 16C) associated with a respective application running on the computer system (e.g., as similarly described above with reference to step(s) 1702). Displaying a virtual application window with less visual prominence in a three-dimensional environment when a respective user interface element is displayed overlapping the virtual application window in response to detecting that an event has occurred provides visual feedback to the user that detection of the event caused a spatial conflict between the virtual application window and the respective user interface element in the three-dimensional environment, which provides an opportunity to the user to correct the spatial conflict, and/or facilitates user input for interacting with the respective user interface element, thereby avoiding errors in interaction directed to the virtual application window and improving user-device interaction.

In some embodiments, the first user interface element corresponds to an immersive virtual object, such as immersive virtual object 1630 in FIG. 16G. For example, as similarly described above with reference to step(s) 1702, the immersive virtual object corresponds to a three-dimensional object that has a respective volume in the three-dimensional environment and that occupies a volumetric space within the three-dimensional environment. In some embodiments, the immersive virtual object is associated with an immersive application running on the computer system, such as a mixed-reality application, a video game application, a meditation application, and the like. In some embodiments, the immersive virtual object is a world-locked object (e.g., defined herein). In some embodiments, the immersive virtual object includes one of a window of a web browsing application displaying content (e.g., text, images, or video), a window displaying a photograph or video clip, a media player window for controlling playback of content items on the computer system, a contact card in a contacts application displaying contact information (e.g., phone number email address, and/or birthday) and/or a virtual boardgame of a gaming application. In some embodiments, the application with which the immersive virtual object is displayed is permitted to display content that is spatially distributed throughout an available display area (e.g., a volume or region that is optionally constrained by a portal or other boundary) of the three-dimensional environment. In some embodiments, the portal or other boundary is a portal into content associated with and/or provided by the application. Accordingly, the content is visible from the viewpoint of the user via the portal. In some embodiments, the immersive virtual object is capable of being located within the portal and/or located outside the portal. Accordingly, in some embodiments, the computer system displays the immersive virtual object within the portal and outside the portal. For example, if the application includes a media player application, a portion of the content provided by the media player application (e.g., images, video (e.g., movies, television episodes, and/or other video clips), text, and/or three-dimensional objects (e.g., shapes, models, and/or other renderings)) can be displayed within (and/or overlaid on) a virtual portal or boundary associated with the media player application, and another portion of the content provided by the media player application can be displayed in locations outside of the virtual portal or boundary (e.g., beside the virtual portal or boundary, in front of the virtual portal or boundary, and/or behind the virtual portal or boundary) from the viewpoint of the user. Displaying an immersive virtual object with less visual prominence in a three-dimensional environment when a respective user interface element is displayed overlapping the immersive virtual object in response to detecting that an event has occurred provides visual feedback to the user that detection of the event caused a spatial conflict between the immersive virtual object and the respective user interface element in the three-dimensional environment, which provides an opportunity to the user to correct the spatial conflict, and/or facilitates user input for interacting with the respective user interface element, thereby avoiding errors in interaction directed to the immersive virtual object and improving user-device interaction.

In some embodiments, while displaying the second user interface element in the environment in response to detecting that the first event has occurred, the computer system detects, via the one or more input devices, respective input directed toward the first user interface element in the environment (e.g., the immersive virtual object described above), such as if the hand 1605*b* provided an air gesture directed to the immersive virtual object 1630 in FIG. 16I. In some embodiments, detecting the respective input includes detecting an air gesture (e.g., an air pinch gesture or an air tap gesture) provided by a hand of the user, optionally while the gaze of the user is directed to the first user interface element in the three-dimensional environment. In some embodiments, detecting the respective input includes detecting selection of a hardware button of the computer system that corresponds to interaction with the first user interface element. For example, rotation of the hardware button (e.g., a rotational element, such as a mechanical dial) corresponds to a request to change an immersion level of the immersive virtual object. In some embodiments, the immersion level controls an amount of (e.g., a size of, a volume of, a brightness of, and/or a color saturation of) the immersive virtual object is displayed in the three-dimensional environment. For example, if the respective input includes a request to increase (e.g., or decrease) the immersion level, then the amount of the immersive virtual object that is displayed within the three-dimensional environment is optionally increased (e.g., or decreased). In some embodiments, detecting the respective input includes detecting gaze-based input, such as gaze and dwell (e.g., in which the gaze of the user is directed to the first user interface element for a threshold amount of time, such as 0.5, 1, 1.5, 2, 3, 4, 5, 10, or 15 seconds).

In some embodiments, in response to detecting the respective input, the computer system forgoes performing an operation (optionally any operation, such as forgoing changing the immersion level of the immersive virtual object) associated with the respective input directed to the first user interface element, such as forgoing performing an operation directed to the immersive virtual object 1630 while the preview 1636 is displayed in FIG. 16I. For example, while the second user interface element is displayed in the three-dimensional environment, the computer system forgoes responding to the respective input that is directed toward the first user interface element in the three-dimensional environment. The computer system optionally forgoes performing operations responsive to further inputs directed to the first user interface element while the second user interface element remains displayed in the three-dimensional environment. In some embodiments, forgoing performing the operation associated with the respective input directed to the first user interface element includes forgoing transmitting (e.g., and/or preventing transmission of) data associated with the respective input to the first user interface and/or an application with which the first user interface element is associated (e.g., and irrespective of whether the application provides data indicating a manner in which to respond to the respective input). In some embodiments, in accordance with a determination that the second user interface element is not displayed and/or is not overlapping the first user interface element when the respective input is detected, the computer system performs the operation associated with the respective input directed to the first user interface element. Forgoing performing an operation associated with an immersive virtual object that is displayed in a three-dimensional environment in response to detecting user input while a respective user interface element is displayed overlapping the immersive virtual object provides feedback to the user that the computer system is not responsive to input directed to the immersive virtual object while the respective user interface element is displayed, thereby avoiding errors in interaction directed to the immersive virtual object and improving user-device interaction.

In some embodiments, displaying the first user interface element in the environment includes, in accordance with a determination that a first portion (e.g., a first hand) of the user is positioned within the environment relative to the viewpoint of the user (e.g., the first event is detected while the first hand is positioned within the three-dimensional environment in the field of view of the user relative to the viewpoint), applying a visual effect to the first portion of the user that causes the first portion of the user to be displayed as a respective virtual representation in the environment relative to the viewpoint of the user, such as virtual representation 1628 in FIG. 16G. For example, the computer system displays a virtual representation associated with the immersive virtual object, such as a second virtual object (e.g., a three-dimensional object, shape, model, or rendering), at a location in the three-dimensional environment that corresponds to a location of the first portion of the user (e.g., the hand of the user) in the three-dimensional environment, such that the virtual representation visually appears to replace (e.g., or consume or occupy) the first portion of the user relative to the viewpoint of the user. In some embodiments, the computer system updates display of the virtual representation in the three-dimensional environment based on movement of the first portion of the user within the three-dimensional environment relative to the viewpoint of the user. For example, if the computer system detects the hand of the user move leftward or rightward in the three-dimensional environment relative to the viewpoint of the user, the computer system updates a location at which the virtual representation is displayed in the three-dimensional environment and moves the virtual representation leftward or rightward relative to the viewpoint of the user in accordance with the movement of the hand, such that the virtual representation continues to visually appear to replace the first portion of the user relative to the viewpoint of the user. In some embodiments, if the computer system detects the hand of the user move upward or downward in the three-dimensional environment relative to the viewpoint of the user, the computer system updates the location at which the virtual representation is displayed in the three-dimensional environment and moves the virtual representation upward or downward relative to the viewpoint of the user in accordance with the movement of the hand, optionally changing a size of the virtual representation to account for any changes in an amount of the hand of the user that is positioned within the three-dimensional environment as a result of the upward or downward hand movement. As another example, if the computer system detects the hand of the user move toward or away from the viewpoint of the user in the three-dimensional environment relative to the viewpoint, the computer system optionally updates the location at which the virtual representation is displayed in the three-dimensional environment and moves the virtual representation toward or away from the viewpoint of the user in accordance with the movement of the hand, optionally changing a size of the virtual representation to account for increases or decreases in size of the hand relative to the viewpoint as the hand is moved toward or away from the viewpoint.

In some embodiments, in response to detecting that the first event has occurred, in accordance with the determination that the first portion of the user is positioned within the environment relative to the viewpoint of the user when the first event is detected to have occurred (e.g., the computer system is displaying the virtual representation in the three-dimensional environment when the first event occurs), the computer system ceases application of the visual effect to the first portion of the user, such that the respective virtual representation is no longer displayed in the environment relative to the viewpoint of the user, such as ceasing display of the virtual representation 1628 in FIG. 16I. For example, when the second user interface element is displayed in the three-dimensional environment, the computer system ceases applying the visual effect to the first portion of the user, such that the first portion of the user is visible via the display generation component or a representation of the first portion of the user is visible via the display generation component. In some embodiments, in accordance with a determination that the first portion of the user is not positioned within the environment relative to the viewpoint of the user when the first event is detected to have occurred, the computer system displays the second user interface element in the three-dimensional environment without ceasing application of the visual effect to the first portion of the user (e.g., because the visual effect is not applied to the first portion of the user when the first event is detected to have occurred). Ceasing applying a visual effect to a first portion of the user when a respective user interface element is displayed in a three-dimensional environment helps reduce or avoid potential depth conflict between the first portion of the user and the respective user interface element in the three-dimensional environment, and/or facilitates discovery that displaying the respective user interface element causes the visual effect to no longer be applied to the first portion of the user, thereby improving user-device interaction.

It should be understood that the particular order in which the operations in method 1700 have been described is merely exemplary and is not intended to indicate that the described order is the only order in which the operations could be performed. One of ordinary skill in the art would recognize various ways to reorder the operations described herein.

FIGS. 18A-18T illustrate examples of a computer system moving a first virtual object relative to a second virtual object in a three-dimensional environment in accordance with some embodiments. FIG. 18A illustrates a computer system 101 (e.g., an electronic device) displaying, via a display generation component (e.g., display generation component 120 of FIGS. 1 and 3), a three-dimensional environment 1801 from a viewpoint of a user 1814 (e.g., facing the back wall of the physical environment in which computer system 101 is located).

In some embodiments, computer system 101 includes a display generation component 120. In FIG. 18A, the display generation component 120 includes one or more internal image sensors 314*a* oriented towards the face of the user (e.g., eye tracking cameras 540 described with reference to FIG. 5). In some embodiments, internal image sensors 314*a* are used for eye tracking (e.g., detecting a gaze of the user). Internal image sensors 314*a* are optionally arranged on the left and right portions of display generation component 120 configured to track position, orientation, and/or movement of the user's left and right eyes. Display generation component 120 also includes external image sensors 314*b* and 314*c* facing outwards from the user to detect and/or capture the physical environment and/or movements of the user's hands. In some embodiments, image sensors 314*a*, 314*b*, and 314*c* have one or more of the characteristics of image sensors 314 described with reference to the series of figures prefixed with the numbers 7, 10, 12, 14, 16.

As shown in FIG. 18A, computer system 101 captures one or more images of the physical environment around computer system 101 (e.g., operating environment 100), including one or more objects in the physical environment around computer system 101. In some embodiments, computer system 101 displays representations of the physical environment in three-dimensional environment 1801. For example, three-dimensional environment 1801 optionally includes a representation of a window, which is optionally a representation of a physical window in the physical environment. Additionally, three-dimensional environment 1801 includes a textured wall that is visible via display generation component 120 in FIG. 18A.

As discussed further herein, in FIG. 18A, display generation component 120 is illustrated as displaying content in the three-dimensional environment 1801. In some embodiments, the content is displayed by a single display (e.g., display 510 of FIG. 5) included in display generation component 120. In some embodiments, display generation component 120 includes two or more displays (e.g., left and right display panels for the left and right eyes of the user, respectively, as described with reference to FIG. 5) having displayed outputs that are merged (e.g., by the user's brain) to create the view of the content shown in FIGS. 18A-18T.

Display generation component 120 has a field of view (e.g., a field of view captured by external image sensors 314*b* and 314*c* and/or visible to the user via display generation component 120) that corresponds to the content shown in FIG. 18A, corresponding to the "viewport" described further herein. Because display generation component 120 is optionally a head-mounted device, the field of view of display generation component 120 is optionally the same as or similar to the field of view of the user.

As discussed herein, the user of the computer system 101 performs one or more air pinch gestures (e.g., with hand 1816) to provide one or more inputs to computer system 101 to provide one or more user inputs directed to content displayed by computer system 101. Depiction the air gestures performed by hand 1816 is merely exemplary and non-limiting; the user optionally provides user inputs using different air gestures and/or using other forms of input as described with reference to the series of figures prefixed with the numbers 7, 10, 12, 14, and/or 16.

In the example of FIG. 18A, because the user's hand is within the field of view of display generation component 120, it is visible within the three-dimensional environment 1801. That is, the user is able to optionally see, in the three-dimensional environment, any portion of their own body that is within the field of view of display generation component 120.

As mentioned above, the computer system 101 is configured to display content in the three-dimensional environment 1801 using the display generation component 120. In FIG. 18A, three-dimensional environment 1801 also includes virtual objects 1803 and 1804. In some embodiments, the virtual object 1804 is optionally a user interface of an application containing content (e.g., a plurality of selectable options), three-dimensional objects (e.g., virtual clocks, virtual balls, virtual cars, etc.) or any other element displayed by computer system 101 that is not included in the physical environment of display generation component 120. For example, in FIG. 18A, the virtual object 1804 is a user interface of a web-browsing application including web-related content, such as text, images, video, hyperlinks, and/or audio content, from a website, or is a user interface of an audio playback application including a list of selectable categories of music and a plurality of selectable user interface objects corresponding to a plurality of albums of music. It should be understood that the content discussed above is exemplary and that, in some embodiments, additional and/or alternative content and/or user interfaces are provided in the three-dimensional environment 1801, such as the content described below with reference to method 1900. In some embodiments, virtual objects are displayed with an exit option and a grabber bar. In some embodiments, the exit option is selectable to initiate a process to cease display of the virtual object 1804 in the three-dimensional environment 1801. In some embodiments, the grabber bar is selectable to initiate a process to move the virtual object 1804 within the three-dimensional environment 1801.

In some embodiments, as shown in FIG. 18A, the virtual object 1804 is displayed at a first location within the three-dimensional environment 1801 relative to a viewpoint of the user 1814 of the computer system 101. Additionally, as shown in FIG. 18A, while the virtual object 1804 is displayed at the first location in the three-dimensional environment 1801, the virtual object 1804 is at least partially obscuring a portion of the user's physical environment in the three-dimensional environment 1801 from the viewpoint of the user (e.g., because the virtual object 1804 occupies a simulated position that is intermediate to the textured, back-wall of the user's physical environment and the viewpoint of the user 1814).

In FIG. 18A, three-dimensional environment 1801 includes a virtual object 1806 that is associated with virtual object 1804. For example virtual object 1804 is displayed concurrently with one or more user interfaces and/or virtual objects that include virtual content such as settings associated with the virtual object 1804. Virtual object 1806, for example, includes a plurality of selectable options (e.g., "File," "Edit," "View," "History," and "Bookmarks") that are pertinent to the user's interactions with virtual object 1804. For example, the plurality of selectable options is optionally, respectively selectable to initiate display of virtual content included in the virtual object 1804, extending from and/or included in virtual object 1806, and/or separated from virtual object 1804. As an example, in response to detecting selection of "File" included in user interface 1806, the computer system 101 optionally updates virtual object 1806 to include a plurality of selectable options, respectively selectable to initiate operations such as closing a browser window included in virtual object 1804, initiating display of an additional virtual object associated with a same application (e.g., a web browsing application) as virtual object 1804, and/or exporting the contents of virtual object 1804 as a file (e.g., a picture, a document, and/or a shortcut virtual object linking to a webpage). Thus, virtual object 1806 is associated with the virtual object 1804, and computer system 101 optionally determines a hierarchical relationship between the virtual object 1804 and virtual object 1806, indicating that virtual object 1806 depends upon and/or relates to virtual object 1804.

In some embodiments, virtual object 1806 is displayed at location within three-dimensional environment 1801 relative to virtual object 1804. For example, the virtual object 1806 is optionally displayed flush to, extending from, and/or in close proximity to virtual object 1804. As a further example, the virtual object 1806 is optionally included in and/or extending from a front-face of the virtual object 1804, which optionally is a surface of a virtual object upon which visible and/or interactable virtual content is displayed. It is understood that although virtual object 1804 and/or virtual object 1806 are described as two-dimensional objects, it is understood that such description is not strictly limiting. As an example, two-dimensional objects optionally have a depth and/or a simulated thickness, and thus optionally are understood as "nearly" two-dimensional objects. For example, virtual object 1804 and virtual object 1806 are not necessarily understood as infinitely thin planes relative to three-dimensional environment 1801, and optionally are understood as relatively thin objects that have a depth (e.g., a distance along an axis perpendicular to the front faces of the virtual objects) relative to the three-dimensional environment 1801.

In FIG. 18A, three-dimensional environment 1801 further includes virtual object 1803, which optionally has one or more characteristics similar to or the same as described with reference to virtual object 1804. In FIG. 18A, virtual object 1803 is optionally a container virtual object including a file browsing user interface configured to facilitate browsing of virtual content stored in memory of the computer system 101 and/or associated with a user account of the computer system 101. Additionally or alternatively, virtual object 1803 includes a plurality of representations of media such as a photo and/or media browsing applications. As an example, virtual object 1803 includes a virtual object 1802. Virtual object 1802 in FIG. 18A includes an image as illustrated in FIG. 18A, and optionally includes additional information associated with the image. For example, the virtual object 1802 includes text indicating a type of file of the image, a descriptor of the image, metadata associated with the image, and/or a file name assigned to the image. The present disclosure contemplates operations performed relative to virtual object 1802, however, it is understood that operations optionally are performed relative to additional or alternative virtual objects, in a manner similar to or the same as described with reference to virtual object 1802. Additionally, it is understood that computer system 101 optionally performs one or more operations similar to or the same as described with reference to virtual object 1802 relative to a grouping of a plurality of virtual objects, such as a plurality of virtual objects that are concurrently selected (e.g., and/or concurrently visually distinguished relative to three-dimensional environment 1801).

In FIG. 18A, while displaying the virtual object 1802, the computer system 101 detects an input provided by hand 1816 corresponding to a request to initiate movement of the virtual object 1802 relative to three-dimensional environment 1801. For example, as shown in FIG. 18A, the computer system 101 detects hand 1816 provide an air gesture, such as an air pinch gesture in which an index finger and thumb of the hand of the user come together to make contact, while attention 1807 of the user is directed toward the virtual object 1802. In some embodiments, the computer system 101 initiates movement of virtual object 1802 in accordance with a determination that the attention 1807 dwells upon directed virtual object 1802 for a period of time greater than a threshold amount of time (e.g., 0.5, 1, 1.5, 2, 3, 5, 10, or 15 seconds). Additionally or alternatively, in FIG. 18A, the computer system 101 detects a selection (e.g., a press) of physical button of the computer system 101. In some embodiments, the selection of the physical button corresponds to a long press in which contact with the physical button is sustained for a threshold amount of time (e.g., 0.5, 1, 1.5, 2, 3, 4, or 5 seconds). It is understood that one or more air gestures and/or inputs optionally are provided by one or more hands of user 1814. In some embodiments, the hands and inputs are detected concurrently, or in succession. In some embodiments, computer system 101 independently responds to the hands and/or inputs illustrated and described in response to detecting such hands and/or inputs independently. In some embodiments, user input is "directed toward" respective virtual content in accordance with a determination that the attention 1807 is directed to the respective virtual content. Further description of the attention 1807 is omitted hereafter, but it is understood that input including movement of hand 1816 optionally indicates to the computer system 101 a target of the input.

In some embodiments, computer system 101 facilitates display of feedback including changing of a visual prominence of a virtual object displayed in three-dimensional environment 1801 when moving another virtual object. As described further with reference to methods 800, 900, 1100, 1300, 1500, 1700, and/or 1900, computer systems 101 displays virtual object 1804 with an active focus state, including a high degree of opacity or fully opaque appearance relative to three-dimensional environment 1801. In some embodiments, changing the visual prominence of a respective virtual object (e.g., a level of visual prominence of one or more portions of the respective virtual object) includes changing a brightness level of the virtual object (e.g., including the content that is displayed within the respective virtual object and/or that is otherwise associated with the respective virtual object). For example, decreasing the visual prominence of the respective virtual object (e.g., visually deemphasizing the respective virtual object relative to the three-dimensional environment 1801) includes decreasing the brightness level of the respective virtual object (e.g., dimming the content of the respective virtual object). In some embodiments, changing the visual prominence of a respective virtual object includes changing a translucency/opacity of the virtual object (e.g., including the content that is displayed within the respective virtual object and/or that is otherwise associated with the respective virtual object). For example, decreasing the visual prominence of the respective virtual object (e.g., visually deemphasizing the respective virtual object relative to the three-dimensional environment 1801) includes increasing a translucency of the respective virtual object (e.g., decreasing an opacity of the content of the respective virtual object). Additional details regarding changing the visual prominence of a respective virtual object are provided with reference to methods 800, 900, 1100, 1300, 1500, 1700, and/or 1900.

Figure 18B:
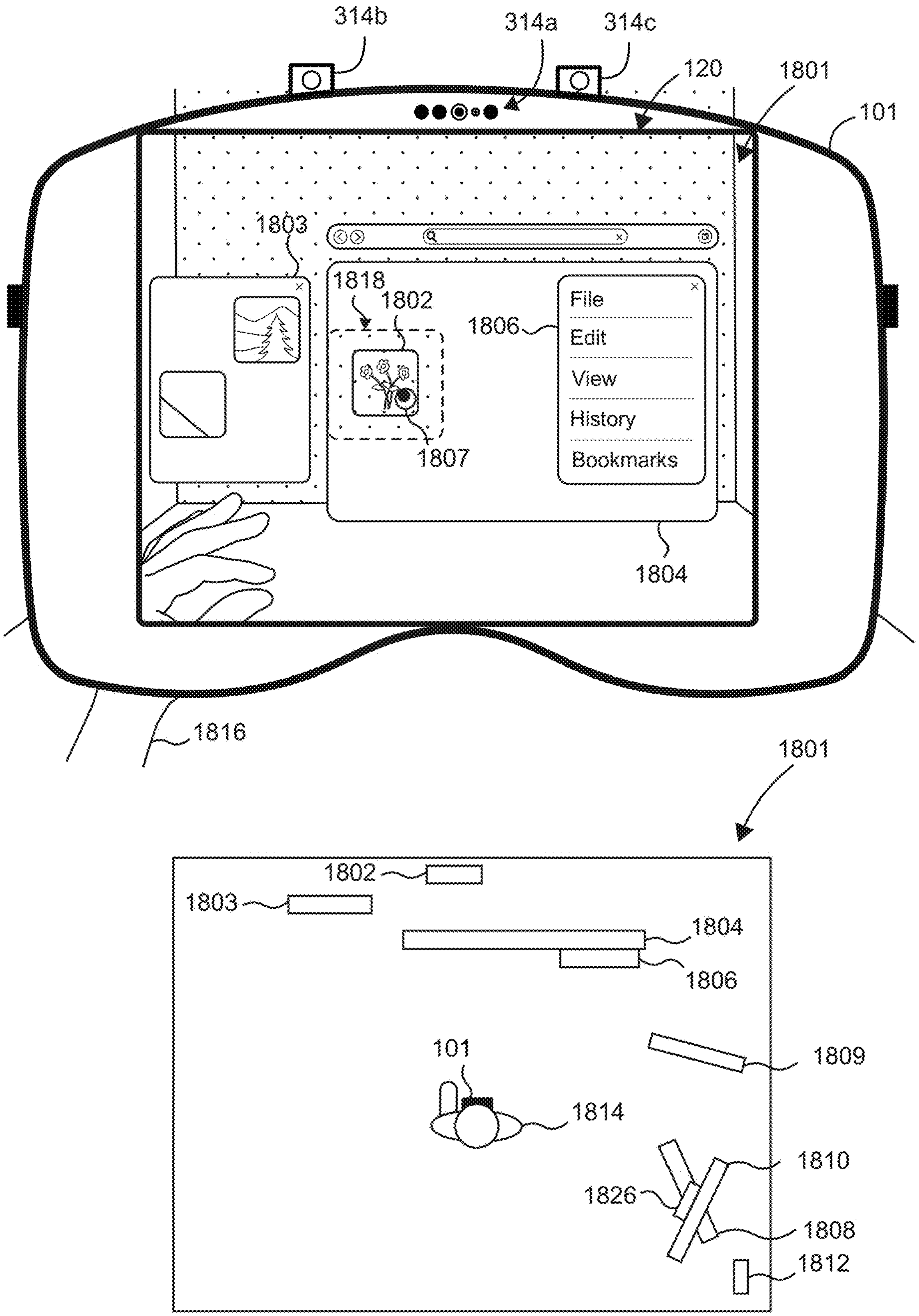

In FIG. 18B, as shown in the overhead view of the three-dimensional environment 1801, the virtual object 1802 is moved to a position that would be obscured by virtual object 1804, were it not for changing the opacity and/or visual prominence of a portion of virtual object 1804. For example, virtual object 1802 is moved in accordance with movement of hand 1816 from FIG. 18A to FIG. 18B, in a direction similar to or the same as the direction hand 1816 moving relative to the computer system 101.

In FIG. 18B, computer system 101 changes one or more visual properties of at least a portion of the virtual object 1804 to facilitate viewing and/or interaction with the virtual object 1802. For example, from FIG. 18A to FIG. 18B, an air pose (e.g., the air pinch illustrated) is maintained while moving the virtual object 1802. In response to determining and/or in accordance with a determination that the virtual object will present a simulated obscuring of the virtual object 1802, computer system 101 optionally changes the one or more visual properties of the region 1818 illustrated in FIG. 18B to resolve a simulated obscuring of virtual object 1802 by the virtual object 1804 and to at least partially preserve visibility of virtual object 1802. For example, as described further with reference method 1900, the computer system 101 optionally changes a brightness, opacity, saturation, hue, a magnitude and/or radius of a simulated blurring effect applied to the region 1818. In particular, in FIG. 18B, the opacity of region 1818 is reduced (e.g., made translucent, or more translucent than previously) and display of virtual object 1802 is maintained.

A simulated obscuring—as described further with reference to method 1900 herein—optionally corresponds to scenarios in which physical equivalents of first virtual content that is relatively closer to the viewpoint of the user 1814 (e.g., along a depth dimension extending parallel to the floor of three-dimensional environment 1801 and from a center of the viewpoint of user 1814) would visually block or obscure second virtual content that is relatively further from the viewpoint of the user than the first virtual content. As an example, in an alternative arrangement to the embodiment illustrated in FIG. 18B, a physical equivalent of an opaque window—corresponding to virtual object 1804—would visually block a physical equivalent of virtual object 1802 relative to the viewpoint of user 1814. Accordingly, the computer system in the alternative arrangement to the embodiment illustrated in FIG. 18B optionally changes visual properties of virtual object 1802 to simulate the obscuring of virtual object 1802, such as ceasing display of the virtual object 1802. FIG. 18B, in contrast, illustrates an embodiment in which the visual prominence and/or one or more visual properties of region 1818 are modified to resolve the simulated obscuring.

In some embodiments, visual properties of the region 1818 of virtual object 1804 are modified to resolve a potential obscuring of virtual content, the region 1818 corresponding to a border of the virtual object 1802 in FIG. 18B. For example, computer system 101 projects a perceived border of the virtual object 1802 to a plane and/or location parallel to and/or intersecting with virtual object 1804. As an example, the border of the virtual object 1802 relative to what is visible from the viewpoint of user 1814 in FIG. 18B is extended to a position parallel to and intersecting virtual object 1804. The dimensions and/or scale of the projection circumscribe a portion of virtual object 1804 that optionally will be displayed with modified one or more visual properties, to improve visibility of the virtual object 1802. In some embodiments, the region 1818 is relatively larger than the projection of the border of virtual object 1802 to its position parallel to and/or intersecting with virtual object 1804. For example, the portion of the virtual object 1804 that is between the border of virtual object 1802 in FIG. 18B and the border of region 1818 is also reduced in opacity, as indicated by the dotted fill pattern presenting the representation of a physical wall in the user's environment. As illustrated and described further with reference to FIG. 18C, the distance between the border of virtual object 1802 and the border of region 1818 optionally is based upon the relative depth between the virtual object 1802 and virtual object 1804. In some embodiments, one or more visual properties included in region 1818 are changed to facilitate the viewing of object 1802. For example, an opacity of one or more portions are reduced relative to the three-dimensional environment 1801, a brightness decreased, a blurring effect applied, a color desaturated, and/or some combination thereof are changed to view object 1802 as shown in FIG. 18B.

In some embodiments, computer system 101 changes a scale of a moving virtual object dynamically to present the virtual object at a consistent size as perceived by the user 1814, but at a changing size relative to the three-dimensional environment 1801. Such scaling of the virtual object is illustrated from FIG. 18A to FIG. 18B as shown in the overhead view of three-dimensional environment 1801, and it is understood that such scaling optionally applies to moving virtual object illustrated in FIGS. 18C-18T.

Figure 18C:
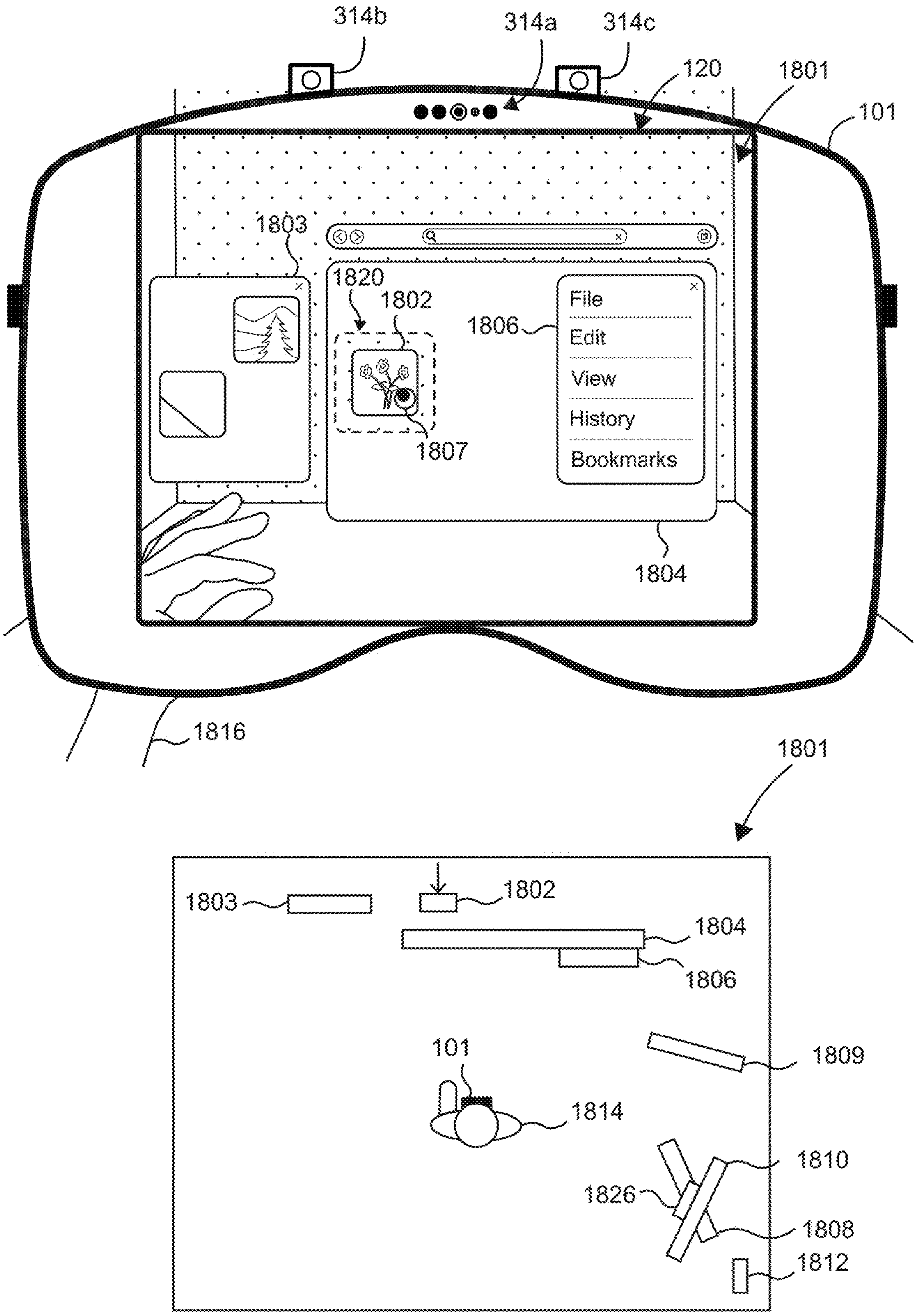

In FIG. 18C, virtual object 1802 is moved closer toward the viewpoint of user 1814. As an example, the input moving virtual object 1802 continues from FIG. 18B to FIG. 18C, and a region surrounding virtual object 1802 relative to the viewpoint of user 1814 is changed in accordance with the moving of virtual object 1802. In some embodiments, the visual properties of a region of virtual object 1804 configured to preserve visibility of virtual object 1802 are changed in accordance with a relative distance and/or movement between the virtual object 1802 and the virtual object 1804. For example, the region 1820 in FIG. 18C is relatively smaller than the region 1818 in FIG. 18B, in accordance with a relatively decreased depth between the virtual objects 1802 and 1804. In some embodiments, the size of region 1818 and/or 1820 grows in accordance with decreases in depth between virtual objects 1802 and 1804, relative to the viewpoint of user 1814 and/or is based upon the border of virtual object 1802 relative to the user's viewpoint. In some embodiments, in response to moving the virtual object 1802 further away from virtual object 1804, the computer system 101 changes (e.g., scales up or scales down) the portion of virtual object 1804 that includes modified visual properties.

In some embodiments, computer system 101 changes visual properties of the region facilitating visibility of virtual object 1802 in a first "direction" in response to movement of the first virtual object in a first direction toward or away from the second virtual object, and in some embodiments, changes visual properties of the region in a second "direction" in response to movement of the first virtual object in a second direction away or toward the second virtual object. For example, changes in visual properties of the portion of virtual object 1804 in response to virtual object 1802 moving closer toward virtual object 1804 are optionally opposed by changes in visual properties of virtual object 1802 moving away from virtual object 1804 (e.g., shrinking vs. growing the size of the portion, increasing vs. decreasing opacity, a radius of a blurring effect, a level of saturation, a level of hue, and/or a level of brightness).

Figure 18D:
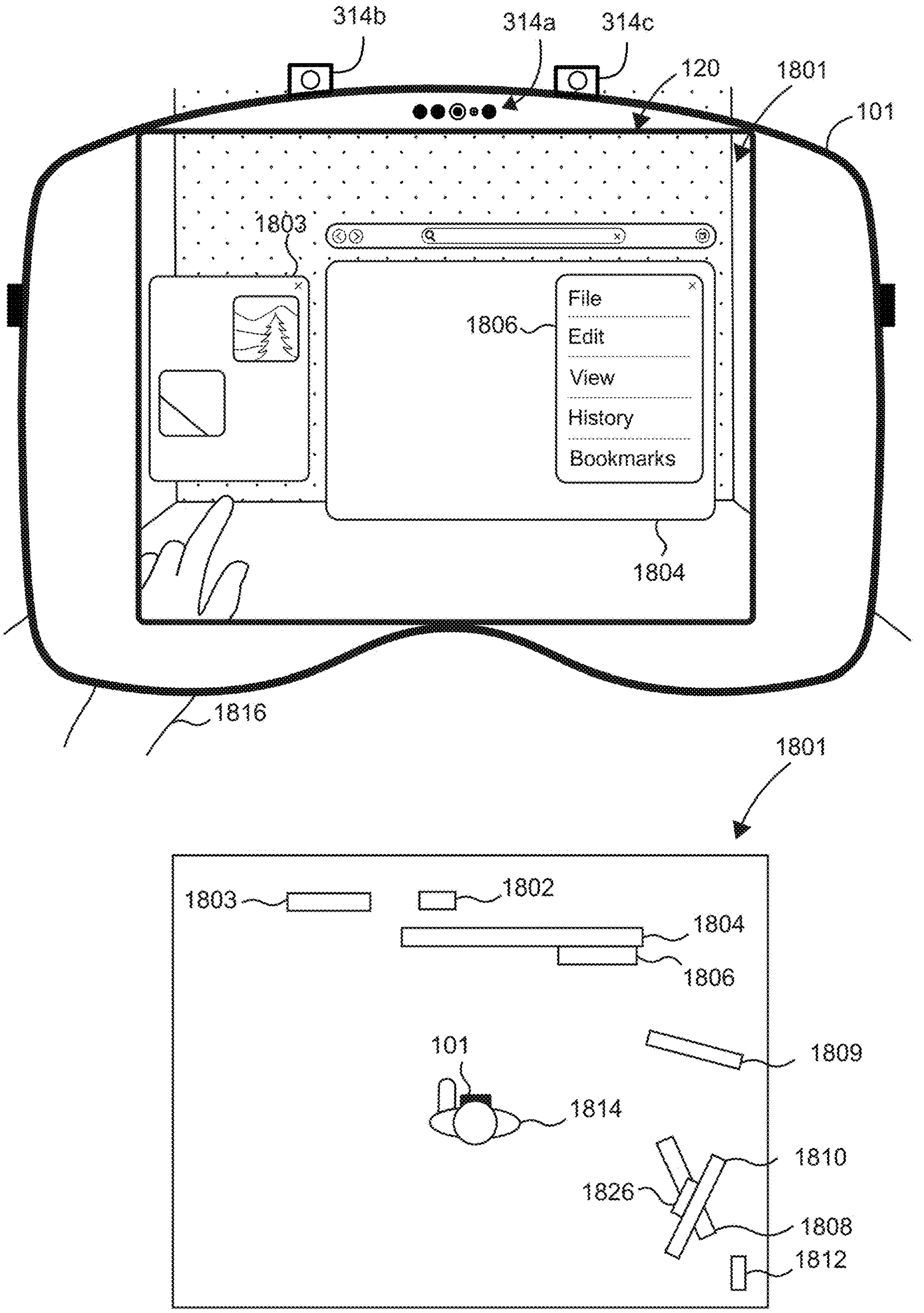

In FIG. 18D, input directed to the virtual object 1802 is terminated. In some embodiments, computer system 101 ceases display of the virtual object 1802 (e.g., and/or virtual object 1802 is no longer visible to the user 1814) and/or a region included in virtual object 1804 configured to facilitated visibility of virtual object 1804 in accordance with a determination that the movement of virtual object 1802 is terminated while the virtual object 1804 obscures virtual object 1802 relative to the viewpoint of user 1814. For example, from FIG. 18C to FIG. 18D, computer system 101 detects a ceasing of the air pinch gesture (e.g., a ceasing of contact between fingers of user 1814), ceasing of another air pinch pose, ceasing of contact with a surface (e.g., a touch-sensitive trackpad or a non-touch sensitive surface monitored by computer system 101), a voice command requesting ceasing of movement of virtual object 1802, and/or ceasing of selection of a physical or virtual button. In response to the ceasing of the input moving virtual object 1802, and because the dimensions of virtual object 1804 present a simulated obscuring of the virtual object 1802, computer system 101 ceases display of virtual object 1802 in FIG. 18D (e.g., and/or ceases to maintain visibility of the virtual object 1802 through the virtual object 1804). In some embodiments, the computer system 101 ceases modification of one or more visual properties of the virtual object 1804 (e.g., the region 1820 in FIG. 18C), reverting the visual properties to their respective values prior to the modification (e.g., causing a visual appearance of virtual object 1804 similar to or the same as illustrated in FIG. 18A).

Figure 18E:
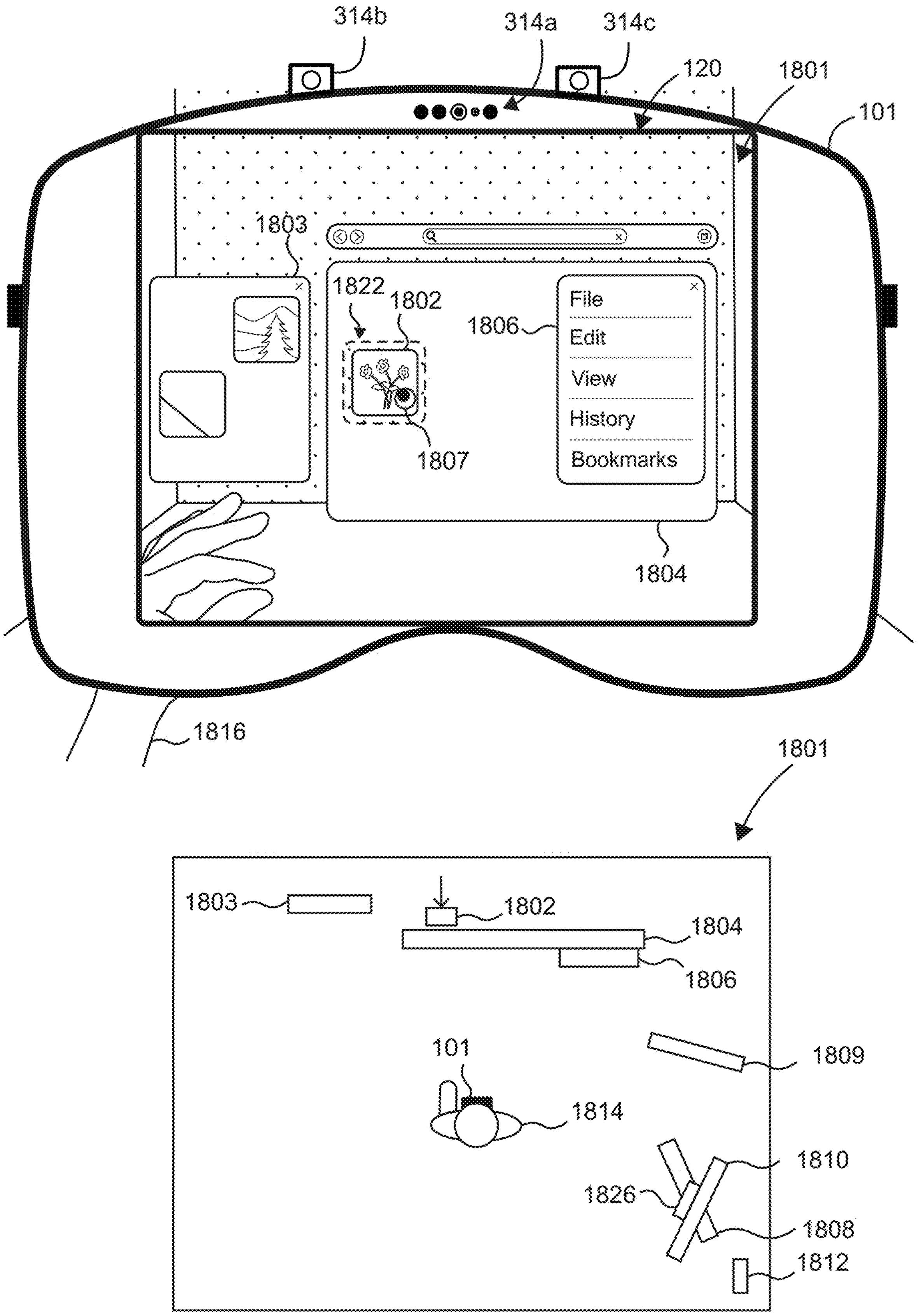

In FIG. 18E, computer system 101 resumes movement of the virtual object 1802. For example, the computer system 101 detects an additional input selecting and/or moving the virtual object 1802, or maintains the movement operations initiated in FIG. 18A (without detecting the ceasing of the movement, described with reference to FIGS. 18C-18D). In FIG. 18E, similar to as described with reference to FIGS. 18B-18C, computer system 101 displays a portion of virtual object 1804 including region 1822 with modified one or more visual properties (e.g., a reduced level of opacity), indicating proximity between the virtual object 1802 and virtual object 1804. Region 1822 in FIG. 18E is displayed with a relatively smaller size relative to virtual object 1804 and/or relative to the viewpoint of user 1814, in accordance with the distance between the virtual object 1802 and virtual object 1804 relative to the viewpoint of the user compared to the distance in FIG. 18C. Thus, computer system 101 provides visual feedback indicating that the virtual objects 1802 and 1804 are relatively close to each other.

Figure 18F:
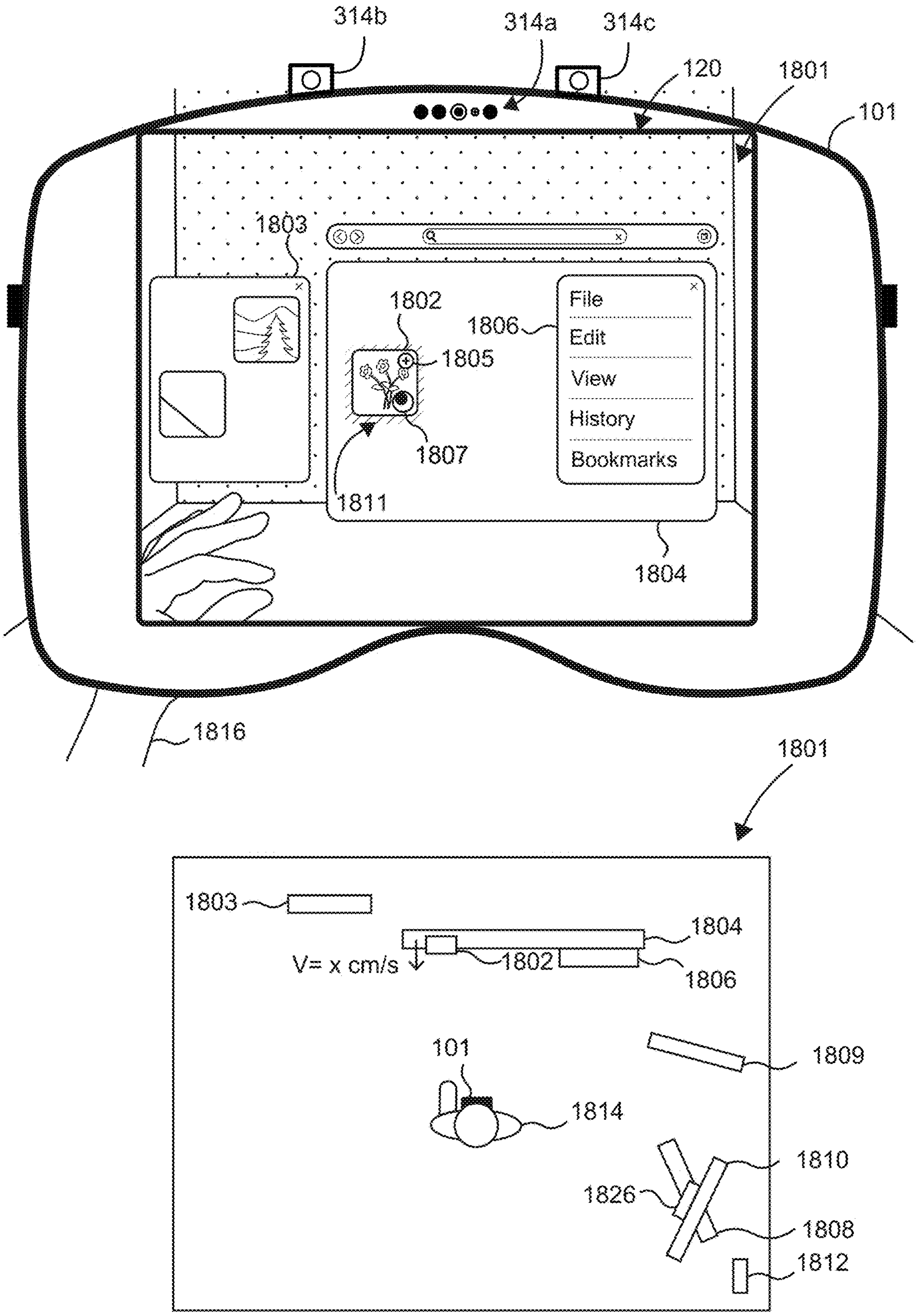

In FIG. 18F, computer system 101 displays virtual object 1802 and virtual object 1804 with visual appearances indicating that the virtual object 1802 will be added to virtual object 1804, and/or that it is possible to add virtual object 1802 to virtual object 1804. As described previously with reference to methods 800, 900, 1100, 1300, 1500, 1700, and/or 1900, in some embodiments, computer system 101 facilitates inclusion of a first virtual object in a second virtual object, such as when the second virtual object is a virtual container for other virtual objects, including the first virtual object. To visually indicate that the first virtual object will be and/or is able to be added to the second virtual object 1804, the computer system displays a virtual shadow, such as virtual shadow 1811, overlaying a front-facing surface of the virtual object 1804 in response to movement of the air pinch maintained by hand 1816 from FIG. 18E to FIG. 18F.

In some embodiments, the virtual shadow 1811 is displayed with one or more values of one or more visual properties to convey a proximity between the virtual object 1802 and virtual object 1804. For example, in FIG. 18F, virtual shadow 1811 is displayed at a first scale, saturation, brightness, hue, with a first simulated lighting effect, and/or some combination thereof simulating the appearance of one or more light sources illuminating the front of virtual object 1802 and casting a shadow onto virtual object 1804. As an example, the virtual shadow 1811 is displayed because the virtual object 1802 is now within a threshold distance (e.g., described further with reference to method 1900) of the virtual object 1804. In FIG. 18F, the position of the simulated light source is relatively close to the virtual object 1802, and oriented along an axis extending normal to a surface of virtual object 1802 including the image. Thus, a spatial profile of the virtual shadow (e.g., shape, scale, and position relative to virtual object 1804) is centered with virtual object 1802, and closely resembles virtual object 1802.

In some embodiments, virtual shadow 1811 is and/or includes a drop shadow, in which an alpha value and/or Gaussian blur is applied to the virtual shadow 1811 to convey a sense of depth to virtual object 1802 moving close to, and in front of, virtual object 1804. In some embodiments, the virtual shadow 1811 is based upon a position of one or more simulated light sources. For example, a simulated light source is relatively above and to the right of virtual object 1802, and is oriented downward toward the virtual object 1802. In some embodiments, the position and/or orientation of the simulated light source and/or orientation of the simulated light source changes in response to changes in position of virtual object 1802 relative to virtual object 1804.

In some embodiments, the virtual shadow 1811 additionally indicates that the virtual object 1802 is snapping, or has snapped to a location (e.g., a snap location) relative to virtual object 1804. Snapping described further with reference to method 1900 includes quickly moving the virtual object 1802, as though attracted toward the snapping position that is within a threshold distance (e.g., described with reference to method 1900) of the virtual object 1804. At the snapped position, the computer system 101 optionally offers a simulated resistance to movement away from the snapped position, and/or optionally moves the virtual object 1802 back toward the snapped position if input requesting movement terminates before one or more criteria are satisfied, such as when the virtual object 1802 is not moved far enough away from the snap location, and/or is not moved away fast enough from the snap location.

Additionally, as illustrated with reference to the FIGS. 18A-18T, computer system 101 optionally displays visual indication 1805 to visually convey that the virtual object 1802 can be "added" to another virtual object (e.g., virtual object 1804 in FIG. 18F). "Adding" a virtual object to another virtual object optionally includes displaying the virtual object without a virtual shadow in response to detecting termination of movement input while the visual indication 1805 is displayed. When the virtual objects described herein are "added" to another virtual object, the computer system 101 optionally displays the added virtual object in proximity to, parallel to, and/or within a body of the recipient object. The "adding" of virtual objects is described further with reference to method 1900, and optionally includes moving the added virtual object in a direction and by a magnitude that matches the direction and/or magnitude of the virtual object that contains the added virtual object. After adding the virtual object 1802, the computer system 101 optionally ceases display a virtual shadow cast onto virtual object 1804.

As illustrated in the overhead view, computer system 101 moves the virtual object 1802 with a first simulated speed (e.g., "V=x cm/s) in FIG. 18F. In some examples, the computer system provides a simulated resistance to movement of virtual content that is based upon a direction of movement relative to the virtual content. For example, because virtual object 1802 is being "pulled" through a rear-facing surface of the virtual object 1804 from FIG. 18E to FIG. 18F, the computer system 101 optionally applies a first degree of simulated resistance to the movement of virtual object 1802, and translates the position of virtual object 1802 from a first location to a second location that is different from an expressly requested location. For example, distance between the first and second locations is a first distance. In the event that an input—an input similar to or the same as the input directed to the same virtual object 1802 in FIG. 18E—were detected while virtual object 1802 was not moving through and/or toward virtual object 1804, the computer system 101 optionally moves the virtual object 1802 from a third location to a fourth location that are a second distance apart from each other, greater than the first distance. Thus, a same input optionally moves a virtual object by a greater amount in accordance with a determination that the moved virtual object is not passing through and/or almost passing through another virtual object.

In some embodiments, the computer system 101 moves the virtual object 1802 snapping toward a surface of virtual object 1804. For example, as an additional or alternative embodiment to those described above, the computer system 101 "snaps" (e.g., moves) the virtual object 1802 toward the front-facing surface of virtual object 1804, from FIG. 18E to FIG. 18F. In some embodiments, the snapping and/or snapped location of the virtual object 1802 additionally or alternatively includes a predetermined orientation relative to virtual object 1804. For example, the computer system 101 in FIG. 18F orients the virtual object 1802 parallel to virtual object 1804, as if the virtual object 1802 were subject to forces aligning the virtual objects.

In some embodiments, computer system 101 resists movement of virtual object 1802 away from the predetermined position. For example, the computer system 101 detects input requesting movement of the virtual object 1802, and in accordance with a determination that the input does not correspond to a request to move the virtual object 1802 with a simulated speed that exceeds a threshold speed (e.g., 0.05, 0.1, 0.25, 0.5, 0.75, 1, 1.25, 1.5, 3, 5, or 10 m/s) and/or that a distance of requested movement of the virtual object does not exceed a simulated threshold distance (e.g., 0.05, 0.1, 0.25, 0.5, 0.75, 1, 1.25, 1.5, 3, 5, or 10 m), computer system 101 forgoes movement of virtual object 1802 away from its snapped location in FIG. 18F. Alternatively, computer system 101 optionally moves the virtual object 1802 in response to the aforementioned input by a distance significantly less than the requested distance of movement (e.g., an order of magnitude less), and in response to termination of the input, and optionally animates movement of the virtual object 1802 back to the predetermined position relative to virtual object 1804 without detecting additional input expressly requesting such movement.

Figure 18G:
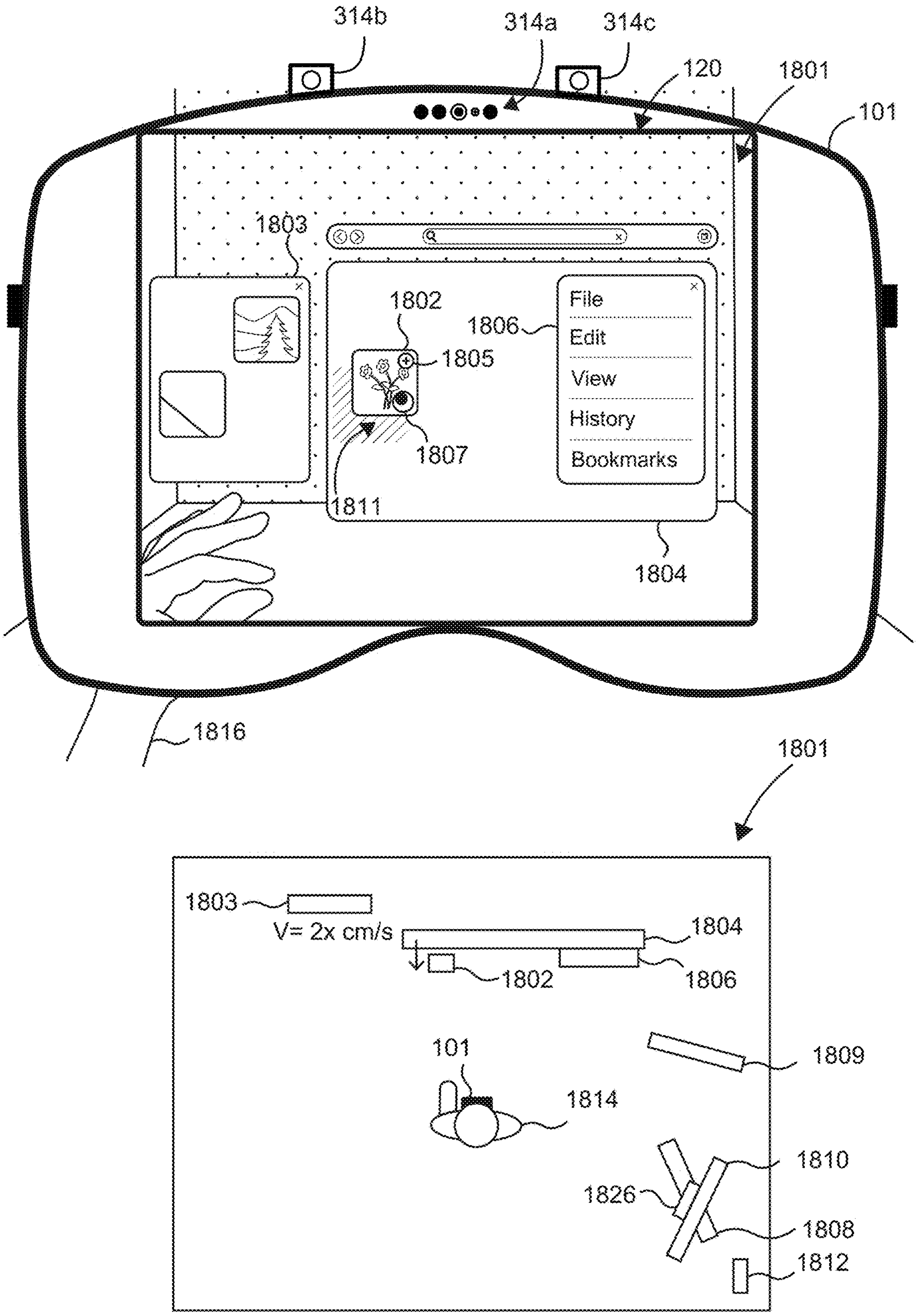

From FIG. 18F to FIG. 18G, computer system 101 moves virtual object 1802 relative to virtual object 1804. In FIG. 18G, computer system 101 detects movement of hand 1816 such as movement of a maintained air pinch gesture toward the body of user 1814, and in response "pulls" virtual object 1802 away from virtual object 1804. In some embodiments, the computer system 101 changes a position, orientation, and/or one or more visual properties of virtual shadow 1811 in response to detecting inputs moving the virtual object 1802 relative to virtual object 1804. For example, the computer system 101 from FIG. 18F to FIG. 18G updates a position and/or scale of virtual shadow 1811 leftward, downward, and relatively larger in FIG. 18G. In FIG. 18G, the appearance of virtual shadow 1811 optionally is similar to a moving a simulated light source from a position along an axis normal to the virtual object 1802, to a position relatively to the right of the normal axis, and upwards toward the ceiling of three-dimensional environment 1801 and relative to the viewpoint of user 1814.

In some embodiments, the computer system 101 changes one or more dimensions of the virtual object 1802 during the movement of virtual object 1802. For example, the computer system 101 optionally increases a relative width of the virtual object 1802 (e.g., scaling downward along a lateral dimension parallel to a width of the virtual object 1802) from FIG. 18B to FIG. 18C, to optionally preserve a perceived scale (e.g., width) of the virtual object relative to the viewpoint of the user. Accordingly, a relative depth (e.g., distance along an axis extending from the center of the user's viewpoint, parallel to a floor of the three-dimensional environment 801) is optionally a factor in determining a dynamic scale of the virtual object 1802. It is understood that the scaling optionally occurs proportionally, inverse proportionally, or otherwise based upon the relative depth between a virtual object and the viewpoint of the user. Additionally or alternatively, the scaling optionally occurs along one or more dimensions (e.g., a height and a width) of a moving virtual objects, optionally by a similar or same amount of scaling, thus optionally preserving an aspect ratio of the virtual object relative to the viewpoint of the user 1814.

In some embodiments, computer system 101 forgoes snapping of the virtual object 1802 to another virtual object when movement of the virtual object 1802 exceeds a threshold, simulated speed. For example, from FIG. 18E to FIG. 18F, the computer system 101 moves virtual object 1802 at a first speed (e.g., "x cm/s"). As an alternative example, from FIG. 18E to FIG. 18G, computer system 101 moves the virtual object 1802 at a second speed, greater than the first speed (e.g., "2x cm/s"). In some embodiments, the computer system 101 snaps the virtual object moving as illustrated from FIG. 18E to FIG. 18F, including display of the virtual shadow 1811 in FIG. 1811 when the speed of the virtual object is relatively slower than as when the virtual object "passes through" without snapping. In some embodiments, the computer system 101 forgoes the snapping of the virtual object 1802 moving as illustrated from FIG. 18E to FIG. 18G. As an example, the computer system 101 does not offer a simulated resistance, does not display the virtual shadow, and/or does not move the virtual object 1802 toward the snapped position relative to virtual object 1804 during movement of virtual object 1802 at the second speed. It is understood that the relative different in speeds and/or thresholds dictating whether the virtual object 1802 snaps or passes through without snapping is different from the described thresholds (e.g., "x cm/s" and "2x cm/s" merely convey a difference in relative speeds, rather than a strict mathematical relationship).

Figure 18H:
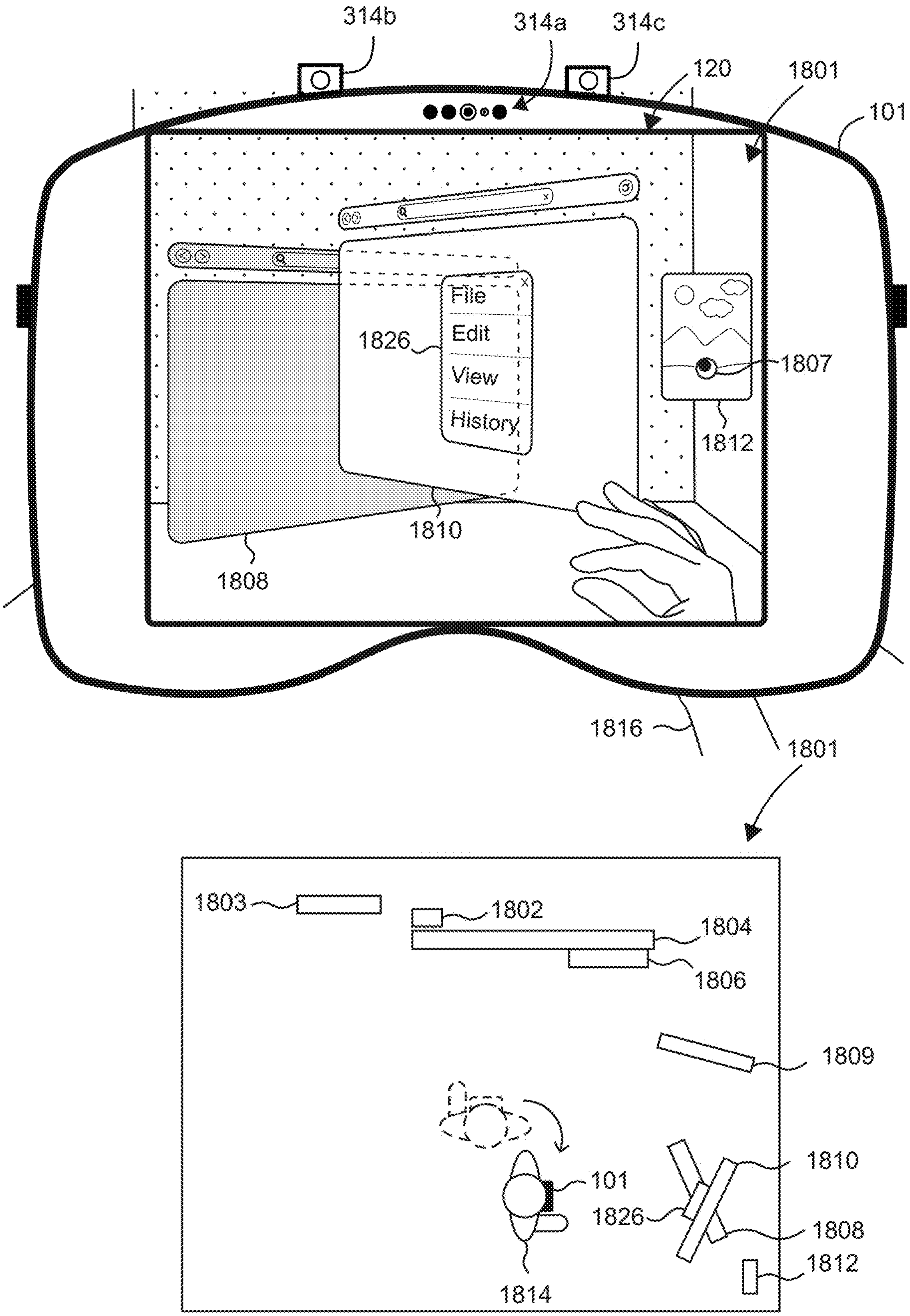

In FIG. 18H, the viewpoint of user 1814 relative to three-dimensional environment 1801 is different from as illustrated from FIG. 18A-18G. For example, in response to detecting a change in viewpoint (e.g., from FIG. 18G to FIG. 18H), computer system 101 displays virtual object 1810 and virtual object 1808, which are virtual windows having one or more characteristics similar to or the same as virtual object 1804. Virtual objects 1808 and 1810 as illustrated in the overhead view of three-dimensional environment 1801 virtually intersect, partially occupying a same region of the three-dimensional environment as described further with reference to method 1900. In FIG. 18H, virtual object 1810 is displayed with a visual appearance including a level of opacity to emphasize that its active focus state corresponding to a primary state of focus, in contrast to virtual object 1808 which is displayed with a different visual appearance (e.g., including a different, relatively lower level of opacity) to indicate its inactive focus state corresponding to a secondary state of focus. In some embodiments, the computer system 101 ceases display of virtual object 1808 at positions relative to the viewpoint of user 1814 that are subject to a simulated obscuring. For example, as described further at least with reference to methods 800, 900, and/or 1900, the computer system 101 displays the portions of the virtual object 1808 that would otherwise visually obscure the virtual object 1810 with a low opacity level or a completely transparent appearance, as indicated by the dashed outline of virtual object 1808 that are overlap with a body of virtual object 1810 in FIG. 18H.

In FIG. 18H, menu 1826 is included overlaying the virtual object 1810. In some embodiments, the menu 1826 includes a user interface to control one or more settings associated with virtual object 1810. Additionally or alternatively, menu 1826 optionally includes one or more selectable options (e.g., "File," "edit," "view," "history") that are respectively selectable to initiate display of additional user interface(s) and/or virtual content. In some embodiments, a virtual object such as menu 1826 is displayed having a spatial relationship indicating its association with an underlying virtual object such as virtual object 1810. For example, menu 1826 is displayed intersecting, parallel to, and/or virtually affixed to a front surface of the virtual object 1810, as illustrated in FIG. 18H. In some embodiments, menu 1826 is displayed overlaying and tangent to a surface of virtual object 1810, intersecting (e.g., in a depth direction) with virtual object 1810, and/or extruded a predetermined distance (e.g., 0.001, 0.0025, 0.005, 0.01, 0.025, 0.05, 0.1, 0.15, or 0.25 m) from the front surface of virtual object 1810.

Figure 18I:
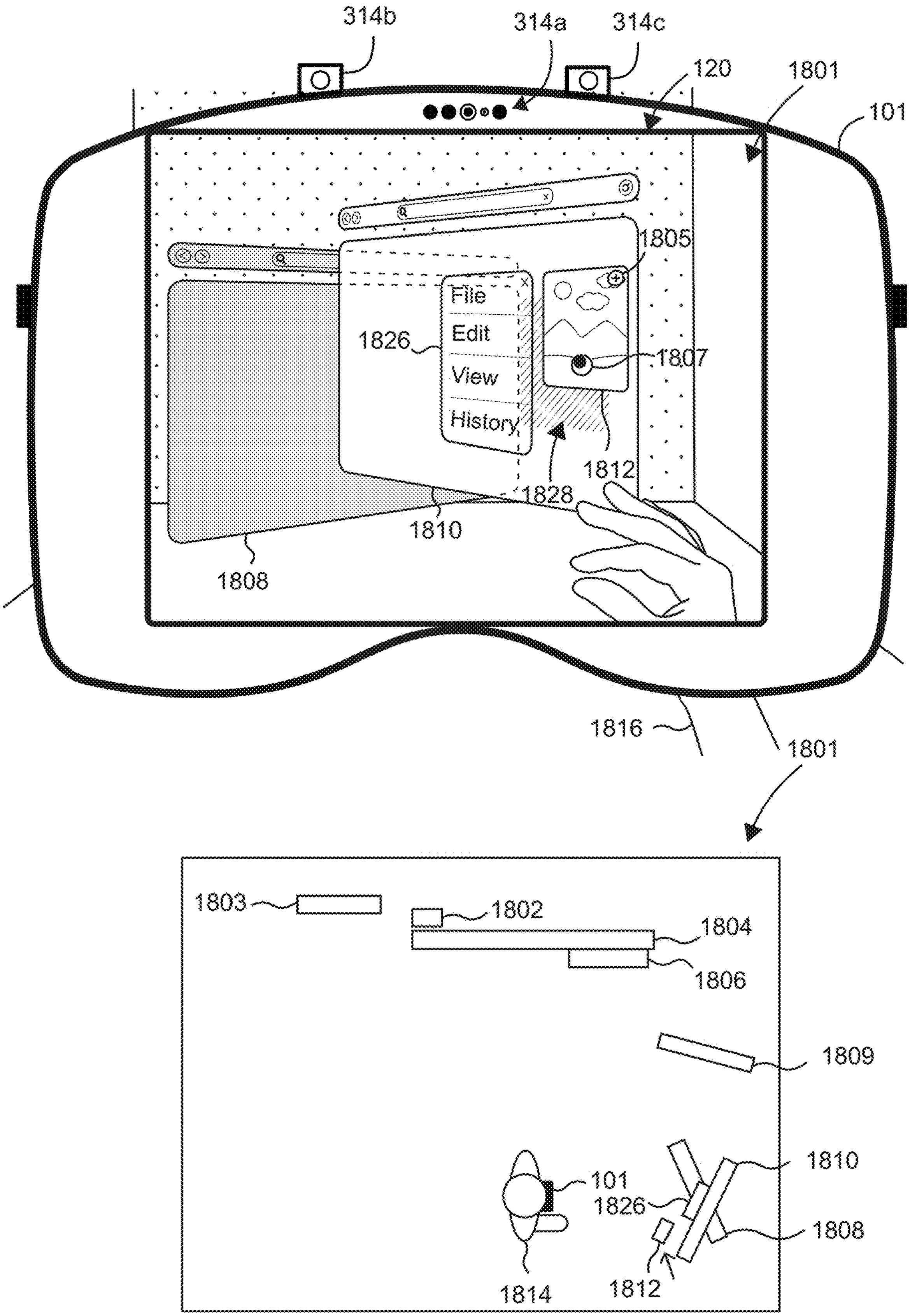

In FIG. 18H, computer system 101 displays virtual object 1812—having characteristics similar to or the same as virtual object 1802—that is a target of user attention 1807. In FIG. 18H, computer system 101 detects an input including hand 1816 forming an air pinch gesture initiating movement of virtual object 1812. In FIG. 18I, computer system 101 moves the virtual object 1812 in accordance with user input, such as in response to movement of the air gesture and/or while the air gesture detected in FIG. 18H.

Figure 18J:
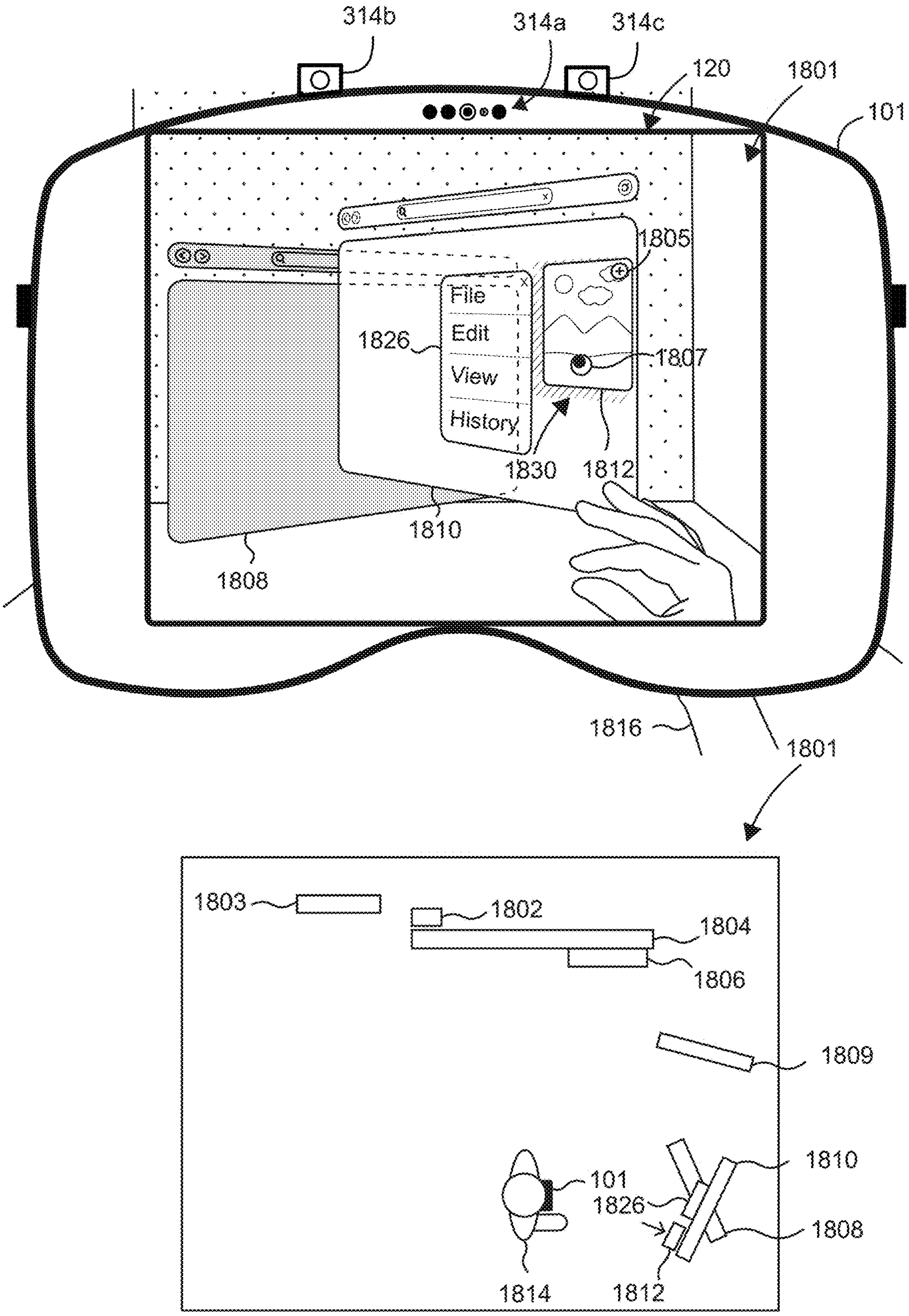

In FIG. 18I, virtual object 1812 is moved to within the threshold distance of virtual object 1810, such as the threshold distance of the front of virtual object 1810 and/or within a threshold distance of any portion of virtual object 1810. In response to the movement, computer system 101 begins to "snap" the virtual object 1812 to correspond to the front surface of virtual object 1810, including rotating and/or translating virtual object 1812. Accordingly, in FIG. 18I, computer system 101 displays virtual object 1812 parallel to virtual object 1810, and initiates display of the virtual shadow 1828 and the "adding" visual indication 1805. In FIG. 18I, the dimensions of virtual shadow 1828 corresponds to the orientation of the surface of virtual object 1810 relative to the viewpoint of the user and parallel to the surface of virtual object 1810, similar to a rotated view of the virtual shadow 1811 described previously. It can be appreciated that the simulated orientation of the virtual shadow optionally is different than in FIG. 18I, such as if cast by a virtual light source oriented parallel to an axis extending from the viewpoint of the user, parallel to the floor of the three-dimensional environment 1801, and normal to the viewpoint of the user relative to the overhead view of three-dimensional environment 1801. In FIG. 18J, computer system 101 begins to snap the virtual object 1812 toward virtual object 1810, and accordingly changes the position of the simulated light source casting virtual shadow 1830, consequentially changing the visual appearance of virtual shadow 1830 overlaying virtual object 1810.

In some embodiments, computer system 101 changes a scale of a virtual object snapping toward another virtual object. For example, from FIG. 18I to FIG. 18J, computer system 101 initiates snapping of virtual object 1812 moving within the threshold distance (e.g., snapping threshold distance) of virtual object 1810. To visually indicate the initiation of the snapping, computer system 101 display virtual object 1812 increases the scale of virtual object 1812 from FIG. 18I to FIG. 18J, by a magnitude in one or more dimensions that is greater than, and/or separate from the dynamic scaling of the virtual object 1812 described herein. In some embodiments, the scaling is animated, and/or is a function of the distance between virtual object 1812 and the snapping location relative to virtual object 1810. As described further with reference to FIGS. 18M to 18N, computer system 101 optionally snaps virtual object 1812 toward virtual object 1808; accordingly, computer system 101 increases the scale of virtual object 1812 due to such snapping, similar as described with reference to FIG. 18I to FIG. 18J. In some embodiments, in response to movement of the virtual object that is at the snapping location relative to a respective virtual object, computer system 101 progressively scales down the moving virtual object in response to movement away from the snapping location. In some embodiments, the scaling down of the virtual object opposes the scaling up of the virtual object moving toward another virtual object to the snapping location, in magnitude and/or direction of the scaling.

Figure 18K:
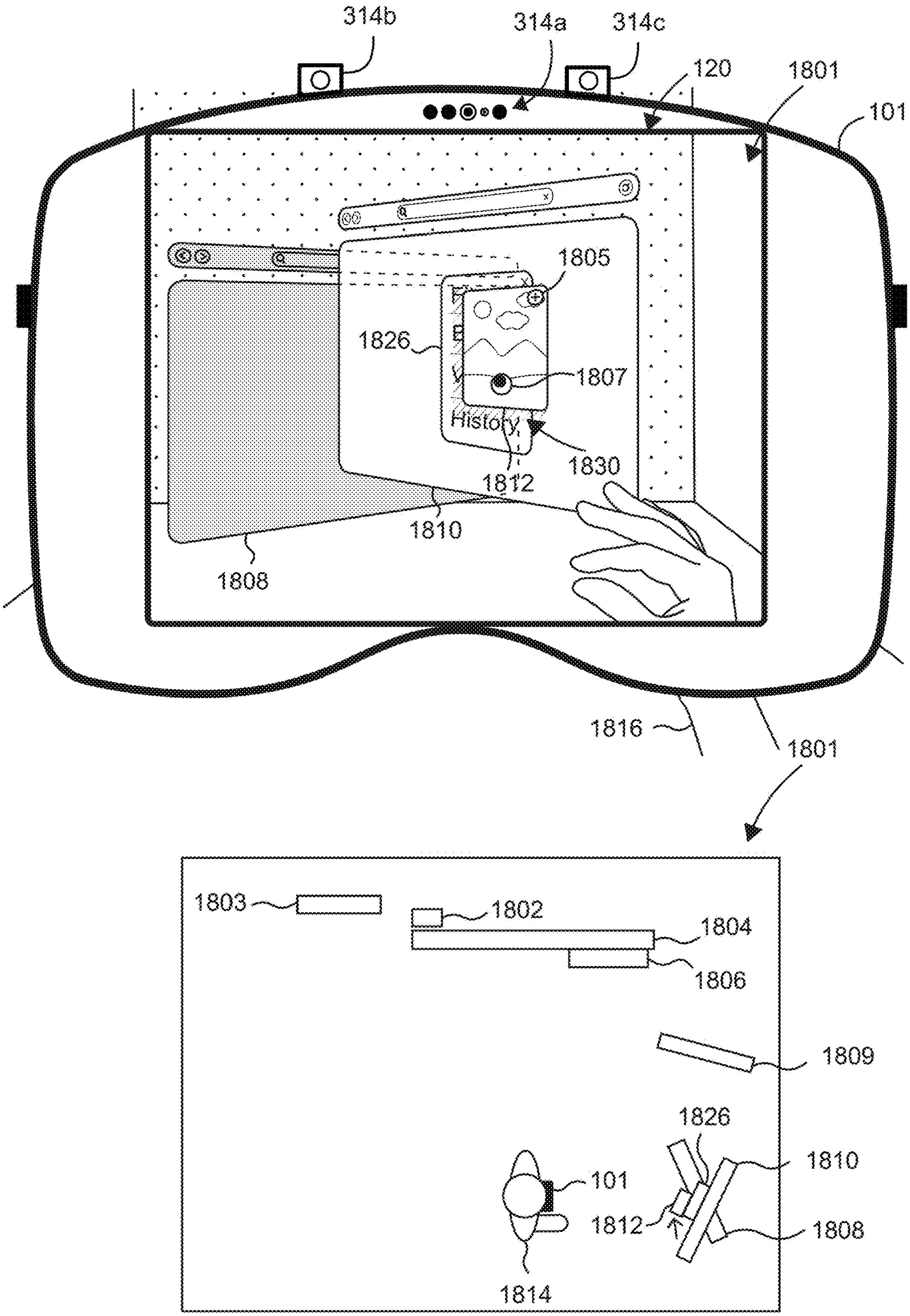

In FIG. 18K, computer system 101 displays virtual object 1812 overlaying menu 1826. For example, in response to detecting user input including the air pinch maintained by 1816 from FIG. 18J to FIG. 18K, the computer system 101 moves the virtual object 1812, maintaining its orientation relative to virtual object 1810. In some embodiments, computer system 101 offsets a position or location of a virtual object moving within a threshold distance of a second virtual object in accordance with a determination that a third virtual object is intermediate to the first and the second virtual object. For example, in FIG. 18J, computer system 101 detects a request to translate the location of virtual object 1812 parallel to the surface of virtual object 1810. From FIG. 18J to FIG. 18K, computer system 101 determines that the translation of virtual object 1812 will cause virtual object 1812 to be within a threshold distance (e.g., in a depth direction) of the menu 1826. Accordingly, computer system 101 optionally offsets (e.g., in the depth direction) virtual object 1812 from menu 1826 in FIG. 18K. For example, the computer system 101 maintains a depth between virtual object 1812 and respective virtual content, such as a depth relative to virtual object 1810 in FIG. 18J and a depth relative to menu 1826 in FIG. 18K, thus moving the virtual object 1812 even further away from virtual object 1810 in FIG. 18K. Were it not for the presence of menu 1826, computer system 101 optionally translates the virtual object 1812 in FIG. 18K, maintaining a same depth relative to virtual object in FIG. 18J.

Figure 18L:
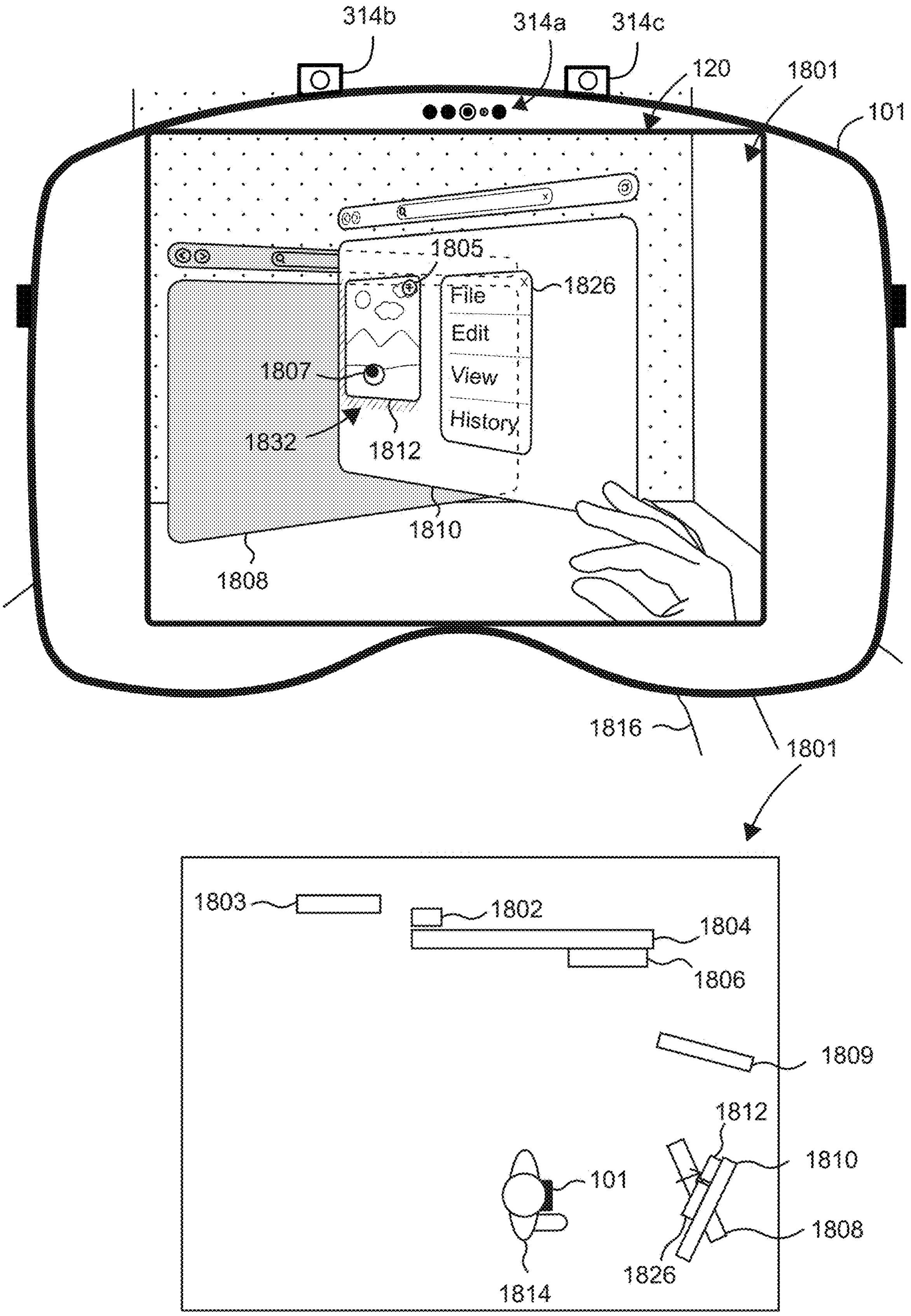

In FIG. 18L, computer system 101 displays virtual object 1812 overlaying another portion of virtual object 1810, not overlapping (e.g., in a depth direction) with menu 1826. For example, the depth between virtual object 1812 and the surface of virtual object 1810 optionally is the same in FIG. 18J and FIG. 18L. The translation optionally occurs in response to detecting a request to move the virtual object 1812 parallel to the surface of virtual object 1810 and/or menu 1826, not including a request to move the virtual object 1812 toward the virtual object 1810 (e.g., or away from the virtual object 1810). Similar to as described with reference to FIG. 18J, computer system 101 optionally maintains the virtual object 1812 "snapped" to a surface of proximate virtual content. In the embodiment illustrated in FIG. 18L, virtual object 1812 is snapped to a depth relative to virtual object 1810 rather than menu 1826.

Figure 18M:
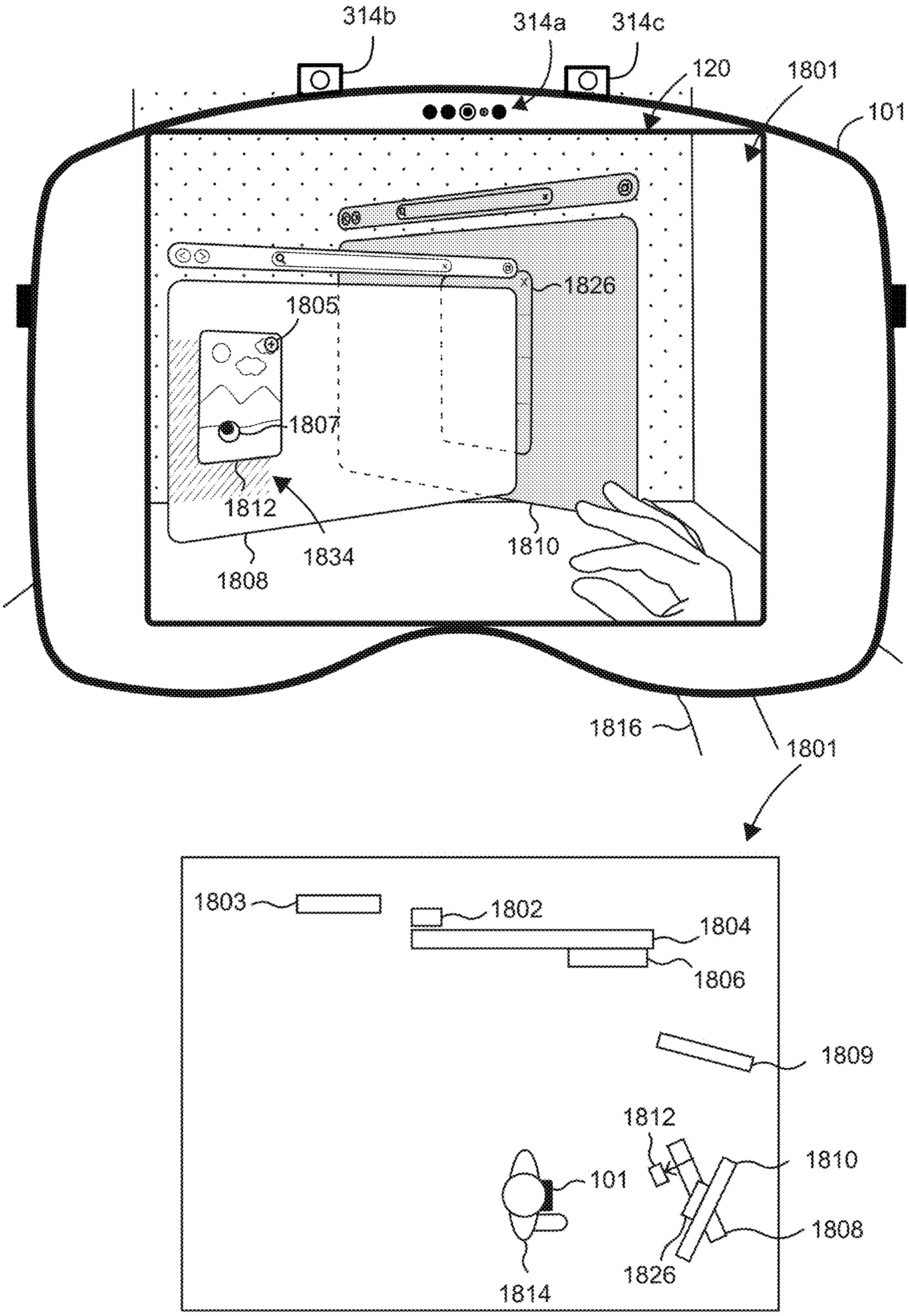
Figure 18N:
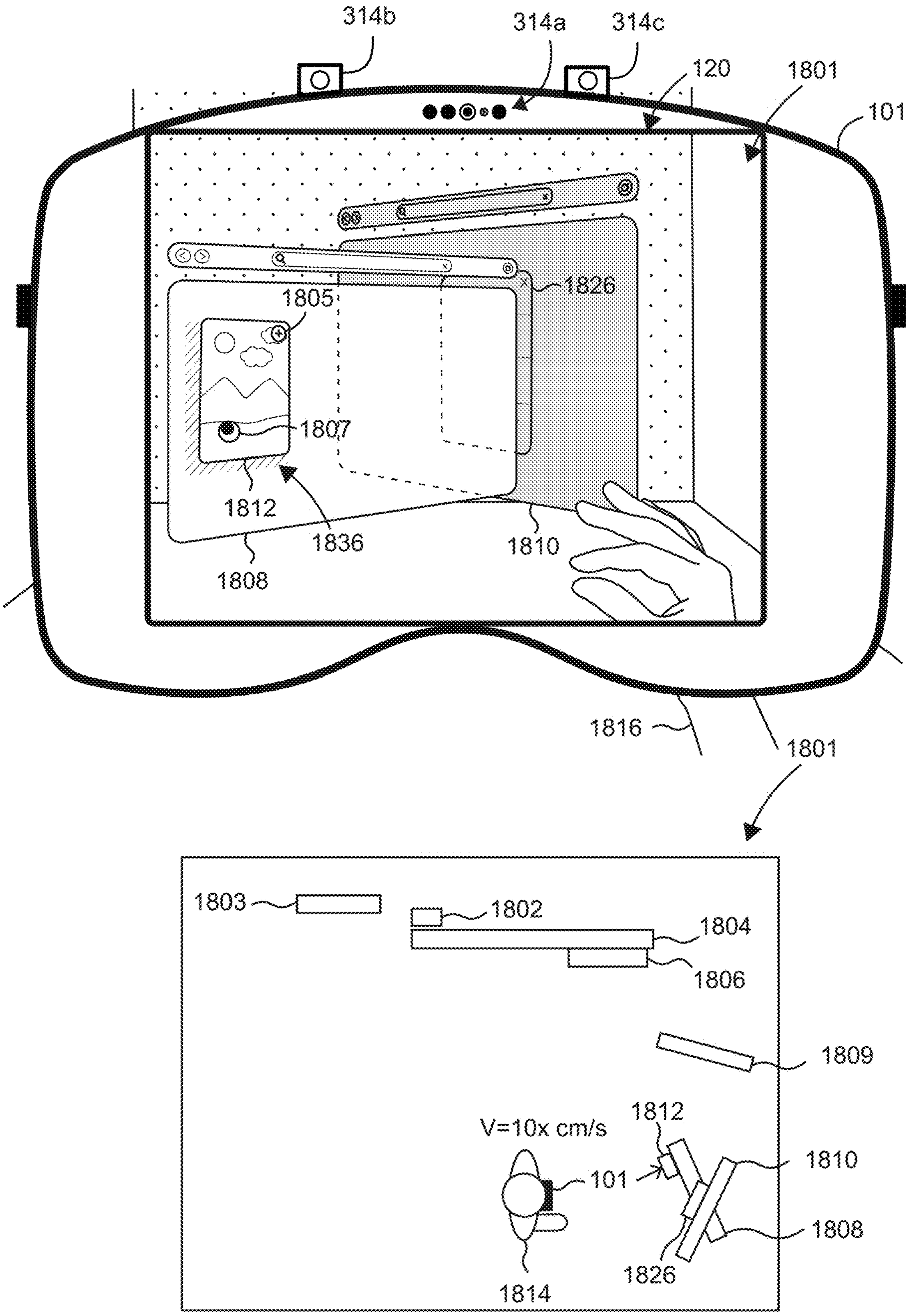

From FIG. 18L to FIG. 18M, computer system 101 changes a focus state of virtual objects 1808 and 1810. In some embodiments, computer system 101 changes a focus state of a respective virtual object in response to moving a virtual object to within a threshold distance of the respective virtual object. For example, in FIG. 18N, computer system 101 displays virtual object 1808 with the active focus state, and virtual object 1810 with the inactive focus state, thus providing full visibility of virtual object 1808 and a reduced visibility (e.g., opacity) of portions of virtual object 1810 presenting a simulated obscuring of virtual object 1808. For example, the dashed outline of the virtual object 1810 and menu 1826 in FIG. 18M indicate that such virtual content is displayed with a low level of opacity, or completely transparent relative to the three-dimensional environment 1801. Additionally, virtual object 1810 is optionally displayed with a desaturated appearance to further indicate the inactive focus state in FIG. 18M. In FIG. 18N computer system 101 further moves the virtual object 1812 to overlay virtual object 1808. Accordingly, computer system 101 in FIG. 18N displays the virtual shadow 1834 as though a simulated light source were pointed toward the virtual object 1812 casting a shadow onto virtual object 1808 (e.g., offset with a drop shadow, indicating that the virtual object 1812 can be added and/or is snapping to virtual object 1808).

From FIG. 18M to FIG. 18N, computer system 101 moves virtual object 1812 closer toward virtual object 1808. For example, virtual object 1812 snaps toward a surface of virtual object 1808 even when the hand of 1816 remains static from FIG. 18M to FIG. 18N, or in response to detecting a ceasing of the air gesture that was previously maintained by hand 1816, moving the virtual object 1812. In some embodiments, the snapping occurs when the computer system 101 detects that the hand 1816 maintains its position relative to the three-dimensional environment 1801 (e.g., despite the maintenance of position requesting maintenance of a position of virtual object 1812), because the virtual object 1812 is within the threshold "snapping" distance of virtual object 1808 in FIGS. 18M and 18N.

In some embodiments, computer system 101 detects an input attempting to move (e.g., push) virtual object 1812 through virtual object 1808. For example, computer system 101 detects hand 1816 maintaining an air gesture moving normal to the surface of virtual object 1808 with a speed (e.g., "10x cm/s") in FIG. 18N. In some embodiments, the computer system 101 moves the virtual object 1812 in response to such a pushing input until the virtual object 1812 is within a second threshold distance (e.g., intersecting, or within 0.001, 0.0025, 0.005, 0.01, 0.025, 0.05, 0.1, 0.15, or 0.25 m) of virtual object 1808. While the virtual object 1812 is within the second threshold distance of virtual object 1808 as illustrated in FIG. 18N, computer system 101 optionally forgoes further movement of the virtual object 1812 along the depth direction, further toward and/or through the surface of virtual object 1808. Thus, the computer system 101 optionally terminates movement in a depth direction of virtual object 1812 when the virtual object 1812 is too close to the virtual object 1808.

Figure 18O:
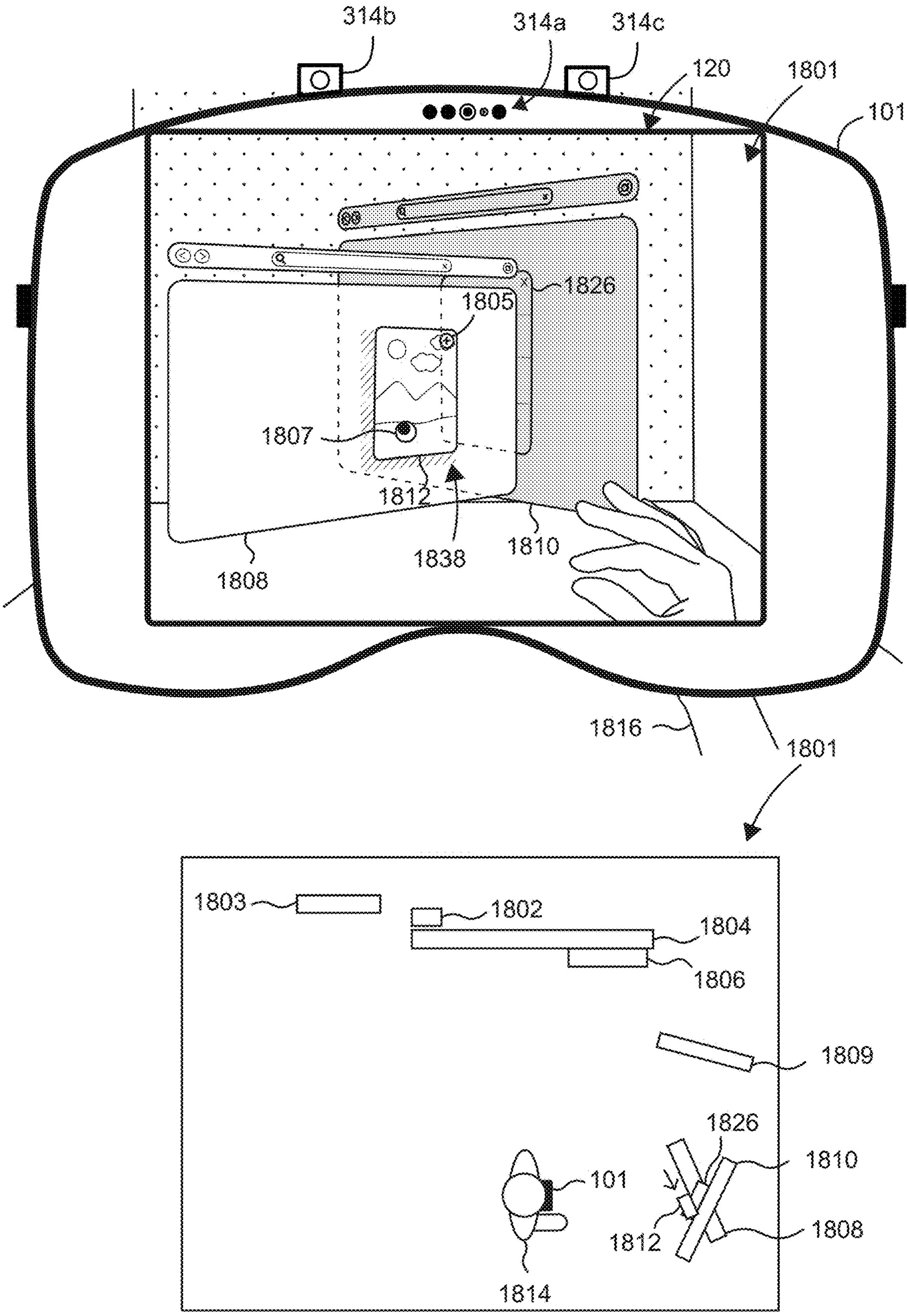

From FIG. 18N to FIG. 18O, computer system 101 detects user input including movement of the air pinch performed by hand 1816 requesting movement of the virtual object 1812 along the surface of virtual object 1808. In FIG. 18O, computer system 101 displays the virtual object 1812 translated—optionally without rotation—parallel to the surface of virtual object 1808 in response to the aforementioned movement input. Additionally, even if movement of the hand 1816 requests movement of the virtual object in a depth direction away from the surface of virtual object 1808, computer system 101 maintains a depth between the virtual object 1812 and virtual object 1808 due to the ongoing snapping.

In FIG. 18O, computer system 101 does not snap virtual object 1812 toward virtual object 1810, despite the relative proximity between virtual object 1810 and 1812. In some embodiments, the computer system 101 does not snap virtual object 1812 to virtual content that satisfies one or more criteria. For example, the computer system 101 does not snap virtual object 1812 toward virtual object 1810 in FIG. 18O because the portions of the virtual object 1810 proximate to virtual object 1812 are displayed with a level of visual prominence less than a threshold level (e.g., 0, 5, 10, 20, 30, 40, 50, or 60% opacity). Consequentially, the computer system 101 forgoes snapping of the virtual object 1812. In contrast, were virtual object 1810 displayed with the active focus state—and the portions of virtual object 1810 proximate to virtual object 1812 displayed with a level of visual prominence greater than the threshold level—the computer system 101 optionally snaps the virtual object 1812 toward the virtual object 1810.

Figure 18P:
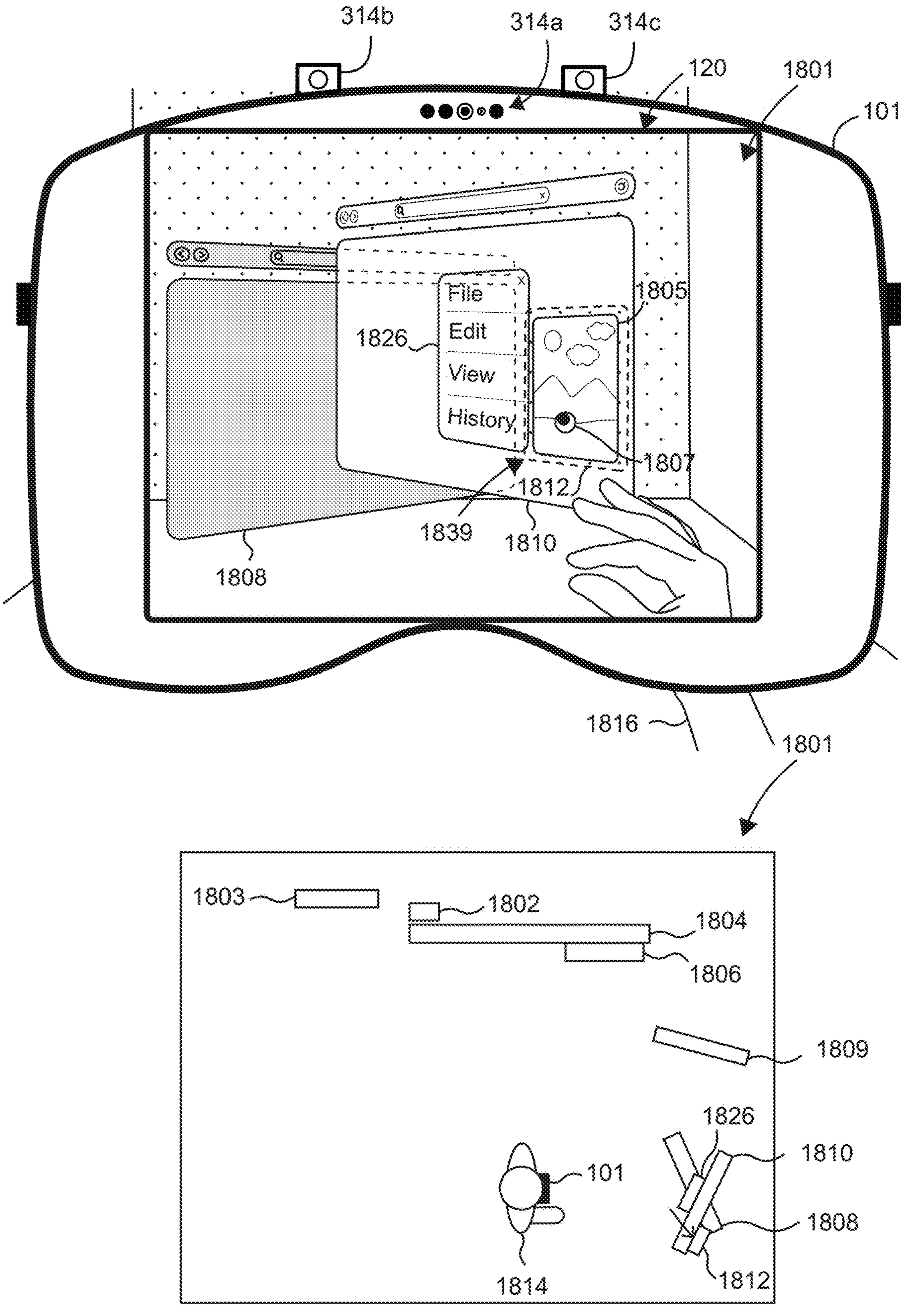

From FIG. 18O to FIG. 18P, computer system 101 detects movement of the virtual object 1812 away from virtual object 1808, and toward virtual object 1810. For example, the computer system 101 detects an input moving the virtual object 1812 behind the virtual object 1810. In some embodiments, in accordance with a determination that the virtual object is brought within a threshold distance of an object displayed with the inactive focus state, the computer system 101 changes the focus state of the proximate object. For example, from FIG. 18O to FIG. 18P, computer system 101 increases the visual prominence of virtual object 1810, and decreases the visual prominence of virtual object 1808, to arrange focus states of the respective objects similar to as described with reference to FIG. 18A. In FIG. 18P, the computer system 101 displays a region 1839 with a reduced level of visual prominence (e.g., opacity, brightness, saturation, and other visual properties described herein) similar to as described with reference to region 1818 with reference to FIG. 18A. Thus, in FIG. 18P, the computer system 101 again presents visibility of virtual object 1812 that would otherwise be obscured by virtual object 1810.

Figure 18Q:
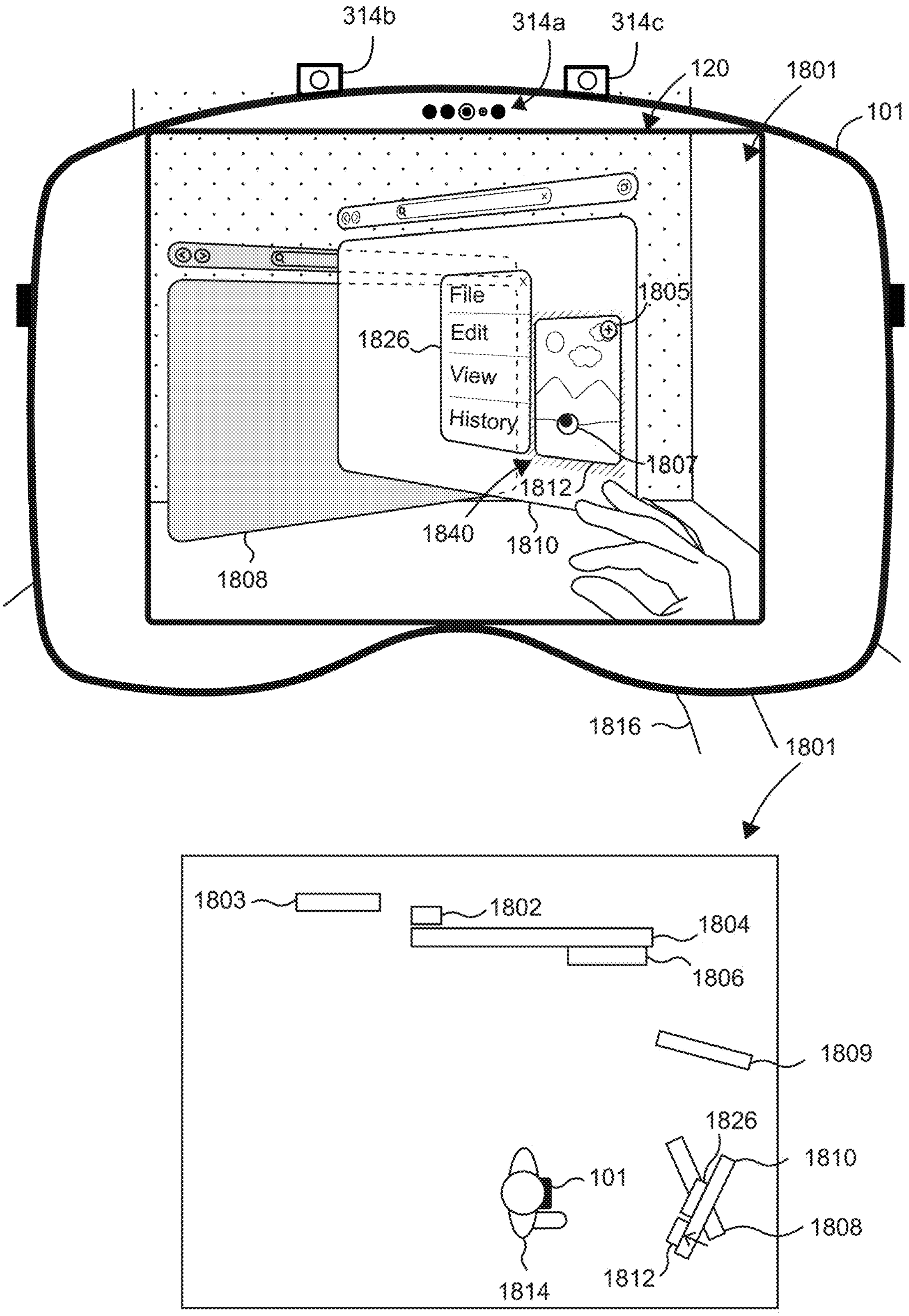

From FIG. 18P to FIG. 18Q, computer system 101 detects one or more inputs moving the virtual object 1812 toward and/or through the front of the virtual object 1810, and optionally moves the virtual object 1812 to a distance (e.g., a predetermined and/or snapping distance described further herein) relative to a surface of virtual object 1810. Although the computer system 101 forwent snapping of the virtual object 1812 relative to the portion of virtual object 1810 displayed with the reduced level of visual prominence—as described with reference to FIG. 18O—the computer system 101 performs the snapping of virtual object 1812 relative to the portion(s) of virtual object 1810 displayed with a level of visual prominence greater than a threshold level of visual prominence from FIG. 18P to FIG. 18Q. As an example, the computer system 101 would optionally snap virtual object 1812 to virtual object 1810 as illustrated in FIG. 18Q, while virtual object 1810 is displayed having the inactive state illustrated in FIG. 18O, in response to moving the virtual object 1812 to within the snapping threshold distance of the portion of virtual object 1810 displayed with a desaturated appearance. In response to such snapping, the computer system 101 optionally displays the arrangement of virtual content as illustrated in FIG. 18Q.

Figure 18R:
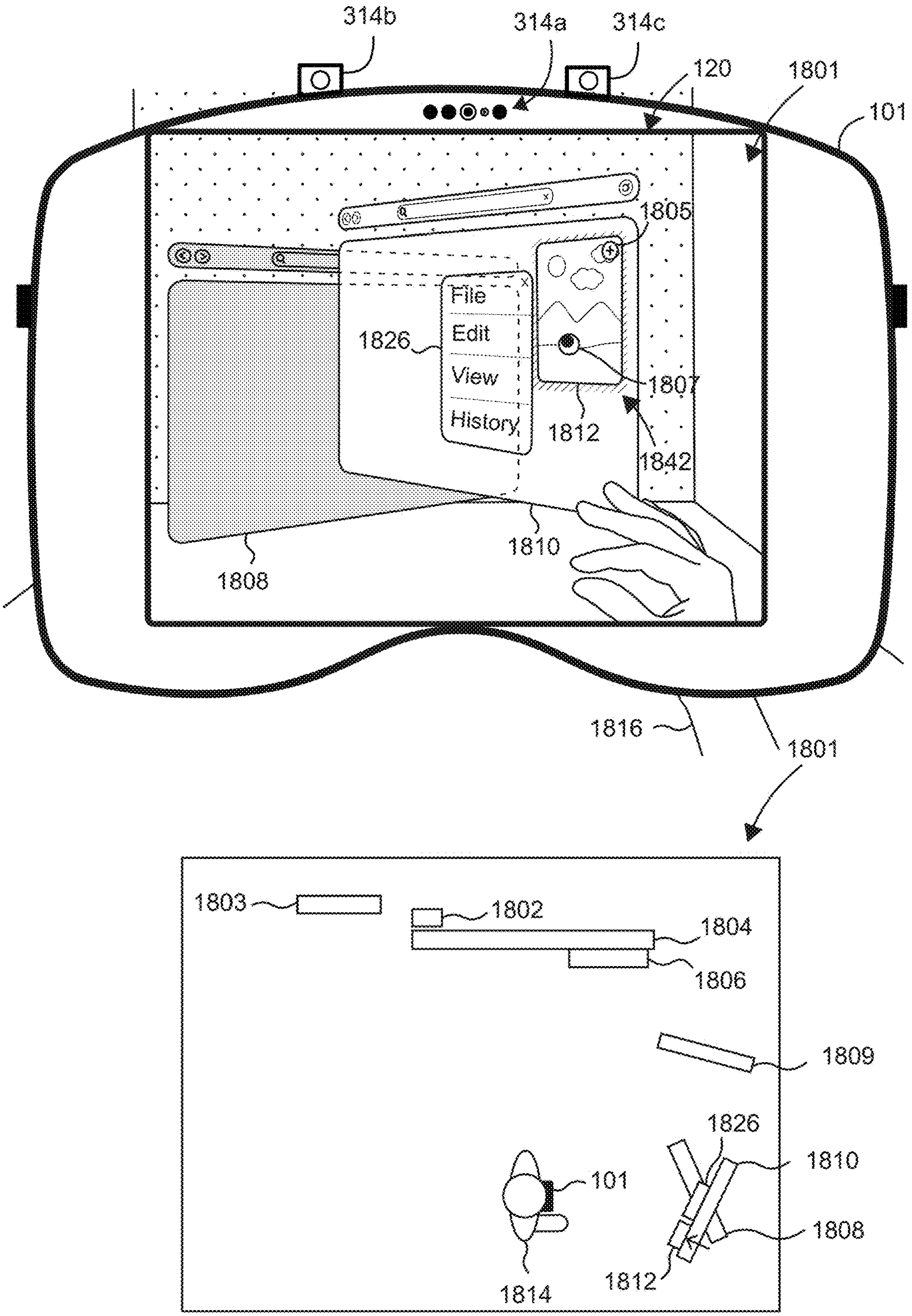

From FIG. 18Q to FIG. 18R, the computer system 101 detects one or more inputs moving virtual object 1812 relative to the surface of virtual object 1810, requesting translation along a vertical dimension of the surface relative to the ground of three-dimensional environment 1801. In response to such one or more inputs, computer system 101 moves the virtual object 1812 to its position illustrated in FIG. 18R, while maintaining a relative depth between the virtual object 1812 and virtual object 1810. In some embodiments, the computer system 101 ignores movement inputs away from a snapping, container virtual object. For example, the computer system optionally ignores some movement of hand 1816 moving away from the surface of virtual object 1810 while moving virtual object 1812 due to "snapping" attraction, thus maintaining the depth between virtual object 1810 and 1812. In some embodiments, however, the movement away from the virtual object 1810 satisfies one or more criteria (e.g., a threshold requested speed and/or distance of the virtual object 1812), and the computer system moves the virtual object 1812 away from the virtual object 1810.

Figure 18S:
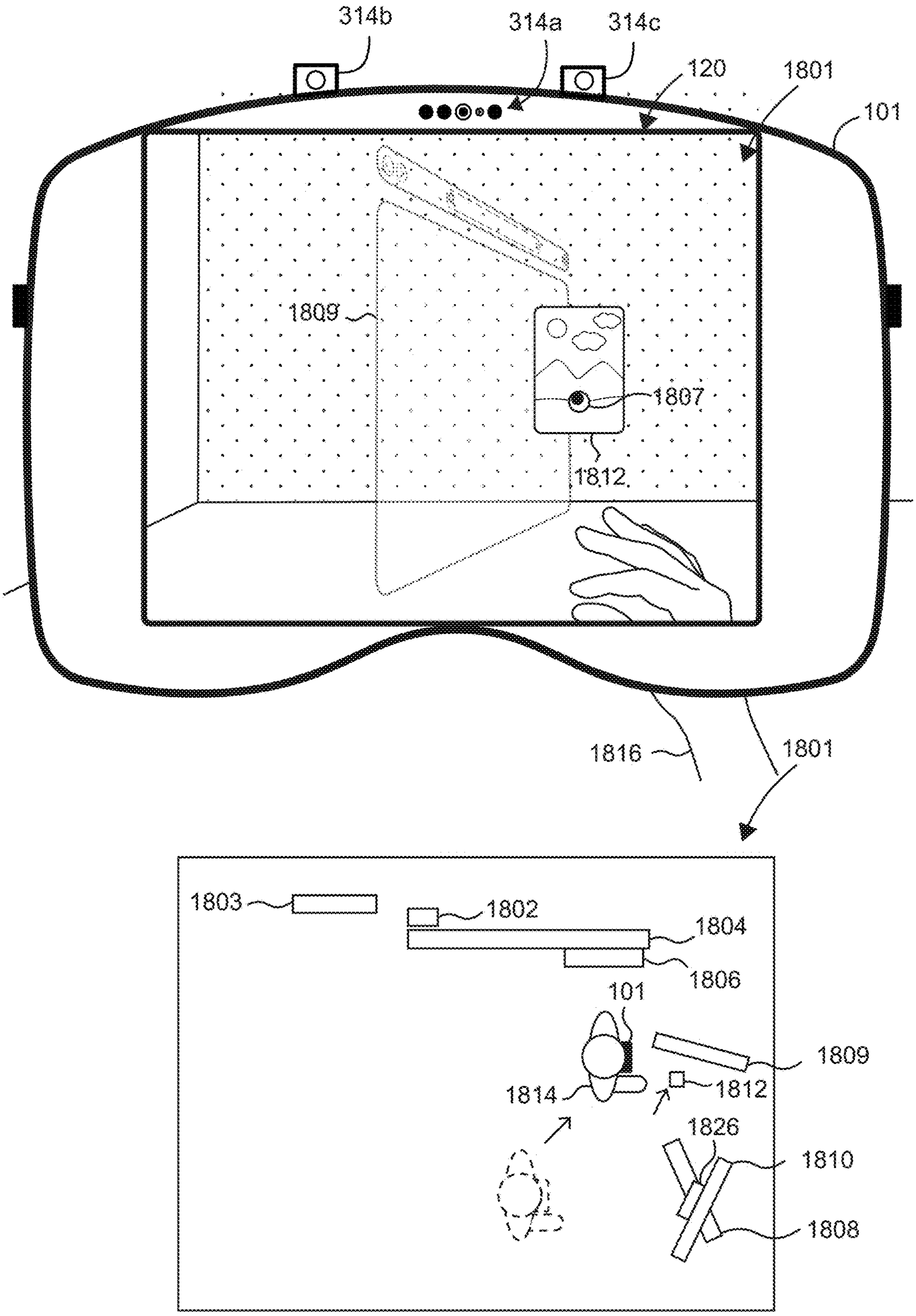
Figure 18T:
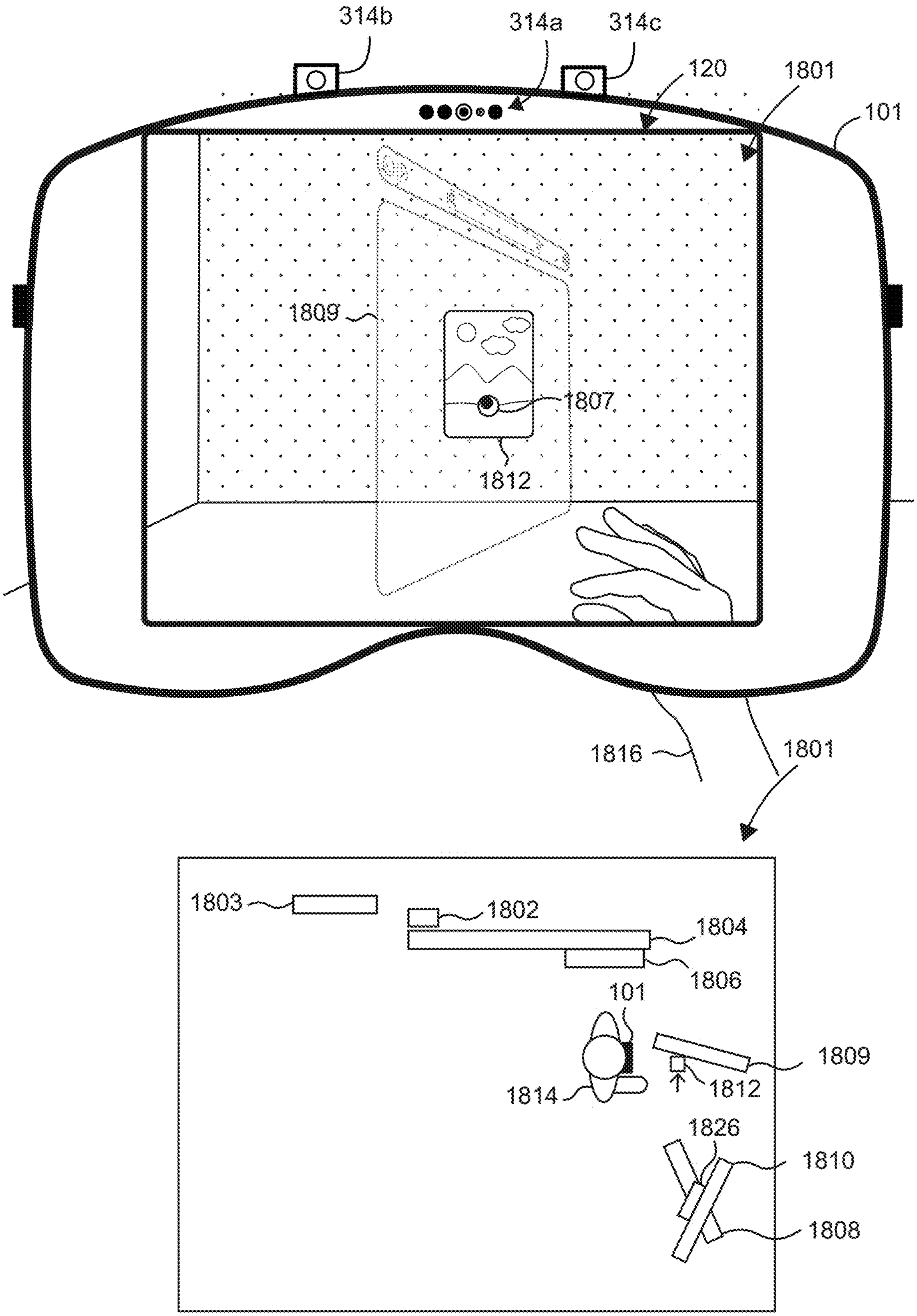
Figure 19:
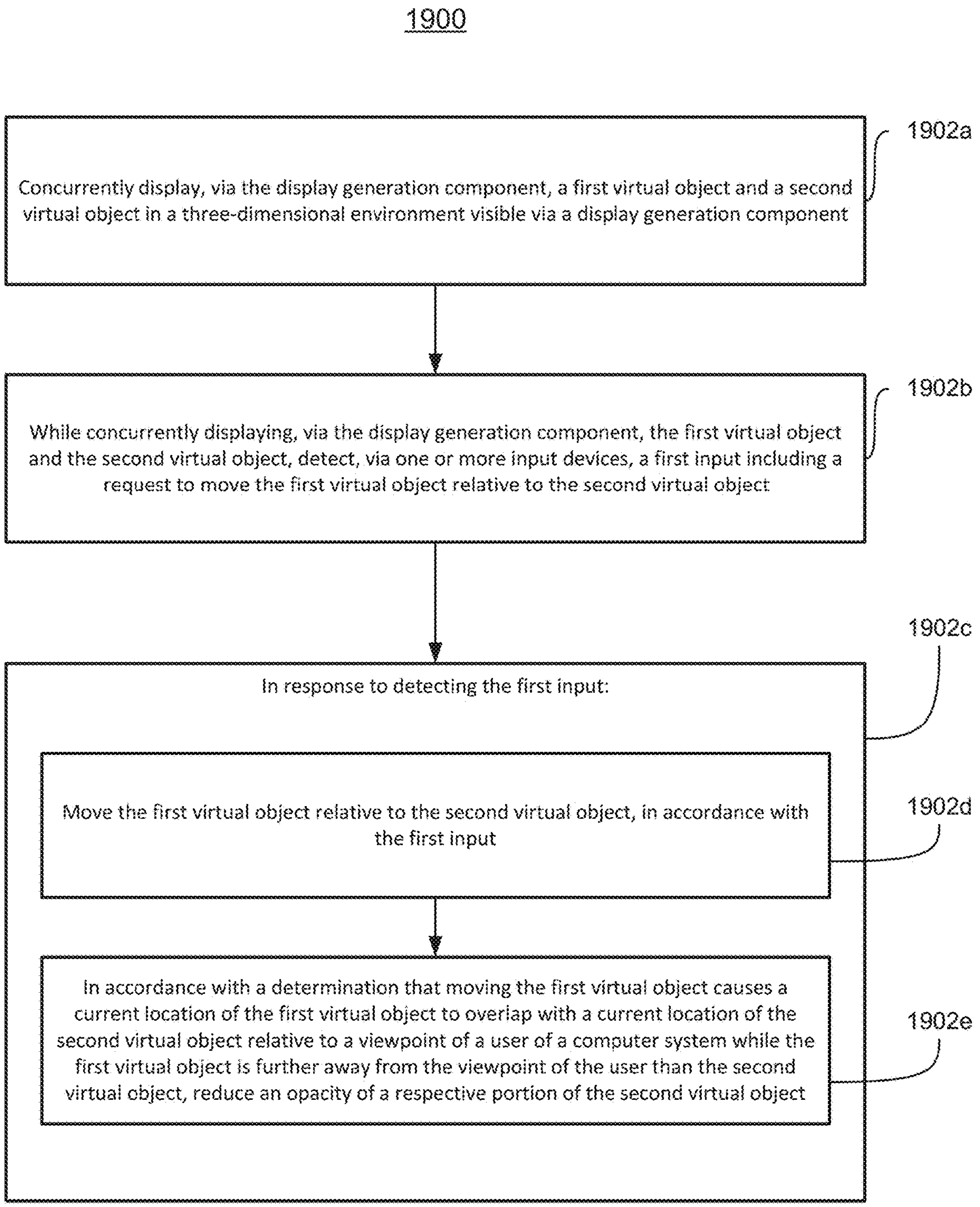
FIG. 19 is a flowchart illustrating a method of changing a visual prominence of a virtual object to resolve a simulated overlapping with another virtual object in accordance with some embodiments.

FIGS. 18S-18T illustrate embodiments in which the viewpoint of the computer system is oriented at a relatively extreme viewing angle relative to a virtual object, and illustrate snapping operations that are or are not performed relative to the virtual object. From FIG. 18R to FIG. 18S, the computer system 101 detects a change in viewpoint of the user 1814, and initiates display of virtual object 1809. As illustrated in FIG. 18S, the virtual object 1809 is displayed such that a line extending normal relative to a face of the virtual object 1809 forms an angle with a line extending from a center of the viewpoint of the user 1814. The angle in FIG. 18S is greater than a threshold angle (e.g., 5, 10, 20, 30, 40, 50, 60, 70, or 80 degrees) that the computer system 101 determines is suitable for viewing the virtual object 1809; accordingly, computer system 101 decreases the level of visual prominence and/or opacity of virtual object 1809 in FIG. 18S. In some embodiments, virtual object 1809 is displayed with a placeholder border, indicating the general presence of the virtual object 1809 but lacking content included in virtual object 1809 (e.g., a search bar, a menu window, and/or media included in a web browsing user interface).

In some embodiments, the virtual content that is typically visible and included in the virtual object 1809 is no longer displayed, and a placeholder such as a border of the virtual object 1809 is displayed when viewing the virtual object from such extreme angles. In some embodiments, the computer system 101 does not snap an object toward the virtual object 1809 displayed with the reduced level of opacity. For example, from FIG. 18S to FIG. 18T, the computer system 101 detects one or more inputs provided by the hand 1816 moving the virtual object 1812 toward the virtual object 1809. In FIG. 18T, computer system 101 forgoes snapping of virtual object 1812 to virtual object 1809 in response to the inputs moving the virtual object 1812, due to the relatively extreme viewing angle between the user's viewpoint and virtual object 1809.

FIG. 19 is a flowchart illustrating an exemplary method 1900 of changing a visual prominence of a virtual object to resolve a simulated overlapping with another virtual object. In some embodiments, the method 1900 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, and/or a projector) and one or more cameras (e.g., a camera (e.g., color sensors, infrared sensors, and other depth-sensing cameras) that points downward at a user's hand or a camera that points forward from the user's head). In some embodiments, the method 1900 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1900 are, optionally, combined and/or the order of some operations is, optionally, changed.

In some embodiments, a method 1900 is performed at a computer system in communication with one or more input devices and a display generation component, such as computer system 101 in communication with image sensors 314*a-c* and display generation component 120, as shown in FIG. 18A. For example, the computer system, one or more input devices, and display generation component have one or more characteristics of the computer system(s), one or more input device(s), and/or display generation component, respectively, described with reference to methods 800, 900, 1100, 1300, 1500, and/or 1700.

In some embodiments, the computer system concurrently displays (1902*a*), via the display generation component, a first virtual object and a second virtual object in a three-dimensional environment visible via the display generation component, such as virtual object 1802 and virtual object 1804 as shown in FIG. 18A. In some embodiments, the first virtual object and the second virtual object are displayed at a first location and a second location in the three-dimensional environment, respectively. In some embodiments, the first virtual object and/or the first virtual location have one or more characteristics similar to or the same as the virtual object(s) and their corresponding position(s) described with reference to methods 800, 900, 1100, 1300, 1500, and/or 1700. Additionally or alternatively, the second virtual object optionally has one or more characteristics similar to or the same as the virtual object(s) and their corresponding position(s) described with reference to methods 800, 900, 1100, 1300, 1500, and/or 1700. It is understood that virtual objects optionally are be displayed at and/or corresponding to a position within the three-dimensional environment. For example, the virtual objects optionally are be displayed as though the virtual objects were two-dimensional, nearly two-dimensional objects, and/or three-dimensional objects occupying space within the user's physical environment. In some embodiments, the virtual objects respectively correspond to any one or more of the locations where the two-dimensional, nearly two-dimensional objects, and/or three-dimensional objects are respectively displayed. In some embodiments, the three-dimensional environment has one or more characteristics similar or the same as one or more characteristics of the three-dimensional environment (s) described with reference to methods 800, 900, 1100, 1300, 1500, and/or 1700.

In some embodiments, the first virtual object at the first location is displayed with a first level of visual prominence, such as the level of visual prominence of the virtual object 1802 as shown in FIG. 18A. In some embodiments, the second virtual object displayed at the second location is displayed with a second level of visual prominence, different from the first level of visual prominence, such as the level of visual prominence of the virtual object 1804 as shown in FIG. 18A. In some embodiments, the first level of visual prominence and the second level have one or more characteristics similar to or the same as level(s) of visual prominence described with reference to methods 800, 900, 1100, 1300, 1500, and/or 1700. As described further herein, a level of visual prominence optionally includes a simulated blurring effect, a level of opacity, a simulated lighting effect, a saturation, and/or a change in brightness of a portion of a virtual object. It is understood that visual prominence as described herein is optionally different from a scale, location, and/or orientation of a virtual object (or other changes in how a virtual object is displayed merely due to movement of the virtual object and/or display of the virtual object at a different orientation and/or position relative to the viewpoint of the user). For example, changing levels of visual prominence optionally includes displaying the virtual object—and/or one or more portions of the virtual object—at a scale, location, and/or orientation relative to the three-dimensional environment, and concurrently changing one or more other visual properties of the virtual object.

In some embodiments, while concurrently displaying, via the display generation component, the first virtual object and the second virtual object, the computer system detects (1902*b*), via the one or more input devices, a first input including a request to move the first virtual object relative to the second virtual object, such as input including movement of hand 1816 as shown in FIG. 18A. For example, the first input optionally has one or more characteristics similar to or the same as the input(s) described with reference to methods 800, 900, 1100, 1300, 1500, and/or 1700. Similarly, the request to move the first virtual object relative to the second virtual object has one or more characteristics similar to or the same as those described with reference to requests and/or operations for moving a virtual object within a three-dimensional environment, described with reference to methods 800, 900, 1100, 1300, 1500, and/or 1700. For example, the first object optionally is moved closer to, away from, rotated toward, and/or rotated away from the second virtual object.

In some embodiments, in response to (and/or while) detecting the first input (1902*c*) (For example, the first input is optionally ongoing and/or maintained while the computer system detects a maintaining of a contact with a trackpad, maintaining of an air gesture (e.g., an air pinch gesture), maintaining of a selection of a button, and/or while a movement mode of the first virtual object is enabled), the computer system moves (1902*d*) the first virtual object relative to the second virtual object, in accordance with the first input, such as the movement of virtual object 1802 from FIG. 18A to FIG. 18B. In some embodiments, the first virtual object is moved to a third location from the first location. In some embodiments, the third location has one or more characteristics similar to or the same as the first location. In some embodiments, the third location is situated at a different simulated depth than the first and/or second locations relative to the viewpoint of the user. The depth is optionally a simulated depth, measured relative to a viewpoint of a user of the computer system. In some embodiments, the viewpoint and/or the user have one or more characteristics similar or the same as those described with reference to viewpoint(s) and/or user(s) in the context of methods 800, 900, 1100, 1300, 1500, and/or 1700.

In some embodiments, in accordance with a determination that moving the first virtual object causes a current location of the first virtual object to overlap with a current location of the second virtual object relative to a viewpoint of a user of the computer system while the first virtual object is further away from the viewpoint of the user than the second virtual object (e.g., the first object is spatially "behind" the second virtual object in a depth dimension) the computer system reduces (1902*e*) an opacity of a respective portion of the second virtual object (e.g., ceasing to display the respective portion of the second virtual object or making the respective portion of the second virtual object partially transparent, or increasing a transparency of the respective portion of the second virtual object, to increase visibility of an at least first portion of the first virtual object from the viewpoint of the user), such as the overlap between the virtual object 1802 and virtual object 1804, and the reducing of opacity of the region 1818 as shown in FIG. 18B. In some embodiments, the reduction in opacity of the respective portion of the second virtual object applies to the entire second virtual object. In some embodiments, the reduction in opacity of the respective portion of the second virtual object applies to a portion of the second virtual object without applying to other portions of the second virtual object (e.g., an opacity of the respective portion of the second virtual object is reduced relative to an opacity of other portions of the second virtual object).

In some embodiments, in accordance with a determination that the second virtual object at least partially presents a simulated or virtual obscuring of the first virtual object while the first virtual object is being moved, such as movement of virtual object 1802 from as shown in FIG. 18A to as shown in FIG. 18B relative to virtual object 1804, the computer system modifies (e.g., decreases) the level of visual prominence of an at least portion of the second virtual object to improve visibility and/or interactability of the first virtual object, such as one or more portions of virtual object 1804 included in region 1818 as shown in FIG. 18B. It is understood that a simulated obscuring of the first virtual object optionally includes a mimicking of a physical obscuring of a physical equivalent of the first virtual object by a physical equivalent of the second virtual object relative to the viewpoint of the user (e.g., in a physical environment) at current positions of the first and the second virtual objects. The systems and methods contemplated herein optionally include modifying a visual appearance of the second virtual object to at least partially "preserve" visibility of the first virtual object that is currently being moved behind the second virtual object (e.g., in accordance with the first input), that would otherwise be obscured by the second virtual object. Thus, the computer system optionally increases visibility of the first portion of the first virtual object. For example, one or more portions of the second virtual object are displayed with a higher degree of translucency, or optionally are fully translucent, the one or more portions optionally including a region surrounding the first virtual object to improve the visibility and/or interactability of the first virtual object.

In some embodiments, the changing of the visual appearance includes changing additional or alternative visual properties of the second virtual object (e.g., at least a second portion of the virtual object), such as visual properties of the region 1818 and/or virtual object 1804 as shown in FIG. 18B, to increase visibility of the first virtual object (e.g., a first portion of the first virtual object). For example, the changed visual appearance optionally includes movement of the second virtual object (e.g., translation, rotation, and/or scaling to resolve the simulated obscuring), optionally includes changing a color, saturation, and/or brightness of the second virtual object, optionally includes blurring the second virtual object, and/or includes displaying a border indicating the dimensions of the at least the first portion of the virtual object that is virtually obscured by the second virtual object (e.g., while maintaining the location of the second virtual object). In some embodiments, the changing of the visual appearance includes some combination of one or more of the visual properties described herein. In some embodiments, in response to and/or in accordance with the first input, and in accordance with a determination that one or more criteria is satisfied, including the criterion satisfied when the current location of the second virtual object will cause the second virtual object to obscure the first virtual object, the computer system maintains the visual appearance of the first virtual object, and/or changes the visual appearance of one or more portions of the first virtual object in simulated visual conflict with the simulated obscuring one or more portions of the second virtual object. In some embodiments, changing or maintaining the visual appearance of the first virtual object includes changing or maintaining one or more visual properties described with reference to visual appearance of the second virtual object. It is understood that visual characteristics, properties, and/or a visual appearance of the first virtual object and/or the second virtual object optionally have one or more characteristics similar to or the same as those described with reference to methods 800, 900, 1100, 1300, 1500, and/or 1700.

In some embodiments, one or more criteria are satisfied based upon the spatial relationship between the second location of the second virtual object and a current location (e.g., the third location) of the first virtual object, such as between virtual object 1802 and virtual object 1804 as shown in FIG. 18B. As an example, the spatial relationship optionally includes the relative proximity (e.g., distance) between the current location of the first virtual object and the second location of the second virtual object, such as when the second location of the second virtual object is relatively closer to the user's viewpoint than the current location (e.g., the third location) of the first virtual object. Additionally or alternatively, such determinations optionally include a positive determination that the second virtual object will at least partially obscure the first virtual object when displayed at the third location, absent a change in visual appearance of the second virtual object.

In some embodiments, the changed visual appearance of the second virtual object is optionally predetermined, such as including a third level of visual prominence corresponding to a predetermined level of visual prominence (e.g., 5%, 10%, 20%, 30%, 40%, 50%, 60%, 70%, or 80% opacity). In some embodiments, the visual appearance is determined dynamically, such as relatively decreasing or increasing visual prominence as the spatial relationship (e.g., distance) between the current location of the first virtual object and the third virtual object changes (e.g., increases or decreases). In some embodiments, the changed visual appearance is additionally or alternatively determined in accordance with a determination of visual properties of virtual content included in the first virtual object and/or the second virtual object, such as virtual content present at and/or surrounding the portions of the simulated overlapping relative to the user's viewpoint. For example, a presence of, a color, a spatial density, a brightness, and/or an opacity of text, media, virtual objects, and/or portions of user interfaces included in the first portion of the first virtual object and/or the second portion of the second virtual object optionally modulates the degree to which the visual appearance of the second portion of the second virtual object changes. As an example, in accordance with a determination that colors of virtual content included in the first portion and the second portion of the virtual objects are similar or the same, the computer system optionally changes the visual appearance (e.g., level of opacity) of the second portion of the virtual object by a greater degree (e.g., greater change in the level of opacity) as compared to if the colors were visually distinct (e.g., white and black) when the one or more criteria are satisfied. Additionally or alternatively, the computer system optionally determines that a relative spacing between text included in the first portion of the first virtual object is relatively spacious, and optionally changes the visual appearance of the second portion of the second virtual object to a lesser degree than if the text were densely arranged within the first portion of the first virtual object. Reducing visual prominence of the at least portion of the second virtual object when the first virtual object is moved behind the second virtual object reduces the likelihood that the first virtual object is moved erroneously from the first location to the third location, helps reduce difficulty in providing further input for movement of the first virtual object and/or reduces the need for input to maintain visibility and/or interactability of the first virtual object, thus reducing computational load and power of the computer system required to perform such operations.

In some embodiments, in response to (and/or while) detecting the first input, such as movement of hand 1816 from FIG. 18A to FIG. 18B, in accordance with a determination that moving the first virtual object does not cause the current location of the first virtual object to overlap with the current location of the second virtual object relative to the viewpoint of the user (e.g., while the first virtual object is further away from the viewpoint of the user than the second virtual object), such as moving virtual object 1802 away from virtual object 1804 relative to the user's viewpoint to the arrangement as shown in FIG. 18A, the computer system forgoes the reducing of the opacity of the respective portion of the second virtual object (and, optionally, forgoes the reducing of the opacity of the second virtual object, forgoes reducing the opacity of the entire second virtual object, and/or forgoes reducing the opacity of any portion of the second virtual object). The response to detecting the first input optionally occurs while the viewpoint of the user is maintained. For example, the computer system does not reduce opacity of the respective portion of the second virtual object in accordance with a determination that the current locations of the first virtual object and the second virtual object do not present a simulated overlap and/or obscuring relative to the viewpoint of the user. In some embodiments, the reducing of opacity is performed independently of whether the first or the second virtual object are closer to the viewpoint of the user. For example, while the viewpoint of the user is maintained, the computer system optionally detects user input (e.g., the first input) moving the first virtual object relative to the second virtual object such that a perceived border of the first virtual object does not overlap and/or obscure a perceived border of the second virtual object. Accordingly, the computer system optionally maintains the opacity of the respective portion of the second virtual object and/or maintains the opacity of the second virtual object as a whole in response to such movement of the first virtual object relative to the second virtual object. In some embodiments, the opacity of the first and/or second virtual object are maintained independently of a relative distance between the virtual objects and/or independently of whether the first or the second virtual object is closer to the viewpoint of the user, in accordance with a determination that the virtual objects respectively do not present a simulated obscuring of one another. Forgoing reduction of opacity of the respective portion of the second virtual object if movement of the second virtual object does not cause the respective portion of the second virtual object to overlap with the first virtual object preserves visibility of the respective portion of the second virtual object, thus preserving visibility with the second virtual object as a whole and thereby reducing power consumption and processing to needlessly reduce the opacity of the respective portion and/or to manually correct for needless reductions in the opacity.

In some embodiments, in response to (and/or while) detecting the first input, in accordance with a determination that moving the first virtual object causes the current location of the first virtual object to overlap with the current location of the second virtual object relative to the viewpoint of the user while the first virtual object is closer to the viewpoint of the user than the second virtual object, such as moving virtual object 1802 in front of virtual object 1804 initiated from the arrangement as shown in FIG. 18A, the computer system forgoes the reducing of the opacity of the respective portion of the second virtual object (and, optionally, forgoes the reducing of the opacity of the second virtual object, forgoes reducing the opacity of the entire second virtual object, and/or forgoes reducing the opacity of any portion of the second virtual object), such as maintaining the level of visual prominence of virtual object 1802. The response to detecting the first input optionally occurs while the viewpoint of the user is maintained. In some embodiments, in accordance with a determination that the first virtual object is moved relatively closer to the viewpoint of the user than the second virtual object, the computer system forgoes reducing the opacity of one or more portions of the second virtual object, including the respective portion of the second virtual object (and optionally maintains the opacity of the one or more portions of the second virtual object). For example, because a physical equivalent of the second virtual object would not obscure a physical equivalent of the first virtual object placed closer to the viewpoint of the user than the second virtual object, the computer system determines that the second virtual object does not present a simulated obscuring of the first virtual object. Accordingly, the computer system optionally forgoes reducing the visual prominence of the respective portion of the virtual object to improve visibility and/or interactability of the first virtual object. In some embodiments, in response to such a spatial arrangement in which the first virtual object is relatively closer to the viewpoint of the user than the second virtual object, and in accordance with a determination that the movement of the first virtual object will present a simulated obscuring of the second virtual object, the computer system reduces opacity of one or more portions of the second virtual object (e.g., other than the respective portion, and optionally including the respective portion), to simulate the visual effect of the first virtual object obscuring the second virtual object. Forgoing the reducing of opacity of the respective portion of the virtual object in accordance with a determination that the first virtual object is relatively closer to the viewpoint of the user than the second virtual object improves visual feedback and user intuition concerning the spatial relationship of the virtual objects, analogously to physical objects moving within the user's physical environment, thus reducing the likelihood of detecting user input erroneously moving the virtual objects, and thereby reducing power consumption and processing required to perform operations in accordance with the erroneous input.

In some embodiments, the overlap between the first virtual object and the second virtual object while the first virtual object is further away from the viewpoint of the user than the second virtual object includes a first degree of overlap relative to the viewpoint of the user, such as a degree of overlap between virtual object 1802 and virtual object 1804 as shown in FIG. 18B. For example, the overlap between the first virtual object and the second virtual object described with reference to step(s) 1902 includes a first size and/or degree of overlap relative to what is visible relative to the viewpoint of the user. For example, the degree of overlap includes a portion of the first and/or the second virtual objects. The portion optionally includes an area bound by an intersection between the first and the second virtual objects when projected onto a plane (e.g., laterally intersecting the user's viewpoint, parallel to the user's shoulders and perpendicular to the floor).

In some embodiments, while the current location of the first virtual object overlaps with the current location of the second virtual object relative to the viewpoint of the user while the first virtual object is further away from the viewpoint of the user than the second virtual object and the opacity of the respective portion of the second virtual object is reduced, (for example, as described with reference to step(s) 1902) the computer system detects, via the one or more input devices, a second input moving the first virtual object relative to the second virtual object, such as movement of hand 1816 while virtual object 1802 is displayed and region 1820 is reduced in opacity as shown in FIG. 18C. For example, the second input has one or more characteristics similar to or the same as the first input. In some embodiments, the second input is a continuation of the first input (e.g., more movement of an air pinch gesture, more movement of a contact on a trackpad, and/or more movement requested via a joystick), also potentially causing obscuring of the first virtual object. In some embodiments, the second input is a separate input from the first input.

In some embodiments, in response to detecting the second input, the computer system moves the first virtual object in accordance with the second input (for example, similar to or the same as described as moving the first virtual object in accordance with the first input), and in accordance with a determination that the moving of the first virtual object causes the current location of the first virtual object to overlap with the current location of the second virtual object relative to the viewpoint of the user including a second degree of overlap (e.g., different from the first degree of overlap) relative to the viewpoint of the user, such as the overlap between virtual object 1802 and virtual object 1804 as shown in FIG. 18C, and while the first virtual object is further away from the viewpoint of the user than the second virtual object, the computer system reduces an opacity of an additional portion of the second virtual object different from the respective portion of the second virtual object, such as the difference in region 1820 in FIG. 18C and region 1818 in FIG. 18B. For example, in accordance with a determination that the degree to which the first virtual object overlaps the second virtual object increases relative to the viewpoint of the user, the computer system optionally displays an additional portion of the second virtual object with a reduced opacity, similar to or the same as described with reference to the respective portion of the second virtual object, and optionally concurrent with the reduced opacity of the respective portion. Thus, the portion of the second virtual object that is reduced in level of visual prominence (e.g., reduced in level of opacity) is optionally dependent upon the degree of a perceived obscuring of the first virtual object by the second virtual object. In some embodiments, the computer system detects that the first and second virtual objects overlap to a lesser degree, and the computer system shrinks the respective portion of the second virtual object in accordance with the lesser degree of simulated overlap relative to the viewpoint of the user. In some embodiments, in accordance with a determination that the moving of the first virtual object causes an overlapping with the second virtual object relative to the viewpoint of the user that does not include the second degree of overlap, the computer system forgoes the reducing of opacity of the additional portion of the second virtual object (e.g., while maintaining the opacity of the additional portion). For example, the computer system determines that the second virtual object overlaps with the first virtual object by the first degree, or by a third degree that is less than the second degree, and forgoes additionally reducing the opacity of the additional portion. Displaying an additional portion of the second virtual object with a reduced level of opacity when movement of the first virtual object changes the portion of the second virtual object that is overlapping with the first virtual object preserves visibility of the first virtual object, thus reducing the need for inputs to improve visibility of the first virtual object, and thereby reducing processing and power consumption performed by the computer system to perform operations in response to such inputs.

In some embodiments, in response to (and/or while) detecting the first input, and in accordance with the determination that moving the first virtual object causes the current location of the first virtual object to overlap with the current location of the second virtual object relative to the viewpoint of the user while the first virtual object is further away from the viewpoint of the user than the second virtual object (for example, as described with reference to step(s) 1902), such as an obscuring of virtual object 1802 by virtual object 1804 as shown in FIG. 18B, in accordance with a determination that a distance between the first virtual object and the second virtual object relative to the viewpoint of the user is a first distance, the respective portion of the second virtual object has a first size relative to the three-dimensional environment (and/or relative to the second virtual object), such as a size of region 1818 as shown in FIG. 18B. For example, the respective portion of the second virtual object that is displayed with one or more modified visual properties facilitating visibility of the first virtual object (e.g., described with reference to step(s) 1902) has a size that is dependent upon the distance between the first virtual object and the second virtual object. As an example, the computer system optionally determines a radius and/or foci of an elliptical region of the second virtual object that is displayed with a reduced opacity that scales upward or downward in accordance with the distance. For example, as the distance decreases between the first and the second virtual objects, the radius or foci increase (or decrease). As the distance increases between the first and the second virtual objects, the radius or foci decrease (or increase). Additionally or alternatively, the computer system optionally determines a boundary of the first virtual object relative to the viewpoint of the user, and determines that the respective portion of the second virtual object has a size corresponding to (e.g., matching or based on) the boundary. In some embodiments, the respective portion does not have a polygonal shape, but generally is arranged, and/or scales such that the first virtual object is entirely visible while the viewpoint of the user is maintained and the first virtual object moves relative to the second virtual object.

In some embodiments, in response to (and/or while) detecting the first input, and in accordance with the determination that moving the first virtual object causes the current location of the first virtual object to overlap with the current location of the second virtual object relative to the viewpoint of the user while the first virtual object is further away from the viewpoint of the user than the second virtual object (for example, as described with reference to step(s) 1902), in accordance with a determination that the distance between the first virtual object and the second virtual object relative to the viewpoint of the user is a second distance, different from the first distance, the respective portion of the second virtual object has a second size, different from the first size, relative to the three-dimensional environment (and/or relative to the second virtual object), such as a size of region 1820 as shown in FIG. 18C. For example, in accordance with the determination that the first virtual object is moved closer to the second virtual object relative to the user's viewpoint, the computer system optionally decreases (or increases) the size of the respective portion of the second virtual object. In accordance with a determination that the first virtual object is moved further from the second virtual object, the computer system optionally increases (or decreases) the size of the respective portion of the second virtual object. It is understood that the size of the respective portion can increase proportionally, inversely proportionally, or otherwise based upon the relative distance between the first and second virtual objects. Scaling the size of the respective portion relative to the three-dimensional environment in accordance with changes in the distance between the first and the second virtual object reduces user input required to manually change the visual properties and/or move the virtual objects separately to maintain visibility of the first virtual object.

In some embodiments, the respective portion of the second virtual object includes a first portion and a second portion, different from the first portion, such as a portion corresponding to a border of virtual object 1802 as shown in FIG. 18B and a portion extending from the border to a different border of region 1818 as shown in FIG. 18B. For example, the computer system optionally changes a visual appearance (e.g., reduces a level of opacity) of a respective portion of the second virtual object including the first and the second portion of the second virtual object. In some embodiments, the first and the second portions are contiguous portions of the second virtual object, relative to the viewpoint of the user and/or relative to one or more surfaces of the second virtual object.

In some embodiments, the first portion corresponds to an area of visual overlap between the first virtual object and the second virtual object relative to the viewpoint of the user, such as a portion corresponding to a border of virtual object 1802 as shown in FIG. 18B. For example, an area and/or spatial profile of the first portion of the second virtual object is optionally configured such that the first virtual object and a visual border of the first virtual object relative to the viewpoint of the user is visible to the user. As an example, the area and/or spatial profile of the first portion includes a projection of the visual border of the first virtual object, that is projected to the current location of the second virtual object relative to the viewpoint of the user. For example, the computer system determines a plane that is parallel to a lateral dimension of the user and perpendicular to a floor or ground of the three-dimensional environment. Such a plane is optionally representative of a visual plane of the viewpoint of the user. The plane is optionally translated to intersect the second virtual object, and the computer system optionally determines a projection of the apparent border of the first virtual object onto the translated plane, thus indicating portion of the second virtual object that is presenting a simulated obscuring of the first virtual object relative to the viewpoint of the user. In some embodiments, the computer system reduces a level of opacity of such a portion (e.g., the first portion of the respective portion), as though the first virtual object were visible "through" the second virtual object. The projection, for example, determines a "cutout" region of the virtual plane, and is optionally mapped to portions of the second virtual object that present the simulated obscuring of the first virtual object. Thereafter, the computer system optionally reduces a level of opacity of the portions (e.g., including the first portion) of the second virtual object, as if the computer system cut out and removed the first portion of the second virtual object, to present visibility of the first virtual object. Such operations optionally are repeated in response to detecting movement inputs (e.g., translation, rotation, and/or scaling) directed to the first virtual object to provide continuous or near continuous visibility of the first virtual object during and after its movement.

In some embodiments, in accordance with a determination that the size of the first virtual object is a first size, the first portion of the second virtual object is the first area, such as an area corresponding to or matching a boundary of virtual object 1802 as shown in FIG. 18B. In some embodiments, in accordance with a determination that the size of the virtual object is a second size, the first portion of the second virtual object is a second area, different from (e.g., greater or less than) the first area, such as an area corresponding to or matching a boundary of virtual object 1802 displayed at a larger or smaller scale than as shown in FIG. 18B. For example, the first portion of the second virtual object is optionally relatively larger when the first virtual object is relatively larger at a first position relative to the second virtual object, compared to if the first virtual object were a second, smaller size relative to the second virtual object. Additionally or alternatively, the computer system optionally changes (e.g., decreases or increases) the area of the first portion of the virtual object in accordance with a depth/distance between the first virtual object and the second virtual object.

In some embodiments, the second portion corresponds to a region surrounding the first portion of the second virtual object relative to the viewpoint of the user, such as a portion extending from the border of virtual object 1802 to a different border of region 1818 as shown in FIG. 18B. For example, the computer system optionally provides a simulated padding at least partially surrounding the first portion of the second virtual object. As an example, the computer system reduces a level of opacity of the second portion by a same or to a similar degree as the reduced level of opacity of the first portion. In some embodiments, the padding extends uniformly from the first portion of the second virtual object relative to the viewpoint of the user. For example, the computer system determines the second portion includes a threshold number of pixels (e.g., 1, 2, 4, 8, 16, 32, 64, 128, 256, 512, or 1024 pixels) surrounding a border of the first portion of the second virtual object. Additionally or alternatively, the second portion is based upon a visual area of the first portion of the second virtual object (e.g., 0.01 0.05, 0.1, 0.5, 1, 2.5, 5, 7.5, 10, 12.5, 15, or 25% of the area of the first portion). In some embodiments, the opacity of the second portion of the virtual object is different from the first portion. For example, the reduction in opacity along a first direction of the second portion (e.g., extending from a border of the first portion to a border of the second portion) follows a gradient, increasing or decreasing toward a border of the second portion of the second virtual object. In some embodiments, the second portion of the second virtual object is displayed by the computer system with additional or alternative visual properties that are modified differently than the first portion of the second virtual object. For example, the second portion of the second virtual object is displayed with a different level of saturation, brightness, hue, a simulated lighting effect mimicking physical lighting illuminating the second portion, and/or a magnitude of a blurring effect that is different from the first portion. Displaying the respective portion including a first and a second portion corresponding to a size of the first virtual object preserves visibility of the first virtual object, and reduces the likelihood that the first virtual object moves relative to the second virtual object in an unexpected or undesired way, thus reducing user input required to correct for such movement, and thereby reducing processing by the computer system detecting the user input.

In some embodiments, in accordance with a determination that the first virtual object is a first distance from the second virtual object when the first virtual object overlaps with the current location of the second virtual object relative to the viewpoint of the user, the second portion of the second virtual object extends beyond a boundary of the first virtual object by a first amount, such as the distance between virtual object 1802 and virtual object 1804 as shown in FIG. 18B, and the extension of region 1818 from the border of virtual object 1802 to the border of region 1818 as shown in FIG. 18B. In some embodiments, the computer system displays the respective portion of the second virtual object with an area that is based at least in part upon the distance between the first virtual object overlapping the second virtual object relative to the viewpoint of the user. For example, the computer system optionally maintains the scale of the first and/or second virtual objects relative to the three-dimensional environment while moving the first or second virtual object relative to the three-dimensional environment. In some embodiments, in response to detecting user input moving the first virtual object while obscured by the second virtual object, the computer system progressively increases or decreases a size of the respective portion (e.g., the first and second portions) of the second virtual object in response to the movement of the first virtual object. For example, the computer system increases the size of the respective region from an initial size to a size that corresponds to a boundary of the first virtual object relative to the viewpoint of the user or to a second size dependent upon the distance between the first and the second virtual objects. It is understood that the size and/or area of the first and/or second portion of the second virtual object optionally corresponds to the area of visual overlap described herein, in addition to being modulated by the distance between from the first virtual object to the second virtual object.

In some embodiments, in accordance with a determination that the first virtual object is a second distance, different from the first distance, from the second virtual object when the first virtual object overlaps with the current location of the second virtual object relative to the viewpoint of the user, the second portion of the second virtual object extends beyond the boundary of the first virtual object by a second amount that is different from the first amount, such as the distance between virtual object 1802 and virtual object 1804 as shown in FIG. 18C, and the extension of region 1820 from the border of virtual object 1802 to the border of region 1820 as shown in FIG. 18C. For example, the second distance is optionally greater or less than the first distance, and the simulated overlapping relative to the viewpoint of the user is a respective area corresponding to the distance. In some embodiments, the computer system changes the size of the second portion of the second virtual object to extend the second distance, different from the first distance, beyond the boundary of the first virtual object. For example, the respective portion of the virtual object and/or the second portion of the second virtual object increases when the second virtual object is relatively further away from the first virtual object, than when relatively closer to the first virtual object. In some embodiments, such behaviors of the second portion of the second virtual object are a function of the distance between the first and the second virtual object relative to the viewpoint of the user, and/or a function of an area of the first virtual object and/or the second virtual object. Changing a size of the second portion of the second virtual object based upon the distance between the first and the second virtual objects enhances visibility of the three-dimensional environment surrounding the first virtual object that is behind the second virtual object relative to the user's viewpoint and visually indicates depth between the first and the second virtual objects, thus reducing the likelihood that the user moves the first virtual object colliding with other objects included in the three-dimensional environment and/or erroneously relative to the second virtual object, thus reducing user input and processing required to resolve such collisions and thereby reducing power consumption of the computer system detecting such user inputs.

In some embodiments, while the first input is ongoing, the computer system detects a termination of the first input, such as the ceasing of the air pinch performed by hand 1816 as shown in FIG. 18D. For example, the computer system moves the first virtual object until the computer system detects a ceasing of contact between fingers previously maintaining an air pinch, ceasing of a contact on a trackpad or a non-touch sensitive surface, a ceasing of selection of a physical or virtual button, and/or a voice input requesting ceasing of the movement, optionally corresponding to the termination of the first input.

In some embodiments, in response to detecting the termination of the first input, in accordance with a determination that the current location of the first virtual object is within a threshold distance of the current location of the second virtual object when the first input is terminated, the computer system adds the first virtual object to the second virtual object, such as adding of virtual object 1802 to virtual object 1804 when respectively arranged as shown in FIG. 18F. In some embodiments, the computer system adds a first virtual object to a second virtual object in accordance with a determination that the first virtual object is "released" within a threshold distance (e.g., 0, 0.01, 0.05, 0.1, 0.5, 0.75, 1, 1.25, 1.5, 3, and/or 5 m) of the second virtual object, such as in response to the termination of the first input. In some embodiments, the second virtual object is a "container" virtual object, within which virtual objects such as the first virtual object can be added or removed. For example, in response to detecting the termination of the first input when the first virtual object is within the threshold distance of the current location of the second virtual object, the computer system moves the virtual object—if necessitated by a current location and/or orientation of the first virtual object—to assume a position and/or orientation relative to the second virtual object, such as parallel with a surface of the second virtual object, at a position that is unoccupied by other virtual object(s), at a predetermined distance relative to the surface of the second virtual object, and/or intersecting with the surface of the second virtual object. In some embodiments, adding the first virtual object to the second virtual object includes displaying the first virtual object intersecting with the second virtual object, at a position that is bounded by the second virtual object, and/or overlaying the second virtual object. After adding the first virtual object to the second virtual object, the second computer system optionally concurrently moves the first and the second virtual object by a similar and/or same magnitude and in a similar and/or same direction, as if the first and second virtual object were a single virtual object.

In some embodiments, the threshold and/or the current distance between the first and the second virtual objects are determined relative to a particular position included in the first and/or the second virtual objects, such as the position of virtual object 1802 and virtual object 1804 as shown in FIG. 18F. For example, the distance is determined relative to a center, corner, border, and/or a position intermediate to those positions of a surface and/or body of the first and/or second virtual objects. In some embodiments, the distance between the first and second virtual objects compared to the threshold distance is determined relative to the portions of the first and second virtual objects that are closest to each other. In some embodiments, the threshold distance is measured relative to a surface of the second virtual object, such as along a dimension that is normal to a surface of the second virtual object or extending from another angle relative to the surface of the second virtual object, and/or measured relative to the viewpoint of the user (e.g., extending along a vector that extends from the center of the user's viewpoint, parallel to the floor or ground of the three-dimensional environment). It is understood that descriptions of the current distance and/or the threshold distance additionally apply to one or more of the embodiments described herein referring to snapping the first virtual object toward the second virtual object. Adding the first virtual object to the second virtual object in accordance with a determination that the first input is terminated while the first virtual object is within the threshold distance of the second virtual object reduces user input otherwise required to perform the adding, thus reducing processing and power consumption of the computer system required to perform the other user input.

In some embodiments, in response to detecting the termination of the first input, in accordance with a determination that the current location of the first virtual object is not within the threshold distance of the current location of the second virtual object when the first input is terminated, and that the current location of the first virtual object is closer to the viewpoint of the user than the current location of the second virtual object, the computer system forgoes adding the first virtual object to the second virtual object, such as a termination of input while virtual object 1812 is far away from virtual object 1810 as shown in FIG. 18H. For example, the computer system does not add the first virtual object to the second virtual object in accordance with a determination that the first virtual object is not within the threshold distance of the second virtual object when the first input is terminated. As an example, the computer system forgoes adding the first virtual object to the second virtual object in accordance with a determination that the first input is terminated when the first virtual object is not within a threshold distance (e.g., 0.0001, 0.005, 0.01, 0.05, 0.1, 0.25, 0.5, 0.75, 1, 1.25, 1.5, 3, or 5 m) of respective virtual content (e.g., the second virtual object). In some embodiments, the computer system forgoes adding the first virtual object to the second virtual object in accordance with a determination that termination of the first input corresponds to a request to forgo movement of the first virtual object entirely. In response to such a request, the computer system optionally moves the first virtual object back to its previous location prior to initiation of the movement (e.g., as an independent object in the three-dimensional environment or as an object that is located within another object such as within a window or application region). Additionally or alternatively, the computer system optionally does not add the first virtual object to the second virtual object in accordance with a determination that the first virtual object is closer to the viewpoint of the user than the second virtual object. In some embodiments, in accordance with a determination that the current location is within the threshold distance of the current location of the second virtual object when the first input is terminated, and/or that the current location of the first virtual object is further from the viewpoint of the user than the current location of the second virtual object, the computer system adds the first virtual object to the second virtual object. Forgoing adding the first virtual object to the second virtual object in accordance with a determination that the first input is terminated while the first virtual object is beyond the threshold distance of the second virtual object reduces user input otherwise required to correct erroneous adding of the virtual objects, thus reducing processing and power consumption of the computer system required to perform the correct for the erroneous adding.

In some embodiments, in response to detecting the termination of the first input, in accordance with the determination that the current location of the first virtual object is further from the viewpoint of the user than the current location of the second virtual object, the computer system forgoes adding the first virtual object to the second virtual object (e.g., optionally without regard to whether or not the first virtual object is within the threshold distance of the current location of the second virtual object), such as the forgoing of adding virtual object 1802 to virtual object 1804 in response to termination of an air pinch as shown in FIG. 18D. In some embodiments, the computer system does not add the first virtual object to the second virtual object in accordance with a determination that the first virtual object is not within the threshold distance when the first input is terminated. Additionally or alternatively, the computer system optionally does not add the first virtual object to the second virtual object in accordance with a determination that the first virtual object is further away from the viewpoint of the user than the second virtual object. In some embodiments, in accordance with a determination that the current location is within the threshold distance of the current location of the second virtual object when the first input is terminated, and/or that the current location of the first virtual object is further from the viewpoint of the user than the current location of the second virtual object, the computer system adds the first virtual object to the second virtual object. Forgoing adding of the first virtual object to the second virtual object in accordance with a determination that the first input is terminated while the first virtual object is behind the second virtual object reduces user input otherwise required to correct erroneous adding of the virtual objects, thus reducing processing and power consumption of the computer system required to perform the correct for the erroneous adding.

In some embodiments, a first portion of the first virtual object is displayed with a first level of visual prominence relative to the three-dimensional environment and a second portion of the second virtual object, different from the respective portion of the second virtual object, is displayed with a second level of visual prominence relative to the three-dimensional environment while concurrently displaying the first virtual object and the second virtual object such as the levels of visual prominence of virtual object 1808, including a desaturated portion and a translucent portion as shown in FIG. 18L. For example, the levels of visual prominence have one or more characteristics as described with reference to step(s) 1902. In some embodiments, the level of visual prominence of a virtual object and/or changes to such levels of visual prominence visually indicate a focus or active/inactive state of the virtual object, described further with reference to methods 800, 900, 1100, 1300, 1500, and/or 1700. In some embodiments, the first portion of the first virtual object and/or the second portion of the second virtual object correspond to distinct portions or a whole of the respective virtual objects.

In some embodiments, while concurrently displaying the first portion of the first virtual object and the second portion of the second virtual object with the second level of visual prominence, such as the levels of visual prominence of virtual object 1808, including the desaturated portion and the translucent portion as shown in FIG. 18L, and while detecting the first input (e.g., before detecting termination of the first input) and while movement of the first virtual object satisfies one or more criteria, such as movement of virtual object 1812 to within a threshold distance of virtual object 1808 as shown in FIG. 18M, in accordance with a determination that the current location of the first virtual object is within a threshold distance of the second virtual object and that the current location of the first virtual object is closer to the viewpoint of the user than the current location of the second virtual object, such as virtual object 1812 in front of virtual object 1812, displaying the second portion of the second virtual object with a third level of visual prominence, greater than the second level of visual prominence, such as displaying the virtual object 1808 with the active focus state as shown in FIG. 18M. For example, as described with reference to step(s) 1902. In some embodiments, the computer system changes the focus state of virtual objects when a virtual object that is being moved (e.g., the first virtual object) is held within a threshold distance of the second virtual object (described further below). As an example, the one or more criteria include a criterion that is satisfied when the first virtual object maintains its location relative to the second virtual object for a period of time greater than a threshold period of time (e.g., 0.05, 0.1, 0.15, 0.25, 0.4, 0.5, 0.6, 0.75, 0.85, 1, 1.25, or 1.5 seconds). The one or more criteria optionally include a criterion that is satisfied when the first virtual object moves less than a threshold amount (e.g., 0, 0.001, 0.005, 0.01, 0.05, 0.1, 0.15, 0.25, 0.4, or 0.5 m) during the period of time. In some embodiments, in accordance with a determination that the one or more criteria are not satisfied, the computer system forgoes changing the focus state of the virtual objects.

For example, when the first virtual object is relatively close to the second virtual object and in front of the second virtual object relative to the viewpoint of the user, the computer system optionally changes (e.g., increases or decreases) the level of visual prominence of the second virtual object. For example, the computer system optionally increases the level of visual prominence of the second virtual object (e.g., increases a level of opacity, hue, saturation, brightness, an application of a lighting effect, and/or decreases a radius of a blurring effect applied to the second portion of the second virtual object or the entirety of the second virtual object). In some embodiments, concurrent with the display of the second virtual object with the third level of visual prominence, the computer system maintains display of the first virtual object with the first level of visual prominence. In some embodiments, the computer system concurrently displays the second portion of the second virtual object with the second level of visual prominence and maintains a level of visual prominence (e.g., opacity) of the respective portion of the virtual object in accordance with the determination that the current location of the first virtual object is within the threshold distance—and closer to the viewpoint of the user—relative to the current location of the second virtual object. In some embodiments, the computer system further requires that the first virtual object remain within the threshold distance of the second virtual object for a period of time (e.g., 0.01, 0.05, 0.1, 0.2, 0.3, 0.4, 0.5, 0.75, 1, 1.25, or 1.5 second) greater than a threshold of time before changing the level of visual prominence of the second virtual object. In some embodiments, when the first virtual object does not remain within the threshold distance for more than the threshold amount of time, the computer system forgoes changing of the level of visual prominence of the second virtual object, even when the first virtual object is within the threshold distance of the second virtual object and closer to the viewpoint of the user than the second virtual object.

In some embodiments, while concurrently displaying the first portion of the first virtual object and the second portion of the second virtual object with the second level of visual prominence, and while detecting the first input (e.g., before detecting termination of the first input) and while movement of the first virtual object satisfies one or more criteria, in accordance with a determination that the current location of the first virtual object is further from the viewpoint of the user than the current location of the second virtual object, forgoing the displaying of the second portion of the second virtual object with the third level of visual prominence, such as moving virtual object 1812 behind virtual object 1808 from the arrangement displayed in FIG. 18L, and maintaining the levels of visual prominence of virtual object 1808 shown in FIG. 18L. For example, the computer system optionally maintains the level of visual prominence of the second portion of the second virtual object, the first portion of the first virtual object, the respective portion of the virtual object, and/or all of the second virtual object, in response to the first input and in accordance with a determination that the current location of the first virtual object is further away from the current location of the second virtual object while moving the first virtual object. In some embodiments, the computer system forgoes displaying the second portion of the second virtual object with the third level of visual prominence when the second virtual object is closer to the viewpoint of the user than the virtual object, and irrespective of a distance between the first and second virtual objects. Changing a level of visual prominence of the second portion of the second virtual object based on a location of the first virtual object relative to the second virtual object increases visual emphasis of the second virtual object, thus providing visual feedback concerning a spatial relationship between the first and the second virtual objects while the first virtual object is being moved, and reducing the likelihood of erroneous movement of the first virtual object relative to the second virtual object, thereby reducing processing required by the computer system.

In some embodiments, while the opacity of the respective portion of the second virtual object is reduced in accordance with the determination that the current location of the first virtual object is further away from the viewpoint of the user than the current location of the second virtual object in response to detecting the first input (and/or while the first input is ongoing) the computer system detects a termination of the first input, such as termination of the air pinch gesture performed by hand 1816 as shown in FIG. 18D. For example, as described with reference to step(s) 1902, and further herein with respect to at least ceasing of an air pinch gesture and/or other user inputs.

In some embodiments, in response to detecting the termination of the first input, in accordance with a determination that the current location of the first virtual object is further away from the viewpoint of the user than the current location of the second virtual object and that the current location of the first virtual object causes the first virtual object to overlap with the current location of the second virtual object relative to the viewpoint of the user, the computer system increases (e.g., ceasing the reducing of) the opacity of the respective portion of the second virtual object, such as increasing the level of visual prominence of the region 1820 from FIG. 18C to FIG. 18D. For example, in accordance with a determination that the first virtual object is relatively further away from the viewpoint of the user than the second virtual object, and in response to detecting termination of movement input directed to the first virtual object (e.g., the first input), the computer system ceases movement of the first virtual object and displays the respective portion of the second virtual object with its level of opacity before the movement of the first virtual object was initiated. The computer system optionally increases the opacity of the respective portion of the second virtual object to its level of visual prominence and/or opacity prior to reducing the opacity. Thus, the computer system optionally restores visibility of the second virtual object, and presents a simulated obscuring of portion(s) of the first virtual object that are relatively behind the second virtual object relative to the viewpoint of the user. Ceasing the reducing of opacity of the respective portion of the second virtual object when movement of the first virtual object is terminated while the first virtual object is behind the second virtual object relative to the viewpoint of the user reinforces a spatial relationship between the virtual objects relative to the viewpoint of the user, thus reducing user input requesting movement of the first virtual object under assumptions that the first virtual object is relatively closer and/or is currently being moved, and thereby reducing processing required to perform operations related to the erroneous movement of the first virtual object.

In some embodiments, in response to (and/or while) detecting the first input, and while moving the first virtual object relative to the second virtual object in accordance with the first input (for example, as described with reference to step(s) 1902), such as the movement of hand 1816 from FIG. 18E to FIG. 18F, in accordance with a determination that requested movement of the first virtual object includes a request to move the current location of the first virtual object by a first magnitude through the second virtual object from a location that is in front of the second virtual object, such as movement of virtual object 1812 from FIG. 18M to FIG. 18N, from a viewpoint of the user (e.g., moving the first virtual object towards which a rear-facing side of the second virtual object is facing (e.g., a side of the second virtual object whose normal is oriented away from the viewpoint of the user)), such as the location of virtual object 1812 as shown in FIG. 18M, to a location that is behind the second virtual object, from a viewpoint of the user (e.g., moving the first virtual object towards which a front-facing side (optionally opposite the rear-facing side) of the second virtual object is facing (e.g., a side of the second virtual object whose normal is oriented towards the viewpoint of the user)), such as the location of virtual object 1812 to as shown in FIG. 18N, the computer system moves the first virtual object by a second magnitude (optionally the same or different from the first magnitude), such as a magnitude of movement of virtual object 1812 from FIG. 18M to FIG. 18N. For example, the computer system detects input including a request for moving the first virtual object at least partially through a surface of the second virtual object. It is understood that the input(s) described herein moving the virtual object optionally additionally or alternatively include a request for such movement. In some embodiments, the computer system determines a relative direction of the movement relative to a respective "side" of the surface of the second virtual object. For example, a first side—referred to herein as a "front-facing" side—of the surface of the second virtual object optionally includes virtual content with which the user of the computer system will likely view and/or interact, such as including a user interface of an application presented by the surface of the second virtual object. Further, a second side—referred to herein as a "rear-facing" side—of the surface of the second virtual object optionally does not include virtual content with which the user will likely view and/or interact, and/or includes less virtual content of interest to the user. For example, a user interface window included in a virtual object includes a front-facing side include a web browsing user interface, and a color or fill pattern on a rear-facing side of the window virtual object. Thus, the computer system optionally moves the first virtual object in a direction relative to a respective "side" of a surface of the second virtual object, and optionally moves the first virtual object from a first location that is in front of the second virtual object relative to a viewpoint of the user to a second location that is in behind the second virtual object relative to a viewpoint of the user in accordance with the user's inputs and/or requests.

In some embodiments, the computer system modulates a simulated force required to move a virtual object through a side of the second virtual object in accordance with a determination that the moved object is traveling through and/or towards a first surface, such as a simulated force when moving virtual object 1802 from as shown in FIG. 18E to as shown in FIG. 18F. The simulated force, for example, modulates the degree to which a magnitude of user input (e.g., hand movement, movement of contact on a trackpad or non-touch sensitive surface, movement of a joystick, and/or movement of a spatial pointing device) causes a magnitude of movement of the first virtual object. For example, the computer system optionally offers no simulated resistance, or no resistance when moving the first virtual object from a location on a rear-facing side of the virtual object toward a location on a front-facing side of the virtual object. As an example, the computer system detects an air pinch move by a first distance, and moves the first virtual object a respective first magnitude (e.g., distance) from a rear-facing side of the second virtual object toward the second virtual object. It is understood that in some embodiments, description of virtual content being on a "side" of the surface of the second virtual object and/or the virtual object includes placing the virtual content on the front or rear-facing side of the surface, or placing the virtual content within a region of the three-dimensional environment that is closer to a respective first side of the surface than to a respective second side of the surface.

In some embodiments, in accordance with a determination that the requested movement of the first virtual object includes a request to move the current location of the first virtual object by the first magnitude through the second virtual object from a location that is behind the second virtual object, from a viewpoint of the user (e.g., moving the first virtual object towards which the front-facing side of the second virtual object is facing), such as the location of virtual object 1802 as shown in FIG. 18E, to a location that is in front of the second virtual object, from a viewpoint of the user (e.g., moving the first virtual object towards which the rear-facing side of the second virtual object is facing), such as the location of virtual object 1802 as shown in FIG. 18F, the computer system moves the first virtual object by a third magnitude, less than the second magnitude, such as the movement of virtual object 1812 from FIG. 18E to FIG. 18F. For example, in accordance with a determination that movement of the first virtual object includes movement through the front-facing side of the surface of the second virtual object, the computer system does not move first virtual object to an initially requested position (e.g., moves the first virtual object by the third magnitude/distance). For example, the computer system optionally detects the air gesture moving the first distance described previously, traveling in a second direction from a front-facing side of the second virtual object toward a rear-facing side of the second virtual object. Instead of moving the first virtual object by the respective first magnitude (e.g., distance as described with reference to the first and second location above), the computer system optionally moves the first virtual object by a respective second magnitude (e.g., distance), less than the first magnitude (e.g., distance), thus simulating a resistance force to "pushing" the first virtual object toward and/or through the front-facing surface.

As an additional example, the computer system detects a request and/or input to move the first virtual object from a third location in front of the front-facing side of the second virtual object (e.g., relative to the viewpoint of the user or independent of the viewpoint of the user) to a fourth location that is on a rear-facing side of the second virtual object. Because the requested movement requires movement through the front-facing side of the second virtual object, the computer system instead moves the virtual object to a fifth location, simulating the effect of a greater amount of "force" of the user's input (e.g., movement of an air gesture, contact across a trackpad, of a joystick and/or movement of the user's body) required to move the second virtual object through the front-facing side of the surface of the second virtual object than through the rear-facing side of the surface of the second virtual object. Providing a simulated force resisting movement of the first virtual object toward and/or through the front-facing surface of the second virtual object reduces the likelihood that the user moves the first virtual object too far past a side of the second virtual object for viewing and/or interaction, thus reducing the need to correct for erroneous movement of the first virtual object, thereby reducing power consumption required for performing operations to process the input.

In some embodiments, the first virtual object is prevented from being moved through the second virtual object in a direction from a front of the second virtual object to behind the second virtual object, from the viewpoint of the user (e.g., moving the first virtual object by the third magnitude is independent of a magnitude of the requested movement of the first virtual object through the second virtual object from the front-facing side to the rear-facing side of the second virtual object), such as the movement of virtual object 1812 from as shown in FIG. 18M to as shown in FIG. 18N, not moving through virtual object 1808. For example, in accordance with a determination that the user requests movement of the first virtual object through the front-facing side of the second virtual object (e.g., by a respective magnitude to the fifth location that is on the rear-facing side relative to the surface of the second virtual object relative to the viewpoint of the user), the computer system forgoes the movement through the front-facing side of the second virtual object. Instead, the computer system optionally moves the first virtual object toward the front-facing side of the second virtual object until a portion of the first virtual object (e.g., a bounding volume, a point along the first virtual object) intersects and/or moves within a threshold distance (e.g., 0, 0.01, 0.05, 0.1, 0.5, 0.75, 1, 1.25, 1.5, 3, and/or 5 m) with the front-facing side of the second virtual object. At that point, the computer system optionally forgoes further movement normal to the surface of the second virtual object, and maintains the position of the first virtual object relative to the normal. Preventing movement of the first virtual object through the front-facing side of the second virtual object reduces the likelihood that the first virtual object is erroneously moved through the second virtual object, thereby reducing operations and power consumption required to present a reducing of opacity of the second virtual object preserving visibility of the first virtual object.

In some embodiments, moving the first virtual object from the location that is in front of the second virtual object to the location that is behind the second virtual object from the viewpoint of the user, such as the movement of virtual object 1802 from as shown in FIG. 18E to as shown in FIG. 18F, includes, in accordance with a determination that the requested movement of the first virtual object corresponds to a speed of movement of the first virtual object that is greater than a threshold speed, the computer system moves the first virtual object through the second virtual object without snapping the first virtual object to the (optionally, the front-facing side of the) second virtual object when the first virtual object is within a threshold distance of the (optionally, the front-facing side and/or rear-facing side of the) second virtual object, such as a speed of movement of virtual object 1802 through virtual object 1804 at a speed greater than the threshold speed from as shown in FIG. 18E to as shown in FIG. 18F. For example, the computer system forgoes adding the first virtual object to the second virtual object or forgoes snapping to the second virtual object based on whether the first virtual object is moving toward the second virtual object at a speed that is greater than or less than a threshold speed (e.g., 0.01, 0.05, 0.1, 0.5, 0.75, 1, 1.25, 1.5, 3, 5, or 10 m/s). For example, the computer system forgoes the adding and/or snapping, and instead moves the first virtual object through and/or toward the second virtual object in accordance with a determination that the first virtual object is moving toward the second virtual object at a speed that greater than the threshold speed (e.g., 0.01, 0.05, 0.1, 0.5, 0.75, 1, 1.25, 1.5, 3, 5, or 10 m/s). As an example, in accordance with a determination that the first virtual object is being moved from the rear-facing side of the surface of the second virtual object, is within a threshold distance (e.g., 0, 0.01, 0.05, 0.1, 0.5, 0.75, 1, 1.25, 1.5, 3, and/or 5 m) of the rear-facing side of the surface of the second virtual object, and/or exceeds the speed threshold, the computer system optionally moves the first virtual object without adding and/or snapping it to the second virtual object.

In some embodiments, in accordance with a determination that the requested movement of the first virtual object corresponds to a speed of movement of the first virtual object that is less than the threshold speed, the computer system snaps the first virtual object to the (optionally, the front-facing side of the) second virtual object when the first virtual object is within the threshold distance of the (optionally, the front-facing side and/or rear-facing side of the) second virtual object while moving the first virtual object through the second virtual object, such as a speed of movement of virtual object 1802 through virtual object 1804 at a speed less than the threshold speed, snapping toward virtual object 1804 from as shown in FIG. 18E to as shown in FIG. 18F. As an example, in accordance with a determination that the first virtual object is being moved from the rear-facing side of the surface of the second virtual object traveling below the threshold speed, and/or is within a threshold distance (e.g., 0, 0.01, 0.05, 0.1, 0.5, 0.75, 1, 1.25, 1.5, 3, and/or 5 m) of the rear-facing side of the surface of the second virtual object, the computer system optionally adds or snaps the first virtual object to the second virtual object. In some embodiments, the computer system adds or snaps the first virtual object to the second virtual object in accordance with the determination associated with the speed of the virtual object, and independently of a direction of the first virtual object (e.g., moving from the third to the fourth location through the second virtual object).

In some embodiments, the computer system snaps the first virtual object to the second virtual object. The snapping optionally includes quickly moving the first virtual object toward the second virtual object, and after the snapping to a snap position relative to the second virtual object, offering simulating resistance in response to input moving the first virtual object away from the snap position. For example, the computer system moves (e.g., snaps) the first virtual object with an increased speed when the first virtual object moves closer toward the second virtual object. Additionally, when moving the first virtual object away from the snap position, the computer system moves the first virtual object less than a requested movement, as though the first virtual object were attracted toward the snap position. In some embodiments, the computer system moves the first virtual object to assume a predetermined or dynamically determined position and/or orientation relative to the second virtual object in accordance with a determination that the first virtual object is moved within a threshold distance of the second virtual object, as if "snapping" to the second virtual object. Such a position (e.g., the first location) and/or orientation is optionally determined without an express request, as if magnetic poles were realigning the position and/or orientation of the first virtual object automatically. As an example, the first virtual object is displayed with a surface that is parallel to a surface of the second virtual object (e.g., front-facing surface), and/or at a threshold distance away from the second virtual object (e.g., 0.0001, 0.005, 0.01, 0.05, 0.1, 0.25, 0.5, 0.75, 1, 1.25, 1.5, 3, or 5 m). In some embodiments, the computer system determines a relative orientation of the first virtual object when snapping to the second virtual object (e.g., parallel to the second virtual object), and determines a position that is not necessarily predetermined. For example, a relative center of the first virtual object is aligned with a particular position corresponding to a surface of the second virtual object, such as a projection of the center of the first virtual object onto the surface. Performing different operations relative to the second virtual object in accordance with a determination of characteristics of the first virtual object movement, such as a speed of the movement, allows for more granular control of virtual objects without requiring additional inputs expressly requesting a first or a second operation be performed relative to the virtual objects.

In some embodiments, moving the first virtual object from the location that is behind the second virtual object to the location that is in front of the second virtual object, such as the movement of virtual object 1812 from as shown in FIG. 18M to as shown in FIG. 18N, includes snapping the first virtual object to the (optionally, the front-facing side of the) second virtual object when the first virtual object is within the threshold distance of the (optionally, the front-facing side of the) second virtual object (e.g., without regard to whether or not the requested movement of the first virtual object corresponds a threshold simulated speed or not), such as snapping of virtual object 1812 from as shown in FIG. 18M to as shown in FIG. 18N.

In some embodiments, in accordance with a determination that the requested movement of the first virtual object corresponds to a speed of the movement of the first virtual object that is greater than the threshold speed, the computer system snaps the first virtual object to the (optionally, the front-facing side of the) second virtual object when the first virtual object is within the threshold distance of the (optionally, the front-facing side of the) second virtual object. For example, the computer system snaps the first virtual object to the second virtual object when moving the first virtual object by the third magnitude and in response to moving within the threshold distance of the second virtual object.

In some embodiments, in accordance with a determination that the requested movement of the first virtual object corresponds to a speed of the movement of the first virtual object that is less than the threshold speed, the computer system snaps the first virtual object to the (optionally front-facing side of the) second virtual object when the first virtual object is within the threshold distance of the (optionally front-facing side of the) second virtual object. In some embodiments, the computer system snaps and/or adds the first virtual object to the second virtual object independently of the simulated speed of movement of the first virtual object in accordance with a determination that the first virtual object was moved from and toward the front-facing side of the second virtual object. For example, as described further herein, in response to detecting user input moving the first virtual object by the second simulated speed that is initiated from the front-facing side of the second virtual object, and moving toward the front-facing side of the second virtual object, computer system optionally moves the first virtual object to a respective position in accordance with user input, and adds or snaps the first virtual object to the second virtual object. For example, in accordance with a determination that the first virtual object is within a threshold distance of the front-facing side of the second virtual object, the computer system adds or snaps the first virtual object to the second virtual object, independently of the speed of the first virtual object. Snapping and/or adding the first virtual object to the second virtual object when moving the first virtual object toward the front-facing side of the second virtual object—independently of a speed of the first virtual object—allows a broader range of user inputs to cause addition of the first virtual object to the second virtual object, thus improving efficiency of interaction with virtual content included in the three-dimensional environment.

In some embodiments, the speed of the movement of the first virtual object is an average speed of the movement of the first virtual object, such as an average speed of virtual object 1812 moving from as shown in FIG. 18M to as shown in FIG. 18N. For example, the computer system optionally determines an average, median, and/or some other aggregate of the speed of the first virtual object prior to the movement of the first virtual object, and/or prior to the movement of the first virtual object moving toward the second virtual object. In some embodiments, the speed and/or velocity data leading up to a comparison with the threshold speed is captured within a window of time (e.g., 0.05, 0.1, 0.5, 1, 1.5, 2.5, 3, 5, or 10 seconds) of a current moment in time, and/or of when the first virtual object was moved within a threshold distance (e.g., 0.0001, 0.005, 0.01, 0.05, 0.1, 0.25, 0.5, 0.75, 1, 1.25, 1.5, 3, or 5 m) of the second virtual object. In accordance with a determination that the aggregated indication of speed of the first virtual object over the period of time exceeds the threshold speed, the computer system optionally forgoes snapping of the first virtual object to the second virtual object. Thus, the first simulated speed and/or the second simulated speed of the second virtual object are optionally compared to the simulated threshold speed to determine snapping behavior of the first virtual object. Comparing a variable speed of the first virtual object to a threshold speed to determine whether the first virtual object is snapped to the second virtual object reduces the likelihood that the virtual object is erroneously added to the second virtual object, thus reducing input, and thereby power consumption of the computer system performing operations in response the input required to resolve the erroneous addition.

In some embodiments, while moving the first virtual object relative to the second virtual object in accordance with the first input (for example, as described with reference to step(s) 1902), such as moving virtual object 1812 as shown in FIG. 18O, in accordance with a determination that the current location of the first virtual object is within a threshold distance of a second portion of the second virtual object that is displayed with a level of visual prominence that is greater than a threshold level of visual prominence relative to the three-dimensional environment, such as a level of visual prominence of a rightward portion of virtual object 1810 as shown in FIG. 18O, the computer system snaps the first virtual object to the second portion of the second virtual object in the three-dimensional environment, such as snapping virtual object 1812 to virtual object 1810 as shown in FIG. 18Q. For example, as described further herein with reference to "snapping" the first virtual object to the second virtual object. The snapping, for example, optionally includes moving the first virtual object to the first location relative to the second virtual object, such as aligning a center of the first virtual object with a projection of the first virtual object onto a surface of the second virtual object (e.g., to the second portion of the second virtual object). In some embodiments, other portions of the second virtual object are displayed with a same or different level of visual prominence as the level of visual prominence of the second portion. For example, the second virtual object is optionally displayed with a uniform level of visual prominence (e.g., opacity). Additionally or alternatively, a portion other than the second portion is optionally displayed with a level of visual prominence higher or lower than the second portion. In response to detecting movement of the first virtual object within a threshold distance of the other portion of the second virtual object, the computer system optionally snaps the first virtual object to the other portion of the second virtual object in accordance with a determination that the other portion is displayed with a level of visual prominence greater than the threshold level of visual prominence. In some embodiments, the snapping of the first virtual object to the second portion of the second virtual object includes moving the first virtual object to a location relative to, and corresponding to the second portion of the second virtual object. For example, as described herein, the snapping optionally includes moving the first virtual object to a location that is centered with a surface of the second portion of the second virtual object.

In some embodiments, while moving the first virtual object relative to the second virtual object in accordance with the first input (for example, as described with reference to step(s) 1902), in accordance with a determination that the current location of the first virtual object is within the threshold distance of a location corresponding to the second portion of the second virtual object but that the second portion of the second virtual object is not displayed with a level of visual prominence that is greater than the threshold level of visual prominence relative to the three-dimensional environment, such as the level of visual prominence of the portion of virtual object 1810 overlapping with virtual object 1808 near the dashed line indicating a border of virtual object 1810 as shown in FIG. 18O, the computer system forgoes snapping the first virtual object to the second portion of the second virtual object, such as forgoing snapping virtual object 1812 to virtual object 1810 as shown in FIG. 18O.

In some embodiments, while moving the first virtual object relative to the second virtual object in accordance with the first input and in accordance with a determination that the current location of the first virtual object is not within the threshold distance of the location corresponding to the second portion of the second virtual object (e.g., without regard to whether or not the second portion of the virtual object is displayed with a level of visual prominence that is greater than the threshold level of visual prominence relative to the three-dimensional environment), the computer system forgoes snapping the first virtual object to the second portion of the second virtual object.

For example, the computer system optionally does not "snap" the first virtual object to or toward the second virtual object in accordance with a determination that a set of criteria is not satisfied, even when the first virtual object is within the threshold distance of the second portion of the second virtual object. For example, the computer system determines that a portion of the second virtual object (e.g., that is within the threshold distance of the first virtual object) is displayed with a level of opacity and/or visual prominence less than a threshold level (e.g., less than 0.5, 1, 5, 10, 20, 30, 40, 50, 60, or 70% opacity and/or another visual property). Additionally or alternatively, the computer system does not snap the first virtual object to and/or toward the other portion of the second virtual object in accordance with a determination that the other portion is displayed with a level of visual prominence less than the threshold level of visual prominence. In such embodiments, the computer system forgoes snapping the first virtual object to align with and be close to the second virtual object. In some embodiments, when the set of criteria is not satisfied, the computer system displays the first virtual object at the second location and/or with a second orientation in accordance with the user input moving the first virtual object. For example, the first virtual object is displayed at a position and with an orientation that corresponds to the user's air gestures, without automatically adjusting to bring the first virtual object within the threshold distance of the second virtual object, and/or to reorient the first virtual object relative to the surface of the second virtual object. As an additional example, the forgoing of the snapping of the second virtual object includes forgoing movement of the first virtual object to the location relative to, and corresponding to the second portion of the second virtual object. Additionally or alternatively, the computer system maintains the location of the first virtual object relative to the second virtual object when the snapping is forgone. Displaying the first virtual object at a first or a second location in accordance with a determination that a set of criteria is satisfied provides a flexible approach to arrange the first virtual object toward the viewpoint of the user, and reduces the likelihood that the first virtual object is not repositioned and/or reoriented erroneously, thus reducing user input required to improve the visibility of the first virtual object and thereby reducing power consumption required to process the user input.

In some embodiments, while displaying the second virtual object, in accordance with a determination that a first portion of a respective virtual object (or representation of a physical object) has a location that corresponds to (e.g., occupies or would occupy in the absence of a spatial conflict) a same portion of the three-dimensional environment as the second portion of the second virtual object, such as portion of virtual object 1810 overlapping with virtual object 1808 near the dashed line indicating a border of virtual object 1810 as shown in FIG. 18O, the computer system displays the second portion of the second virtual object with a first level of visual prominence that is less than the threshold level of visual prominence, such as the level of visual prominence of virtual object 1810 overlapping with virtual object 1808 near the dashed line indicating a border of virtual object 1810 as shown in FIG. 18O. For example, the computer system determines a simulated intersection between the second virtual object and another virtual object (e.g., the first, a third, and/or a fourth virtual object) in which the pair of virtual objects at least partially occupies a same portion of the three-dimensional environment. The simulated intersection is configured to mimic the appearance of two physical objects that were placed attempting to occupy a same location. It is understood that two separate physical objects cannot occupy a same point within a physical environment; accordingly, the computer system optionally reduces a level of opacity and/or visual prominence of offending objects that present a simulated intersection (e.g., correspond to a same portion of the three-dimensional environment) to present a virtual indication of the intersection of virtual content. For example, the first portion of the respective virtual object and/or the second portion of the second virtual object are displayed with a reduced opacity (e.g., 0, 5, 10, 15, 20, or 30% opacity). In such embodiments, the computer system optionally forgoes a "snapping" of the first virtual object moving within a threshold distance of second portion of the second virtual object and/or within the threshold distance of the first portion of the respective virtual object. In some embodiments, a respective first virtual object of virtual objects presenting a simulated intersection is at least partially displayed at the location presenting the intersection, and a respective second virtual object is not displayed at the location.

In some embodiments, while displaying the second virtual object, in accordance with a determination that no object (e.g., virtual or physical) has the location that corresponds to (e.g., occupies or would occupy in the absence of a spatial conflict) the same portion of the three-dimensional environment as the second portion of the second virtual object, such as the lack of objects occupying a rightmost portion of virtual object 1810 in FIG. 18I, the computer system displays the second portion of the second virtual object with a second level of visual prominence, greater than the threshold level of visual prominence, such as the level of visual prominence of the rightmost portion of virtual object 1810 in FIG. 18I. For example, the computer system optionally maintains the level of visual prominence of the second portion of the second virtual object and/or the first portion of the respective virtual object in accordance with a determination that the portions do not present a simulated intersection within the three-dimensional environment. In such embodiments, the computer system snaps the first virtual object relative to the second virtual object (e.g., the second portion of the second virtual object) in accordance with a determination that movement and/or proximity between the first and the second virtual objects satisfy criteria described further herein (e.g., related to speed, distance, and visibility relative to the viewpoint of the user). Modifying a level of visual prominence of portions of virtual objects indicates a simulated intersection, and forgoing a moving of the first virtual object snapping toward a simulated intersection reduces the likelihood that the first virtual object is repositioned and/or reoriented in a manner that the user does not desire and/or expect, thus reducing user input required to resolve an undesirable position and/or orientation, and thereby reducing power consumption and processing required to perform operations in response to such user input.

In some embodiments, while displaying the second virtual object, in accordance with a determination that a viewing angle between the viewpoint of the user and a respective viewing vector (e.g., a front-facing viewing angle that corresponds to viewing the second virtual object from a side that is designated as the "front" of the second virtual object such as a vector that is normal to a surface of a window) for the second virtual object is greater than a threshold angle, such as a viewing angle between the viewpoint of the user and a vector extending from the face of virtual object 1809 as shown in FIG. 18S, the computer system displays the second portion of the second virtual object with a first level of visual prominence that is less than the threshold level of visual prominence relative to the three-dimensional environment, such as the level of visual prominence of virtual object 1809 as shown in FIG. 18S. For example, in accordance with a determination that a viewing angle formed by vectors extending from a normal of a surface of the second virtual object and a vector extending from the origin of the normal, and intersecting with the center of the viewpoint of the user exceeds a threshold angle, the computer system optionally decreases a level of visual prominence of one or more portions of the second virtual object. As an example, the threshold angle is 5, 10, 25, 40, 50, 60, 75, 80, or 85 degrees. In some embodiments, the reducing in level of visual prominence includes reducing a level of opacity of the second virtual object (e.g., to 0, 2.5, 5, 7.5, 10, 12.5, 15, 17.5, 20, or 25% opacity). In some embodiments, in response to detecting the first virtual object move within the threshold distance of the second virtual object that is displayed with the reduced level of visual prominence due to the extreme viewing angle (e.g., greater than the threshold angle), the computer system forgoes snapping of the first virtual object toward the second virtual object (e.g., repositioning and/or reorienting the first virtual object automatically) as described further herein.

In some embodiments, while displaying the second virtual object, in accordance with a determination that the viewing angle between the viewpoint of the user and the respective viewing vector for the second virtual object is less than or equal to the threshold angle, such as the viewing angle between the viewpoint of the user and the normal extending from virtual object 1804 as shown in FIG. 18D, the computer system displays the second portion of the second virtual object with a second level of visual prominence, greater than the threshold level of visual prominence relative to the three-dimensional environment, such as the level of visual prominence of virtual object 1804 as shown in FIG. 18D. For example, in accordance with a determination that the viewing angle is less than the threshold angle, the computer system forgoes the reducing of the level of opacity of the second virtual object. In some embodiments, in response to detecting the first virtual object move within the threshold distance of the second virtual object that is displayed with the maintained level of visual prominence (e.g., in accordance with user input), the computer system performs the snapping of the first virtual object toward the second virtual object (e.g., repositioning and/or reorienting the first virtual object automatically) as described further herein. Displaying the second virtual object with a reduced level of visual prominence in accordance with an extreme viewing angle, and snapping the first virtual object toward the second virtual object when the second virtual object is not reduced in visual prominence, reduces the likelihood that the first virtual object is displayed relative to the viewpoint of the user at an angle that is difficult to view and/or interact with the first virtual object, thus reducing user input required to correct for such an extreme angle, and thereby reducing processing and power consumption of the computer system performing inputs correcting the extreme angle.

In some embodiments, aspects/operations of methods 800, 900, 1100, 1300, 1500, 1700, and/or 1900 may be interchanged, substituted, and/or added between these methods. For example, the three-dimensional environments of methods 800, 900, 1100, 1300, 1500, 1700, and/or 1900, the virtual content (e.g., virtual objects) of methods 800, 900, 1100, 1300, 1500, 1700, and/or 1900, the visual effects of methods 800, 900, 1100, 1300, 1500, 1700, and/or 1900, the attention and attention-based inputs of methods 800, 900, 1100, 1300, 1500, 1700, and/or 1900, and/or techniques to increase or decrease (e.g., reduce) visual prominence of virtual content (e.g., virtual objects) in 800, 900, 1100, 1300, 1500, 1700, and/or 1900 are optionally interchanged, substituted, and/or added between these methods. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve XR experiences of users. The present disclosure contemplates that in some instances, this gathered data may include personal information data that uniquely identifies or can be used to contact or locate a specific person. Such personal information data can include demographic data, location-based data, telephone numbers, email addresses, social media IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve an XR experience of a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of XR experiences, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an XR experience can be generated by inferring preferences based on non-personal information data or a bare minimum amount of personal information, such as the content being requested by the device associated with a user, other non-personal information available to the service, or publicly available information.

The invention claimed is:

1. A method comprising:

at a computer system in communication with one or more input devices and a display generation component:

displaying, via the display generation component, a plurality of virtual objects including a first virtual object and a second virtual object, with a first spatial relationship in a three-dimensional environment relative to a current viewpoint of a user of the computer system, wherein displaying the first virtual object and the second virtual object with the first spatial relationship includes displaying the first virtual object and the second virtual object without an overlapping portion relative to the current viewpoint of the user, and the first virtual object and the second virtual object are displayed with a first visual prominence relative to the three-dimensional environment;

detecting, via the one or more input devices, a first input corresponding to a request to change a spatial relationship between the first virtual object and the second virtual object from the first spatial relationship to a second spatial relationship, different from the first spatial relationship, relative to the current viewpoint of the user;

in response to detecting the first input:

moving a respective virtual object of the plurality of virtual objects, in accordance with the first input, so that the first virtual object and the second virtual object have the second spatial relationship relative to the current viewpoint of the user, and the first virtual object overlaps the second virtual object from the current viewpoint of the user;

in accordance with a determination that the second spatial relationship between the first virtual object and the second virtual object meets respective criteria, wherein the respective criteria include a requirement that at least a portion of the first virtual object overlaps the second virtual object by more than a threshold amount from the current viewpoint of the user, displaying, via the display generation component, a respective portion of a respective virtual object of the plurality of virtual objects with a second visual prominence less than the first visual prominence relative to the three-dimensional environment; and in accordance with a determination that the second spatial relationship between the first virtual object and the second virtual object does not meet the respective criteria, displaying, via the display generation component, the respective portion of the respective virtual object with the first visual prominence relative to the three-dimensional environment.

2. The method of claim 1, wherein in accordance with a determination that the first input includes attention directed to the first virtual object, the respective virtual object of the plurality of virtual objects is the second virtual object, the method further comprising:

after detecting the first input, detecting a second input corresponding to attention directed to the second virtual object; and in response to detecting the second input, in accordance with a determination that at least a portion of the first virtual object overlaps the second virtual object by more than the threshold amount from the current viewpoint of the user:

displaying the respective portion of the second virtual object with the first visual prominence relative to the three-dimensional environment; and displaying a respective portion of the first virtual object with the second visual prominence relative to the three-dimensional environment.

3. The method of claim 1, further comprising:

after detecting the first input and while displaying the first virtual object with the first visual prominence, detecting a second input corresponding to attention directed to the second virtual object; and in response to detecting the second input, in accordance with a determination that at least a portion of the first virtual object overlaps the second virtual object by more than the threshold amount from the current viewpoint of the user:

displaying a respective portion of the second virtual object with the first visual prominence relative to the three-dimensional environment; and displaying a respective portion of the first virtual object with the second visual prominence relative to the three-dimensional environment.

4. The method of claim 3, further comprising:

after detecting the second input and while displaying the respective portion of the second virtual object with the first visual prominence, detecting a third input corresponding to attention directed to a third virtual object of the plurality of virtual objects in the three-dimensional environment; and in response to detecting the third input, in accordance with a determination that at least a portion of the third virtual object overlaps the second virtual object by more than the threshold amount from the current viewpoint of the user:

displaying the respective portion of the second virtual object with the second visual prominence relative to the three-dimensional environment; and maintaining display of the respective portion of the first virtual object with the second visual prominence relative to the three-dimensional environment.

5. The method of claim 4, further comprising:

in response to detecting the third input, in accordance with a determination that the third virtual object does not overlap the second virtual object by more than the threshold amount from the current viewpoint of the user:

maintaining display of the respective portion of the second virtual object with the first visual prominence relative to the three-dimensional environment; and maintaining display of the respective portion of the first virtual object with the second visual prominence relative to the three-dimensional environment.

6. The method of claim 3, further comprising:

in response to detecting the second input, in accordance with a determination that at least a portion of the first virtual object overlaps the second virtual object by more than the threshold amount from the current viewpoint of the user and at least a portion of the second virtual object overlaps a third virtual object of the plurality of virtual objects in the three-dimensional environment by more than the threshold amount from the current viewpoint of the user:

displaying the respective portion of the second virtual object with the first visual prominence relative to the three-dimensional environment;

displaying the respective portion of the first virtual object with the second visual prominence relative to the three-dimensional environment; and displaying a respective portion of the third virtual object with the second visual prominence relative to the three-dimensional environment.

7. The method of claim 1, further comprising:

while displaying the plurality of virtual objects in the three-dimensional environment, displaying an input element in the three-dimensional environment associated with the respective virtual object; and in response to detecting the first input:

in accordance with the determination that the second spatial relationship between the first virtual object and the second virtual object meets the respective criteria, displaying the input element with a third visual prominence less than the first visual prominence relative to the three-dimensional environment; and in accordance with the determination that the second spatial relationship between the first virtual object and the second virtual object does not meet the respective criteria, displaying the input element with a fourth visual prominence greater than the second visual prominence relative to the three-dimensional environment.

8. The method of claim 7, further comprising:

after detecting the first input, detecting a second input corresponding to a request to display an input element associated with a third virtual object of the plurality of virtual objects in the three-dimensional environment; and in response to detecting the second input:

ceasing to display the input element in the three-dimensional environment associated with the respective virtual object; and displaying the input element in the three-dimensional environment associated with the third virtual object.

9. The method of claim 1, wherein the respective portion of the respective virtual object of the plurality of virtual objects is a respective portion of the second virtual object, the method further comprising:

after detecting the first input, detecting a second input corresponding to attention directed to a location in the three-dimensional environment corresponding to empty space in the three-dimensional environment; and in response to detecting the second input, in accordance with a determination that at least a portion of the first virtual object overlaps the second virtual object by more than the threshold amount from the current viewpoint of the user:

displaying the respective portion of the second virtual object with the first visual prominence relative to the three-dimensional environment; and displaying a respective portion of the first virtual object with the second visual prominence relative to the three-dimensional environment.

10. The method of claim 1, wherein detecting the first input includes detecting movement of the current viewpoint of the user from a first viewpoint relative to the three-dimensional environment to a second viewpoint relative to the three-dimensional environment, wherein the movement of the current viewpoint of the user relative to the three-dimensional environment causes the at least the portion of the first virtual object to overlap the second virtual object from the current viewpoint of the user.

11. The method of claim 1, wherein:

in accordance with a determination that a difference in distance between the first virtual object and the current viewpoint of the user and the second virtual object and the current viewpoint of the user is a first distance, the threshold amount is a first threshold amount; and in accordance with a determination that the difference in between the first virtual object and the current viewpoint of the user and the second virtual object and the current viewpoint of the user is a second distance, different from the first distance, the threshold amount is a second threshold amount different from the first threshold amount.

12. The method of claim 11, wherein:

in accordance with the first distance being greater than the second distance, the first threshold amount is greater than the second threshold amount; and in accordance with the second distance being greater than the first distance, the second threshold amount is greater than the first threshold amount.

13. The method of claim 1, wherein:

displaying the respective portion of the respective virtual object of the plurality of virtual objects with the first visual prominence relative to the three-dimensional environment includes displaying the respective portion of the respective virtual object with a first value for a first visual characteristic; and displaying the respective portion of the respective virtual object of the plurality of virtual objects with the second visual prominence relative to the three-dimensional environment includes displaying the respective portion of the respective virtual object with a second value, less than the first value, for the first visual characteristic.

14. The method of claim 1, wherein displaying the respective portion of the respective virtual object with the second visual prominence relative to the three-dimensional environment includes ceasing to display a first portion of the respective portion of the respective virtual object in the three-dimensional environment, wherein the first portion of the respective portion of the respective virtual object has a relative size that corresponds to a relative size of the at least the portion of the first virtual object that overlaps the second virtual object.

15. The method of claim 14, wherein displaying the respective portion of the respective virtual object with the second visual prominence relative to the three-dimensional environment includes displaying a second portion of the respective portion of the respective virtual object with a greater amount of transparency compared to displaying the second portion of the respective portion of the respective virtual object with the first visual prominence, wherein the second portion of the respective portion of the respective virtual object surrounds the first portion of the respective portion of the respective virtual object.

16. The method of claim 1, wherein displaying the respective portion of the respective virtual object with the second visual prominence relative to the three-dimensional environment includes, while the first virtual object is an active virtual object that overlaps with the second virtual object:

in accordance with a determination that the first virtual object is further from a viewpoint of the user than the second virtual object, ceasing to display a respective portion of the second virtual object in the three-dimensional environment; and in accordance with a determination that the first virtual object is closer to the viewpoint of the user than the second virtual object, maintaining display of the respective portion of the second virtual object in the three-dimensional environment.

17. The method of claim 1, further comprising:

in response to detecting the first input, in accordance with a determination that a first portion of a third virtual object of the plurality of virtual objects overlaps the first virtual object by more than the threshold amount from the current viewpoint of the user, and that a second portion of the third virtual object overlaps the second virtual object by more than the threshold amount from the current viewpoint of the user:

displaying a first respective portion of a first respective virtual object of the plurality of virtual objects with the second visual prominence; and displaying a second respective portion of a second respective virtual object of the plurality of virtual objects with the second visual prominence.

18. The method of claim 1, wherein displaying the plurality of virtual objects includes:

in accordance with a determination that the first virtual object is an active virtual object, the first virtual object is displayed with the first visual prominence without regard to whether or not the first virtual object overlaps with other virtual objects; and in accordance with a determination that the second virtual object is an active virtual object, the second virtual object is displayed with the first visual prominence without regard to whether or not the first virtual object overlaps with other virtual objects.

19. The method of claim 1, further comprising:

while displaying the respective virtual object with the second visual prominence, detecting a second input corresponding to a request to move a virtual element in the three-dimensional environment toward a location associated with the respective virtual object in the three-dimensional environment; and while detecting the second input, moving the virtual element in the three-dimensional environment in accordance with movement associated with the second input while the respective virtual object is displayed with the second visual prominence.

20. The method of claim 19, further comprising:

after moving the virtual element to the location associated with the respective virtual object, detecting, via the one or more input devices, a termination of the second input; and in response to detecting the termination of the second input, adding the virtual element to the respective virtual object in the three-dimensional environment while maintaining display of the respective portion of the respective virtual object with the second visual prominence.

21. The method of claim 19, further comprising:

while detecting the second input:

in accordance with a determination that movement of the virtual element in the three-dimensional environment satisfies one or more first criteria, displaying the respective portion of the respective virtual object with a third visual prominence greater than the second visual prominence; and in accordance with a determination that the movement of the virtual element in the three-dimensional environment does not satisfy the one or more first criteria, maintaining display of the respective portion of the respective virtual object with the second visual prominence.

22. The method of claim 21, wherein the one or more first criteria include a criterion that is satisfied when the virtual element is within a threshold distance of the respective virtual object.

23. The method of claim 21, wherein the one or more first criteria include a criterion that is satisfied when movement of the virtual element is less than a threshold amount of movement.

24. The method of claim 21, wherein the one or more first criteria include a criterion that is satisfied when the virtual element is within a threshold distance of the respective virtual object for more than a threshold period of time.

25. The method of claim 21, wherein the one or more first criteria include a criterion that is satisfied when a first portion of the respective virtual object is visible in the three-dimensional environment from the current viewpoint of the user.

26. The method of claim 21, further comprising:

while detecting the second input, moving the virtual element within a threshold distance of the respective virtual object in accordance with the movement associated with the second input; and in accordance with a determination that the movement of the virtual element in the three-dimensional environment satisfies the one or more first criteria, moving the virtual element to the respective virtual object in the three-dimensional environment prior to displaying the respective portion of the respective virtual object with the third visual prominence.

27. The method of claim 21, further comprising:

while displaying the respective portion of the respective virtual object with the third visual prominence in accordance with the determination that the movement of the virtual element in the three-dimensional environment satisfies the one or more first criteria, detecting, via the one or more input devices, a termination of the second input; and in response to detecting the termination of the second input, in accordance with the virtual element being at a location in the three-dimensional environment that is away from the respective virtual object, maintaining display of the respective portion of the respective virtual object with the third visual prominence.

28. A computer system that is in communication with a display generation component and one or more input devices, the computer system comprising:

one or more processors;

memory; and one or more programs, wherein the one or more programs are stored in the memory and configured to be executed by the one or more processors, the one or more programs including instructions for:

displaying, via the display generation component, a plurality of virtual objects including a first virtual object and a second virtual object, with a first spatial relationship in a three-dimensional environment relative to a current viewpoint of a user of the computer system, wherein displaying the first virtual object and the second virtual object with the first spatial relationship includes displaying the first virtual object and the second virtual object without an overlapping portion relative to the current viewpoint of the user, and the first virtual object and the second virtual object are displayed with a first visual prominence relative to the three-dimensional environment;

detecting, via the one or more input devices, a first input corresponding to a request to change a spatial relationship between the first virtual object and the second virtual object from the first spatial relationship to a second spatial relationship, different from the first spatial relationship, relative to the current viewpoint of the user;

in response to detecting the first input:

moving a respective virtual object of the plurality of virtual objects, in accordance with the first input, so that the first virtual object and the second virtual object have the second spatial relationship relative to the current viewpoint of the user, and the first virtual object overlaps the second virtual object from the current viewpoint of the user;

in accordance with a determination that the second spatial relationship between the first virtual object and the second virtual object meets respective criteria, wherein the respective criteria include a requirement that at least a portion of the first virtual object overlaps the second virtual object by more than a threshold amount from the current viewpoint of the user, displaying, via the display generation component, a respective portion of a respective virtual object of the plurality of virtual objects with a second visual prominence less than the first visual prominence relative to the three-dimensional environment; and in accordance with a determination that the second spatial relationship between the first virtual object and the second virtual object does not meet the respective criteria, displaying, via the display generation component, the respective portion of the respective virtual object with the first visual prominence relative to the three-dimensional environment.

29. A non-transitory computer readable storage medium storing one or more programs, the one or more programs comprising instructions, which when executed by one or more processors of a computer system that is in communication with a display generation component and one or more input devices, cause the computer system to perform a method comprising:

displaying, via the display generation component, a plurality of virtual objects including a first virtual object and a second virtual object, with a first spatial relationship in a three-dimensional environment relative to a current viewpoint of a user of the computer system, wherein displaying the first virtual object and the second virtual object with the first spatial relationship includes displaying the first virtual object and the second virtual object without an overlapping portion relative to the current viewpoint of the user, and the first virtual object and the second virtual object are displayed with a first visual prominence relative to the three-dimensional environment;

detecting, via the one or more input devices, a first input corresponding to a request to change a spatial relationship between the first virtual object and the second virtual object from the first spatial relationship to a second spatial relationship, different from the first spatial relationship, relative to the current viewpoint of the user;

in response to detecting the first input:

moving a respective virtual object of the plurality of virtual objects, in accordance with the first input, so that the first virtual object and the second virtual object have the second spatial relationship relative to the current viewpoint of the user, and the first virtual object overlaps the second virtual object from the current viewpoint of the user;

in accordance with a determination that the second spatial relationship between the first virtual object and the second virtual object meets respective criteria, wherein the respective criteria include a requirement that at least a portion of the first virtual object overlaps the second virtual object by more than a threshold amount from the current viewpoint of the user, displaying, via the display generation component, a respective portion of a respective virtual object of the plurality of virtual objects with a second visual prominence less than the first visual prominence relative to the three-dimensional environment; and in accordance with a determination that the second spatial relationship between the first virtual object and the second virtual object does not meet the respective criteria, displaying, via the display generation component, the respective portion of the respective virtual object with the first visual prominence relative to the three-dimensional environment.

30. The computer system of claim 28, wherein in accordance with a determination that the first input includes attention directed to the first virtual object, the respective virtual object of the plurality of virtual objects is the second virtual object, the one or more programs further including instructions for:

after detecting the first input, detecting a second input corresponding to attention directed to the second virtual object; and in response to detecting the second input, in accordance with a determination that at least a portion of the first virtual object overlaps the second virtual object by more than the threshold amount from the current viewpoint of the user:

displaying the respective portion of the second virtual object with the first visual prominence relative to the three-dimensional environment; and displaying a respective portion of the first virtual object with the second visual prominence relative to the three-dimensional environment.

31. The computer system of claim 28, the one or more programs further including instructions for:

after detecting the first input and while displaying the first virtual object with the first visual prominence, detecting a second input corresponding to attention directed to the second virtual object; and in response to detecting the second input, in accordance with a determination that at least a portion of the first virtual object overlaps the second virtual object by more than the threshold amount from the current viewpoint of the user:

displaying a respective portion of the second virtual object with the first visual prominence relative to the three-dimensional environment; and displaying a respective portion of the first virtual object with the second visual prominence relative to the three-dimensional environment.

32. The computer system of claim 31, the one or more programs further including instructions for:

after detecting the second input and while displaying the respective portion of the second virtual object with the first visual prominence, detecting a third input corresponding to attention directed to a third virtual object of the plurality of virtual objects in the three-dimensional environment; and in response to detecting the third input, in accordance with a determination that at least a portion of the third virtual object overlaps the second virtual object by more than the threshold amount from the current viewpoint of the user:

displaying the respective portion of the second virtual object with the second visual prominence relative to the three-dimensional environment; and maintaining display of the respective portion of the first virtual object with the second visual prominence relative to the three-dimensional environment.

33. The computer system of claim 32, the one or more programs further including instructions for:

in response to detecting the third input, in accordance with a determination that the third virtual object does not overlap the second virtual object by more than the threshold amount from the current viewpoint of the user:

maintaining display of the respective portion of the second virtual object with the first visual prominence relative to the three-dimensional environment; and maintaining display of the respective portion of the first virtual object with the second visual prominence relative to the three-dimensional environment.

34. The computer system of claim 31, the one or more programs further including instructions for:

in response to detecting the second input, in accordance with a determination that at least a portion of the first virtual object overlaps the second virtual object by more than the threshold amount from the current viewpoint of the user and at least a portion of the second virtual object overlaps a third virtual object of the plurality of virtual objects in the three-dimensional environment by more than the threshold amount from the current viewpoint of the user:

displaying the respective portion of the second virtual object with the first visual prominence relative to the three-dimensional environment;

displaying the respective portion of the first virtual object with the second visual prominence relative to the three-dimensional environment; and displaying a respective portion of the third virtual object with the second visual prominence relative to the three-dimensional environment.

35. The computer system of claim 28, the one or more programs further including instructions for:

while displaying the plurality of virtual objects in the three-dimensional environment, displaying an input element in the three-dimensional environment associated with the respective virtual object; and in response to detecting the first input:

in accordance with the determination that the second spatial relationship between the first virtual object and the second virtual object meets the respective criteria, displaying the input element with a third visual prominence less than the first visual prominence relative to the three-dimensional environment; and in accordance with the determination that the second spatial relationship between the first virtual object and the second virtual object does not meet the respective criteria, displaying the input element with a fourth visual prominence greater than the second visual prominence relative to the three-dimensional environment.

36. The computer system of claim 35, the one or more programs further including instructions for:

after detecting the first input, detecting a second input corresponding to a request to display an input element associated with a third virtual object of the plurality of virtual objects in the three-dimensional environment; and in response to detecting the second input:

ceasing to display the input element in the three-dimensional environment associated with the respective virtual object; and displaying the input element in the three-dimensional environment associated with the third virtual object.

37. The computer system of claim 28, wherein the respective portion of the respective virtual object of the plurality of virtual objects is a respective portion of the second virtual object, the one or more programs further including instructions for:

after detecting the first input, detecting a second input corresponding to attention directed to a location in the three-dimensional environment corresponding to empty space in the three-dimensional environment; and in response to detecting the second input, in accordance with a determination that at least a portion of the first virtual object overlaps the second virtual object by more than the threshold amount from the current viewpoint of the user:

displaying the respective portion of the second virtual object with the first visual prominence relative to the three-dimensional environment; and displaying a respective portion of the first virtual object with the second visual prominence relative to the three-dimensional environment.

38. The computer system of claim 28, wherein detecting the first input includes detecting movement of the current viewpoint of the user from a first viewpoint relative to the three-dimensional environment to a second viewpoint relative to the three-dimensional environment, wherein the movement of the current viewpoint of the user relative to the three-dimensional environment causes the at least the portion of the first virtual object to overlap the second virtual object from the current viewpoint of the user.

39. The computer system of claim 28, wherein:

in accordance with a determination that a difference in distance between the first virtual object and the current viewpoint of the user and the second virtual object and the current viewpoint of the user is a first distance, the threshold amount is a first threshold amount; and in accordance with a determination that the difference in between the first virtual object and the current viewpoint of the user and the second virtual object and the current viewpoint of the user is a second distance, different from the first distance, the threshold amount is a second threshold amount different from the first threshold amount.

40. The computer system of claim 39, wherein:

in accordance with the first distance being greater than the second distance, the first threshold amount is greater than the second threshold amount; and in accordance with the second distance being greater than the first distance, the second threshold amount is greater than the first threshold amount.

41. The computer system of claim 28, wherein:

displaying the respective portion of the respective virtual object of the plurality of virtual objects with the first visual prominence relative to the three-dimensional environment includes displaying the respective portion of the respective virtual object with a first value for a first visual characteristic; and displaying the respective portion of the respective virtual object of the plurality of virtual objects with the second visual prominence relative to the three-dimensional environment includes displaying the respective portion of the respective virtual object with a second value, less than the first value, for the first visual characteristic.

42. The computer system of claim 28, wherein displaying the respective portion of the respective virtual object with the second visual prominence relative to the three-dimensional environment includes ceasing to display a first portion of the respective portion of the respective virtual object in the three-dimensional environment, wherein the first portion of the respective portion of the respective virtual object has a relative size that corresponds to a relative size of the at least the portion of the first virtual object that overlaps the second virtual object.

43. The computer system of claim 42, wherein displaying the respective portion of the respective virtual object with the second visual prominence relative to the three-dimensional environment includes displaying a second portion of the respective portion of the respective virtual object with a greater amount of transparency compared to displaying the second portion of the respective portion of the respective virtual object with the first visual prominence, wherein the second portion of the respective portion of the respective virtual object surrounds the first portion of the respective portion of the respective virtual object.

44. The computer system of claim 28, wherein displaying the respective portion of the respective virtual object with the second visual prominence relative to the three-dimensional environment includes, while the first virtual object is an active virtual object that overlaps with the second virtual object:

in accordance with a determination that the first virtual object is further from a viewpoint of the user than the second virtual object, ceasing to display a respective portion of the second virtual object in the three-dimensional environment; and in accordance with a determination that the first virtual object is closer to the viewpoint of the user than the second virtual object, maintaining display of the respective portion of the second virtual object in the three-dimensional environment.

45. The computer system of claim 28, the one or more programs further including instructions for:

in response to detecting the first input, in accordance with a determination that a first portion of a third virtual object of the plurality of virtual objects overlaps the first virtual object by more than the threshold amount from the current viewpoint of the user, and that a second portion of the third virtual object overlaps the second virtual object by more than the threshold amount from the current viewpoint of the user:

displaying a first respective portion of a first respective virtual object of the plurality of virtual objects with the second visual prominence; and displaying a second respective portion of a second respective virtual object of the plurality of virtual objects with the second visual prominence.

46. The computer system of claim 28, wherein displaying the plurality of virtual objects includes:

in accordance with a determination that the first virtual object is an active virtual object, the first virtual object is displayed with the first visual prominence without regard to whether or not the first virtual object overlaps with other virtual objects; and in accordance with a determination that the second virtual object is an active virtual object, the second virtual object is displayed with the first visual prominence without regard to whether or not the first virtual object overlaps with other virtual objects.

47. The computer system of claim 28, the one or more programs further including instructions for:

while displaying the respective virtual object with the second visual prominence, detecting a second input corresponding to a request to move a virtual element in the three-dimensional environment toward a location associated with the respective virtual object in the three-dimensional environment; and while detecting the second input, moving the virtual element in the three-dimensional environment in accordance with movement associated with the second input while the respective virtual object is displayed with the second visual prominence.

48. The computer system of claim 47, the one or more programs further including instructions for:

after moving the virtual element to the location associated with the respective virtual object, detecting, via the one or more input devices, a termination of the second input; and in response to detecting the termination of the second input, adding the virtual element to the respective virtual object in the three-dimensional environment while maintaining display of the respective portion of the respective virtual object with the second visual prominence.

49. The computer system of claim 47, the one or more programs further including instructions for:

while detecting the second input:

in accordance with a determination that movement of the virtual element in the three-dimensional environment satisfies one or more first criteria, displaying the respective portion of the respective virtual object with a third visual prominence greater than the second visual prominence; and in accordance with a determination that the movement of the virtual element in the three-dimensional environment does not satisfy the one or more first criteria, maintaining display of the respective portion of the respective virtual object with the second visual prominence.

50. The non-transitory computer readable storage medium of claim 29, wherein in accordance with a determination that the first input includes attention directed to the first virtual object, the respective virtual object of the plurality of virtual objects is the second virtual object, the method further comprising:

after detecting the first input, detecting a second input corresponding to attention directed to the second virtual object; and in response to detecting the second input, in accordance with a determination that at least a portion of the first virtual object overlaps the second virtual object by more than the threshold amount from the current viewpoint of the user:

displaying the respective portion of the second virtual object with the first visual prominence relative to the three-dimensional environment; and displaying a respective portion of the first virtual object with the second visual prominence relative to the three-dimensional environment.

51. The non-transitory computer readable storage medium of claim 29, the method further comprising:

after detecting the first input and while displaying the first virtual object with the first visual prominence, detecting a second input corresponding to attention directed to the second virtual object; and in response to detecting the second input, in accordance with a determination that at least a portion of the first virtual object overlaps the second virtual object by more than the threshold amount from the current viewpoint of the user:

displaying a respective portion of the second virtual object with the first visual prominence relative to the three-dimensional environment; and displaying a respective portion of the first virtual object with the second visual prominence relative to the three-dimensional environment.

52. The non-transitory computer readable storage medium of claim 51, the method further comprising:

after detecting the second input and while displaying the respective portion of the second virtual object with the first visual prominence, detecting a third input corresponding to attention directed to a third virtual object of the plurality of virtual objects in the three-dimensional environment; and in response to detecting the third input, in accordance with a determination that at least a portion of the third virtual object overlaps the second virtual object by more than the threshold amount from the current viewpoint of the user:

displaying the respective portion of the second virtual object with the second visual prominence relative to the three-dimensional environment; and maintaining display of the respective portion of the first virtual object with the second visual prominence relative to the three-dimensional environment.

53. The non-transitory computer readable storage medium of claim 52, the method further comprising:

in response to detecting the third input, in accordance with a determination that the third virtual object does not overlap the second virtual object by more than the threshold amount from the current viewpoint of the user:

maintaining display of the respective portion of the second virtual object with the first visual prominence relative to the three-dimensional environment; and maintaining display of the respective portion of the first virtual object with the second visual prominence relative to the three-dimensional environment.

54. The non-transitory computer readable storage medium of claim 51, the method further comprising:

in response to detecting the second input, in accordance with a determination that at least a portion of the first virtual object overlaps the second virtual object by more than the threshold amount from the current viewpoint of the user and at least a portion of the second virtual object overlaps a third virtual object of the plurality of virtual objects in the three-dimensional environment by more than the threshold amount from the current viewpoint of the user:

displaying the respective portion of the second virtual object with the first visual prominence relative to the three-dimensional environment;

displaying the respective portion of the first virtual object with the second visual prominence relative to the three-dimensional environment; and displaying a respective portion of the third virtual object with the second visual prominence relative to the three-dimensional environment.

55. The non-transitory computer readable storage medium of claim 29, the method further comprising:

while displaying the plurality of virtual objects in the three-dimensional environment, displaying an input element in the three-dimensional environment associated with the respective virtual object; and in response to detecting the first input:

in accordance with the determination that the second spatial relationship between the first virtual object and the second virtual object meets the respective criteria, displaying the input element with a third visual prominence less than the first visual prominence relative to the three-dimensional environment; and in accordance with the determination that the second spatial relationship between the first virtual object and the second virtual object does not meet the respective criteria, displaying the input element with a fourth visual prominence greater than the second visual prominence relative to the three-dimensional environment.

56. The non-transitory computer readable storage medium of claim 55, the method further comprising:

after detecting the first input, detecting a second input corresponding to a request to display an input element associated with a third virtual object of the plurality of virtual objects in the three-dimensional environment; and in response to detecting the second input:

ceasing to display the input element in the three-dimensional environment associated with the respective virtual object; and displaying the input element in the three-dimensional environment associated with the third virtual object.

57. The non-transitory computer readable storage medium of claim 29, wherein the respective portion of the respective virtual object of the plurality of virtual objects is a respective portion of the second virtual object, the method further comprising:

after detecting the first input, detecting a second input corresponding to attention directed to a location in the three-dimensional environment corresponding to empty space in the three-dimensional environment; and in response to detecting the second input, in accordance with a determination that at least a portion of the first virtual object overlaps the second virtual object by more than the threshold amount from the current viewpoint of the user:

displaying the respective portion of the second virtual object with the first visual prominence relative to the three-dimensional environment; and displaying a respective portion of the first virtual object with the second visual prominence relative to the three-dimensional environment.

58. The non-transitory computer readable storage medium of claim 29, wherein detecting the first input includes detecting movement of the current viewpoint of the user from a first viewpoint relative to the three-dimensional environment to a second viewpoint relative to the three-dimensional environment, wherein the movement of the current viewpoint of the user relative to the three-dimensional environment causes the at least the portion of the first virtual object to overlap the second virtual object from the current viewpoint of the user.

59. The non-transitory computer readable storage medium of claim 29, wherein:

in accordance with a determination that a difference in distance between the first virtual object and the current viewpoint of the user and the second virtual object and the current viewpoint of the user is a first distance, the threshold amount is a first threshold amount; and in accordance with a determination that the difference in between the first virtual object and the current viewpoint of the user and the second virtual object and the current viewpoint of the user is a second distance, different from the first distance, the threshold amount is a second threshold amount different from the first threshold amount.

60. The non-transitory computer readable storage medium of claim 59, wherein:

in accordance with the first distance being greater than the second distance, the first threshold amount is greater than the second threshold amount; and in accordance with the second distance being greater than the first distance, the second threshold amount is greater than the first threshold amount.

61. The non-transitory computer readable storage medium of claim 29, wherein:

displaying the respective portion of the respective virtual object of the plurality of virtual objects with the first visual prominence relative to the three-dimensional environment includes displaying the respective portion of the respective virtual object with a first value for a first visual characteristic; and displaying the respective portion of the respective virtual object of the plurality of virtual objects with the second visual prominence relative to the three-dimensional environment includes displaying the respective portion of the respective virtual object with a second value, less than the first value, for the first visual characteristic.

62. The non-transitory computer readable storage medium of claim 29, wherein displaying the respective portion of the respective virtual object with the second visual prominence relative to the three-dimensional environment includes ceasing to display a first portion of the respective portion of the respective virtual object in the three-dimensional environment, wherein the first portion of the respective portion of the respective virtual object has a relative size that corresponds to a relative size of the at least the portion of the first virtual object that overlaps the second virtual object.

63. The non-transitory computer readable storage medium of claim 62, wherein displaying the respective portion of the respective virtual object with the second visual prominence relative to the three-dimensional environment includes displaying a second portion of the respective portion of the respective virtual object with a greater amount of transparency compared to displaying the second portion of the respective portion of the respective virtual object with the first visual prominence, wherein the second portion of the respective portion of the respective virtual object surrounds the first portion of the respective portion of the respective virtual object.

64. The non-transitory computer readable storage medium of claim 29, wherein displaying the respective portion of the respective virtual object with the second visual prominence relative to the three-dimensional environment includes, while the first virtual object is an active virtual object that overlaps with the second virtual object:

- in accordance with a determination that the first virtual object is further from a viewpoint of the user than the second virtual object, ceasing to display a respective portion of the second virtual object in the three-dimensional environment; and
- in accordance with a determination that the first virtual object is closer to the viewpoint of the user than the second virtual object, maintaining display of the respective portion of the second virtual object in the three-dimensional environment.

65. The non-transitory computer readable storage medium of claim 29, the method further comprising:

- in response to detecting the first input, in accordance with a determination that a first portion of a third virtual object of the plurality of virtual objects overlaps the first virtual object by more than the threshold amount from the current viewpoint of the user, and that a second portion of the third virtual object overlaps the second virtual object by more than the threshold amount from the current viewpoint of the user:
  - displaying a first respective portion of a first respective virtual object of the plurality of virtual objects with the second visual prominence; and
  - displaying a second respective portion of a second respective virtual object of the plurality of virtual objects with the second visual prominence.

66. The non-transitory computer readable storage medium of claim 29, wherein displaying the plurality of virtual objects includes:

- in accordance with a determination that the first virtual object is an active virtual object, the first virtual object is displayed with the first visual prominence without regard to whether or not the first virtual object overlaps with other virtual objects; and
- in accordance with a determination that the second virtual object is an active virtual object, the second virtual object is displayed with the first visual prominence without regard to whether or not the first virtual object overlaps with other virtual objects.

67. The non-transitory computer readable storage medium of claim 29, the method further comprising:

- while displaying the respective virtual object with the second visual prominence, detecting a second input corresponding to a request to move a virtual element in the three-dimensional environment toward a location associated with the respective virtual object in the three-dimensional environment; and
- while detecting the second input, moving the virtual element in the three-dimensional environment in accordance with movement associated with the second input while the respective virtual object is displayed with the second visual prominence.

68. The non-transitory computer readable storage medium of claim 67, the method further comprising:

- after moving the virtual element to the location associated with the respective virtual object, detecting, via the one or more input devices, a termination of the second input; and
- in response to detecting the termination of the second input, adding the virtual element to the respective virtual object in the three-dimensional environment while maintaining display of the respective portion of the respective virtual object with the second visual prominence.

69. The non-transitory computer readable storage medium of claim 67, the method further comprising:

- while detecting the second input:
  - in accordance with a determination that movement of the virtual element in the three-dimensional environment satisfies one or more first criteria, displaying the respective portion of the respective virtual object with a third visual prominence greater than the second visual prominence; and
  - in accordance with a determination that the movement of the virtual element in the three-dimensional environment does not satisfy the one or more first criteria, maintaining display of the respective portion of the respective virtual object with the second visual prominence.

* * * * *